United States Patent [19]

Kasparian et al.

[11] Patent Number: 5,020,135

[45] Date of Patent: May 28, 1991

[54] COMPUTERIZED MULTISTANDARD, FIELD-CONVERTIBLE, MULTIREGIONAL/MULTISERVICE, REMOTE CONTROLLABLE, REMOTE PROGRAMMABLE MOBILE TWO-WAY RADIO SYSTEM WITH DIGITAL SERIAL BUS LINK, BUILT-IN PROGRAMMER AND AUTODIAGNOSTICS

[75] Inventors: Kaspar Kasparian; John D. Ide; Thomas A. Brown, all of Raleigh; Aaron S. Rogers, Knightdale; John P. Fussell; Ming C. Hsu, both of Raleigh, all of N.C.

[73] Assignee: Teletec Corporation, Raleigh, N.C.

[21] Appl. No.: 30,743

[22] Filed: Mar. 27, 1987

[51] Int. Cl.[5] ..... H04B 1/40

[52] U.S. Cl. ..... 455/76; 370/24; 455/77

[58] Field of Search ..... 455/73, 75, 76, 77, 455/78, 79, 91, 31, 33, 84, 90; 381/91, 155, 104, 122; 379/202; 375/25

[56] References Cited

U.S. PATENT DOCUMENTS

| | | | |
|---|---|---|---|
| 2,577,751 | 11/1951 | Halstead | 455/58 |
| 4,175,215 | 11/1979 | McLaughlin | 379/202 |
| 4,267,597 | 5/1981 | Volpi et al. | 455/76 |
| 4,317,222 | 2/1982 | Bell et al. | 455/77 |
| 4,370,523 | 1/1983 | Bäder | 375/25 |
| 4,390,963 | 6/1983 | Puhl et al. | 364/900 |
| 4,398,265 | 8/1983 | Puhl et al. | 364/900 |
| 4,486,624 | 12/1984 | Puhl et al. | 370/24 |
| 4,616,314 | 10/1986 | Wilson et al. | 364/200 |
| 4,637,022 | 1/1987 | Burke et al. | 455/31 |
| 4,680,787 | 7/1987 | Marry | 455/349 |
| 4,718,080 | 1/1988 | Serrano et al. | 379/63 |
| 4,742,514 | 5/1988 | Goode et al. | 370/109 |
| 4,754,450 | 6/1988 | Lynk et al. | 370/29 |

FOREIGN PATENT DOCUMENTS

86/03926 7/1986 PCT Int'l Appl. .

2157923 10/1985 United Kingdom .

OTHER PUBLICATIONS

NEC Research and Development, No. 84, Jan. 1987, pp. 85-93. Tokyo, J.p. P.;KAI et al., "Cellular Mobile Radio Equipment".

Ericsson Review, vol. 60, No. 3, 1983, pp. 151-158, Stockholm, SE; C. Andren, et al., "Mobile Radio System C600".

*Primary Examiner*—Benedict V. Safourek

*Attorney, Agent, or Firm*—Breneman & Georges

[57] ABSTRACT

A Computerized Mobile Two-Way Radio System is provided having microprocessor enhanced capabilities and versatility for wide area/multiple region two-way radio networks with multiple categories of users and adaptability to multiple international standards and mobile radio equipment configurations. The main elements of the system consist of (1) a microprocessor-based Control Unit, (2) a Digital Serial Interface/Link and (3) a microprocessor-based Convertible Transceiver Unit. The Control Unit provides many facilities and capabilities for the operator and the system in compact form. The Interface/Link provides a two-way path for serial data consisting of digitized audio and digital command and status signals. The Transceiver Unit is designed for operation and control over the Digital Serial Interface/Link. The system allows the addition of many options, capabilities and peripheral/extenal devices including builtin front panel or remote programmability, built-in autodiagnostics, remote takeover of controls, remote memory-dump, remote diagnostics, program cloning capability, voting on all channels, 512 channel (expandable) programmability within 16 groups (expandable), triple levels of priority within each group (expandable), supreme over-ride channel, RS232C Interface Ports for data applications, phone patch for voice and for world-wide telephone linkable devices and other capabilities.

55 Claims, 53 Drawing Sheets

STATUS- CONTAINS ALL SINGLE BIT DATA ELEMENTS THAT ARE TRANSMITTED FROM THE CU TO THE RFU.

CONTROL UNIT TO TRANSCEIVER UNIT STATUS WORD

STATUS- CONTAINS ALL SINGLE BIT DATA ELEMENTS THAT ARE TRANSMITTED FROM THE RFU TO THE CU.

TRANSCEIVER UNIT TO CONTROL UNIT STATUS WORD

| LAST USED | NOT USED |
|---|---|
| C22 | C9 |
| R13 | — |
| CR3 | — |
| U9 | — |
| Y1 | — |

| SYMBOL | REF. DES. | TYPE | GATES/PKG. | UNUSED INPUTS HI | UNUSED INPUTS GND | PWR | GND |
|---|---|---|---|---|---|---|---|
| | U7 | 74HC04 | 6 | 11 | — | 14 | 7 |
| | U6 | 74HC08 | 4 | — | — | 14 | 7 |
| | U9 | 74HC74 | 2 | 10, 11, 12, 13 | — | 14 | 7 |

FIG. 26
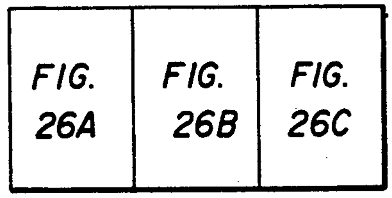
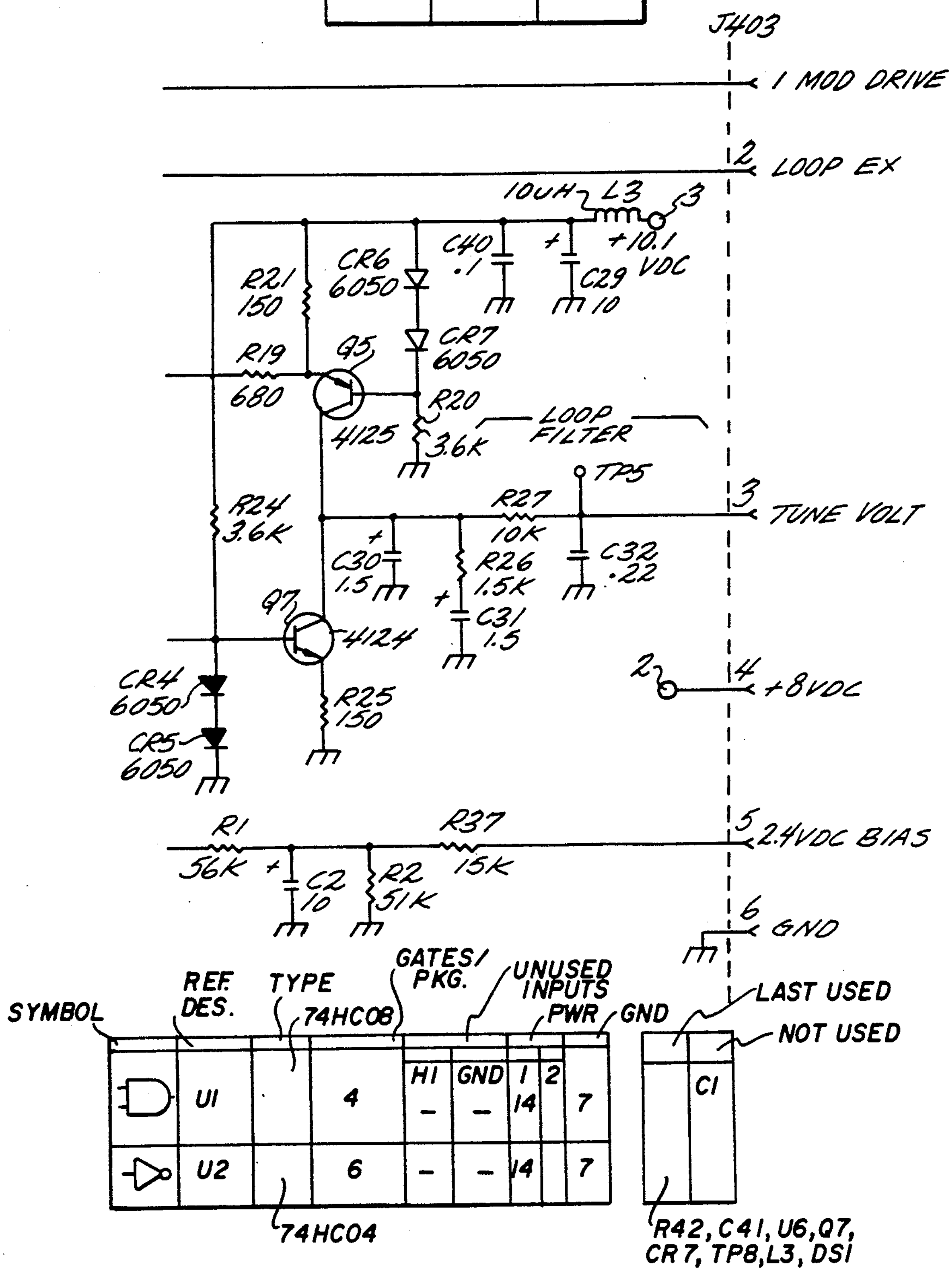
FIG. 26C

| SYMBOL | REF. DES. | TYPE | GATE / PKG. | UNUSED INPUTS | PWR | GND |
|---|---|---|---|---|---|---|
| (op-amp symbol) | U4,5,7 | LM358 | 2 | | 8 | 4 |
| | U3,6 | TL082 | 2 | | 8 | 4 |

| FIG. 27A | FIG. 27B | FIG. 27C |
|---|---|---|

| LAST USED | NOT USED |
|---|---|
| R99 | R78,84, |
| C96 | C11, 27, 47, 49, 54, 60, |
| Q10 | — |
| L17 | — |
| U11 | — |
| CR10 | — |

IC TABLE

| GATE | REF. DES. | DEVICE TYPE | GATES/ DEVICE | UNUSED INPUTS | PWR/GND |
|---|---|---|---|---|---|
| | U18 | 74 HC00 | 4 | 1,2 TIE TO GND | 14/7 |
| | U15 | 74 HC03 | 4 | — | 14/7 |
| | U13 | 74 HC14 | 6 | — | 14/7 |
| | U16 | 74 HC32 | 4 | — | 14/7 |
| | U17 | 74 HC04 | 6 | 13 TIE TO GND | 14/7 |

FIG. 29C
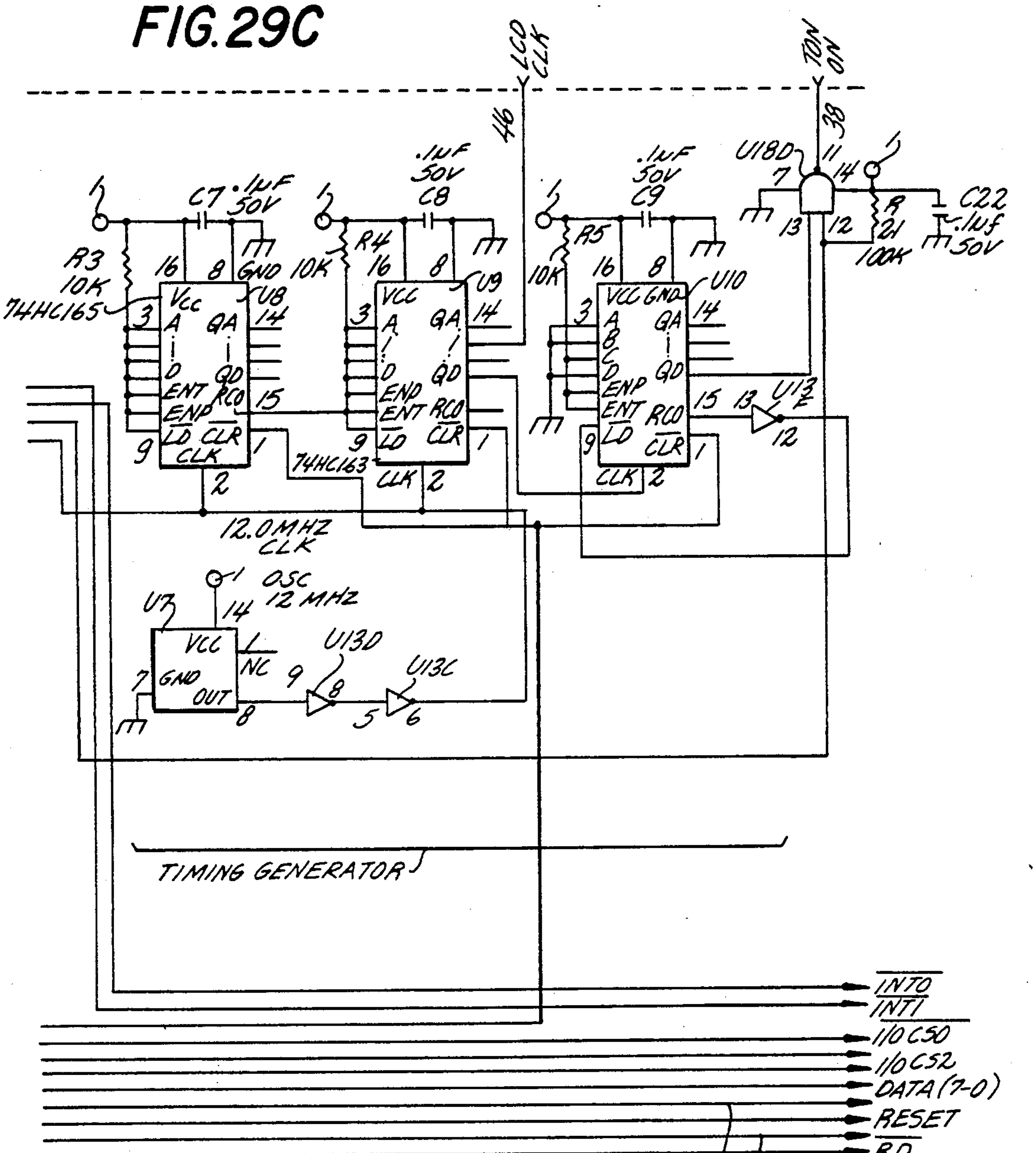
IC TABLE
| GATE | REF. DES. | DEVICE TYPE | GATES/DEVICE | UNUSED INPUTS | PWR/GND |
|---|---|---|---|---|---|
| 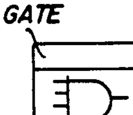 | U12 | 74HC21 | 2 | 1,2,4,5, TIE TO GND | 14/7 |
| 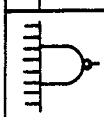 | U14 | 74HC30 | 1 | 9,10,13, NC | 14/7 |
| LAST USED REF. DES. | NOT USED |
|---|---|
| U20<br>C25<br>R21 | C15 |
| FIG. 29A | FIG. 29B | FIG. 29C |
|---|---|---|
FIG. 29

| FIG. 31A | FIG. 31B |
|---|---|

FIG. 32
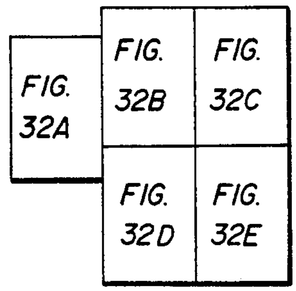
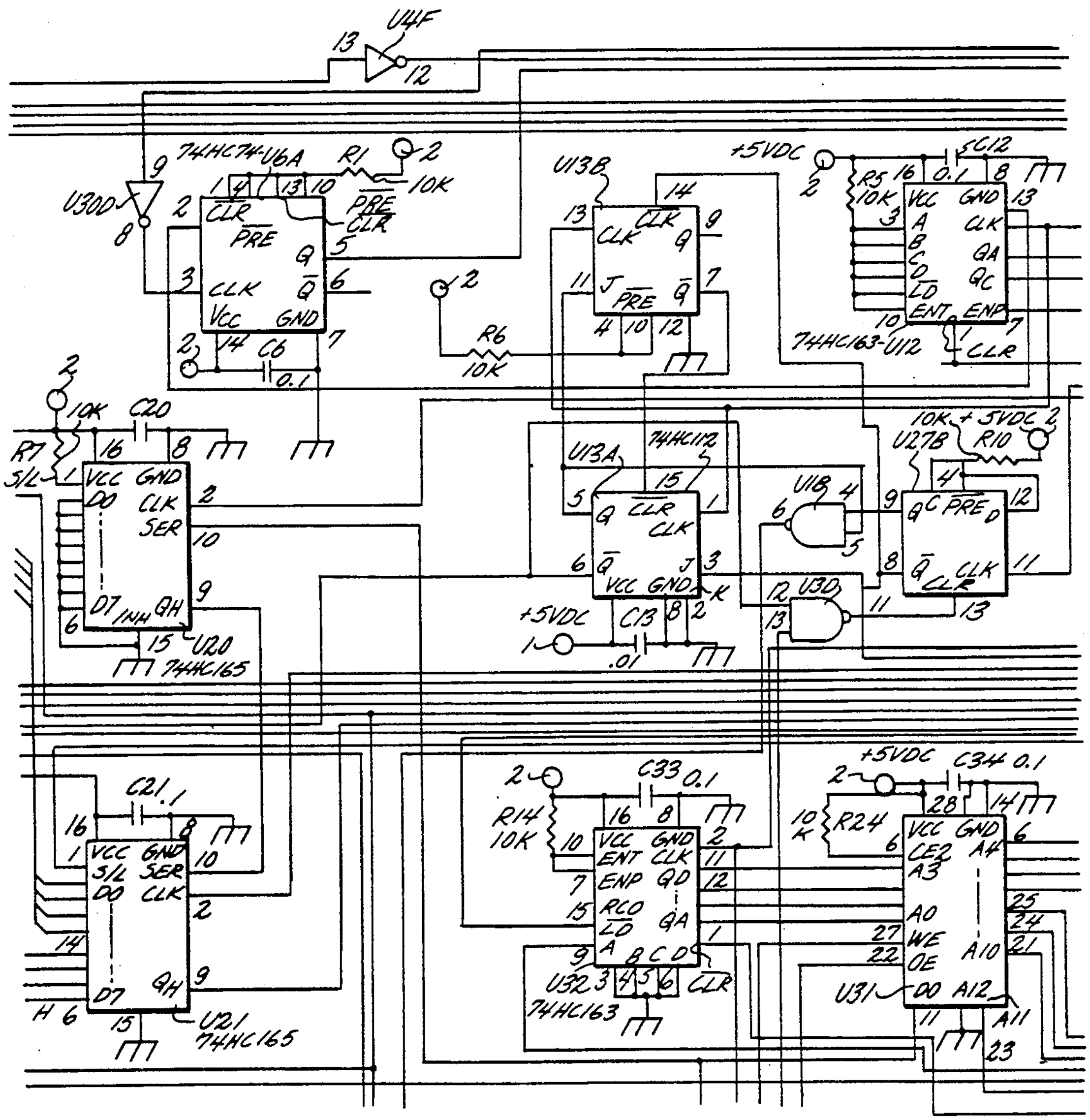
FIG. 32B

| SYMBOL | REF DES. | TYPE | GATES/PKG. | UNUSED INPUTS HI | UNUSED INPUTS GND | PWR | GND |
|---|---|---|---|---|---|---|---|
|  | U4 | 74HC14 | 6 | | 3 | 14 | 7 |
| | U24 | 74HC04 | 6 | | 3, 5 | 14 | 7 |
| | U30 | 74HC04 | 6 | | 13 | 14 | 7 |
| | U36 | " " | 6 | | 1,9,11,13 | 14 | 7 |
|  | U2 | 74HC08 | 4 | | | 14 | 7 |
| | U5 | 74HC08 | 4 | | | 14 | 7 |
|  | U1 | 74HC00 | 4 | | | 14 | 7 |
| | U3 | " " | 4 | | | 14 | 7 |
| | U25 | " " | 4 | | | 14 | 7 |

| LAST USED | NOT USED |
|---|---|
| U38 | U11, U26, U37 |
| C42 | |
| R25 | |
| CR2 | |

FIG. 33C
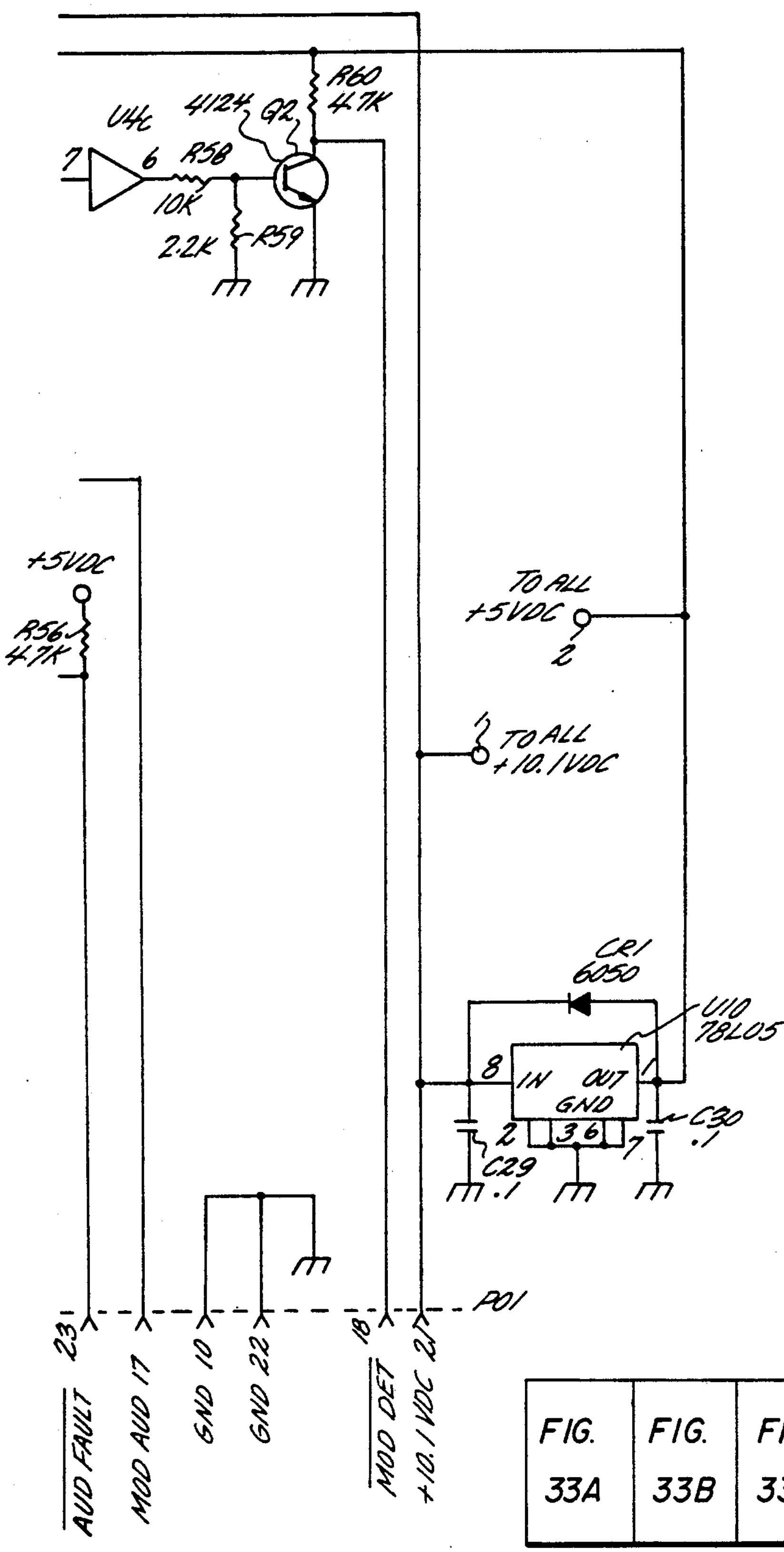
FIG. 33

COMPUTERIZED MULTISTANDARD, FIELD-CONVERTIBLE, MULTIREGIONAL/MULTISERVICE, REMOTE CONTROLLABLE, REMOTE PROGRAMMABLE MOBILE TWO-WAY RADIO SYSTEM WITH DIGITAL SERIAL BUS LINK, BUILT-IN PROGRAMMER AND AUTODIAGNOSTICS

BACKGROUND OF THE INVENTION

1. Cross Reference To Related Applications

The invention pertains to a computerized multistandard, field convertible, multiregional/multiservice, remote controllable, remote programmable mobile two-way radio system with digital serial bus link, built in programmer and autodiagnostics that is interrelated to the subject matter of the related copending patent applications entitled (1) Control System For Microprocessor And Software Enhanced Communications Equipment, U.S. application Ser. No. 031,004 filed Mar. 27, 1987 now U.S. Pat. No. 4,896,370; (2) Bidirectional Digital Serial Interface For Communicating Digital Signals Including Digitized Audio Between Microprocessor-Based Control and Transceiver Units of Two-Way Radio Communications Equipment, U.S. application Ser. No. 031,003 filed Mar. 27, 1987; (3) Audio Blanking Fill-In Method and Apparatus For Priority Multi-Channel Receivers, U.S. application Ser. No. 030,594 filed Mar. 27, 1987 which title was amended to, Interrupted Audio Fill-In System for Noise Reduction and Intelligibility Enhancement in Multi-Channel Scanning Receiver Applications and issued as U.S. Pat. No. 4,868,891; (4) Combined Phase And Frequency Modulator For Modulating An Information Signal, U.S. application Ser. No. 030,592 filed Mar. 27, 1987 now U.S. Pat. No. 4,739,288; (5) Variable Time Inversion Algorithm Controlled System For Multi-Level Speech Security, U.S. application Ser. No. 030,499 filed Mar. 27, 1987 and U.S. application Ser. No. 346,282 now U.S. Pat. No. 4,937,867, the disclosure of which are incorporated herein by reference.

2. Field of the Invention

This invention relates to mobile two-way radio equipment. It is intended to provide a new and better system for such equipment. The advantages include: the capability of such equipment to meet multiple international norms, allow field convertibility to different versions, allow a high degree of hierarchical control of the network by headquarters, allow operation over a wide area or multiple regions, provide the capability to accommodate multiple services, provide outstanding versatility for network growth and changing operational requirements, provide many facilities for the user and allow the addition of many useful peripheral devices. The system of the invention in addition allows remote takeover of mobile radio equipment, allows remote programming of mobile transceivers, provides autodiagnostics with alphanumeric indication, provides remote diagnostics, provides cloning of programs between equipment, provides selectable grouping of frequencies, provides multiple modes of operation, provides multiple levels of priority in manual as well as scan modes, provides one highest priority channel designation common to all channel groups, provides selective calling, allows the transmission and reception of messages including emergency status, provides a highly compact control system, provides the capability to control multiple transceivers in multiple bands through one control unit, allows front panel programming facility with double access security and other advantages.

3. Description of the Prior Art

The System of the invention was developed to meet a long existing need in the 'high-end' land/mobile two-way radio domain. Relative to 'high-end' transceivers, 'low-end' radio equipment are typically designed for local, smaller or only city-wide networks. The 'low-end' radios have less sophisticated capabilities relative to the 'high-end' radio equipment that are used by demanding users such as public safety agencies.

Prior art 'high-end' land/mobile radio equipment are characterized by higher performance, more capabilities, additional facilities and some versatility. They are typically designed to accommodate better control by headquarters and allow some changes in operational requirements. These characteristics are important for stringent and sophisticated users with large organizations, such as utilities and public safety agencies. Due to the inherent nature of such users, the radios must be able to operate over wide areas, including multiple radio coverage zones, and with the participation of multiple categories of users or services. Sometimes, those zones and services are interconnected through various large networks, such as microwave backbone systems, remote repeaters and various radio or telephone links. Sophisticated users often require other facilities such as 'tactical' operation (low power car-to-car operation), selective calling, status reports, duplex operation, headquarters to mobile message capability, automatic identification, voice security, data transmission, acknowledgement of messages, resetting of messages, tone system for access to repeaters at remote sites, wide band operation, wide-spaced transmit and receive frequencies, phone patch capability, scanning with priority, voting and other facilities.

Over the years, wide-area multiple service two-way radio networks have typically developed from smaller systems that were designed for specific limited local requirements. Since these requirements were not all identical, integrating the smaller systems eventually into wide area (statewide or nationwide) networks incorporating multiple services has often required very versatile and sophisticated equipment. The problem has been further compounded considering the number of such large networks, each with the idiosyncracies of its component local systems and users. Thus, a prior art two-way land/mobile radio designed for one special large network and organization may not be fully suitable to meet the requirements of another large network that has evolved differently and where the needs of that organization are different. Added to this are the complications imposed on the 'high-end' radio designer where the equipment is to meet the future growth requirements of the large organization along with versatility to cope with undefined future changes that may occur in operational requirements.

In the past, large network designers have often had to take into consideration the limitations of available equipment in engineering two-way radio networks. Where no existing equipment could meet the organization's special requirements, the user had to resort to specifying custom-engineered equipment. This caused delays due to the special engineering required and often added to the cost of the equipment. Also, being one-of-a-kind and custom-engineered, land/mobile transceivers sometimes have been plagued by the 'teething' problems of the special design.

To the supplier catering to such customizing, the special engineering caused other problems. Special development diversions had often to be created to accommodate the customizing. The manufacturing process also tended to be more of the 'batch processing' or 'job shopping' variety rather than a smooth flow. This often resulted in irregular shipments with consequent irregular receivables.

Sometimes, no matter how willing a radio supplier would be to customize, the engineering tasks to meet the special requirements would be too extensive in the way of modifications or diversions. This would make the cost and deliveries prohibitive.

From an international perspective, there are also multiple international norms to be considered. Besides the FCC/EIA standards, there are many other international standards that apply to two-way land/mobile radio equipment. Expressed in simple terms, the different countries may be thought of as being 'Anglophile' or 'Francophile'. Thus, many countries adopt standards that may be close to or bear a resemblance to British or French norms. There are, however, other norms as well as many nuances of the basic three norms mentioned. Many developed nations have already established their specific standards. In developing nations, however, there are areas which have adopted one of the three basic systems mentioned above, adopted variations thereof, developed their own standards or remained undecided. This presents many problems to international consultants who try to anticipate future directions in undecided areas and do not want to be restrictive in specifying equipment.

In terms of hardware, the U.S. market has both low and high R.F. output power requirements and tends to favor high power equipment for 'high-end' requirement. Thus, R.F. output requirements for stringent U.S. users can typically reach 100 Watts, while 15 or 25 Watts in Europe is quite common.

Yet another problem is related to whether 'high-end' equipment is purchased in a dash or trunk-mount configuration. The issue is the adaptability of the equipment to future configuration requirements or to future vehicle limitations.

All these differences in norms present a problem for U.S. or international manufacturers of 'high-end' two-way radio equipment.

Obviously, a totally new approach has long been required. The advent of increasingly powerful and affordable microprocessors, memory devices and digital techniques plus a novel design for accommodating field-convertibility of the equipment's configurations allows such a new approach. The result is the system of this invention, providing immense versatility for sophisticated users and large networks plus many new facilities and capabilities. In addition, this system allows the equipment to operate within all the parameters of the prevailing world-wide technical norms.

SUMMARY OF THE INVENTION

The disadvantage and limitations of prior art systems and two-way radio equipment are obviated by the invention which involves a new system for mobile two-way radio equipment so as to provide: multistandard operation, field convertibility into different versions, multiregional/multiservice operation, outstanding versatility, extensive software, remote takeover and remote programming capability, hierarchical operation for large organizations, one universal type of control cable for all applications, accommodation of many peripheral communications devices and extensive facilities for the user and the headquarters.

It is a further aspect of this invention to achieve the above and many other innovations and advantages through the special design developed for each of the three main elements of the mobile two-way radio. These are: (1) the Control Unit, (2) the Transceiver Unit and (3) the Digital Serial Interface/Link System between the Control and Transceiver Units.

The Control Unit of this invention is microprocessor-based and has a multipurpose and highly compact system of control buttons. It also has an alphanumeric display with annunciators and other indicators. It has an RS232C Interface Port for data applications as well as other special, multipurpose connectors. It has provisions for program cloning from one equipment to another. It is designed to mount in the dash of U.S., European and Japanese cars. It can also be mounted elsewhere, such as under the dash of vehicles. The Control Unit is designed to plug-in-connect with the Transceiver Unit to provide an integrated mobile radio. Alternately, it is designed to provide extended control of one or more Transceiver Units in the same or different bands which are typically mounted in the trunk of vehicles. The Control Unit is field adaptable to U.S., Japanese and European vehicle dashboards. It has other facilities and capabilities that are described in further detail in copending patent applications entitled (1) CONTROL SYSTEM FOR MICROPROCESSOR AND SOFTWARE ENHANCED COMMUNICATIONS EQUIPMENT and (2) BIDIRECTIONAL DIGITAL SERIAL INTERFACE SYSTEM FOR COMMUNICATING DIGITAL SIGNALS INCLUDING DIGITIZED AUDIO BETWEEN MICROPROCESSOR-BASED CONTROL AND TRANSCEIVER UNITS OF TWO-WAY RADIO COMMUNICATIONS EQUIPMENT U.S. application Ser. No. 031,003.

The Transceiver Unit is designed for multi-frequency bandwidth operation and with independent Transmit/-Receive Synthesizers. The Transceiver Unit is field convertible from a low R.F. output version to a high R.F. output version. It is also designed for field conversion from simplex to duplex operation. The Transceiver Unit allows field conversion from a trunk-mounted version into a dash-mounted version and vice versa. Like the Control Unit, the Transceiver Unit is microprocessor-based and operates in coordination with the Control Unit. The Transceiver Unit too is provided with an RS232C Interface Port. The mounting system of the Transceiver Unit allows automatic coupling of the control and power connectors.

The Serial Interface/Link System acts as a 'bridge' between the Control and Transceiver Units. The Interface portion resides partially in the Control Unit and partially in the Transceiver Unit, while the Link is the actual medium (or Control Cable) through which the Control and Transceiver Units communicate. The Interfaces comprises a Digital Serial Bus System using a TDM/PCM approach (Time Division Multiplex/Pulse Code Modulation). The Interface System is described in a separate patent application BIDIRECTIONAL DIGITAL SERIAL INTERFACE SYSTEM FOR COMMUNICATING DIGITAL SIGNALS INCLUDING DIGITIZED AUDIO BETWEEN MICROPROCES- SOR-BASED CONTROL AND TRANSCEIVER UNITS OF TWO-WAY RADIO COMMUNICATIONS EQUIPMENT the disclosure of which is incorporated herein by reference.

The path provided by the Interface System is two-way and accommodates digital signals and digitized audio which are grouped into channels. The channels are transmitted and received in frames by Control and Transceiver Units. This allows the use of one compact universal Control Cable between the Control and Transceiver Units for all applications, obviating bulky control cables with many conductors and multiple pin connectors at each end which are often custom made to meet specific requirements. This Interface System also allows the use of a non-radiating two-way compact optical fiber link control cable between the Control and Transceiver Units.

The design of the unique and advantageous system of this invention is the result of many years of experience in the high-end two-way radio domain, the recognition of the needs of stringent users in the U.S. and overseas, the design of the equipment for field-convertible configurations, the application of modern microprocessors and digital techniques, the use of software instead of custom hardware to provide versatility and the unique combination of several technologies and approaches in the design of the system.

The system of this invention provides many new and powerful tools to the users and designers of two-way land/mobile networks.

BRIEF DESCRIPTION OF THE DRAWINGS

The objects, innovations, features, capabilities, details and advantages of the invention will become more evident by reference to the Detailed Description and the following drawings in which:

FIG. 1(*b*) illustrates a block diagram of a recent prior art radio with multiconductor connection between the control unit and transceiver unit having separate analog audio, digital data and control paths;

FIG. 10(*b*) illustrates further examples of messages, such as diagnostics-related messages between Control and Transceiver Units;

FIGS. 24, 25, 25A, 25B, 26, 26A, 26B, 26C, 27, 27A, 27B, 27C, 28, 28A, 28B, 28C, 29, 29A, 29B, 29C, 30, 31, 31A, 31B, 32, 32A, 32B, 32C, 32D, 32E, 33, 33A, 33B, 33C, 34, 35, 35A, 35B, 35C and 35D were originally filed as Appendix Items 8a through 81 and are schematic and mechanical drawings that may be utilized in the construction of novel radios of the invention.

COMPUTER PROGRAM LISTING APPENDIX

APPENDIX 1: Appendix 1 provides a description and listing of programming/software that is related to the system of the invention. The following is a listing of the items included in Appendix 1:

APP. ITEM 1 illustrates a Software Module Header format that can be used to identify and describe each module of the software design.

APP. ITEMS 2a through 2g provide actual Control Unit Module Header samples that are used with the approach of FIGS. 22 and 23, and APP. ITEM I. These Module Headers relate to the Control Unit, including the Control Panel, Interrupt Function, RS232 Interrupt, CU PCM Interrupt and Power Up Modules.

APP. ITEMS 3a through 3e provide sample Transceiver Unit Module Headers. These Module Headers relate to the Transceiver Unit, including the Executive Module, Power Down Interrupt, Power Up initialization, Radio Function Interrupt and PCM Interrupt.

APP. ITEMS 4a through 4g provide actual software code examples based on the structure of FIGS. 22, 23 and ITEMS 1 through 4. These program codes relate to the Control Panel.

APP. ITEMS 5a through 5u provide sample Module Headers for the Digital Serial Interface Links of the Control and Transceiver Units of the invention.

APP. ITEMS 6a through 6u provide actual software code examples based on the Module Headers of APP. ITEMS 5a through 5u regarding the Digital Serial Interface Links of the Control and Transceiver Units of the invention.

APP. ITEM 7 is a comprehensive compilation of software Module Headers and sample program codes for the system of the invention.

UNPRINTED APPENDIX ITEMS include two boxes of computer program print-outs labelled "Control Unit" and "RF Unit" which are not printed as part of the patent but will be maintained as part of the application file.

DETAILED DESCRIPTION OF THE INVENTION

Figure 1A:
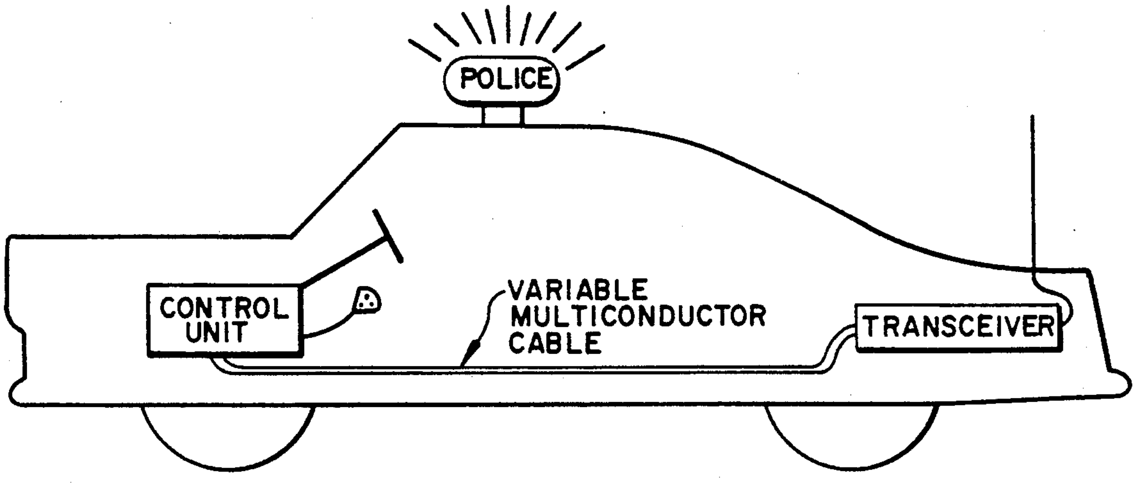
FIG. 1(*a*) illustrates a recent prior art trunk-mount radio with separate control unit, separate transceiver unit typically permanently configured for 'trunk-mount' application and a multiconductor cable connecting the two units where the number of conductors may have to vary to meet custom requirements.
Figure 1B:
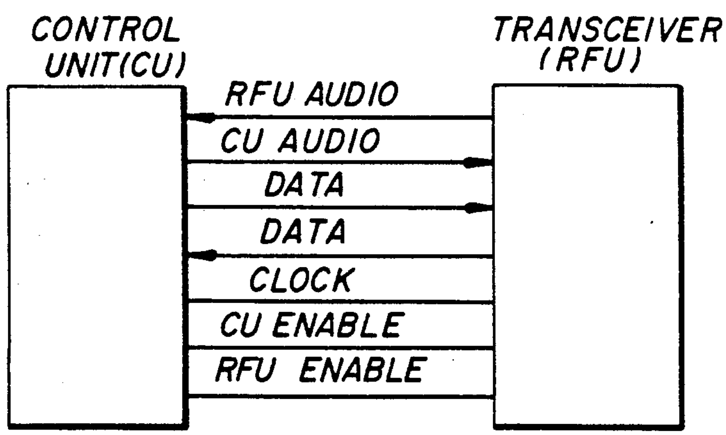

Referring to FIG. 1(*a*), a typical prior art trunk-mount two-way installation in a vehicle is illustrated. The control portion of the radio is installed in the passenger compartment while the transceiver portion is installed in the trunk. A multiconductor control cable connects the two. For many custom requirements entailing custom modifications of the control and transceiver portions of the radio, custom cables too are usually necessary.

FIG. 1(*b*) depicts a recent prior art radio employing a microprocessor approach but using separate physical links between the control and radio frequency portions of the equipment for analog audio, digital data and control paths.

Figure 2:
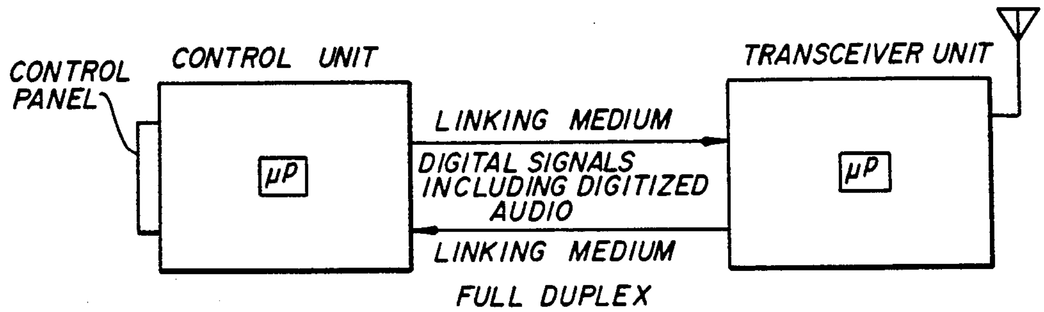
FIG. 2 illustrates the simplified system block diagram of two-way land/mobile radios of the invention with only two physical paths needed in the communications medium between the microprocessor-based Control Unit and the microprocessor based Transceiver Unit.

FIG. 2 illustrates the simplified block diagram of the two-way radio system of the invention which consists of a Control Unit, a Transceiver Unit and a Serial Interface System used as a communications medium between the two units. One subsystem of the Serial Interface System resides in the Control Unit and the other is in the Transceiver Unit. The actual physical linking medium between the two units can be a 2 wire control cable or a 2 'conductor' optical fiber connecting link.

Figure 3:
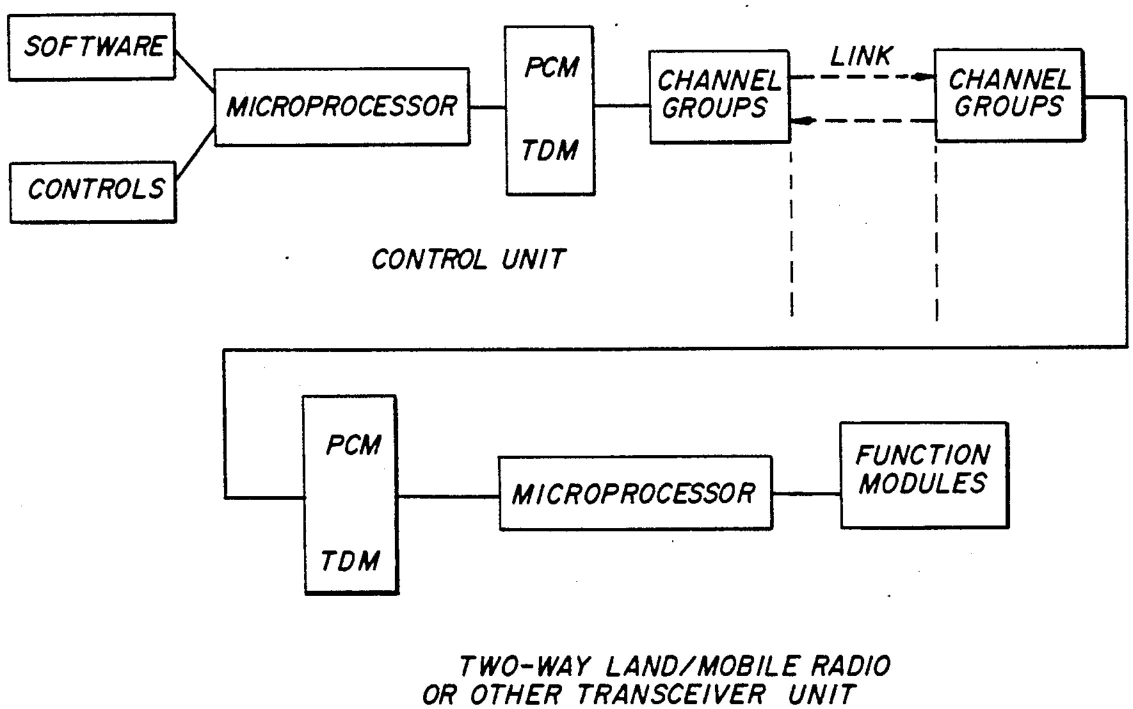
FIG. 3 shows a further expanded general block diagram of two-way land/mobile radios of the invention including the Digital Serial Interface portion of the invention which provides a communications path between the Control and Transceiver Units of the invention, this path only requiring two linking mediums which do not need to be varied for custom application requirements.

FIG. 3 illustrates a further expanded block diagram of the two-way radio system of the invention. As shown, both Control and Transceiver Units are microprocessor-based. Also, the radio equipment is software-based, providing it with extensive capabilities and versatility. A vast number of applications that with prior art equipment would have required custom hardware and modification of the circuitry and control cable (and its connectors) can be accomplished through programming. The Serial Interface System allows the incorporation of all these modifications without requiring a modification of the linking medium (control cable).

The Serial Interface System performs the task of serializing all the digital signals, including the digitized audio, then organizing them into channel groups which are transmitted in frames in serial fashion. The process is bidirectional, i.e., the serialized signal reaching the Transceiver Unit are deserialized into the original component signals and all communication in the reverse direction is accomplished essentially in the same manner.

The Digital Serial Interface, the microprocessors, the extensive software, the novel control approach, the special Transceiver and the flexible mechanical/electrical design of the package all contribute to the many features, capabilities and versatility of the novel two-way radio system of the invention.

Figure 4:
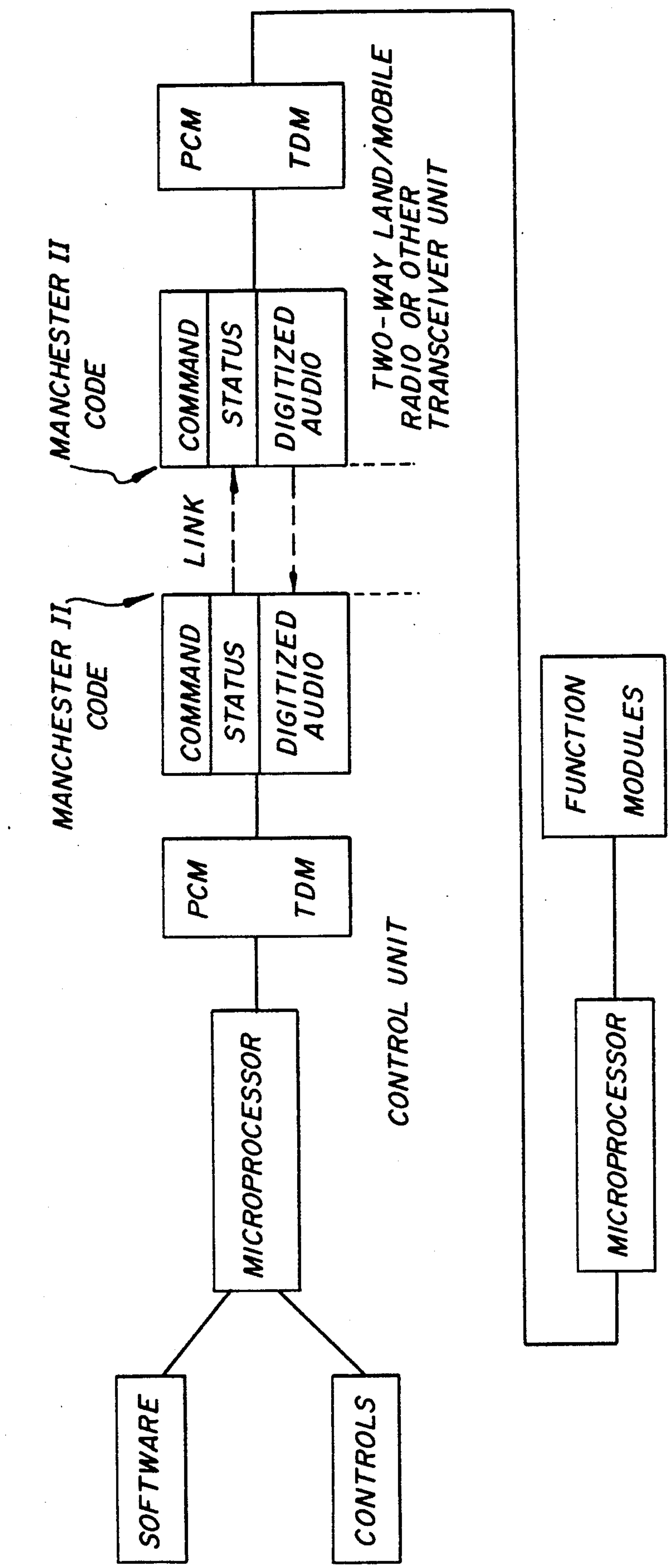
FIG. 4 illustrates a preferred embodiment of a two-way radio illustrating a preferred organization of channels of the Digital Serial Interface portion of the invention wherein the serialized data is organized into Command, Status and Audio Channels which are collected into a serial form suitable for TDM, and are transmitted in frames over the linking medium in "Manchester II" format synchronous bidirectional (full duplex) mode.

FIG. 4 illustrates a block diagram of the invention similar to FIG. 3, but showing a preferred embodiment mainly with respect to the Digital Serial Interface. The interface in this embodiment employs three channel groups: Audio, Status and Command Channels. These are transmitted two to a frame using the Manchester II Code.

This allows for the transmission of both parametric and non-parametric data over the interface. The parameters of the parametric data pertain to the status, command and control functions of the Control Unit and Transceiver Unit. The non-parametric data pertains to all other digitized information including but not limited to digitized audio, digitized graphic information, encoded data or other desired information for transmittal.

Details of the Digital Serial Interface are provided in the copending application entitled Bidirectional Digital Serial Interface System For Communicating Digital Signals Including Digitized Audio Between Microprocessor-Based Control And Transceiver Units Of Two-Way Radio-Communication Equipment the disclosure of which is incorporated herein by reference.

Figure 5:
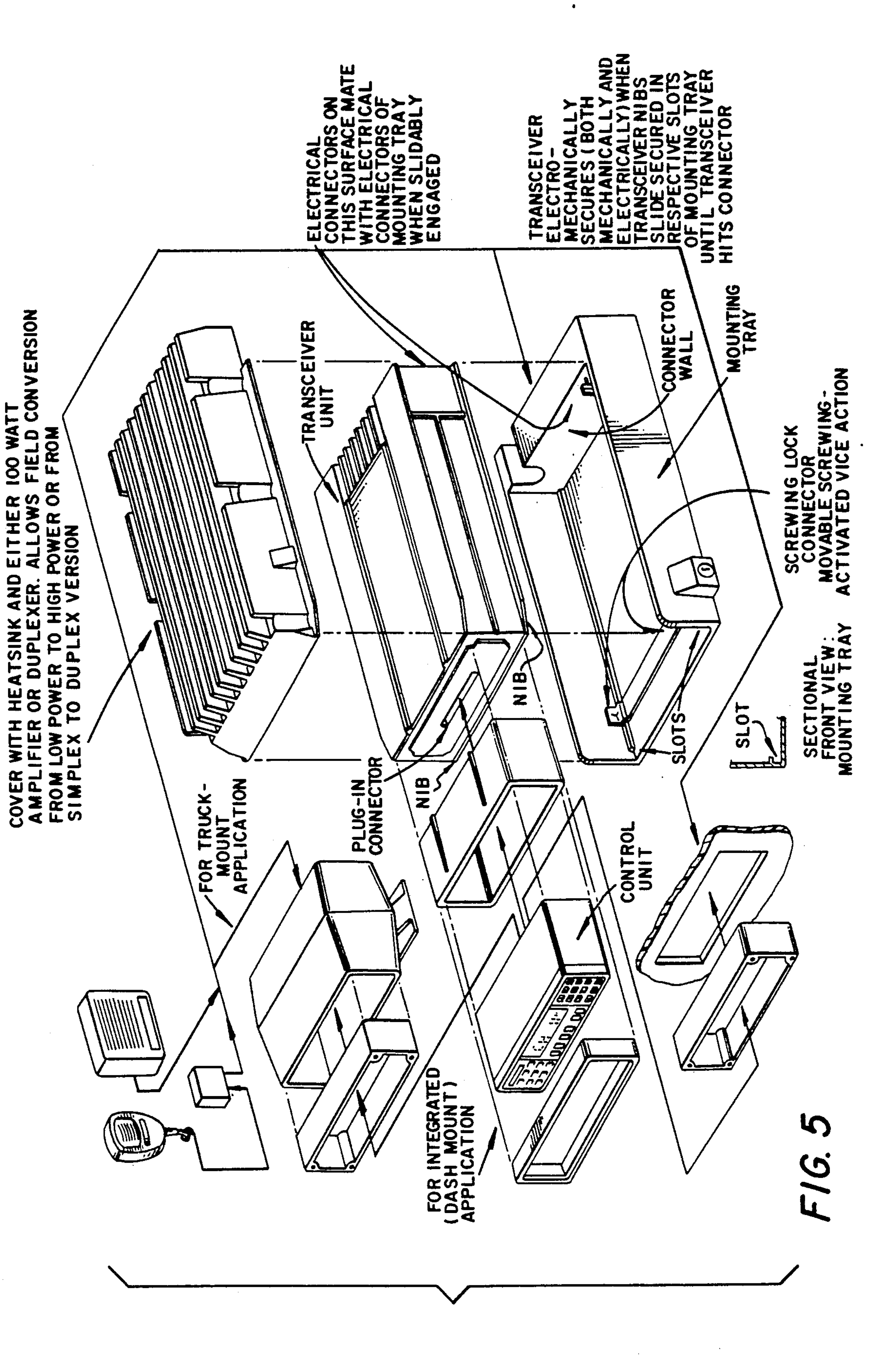
FIG. 5 illustrates a field convertible and autocoupling embodiment of the electromechanical design attributes of the radio equipment of the invention allowing field conversions.

FIG. 5 illustrates the physical components of an embodiment of the invention. A mounting tray is provided for housing the Transceiver Unit. This tray can be trunk mounted or passenger compartment mounted such as under the dash, as heretofore illustrated and described. The Transceiver Unit is then slidably engaged with the tray. If the tray is mounted under the dash or otherwise accessible to the operator, the Control Unit is then also mounted to the tray as illustrated in FIG. 5. In the alternative, if the tray is trunk mounted, the Control Unit is provided with a separate mounting housing, as illustrated, for independent passenger compartment mounting. The standard low power Transceiver Unit can be upgraded or field converted with an additional cover which acts as a heat sink and contains the necessary circuitry for a high power amplifier or for a duplexer to allow for field conversion from low power to high power or from simplex to duplex respectively. It is within the knowledge of those skilled in the art to provide such circuitry as illustrated below in a modular form for plug-in implementation as illustrated in FIG. 5 as evidenced by the number of after market RF power amplifiers and duplexers available.

Figure 6:
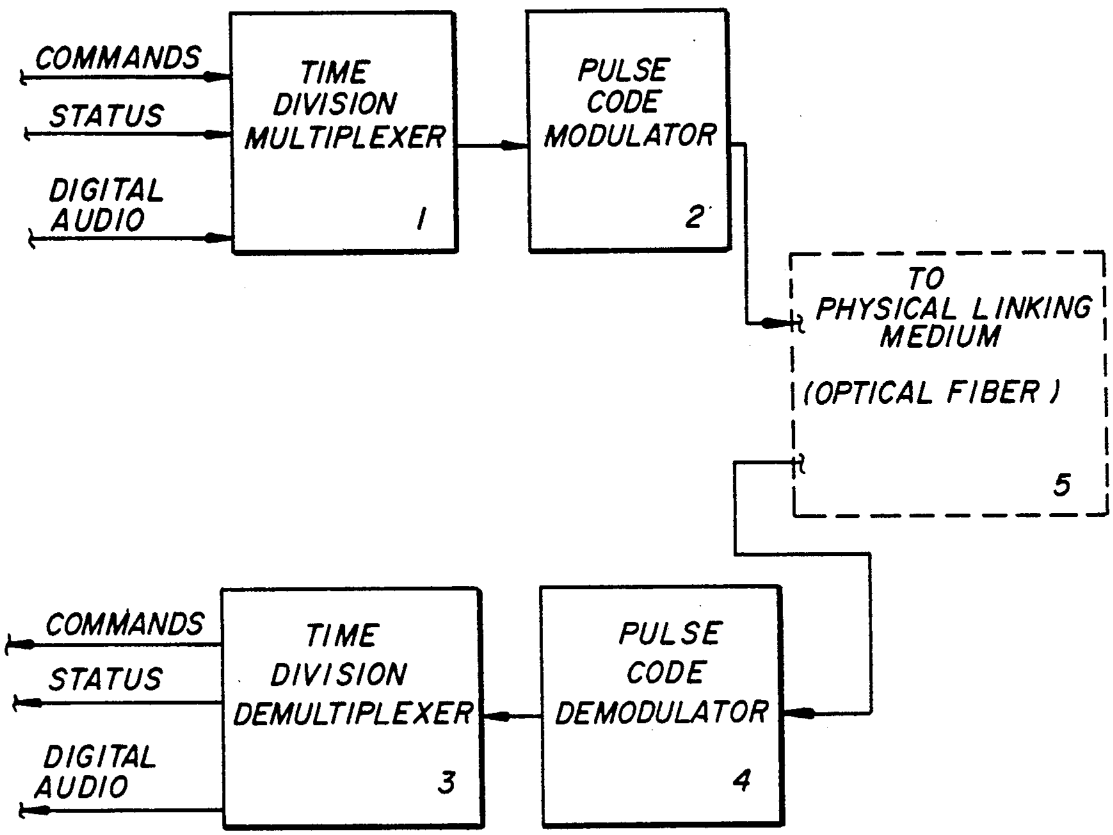
FIG. 6 illustrates serializer and deserializer sets employed in Control and Transceiver Units for the serializing and deserializing that occurs in the Control and Transceiver Units in accordance with the invention.

FIG. 6 illustrates the serializing and deserializing process in each subsystem of the preferred embodiment of the Digital Serial Interface System that provides a communications path between the Control Unit and the Transceiver Unit. As mentioned above, one subsystem of the Serial Interface System resides in the Control Unit, while the other resides in the Transceiver Unit. Each subsystem provides a serializing and deserializing function to allow two-way communications between the Control and Transceiver Units. Essentially, digital signals, including digitized audio, is organized into Command, Status and Digitized Audio Channels which are then transmitted in serial fashion in frames, using the Manchester II code and with each frame containing two of the channels mentioned.

This portion of the radio equipment system is described in detail in the copending application entitled: Bidirectional Digital Serial Interface System For Communicating Digital Signals Including Digitized Audio Between Microprocessor-Based Control And Transceiver Units Of Two-Way Radio Communications Equipment the disclosure of which is incorporated herein by reference.

Figure 7:
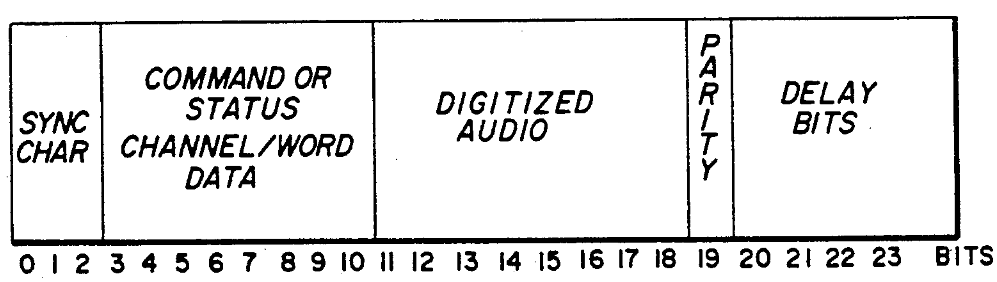
FIG. 7 illustrates a frame format used in the Interface System of the invention.

FIG. 7 illustrates the frame format used in the above Interface portion of the radio equipment system of the invention. This too is explained in detail in the copending application.

Figure 8:
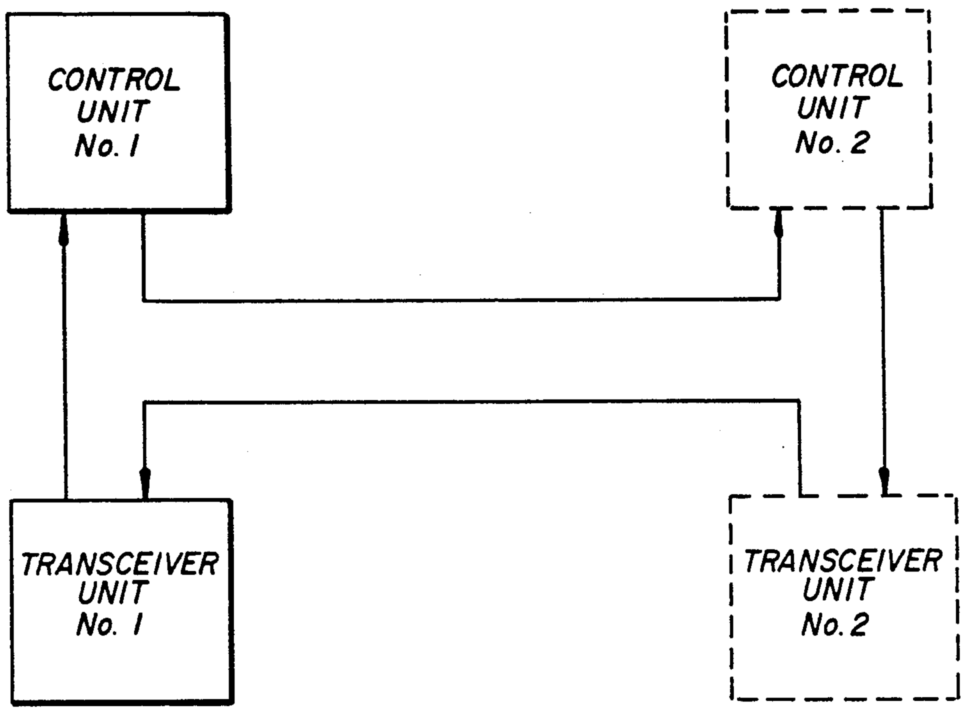
FIG. 8 illustrates a multiple unit interconnection of multiple Control and Transceiver Units of the invention.
Figure 9:
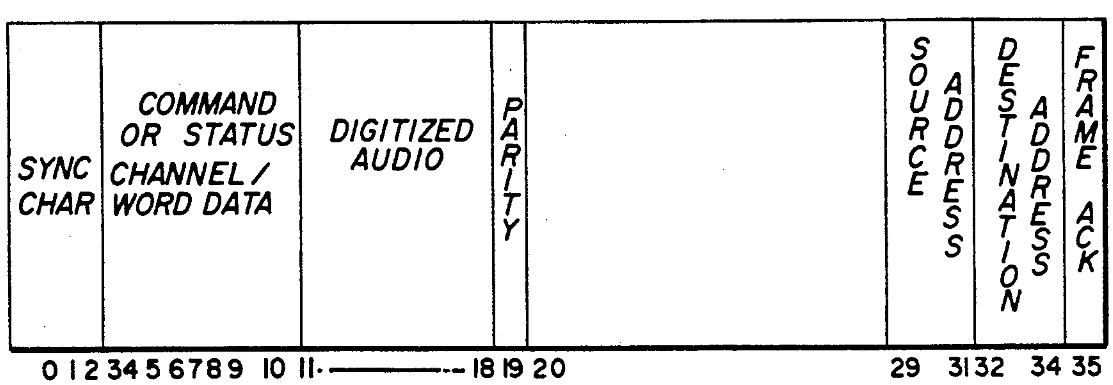
FIG. 9 illustrates a frame format - Token passing used for token passing for multiple unit interconnections.

FIG. 8 and FIG. 9 illustrate one of the important capabilities of the system of the invention. The Control Unit portion of the system is capable of controlling multiple Transceiver Units in the same or different bands. Similarly, one Transceiver Unit may be controlled by multiple Control Units. In the first configuration which has also been discussed earlier, the advantage is to allow the user to interface with only one point of control as opposed to prior art solutions which have had to provide one Control Unit per Transceiver Unit. Thus, with prior art, if it were required to have one or more Transceiver Units to cover the VHF High Band and one or more to cover the UHF Band, each would require a Control Unit in the passenger compartment. The clutter would be quite unpractical, especially during high speed driving conditions and when the user would have to control, set and use each and every one of these Control Units! With the system of the invention, all that is necessary is to use one single Control Unit in the passenger compartment to conveniently control multiple Transceiver Units in the same or different bands. Furthermore, with the system of the invention, only one Transceiver Unit is required to cover the conventional VHF High Band and only one to cover the conventional UHF Band.

The second related advantage of the invention is the capability it allows to use multiple points of control for one Transceiver Unit. Thus, the radio equipment of the invention allows a trunk-mounted Transceiver Unit to be controlled from the front passenger area or the rear. The same applies to larger vehicles such as trucks or the like.

The technical approach used to achieve this makes use of the unique attributes of main building blocks of the radio equipment system described earlier. The Serial Digital Interface allows an approach which may be described as 'token passing' and which is described in detail in the copending application related to the Digital Serial Interface with the title mentioned above. In essence, it is similar to the approach used for large LAN (Local Area Network) requirements. In this case, the system used is for a small 'LAN' and FIG. 9 illustrates one frame format that can be used over the Serial Interface System to achieve the 'token passing'!

Figure 10A:
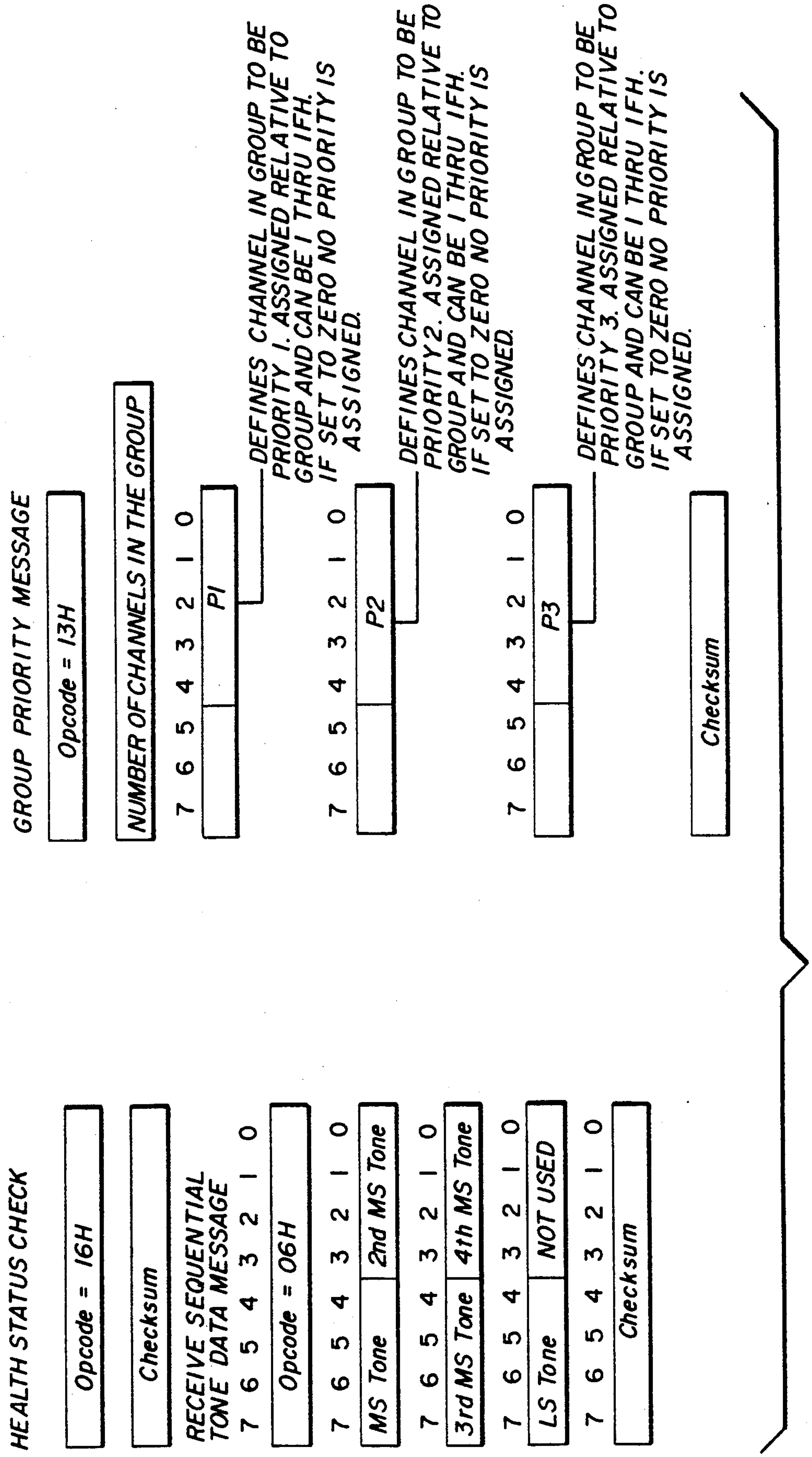
FIG. 10(*a*) illustrates examples of command messages between Control and Transceiver Units.
Figure 10B:
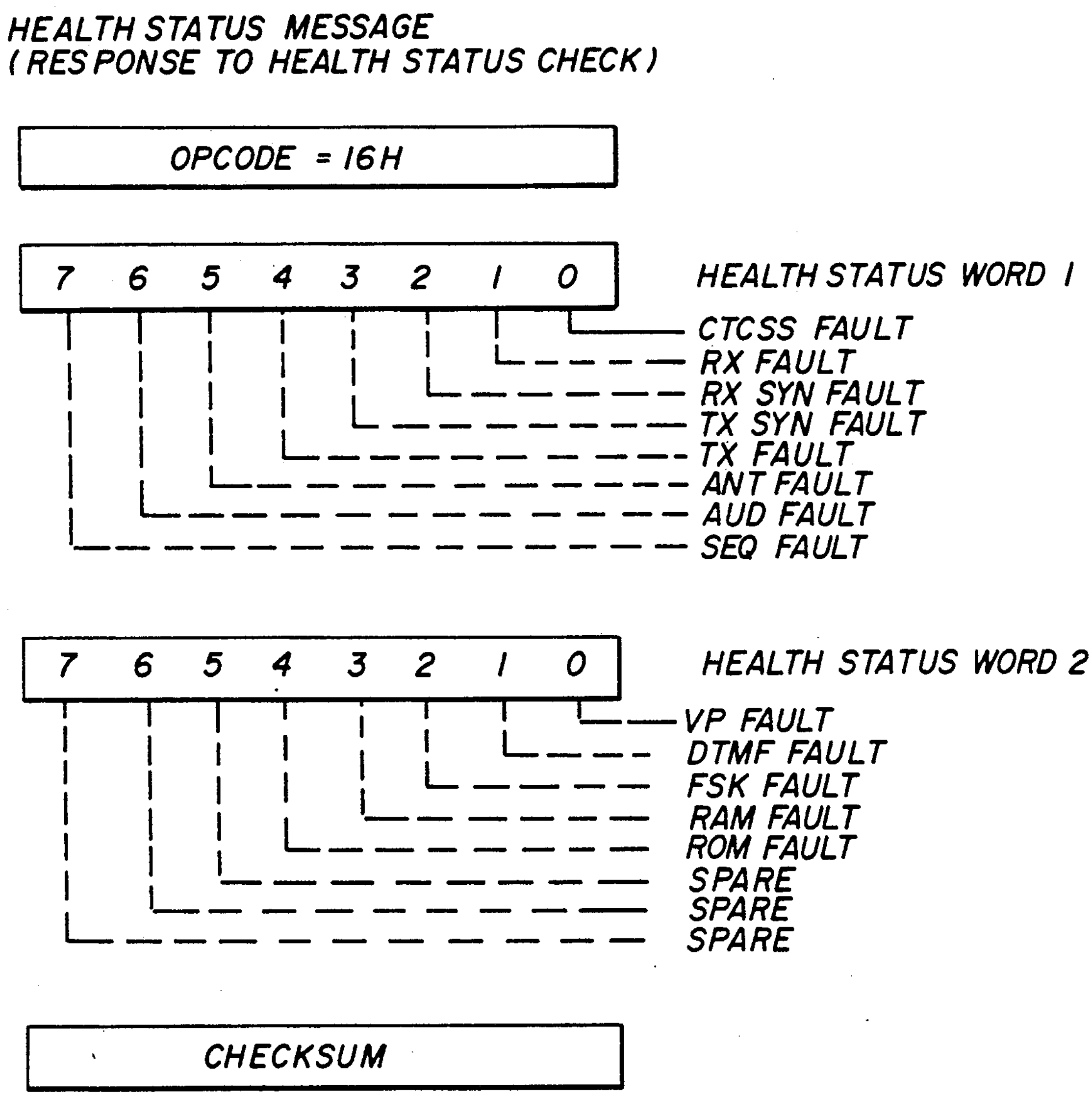

FIGS. 10(*a*) and 10(*b*) illustrate further examples of the messages (communications) between the Control Unit and the Transceiver Unit of the invention. The examples in FIG. 10(*a*) are command messages and relate to diagnostics, sequential tones (used for selective calling and other purposes) and group priority messages that relate to the designation of channels with different hierarchical priority ratings. FIG. 10(*b*) provides examples of status messages related to the diagnostics. From the top down, the first Status Word contains components related to CTCSS Fault (the subaudible tones available in the radio equipment system of the invention for accessing specific repeaters) which relates to the SITE Fault selection function. Continuing down, the RX Fault relates to receiver fault, RX SYN Fault relates to a receiver synthesizer fault, TX Fault relates to a transmitter fault, ANT Fault relates to a fault in the antenna system and the transmission line (or 'feeder'), AUD Fault relates to a fault in the audio system and SEQ Fault relates to a fault in the sequential tone system (used for selective calling and other purposes).

The next word from top down shows VP Fault which is related to a fault in the voice privacy system of the equipment. Next, DTMF Fault relates to a fault in the touch tone system of the equipment (used for the phone patch operation and other requirements), FSK Fault relates to a fault to the frequency shift keying portion of the equipment which would be used for specific applications such as remote instructions to the equipment, RAM Fault relates to a fault in the 'random access memory' system and ROM Fault relates to a fault in the 'read only memory' system of the equipment. Three spare components of the second health status message are reserved for any possible future requirements, such as custom options that may be provided to a user for special requirements.

Figure 11A:
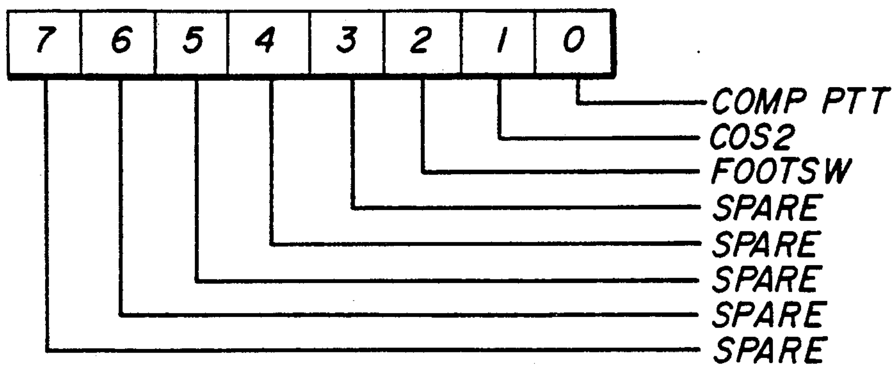
FIGS. 11(*a*) and 11(*b*) illustrate Status Word examples in the form of Status messages between Control and Transceiver Units.
Figure 11B:
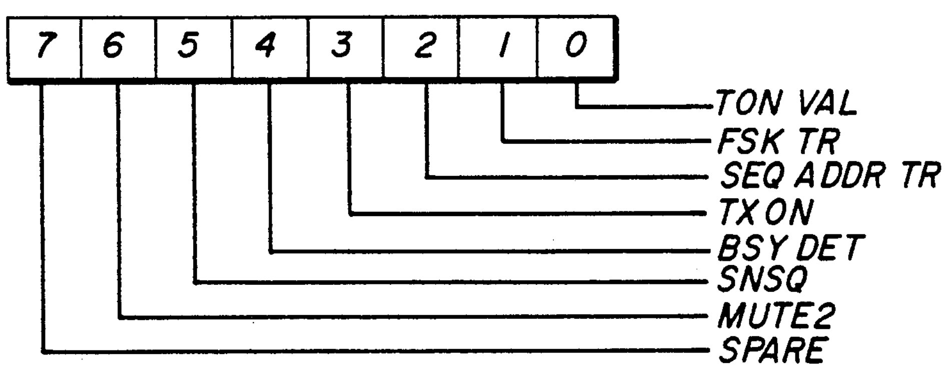

FIG. 11(*a*) illustrates yet further examples of messages from the Control Unit and the Transceiver Unit of the novel radio equipment system of the invention. 11(*b*) provides further examples of messages from the Transceiver to the Control Unit. This illustrates the powerful role played by the Digital Serial Interface System of the invention as one of its three main portions (the other two being the Control and Transceiver portions).

A further description of the types of messages follows:

Types of Commands, Command Channel/Word Messages: In a preferred embodiment, command channel/word type messages comprise a sequence of a variable number of such 8 bit command channel/words. The first of such words transmitted is a 'SOH', start of header word. The second word is an opcode, usually given in 2 symbol HEX (8 bits, 2 4-bit hex characters [ala Apple 2 - 6502 microprocessor notation or similar]) then a predetermined number of 8 bit words containing data to be transferred based on the specific OPCOPE. Lastly, a checksum word is transmitted at the end of a command message.

Examples of command messages are shown in FIG. 10(*a*).

Types of Status Words: In one preferred embodiment of the invention, there are two types of status words. A first RFU-to-CU status word and a second CU-to-RFU status word. The formats for each of these types of status words are given in FIG. 11(*a*) and 11(*b*).

Figure 12:
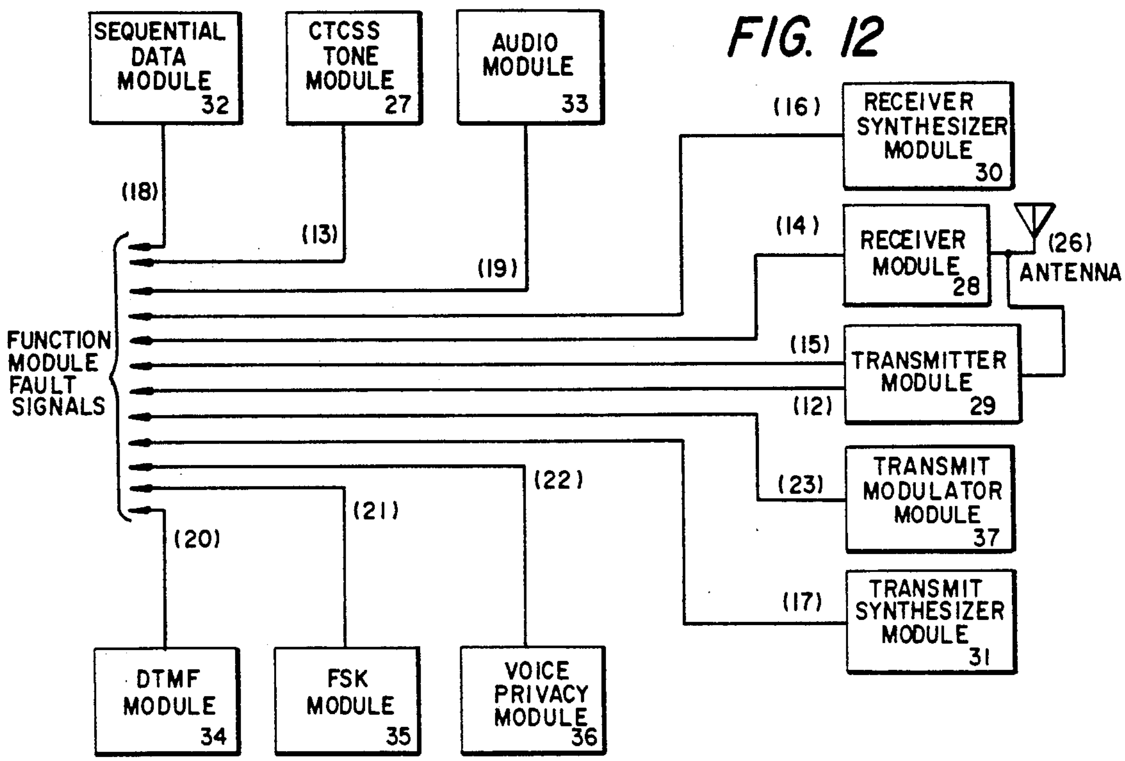
FIG. 12 illustrates function module fault signals for the autodiagnostics systems of the novel two-way radios that are used in the autodiagnostics routines.

FIG. 12 schematically illustrates the origins of the 'health status' messages of the function modules and starting from top left and clockwise, relates directly to the diagnostics related message components shown in FIG. 10(*b*) as described above. The schematics shows these fault signals as originating from the vital function modules of the radio equipment of the invention. Physically, the function modules are circuit boards that plug-in and which are secured to a 'mother board' which effects most of the interconnections between these modules. With the diagnostics information displayed on the control panel of the equipment, the user or technician can determine which module is defective. The defective module can then be removed and an appropriate replacement module is plugged in to affect an easy remedy.

Figure 13:
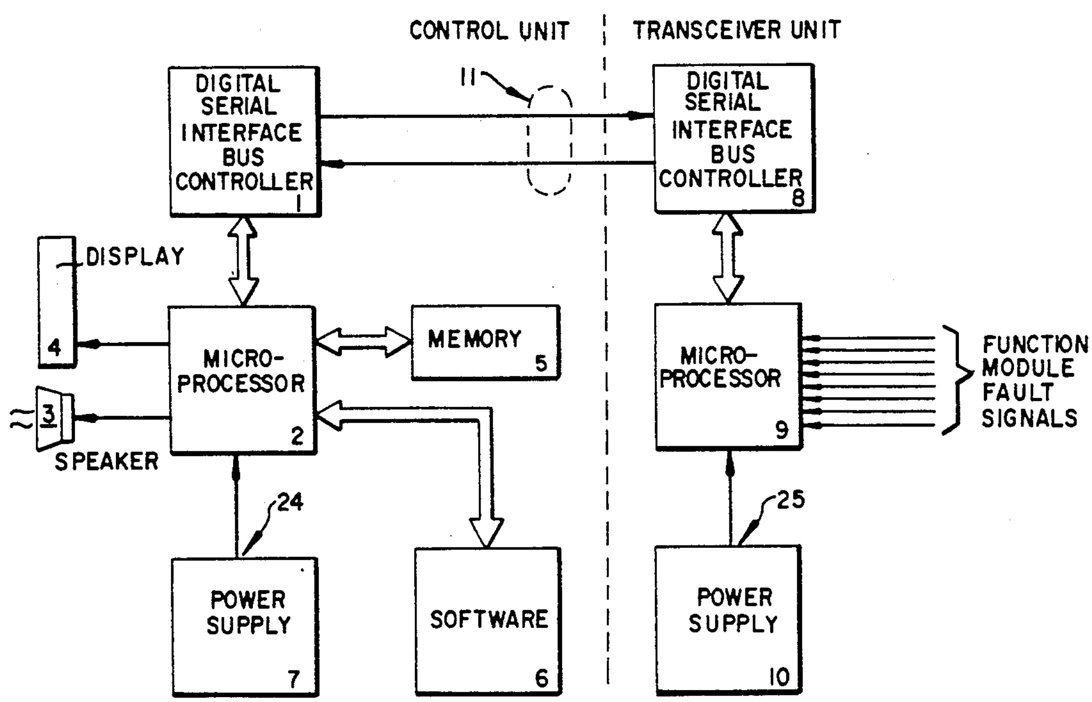
FIG. 13 illustrates a block diagram of the autodiagnostics system of the invention, continuing from FIG. 12.

FIG. 13 shows a block diagram of the autodiagnostics system of the invention, which is a subsystem of the overall system of the radio equipment of the invention.

The radio of the invention, in a preferred embodiment, performs an autodiagnostic 'health' check periodically to detect any faults in the radio and its vital peripherals. The autodiagnostics check examines twelve functional modules for fault conditions periodically. These faults are listed below. Also, two other modules (the power supplies) signal fault conditions on a higher priority basis than the other twelve functional modules.

First, the autodiagnostics check for the twelve functional modules will be described. Each functional module (shown in FIG. 12) produces a fault signal when the module malfunctions.

As shown in FIG. 13, these digital logic fault signals are monitored periodically by the microprocessor located in the Transceiver Unit (9). The microprocessor in the Transceiver Unit (9) periodically sends the status of the digital logic fault signals to the microprocessor located in the Control Unit (2) over the Digital Serial Interface Bus (11). The status of the digital logic fault signals is examined by the microprocessor in the Control Unit (2) and some preprogrammed action is taken if there is a valid fault condition.

AUTODIAGNOSTICS FAULTS

12: ANTENNA FAULT
13: CTCSS MODULE FAULT
14: RECEIVER FAULT
15: TRANSMITTER FAULT
16: RECEIVER SYNTHESIZER FAULT
17: TRANSMITTER SYNTHESIZER FAULT
18: SEQUENTIAL DATA MODULE FAULT
19: AUDIO MODULE FAULT
20: DUAL TONE MULTIPLE FREQUENCY (DTMF) MODULE FAULT
21: FREQUENCY SHIFT KEYING (FSK) MODULE FAULT
22: VOICE PRIVACY (VP) MODULE FAULT
23: TRANSMIT MODULATOR FAULT
24: CONTROL UNIT POWER SUPPLY FAULT (HIGH PRIORITY)
25: TRANSCEIVER UNIT POWER SUPPLY FAULT (HIGH PRIORITY)
26: ANTENNA MODULE
27: CTCSS MODULE
28: RECEIVER MODULE
29: TRANSMITTER MODULE
30: RECEIVER SYNTHESIZER MODULE
31: TRANSMITTER SYNTHESIZER MODULE
32: SEQUENTIAL DATA MODULE
33: AUDIO MODULE
34: DTMF MODULE
35: FSK MODULE
36: VP MODULE
37: TRANSMIT MODULATOR MODULE.

The possible actions taken by the microprocessor in the Control Unit (2) are to store the detected fault in memory (5) to display the detected fault on the control panel display (4) to notify the microprocessor in the Transceiver Unit (9) to transmit a fault message during the next subsequent radio transmission, or to notify the microprocessor in the Transceiver Unit (9) to transmit a fault message automatically at a preprogrammed periodic interval.

These actions would be specified in the radio's preprogrammed software (6) located in the Control Unit. These transmissions would typically consist of a sequence of tones that could be decoded by a receiving radio to activate some kind of warning mechanism (3).

The two remaining modules: the Control Unit power supply (7) and the Transceiver Unit power supply (10) also can generate fault conditions. If a condition exists such that the power supply voltage becomes out of tolerance for a certain duration of time the power supply warns the microprocessor of an impending loss of power. The microprocessor must take immediate action to store the present status of the unit and then shut the power supply off. Both power supplies and microprocessors react the same way to these conditions.

If the Transceiver Unit shuts off, the Control Unit will attempt to communicate several times over the Digital Serial Interface Bus (11). If there is no response from the Transceiver Unit, the Control Unit will then shut off.

Figure 14:
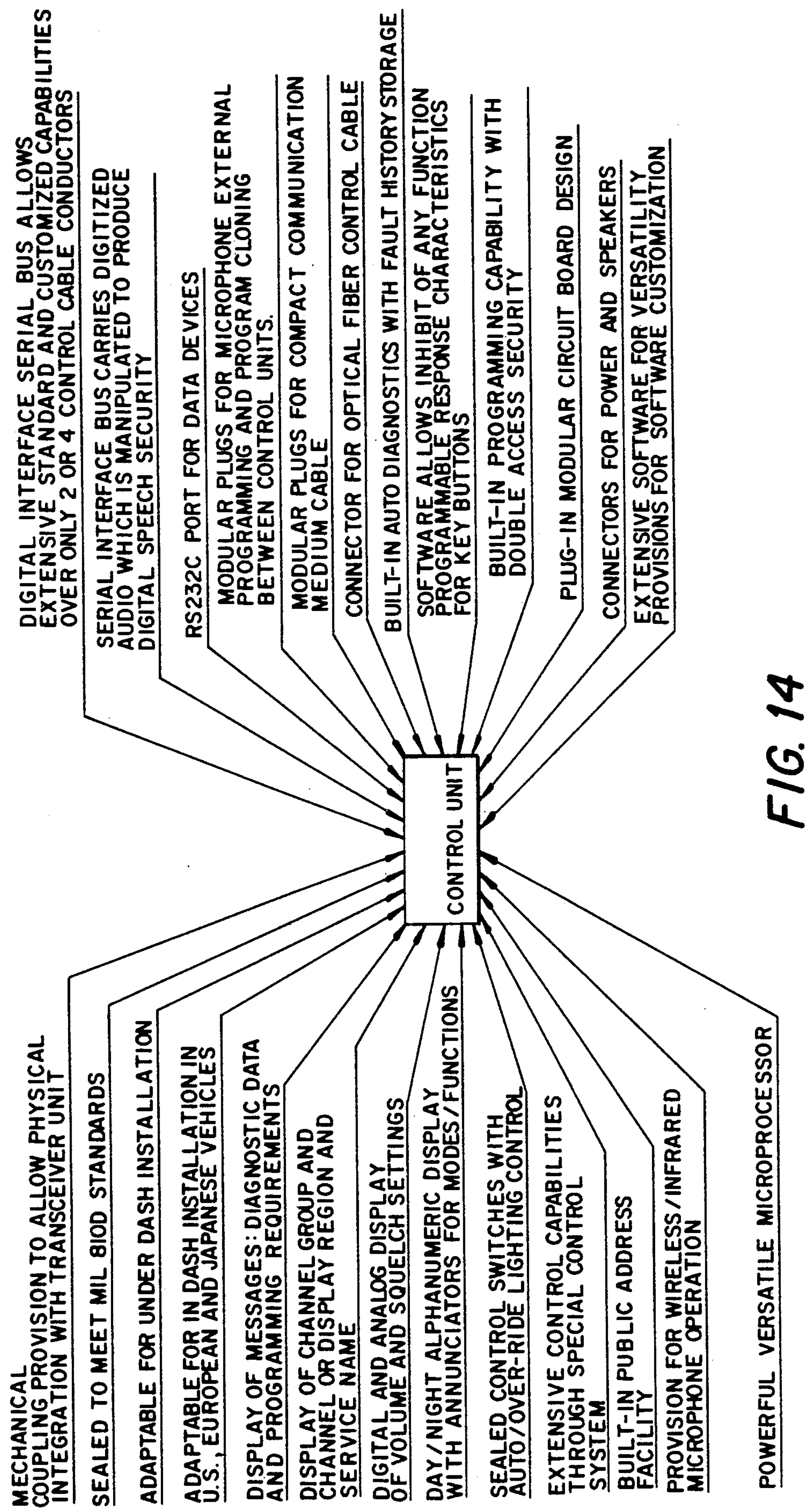
FIG. 14 illustrates a combination of features and capabilities of the novel microprocessor based Control Unit of the invention.

FIG. 14 illustrates the combination of features and capabilities of the microprocessor-based Control Unit of the invention which is one of the three main elements of the system of the invention. (Being so 'smart' it was designated as 'IQ 1000' by Teletec Corporation, Raleigh, N.C., where the system of the invention was developed.) Although the callouts of the drawing are self-explanatory, some additional details may assist in demonstrating the many advantageous innovations of this portion of the mobile two-way radio system of the invention. Items discussed in part earlier are included in the description of this FIG. 14 for a complete and integrated discussion of this important portion of the invention.

The Control Unit is the 'brains' of the mobile two-way radio system. In many respects, the Transceiver Unit that it controls is a 'slave' to it. The IQ 1000 has a powerful microprocessor and a vast amount of software. It carries out routine 'housekeeping functions' (analogous to the human brain's autonomous control center), it 'analyzes' a myriad of parameters, it responds to received external spurious and desired signals and it carries out the operator's deliberate commands.

The Control Unit of this invention is compact and designed to fit under the dashboard or elsewhere or in the dashboard of U.S., Japanese and European vehicles. It has special provisions that allow its adaptation in the field to all prevailing mounting requirements in the U.S. and overseas. It thus is truly designed for world-wide use and allows advantageous interchangeability between vehicles manufactured in different parts of the world. The IQ 1000 Control Unit is also designed to plug-in and connect with the Transceiver Unit wherever an integrated mobile radio is required. This versatility is a unique advantage as it allows the radio to be moved from vehicle to vehicle and adapt to changing fleet vehicle acquisitions and various installation requirements in the field.

The Control Unit is engineered to control one or more trunk-mount Transceiver Units in the same or different frequency bands. This is extremely advantageous for radio users in large networks where both VHF and UHF (or other frequencies and special bands) are used. This can even be accomplished in the field. It is easy to imagine how cluttered a vehicle interior would be with a multiplicity of control units and how difficult it is for the mobile user to cope with such multiple radio control units during driving conditions. Multiple radios also normally require multiple bulky control cables. All the aforementioned complications are obviated with the IQ 1000 Control Unit. All that is necessary in such cases is to install one single Control Unit which can then control multiple Transceiver Units in the trunk. The controls are designed for this and the Interface System of the IQ 1000 is engineered to accept very slim 2 or 4 conductor or optical fiber control cables. It is easy to visualize the powerful advantages of this capability.

The Control Unit is also designed to provide a very useful parallel control capability. In special systems, multiple Control Units may be used to control one Transceiver Unit. The additional Control Units may be located in the same vehicle or extended to other vehicles or even extended through the optical fiber link to a command post! This adaptation too is possible to accomplish in the field.

The Control Unit is provided with connectors for a wire connected or infrared linked microphone with connection provision on both sides to adapt to left-hand and right-hand drive vehicles. Other connector provisions are made for external programming, program cloning, RS232C interface, field conversion to integrated version, 2/4 wire Control Cable (with an easy to connect modular plug), optical fiber control cable, speaker, power and emergency reporting foot switch.

The front panel of the Control Unit consists of control push buttons and a negative contrast LCD display with a special filter to optimize daylight and night-time visibility. It is well known that while LED and fluorescent displays provide excellent visibility during low light conditions, they tend to 'washout' under strong sunlight. LCD displays, on the other hand, fare very well in well-lit conditions but provide poor readability under low light conditions, even with backlighting. The display of this invention provides excellent visibility under both conditions. An electroluminiscent panel shines light 'through' the display characters, while a special transparent but semi-reflective filter behind the characters reflects ambient light back and out 'through' the characters. An automatic light sensor activates the lighting whenever required and is further provided with an over-ride control.

The push buttons of the Control Unit are illuminated and also provided with an automatic control and an over-ride. The buttons are designed for short travel and provide both tactile and audible feedback of contact operation. They are arranged with full color coordination and with careful human engineering to provide consistent and convenient operating protocols. The response characteristics of important buttons are programmable.

A new approach in the control system of the IQ 1000 Control Unit provides a large number of facilities and capabilities for the user in very compact form. This new control system is described in detail in a copending application entitled Control System For Microprocessor And Software Enhanced Communications Equipment the disclosure of which is incorporated herein by reference.

The Control Unit is designed to provide four (expandable) discrete modes of operation. These are: Manual (manual channel selection), Manual with Priority (manual channel selection with revert to priority channels when signal is received on priority channels), Scan (where groups of frequencies are scanned for signals) and Scan with Priority (where over-ride is provided for priority channels during scan). A Voting Mode and other modes may be added for special requirements.

The Control Unit's unique channeling infrastructure is programmable. The standard infrastructure is designed to provide the user with up to 16 Groups of Frequencies (expandable). Each Group contains up to 32 channels (The number of channels are expandable and may be organized differently for special applications). The Groups may be used to denote regions or alternate bands of frequencies. The channels in each Group may be allocated to various services or users. The Groups may also be used to denote main groups of users while the channels within each group may denote the sub-services within that group. For example, in a multi-region/multi-service network for a public safety organization, each group may represent a region, whereas the channels may represent the various public safety services such as Law Enforcement, Mutual Aid, Narcotics, etc. that are in that region. In a different hypothetical example of the usage of Groups, one Group maybe 'Army' while another can be 'Navy', etc. In this example, within a given Group, the channels may be assigned to subservices such as Infantry, Medical, etc. sub-groups. It is easy to recognize the manifold advantages of providing such a structured system for mobile radio systems used by large, statewide organizations.

The Control Unit provides three hierarchical levels (expandable) of priority within each Group. These priority levels may be programmed for any channel within each Group. In addition, a Supreme Priority Over-ride Channel is provided that is common to all groups and provides access to a mobile radio even if it is operating in the pure Manual Mode. This multiple hierarchical priorities and common over-ride channel provide very powerful capabilities in a network, especially when combined with the other capabilities such as the multi-regional/multi-service or multiple main groups/multiple sub-groups capabilities. This approach will allow independent hierarchical operations within regions or groups yet with full coordination capabilities.

All channels in one or more Groups may be programmed to be 'voting'. The Control Unit can utilize a new dynamic voting protocol, Repetitive Scan Voting with Priority (or R.S.V.P.). Essentially, the channels being voted are initially scanned at a very fast rate. The first channel meeting the predetermined acceptable criteria is seized. However, the process continues in a manner similar to scanning for a priority channel, except that in this case a stronger signal attribute becomes the priority. As soon as a stronger signal is located, communication then resumes on the new frequency. This powerful capability will ensure that a vehicle in a fringe area will always be assured of receiving the best signal. The Supreme Over-Ride priority provision can still operate with the voting mode.

The display of the Control Unit is so designed as to allow alphabetic display of regions, groups or services, or a display with digits or a combination of digits and alphabetic characters. For example, for Charlotte region and Law Enforcement Agency it can show 'CLT LEA' alphabetically or a combination of letters and numbers.

The IQ 1000 Control Unit allows front panel programmability. However, it is provided with a double security system to control access to the programming. One security system entails the requirement of dialing an access code. The second security system requires the insertion or presence of a custom electronic module. If both requirements are satisfied, programming can be advantageously utilized to custom adapt the equipment to the particular system.

The Control Unit may also be programmed through connection with an external programmer. In addition, the design allows the cloning (duplication) of the program of one Control Unit with one or more other Control Units. Remote programming over the phone or over the air is also possible. It is easy to visualize the advantages of having these quintuple programming capabilities that can allow such powerful versatility as to even allow programming remotely on a world-wide basis over phone circuits. (Further details on the cloning are provided in the copending application mentioned earlier related to the Digital Serial Interface System).

The novel Control Unit provides the user with an autodiagnostics system. This system not only provides the user with an indication that the radio requires service, but also indicates the specific problem for the technician. The fault is so displayed upon request that the main area of the fault is quickly identified in addition to the specific module involved. Thus, a less skilled technician may simply choose to replace a main part of the radio to restore service, while a more skilled technician can determine which plug-in module is causing the problem and then replace it. The diagnostics is carried out automatically, at the rate of millions of times per day. The Control Unit can be provided with the capability of storing transient fault indications, to automatically transmit fault information to headquarters or to respond to headquarters interrogations with diagnostics related information without even requiring the user's intervention or presence in the vehicle. When one considers the many parts of the world where a radio can be a 'lifeline' and where service facilities are scarce, the immense advantages of these capabilities are quickly realized. A radio located overseas can be diagnosed by the factory located in another continent to determine the type of repairs required.

The Control Unit includes a phone facility that allows the user an access to the public telephone network in addition to communication with headquarters. This is a tremendous advantage in itself. However, the IQ 1000 also includes an RS232C Port and other provisions to allow the use of a wide range of communications/data devices over the phone link as well as throughout the radio network. These devices include printers, mobile data terminals, telex equipment, slow-scan TV, facsimile, etc.

A description of the outstanding capabilities of the IQ 1000 Control Unit would not be complete without further mentioning the new, unique and powerful capability it provides in the way of remote access to its program and controls. The capabilities thus derived are very important. For example, in the case of a hostile entity taking possession of a vehicle, headquarters can remotely 'dump' the entire memory of the radio and thus render it totally harmless. This capability has never been provided before. The remote access to the radio's program will also allow headquarters to provide special programs for temporary situations or changing operational requirements. For example, if a President visits a town in 'anywhere' for two hours, all pertinent users with the novel radios of this invention can be issued special frequencies, tones, etc. on a temporary basis for coordination purposes during that important occasion. This can include local Police, Highway Patrol, Mutual Aid, Special Forces, etc. As soon as the President leaves, the program can be changed and all users then revert to their normal parameters. The principles behind this capability are detailed in the earlier mentioned copending application related to the Digital Serial Interface System. Essentially, a Remote Instruction Decoder at the receiver receives sequential tones, FSK (or other) encoded instruction signals. The decoder translates those signals to signals similar to and recognized by the Digital Serial Interface System as being command or programming signals. Since the novel radio of the invention includes both digital control protocols and built-in programming protocols, decoded signals, depending on the instruction, can produce control or programming remote takeover. Thus, not only is full remote programming of the radio possible but the novel radio has provisions for takeover of its controls. These powerful capabilities are phenomenal to say the least. Headquarters, for example, can call a car even if its squelch is set 'tight' and 'loosen' it to get through a car. If the operator is not in the car, headquarters can activate the public address capability of the Control Unit and use it to call the operator to the vehicle. As another example, during special police operations, headquarters can take over the controls of one or more cars and change settings of groups, channels, repeater access tones, squelch, etc. to allow the vehicle to operate in a new environment of network parameters. The police thus can concentrate on their prime responsibilities instead of having to look-up special network data with flip charts, etc. This becomes even more important during crisis situations such as during a 90 M.P.H. chase!

The vast software of the Control Unit performs many predetermined protocols. The operator has little to worry about, for such matters as setting the transmit channel during selective calling with scan as the microprocessor/software will perform such functions automatically, fast and accurately.

Other new and unique attributes of this Control Unit are too numerous to include here. They include such provisions as monitoring multiple telemetry signals for transmission by radio and the operation by radio of external devices connected to the Control Unit.

Figure 15:
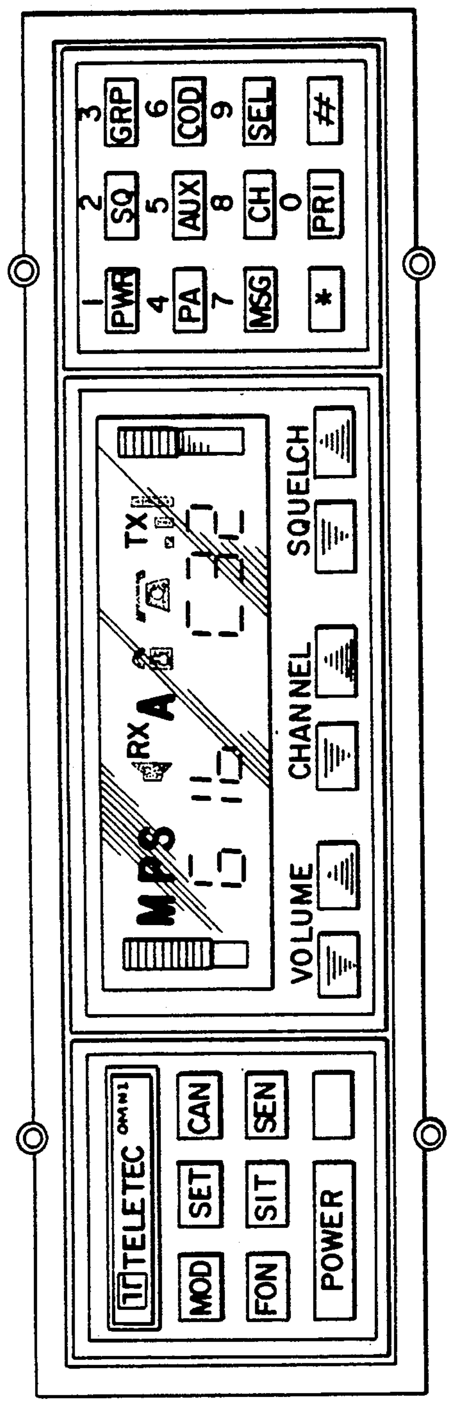
FIG. 15 illustrates a control panel for a mobile Control Unit for accessing the capabilities and facilities of the Control Unit.

FIG. 15 illustrates the preferred front panel layout of the Control Unit. A new control system is provided allowing a multitude of capabilities in very compact form. The attributes of the control system, the many different ways the control buttons are used, its design rationale, its innovations and advantages are described in a copending application entitled: Control System For Microprocessor And Software Enhanced Communications Equipment.

A description of the basic operating protocols follows.

Referring to FIG. 15, the MOD (Mode) Button selects the operating mode. Successively depressing the MOD Button changes the operating mode from Manual to Manual Priority to Scan to Priority Scan and back to the Manual Mode in a cycle.

These modes have been described earlier. The MOD Button, therefore, essentially simulates the operation of a multi-position rotary knob with a turning angle of 360 degrees (full circle). The MOD Button is color coordinated with its respective annunciators in the display. The M annunciator confirms the Manual operating mode. Display of MP confirms the Manual with Priority. Display of S alone confirms that the radio is in the Scan Mode. Similarly, display of a PS indicates a Priority Scan operating Mode.

The SET (Set) Button provides many other facilities and capabilities for the user (Undesired facilities and functions may be inhibited through programming). Depressing SET followed by FON or AUX activates the Phone Facility and the Auxiliary Signalling (used to provide external indication of an incoming call). Upon activating the Phone Facility, the right side Function Keypad is used to dial phone numbers.

Depressing SET followed by PWR and 1, 2 or 3 (on the same keypad) selects the PWR as the function to be set and affects a Low, Medium or High R.F. Output Power setting respectively. The three vertical bar annunciators with the TX designation will confirm the settings.

Depressing the SET Button followed by SQ selects the Squelch Function which can be set anywhere within 32 digital steps (expandable or reducible) through simply dialing the level required. For example, SET+SQ+21 sets the squelch to Level 21.

Similarly, SET followed by the GRP, CODE, MSG, CH, SEL, PRI Functions, followed by a number will set the Channel Group Number, Code Number, Message Number, Channel Number, Selective Calling Address and Security (Privacy) Encryption level Setting, respectively. The 'A' and 'Lock' annunciators confirm the setting 'on' of the Auxiliary and Privacy Functions. The main Alphanumeric Display confirms the other settings which remain displayed for about 5 seconds before reverting to Group and Channel information which is continuously displayed.

SET followed by PA followed by 1 (on the same Function keypad) will divert the received audio to the public address system. SET followed by PA followed by 2 will divert amplified microphone audio to the public address speaker. The speaker symbol annunciator indicates a PA 2 (microphone audio) setting of the public address system while the speaker-plus-RX annunciator denotes that received audio will be produced through the public address system.

Depressing SET followed by SIT followed by a number selects the fixed station Site Number (corresponding to CTCSS tones). Again, display confirms settings before reverting to displaying Group and Channel information. The Group number may be displayed as a two digit display preceded by G. Alternately, a region or other channel group name may be displayed by alphabetic characters. The Channel number may be represented by two digits preceded by a C or as a combination of alphabetic characters. The SEN (Send) Button transmits the radio's Automatic I.D. Number followed by its Status (Message Number) that has been set.

CAN (Cancel) followed by a Function button cancels the function activated.

The Volume and Squelch Up/Down Buttons are used to set these functions and are provided with 32 digital steps each (expandable or reducible). The button responses are programmable. In addition to providing a digital confirmation of the levels during setting, a bar graph for each of these settings provides an analog relative setting indication for instant reference.

The Channel Up/Down Buttons allow selection of the channel required and operate with a slewing response each time they are activated (slow at first then speed-up).

Depressing the Up/Down Volume, Channel and Squelch Buttons simultaneously provides a timed display of the current setting of these functions. Pressing any of the other Function buttons provides a timed display of the related current setting without altering the setting.

A light sensor next to the power button activates the lighting system of the control buttons and the display. Combinations of buttons are provided for manual override of the automatic lighting.

The POWER Button provides an 'On'/'Off' function. Its response is timed to prevent inadvertent operation.

The rectangular squares to the right and left of the T Logo provide a red light indicating 'Transmission' and a flashing yellow light to indicate a 'Busy Channel' condition.

The buttons are used in other ways during programming to set the other 'unseen' radio parameters and channel attributes such as operating frequencies and priority levels. The protocols used are too extensive to be covered for the scope of this application. The display is used to prompt and assist with the programming.

The display is also advantageously used to provide diagnostic data and indicate messages from headquarters.

The Serial Digital Interface System (Bus) of the Control Unit is shown as part of FIG. 17 and will be explained with some additional details under the description of that figure. It is mentioned here since its elements are embedded in the Control Unit as well as the Transceiver Unit. The Serial Interface Bus includes a TDM/PCM (Time Division Multiplex/Pulse Code Modulation) System to serialize the digital signals, including digitized audio. The digital signals are grouped into channels, combinations of which are transmitted in frames to the Transceiver Unit. The Serial Bus is duplex and digital signals can flow both ways. The details of the Interface System are presented in a copending application entitled Bidirectional Digital Serial Interface System For communicating Digital Signals Including Digitized Audio Between Microprocessor-Based Control And Transceivers Units Of Two-Way Radio Communications Equipment along with the special capabilities provided. The most powerful and advantageous service performed by the Serial Interface System is to reduce the physical linking medium to a fixed 2 (or 4) conductor control cable or one with just 2 (or 4) optical fiber strands, no matter how complex or how different the data or configuration of the radio is. This is another phenomenal advantage, as mass producing the conventional multiconductor control cables carrying analog signals limits their flexibility, while custom manufacturing special cables is expensive, time-consuming, problematic and requires special engineering.

The other important advantage is the benefit of being able to use Optical Fiber Control Cables. Such cables are slim, non-corrodible and devoid of crosstalk problems, magnetic interference to vehicle electronics and immune to ignition and other noises. These properties, especially the non-interference with vehicle electronics, is becoming increasingly important. Modern vehicles are more and more utilizing sensitive electronic devices which are prone to cause serious problems to the safety and performance of the vehicle through interference induced problems. (Even the air conditioning system of expensive vehicles have been known to revert from cooling to heating during hot weather every time the two-way radio is operated).

The Digital Serial Interface System provides many new advantages described in the aforementioned patent application. One such advantage is that the digital stream produced by the Serial Bus can be easily manipulated by the software and microprocessor in different ways (such as algorithms) to produce speech and data encryption.

Figure 16:
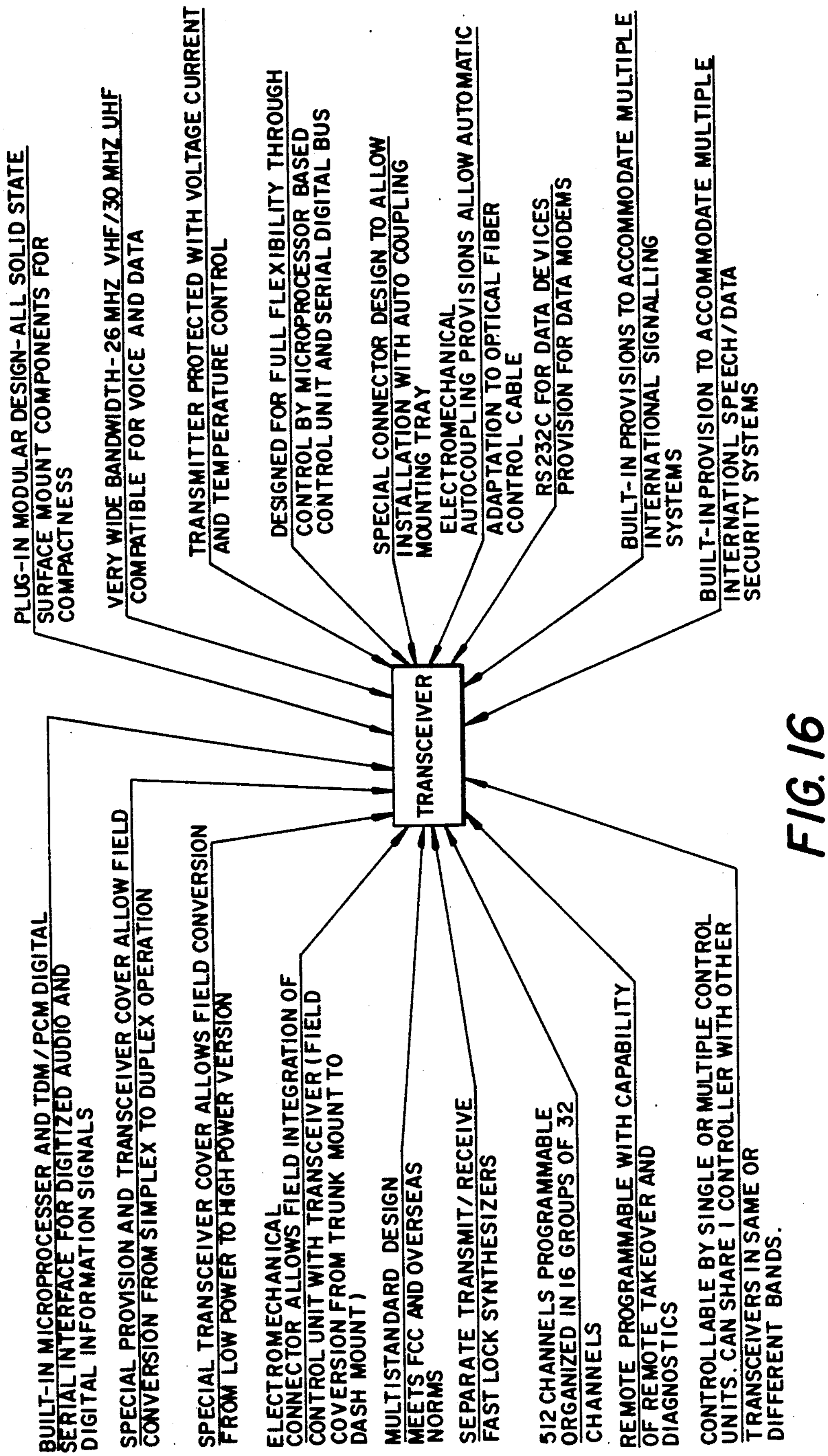
FIG. 16 illustrates a combination of features and capabilities of the novel two-way radio microprocessor based Transceiver Unit.

FIG. 16 illustrates the combination of features and capabilities of the Teletec Transceiver Unit which is one of three important elements of the system of the invention. Like its Control Unit, the Transceiver Unit includes a counterpart Digital Serial Interface Bus. This allows full communications between the two units.

The Transceiver Unit too includes a microprocessor and full provisions for control by the Control Unit. From FIG. 16 it can be observed that the Transceiver Unit takes full advantage of the powerful software and capabilities of the Control Unit.

The basic Transceiver Unit consists of a modern VHF or UHF Receiver and a 30 Watt VHF or UHF Transmitter. Surface Mount Technology and Plug-in Modular Design is used throughout the Transceiver Unit to allow many capabilities in compact form and for ease of maintenance.

The Transceiver Unit can provide 512 Channels and is capable of being expanded to 1024 or more programmable channels. Both the VHF and UHF versions can be controlled by the same type of Control Unit described earlier. Alternately, multiple Transceiver Units in multiple bands may be controlled by one single Control Unit.

The Transceiver Unit is designed for voice, many types of data and is provided with an RS232C Interface Port.

The transmitter and receiver are engineered with fast-lock independent synthesizers. This, combined with a wide band design, allows programming of operating channels with separate transmit and receive frequencies anywhere in the entire 26 MHz of the conventional VHF Band and 30 MHz of the coventional UHF Band. Switching bandwidths can even be adapted to wider requirements in special situations.

The Transceiver Unit has a very-fast scan and transmit rise time allowing instant capture of message preamble bursts and the transmission of digital data without partial loss or mutilation.

The Transceiver Unit is designed to meet all prevailing international norms and is, therefore, truly MULTI-STANDARD. This was achieved through meticulous design of performance parameters for worst case requirements of all the prevailing norms. Such a design necessitated provisions for special testing, incorporation of special circuitry and the engineering of special shielding. The Multistandard design provides many advantages to both the user and the system consultants. Many areas of the world are yet undecided as to what norms are suitable or will be adopted. The novel Transceiver Unit overcomes this problem; it can be exported worldwide and freely incorporated into any design.

Teletec Corporation of Raleigh, N.C., named this novel transceiver as 'OMNI'. The OMNI name is derived from the dictionary and means; 'All, everywhere'. It truly described this versatile Transceiver Unit.

The OMNI Transceiver Unit is characterized with several unique and advantageous field convertibility capabilities designed to meet the multistandard requirements and to render it adaptable to different requirements in the field. The conversions provided have hitherto been very difficult or impossible to achieve through field modification of existing transceivers.

One field conversion that is available is from a Low Power Version (30 Watt) to a High Power Version (100 Watt). Each version is further provided with an adjustment for the R.F. Output Power as well as programmable, user selectable levels. The Auto Coupling Mounting Tray has internal circuit provisions allowing the conversion of the Transceiver for achieving linking through an Optical Fiber Control Cable.

Another field conversion available for the Transceiver Unit is the capability to convert from a Simplex Version to a Duplex Version. This is achieved essentially in the same manner as the conversion from a Low Power Version to a High Power Version by simply replacing the Transceiver Unit Cover with a special cover. The special cover in this case incorporates the duplexer that is used to combine transmitted and received signals for a single antenna.

The internal design of the Transceiver Unit has extensive provisions for the addition of special signalling devices, various data modems, speech encryption modules, various encoders/decoders, etc., adding to the powerful versatility of this unique transceiver. The addition of such devices does not need any modification of the control cable or the Control Unit thanks to the Serial Interface System, the versatile control system and the software flexibility. The space for those devices is possible through the extreme compactness achieved with the Surface Mount Technology utilized.

The Transceiver Unit is designed for easy assembly and conventional or computerized testing. All modules plug into a Master Connector Board which affects the connections between the modules. This Transceiver Unit is designed for autodiagnostics which can be displayed through the Control Unit, stored, automatically transmitted to headquarters or provided upon interrogation by headquarters.

The Transceiver Unit is ruggedized and designed to meet several MIL standards for shock, vibration and environment. All circuitry is housed in a sturdy aluminum chassis with special sealing provisions against dust and weather.

The Transceiver Unit is not only designed to be extremely versatile and perform all its capabilities but also to protect itself. For example,, the transmitter is triple protected with voltage, current and temperature regulation. In inclement high temperature environments where normal limits are exceeded, the protection system automatically reduces the R.F. Output Power to a safe level to prevent 'thermal runaway'. When the vehicle moves and air circulation is improved, the protection system will automatically increase the Output Power to a higher level. This continues until maximum output is reached.

The Transceiver Unit can provide a phone facility whenever this capability is required. This allows access for the operator to the world-wide telephone network, in addition to access to headquarters and other cars in the network. Furthermore, many types of communication devices that operate over telephone circuits can be advantageously utilized. This capability can be further enhanced through conversion to full duplex operation as described earlier. A DTMF module essentially provides the facility in conjuction with the keypad on the control panel of the Control Unit. At headquarters, a manual or automatic path effects the connection to the public telephone networks.

Part of the Serial Interface System of the mobile radio is embedded in the Transceiver Unit as a counterpart to the Serial Interface System in the Control Unit. It is similar in essence.

Figure 17:
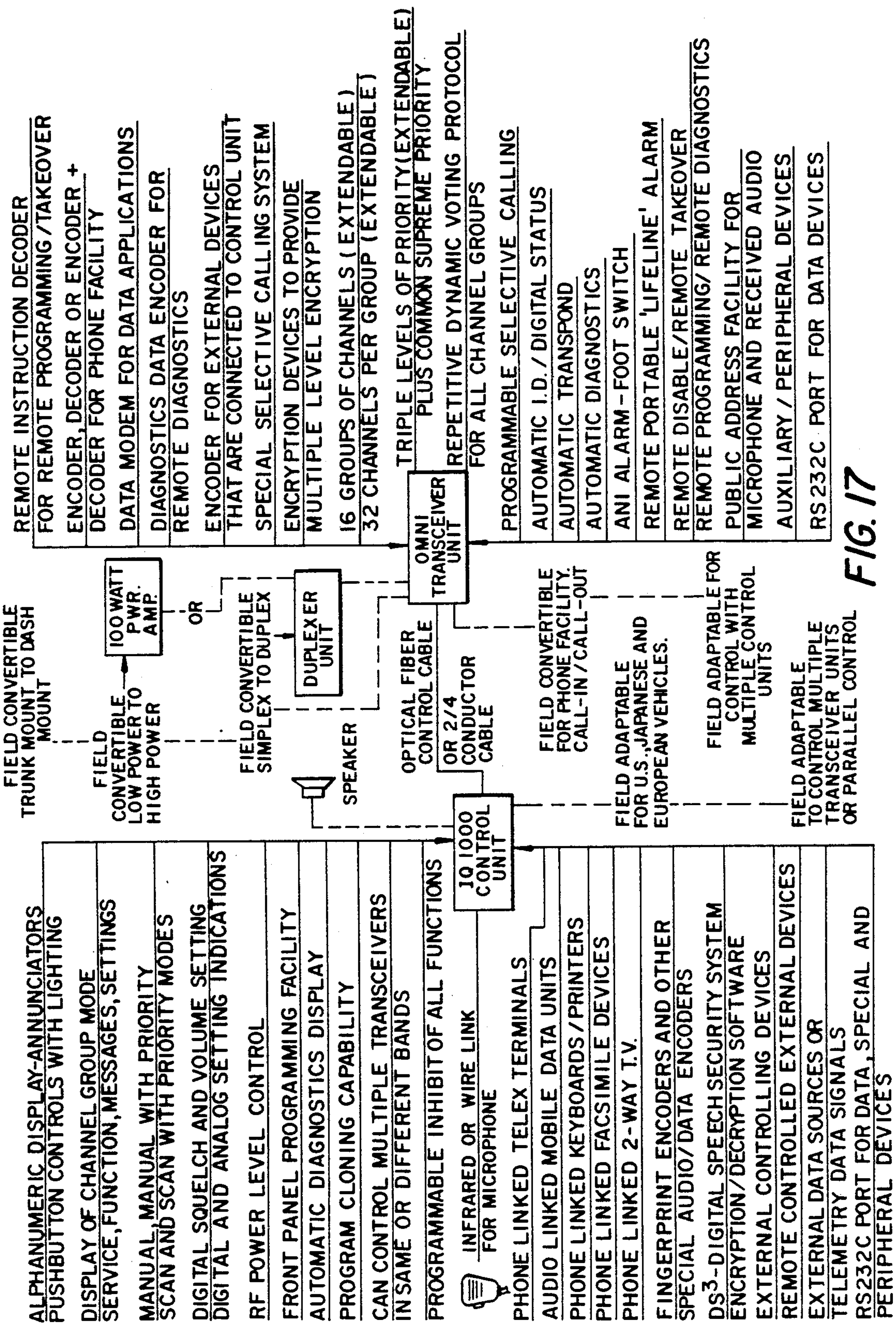
FIG. 17 illustrates a functional design of a novel mobile two-way radio system of the invention.

FIG. 17 illustrates the functional design, features and capabilities of the overall Two-Way Mobile Radio System of the invention, combining the three basic elements described earlier. Many of these attributes of the overall system have already been covered through description of the constituent basic elements. Accordingly, items already discussed will be referred to briefly while the balance will be described further. The listing is categorized for easier reference.

Starting with the Control Unit, the attributes include (but are not limited to):

Alphanumeric display, annunciators and push button controls with a new unique and advantageous combination.

Full display of Channel, Channel Group, Operating Mode, service information, functions being set, alphanumeric messages from headquarters and settings of functions.

Four distinct Operating Modes: Manual, Manual with Priority, Scan and Priority Scan.

Digital setting of squelch and volume in multiple steps. Additional analog bargraph representation of the settings.

Means of setting R.F. Output Power in multiple steps.

Front panel programmability through built-in provisions.

Automatic diagnostics system with display of diagnostic data.

Capability of program cloning between control units.

Capability of one control unit controlling multiple transceivers in the same or different bands.

Programmable inhibit/enable of all functions. Programmable key responses.

Capability of operating with an infrared linked microphone/controller. For communication over short distances around the vehicle, this eliminates the need for an extra portable transceiver, additional operating frequencies for same as well as a mobile repeater.

Phone patch capability that allows the use of telex terminals operating through the radio system and accessing any other telex on a world-wide base.

Same, but for mobile data terminals linked by audio.

Same, but for keyboards and printers.

Same, but for facsimile printers for world-wide transmission and reception of documents and drawings.

Same, but for other peripheral devices that can operate over phone networks, including fingerprint encoders and other devices.

DS (Digital Speech Security System) Encryption/Decryption System produced by software/microprocessor/other manipulation of the digital stream in and between the Control and Transceiver Units.

Capability to accommodate external controlling devices for even more capabilities.

Capability to accommodate peripheral devices that can be controlled over the radio path or through phone networks.

Capability to accommodate external data from external services, including telemetry signals.

RS232C Interface Port for data, special applications and for peripheral devices.

Convertibility attributes of System include (but are not limited to):

Field convertibility of Control Units for installation in dash board openings of U.S., Japanese and European cars.

Field adaptability to controlling multiple transceiver units.

Field convertibility from a Trunk-Mount to a Dash-Mount configuration. Also, convertible in reverse. Thus, system allows easy adaptations of the radio to meet changes in vehicles or requirements of mounting arrangements.

Field convertibility from a Low R.F. Power version to a High Power version. This allows the capability of meeting changing requirements. Also, in licensing operations, this attribute of the system allows the manufacturer to provide customers with field conversion kits to meet different international requirements. Reverse convertibility is also provided.

Field convertibility from simplex mode operation to duplex operation. Similar to the Low-High conversion, this simply requires the interchange of the regular cover with a cover to affect the field conversion. This prevents the equipment from being deemed obsolete should operating requirements change in the future. Reverse conversion capability is also provided.

Field convertibility for dual network access: normal, plus phone patch operation with full facilities including conversion from simplex to duplex operation per previous item.

Field convertibility for operation through multiple 'parallel' Control Units. Reverse capability to reduce control to one Control Unit.

The system's Digital Serial Interface portion has been described in detail in a copending application entitled Bidirectional Digital Serial Interface for Communicating Digital Signals Including Digitized Audio Between Microprocessor-Based Control And Transceiver Units Of Two-Way Radio Communications Equipment U.S. application Ser. No. 031,003.

Provisions for special applications include, but are not limited to:

Capability to accommodate a Remote Instruction Decoder which will allow remote programming or takeover of the radio.

Facility for the addition of an encoder or decoder or encoder/decoder for phone facility.

Capability to accommodate a data modem for special data related applications.

Capability to accommodate a data encoder/command decoder to provide remote diagnostics of the radio.

Capability to accommodate encoders for external devices that are connected to the Control Unit.

Capability to accommodate various signalling devices and international selective calling systems, including many special requirements.

Capability to accommodate encryption/decryption devices made by others to provide multiple, hierarchical levels of voice/data security.

Main Channel Infrastructure design attributes include (but are not limited to):

16 Groups of Channels (Extendable or reducible).

32 Channels per Group (Extendable or reducible).

3 Levels of priority per Group (Extendable or reducible).

Supreme Priority Over-ride Channel common to all channels and channel groups. Other features and capabilities include (but are not limited to):

Programmable Selective Calling as required per system design.

Automatic Identification of callers. Also, automatic transmission of Status upon transmission of Automatic Identification.

Automatic Transponding capability in response to interrogation by headquarters.

Automatic Diagnostics of the Transceiver Unit.

Automatic Identification with High Priority Alarm through foot switch provision. This can be used to automatically leave microphone live for a timed period during emergencies.

Provision for operation with a portable 'Lifeline' miniature transmitter that can be worn to signal companions in vehicle or headquarters of an emergency or need for back-up assistance. Can be activated by hand, level sensing switch (to indicate a fall) or metal sensor (to indicate that gun is drawn).

Provisions for remote disable, remote takeover of controls, remote programming and remote diagnostics of transceiver over a radio or telephone link.

Built-in Public Address System allowing the amplification of the vehicle radio operator's voice or the amplification of the received transmission. Basically, designed to provide the amplified audio to the exterior of the vehicle.

Built-in signaling facility to use external signaling devices (horn, for example) of an incoming call.

RS232C Interface Port for data applications and devices.

Figure 18:
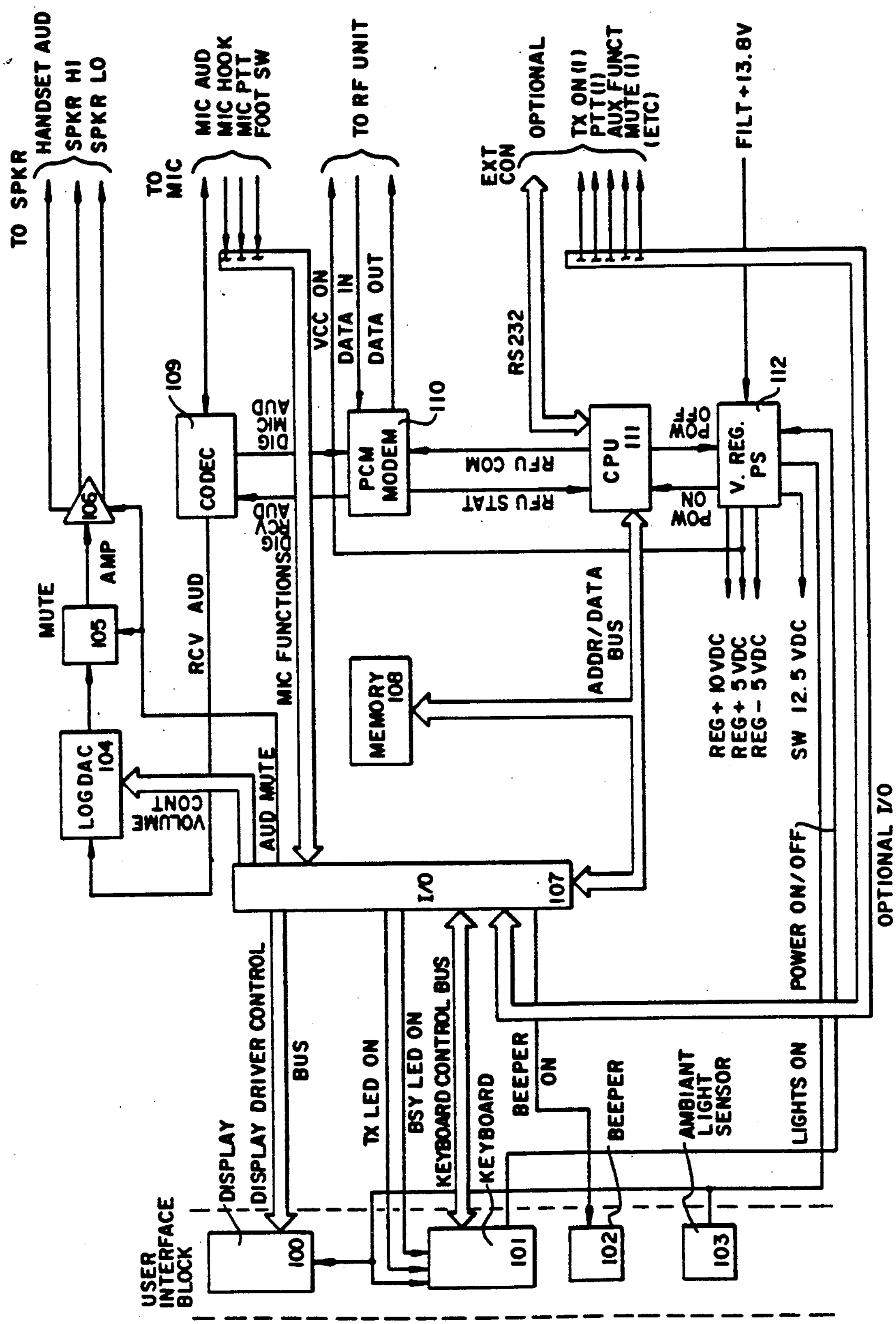
FIG. 18 illustrates a detailed block diagram of the Control Unit of the invention.
Figure 19:
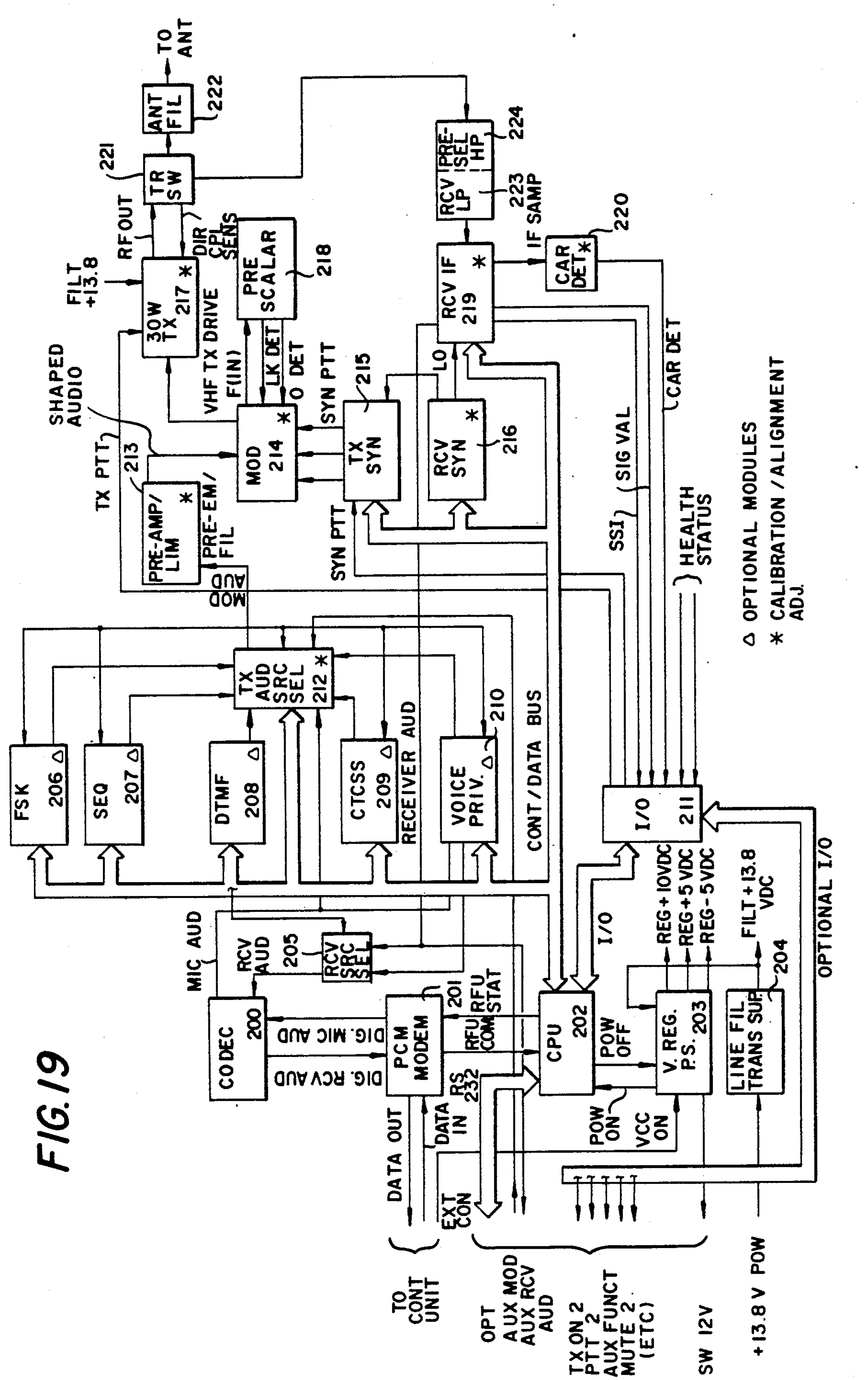
FIG. 19 illustrates a detailed block diagram of the Transceiver Unit of the invention.

FIGS. 18 and 19 represent the detailed block diagrams of the Control Unit and the Transceiver Unit. To simplify the understanding of the interrelationships of the blocks of this extremely sophisticated system, the blocks are directly labeled and flow indicators added to allow direct viewing of the entire system, its component blocks, block interrelationships and flow configurations. The description of FIGS. 18, 19, 20 will start with a narrative style explanation and will follow with a description of the labeled blocks.

The novel mobile radio system is divided into two primary operational components, the Control Unit (CU) and the Transceiver Unit (RFU). All interfacing and communications between the two units is restricted to a full duplex serial data link. This link consists of hard wire in the integrated unit and may be an optional fiber optic cable in the remote RFU installation.

Both the CU and the RFU have independent power supplies that are controlled directly from the front panel power switch. This allows the use of a reliable low current rated switch compatible with membrane switch technology.

System control is exercised through front panel entries (keyboard) and instructions to the Central Processing Unit (CPU). The CPU replies to the user through visual means by using an LCD and by aural means through a sounder to confirm all key entries. The CPU also communicates with the memory module to retrieve system instructions that have been previously programmed. These instructions may be entered by the mobile user or by the maintenance facility through an external data port.

All instructions to and replies from the subsystems are processed through a buffer and a multiplexer at both ends of the serial interface. In addition to control data and functions, microphone audio to the modulator and speaker audio from the receiver is also sent over this data link to provide a simplified installation and method for audio speaker. The audio amplifier is located in the CU, along with microphone circuits since the CU will always be located within a reasonable proximity of the user. This eliminates the requirement for a transformer coupled audio output stage and provides cleaner audio. To transform the audio signals into digital form for transmission over the data link, CODECs with on chip filters are utilized.

At the RFU end of the data link are all the RF and analog receiver functions. The heart of the RFU is a fast lock frequency synthesizer with 2 PPM accuracy. The agile performance of the synthesizer is achieved through adaptive loop dynamic controls to allow uninterrupted audio in the Scan with Priority mode of operation. Spectral purity is maintained by providing necessary static/electromagnetic shielding for all sensitive circuits and rigorous attention to design details, particularly in the areas of the Voltage Controlled Oscillator (VCO) and loop filter.

The synthesizer provides the RF excitation for the 30 Watt Power Amplifier (PA) and the control functions to ensure transmission does not occur until full phase lock has been established. Risetime controls have also been included in the PA to prevent large current transients during PA turnon. The PA incorporates a feedback loop for output power level control and protection of output devices under antenna mismatch conditions. The feedback loop also accepts CPU inputs to allow user or remote selection of three different power output levels. By attention to detail in the design of the transmitter and harmonic filter, output spurious and harmonies have been held to levels that ensure reliable communications. Careful attention to the sources of intermodulation distortion in the PA has resulted in performance levels better than 28 db.

Extensive use of integrated circuits has resulted in a receiver design offering sensitivity levels of under 0.25 uV and dynamic range $>110$ db. Use of a fixed tuned preselector that incorporates an RF amplifier and a doubly balanced mixer provides excellent performance when coupled with the modified single conversion receiver scheme. Selectivity is provided by careful integration of distributed off-the-shelf filter elements with optional bandwidths available for 12.5 KHz applications. These filters have also been selected for low group delay distortion to allow processing of various data formats and complete handshaking capabilities.

The receiver output is processed within the various squelch circuits to provide nuisance free reception of only valid signals. The capability to optionally install any of the popular squelch and signaling methods in addition to a standard noise squelch makes this receiver universal in nature. In addition to squelch methods, various data methods may also be selected and are provided in a plug-in format with companion software control. The output of both squelch and data circuit modules is sent to the CU for appropriate processing. For transmission of data or voice, the modulator accepts either microphone audio or tone formats in response to CPU control. The modulator is fully compatible with either phase or frequency modulation methods. The technique used completely eliminates overmodulation and emission of undesirable adjacent channel signals.

FIG. 18 is a block diagram of the Control Unit of the invention.

The Control Unit makes up 'one-half' of the radio equipment system of the invention. The Control Unit interfaced to the Transceiver RF Unit becomes a complete mobile radio system.

Functionally, the Control Unit provides the user with all the power and capability of the RF Transceiver Unit through its various user interfaces. The user controls the RFU through a multi-key keyboard located at the front of the Control Unit. The Control Unit provides feedback to the user through the custom liquid crystal display and an audible tone generator. Also, the speaker, microphone and auxiliary function control are provided by the Control Unit.

The Control Unit is housed in a two piece diecast aluminum housing. The housing provides mechanical integrity, Electromagnetic Interference/Radio Frequency Interference (EMI/RFI) control, and environmental protection. An injection molded plastic front panel mounts to the front of the aluminum housing to complete the Control Unit assembly. The front panel houses a silicon rubber keyboard. This keyboard and front panel offer advantages such as long-life, resistance to spills and quick replacement.

The Control Unit is made up of five major functional blocks. They are the User Interface Block, the Central Processing Unit, the Memory, the Audio/Power Supply, and the TDM/PCM Bus controller.

The User Interface Block consists of four subfunction blocks. They are the display, the keyboard, the beeper, and the ambient light sensor. The keyboard is scanned constantly by the Central Processing Unit using the keyboard control bus to detect key depressions. Also located on the keyboard are transmit and busy indicators. These indicators are controlled by the signal lines 'TX LED ON' and 'BSY LED ON' which originate with the Central Processing Unit. The display is controlled by the CPU through the display driver control bus. The tone generator labeled 'Beeper' is controlled by the CPU over the signal line 'Beeper ON'. The ambient light sensor turns the keyboard and display lighting on if the ambient light falls below a certain threshold. The keyboard and display lighting may be turned off manually through the keyboard as well. The control line for controlling the keyboard and display lighting is 'Lights On'.

The Interface System includes a TDM/PCM system which serializes the digitized audio and digital signals. These are then organized into Audio, Command and Status Channels which are communicated to the Transceiver Unit in frames of two channels. The interface system operates in reverse when signals are communicated from the Transceiver Unit to the Control Unit. This is described in further detail in the copending application entitled Bidirectional Digital Serial Interface System For Communicating Digital Signals Including Digitized Audio Between Microprocessor-Based Control And Transceiver Units Of Two-Way Radio Communications Equipment.

FIG. 19 is a block diagram of the Transceiver Unit. The Transceiver Unit will also be referred to as the Radio Frequency Unit or RFU.

The RFU is the business end of the overall radio system of the invention, in contrast to the control and program functions of the Control Unit. It consists of three separate but reasonably distinct circuit and hardware areas: the transmit related circuits, receive related circuits and control communications/house keeping functions.

During the transmit mode of operation, MIC (Microphone) audio is communicated to the RFU PCM modem via the custom Serial Digital Bus Link. This link may be implemented with dedicated wire, fiber optics or infrared. Since this received data link contains control functions as well as audio intelligence, the PCM modem sorts this information and routes audio to the CODEC and control data to the CPU. The audio data is converted to analog form and filtered to remove any clock sampling signals and distortion due to aliasing. The filtered audio is then applied directly to the optional voice privacy module or to the audio source select circuits on the Audio Module.

Since a number of analog modulation sources are possible in this sophisticated and versatile communications system, the specific source is activated and selected by the switching circuits on the audio module in response to control data from the CPU. These sources include direct MIC receiver audio for repeater applications, external audio, auxiliary audio and various optional modules such as DTMF, CTCSS, various forms of sequential data, voice privacy and a custom FSK modem. All inputs are scaled and adjustable with individual potentiometers on the audio module. Direct modulator inputs such as the external auxiliary input are limited and shaped to guarantee signal conditioning to the required modulation characteristics.

Depending on the source, pre-amplifications, limiting, pre-emphasis, filtering and output buffering are provided before any signals are applied to the unique modulator circuits. The modulation is actually part of the frequency synthesizer and performs frequency multiplication by a factor of 10 on the TX frequency synthesizer input prior to transmitter exitation, as well as modulation. The circuits capable of generating spurious signals have been moved to a separate pre-scaler p.c. board to preserve the high spectral purity of the modulator VCO output. The TX synthesizer is a low frequency phase-locked loop that responds to controls from the CPU via the control/data bus. It generates an output frequency at one-tenth the desired transmit frequency and through a synthesizer PTT signal, enables the modulator and pre-scaler to conserve power during the receive mode. Phase detector, lock detector and other fault conditions are communicated to the CPU through the synthesizer to provide real time health status.

The modulated RF signal at a level of +7 dBm is then applied to a 4 stage amplifier PC board which produces 30 watts nominally of RF output power. This transmitter is supplied directly with filtered 13.8 VDC and enabled in response to TX PTT (Press-to-talk) from the CPU. This PTT signal also is coupled through the co-ax link to the TR (Transmit) switch to enable the TX antenna path. The TR switch assembly also contains a directional coupler that senses various load and source conditions to provide output power control and fault status information to the CPU. After the TR switch, the signal is filtered to remove all spurious harmonics and provide a clean modulated signal to the antenna for transmission.

In the Receive mode, the absence of TX PTT connects the receiver preselector to the antenna through the antenna filter. The lack of SYN PTT turns off the TX synthesizer and allows normal receive operation. In some selected modes such as a loop-back test or full duplex operation, both transmit and receive functions may be operated simultaneously. In this case, the TR switch will be replaced with a duplexer. The antenna filter provides some help in protecting the receiver from image and other high frequency spurious inputs due to its low pass transfer function.

The pre-selector consists of two separate pc boards in a shielded cast assembly. These two boards contain first a high pass filter and pre-amplifier and then a passive low pass filter before the received signal is applied to the mixer. The combined pass band provides minimal attenuation to any signals in the required band and adequate rejection to allow conformance to all spurious input performance requirements.

The filtered and amplified signal is next applied directly to the mixer input port, multiplied by the local oscillator input from the synthesizer and converted to the IF (Intermediate Frequency). After several stages of amplification and further down converting to a Second IF, the received signal is applied to a discriminator to extract and process the received audio or data. The audio output from the receiver IF module is sent to the RCV audio source select module, Voice Privacy module if installed, or the TX audio source select if the repeater function is desired.

In addition to received audio signal, the IF module sets a squelch comparator level in response to input data from the CPU and provides an output SNSQ signal to indicate to the CPU that a valid signal has been detected. To further enhance the squelch function and signal detection during scan modes, a buffered output of the Second IF is sent to carrier detect circuits on the Audio Module. Here, a phase-locked loop is used to indicate the presence of coherent IF to interrupt scan routines.

The final operational output is a DC SSI signal which indicates received signal strength to the CPU. This is utilized in mobile voting schemes and allows searching multiple frequencies for best signal conditions. The receiver IF audio, or its VP decoded form, is next applied to the PCM for digitizing and synchronization to allow it to be communicated through the PCM modem to the Control Unit for further processing.

Support and control of the Receive and Transmit functions are performed by the CPU and associated circuits. The program instructions for managing the RF Unit functions are contained in an EPROM on the CPU card. Within the limitations of this instruction set, the CPU responds to control data from the Control Unit communicated to it via the PCM link and the PCM modem. Complete control and status information is carried by the link to perform all necessary functions such as scanning, transmission, reception, test, fault analysis, optional signaling control and others.

To support this activity, the CPU manages the PCM Modem and communicates to modules resident in the RF Unit over the dedicated control/data bus. This bus instructs all modules what to do, and when to do it. Such as determining which tone is to be sent by the CTCSS module, if VP is to be active, which frequency the receive synthesizer should tune to if the transmitter is to be on, what level the squelch comparator should recognize, etc. As part of the control/data bus, all optional modules are addressable with a dedicated enable line and also provide the CPU with information verifying whether or not they are installed.

Contained within the complex inter-module communications and control network is a series of health or performance monitors that continually measure vital system parameters. If a failure or problem is encountered, including those of peripheral devices such as the antenna, this condition is made known to the CPU and communicated to the control Unit and operator to alert of the problem. As part of this health status monitoring, a comprehensive voltage regulator/power supply link to the CPU is provided to detect transients or power failures and perform predictable and controllable initialization and termination of CPU activity. To provide further protection from transients and reverse voltage, the power supply contains protection networks for those conditions.

In addition to all required functions, the RF unit contains a host of optional I/O capabilities. Discrete functions such as external TX ON<PTT, AUX, MUTE and others allow integration of the RF unit into a diversity of complex system designs. An optional RS232C type interface link is available for programming, control, and communication with equipment such as printers, computers, etc. The applications flexibility of the Transceiver Unit is limited only by the creativity and ingenuity of the systems designer.

Referring again to FIG. 18, a description by block will be provided. The numbers correspond to callouts on the drawing.

100-Display: The display provides visual feedback to the user about the operational status of the radio. It is a custom, negative image, twisted nematic, 160 segment, biplexed, backlit liquid crystal display. This type of display is made by Hamlin, Crystaloid, and other LCD vendors. The backlighting is supplied by Luminescent Systems, Ball Engineering Corporation and others.

101-The Keyboard: The keyboard allows the user to control the operational status of the radio. It is a custom conductive silicon rubber keypad mated to a printed circuit board. The keypad is enclosed in an injection molded decorative bezel with injection molded keycaps. It is electrically composed of 26 key positions divided into two matrices. Matrix #1 is a 3×8 Martix. Matrix #2 is a redundant 1×1 Martix. The keyboard is backlit by LEDs. The silicon rubber keypad is provided by Shinitsu, EECO, Conductive Rubber Technology and others. The injection molded plastic is supplied by EECO, Durilith, and others. The LEDS are supplied by Stettner Electronics and Lumex Corporation.

102-The Beeper: The beeper is used to provide audio feedback to the user as a warning announcer and to acknowledge valid/invalid keystrokes. It is a piezoelectric sound transducer that emits an audible tone of 75 db. It is biased by a 4 khz HCMOS logic square wave generator. The sound transceiver is from Floyd Bell, Inc.

103-Ambient Light Sensor: The ambient light sensor is used to switch on or off the keyboard backlighting automatically when the proper lighting conditions exist. The sensor is basically a switch that is closed when no ambient light exists and open when ambient light does exist. It is manufactured by Centronics, Inc. and other vendors.

104-Logarithmic Digital to Analog Converter: The logdac allows the volume level of the speaker to be controlled digitally by the central processing unit. The logdac is an integrated circuit device that performs a digital to analog conversion according to a logarithmic scale. These parts are provided by analog devices and others.

105-Audio Mute: The audio mute circuit removes the received audio signal from the speaker amplifier. The audio mute circuit consists of a bipolar transistor switch to enable/disable the speaker amplifier. It consists of a transistor and discrete components only.

106-Audio Amplifier: The audio amplifier provides the power necessary to drive the speaker. It consists of an integrated circuit and several discrete components. The integrated circuit is made by Sanyo and others.

107-Digital Input/Output Ports: The input/output ports allow the microprocessor to interact with a large number of external functions by providing physical interface points to them. The functions can then be controlled by a common address/data bus. The input-/output ports are integrated circuits by Harris Semiconductor, Intel and others.

108-Memory: The memory consists of erasable programmable read only memories (eproms) to store program code, electrically erasable programmable read only memories (eeproms) to store user defined attributes, and random access memories (rams) to use as a scratchpad for doing work by the microprocessor. The memory consists of 64 k eprom, 8 k ram, 24 k eeprom: The rams are built by S-mos. The eproms are built by Hitachi and the eeproms are built by General Instruments.

109-Codec: The audio encoder/decoder is used to convert audio to digital format to be communicated over the serial link. It is an integrated circuit consisting of an analog to digital converter and a digital to analog converter that converts data accordingly to the Mu-law 255 algorithm. The integrated circuit is built by Harris semiconductor and others.

110-PCM Modem: The pulse code modulation modulator/demodulator is used to transmit and receive voice and data information over a serial link in digital format. The PCM modem consists of HCMOS logic devices, digital input/output ports and a Manchester encoder integrated circuit. The HCMOS logic is built by Motorola and Signetics. The digital input/output ports are built by Intel and Harris Corporations. The Manchester encoder integrated circuit is built by Harris Semiconductor Corporation.

111-CPU: The central processing unit serves as the master controller for the entire radio. It controls the activities of all the radio's function modules. It is an integrated circuit by Intel Corporation. This integrated circuit is supported by HCMOS devices from Motorola and Signetics.

112-V.REG P/S: The power supply supplies power to all circuits in the Control Unit. It also monitors the power circuits for faults as well as controlling the radio's start-up and shutdown processes. It consists mainly of voltage regulator integrated circuits and HCMOS supervisory logic. Both are built by Motorola.

The Control Panel: The Control Panel serves as the user's interface to the radio. It consists of the display, the keyboard, the beeper and the ambient light sensor. Together the functions allow the user to have access to all the radio's capabilities.

The Digital Serial Interface Bus: The Digital Serial Interface Bus transmits commands and microphone audio to the Transceiver Unit over the Serial Link. Also the Serial Bus receives status and received audio from the Transceiver Unit. The Serial Interface Bus is made up of the Codec and the PCM Modem.

The Central Processing Unit: The Central Processing Unit serves as the master controller for the radio. It responds to commands from the user via the keypad or software and controls the operation of the Transceiver Unit over the Serial Interface Bus. It consists of the input/output block, the memory and the CPU block.

The Audio Circuits: The audio circuits control the volume level of the external speaker. They consist of the logdac, the mute function and the audio amplifier.

Referring again to FIG. 19, a description by block will be provided. The numbers correspond to the callouts on the drawing.

200-Codec: The audio encoder/decoder is used to convert audio to digital format to be communicated over the serial link. It is an integrated circuit consisting of an analog to digital converter and a digital to analog converter that converts data according to the Mu-Law 255 algorithm. This integrated circuit is built by Harris Semiconductor and others.

201-PCM Modem: The pulse code modulation modulator/demodulator is used to transmit and receive voice and data information over a serial link in digital format. The PCM modem consists of HCMOS logic devices, digital input/output ports and a Manchester encoder integrated circuit. The HCMOS logic is built by Motorola and Signetics. The digital input/output ports are built by Intel and Harris Corporations. The Manchester encoder integrated is built by Harris Semiconductor Corporation.

202-CPU: The Central Processing Unit serves as the slave controller for the Transceiver Unit. It accepts commands from the master controller in the Control Unit and controls the activities of the Transceiver function modules. It is an integrated circuit by Intel Corporation. This integrated circuit is supported by HCMOS devices from Motorola and Signetics.

203-V.REG Power Supply: The Power Supply supplies power to all circuits in the Transceiver Unit. It monitors the power circuit for faults as well as controlling the radio's start-up and shutdown processes. It consists mainly of voltage regulator integrated circuits and HCMOS supervisory logic. Both are built by Motorola.

204-Line Filter/Transient Supervisor: The Line Filter/-Transient Supervisor provides protection for the Transceiver Unit voltage regulator circuits from transient surges and motor generated noise. This circuit consists of discrete components built by Motorola.

211-Input/Output Ports: The input/output ports allow the microprocessor to interact with a large number of external functions by providing physical interface points to them. The functions can then be controlled by a common address/data bus. The input/output ports are integrated circuits by Harris Semiconductor, Intel and others. The input/output ports are designed to accomodate plug-in data modems available from Rockwell, AMD and others, as well as other modules such as FSK and DTMF which essentially include 'data modem' functions. These will be described hereinafter in greater detail.

The Digital Serial Interface Bus: The Digital Serial Interface Bus receives commands and microphone audio from the Control Unit over the Serial Link. Also, the Serial Bus transmits status and received audio to the Control Unit. The Serial Interface Bus is made up of the Codec and the PCM modem.

The Central Processing Unit: The Central Processing Unit serves as the slave controller for the Transceiver Unit. It accepts commands from the master controller located in the Control Unit and controls the operation of the function modules in the Transceiver Unit. It consists of the input/output block and the Central Processing Unit.

206-FSK Module: The FSK Module is a custom design incorporating readily available integrated circuit devices in a format to convert incoming digital formats to an analog signal compatible with the restricted transmission bandwidth of the FM spectrum. It is also capable of receiving such incoming analog data and converting this to the output digital format. Primary communications use of this module is to allow external compatible digital products to communicate via the RF link provided by the OMNI system. The specific conversion format is flexible depending upon the application.

207-Sequential Data Module: The sequential module provides signal encoding and decoding capabilities per any of the defined available formats such as ZVEI, DZVEI, etc. Functions provided are limited to a 5 or 7 bit sequential message in essentially a base-10 format under direct control of the CPU (202). The module uses an off-the-shelf SSI integrated circuit for tone generation and decoding, available from vendors such as MX-Com and is well known in the industry.

208-DTMF Module: The DTMF module is an industry standard interface relying on off-the-shelf integrated circuits from any number of available vendors such as Motorola, Texas Instruments, etc. Its purpose is to provide dual-tone encoding capability such that the resident microprocessor in the CPU (202) can generate tones in any of the Bell or CCITT signalling formats and allow radio communication with a standard telephone network.

209-CTCSS Module: The CTCSS module relies on commercially available integrated circuits to encode and decode a sub-audible tone set for squelch control and signal identification. The tone selection for transmission and reception is determined by the CPU (202) per internationally defined formats and specifications. An SSI integrated circuit readily available from MX-Com is used to provide tone generation and decoding. This device relies on techniques known in the art, such as digital filters, comparators, analog switches, etc. In addition, several peripheral devices such as data buffers and logic gates of CMOS type are used. These are available from most major integrated circuit manufacturers.

210-Voice Privacy Module: The Voice Privacy Module utilizes commercially available systems from manufacturers such as Racal and Ferritronics to convert the analog audio information to a converted analog or digital format compatible with the restrictions of the allocated spectrum. Its purpose is to provide communications privacy to the user at a modest cost. A variety Of methods may be incorporated including techniques such as frequency inversion of the audio in the audio band, time division multiplexing, true digital encoding and decoding, or a mixture of these. This capability will be supplemented with a custom voice privacy method which may be best defined as a Variable Time Inversion Algorithm Controlled Encryption.

212-TX Audio Source Selector: This block consists of a combination of readily available CMOS and supplemental circuits available from most major integrated circuit manufacturers to function as a multiple input to one output signal selector or multiplexer. Its function is to apply selected signals to the modulator (214) for transmission. The signal selection is under control of the CPU (202) and responsive to operating modes.

213-Pre-Amplifier/Limiter and Pre-Emphasis/Filter: This module utilizes available generic integrated circuits such as operational amplifiers and CMOS gates, etc., to provide signal conditioning required by the transmission specifications. The circuits consist of active filters of both high and low pass variety, limiters, buffer amplifiers and analog gates.

214-Modulator: The Modulator provides the circuit function of electrically deviating the phase and instantaneous frequency of the transmitted carrier frequency. It included known circuit devices such as multipliers, analog amplifiers, flip-flops, etc. to generate a narrow band angle modulated spectrum for application to the Transmitter (217). It further incorporates a conventional phase locked loop comprised of a frequency divider, phase detector, voltage controlled oscillator and analog integrated circuit filter for purposes of frequency multiplication from the lower Transmit Synthesizer (215) input frequency to the higher Transmitter (217) frequency. A part of this phase locked loop consists of the Pre-Scaler (218). All circuit devices are readily available from manufacturers such as Motorola, Signetics, National Semiconductor, etc.

215-Transmit Synthesizer: This module utilizes off-the-shelf integrated circuits from such companies as Motorola to generate a controlled output frequency in the HF band that is mathematically one-tenth of the transmitted frequency. It is used as an exitation frequency for the Modulator (214) for purposes described there. The frequency is selected by the CPU (202) via a data bus structure and generated by phase locked loop means. It includes known circuits such as digital frequency dividers, a digital phase detector of a charge-pump variety, an analog integrated circuit loop filter, and a voltage variable oscillator.

216-Receiver Synthesizer: This module consists of commercially available digital and analog integrated circuits utilized in known applications such as frequency counters, phase detectors, oscillators, etc. It further includes an off-the-shelf high stability TCXO as a master reference oscillator for use by both Receive and Transmit Synthesizers (215 and 216). The Receive Synthesizer is further under CPU (202) control via a control data bus. Its output is applied to the Receiver IF module (219) and serves as a local oscillator.

217-Transmitter: The Transmitter uses commercially available RF power transistors available from Motorola and other companies in a broad band amplifier application to provide power gain for the low level input from the Transmit Frequency Synthesizer (215). It further utilizes common integrated circuits such as operational amplifiers for power level control and protection circuits. The high level RF output is then applied to the antenna coupler consisting of a TR Switch (221) and Antenna Filter (22).

218-Pre-Scaler: The Pre-Scaler provides broad band signal amplification for the input received from the Modulator (214) and applies it to a phase detector. The phase detector output is filtered and returned to the Modulator (214) for VCO control functions. The other input to the phase detector originates at the VCO and is divided by 40 to provide correct proportionality with the Modulator (214) output. The integrated circuits used are from Motorola and are of the ECL logic variety.

219-Receiver IF Module: This module provides mixing, gain, filtering and demodulation of the incoming received signal and provides the base-band output for speaker, data or other audio means. In addition, it performs functions of signal level measurement and signal quality determination for squelch, scanning and voting functions. It includes active integrated circuits from RCA, Motorola and Signetics in addition to a double balanced diode ring mixer from MA-Comm and custom crystal filters available from sources such as PTI, Sokol, etc.

220-Carrier Detect Circuit: This block performs the function of carrier recognition. It extracts a coherent signal from the receiver noise to determine if, in fact, a coherent signal exists. This is required for the complex squelch, scan and voting functions performed by the OMNI transceiver. It utilizes a phase locked loop from EXAR and an analog multiplier from Motorola to extract and determine the validity of the signal.

221-Antenna Switch: The antenna switch incorporates PIN diodes available from companies such as Microwave Associates in a solid state, quarter wave switch configuration. Its purpose is to provide coupling of the antenna to either the receiver Pre-Selector (223 and 224) or the Transmitter (217).

222-Antenna Filter: The antenna filter is a passive electronic device utilizing capacitors and inductors in a four pole band-pass configuration. The purpose of this circuit is to prevent out-of-band emissions, generally the harmonics of the transmitted frequency, from being emitted into the environment and to aid in preventing out-of-band received energy and signals of undesired origin from entering the receiver Pre-Selector (223 and 224).

223-Receiver Pre-Selector Low-Pass Filter: This circuit is a passive block including capacitors and inductors to provide a low-pass functional block as part of the Pre-Selector (223 and 224).

224-Receiver Pre-Selector High-Pass Filter: This circuit consists of passive elements in the form of a high-pass filter and one transistor readily available from manufacturers such as Motorola and other companies. Its purpose is to provide rejection for unwanted frequencies and some gain to enhance the reception sensitivity. The amplifier is of the common emitter type.

COMPLEX FUNCTIONS

Frequency Generation: To generate the various frequencies required for transmit and receive functions, the Transceiver Unit incorporates two independent frequency synthesizers to permit full duplex operation. They consist of the Receive Synthesizer (216), and the Pre-Scaler (218). These modules provide functions of receiver mixer exitation (local oscillator), transmitter exitation, and angle modulation of the transmitted signal. All frequency choices are in response to input data from the CPU (202) via the Control/Data Bus and several discrete functions such as SYN PTT.

Transmission: The transmit function consists of several modules providing signal selection, amplification and conditioning for the output of the Modulator (214). They consist of the Transmit Audio Source Selector (212), the Transmitter (217), the TR Switch (221), and the Antenna Filter (222). These blocks combine to provide the final antenna output of the OMNI Transceiver.

Reception: To receive and demodulate incoming signals, the Receiver IF (219), the Receiver Pre-Selector Low-Pass Filter (223), the Receiver Pre-Selector High-Pass (224), and the Carrier Detect Circuit (220) operate in concert. They accept incoming RF energy, convert it to lower intermediate frequencies, provide critical filtering and signal recognition, as well as demodulation of the intelligence or audio. The audio or data is then passed on to one of the signaling modules or to the speaker amplifier in the control head for amplification.

Signaling: There are various forms of signaling and encryption that may be provided in the Transceiver Unit. They perform functions of squelch or signal control, voice encryption and data conversion. These modules include the FSK Module (206), the Sequential Data Module (207), the DTMF Module (208), the CTCSS Module (209), and the Voice Privacy Module (210). They all, exclusive of the DTMF Module (208), perform both encoding and decoding functions, receiving instructions via the Control/Data Bus from the CPU (202) and returning data to the CPU (202) via that same bus. In the case of audio encryption, inputs are provided from the microphone via the PCM link, or directly from the Receiver IF Module (216) for repeater applications.

Figures 20, 20A:
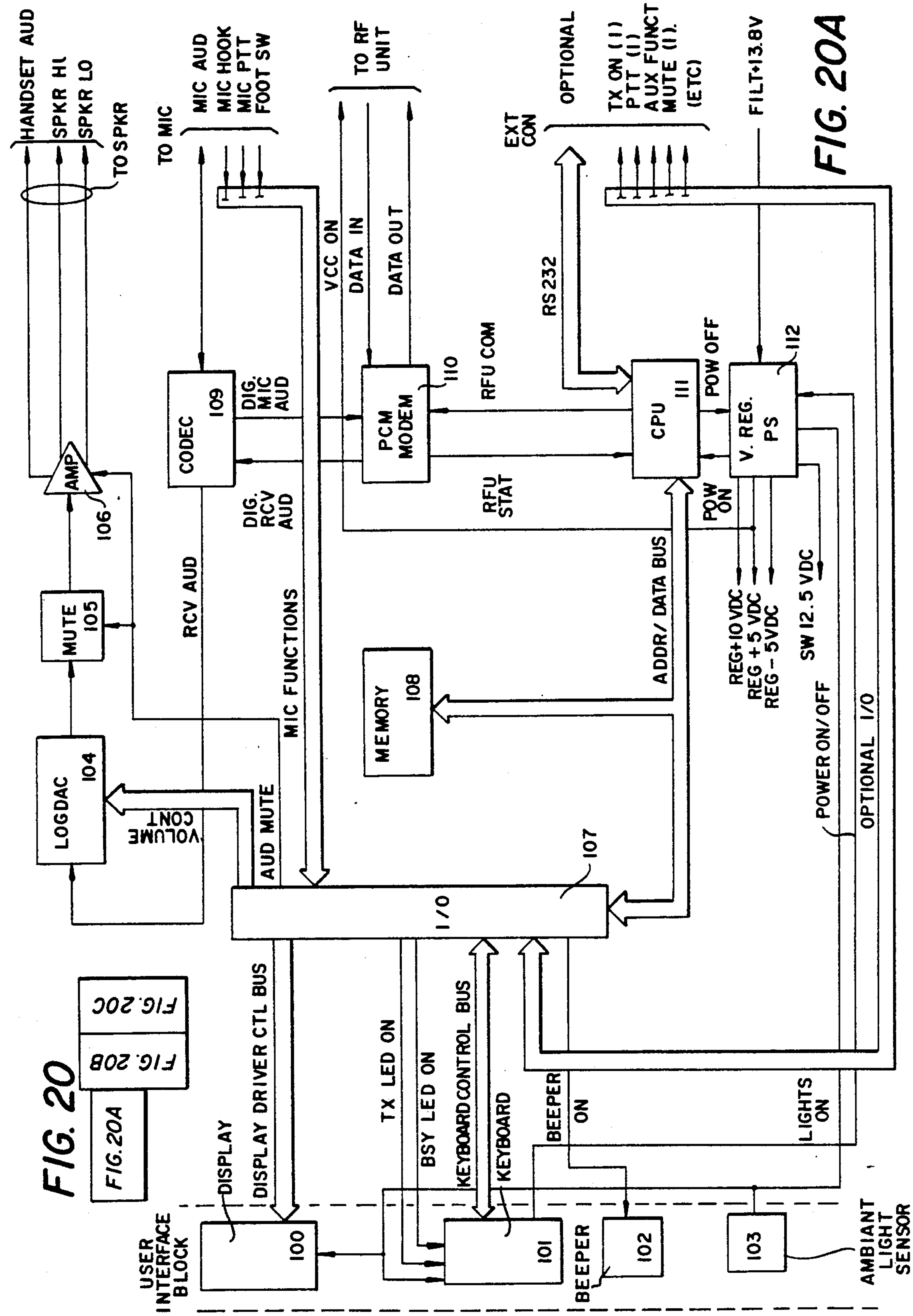
FIG. 20 and FIGS. 20A–20C illustrate a detailed block diagram of a radio system constructed in accordance with the invention including a Control Unit, Digital Serial Interface, and Transceiver Unit.
Figure 20B:
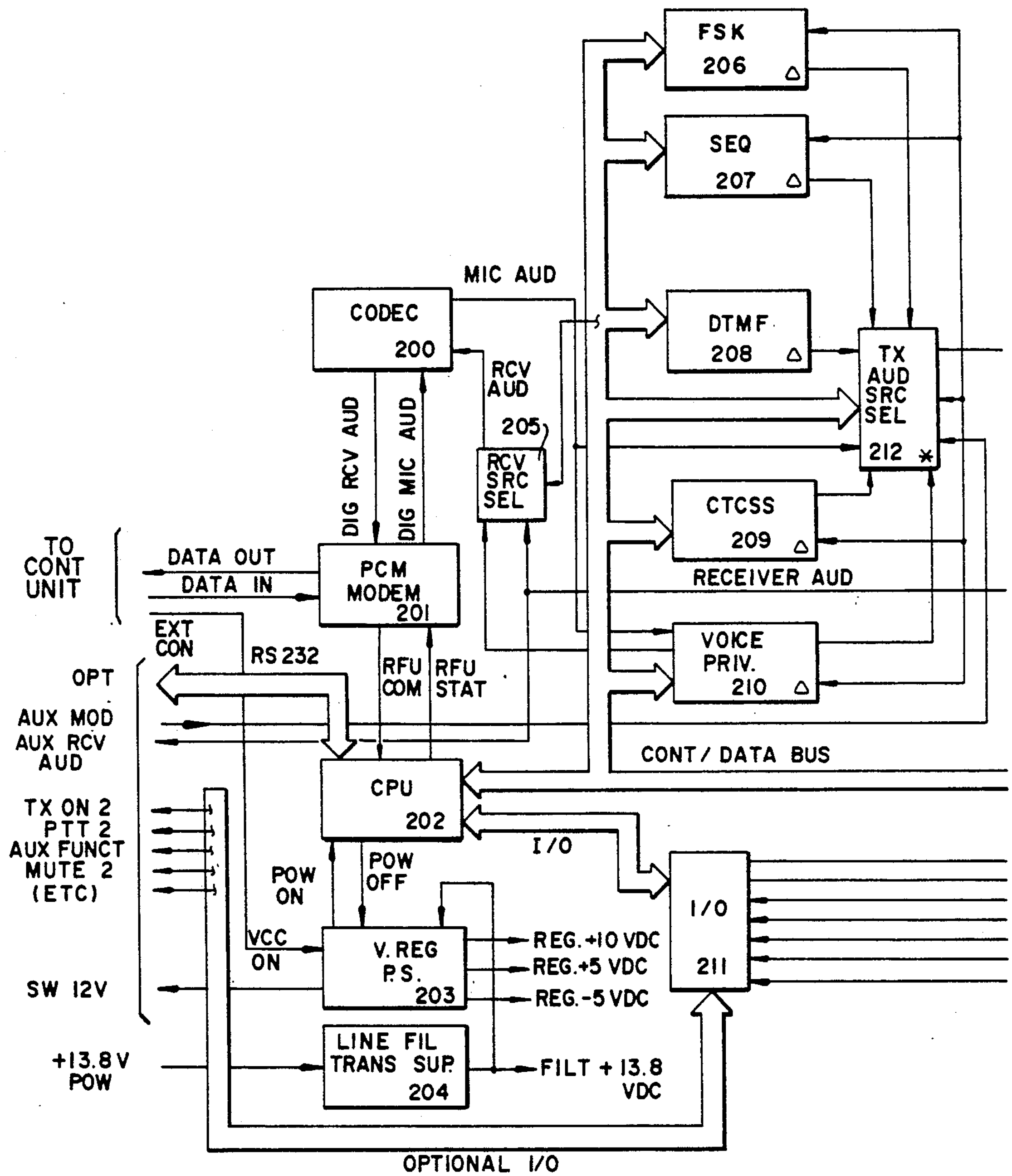
Figure 20C:
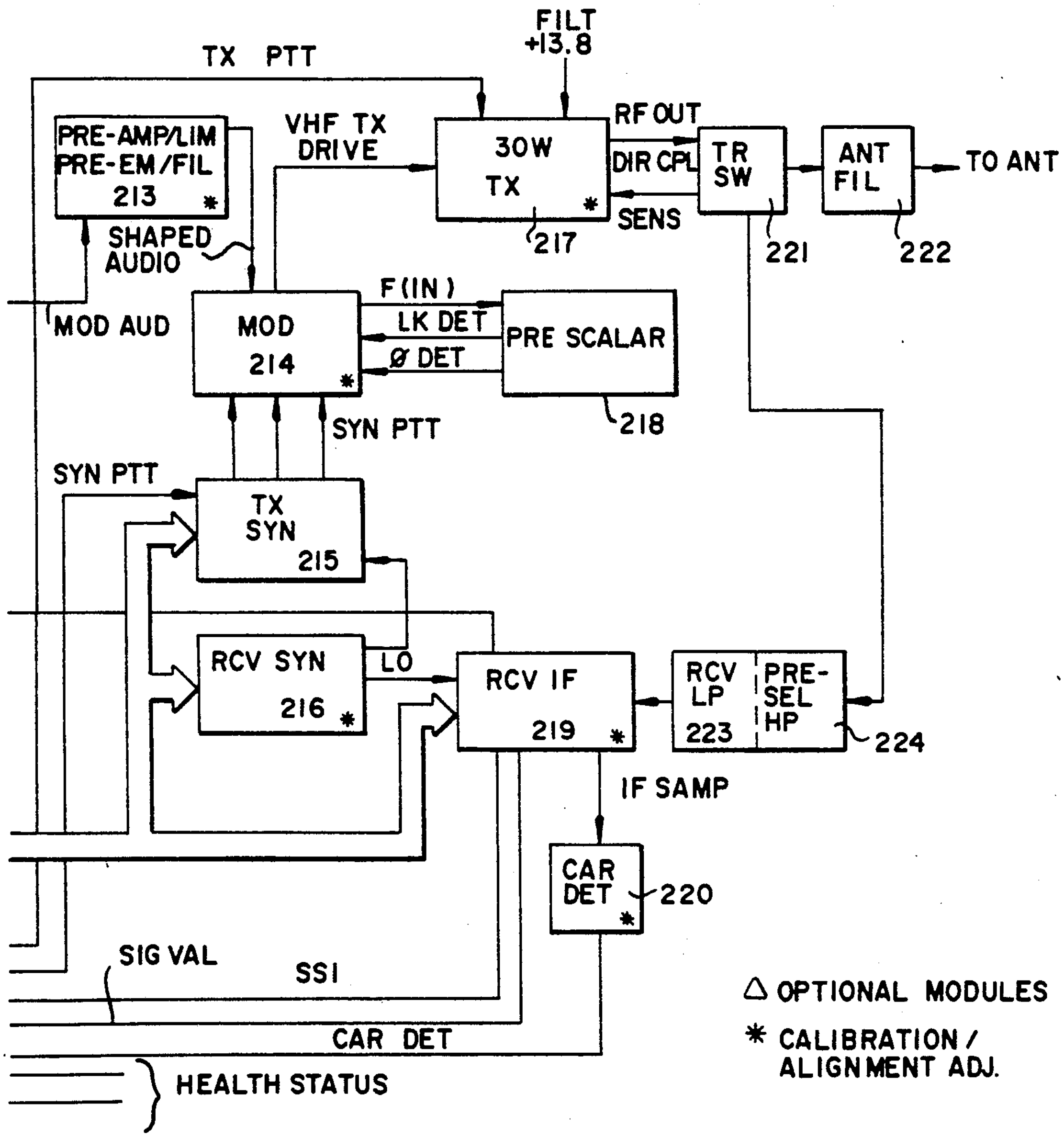

FIG. 20 is a detailed block diagram of the electronics of the radio system of the invention. It compiles FIGS. 18 and 19 which have already been individually and fully explained. It is provided to allow a complete viewing of the detailed block diagrams of the main elements.

Figure 21:
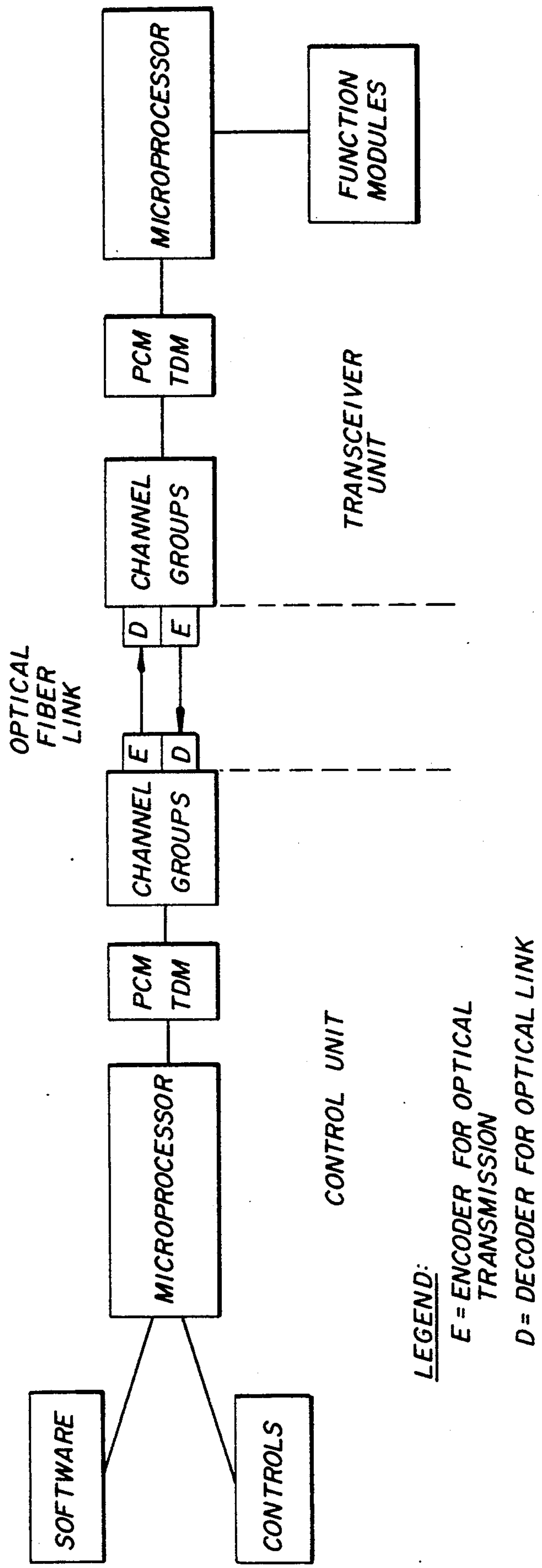
FIG. 21 illustrates the novel radio system using an Optical Fiber Linking Medium.

FIG. 21 depicts the basic block diagram of the system of the invention with an optical fiber linking medium between the Control Unit and the Transceiver Unit. An encoder at the Control Unit interface translates the digital signals into light signals. These are then translated back into the original digital signals through a decoder at the Transceiver Unit interface. The same process occurs for signals being communicated over the optical 'path' from the Transceiver Unit to a Control Unit through an encoder at the Transceiver Unit and a corresponding decoder at the Control Unit. The optical fiber and other elements used in the linking are readily available from multiple electronics and optical fiber suppliers in the U.S. and overseas. For example, the electronic elements are available from Motorola. The fiber can be plastic or other suitable type. For example, a 1000 micron plastic optical fiber can be used and is available from Belden and Alpha in the U.S. The Digital Serial Interface that accommodates this type of linking is described in detail in the copending application entitled: Bidirectional Digital Serial Interface System For Communicating Digital Signals Including Digitized Audio Between Microprocessors-Based Control And Transceiver Units Of Two-Way Radio Communications Equipment.

Figure 22:
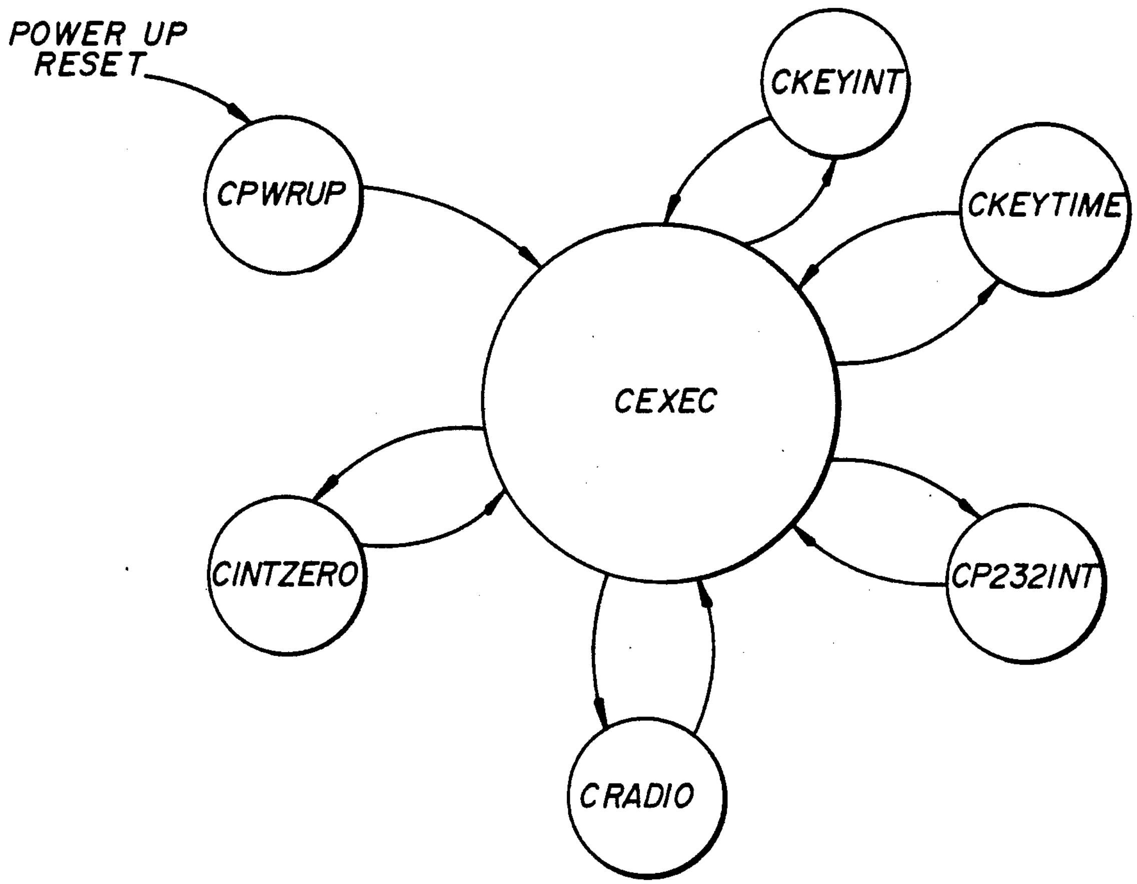
FIG. 22 illustrates a state diagram of a Control Unit computer program (software) as related to the Control Unit of the invention.
Figure 23:
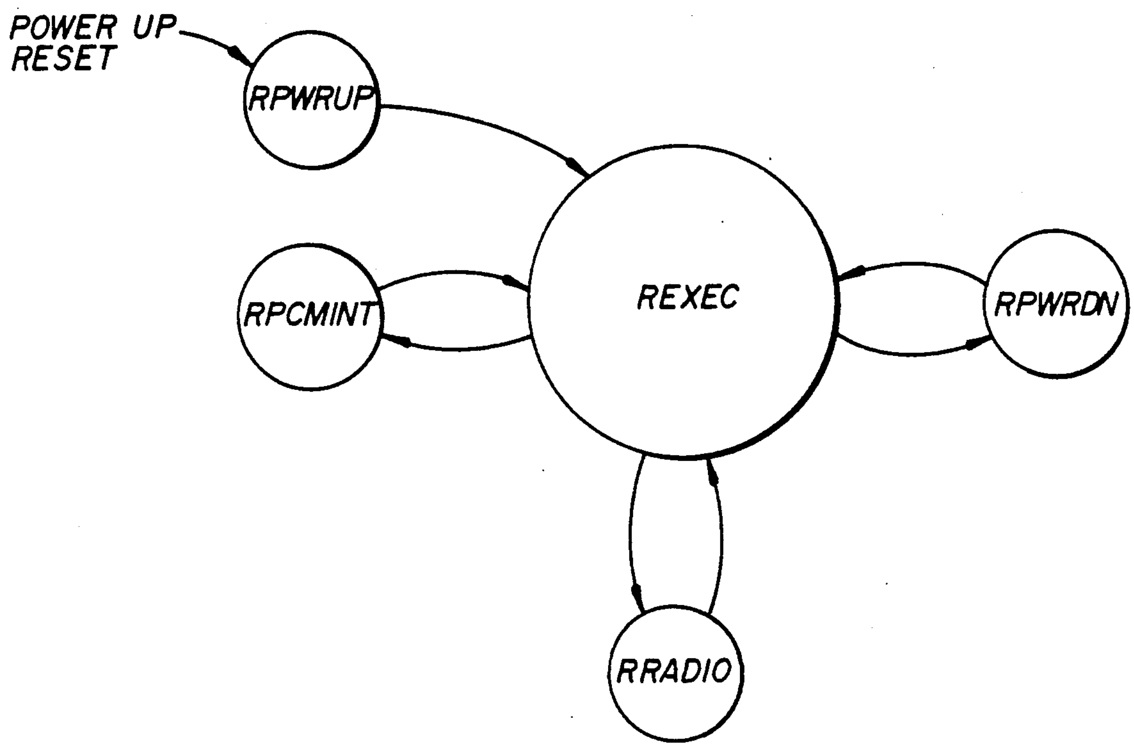
FIG. 23 illustrates a state diagram of a Transceiver Unit computer program (software) as related to the Transceiver Unit of the invention.
Figure 24:
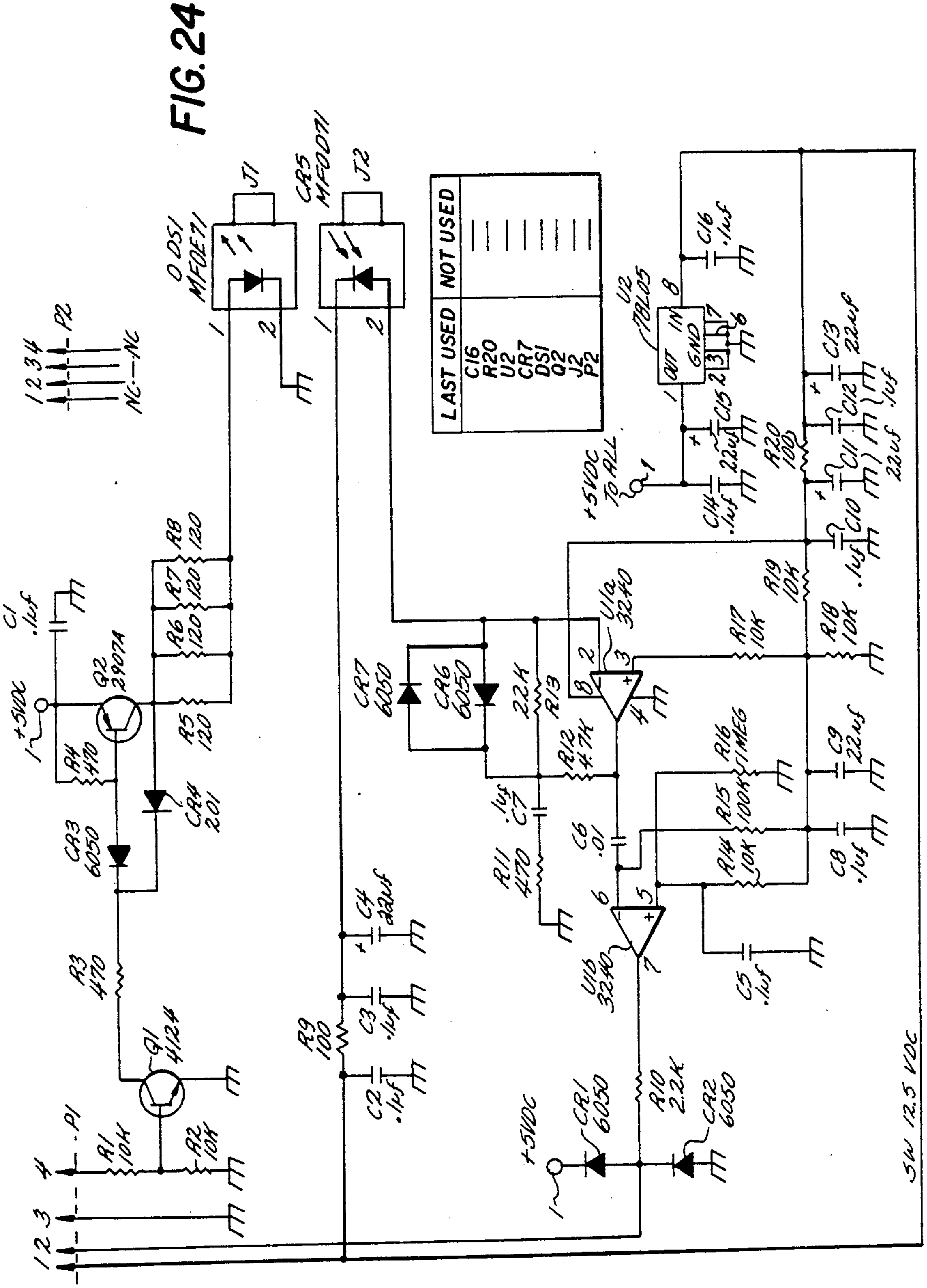
Figure 25A:
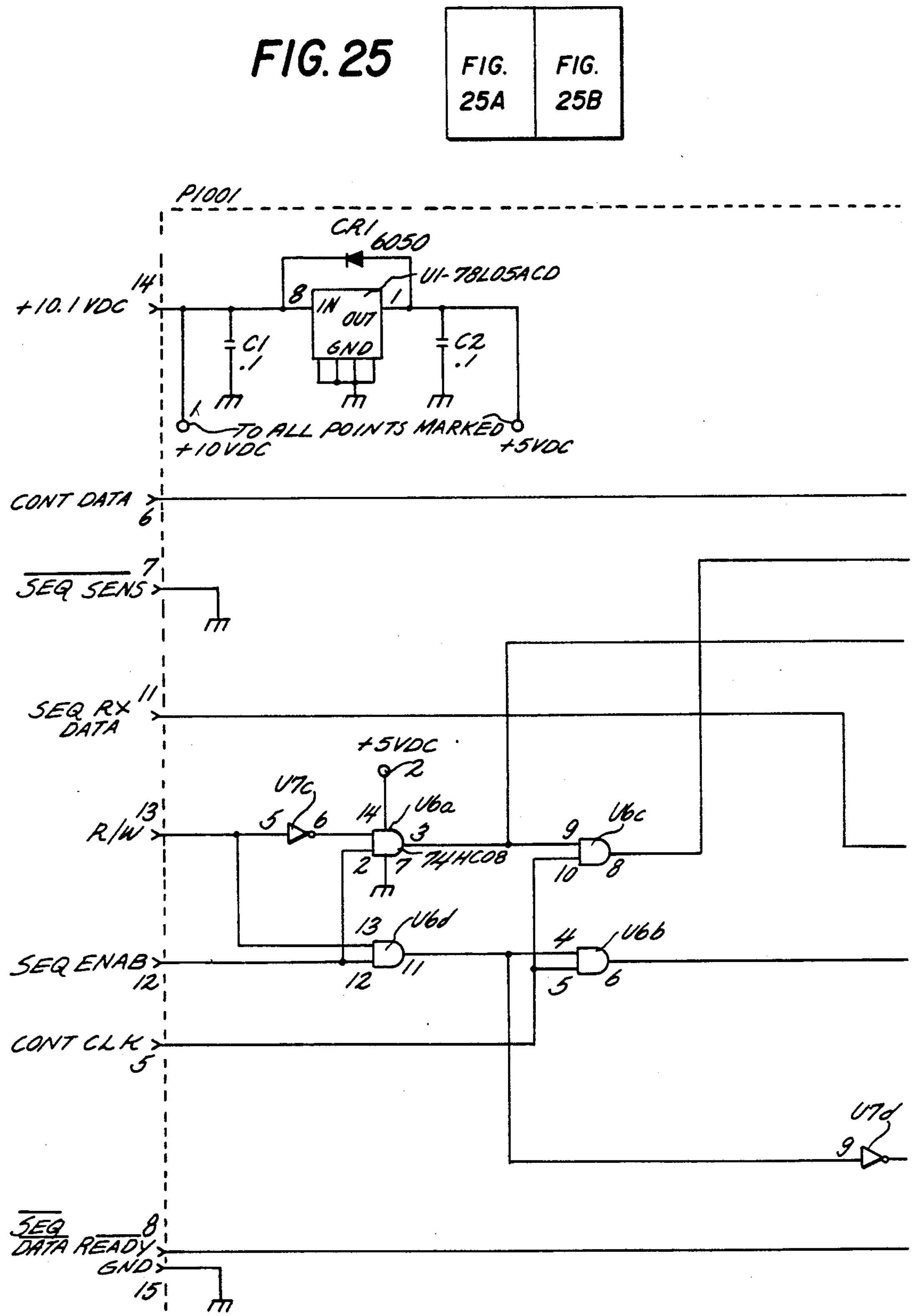
Figure 25B:
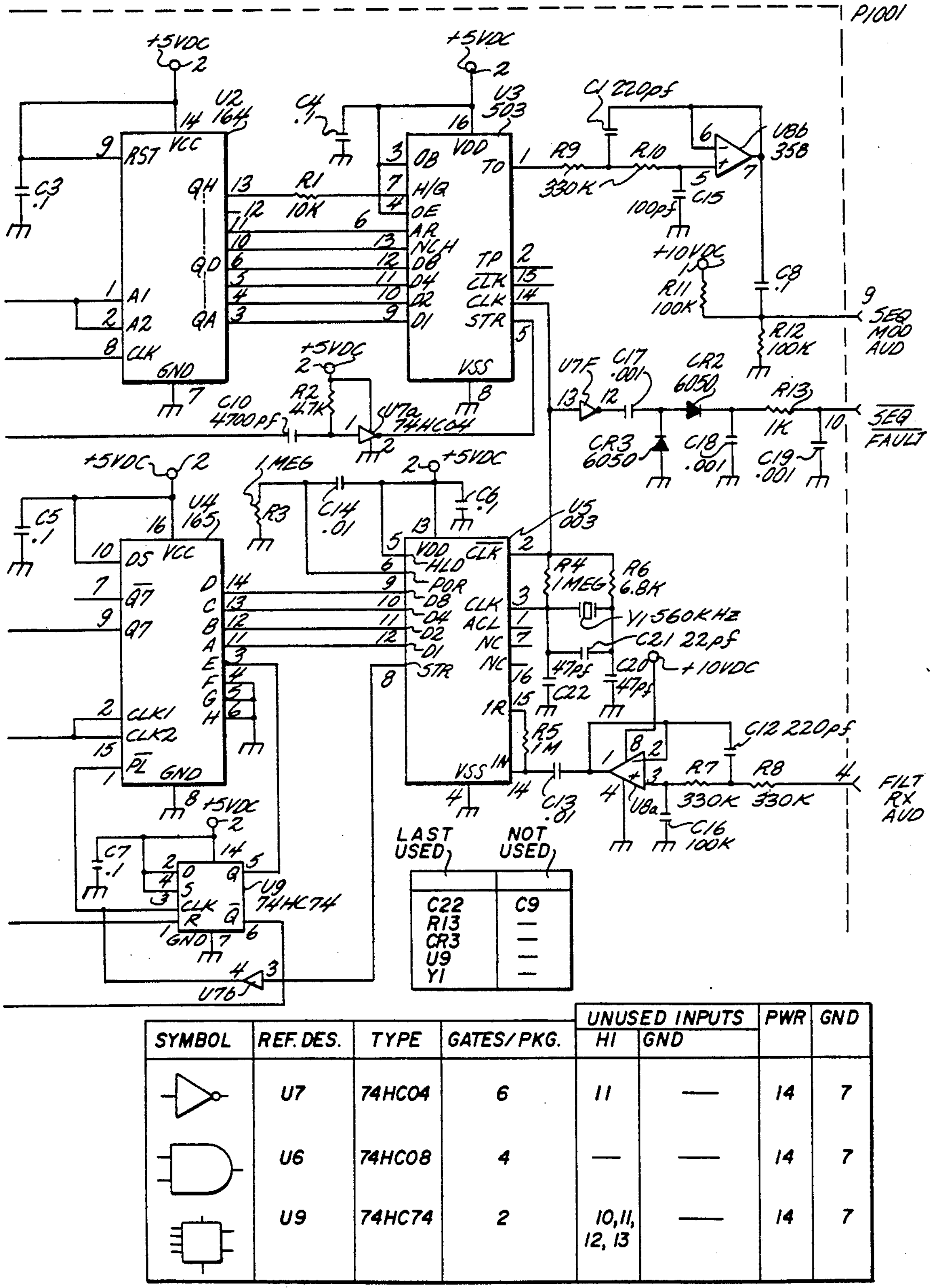
Figure 26A:
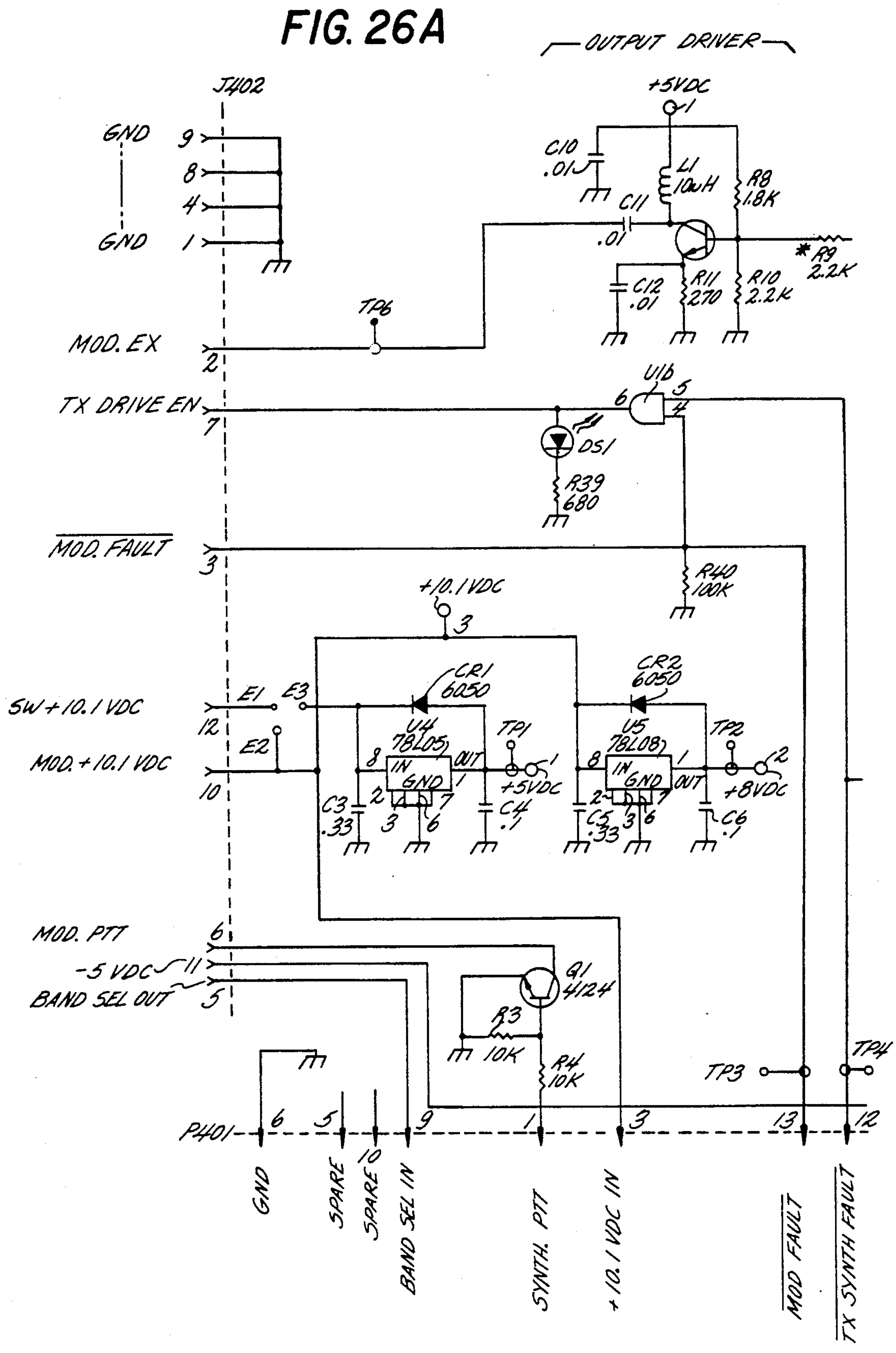
Figure 26B:
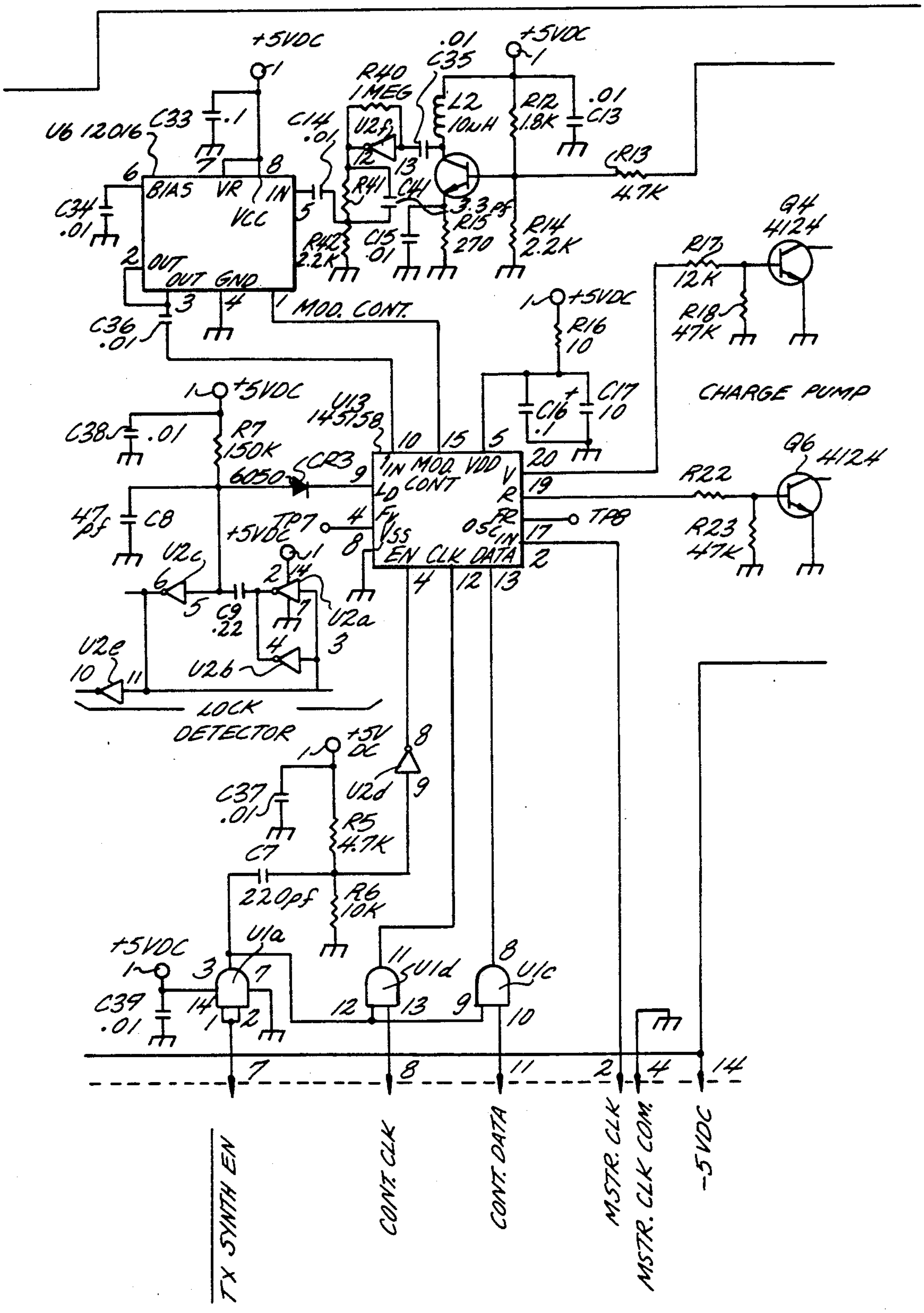
Figure 27A:
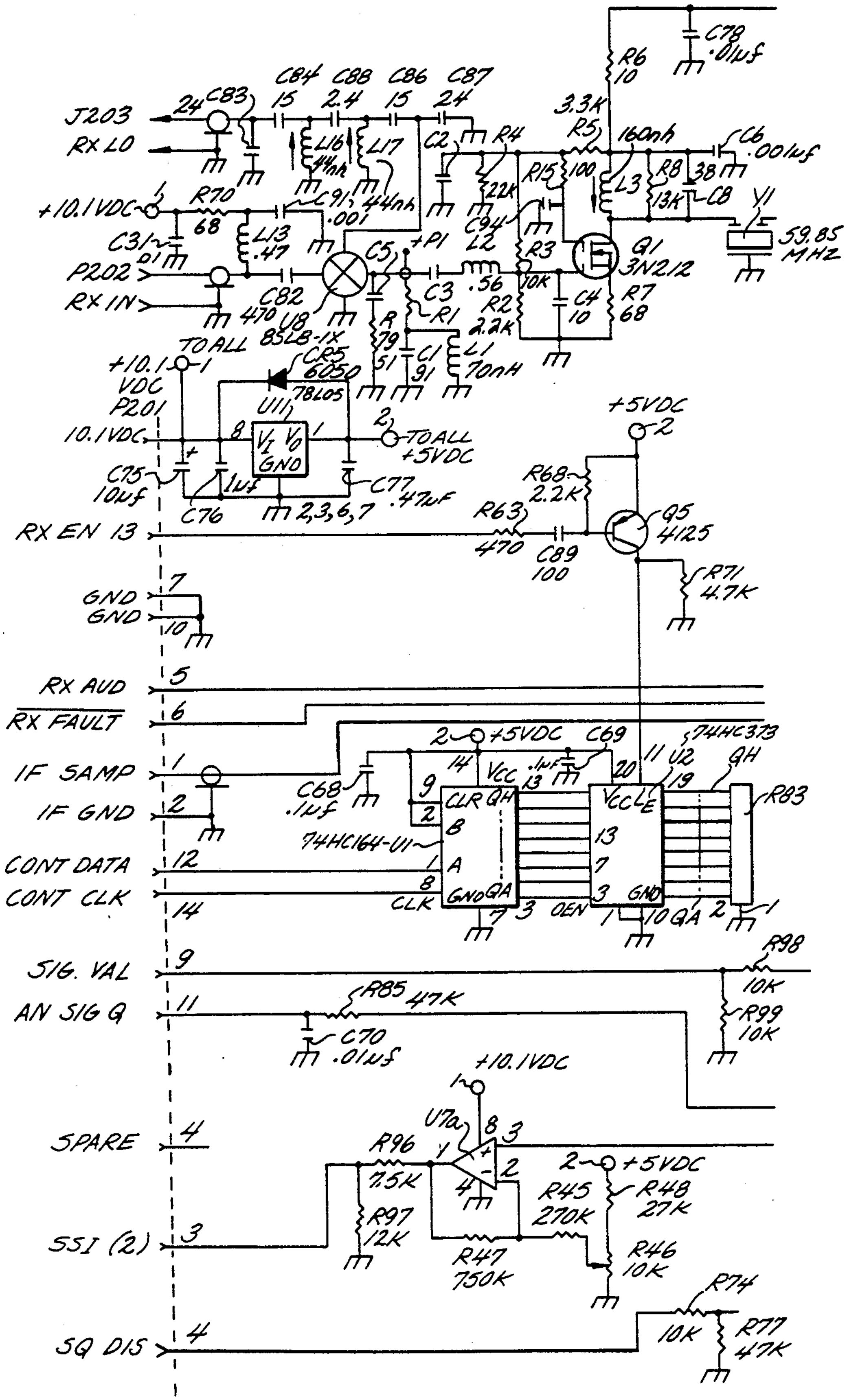
Figure 27B:
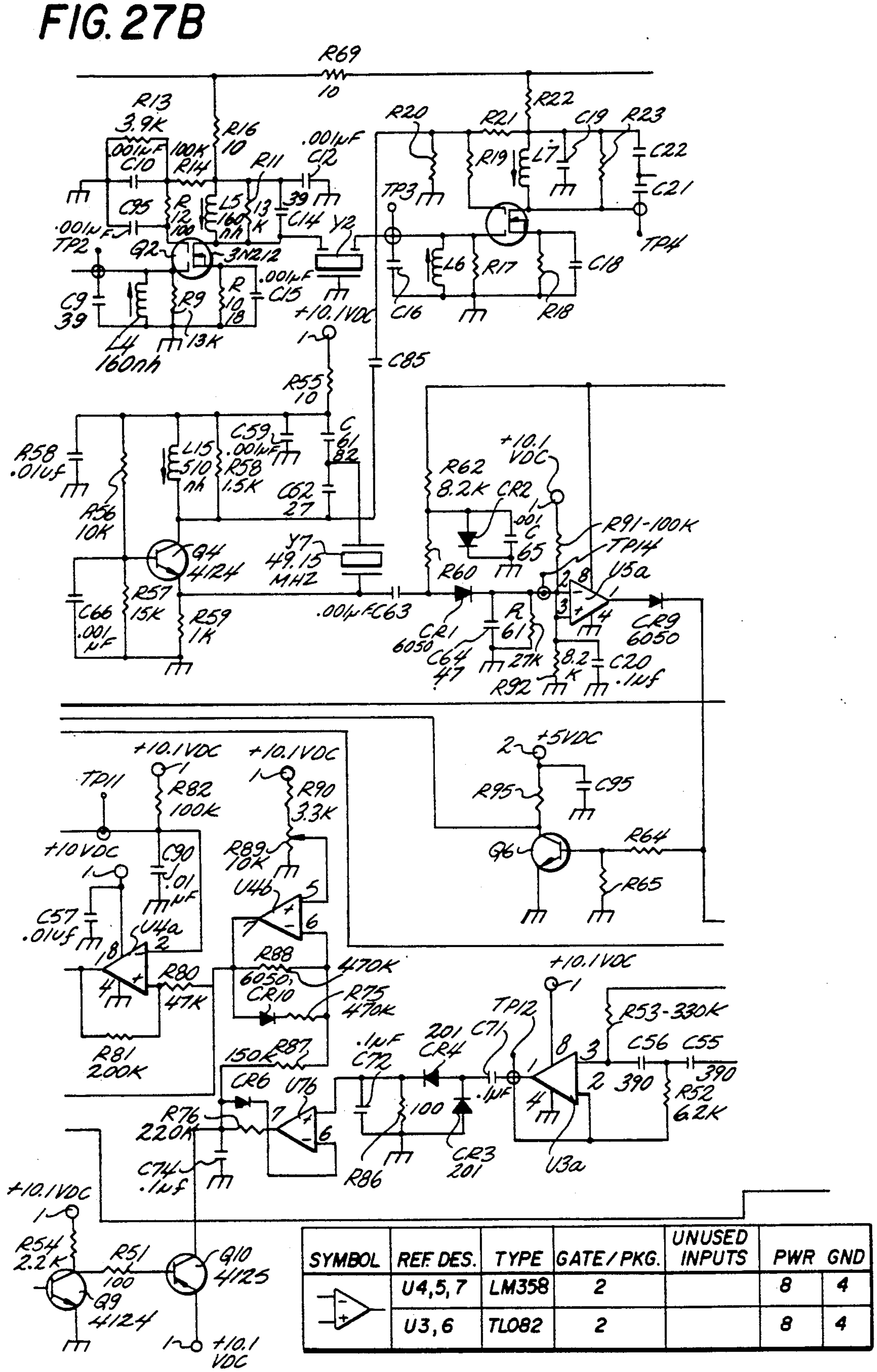
Figures 27, 27C:
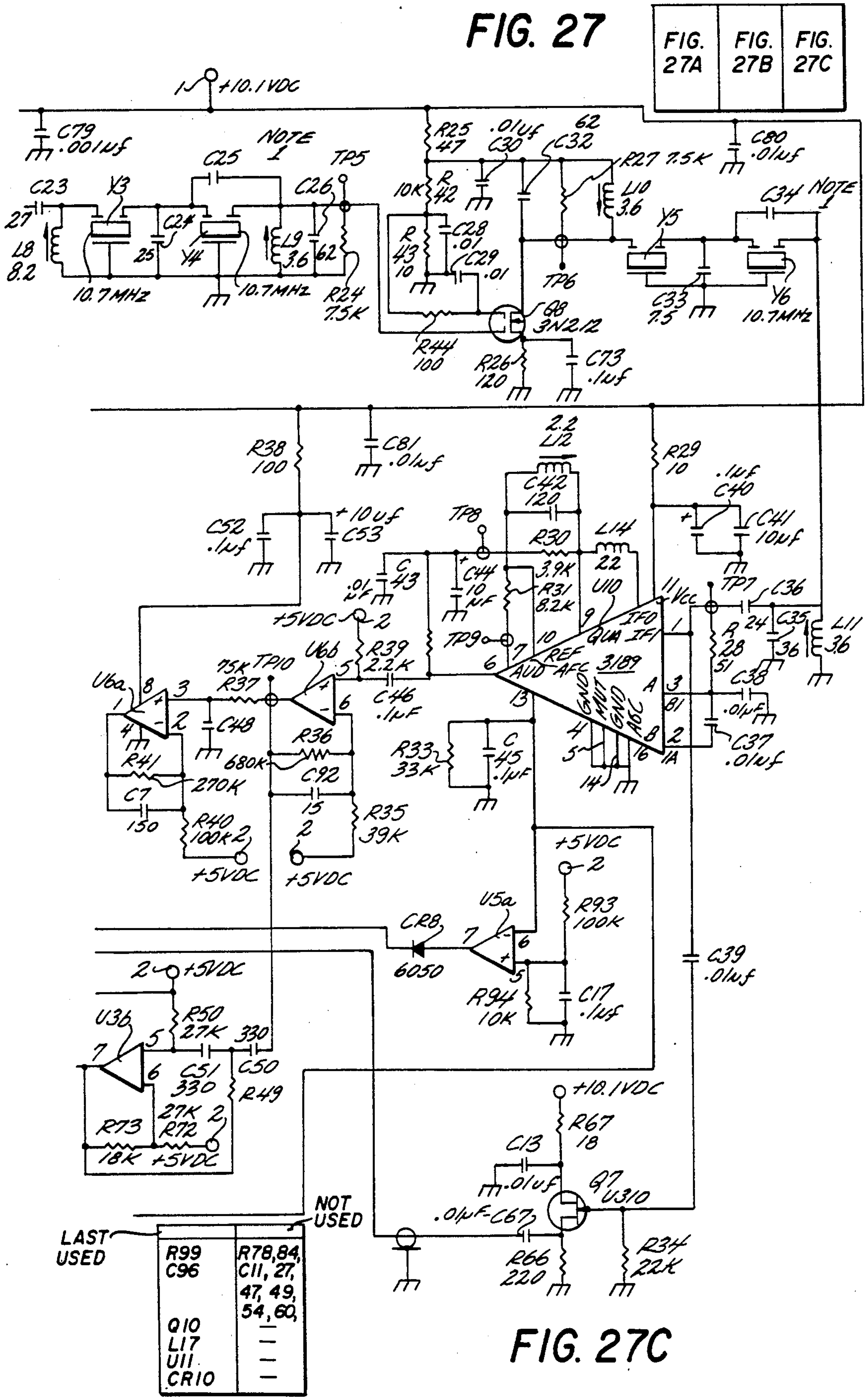
Figure 28A:
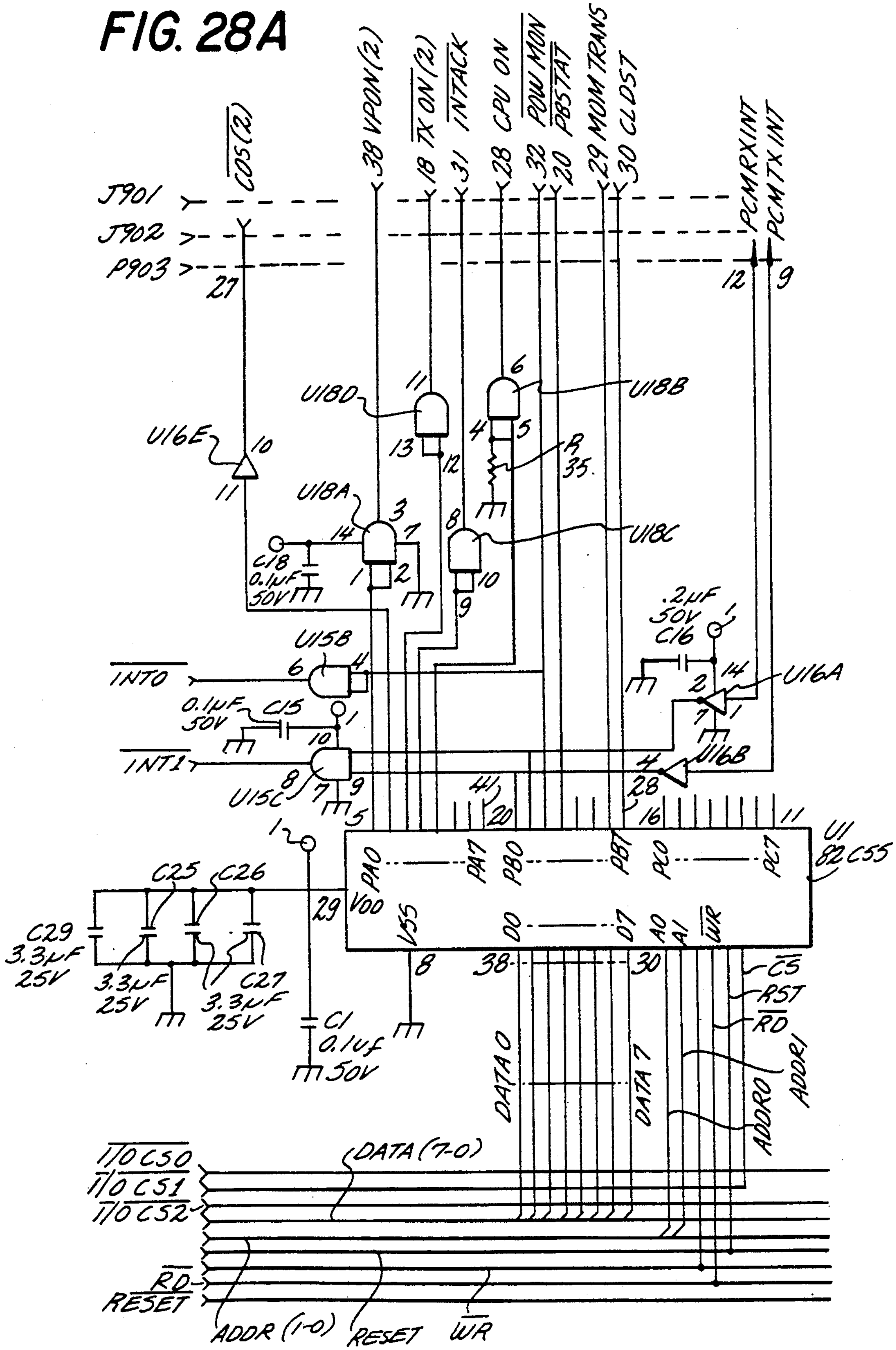
Figure 28B:
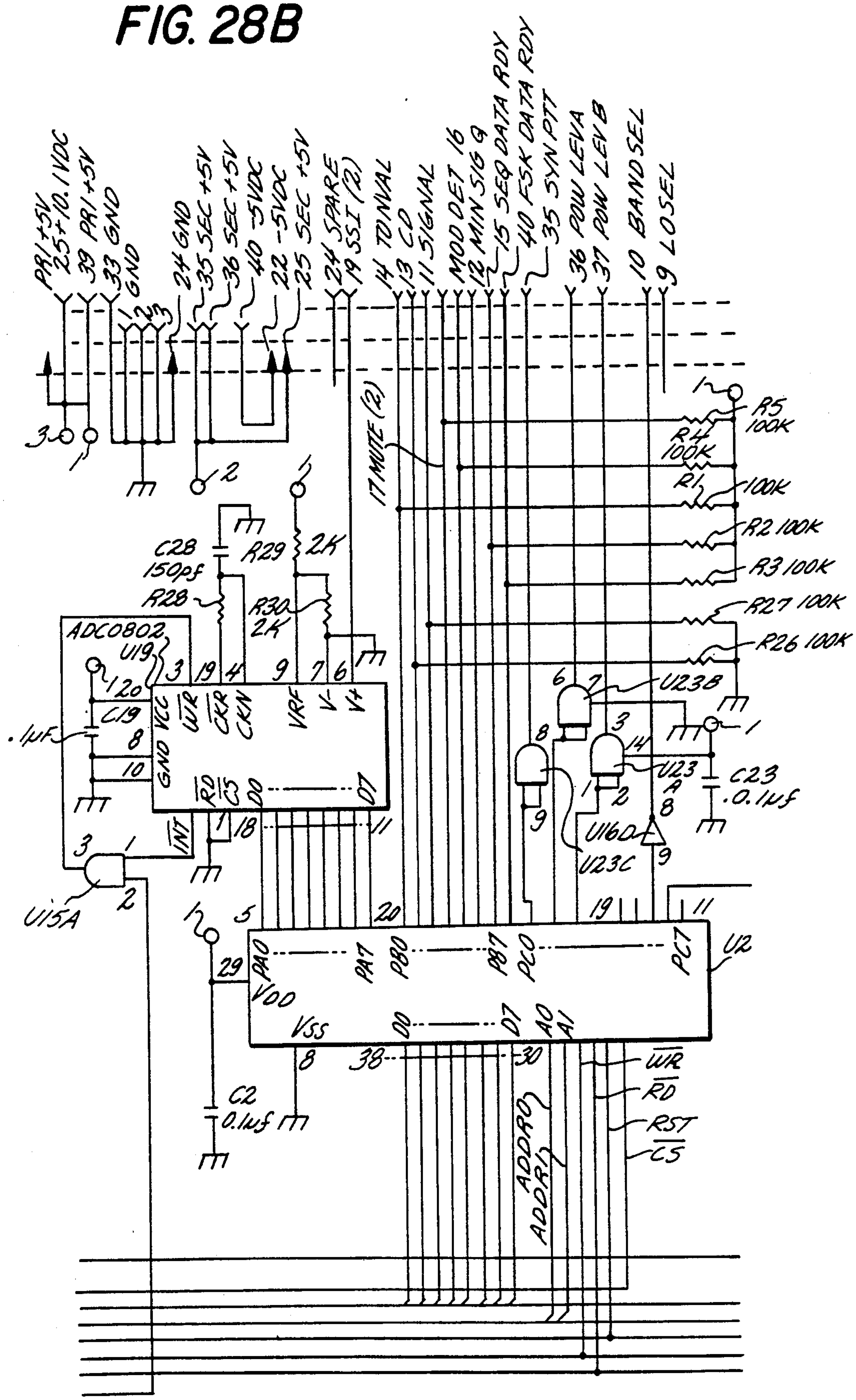
Figure 28C:
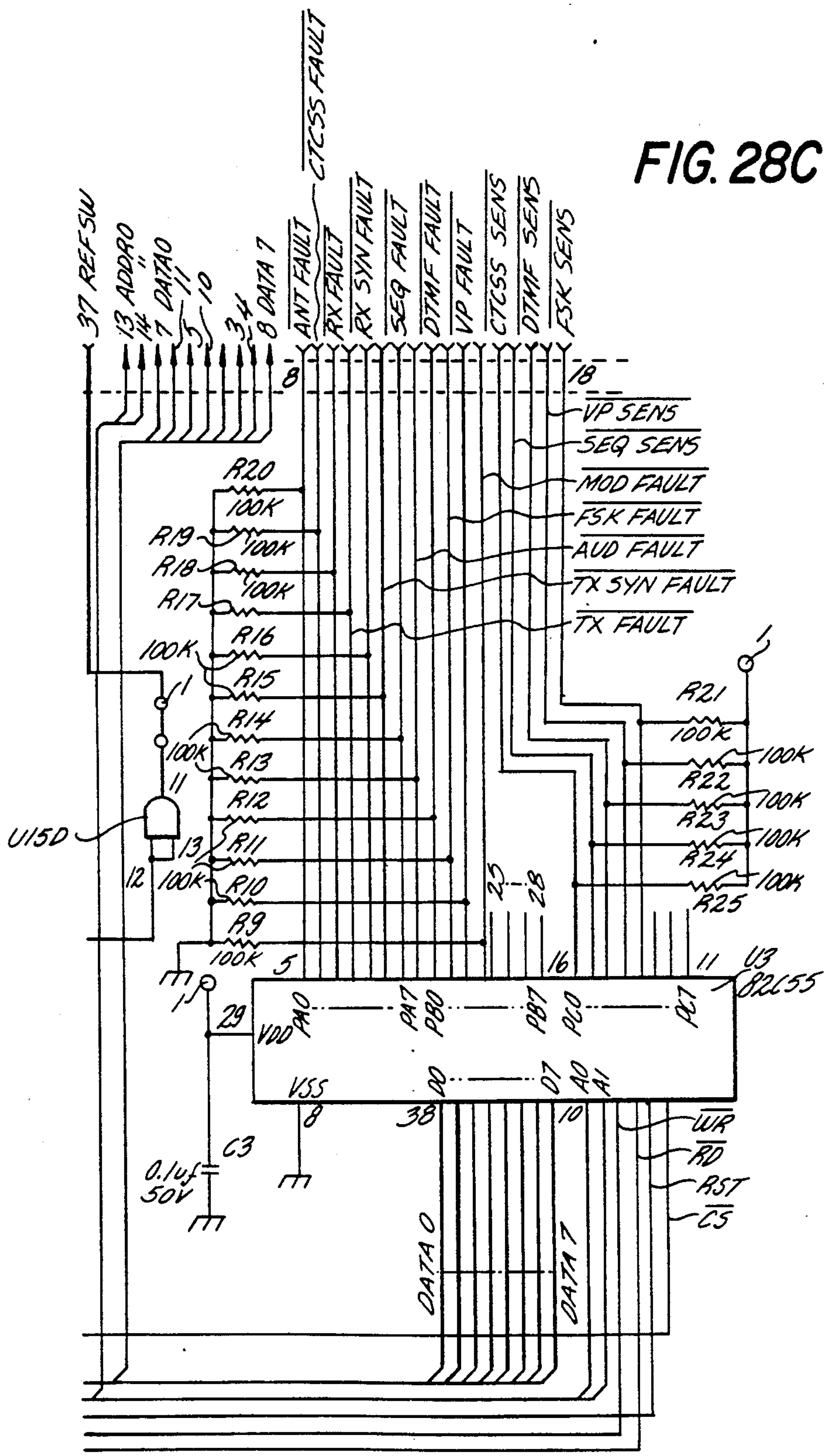
Figure 28:
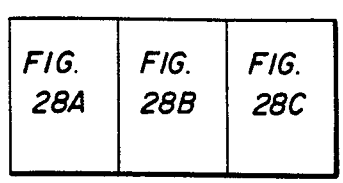
Figure 29A:
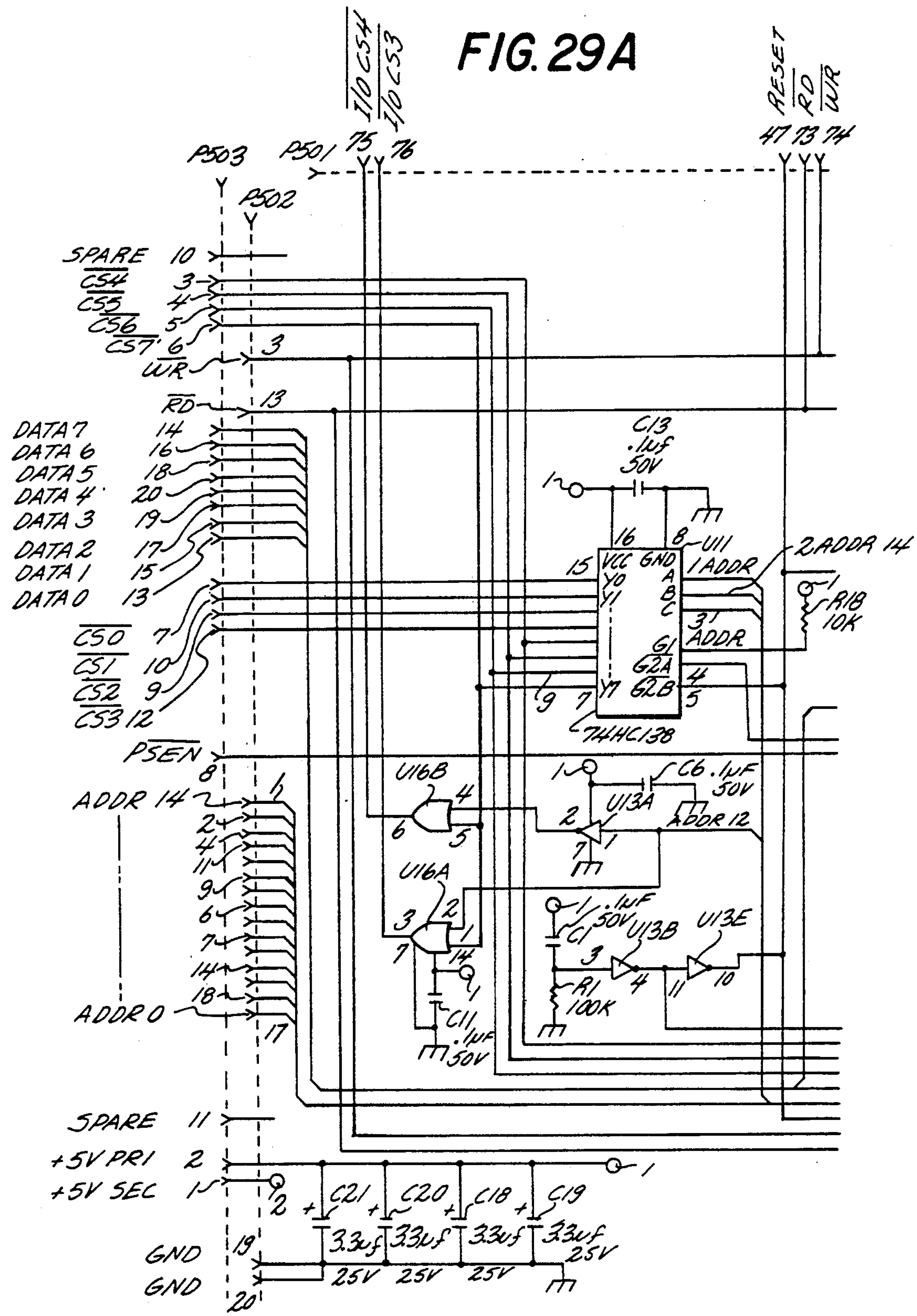
Figure 29B:
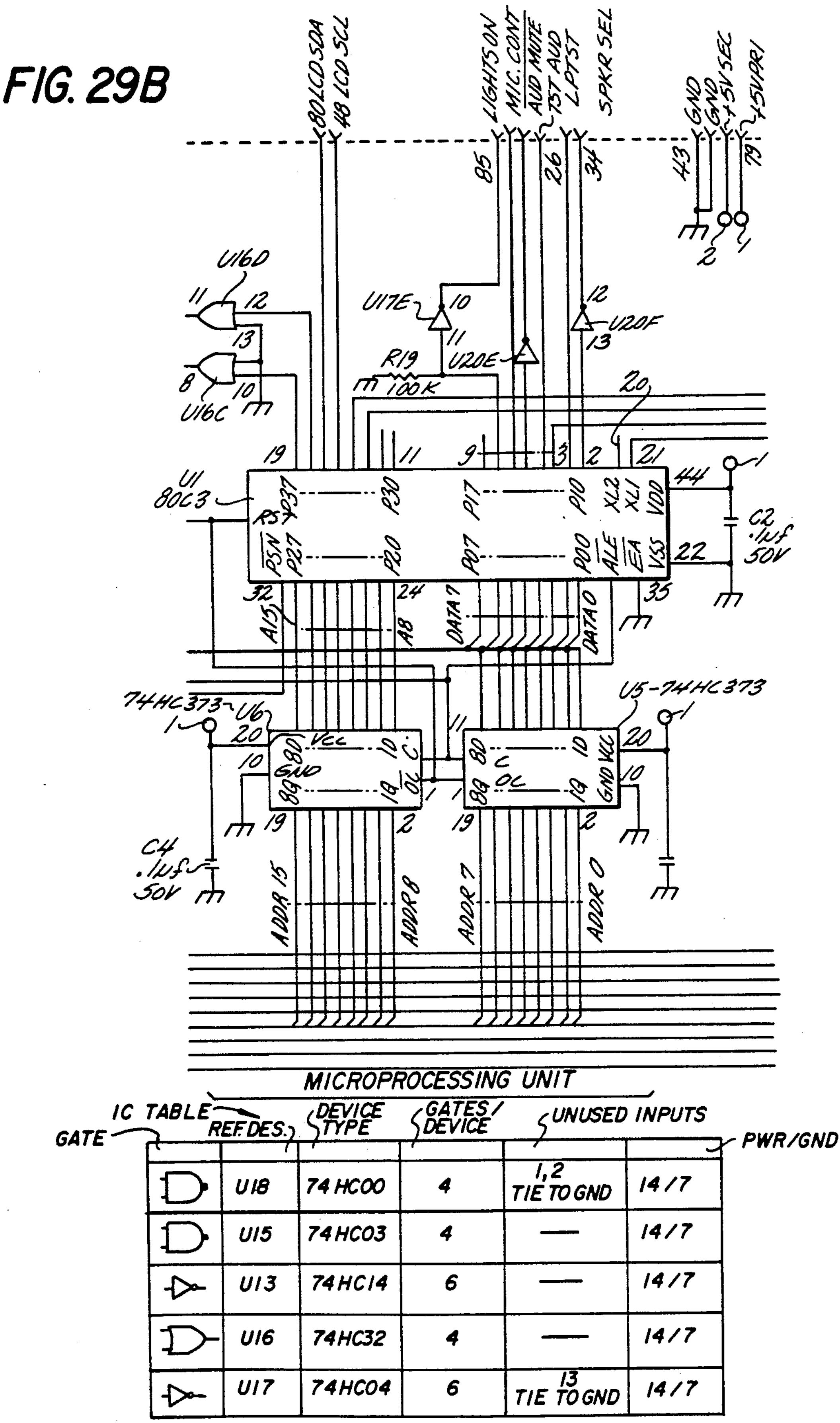
Figure 30:
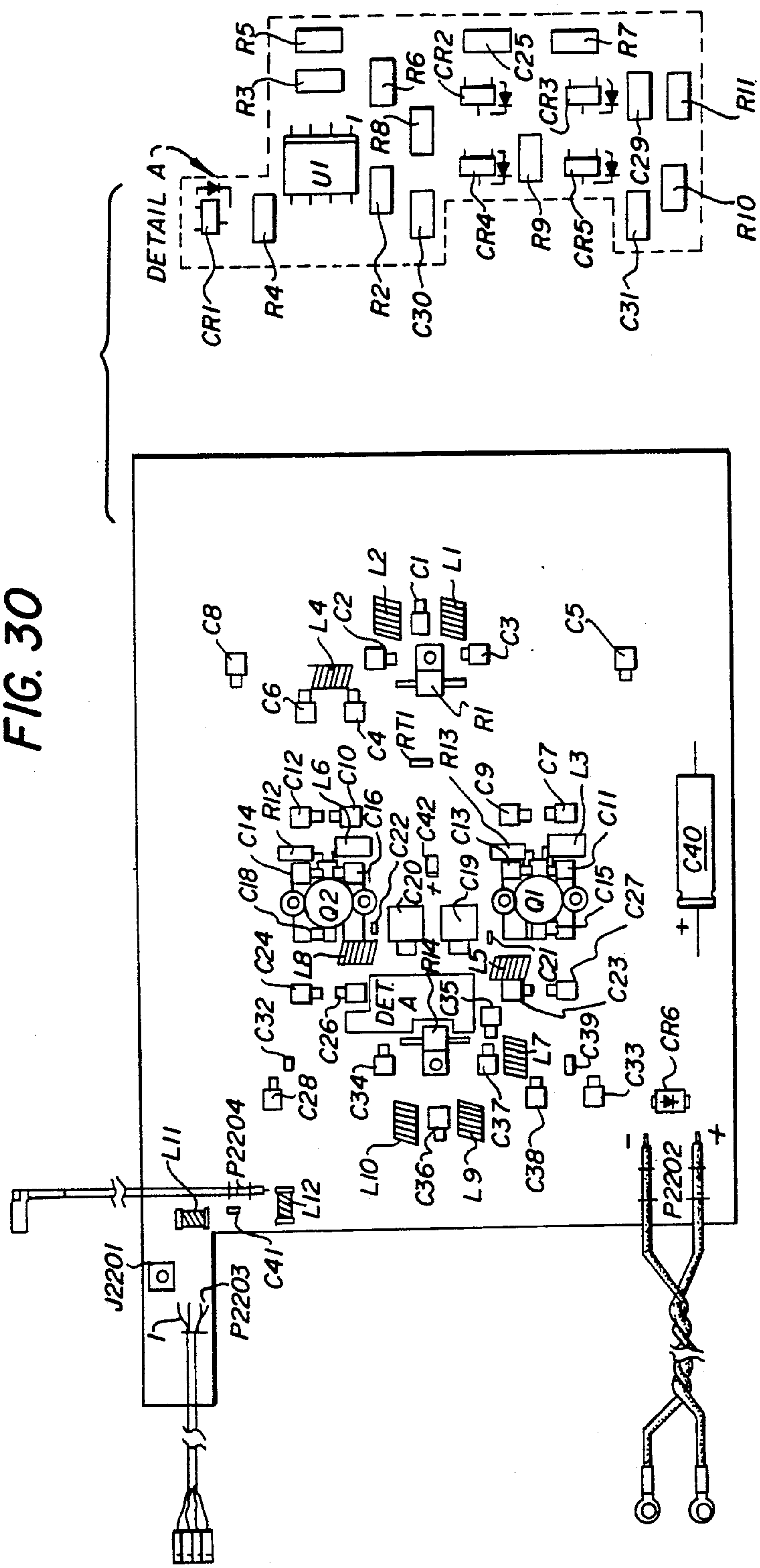
Figures 31, 31A:
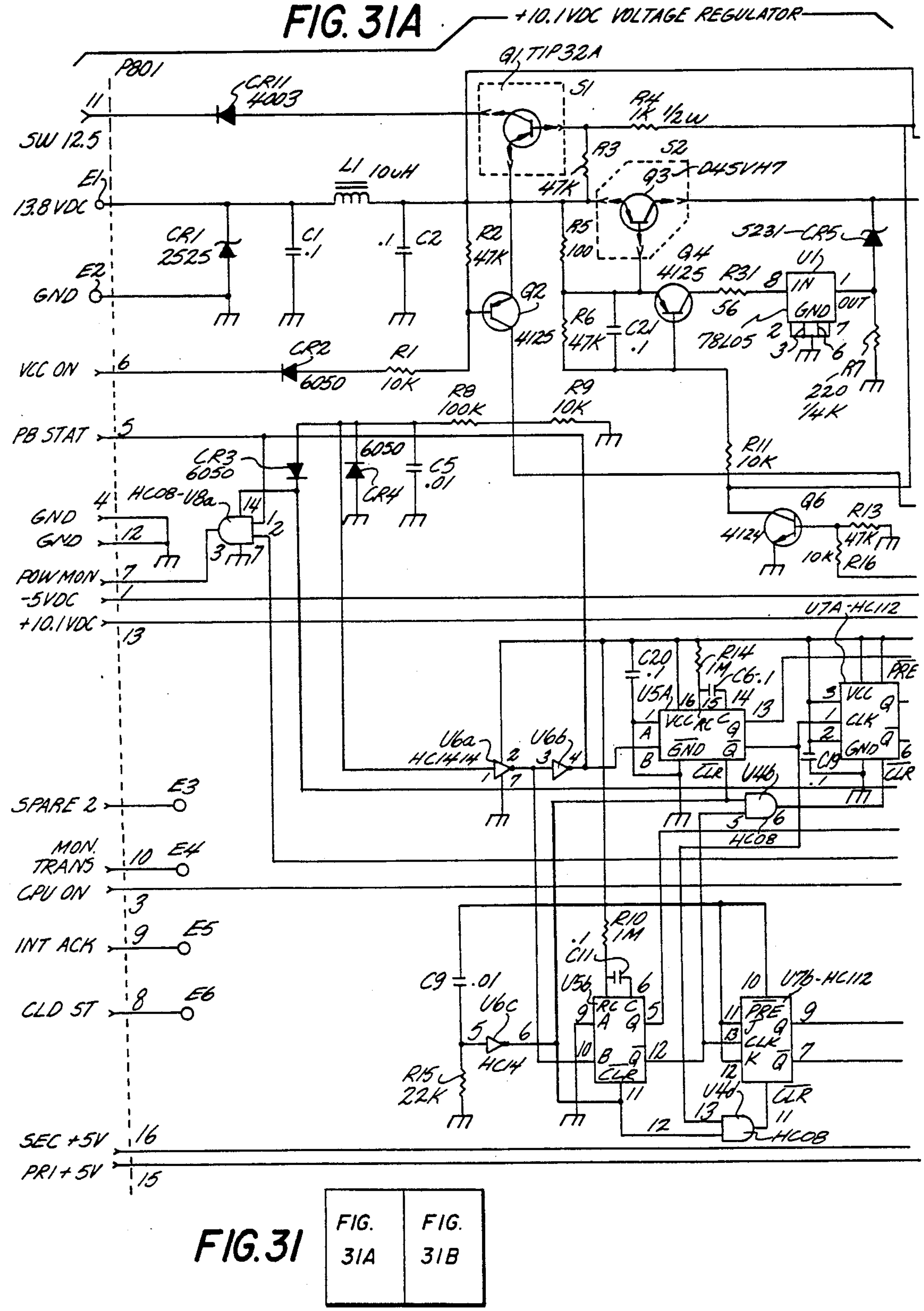
Figure 31B:
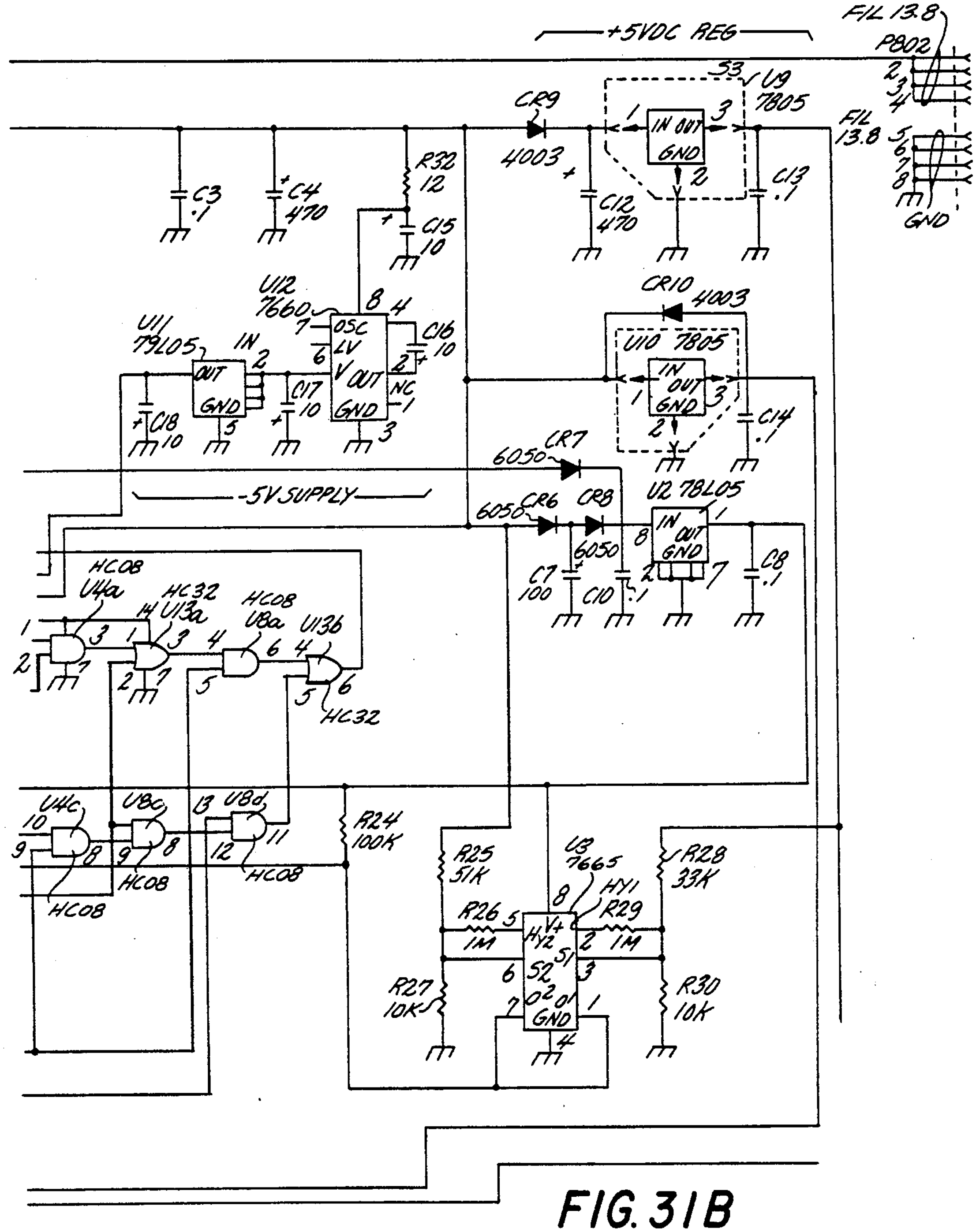
Figure 32A:
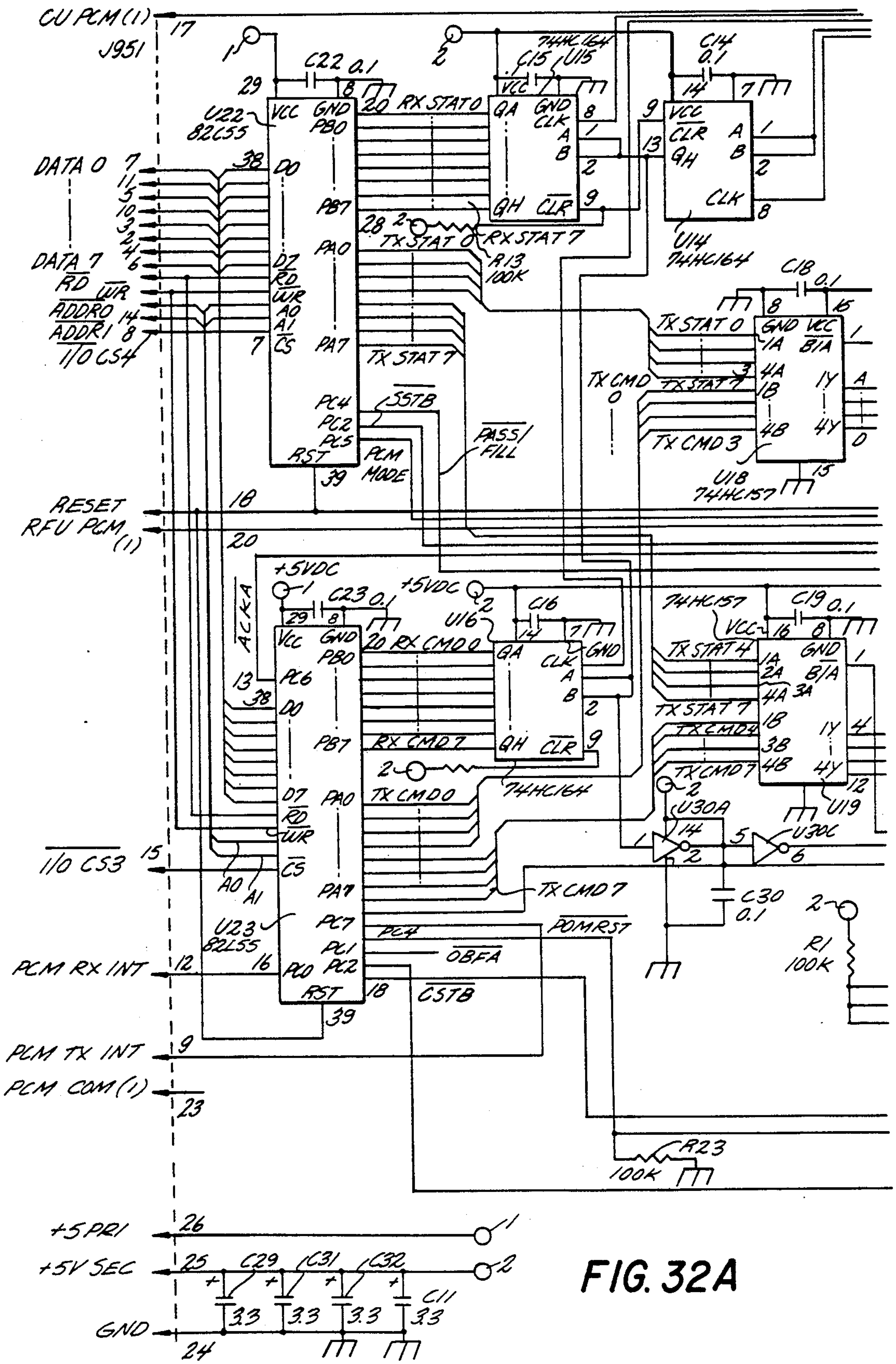
Figure 32C:
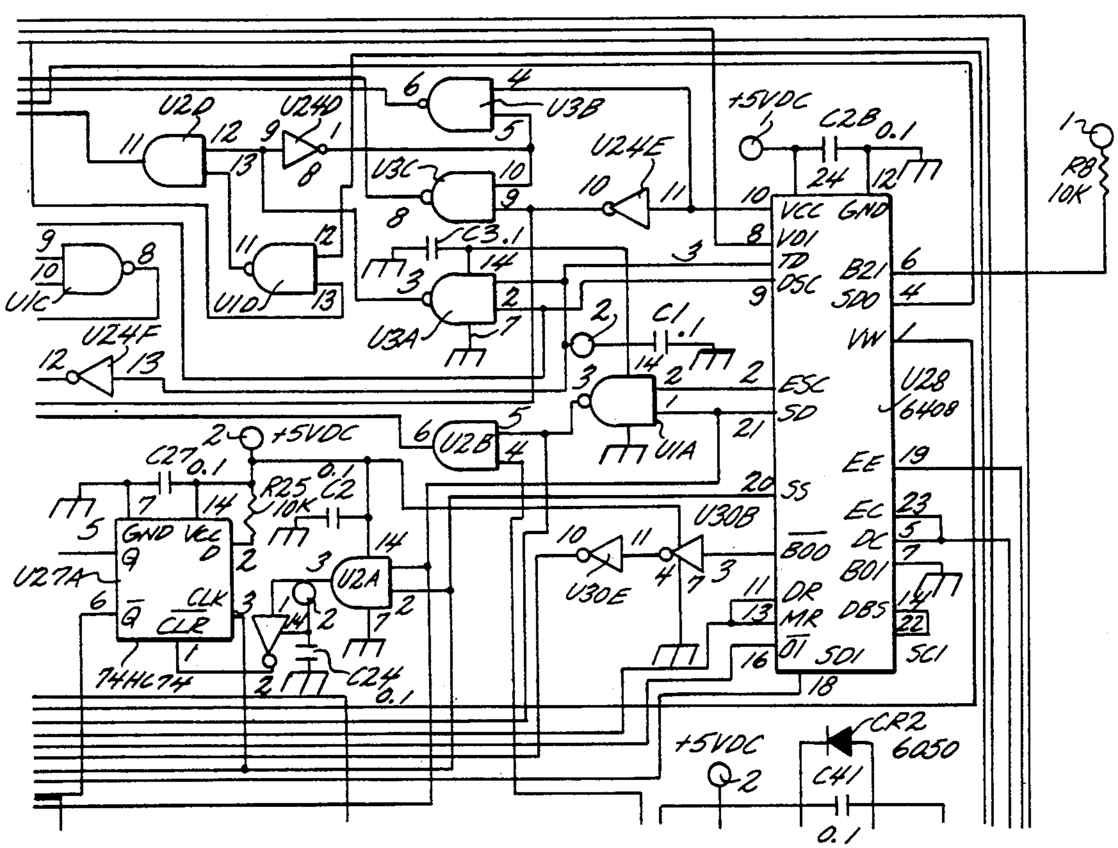
Figure 32D:
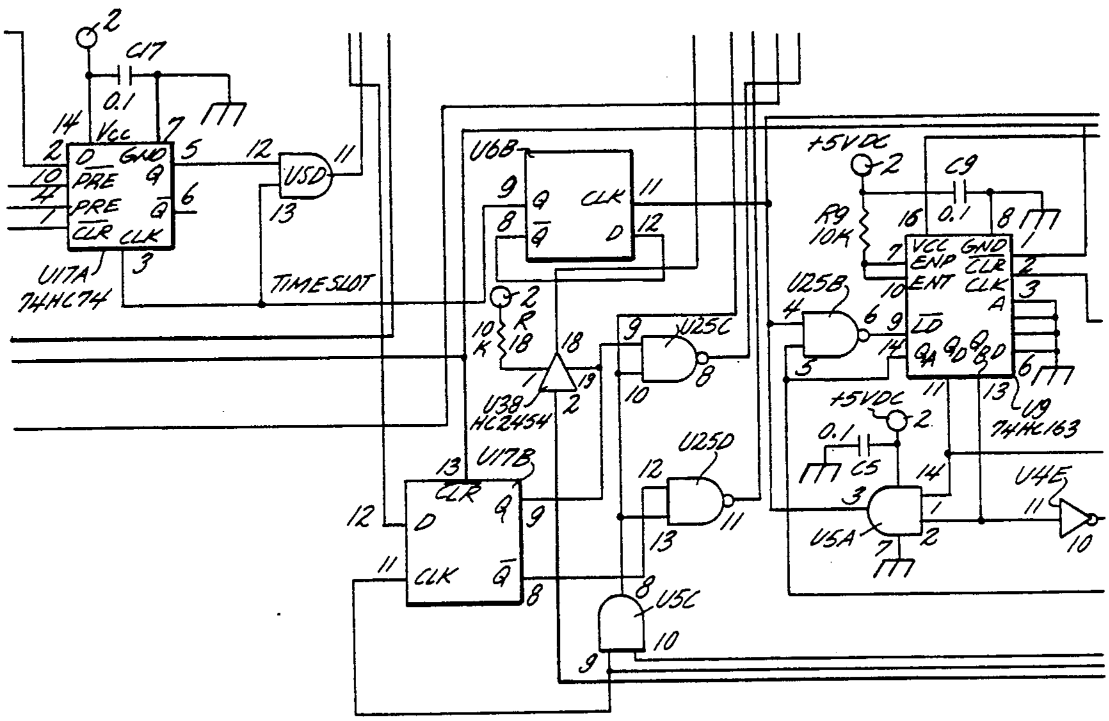
Figure 32D:
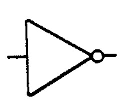
Figure 32D:
Figure 32D:
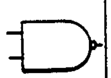
Figure 32E:
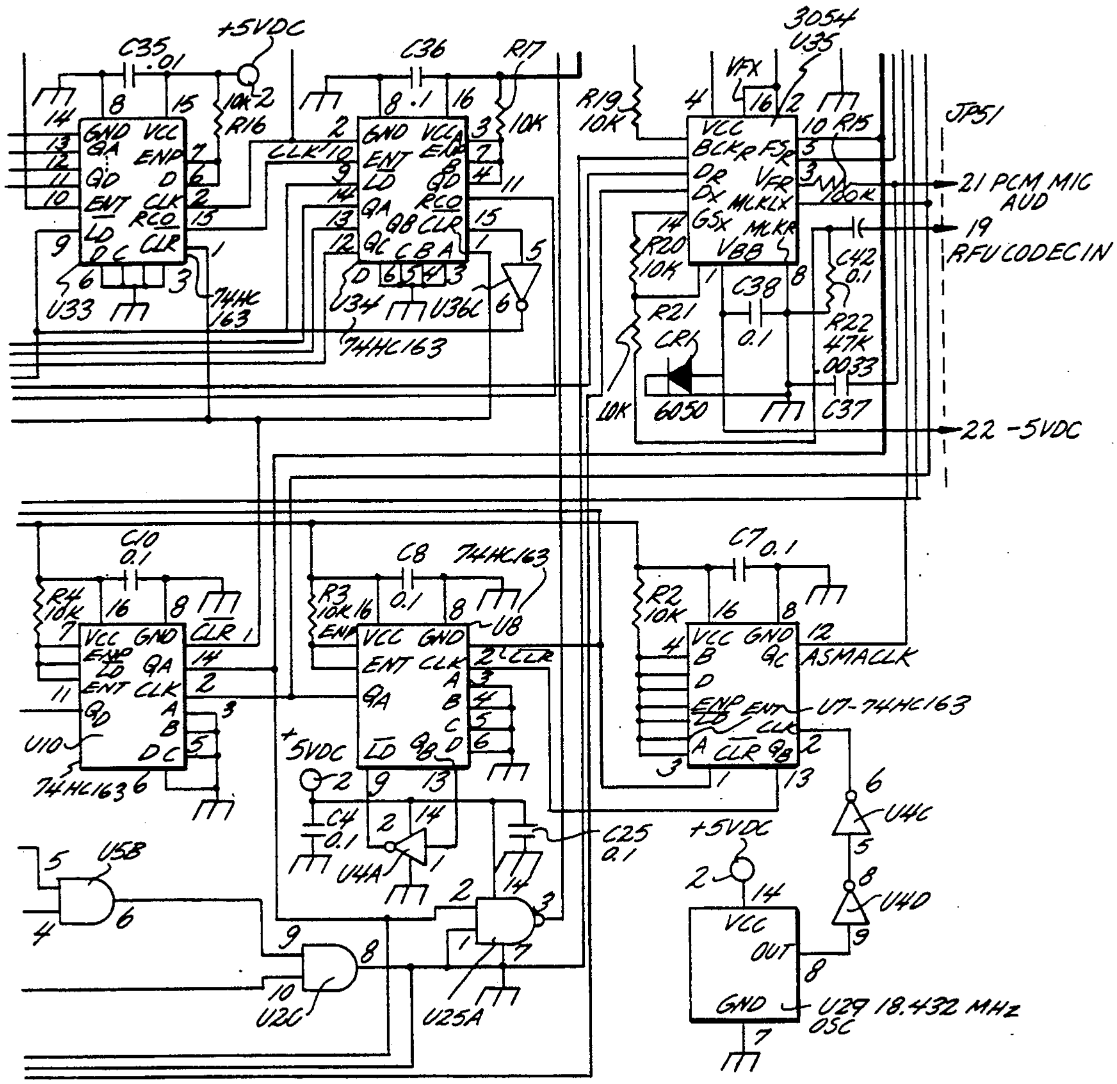
Figure 33A:
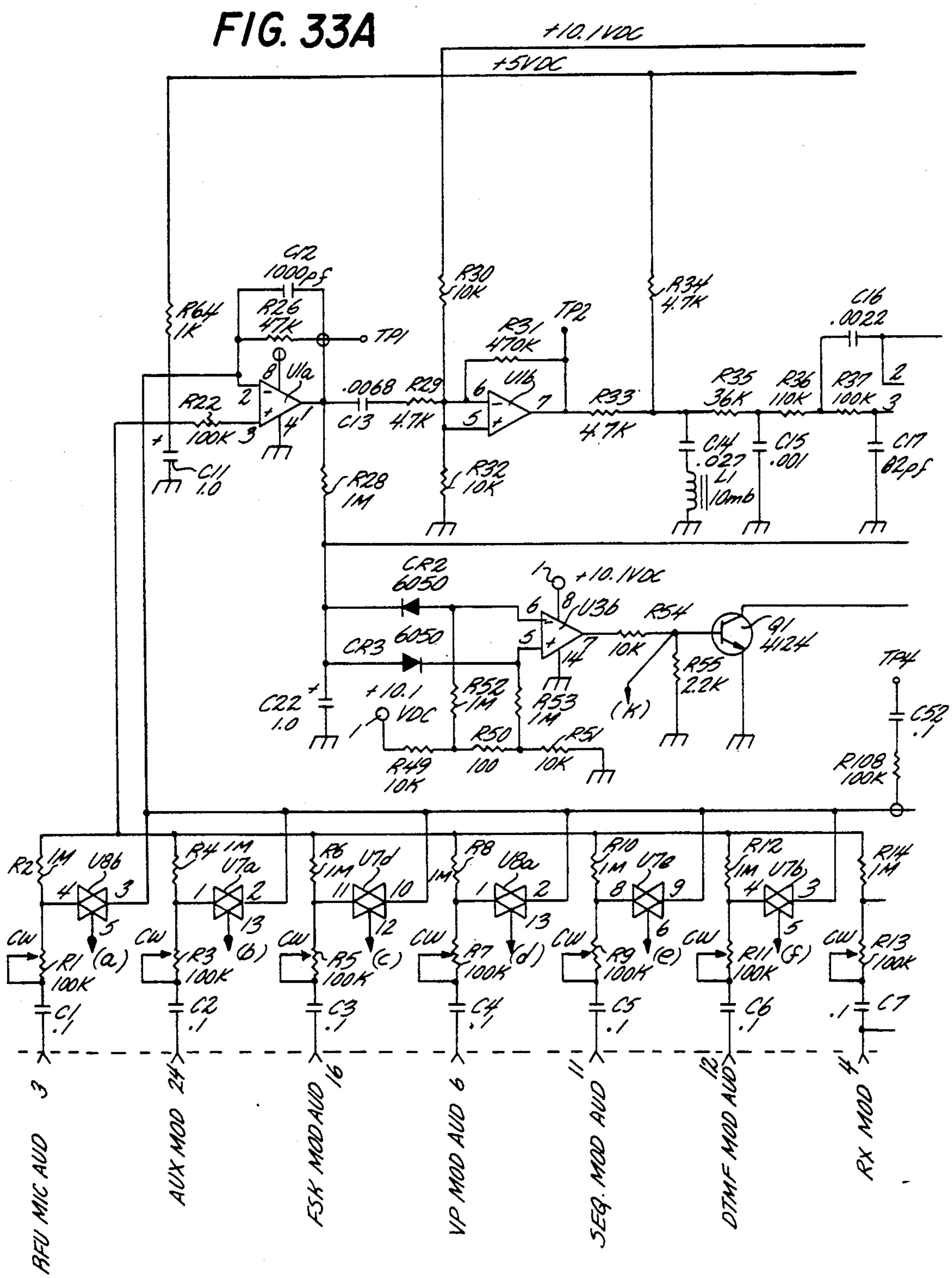
Figure 33B:
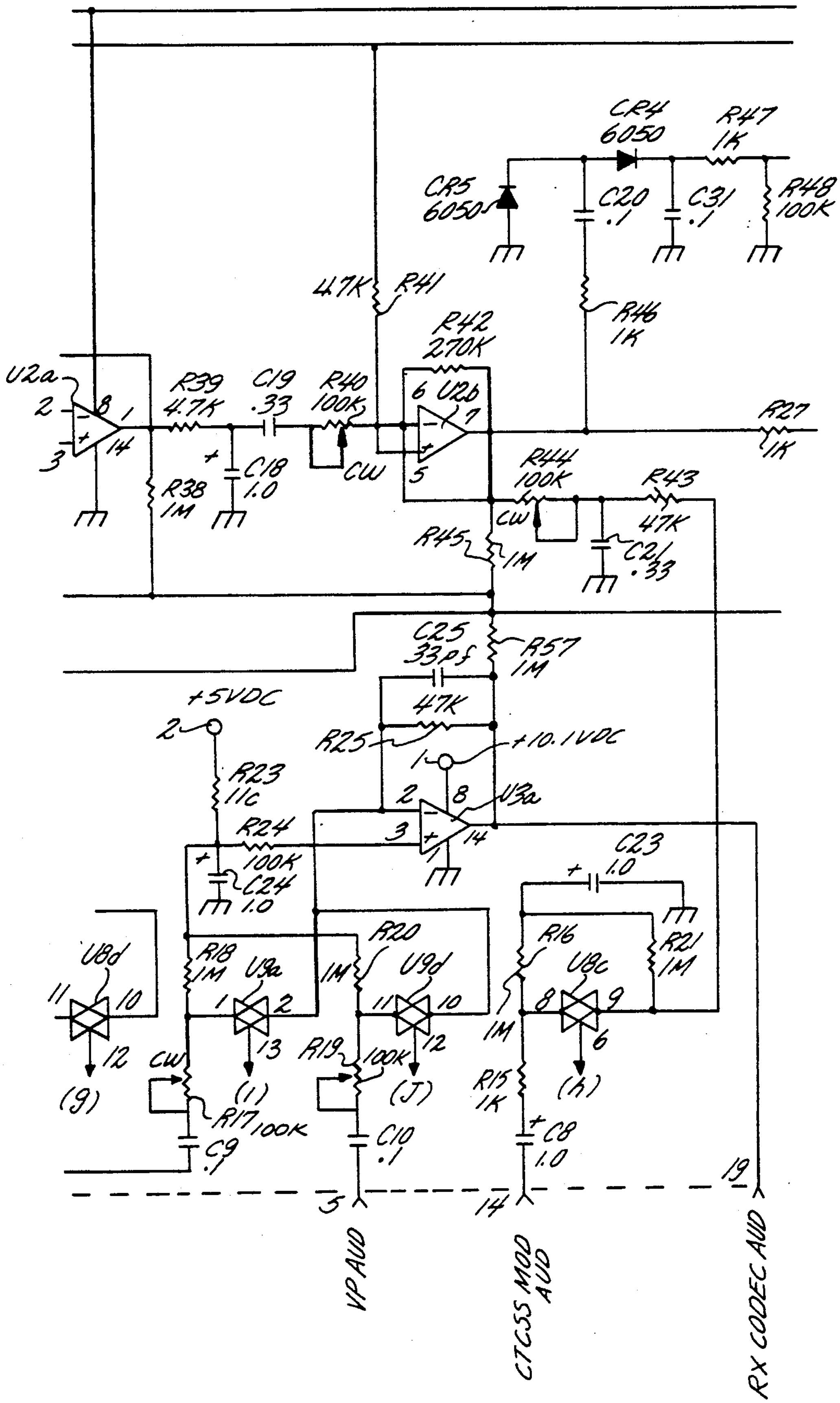
Figure 34:
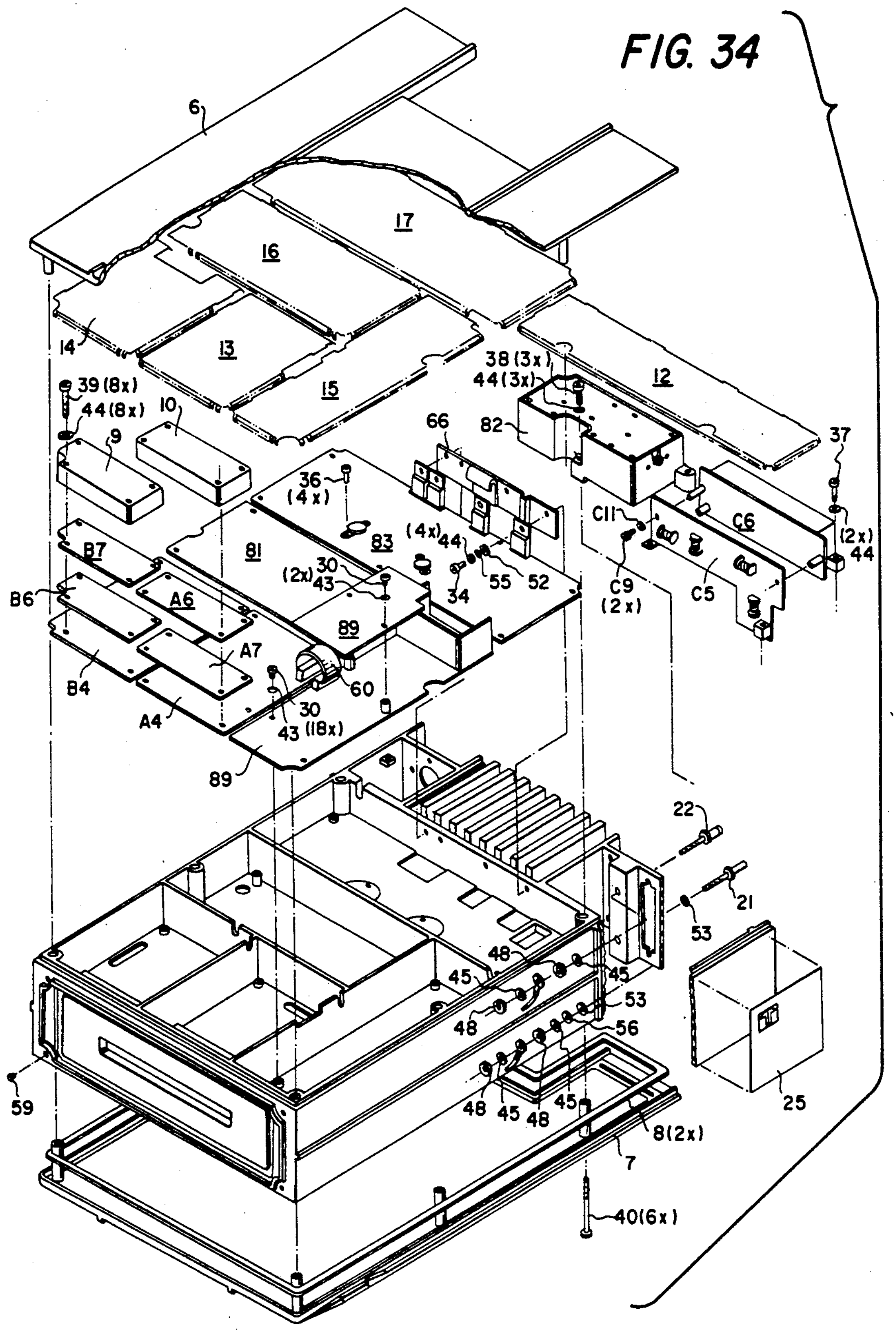
Figure 35A:
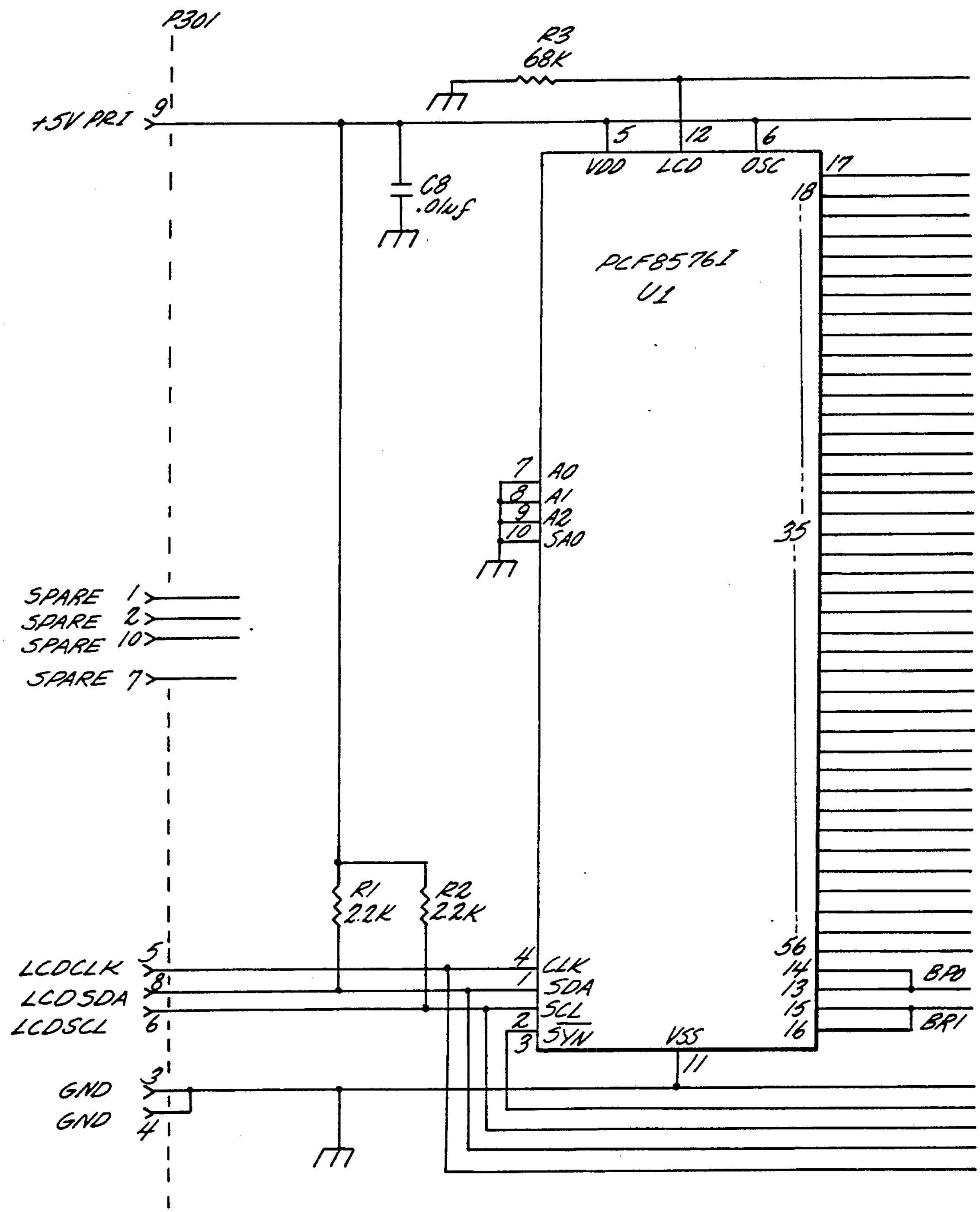
Figure 35B:
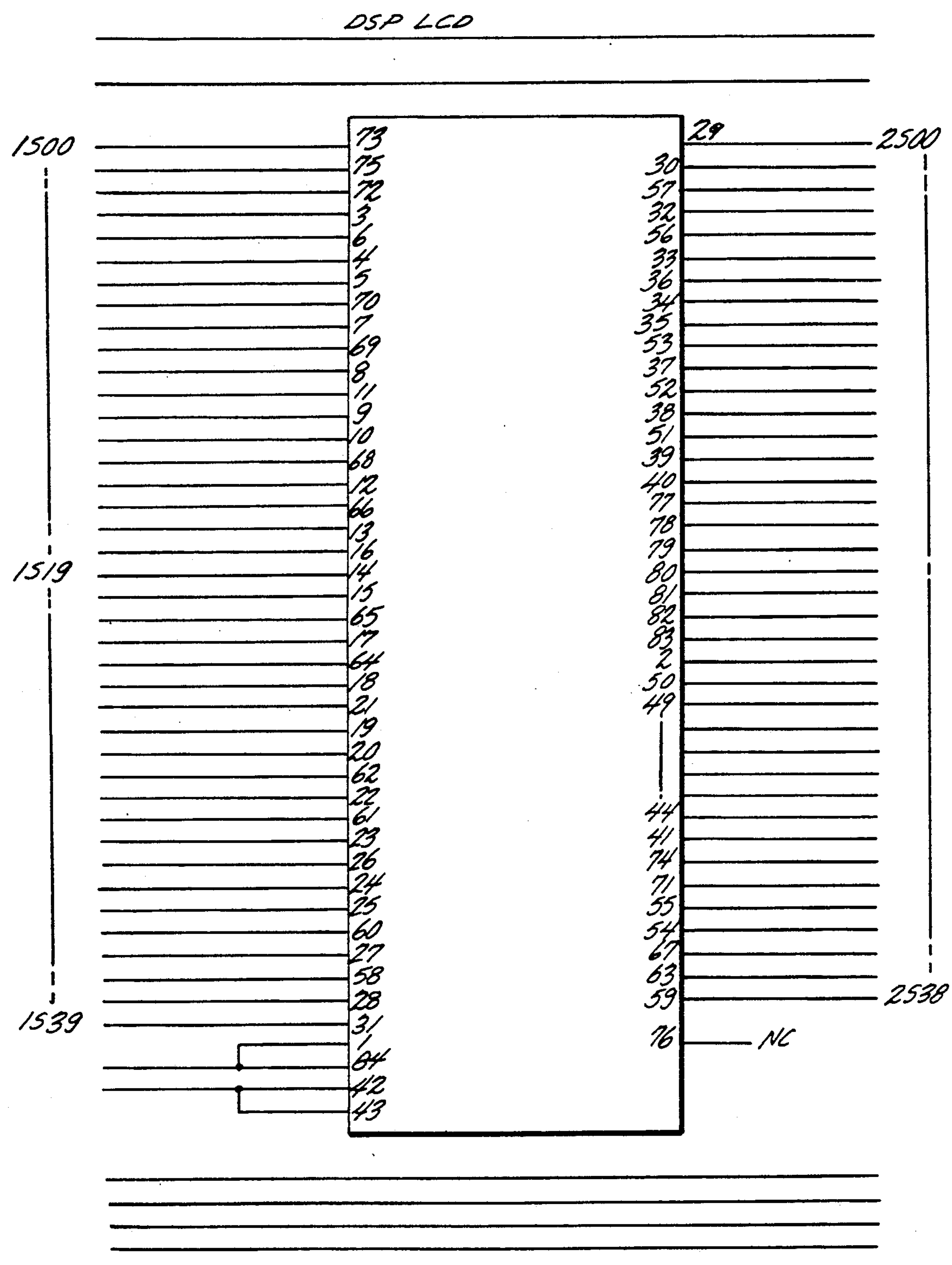
Figure 35C:
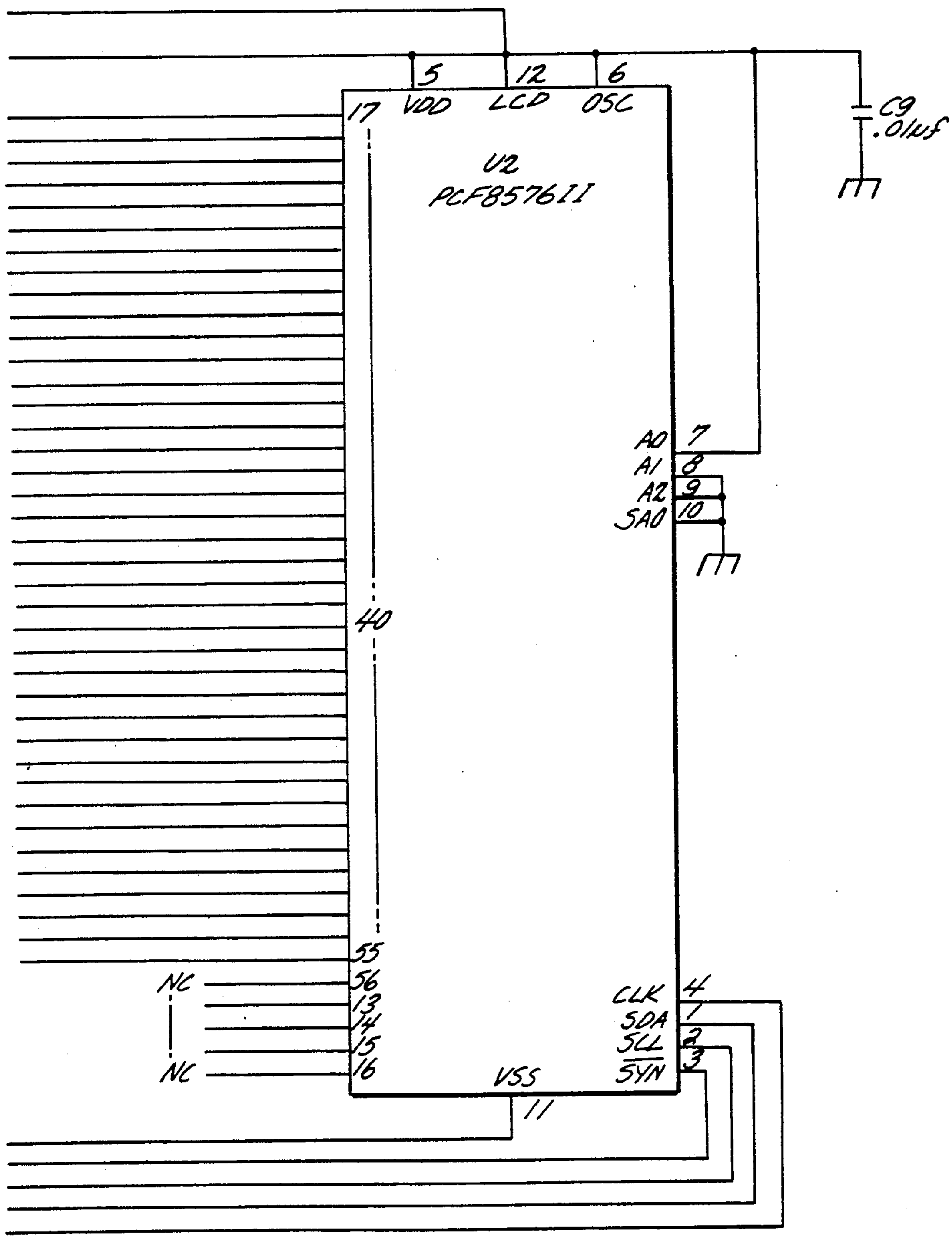
Figure 35:
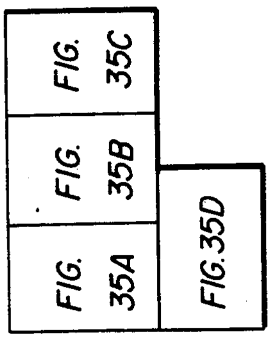
Figure 35D:
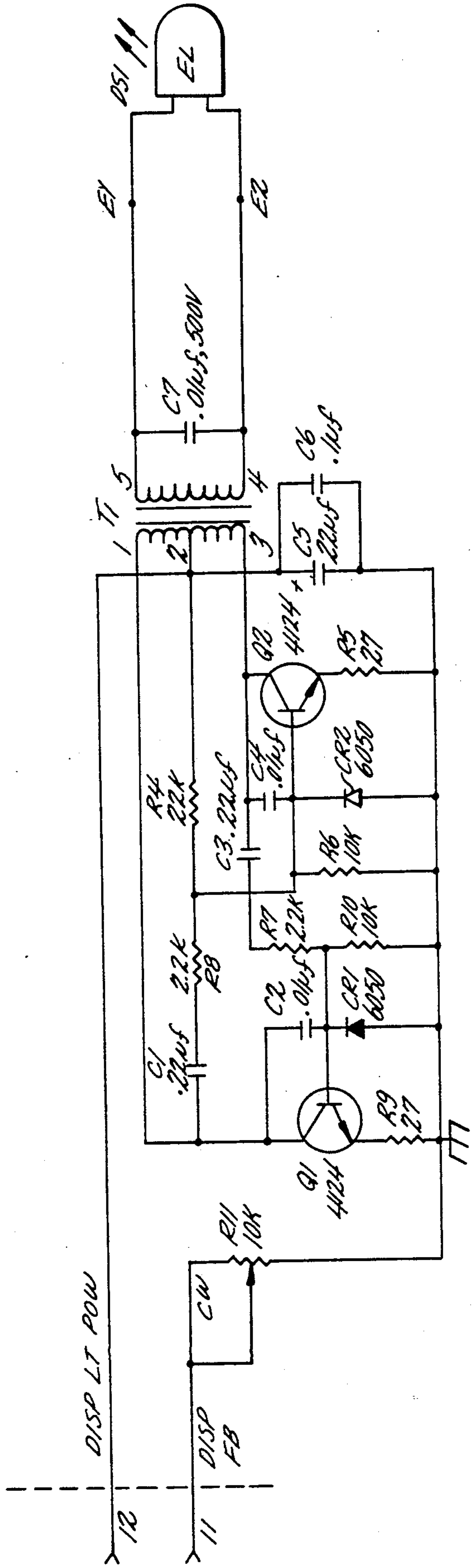

FIGS. 22 and 23 and Appendix items 1 through 4 are used to describe the different facets of the software of the novel mobile radio of the invention. The description that follows describes one approach to the software. Other approaches are possible and within the spirit and scope of this invention. Such other approaches may include other programming language and programming configurations. They are possible, among other things, because of the inherent versatility of modern microprocessors and the overall attributes of the system of the invention, such as the Serial Interface. The information here provided can be used for one skilled in the art to develop full software with the desired variations, derivatives, permutations, etc. that can be advantageously used with the system of the invention.

It must be clarified that 'software' here being described is the programming software of the microprocessor as opposed to the programming carried out by the user. Thus, the SOFTWARE shown in previous drawings in the Control Unit portion is actually a combination of the microprocessor programming that defines the general characteristics, overall infrastructure and general capabilities which are typically imparted to the radio before the user acquires it, plus the programming by the user (or for the user) that imparts the particular characteristics desired for the specific application, such as channel nomenclature versus frequencies, enable and disable of various functions, etc. within the predetermined infrastructure. As discussed earlier, the infrastructure itself can be changed for specific requirements providing a very powerful versatility.

The user alterable programming (as opposed to the 'resident' microprocessor programming to be here described) can be thought of as a capability whose characteristics are defined and designed in the 'resident' software of the microprocessor. Thus, the programming prompts, programming protocols that can be employed by the user, etc. are all defined and are part of the design of the software or programming that resides in the unit before the user acquires it.

The reference to software in the Transceiver Unit does not imply (or is not intended to imply) providing user programming. Rather, it is the programming of the microprocessor residing within the Transceiver Unit. The unique Digital Serial Interface portion of the system of the invention allows two-way communications between the microprocessors/softwares in the Control Unit and Transceiver Unit. It accommodates/tolerates both the user programming changes as well as microprocessor infrastructural modifications.

The approach of describing the software facets of the invention in conjunction with FIGS. 22 and 23 and APPENDIX I, ITEMS 1 through 7 will include the following:

(1) A general system overview that will cover the program development process, the tools and computers used in the development process and a high level discussion of the software architecture.

(2) System block diagrams (Ref. FIGS. 22 and 23) and explanations that will cover in more detail how the software works and which sub-modules support the major modules.

(3) Software module headers (Ref. APP. ITEMS 1 and 2) that are the actual headers used to identify and describe various modules of the software design for the front panel control system of the Control and Transceiver Units.

(4) Software code examples (Ref. APP. ITEM 3) that are actual assembly language listings of the primary modules used to support the front panel control system of the Control and Transceiver Units.

(5) Software module headers (Ref. APP. ITEMS 4 and 5) that are the actual headers used to identify and describe various modules of the software design of the Digital Serial Interface Link of the Control and Transceiver Units.

(6) Software code examples (Ref. APP. ITEM. 6) that are actual assembly language listings of the primary modules used to support the Digital Serial Interface Links of the Control and Transceiver Units.

(7) Software module headers and software code examples that are the actual headers and actual assembly language, respectively, of the entire system of the invention.

General Software System Overview: There are two interrelated computer programs in the Mobile Radio System; one program for the Control Unit and one program for the Transceiver Unit. Both programs use similar architectures to perform their different functions. The two programs communicate to each other over the bidirectional PCM communications link which the software controls. The Control Unit program basically handles management of the LCD display, front panel keyboard and radio database. The Transceiver Unit program basically handles controlling the various hardware modules in the Transceiver Unit based on the command information sent to it from the Control Unit program.

The preferred approach taken on this design was to use state driven software in order to reduce complexity and to make the software easy to modify and test. The basic concept is to have an interrupt function that updates a system state table in memory based on changes in the system. State change flags are used to show that a particular state variable has changed. There will be a circular executive module that will monitor the state change flags and will execute the appropriate module to perform any action that the state change requires. The combination of state driven modules with a circular exec allows for a straight forward implementation of a multitasking software system. All basic functions of the radio will be handled this way. This includes the Control Unit updates as well as Transceiver module update functions.

Software Development Process: The software development process used was "top down design". This process is a standard software technique used to develop code from the general requirements or top level downward toward the specific implementation. The software development process included several major phases.

The first phase was the requirements definition phase. During this phase all requirements for the software were identified and documented. The second phase was the design phase. The first step of the design phase was to examine the software requirements and define the basic system architecture needed to meet the requirements. After the basic architecture was defined the next step was to complete the high level design of the software modules shown in the basic architecture. The next step was to complete program development language (PDL) or pseudo code for each of the modules. After the PDL was complete the source code for each module was written and each module was assembled. After many modules were coded and assembled the individual modules were linked together to form one large program. Once the modules were linked together then the debug phase took place.

To debug the code two methods were used. In one method a software simulator was used in the development environment to run the code. This process simulates execution of each instruction of the program in a controlled situation to allow analysis by the programmer. The second method of debug was the use of an in target system under control of the emulator. In both methods of debug, basic operation of the code along with overall program flow is verified.

The last phase in the development was testing. In this phase correct interaction of the program with the hardware was verified. This was accomplished by using oscilloscopes, logic analyzers and RF signal generators on the target system to verify each of the requirements defined in the first stage of development.

Computers and Development Tools: MS-DOS compatible microcomputers were used as the development environment to run the cross assembler, the editors, the simulator and the emulator. The programming language used was Intel 8051 Assembly Language. The following text editors were used for source code development: Wordstar Professional, IBM Professional Editor 11, UnderWare Inc. Brief Editing Facility and Custom Software Systems PC/VI. The assembler and linker used for program development was the Microtec Research Paragon ASM51 Cross Assembler and Linker. The software simulator used was the Avocet AVSIM 8051. The in circuit emulator (ICE) used to debug the code was the Metalink MetaICE-32.

Software Design Description: The system block diagrams and explanations will cover in more detail how the software works and which sub-modules support the major modules.

Control Unit Program: The Control Unit Program is represented in FIG. 22 and is divided into several subprograms as shown in the diagram. The division is based on functionality and is accomplished in the program by using interrupt levels. The Control Unit interrupt structure is such that the executive module (CEXEC) is the foreground or non-interrupt level. The other subprograms have been allocated a dedicated interrupt. Each of these subprograms can interrupt the executive level. No interrupt routine may interrupt another except for the PCM communication interrupt (CINTZERO). The PCM communication interrupt may interrupt all other levels of the program.

Referring again to FIG. 22, the Control Unit Executive module (CEXEC) is the main controlling routine in the Control Unit Program. Structurally this module is circular in fashion. This means that once execution of this routine begins it will continue in an endless loop until power down occurs. While executing in the loop the routine will constantly check several state change flags to determine if an action is required. Should a flag indicate that a change in the system has occurred then the executive routine will execute the appropriate action routine. The following sub-modules support the Control Unit Executive routine:

| | | | |
|---|---|---|---|
| CALPHA | CANNUNC | CHEALTH | CBEEPER |
| CVUPDATE | CEEROMPG | CPCOMTX | CPCOMRX |
| CMODE | CCUPDATE | CEXSTATE | CSUPDATE |
| CCTCSSTX | CCTCSSRX | CPOWER | CPHONE |
| CPRIVACY | CAUX | CPA_ACT | CGRP_ACT |
| CTX_ACT | CPD_ACT | CCM_DISP | CSCN_CMD |
| CRVT_CMD | CCT_CMD | CDSP_SPR | CHEAL_CMD |
| CPCMRES | | | |

The Power Up Initialization module (CPWRUP) executes once for every power up reset to the system and performs most of the action required to prepare the Control Unit for operation. This includes performing diagnostics, initializing 1/0 ports, initializing the system state table, initializing the timers and starting the interrupts. Once initialization is complete, program control is passed to the Control Unit Executive routine. The following sub-modules support the power up initialization function:

| | | | |
|---|---|---|---|
| CEXTRAMT | CROMTST | SSYSRES | CLCDINIT |
| CINTRAMT | CCH_DISP | CMES_DIS | |

The PCM Communications Interrupt (CINTZERO) routine handles the transmitting and receiving of data to and from the Transceiver Unit. This routine must first determine the source of the interrupt (transmit or receive). Once the source is determined then data is either transmitted from a previously prepared buffer or received and stored in another buffer for later use by the Control Unit program. The data is transmitted and received in a specific message format that includes start of header, opcode, message checksum and data. Once a data transmission is initiated, one byte of data will be transmitted every 250 usec until all bytes have been transmitted. The following sub-modules support the PCM Communications Interrupt routine:

| | | |
|---|---|---|
| CINTZERO | CTX_CMD | CRX_CMD |

The Radio Function Interrupt (CRADIO) is a real-time timer interrupt used to monitor radio functions that require realtime response. This timer interrupt is generated once every 250 usec and is divided into four operational states. Each state handles different functions and the states are changed such that each function is processed once every 1 msec. Radio functions that are handled by this interrupt level are: microphone push to talk debounce, microphone hook switch debounce, audio and speaker control, transmit light control, busy light control, auxiliary function, and push to talk time-outs. The status of these radio functions are communicated to and from the Transceiver Unit by the PCM Single Bit Status Signals.

The RS-232 Communications Interrupt (CP2321NT) routine handles the transmitting and receiving of data through the microprocessor's onboard USART. This routine must first determine the source of the interrupt (transmit or receive). Once the source is determined then data is either transmitted from a previously prepared buffer or received and stored in another buffer for later use by the Control Unit program. The data is transmitted and received in a message format specific to the application of the USART. The USART can be used to program the radio's database, control the radio remotely or to interface external peripheral equipment.

The Keyboard and Power Interrupt module (CKEYINT) handles determining the source of interrupt and dispatch to the appropriate handler. Possible interrupt sources are a power button actuation, a power monitor alert or a front panel keyboard actuation. If either power interrupt occurs CKEYINT will request a power down of the system. The #EXEC module will handle the power down action request. If a front panel key has been actuated then CKEYINT will start the Keytimer and enable the Keytimer Interrupt.

The Keytimer Interrupt (CKEYTIME) routine handles debounce and dispatch of all front panel keyboard support routines. These routines form the primary control system for the OMNI Transceiver Radio System. During normal system operation there are no Keytimer interrupts until a key sequence is initiated. Once the first key of key sequence in initiated and CKEYINT has passed program control to the CKEYTIME module, then Keytimer interrupts will begin occurring on a regular basis to handle the key sequence. The Keytimer module and sub-modules handle each key sequence in a state driven manner such that each key in a sequence is a finite state. Each time the Keytimer interrupt occurs in a key sequence program, control will be vectored to a sub-module to handle the current state. This continues until the key sequence is completed. The following submodules support the Keytimer Interrupt routine:

| | | | |
|---|---|---|---|
| CKEYTIME | CKEYSCAN | CKEYCHEK | CKEYCODE |
| COTHERS | CSEQ | CFINAL | |
| CCANCEL | CCH_VAL | CGROUP | CIR_VOL |
| CIR_SQ | CIR_CH | CMESSAGE | CSET_PA |
| CSET_PWR | CSET_MES | CSET | CSITE |
| CSQ_VAL | CSELECT | | |

The Transceiver Unit Program is illustrated in FIG. 23. It is divided into several subprograms as shown in the diagram. The division is based on functionality and is accomplished in the program by using interrupt levels. The Transceiver Unit interrupt structure is such that the executive module (REXEC) is the foreground or non-interrupt level. The other subprograms have been allocated a dedicated interrupt. EAch of these subprograms can interrupt the executive level. No interrupt routine may interrupt another except for the PCM communication interrupt (RPCMINT). The PCM communication interrupt may interrupt all other levels of the program.

The Transceiver Unit Executive module (REXEC) is the main controlling routine in the Transceiver Unit Program. Structurally, this module is circular in fashion. This means that once execution of this routine begins it will continue in an endless loop until power down occurs. While executing in the loop the routine will constantly check several state change flags to determine if an action is required. Should a flag indicate that a change in the system has occurred then the executive routine will execute the appropriate action routine. The following sub-modules support the Transceiver Unit Executive routine:

| | | | |
|---|---|---|---|
| REXEC | RRXSYN | RTXSYN | RCTCSSRX |
| RCTCSSTX | RPOWER | RAUD_ACT | RUNMUTE |
| REXSTATE | RTX_SEQ | RSCAN | RPD_ACT |
| RMODE | RRFSNSQ | R_DISPAT | RPCMERS |

The Power Up Initialization module (RPWRUP) executes once for every power up reset to the system and performs most of the action required to prepare the Transceiver Unit for operation. This includes performing diagnostics, initializing I/O ports, initializing the system state table, initializing the timers and starting the interrupts. Once initialization is complete, program control is passed to the Transceiver Unit Executive routine. The following submodules support the power up initialization function:

| | | | |
|---|---|---|---|
| RPWRUP | RINTRAMT | REXTRAMT | RROMTEST |

The Radio Function Interrupt (RRADIO) is a realtime timer interrupt used to monitor radio functions that require realtime response. This timer interrupt is generated once every 1 msec. Radio functions that are handled by this interrupt level are: audio and speaker control, PTT functions, the busy function, and push to talk timeouts. The status of these radio functions is communicated to and from the Control Unit by the PCM Single Bit Status Signals.

The Power Down Interrupt (RPWRDN) routine handles initiating a controlled power down of the Transceiver Unit should the Power Monitor Interrupt become active. If the Power Monitor Interrupt occurs, RPWRDN will request a power down of the system. The R[XEC module will handle power down action request.

The PCM Communications Interrupt (RPCMINT) routine handles the transmitting and receiving of data to and from the Control Unit. This routine must first determine the source of the interrupt (transmit or receive). Once the source is determined then data is either transmitted from a previously prepared buffer or received and stored in another buffer for later use by the Transceiver Unit program. The data is transmitted and received in a specific message format that includes start of header, opcode, message checksum and data. Once a data transmission is initiated, one byte of data will be transmitted every 250 usec until all bytes have been transmitted. The following sub-modules support the PCM Communications Interrupt routine:

| |
|---|
| RPCMINT |
| RTX_CMD |
| RRX_CMD |

Software Code Examples: The software code examples are the actual assembly language listings of the primary modules used to support the front panel control system. The modules included are listed below:

| | | | |
|---|---|---|---|
| CKEYTIME | CKEYSCAN | CKEYCHEK | CKEYCODE |
| COTHERS | CSEQ | CFINAL | CKEYINT |
| CCANCEL | CCH_VAL | CGROUP | CIR_COL |
| CIR_SQ | CIR_CH | CMESSAGE | CSET_PA |
| CSET_PWR | CSET_MES | CSET | CSITE |
| CSQ_VAL | CSELECT | | |

United States Patent Office

PTO - BOYERS, PA Duty Station

MISSING PAGE TEMPORARY NOTICE

PATENT # 5020135 FOR ISSUE DATE 5-28-1991

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 41, 42

Data Conversion Operation

Boyers, Pa

```
DESCRIPTION: This is module is the executive routine for the receive mode
             of the IQ-1000 Control Unit prototype. This routine will
             examine state flags and dispatch to control to the appropriate
             function update routines.

INPUTS: none

OUTPUTS: none

REGISTER USAGE: none

SUPPORT MODULES: VOLUPDATE - volume update function
                 ALPHAUPDATE - alphanumeric display update function
                 ANUNCUPDATE - anunciator display update function
                 CCUPDATE - channel update function
                 TXREFUPDATE - transmit synthesizer reference update function
                 SNSQUPDATE - user squelch update function
                 CTCSSUPDATE - ctcss update function
                 HEALTHCHECK - system health monitor function
                 POWERUPDATE - transmit power update function
                 PAUPDATE - public address update function
                 PRIUPDATE - privacy update function
                 MODEUPDATE - channeling mode update function
                 FONUPDATE - phone update function
                 AUXUPDATE - auxiliary update function
                 PRI_SCAN - channel scanning function
                 RXREFUPDATE - receiver reference frequency update function
                 TX_ACTION - handles RFU message responses.
                 CM_DISP - dispatches rfu message responses.
                 CAUX_ACT - handles auxiliary function action.
                 CGRP_ACT - handles group function action.
                 CPD_ACT - handles power down action.
                 CTCSSENCODE - updates ctcss transmit tone.
                 CSCN_CMD - handles scan status requests.

SIZE: 3AH

EXECUTION TIME:

PDL: DOLOOP
        IF (VOLFG=1)
        THEN execute volume update function
        IF (ALPHAFG=1)
        THEN execute alphanumeric update function
        IF (ANUNCFG=1)
        THEN execute anunciator update function
        IF (MOD_FLAG=1)
        THEN channeling mode update function
        IF (CHANFG=1)
        THEN execute channel update function
        IF (SNSQFG=1)
        THEN execute user squelch update function
        IF (CTCSSRXFG=1)
        THEN execute ctcss receive update function
        IF (CTCSSTXFG=1)
        THEN execute ctcss transmit update function
        IF (PA_FLAG=1)
        THEN public address update function
        IF (PRI_FLAG=1)
        THEN privacy update function
        IF (AUX_FLAG=1)
        THEN auxiliary update function
        IF (FON_FLAG=1)
        THEN phone update function
        IF (AUX_ACT_FG=1)
        THEN execute auxiliary action function
        IF (GRP_ACT_FG=1)
        THEN execute group action function
        IF (TX_EMPTY=1)
        THEN execute transmit action function
        IF (DISPATCH_FG=1)
        THEN execute message dispatch function
        IF (PWR_DN_FG=1)
        THEN execute power down function
        IF (SCN_STAT_FG=1)
        THEN execute scan status request function
        IF (HEALTH_FG=1)
        THEN execute health check command
        execute channel scanning function
        execute health monitor function
        IF (CHANGEMODE=1)
        THEN execute exec state transition routine
    ENDLOOP
```

```
MODULE NAME: CKEYINT
        (C) Copyright 1987 Teletec Corporation, U.S.A.
AUTHOR: Ming C. Hsu
CODE COMPLETE: 02/10/86
LAST MODIFICATION: 03/09/87
PERFORMED BY: Ming C. Hsu
TEST/DEBUG: 02/10/86

REVISION NUMBER: new

DESCRIPTION: Keyboard interrupt service routine.

INPUTS: none

OUTPUTS: key matrix data in KEY_BUFFER

REGISTERS USAGE: register bank 3, ACC, DPTR, PSW

SUPPORT MODULES: keyscan

SIZE: 4CH

EXECUTION TIME:

PDL:
        disable keytimer interrupt
        disable keyboard interrupt
        save register
        initialize key scan buffer
        perform key scan
        set up debounce timer
        EXIT
MODULE NAME: CKEYTIME

        (C) Copyright 1987 Teletec Corporation, U.S.A.

AUTHER: Ming Hsu
CODE COMPLETE: 01/20/86
LAST MODIFICATION: 03/09/87
PERFORMED BY: Ming Hsu
TEST/DEBUG: 02/05/86

REVISION NUMBER: new

DESCRIPTION: This module takes care of keyboard timer functions. This
             includes operator timeouts,key debounce and other keyboard
             timing.

INPUTS: NONE

OUTPUTS: NONE

REGISTERS USAGE: ACC, DPTR, PSW

SUPPORT MODULES: KEYSCAN - scans keyboard rows and columns.

SIZE: OF1H

EXECUTION TIME:

PDL:
        save register used
        prescaler function
                IF prescaler count not equal to 0
                   THEN set up 250 us timer
                        exit
                ENDIF
        beeper service routine
                IF beeper count = 0
                        THEN turn off beeper
                        ELSE decrease beeper count
                ENDIF
        power down and Tx mode check
                IF power down signal active
                        THEN perform power down function
                ENDIF
                IF in Tx mode
                        THEN display current channel number
                ENDIF
        keytimer prescaler
                wait 40 ms before go to keyboard scan routine
        perform keyboard scan
        IF release state
                THEN
                        IF no key pressed
                                THEN go to final state
```

```
                    ELSE wait until key release
            ENDIF
ENDIF
IF final state
        THEN check operator time out
        IF key debounced
                THEN go to key sequence
                ELSE wait for keys to be debounced
        ENDIF
ENDIF
perform illegal key function
perform valid key function
perform operator timeout check
        decrease operator time count
                IF timeout count = 0
                        THEN revert LCD dispaly to channel number
                ENDIF
performed final state function
        disable beeper
        reset key sequence starting address
        reset key matrix
        clear last key buffer
        enable keyboard interrupt
        restore registers
EXIT
MODULE NAME: CP232INT

        Copyright 1987  Teletec Corporation, U.S.A.

AUTHOR: Kevin A. Peterson
CODE COMPLETE:

LAST MODIFICATION: 2/2/87
PERFORMED BY: Kevin A. Peterson

TEST/DEBUG:

REVISION NUMBER: new

DESCRIPTION:  This module handles the low-level port communications for the
               radio programming mode via the RS232 port connector.  This
               module is executed after an interrupt (if enabled) on the RXD
               or TXD lines of the 8031. Interrupts are enabled by calls to
               CPTXBUF or CPTXEND.  This routine handles both RX and TX
               interrupts and flow control is set by the variable RXTXSTAT.
               Currently, the interrupts are limited to half-duplex operation
               only.  Data direction is controlled by RXTXSTAT.  All data
               received or transmitted will be in COMBUFF1 or COMBUFF2.  The
               destination buffer is selected by the RXBUFPNT or TXBUFPNT
               pointer before the serial port interrupt is enabled.  Flags are
               set and interrupts are disabled upon exit if the block
               transmission is complete.


INPUTS: Input data retrieved from COMBUFF1 or COMBUFF2,
         RXTXSTAT,RXBUFPNT,RXBUFCNT,TXBUFPNT,TXBUFCNT
         RX_SEL,TX_SEL,RXBUFFUL,TXBUFEMT,RXBUFEMT

OUTPUTS: Output data stored in COMBUFF1 or COMBUFF2,
          Modified RXTXSTAT

REGISTER USAGE: All registers used are saved  (DPTR,ACC,R1,R2,PSW)

SUPPORT MODULES: None

SIZE:

EXECUTION TIME:

PDL:
        IF1 RS232 interrupt occurs
            THEN
              IF2 RX interrupt and receive mode enabled
                  THEN store received byte in buffer
                  ELSE
                     IF3 TX interrupt and transmit mode enabled
                         THEN transmit byte from buffer
                         ELSE ignore interrupt
                ENDIF3
         ENDIF2
     ELSE do nothing
ENDIF1
```

```
MODULE NAME: CRADIO
       COPYRIGHT 1987 Teletec Corporation, U.S.A.
AUTHOR: Ming C. Hsu
CODE COMPLETE: 02/13/86
LAST MODIFICATION: 01/23/87
PERFORMED BY: Ming C. Hsu
TEST/DEBUG:

REVISION NUMBER: new

DESCRIPTION: This module will handle processing of the following realtime
             radio functions: audio squelch, microphone PTT, and busy lamp.
             These functions will processed once every 1 msec. Timer 1 will
             be used to provide the 1 msec interrupt. This module will also
             be responsible for handling the CHANGEMODE exec state change
             flag. This module will also perform a realtime health monitor
             function on all RFU modules.

INPUTS:

OUTPUTS: CHANGEMODE - exec state change flag.

REGISTER USAGE: A, DPTR, R2, R3, R4

SUPPORT MODULES: none

SIZE:

EXECUTION TIME:

PDL:    IF (unit is in receive mode)
           IF (channel is busy AND ctcss tone valid is active)
               turn on busy lamp
               set busy state flag active
           ELSE
               turn off busy lamp
               clear busy flag
           ENDIF
        ENDIF

        IF (unit is in receive mode)
           IF (busy flag is not active)
              check mic ptt
              IF (mic ptt is active)
                 set exec mode state change flag
              ENDIF
            ENDIF
        ELSE (unit is in transmit mode)
           check mic ptt
           IF (mic ptt is not active)
              set exec mode state change flag
           ENDIF
        ENDIF
        IF (unit is in receive mode)
           IF (receiver has broken squelch AND ctcss tone valid is active)
              enable audio
           ELSE
              disable audio
           ENDIF
        ENDIF
        EXIT
MODULE NAME: CINTZERO

CODE COMPLETE: 05/08/86
LAST MODIFICATION: 09/08/86
TEST/DEBUG:

REVISION NUMBER: new

DESCRIPTION: This module performs a dispatch function for the external
             interrupt zero. Determination will be made as to whether
             interrupt occured due to a PCM transmit command and PCM receive
             command, and control will be passed to an appropriate handler.
             This module will handle termination of the interrupt once the
             handler completes processing.

INPUTS:

OUTPUTS:

REGISTER USAGE: A, DPTR

SUPPORT MODULES: RX_COMMAND - pcm receive data handler.
                 TX_COMMAND - pcm transmit data handler.

SIZE:
```

EXECUTION TIME:

```
PDL: save working registers on the stack
     read interrupt status port
     IF (interrupt was a pcm receive interrupt)
        execute pcm receive message handler
     ELSE (interrupt was a pcm transmit interrupt)
        execute pcm transmit message handler
     ENDIF
     restore working registers from stack
     EXIT
```

MODULE NAME: CPWRUP
(C) Copyright 1987 Teletec Corporation, U.S.A.
AUTHOR: John Fussell
CODE COMPLETE: 01/17/86
LAST MODIFICATION: 03/03/87
PERFORMED BY: Ming Hsu
TEST/DEBUG:

REVISION NUMBER: new

DESCRIPTION: This module will be executed in response to power being applied to the system. This module will be responsible for completing the following tasks: initialize ports, initialize system state variables, perform ram test,perform rom test, initialize LCD controllers, initialize timers, initialize system variables, and initialize interrupts.

INPUTS:

OUTPUTS:

REGISTER USAGE: A, DPTR, R0, R2, PSW, SCON, IE, IP, SP

SUPPORT MODULES: LCDINIT - performs LCD initialization
MESSLOADER - loads alphanumeric buffer with an ascii message
CH_DISP - updates ALPHAT based on CHANNEL state variable.
INTRAMTST - internal ram test.
EXTRAMTST - external ram test.
ROMTST - eprom checksum.
CSYS_RES - restore system parameter function.
CEXEC - control unit exec.

SIZE:

EXECUTION TIME:

```
PDL:    initialize internal registers
        execute internal ram test
        initialize stack
        execute external ram test
        execute rom test
        check health of RFU modules
        initialize 8255 I/O ports
        initialize 8031 I/O ports
        initialize system variables
        initialize buffers
        initialize system state table
        initialize LCD controllers
        initialize timers
        initialize interrupts
        END
```

MODULE NAME: REXEC
(C) Copyright 1987 Teletec Corporation, U.S.A.
AUTHOR: John Fussell
CODE COMPLETE: 01/21/86
LAST MODIFICATION: 02/19/87
PERFORMED BY: Ming Hsu
TEST/DEBUG:

REVISION NUMBER: new

DESCRIPTION: This is module is the executive routine for the receive mode of the single processor TRIO-1300 prototype. This routine will examine state flags and dispatch to control to the appropriate function update routines.

INPUTS: none

OUTPUTS: none

REGISTER USAGE: none

SUPPORT MODULES:
TXSYN - transmit synthesizer update function
RXSYN - receive synthesizer update function
RFSNSQ - user squelch update function CTCSSUPDATE - ctcss update function
RX2TX - RX mode to TX mode state transition routine
TXMODE - transmit mode exec function
POWERUPDATE - transmit power update function
MODEUPDATE - channeling mode update function
RSCAN - channel scanning function
PD_ACT - power down function
RAUD_ACT - audio control update function
CTCSSENCODE - ctcss transmit update function
RTX_SEQ - transmit sequential data function

SIZE: 3AH

EXECUTION TIME:

```
PDL: DOLOOP
        IF (RXSYNFG=1)
        THEN execute receive synthesizer update function
        IF (TXSYNFG=1)
        THEN execute transmit synthesizer update function
        IF (SNSQFG=1)
        THEN execute user squelch update function
        IF (CTCSSRXFG=1)
        THEN execute ctcss receive update function
        IF (PWR_FLAG=1)
        THEN execute transmit power update function
        IF (MOD_FLAG=1)
        THEN channeling mode update function
        IF (SCAN_ENABLE=1)
        THEN execute channel scanning function
        execute health monitor function
        IF (PWR_DN_FG=1)
        THEN execute power down function
        IF (AUD_ACT_FG=1)
        THEN execute audio control update function
        IF (TXSEQ_FG=1)
        THEN execute transmit sequential data function
        IF (CHANGEMODE=1)
        THEN execute exec state transition routine
        execute transmit mode exec function
     ENDLOOP
```

MODULE NAME: RPWRDN

CODE COMPLETE: 02/13/86
LAST MODIFICATION: 07/30/86
TEST/DEBUG:

REVISION NUMBER: new

DESCRIPTION: This module will be executed in response to actuation of the POWER monitor. This module will disable the transmitter, and turn off power to the radio.

INPUTS: none

OUTPUTS: none

REGISTER USAGE: A, DPTR, R2, R3, R6, R7, PSW

SUPPORT MODULES: RPD_ACT

SIZE:

EXECUTION TIME:

```
PDL:
            disable transmit synthesizer
            disable transmitter
            turn off power to system
            disable oscillator to cpu
            wait for power to die
         END
```

MODULE NAME: RPWRUP (C) Copyright 1987 Teletec Corporation. U.S.A.

AUTHOR: John Fussell
CODE COMPLETE: 01/17/86
LAST MODIFICATION: 02/19/87
PERFORMED BY: Ming Hsu
TEST/DEBUG:

REVISION NUMBER: new

DESCRIPTION: This module will be executed in response to power being applied to the system. This module will be responsible for completing the following tasks: initialize ports, initialize system state variables, perform ram test,perform rom test, initialize timers, initialize system variables, update TX and RX SYN reference frequencies, and initialize interrupts.

INPUTS: none

OUTPUTS: all RAM locations and ports are modified.

REGISTER USAGE: A, DPTR, R0, R2, PSW, SCON, IE, IP, SP

SUPPORT MODULES: INTRAMTST - internal ram test.
EXTRAMTST - external ram test.
ROMTST - eprom checksum.
REXEC - RF Unit executive routine.

SIZE:

EXECUTION TIME:

```
PDL:    initialize internal registers
        execute internal ram test
        initialize stack
        execute external ram test
        execute rom test
        check health of RFU modules
        initialize 8255 I/O ports
        initialize 8031 I/O ports
        initialize system variables
        initialize system state table
        initialize timers
        initialize interrupts
```

MODULE NAME: RRADIO

CODE COMPLETE: 02/13/86
LAST MODIFICATION: 12/30/86
TEST/DEBUG:

REVISION NUMBER: new

DESCRIPTION: This module will handle processing of the following realtime radio functions: PTT, COS2 and FOOTSW. These functions will processed once every 1 msec. Timer 1 will be used to provide the 1 msec interrupt. This module will also be responsible for handling the CHANGEMODE exec state change flag. This module will also perform a realtime health monitor function on all RFU modules.

INPUTS: TONE VALID - ctcss tone valid signal.
COMP PTT - control unit push to talk signal.
RECEIVER SNSQ - receiver signal to noise squelch signal.
MUTE2 - external audio mute signal.

OUTPUTS: CHANGEMODE - exec state change flag.
TXSTAT0-7 - PCM transmit status word.

REGISTER USAGE: A, DPTR

SUPPORT MODULES: none

SIZE:

EXECUTION TIME: 128 usec - RX best case (09/09/86)
169 usec - RX worst case
133 usec - TX best case
184 usec - TX worst case
193-195 usec - worst case (change mode)

```
PDL:    save registers used during interrupt

        process COMP PTT

        process FOOTSW

        process COS2

        build single bit status output

        IF (time to update health status)
           read health status from RFU modules
           IF (fault indication for 3 consecutive samples)
              set health status flag active
           ENDIF
        ENDIF
        restore register contents previously saved
        END
```

```
MODULE NAME: RPCMINT

CODE COMPLETE: 05/08/86
LAST MODIFICATION: 09/10/86
TEST/DEBUG:

REVISION NUMBER: new

DESCRIPTION: This module performs a dispatch function for the PCM
             interrupts. Determination will be made as to whether interrupt
             occured due to a PCM transmit command or PCM receive command
             condition and control will be passed to an appropriate handler.
             This module will handle termination of the interrupt once the
             handler completes processing.

INPUTS: none

OUTPUTS: none

REGISTER USAGE: A, DPTR

SUPPORT MODULES: RX_COMMAND - pcm receive data handler.
                 TX_COMMAND - pcm transmit data handler.

SIZE:

EXECUTION TIME: 32 usec - RX case
                34 usec - TX case

PDL: save working registers on the stack
     read interrupt status port
     IF (interrupt was a pcm receive interrupt)
        execute pcm receive message handler
     ELSE (interrupt was a pcm transmit interrupt)
        execute pcm transmit message handler
     ENDIF
     restore working registers from stack
     EXIT
```

```
                                 $XREF DEBUG TITLE(KEY BUFFER CHECK FUNCTION)
                                                 NAME    CKEY_CHEK
                                 ;*********************************************************************
                                 ;
                                 ;MODULE NAME: CKEY_CHEK
                                 ;        (C) Copyright 1987 Teletec Corporation, U.S.A.
                                 ;AUTHOR: Ming Hsu
                                 ;CODE COMPLETE: 01/20/86
                                 ;LAST MODIFICATION: 03/09/87
                                 ;TEST/DEBUG:
                                 ;
                                 ;REVISION NUMBER: NEW
                                 ;
                                 ;DESCRIPTION: This module checks to see is any key in the key buffer.
                                 ;
                                 ;INPUTS: KEY_OUTO,KEY_OUT1,KEY_OUT2
                                 ;
                                 ;OUTPUTS: A=KEYCODE( O= NO KEY )
                                 ;
                                 ;REGISTERS USAGE: ACC,RO,R1
                                 ;
                                 ;SUPPORT MODULES: NONE
                                 ;
                                 ;SIZE: OCH
                                 ;
                                 ;EXECUTION TIME:
                                 ;
                                 ;PDL:
                                 ;        get key buffer contents
                                 ;        IF key buffer not equal to 0
                                 ;                THEN exit
                                 ;                ELSE check next buffer location
                                 ;        ENDIF
                                 ;        end
                                 ;
                                 ;***************************************************************************
                                 CODESEG          SEGMENT CODE
                                                  RSEG    CODESEG
                                                  PUBLIC  KEY_CHECK
                                                  EXTRN   DATA(KEY_OUTO)
0000                             KEY_CHECK        EQU     $
0000   78 00          .E..                        MOV     RO,#KEY_OUTO
0002   79 03                                      MOV     R1,#3
                                 NEXT_KEYCK:
0004   E6                                         MOV     A,@RO
0005   76 00                                      MOV     @RO,#0                   ;clear the processed key
0007   70 03          .R..                        JNZ     EXIT_KEY
0009   08                                         INC     RO
000A   D9 FB          .R..                        DJNZ    R1,NEXT_KEYCK
                                 EXIT_KEY:
000C   22                                         RET
000D                                              END


Assembler Errors =      0
```

Cross Reference

| Label | Value | Reference | |
|---|---|---|---|
| EXIT_KEY:CODESEG | C 000C | 49 | -52 |
| KEY_CHECK:CODESEG | C 0000 | 40 | -43 |
| KEY_OUTO:DATA | E 1800 | 41 | 44 |
| NEXT_KEYCK:CODESEG | C 0004 | -46 | 51 |

```
$XREF DEBUG TITLE(KEYBOARD TIMER INTERRUPT HANDLER)
                NAME    CKEYTIME
;**********************************************************************
;
;MODULE NAME: CKEYTIME
;       (C) Copyright 1987 Teletec Corporation, U.S.A.
;AUTHER: Ming Hsu
;CODE COMPLETE: 01/20/86
;LAST MODIFICATION: 03/09/87
;PERFORMED BY: Ming Hsu
;TEST/DEBUG: 02/05/86
;
;REVISION NUMBER: new
;
;DESCRIPTION: This module takes care of keyboard timer functions. This
;              includes operator timeouts,keydebounce and other keyboard
;              timing.
;
;INPUTS: NONE
;
;OUTPUTS: NONE
;
;REGISTERS USAGE: ACC, DPTR, PSW
;
;SUPPORT MODULES: KEYSCAN - scans keyboard rows and columns.
;
;SIZE: OF1H
;
;EXECUTION TIME:
;
;PDL:
;       save register used
;       prescaler function
;               IF prescaler count not equal to 0
;                  THEN set up 250 us timer
;                       exit
;               ENDIF
;       beeper service routine
;               IF beeper count = 0
;                       THEN turn off beeper
;                       ELSE decrease beeper count
;               ENDIF
;       power down and TX mode check
;               IF power down signal active
;                       THEN performe power down function
;               ENDIF
;               IF in TX mode
;                       THEN display current channel number
;               ENDIF
;       keytimer prescaler
;               wait 40 ms before go to keyboard scan routine
```

ACTUAL PROGRAM CODE FOR KEYBOARD
TIMER INTERRUPT HANDLER (CKEYTIME)
WRITTEN IN ASSEMBLY LANGUAGE

APP. ITEM 4b (1)

```
                                ;       performe keyboard scan
                                ;       IF release state
                                ;               THEN
                                ;                       IF no key pressed
                                ;                               THEN go to final state
                                ;                               ELSE wait until key release
                                ;                       ENDIF
                                ;       ENDIF
                                ;       IF final state
                                ;               THEN check operator time out
                                ;               IF key debounced
                                ;                       THEN go to key sequence
                                ;                       ELSE wait for keys to be debounced
                                ;               ENDIF
                                ;       ENDIF
                                ;       performe illegal key function
                                ;       performe valid key function
                                ;       performe operator timeout check
                                ;               decrease operator time count
                                ;                       IF timeout count = 0
                                ;                               THEN revert LCD dispaly to channel number
                                ;                       ENDIF
                                ;       performed final state function
                                ;               disable beeper
                                ;               reset key sequence starting address
                                ;               reset key matrix
                                ;               clear last key buffer
                                ;               enable keyboard interrupt
                                ;               restore registers
                                ;       end
                                ;
                                ;**************************************************************************
                                CODESEG SEGMENT CODE
                                        RSEG    CODESEG
                                        PUBLIC  F_STATE,KEYTIMER,TIME10,SET_TIMER,INTRES
                                        PUBLIC  ILL_KEY,VALID_KEY
                                        PUBLIC  OP_CHECK
                                        EXTRN   CODE(KEYSCAN,KEY_START,PORT1B,PRESCALER10,Q_MSEC)
                                        EXTRN   CODE(CHDISP,CPWRDN,ILL_CNT,VALID_CNT)
                                        EXTRN   XDATA(ALPHAT,PORTOC,CHANNEL)
                                        EXTRN   DATA(BEEPER,CH_TEMP,LCD_POINTER,OPTIMER,TIMEOCNT)
                                        EXTRN   DATA(P_NEXTO,P_NEXT1)
                                        EXTRN   DATA(LAST_KEYO,LAST_KEY1,LAST_KEY2,PRE_COUNT)
                                        EXTRN   BIT(ALPHAFG,BEEPER_ON,FINAL,NO_BEEPER,NO_KEY,RELEASE)
                                        EXTRN   BIT(PWR_DN_FG,SAME_KEY,TXMODEFG,WAIT,SPKR_SOURCE)
                                        EXTRN   BIT(PBSTAT,NO_DISPLAY)
0000                            KEYTIMER        EQU     $                       ;entry point
0000   C0 D0          .D..                      PUSH    PSW                     ;save registers
0002   C0 E0          .D..                      PUSH    ACC
                                ;**************************************************************************
                                ;
                                ;       perform prescaler function
                                ;
                                ;**************************************************************************
0004   E5 00          .E..                      MOV     A,PRE_COUNT             ;prescaler count
0006   60 0E          .R..                      JZ      KT0000                  ;branch if prescaler= 0
0008   15 00          .E..                      DEC     PRE_COUNT               ;decrease prescaler count
000A   75 8A 00       .DE.                      MOV     TLO,#Q_MSEC             ;load 1/4 msec constant
```

```
000D  D2 8C      .B..          SETB    TRO                       ;enable timer
000F  D2 A9      .B..          SETB    ETO                       ;enable  timer interrupt
0011  D0 E0      .D..          POP     ACC
0013  D0 D0      .D..          POP     PSW
0015  32                       RETI
                          ;****************************************************************
                          ;
                          ;      keytimer function
                          ;
                          ;****************************************************************
                          KT0000:
0016  C0 82      .D..          PUSH    DPL                       ;save data pointer
0018  C0 83      .D..          PUSH    DPH
001A  D2 D4      .B..          SETB    RS1
001C  D2 D3      .B..          SETB    RS0                       ;select register bank 3
                                                                 ;-as working register for interrupt
001E  12 00 A6   ..C.          LCALL   INTRES                    ;release interrupt pending
0021  C2 8C      .B..          CLR     TRO                       ;disable timer
                          ;****************************************************************
                          ;*
                          ;* beeper service routine
                          ;*
                          ;****************************************************************
0023  E5 00      .E..          MOV     A,BEEPER                  ;get beeper duration
0025  70 04      .R..          JNZ     KEYTIMER20                ;branch if no beeper service needed
0027  C2 00      .E..          CLR     BEEPER_ON                 ;turn beeper off
0029  80 02      .R..          SJMP    KEYTIMER25
                          KEYTIMER20:
002B  15 00      .E..          DEC     BEEPER                    ;decrease beeper count
                          ;****************************************************************
                          ;*
                          ;* check power down and TX mode
                          ;*
                          ;****************************************************************
                          KEYTIMER25:
002D  90 00 00   ..E.          MOV     DPTR,#PORT1B              ;get 8255 port address
0030  E0                       MOVX    A,@DPTR                   ;read port
0031  20 00 03   .ER.          JB      PBSTAT,KEYTIMER27         ;branch if pbstat not active
0034  02 00 00   ..E.          LJMP    CPWRDN                    ;execute power down handler
                          KEYTIMER27:
0037  30 00 12   .ER.          JNB     TXMODEFG,KEYTIMER30       ;if not TX mode, go to normal sequence
003A  20 00 0F   .ER.          JB      SPKR_SOURCE,KEYTIMER30    ;branch if in PA2
003D  C2 00      .E..          CLR     WAIT                      ;clear wait state
003F  C2 00      .E..          CLR     FINAL                     ;clear final state
0041  90 00 00   ..E.          MOV     DPTR,#CHANNEL             ;prepare channel number
0044  E0                       MOVX    A,@DPTR                   ;get first digit
0045  F5 00      .E..          MOV     CH_TEMP,A                 ;move to channel temperory
0047  12 00 00   ..E.          LCALL   CHDISP                    ;display last channel number
004A  80 72      .R..          SJMP    F_STATE
                          ;****************************************************************
                          ;*
                          ;* key timer prescaler
                          ;*
                          ;****************************************************************
                          KEYTIMER30:
004C  E5 00      .E..          MOV     A,TIMEOCNT                ;get prescaler
004E  60 04      .R..          JZ      KEYTIMER40
0050  15 00      .E..          DEC     TIMEOCNT                  ;decrease prescaler
```

```
0052  80 3F      .R..                  SJMP    TIME10                           ;goto set up timer again
                         KEYTIMER40:
0054  12 00 00   ..E.                  LCALL   KEYSCAN                          ; scan key matrix
                         ;*****************************************************************************
                         ;*
                         ;* release state, wait for all keyes to be released
                         ;*
                         ;*****************************************************************************
0057  30 00 07   .ER.                  JNB     RELEASE,KEYTIMER50
005A  30 00 2A   .ER.                  JNB     NO_KEY,SET_TIMER
005D  C2 00      .E..                  CLR     RELEASE                          ;key released
005F  80 5D      .R..                  SJMP    F_STATE                          ;go to final state
                         KEYTIMER50:
0061  20 00 43   .ER.                  JB      FINAL,OP_CHECK                   ;final state check
0064  30 00 2C   .ER.                  JNB     SAME_KEY,TIME10                  ;if key still buncing then
                                                                                ;go to set up timer
                         ;*****************************************************************************
                         ;*
                         ;* go to next procedure
                         ;*
                         ;*****************************************************************************
0067  85 00 83   .ED.                  MOV     DPH,P_NEXT1                      ;get next procedure address
006A  85 00 82   .ED.                  MOV     DPL,P_NEXT0
006D  E4                               CLR     A
006E  73                               JMP     @A+DPTR                          ;jump to next procedure
                         ;*****************************************************************************
                         ;*
                         ;* illegal key
                         ;*
                         ;*****************************************************************************
006F                     ILL_KEY       EQU     $
006F  E5 00      .E..                  MOV     A,BEEPER                         ;set up illegal key beeper count
0071  24 00      .E..                  ADD     A,#ILL_CNT
0073  F5 00      .E..                  MOV     BEEPER,A
0075  C2 00      .E..                  CLR     NO_DISPLAY                       ;clear display priority flag
0077  75 00 00   .EE.                  MOV     P_NEXT0,#(LOW(KEY_START))        ;set up key board process
007A  75 00 00   .EE.                  MOV     P_NEXT1,#(HIGH(KEY_START))       ;from start
007D  D2 00      .E..                  SETB    RELEASE                          ;set release state, wait for
                                                                                ;-illegal key to be released
007F  80 06      .R..                  SJMP    SET_TIMER
                         ;*****************************************************************************
                         ;*
                         ;* valid key
                         ;*
                         ;*****************************************************************************
0081                     VALID_KEY     EQU     $
0081  E5 00      .E..                  MOV     A,BEEPER                         ;set up valid key beeper count
0083  24 00      .E..                  ADD     A,#VALID_CNT
0085  F5 00      .E..                  MOV     BEEPER,A
                         ;*****************************************************************************
                         ;*
                         ;* set up extra count before the timer interrupt can actully do the service
                         ;*
                         ;*****************************************************************************
0087                     SET_TIMER     EQU     $
0087  75 00 04   .E..                  MOV     TIMEOCNT,#4
                         ;*****************************************************************************
                         ;*
```

```
                              ;* if beeper count not equal zero, then turn on the beeper
                              ;*
                              ;************************************************************************
                              SET_TIMER10:
008A  E5 00       .E..                        MOV     A,BEEPER
008C  60 05       .R..                        JZ      TIME10
008E  20 00 02    .ER.                        JB      NO_BEEPER,TIME10           ;if beeper inhibit,don't turn it on
0091  D2 00       .E..                        SETB    BEEPER_ON                  ;turn beeper on
                              ;************************************************************************
                              ;*
                              ;* Key board still bouncing, set up debounce timer to scan key matrix again
                              ;*
                              ;************************************************************************
0093                          TIME10          EQU     $
0093  75 00 00    .EE.                        MOV     PRE_COUNT,#PRESCALER10     ;load 10 ms prescaler time constant
0096  75 8A 00    .DE.                        MOV     TLO,#Q_MSEC                ;load 1/4 msec time constant
0099  D2 8C       .B..                        SETB    TRO                        ;enable TIMERO
009B  D2 A9       .B..                        SETB    ETO                        ;enable TIMERO interrupt
                              ;************************************************************************
                              ;*
                              ;* exit from interrupt
                              ;*
                              ;************************************************************************
                              INT_EXIT:
009D  D0 83       .D..                        POP     DPH
009F  D0 82       .D..                        POP     DPL
00A1  D0 E0       .D..                        POP     ACC
00A3  D0 D0       .D..                        POP     PSW
00A5  22                                      RET
                              ;************************************************************************
                              ;*
                              ;* release interrupt
                              ;*
                              ;************************************************************************
                              INTRES:
00A6  32                                      RETI
                              ;************************************************************************
                              ;*
                              ;* operator's time out check
                              ;*
                              ;************************************************************************
00A7                          OP_CHECK        EQU     $
00A7  E5 00       .E..                        MOV     A,OPTIMER                  ;no key, check operator's
                                                                                 ;-time out
00A9  60 04       .R..                        JZ      OP_TIME_OUT
00AB  15 00       .E..                        DEC     OPTIMER                    ;decrease operator timer
00AD  80 DB       .R..                        SJMP    SET_TIMER
                              ;************************************************************************
                              ;
                              ;       operator time out
                              ;
                              ;************************************************************************
                              OP_TIME_OUT:
00AF  75 00 00    .EE.                        MOV     LCD_POINTER,#LOW(ALPHAT)   ;revert back LCD display
00B2  75 01 00    .EE.                        MOV     LCD_POINTER+1,#HIGH(ALPHAT)
00B5  D2 00       .E..                        SETB    ALPHAFG                    ;set LCD update flag
00B7  C2 00       .E..                        CLR     WAIT                       ;reset key sequence
00B9  C2 00       .E..                        CLR     NO_DISPLAY                 ;clear display priority flag
00BB  10 00 DF    .ER.                        JBC     FINAL,INT_EXIT
```

```
291                                 ;**********************************************************************
292                                 ;
293                                 ;  final state, set up next key sequence, pull key matrix high and enable
294                                 ;  keyboard interrupt
295                                 ;
296                                 ;**********************************************************************
297                                 F_STATE:
298  00BE  C2 00       .E..                  CLR     NO_DISPLAY                  ;clear display priority flag
299  00C0  E5 00       .E..                  MOV     A,BEEPER
300  00C2  70 C6       .R..                  JNZ     SET_TIMER10                 ;if beeper count not equal zero
                                                                                 ;-wait for another cycle
301
302  00C4  C2 00       .E..                  CLR     BEEPER_ON                   ;turn beeper off
303  00C6  10 00 06    .ER.                  JBC     WAIT,SKIP10                 ;if in wait( for next key ) state
                                                                                 ;-don't change next address
304
305  00C9  75 00 00    .EE.                  MOV     P_NEXT0,#(LOW(KEY_START))
306  00CC  75 00 00    .EE.                  MOV     P_NEXT1,#(HIGH(KEY_START))  ;initialize key sequence
307                                 SKIP10:
308  00CF  90 00 00    ..E.                  MOV     DPTR,#PORTOC                ;keyboard port address
309  00D2  E0                                MOVX    A,@DPTR                     ;get contents
310  00D3  54 F8                             ANL     A,#11111000B                ;mask off keyboard input
311  00D5  44 07                             ORL     A,#00000111B                ;pull all keyboard rows high
312  00D7  F0                                MOVX    @DPTR,A                     ;load to port
313  00D8  75 00 00    .E..                  MOV     LAST_KEY0,#0                ;clear last key
314  00DB  75 00 00    .E..                  MOV     LAST_KEY1,#0
315  00DE  75 00 00    .E..                  MOV     LAST_KEY2,#0
316  00E1  20 00 02    .ER.                  JB      PWR_DN_FG,KT9900            ;branch if in power down state
317  00E4  D2 A8       .B..                  SETB    EX0                         ;set keyboard interrupt enable
318                                 KT9900:
319  00E6  20 00 9E    .ER.                  JB      FINAL,SET_TIMER             ;if final state, set timer and keyboard
                                                                                 ;-interrupt both enable
320
321  00E9  D0 83       .D..                  POP     DPH
322  00EB  D0 82       .D..                  POP     DPL
323  00ED  D0 E0       .D..                  POP     ACC
324  00EF  D0 D0       .D..                  POP     PSW
325  00F1  22                                RET
326  00F2                                    END

Assembler Errors =      0
```

Cross Reference

| Label | Value | Reference | | | | | | | |
|---|---|---|---|---|---|---|---|---|---|
| ALPHAFG:BIT | E 2817 | 96 | 286 | | | | | | |
| ALPHAT:XDATA | E 1009 | 92 | 284 | 285 | | | | | |
| BEEPER:DATA | E 180C | 93 | 135 | 140 | 203 | 205 | 218 | 220 | 234 |
| | | 299 | | | | | | | |
| BEEPER_ON:BIT | E 2818 | 137 | 237 | 302 | | | | | |
| CHANNEL:XDATA | E 100B | 156 | | | | | | | |
| CHDISP:CODE | E 0805 | 91 | 159 | | | | | | |
| CH_TEMP:DATA | E 180D | 158 | | | | | | | |
| CPWRDN:CODE | E 0806 | 150 | | | | | | | |
| FINAL:BIT | E 2819 | 155 | 184 | 289 | 319 | | | | |
| F_STATE:CODESEG | C 00BE | 87 | 160 | 182 | -297 | | | | |
| ILL_CNT:CODE | E 0807 | 204 | | | | | | | |
| ILL_KEY:CODESEG | C 006F | 88 | -202 | | | | | | |
| INTRES:CODESEG | C 00A6 | 87 | 128 | -265 | | | | | |
| INT_EXIT:CODESEG | C 009D | -254 | 289 | | | | | | |
| KEYSCAN:CODE | E 0800 | 90 | 173 | | | | | | |
| KEYTIMER:CODESEG | C 0000 | 87 | -100 | | | | | | |

```
KEYTIMER20:CODESEG       C 002B    136  -139
KEYTIMER25:CODESEG       C 002D    138  -146
KEYTIMER27:CODESEG       C 0037    149  -151
KEYTIMER30:CODESEG       C 004C    152   153  -167
KEYTIMER40:CODESEG       C 0054    169  -172
KEYTIMER50:CODESEG       C 0061    179  -183
KEY_START:CODE           E 0801    207   208   305   306
KT0000:CODESEG           C 0016    109  -122
KT9900:CODESEG           C 00E6    316  -318
LAST_KEY0:DATA           E 1813     95   313
LAST_KEY1:DATA           E 1814    314
LAST_KEY2:DATA           E 1815    315
LCD_POINTER:DATA         E 180E    284   285
NO_BEEPER:BIT            E 281A    236
NO_DISPLAY:BIT           E 2823    206   288   298
NO_KEY:BIT               E 281B    180
OPTIMER:DATA             E 180F    273   276
OP_CHECK:CODESEG         C 00A7     89   184  -272
OP_TIME_OUT:CODESEG      C 00AF    275  -283
PBSTAT:BIT               E 2822     98   149
PORTOC:XDATA             E 100A    308
PORT1B:CODE              E 0802    147
PRESCALER10:CODE         E 0803    244
PRE_COUNT:DATA           E 1816    108   110   244
PWR_DN_FG:BIT            E 281D     97   316
P_NEXT0:DATA             E 1811     94   193   207   305
P_NEXT1:DATA             E 1812    192   208   306
Q_MSEC:CODE              E 0804    111   245
RELEASE:BIT              E 281C    179   181   209
SAME_KEY:BIT             E 281E    185
SET_TIMER:CODESEG        C 0087     87   180   211  -226   277   319
SET_TIMER10:CODESEG      C 008A   -233   300
SKIP10:CODESEG           C 00CF    303  -307
SPKR_SOURCE:BIT          E 2821    153
TIME0CNT:DATA            E 1810    168   170   227
TIME10:CODESEG           C 0093     87   171   185   235   236  -243
TXMODEFG:BIT             E 281F    152
VALID_CNT:CODE           E 0808    219
VALID_KEY:CODESEG        C 0081     88  -217
WAIT:BIT                 E 2820    154   287   303
```

```
$XREF DEBUG TITLE(KEYBOARD INTERRUPT HANDLER)
                    NAME    CKEYINT
;*******************************************************************************
;
;MODULE NAME: CKEYINT
;       (C) Copyright 1987 Teletec Corporation, U.S.A.
;
;AUTHOR: Ming C. Hsu
;CODE COMPLETE: 02/10/86
;LAST MODIFICATION: 03/09/87
;PERFORMED BY: Ming C. Hsu
;TEST/DEBUG: 02/10/86
;
;REVISION NUMBER: new
;
;DESCRIPTION: Keyboard interrupt service routine.
;
;INPUTS: none
;
```

```
                                   ;OUTPUTS: key matrix data in KEY_BUFFER
                                   ;
                                   ;REGISTERS USAGE: register bank 3, ACC, DPTR, PSW
                                   ;
                                   ;SUPPORT MODULES: keyscan
                                   ;
                                   ;SIZE: 4CH
                                   ;
                                   ;EXECUTION TIME:
                                   ;
                                   ;PDL:
                                   ;       disable keytimer interrupt
                                   ;       disable keyboard interrupt
                                   ;       save register
                                   ;       initialize key scan buffer
                                   ;       perform key scan
                                   ;       set up debounce timer
                                   ;       exit
                                   ;
                                   ;**************************************************************************
                                   CODESEG         SEGMENT CODE
                                                   RSEG    CODESEG
                                                   PUBLIC  KEYINT,KI9000
                                                   EXTRN   BIT(FINAL,RELEASE,WAIT,PBSTAT,POWER_MON,PWR_DN_FG)
                                                   EXTRN   BIT(SPKR_SOURCE,TXMODEFG)
                                                   EXTRN   DATA(KEY_BUFFER,PRE_COUNT)
                                                   EXTRN   CODE(KEYSCAN,PRESCALER10,Q_MSEC,CPWRDN,PORT1B,CSYS_SAV)
                                   ;*********************************************************************
                                   ;
                                   ;       INTERRUPT HOUSEKEEPING
                                   ;
                                   ;*********************************************************************
0000                               KEYINT          EQU     $                       ;entry point
0000   C0 D0          .D..                         PUSH    PSW                     ;save status
0002   C0 E0          .D..                         PUSH    ACC
0004   C0 82          .D..                         PUSH    DPL
0006   C0 83          .D..                         PUSH    DPH
0008   D2 D4          .B..                         SETB    RS1
000A   D2 D3          .B..                         SETB    RS0
                                   ;*********************************************************************
                                   ;
                                   ;       HANDLE INTERRUPT DISPATCH
                                   ;
                                   ;*********************************************************************
000C   90 00 00       ..E.                         MOV     DPTR,#PORT1B            ;get 8255 port address
000F   E0                                          MOVX    A,@DPTR                 ;read port
0010   20 00 03       .ER.                         JB      PBSTAT,KI1000           ;branch if pbstat not active
0013   02 00 00       ..E.                         LJMP    CPWRDN                  ;execute power down interrupt handler
                                   KI1000:
0016   20 00 09       .ER.                         JB      POWER_MON,KI2000        ;branch if power monitor interrupt not active
0019   D2 00          .E..                         SETB    PWR_DN_FG               ;set state flag active
001B   C2 A8          .B..                         CLR     EX0                     ;disable external interrupt 1
001D   12 00 00       ..E.                         LCALL   CSYS_SAV                ;execute system parameter save function
0020   80 22          .R..                         SJMP    KI9000                  ;branch to exit interrupt
                                   ;*********************************************************************
                                   ;
                                   ;       HANDLE KEYBOARD INTERRUPT
                                   ;
```

```
                           ;**********************************************************************
                           KI2000:
0022  30 00 03   .ER.                JNB    TXMODEFG,KI2010          ;exit interrupt if in transmit mode
0025  30 00 1C   .ER.                JNB    SPKR_SOURCE,KI9000       ;branch if not in PA2
                           KI2010:
0028  C2 8C      .B..                CLR    TR0                      ;disable key board timer
002A  C2 A8      .B..                CLR    EX0                      ;disable keyboard interrupt
002C  C2 00      .E..                CLR    FINAL                    ;clear final state
002E  A8 00      .E..                MOV    R0,KEY_BUFFER            ;initialize KEY_BUFFER
0030  79 04                          MOV    R1,#4                    ;total 4 bytes
0032  74 FF                          MOV    A,#0FFH
                           KI5000:
0034  F6                             MOV    @R0,A                    ;clear key matrix buffer
0035  D9 FD      .R..                DJNZ   R1,KI5000
0037  12 00 00   ..E.                LCALL  KEYSCAN                  ;go to scan the key matrixs
                            ;**********************************************************************
                            ;
                            ;       set up 10 ms debounce timer to scan the key matrix again
                            ;
                            ;**********************************************************************
                            KI7000:
003A  75 00 00   .EE.                MOV    PRE_COUNT,#PRESCALER10   ;load 10 ms prescaler time constant
003D  75 8A 00   .DE.                MOV    TL0,#Q_MSEC              ;load 1/4 msec time constant
0040  D2 8C      .B..                SETB   TR0                      ;enable timer
0042  D2 A9      .B..                SETB   ET0                      ;enable timer interrupt
                            ;**********************************************************************
                            ;
                            ;       RETURN FROM INTERRUPT
                            ;
                            ;**********************************************************************
                            KI9000:
0044  D0 83      .D..                POP    DPH
0046  D0 82      .D..                POP    DPL
0048  D0 E0      .D..                POP    ACC
004A  D0 D0      .D..                POP    PSW
004C  32                             RETI
004D                                 END

Assembler Errors =     0
```

Cross Reference

| Label | Value | Reference | | | |
|---|---|---|---|---|---|
| CPWRDN:CODE | E 080D | 68 | | | |
| CSYS_SAV:CODE | E 080F | 73 | | | |
| FINAL:BIT | E 2800 | 43 | 86 | | |
| KEYINT:CODESEG | C 0000 | 42 | -53 | | |
| KEYSCAN:CODE | E 080A | 46 | 93 | | |
| KEY_BUFFER:DATA | E 1808 | 45 | 87 | | |
| KI1000:CODESEG | C 0016 | 67 | -69 | | |
| KI2000:CODESEG | C 0022 | 70 | -80 | | |
| KI2010:CODESEG | C 0028 | 81 | -83 | | |
| KI5000:CODESEG | C 0034 | -90 | 92 | | |
| KI7000:CODESEG | C 003A | -100 | | | |
| KI9000:CODESEG | C 0044 | 42 | 74 | 82 | -110 |
| PBSTAT:BIT | E 2803 | 67 | | | |
| PORT1B:CODE | E 080E | 65 | | | |
| POWER_MON:BIT | E 2804 | 70 | | | |

```
PRESCALER10:CODE        E 080B    101
PRE_COUNT:DATA          E 1809    101
PWR_DN_FG:BIT           E 2805     71
Q_MSEC:CODE             E 080C    102
RELEASE:BIT             E 2801      0
SPKR_SOURCE:BIT         E 2806     44     82
TXMODEFG:BIT            E 2807     81
WAIT:BIT                E 2802      0
$XREF DEBUG TITLE(KEYBOARD SCANNING ROUTINE)
                NAME    CKEYSCAN
;************************************************************************
;
;MODULE NAME: CKEYSCAN
;       (C) Copyright 1987, Teletec Corporation, U.S.A.
;AUTHOR: Ming Hsu
;CODE COMPLETE: 01/18/86
;LAST MODIFICATION: 03/09/87
;PERFORMED BY: Ming Hsu
;TEST/DEBUG: 01/18/86
;
;REVISION NUMBER: new
;
;DESCRIPTION: This module scans the keyboard matrix, debounces and
;             outputs the valid keycode.
;
;INPUTS: none
;
;OUTPUTS: keycode(s)
;
;REGISTERS USAGE: A, DPTR, PSW, R0, R1, R2, R3, R4
;
;SUPPORT MODULES: KEYCODE - performs keyboard decode function.
;
;SIZE:
;
;EXECUTION TIME:
;
;PDL:
;       set one of the row to low
;       read key column input
;       compare current reading to last reading
;       IF (current reading not equal to last reading)
;          clear the flag
;          save the current reading to last reading
;       ENDIF
;       scan next row
;       EXIT
;
;************************************************************************
CODESEG         SEGMENT CODE
                RSEG    CODESEG
                PUBLIC  KEYSCAN
                EXTRN   CODE(KEYCODE)
                EXTRN   XDATA(PORTOA,PORTOC)
                EXTRN   DATA(KEY_BUFFER)
                EXTRN   DATA(KEYO,KEY_OUTO,KEY_OUT1,KEY_OUT2)
                EXTRN   BIT(SAME_KEY)
```

```
52  0000                       KEYSCAN     EQU    $                    ;entry point
53  0000  90 00 00   ..E.                  MOV    DPTR,#PORTOC         ;get row address
54  0003  E0                               MOVX   A,@DPTR
55  0004  54 F8                            ANL    A,#11111000B         ;keep upper 5 bits unchanged
56  0006  FA                               MOV    R2,A
57  0007  78 00      .E..                  MOV    R0,#KEY_BUFFER
58  0009  79 03                            MOV    R1,#3                ;3 rows
59  000B  7B 80                            MOV    R3,#10000000B        ;row 0 is low
60  000D  D2 00      .E..                  SETB   SAME_KEY
61                             KEY_LOOP:
62  000F  E6                               MOV    A,@R0                ;get last key reading
63  0010  F5 00      .E..                  MOV    KEY0,A               ;move last key reading to temporary location
64  0012  EB                               MOV    A,R3                 ;make row 0 low
65  0013  23                               RL     A
66  0014  FB                               MOV    R3,A
67  0015  54 07                            ANL    A,#07H               ;mask off 5 msbits
68  0017  4A                               ORL    A,R2
69  0018  F0                               MOVX   @DPTR,A
70  0019  15 82      .D..                  DEC    DPL
71  001B  15 82      .D..                  DEC    DPL                  ;get address of keyboard column inputs
72  001D  E0                               MOVX   A,@DPTR
73  001E  B5 00 02   .ER.                  CJNE   A,KEY0,NOT_SAME
74  0021  80 03      .R..                  SJMP   EQUAL
75                             NOT_SAME:
76  0023  F6                               MOV    @R0,A                ;save new key input
77  0024  C2 00      .E..                  CLR    SAME_KEY
78                             EQUAL:
79  0026  08                               INC    R0
80  0027  05 82      .D..                  INC    DPL
81  0029  05 82      .D..                  INC    DPL                  ;point to keyboard row outputs
82  002B  D9 E2      .R..                  DJNZ   R1,KEY_LOOP
83  002D  75 00 00   .E..                  MOV    KEY_OUT0,#0          ;initialize the KEYOUT
84  0030  75 00 00   .E..                  MOV    KEY_OUT1,#0
85  0033  75 00 00   .E..                  MOV    KEY_OUT2,#0
86  0036  30 00 03   .ER.                  JNB    SAME_KEY,NO_GET      ;key matrix debounced,go to get key code
87  0039  12 00 00   ..E.                  LCALL  KEYCODE
88                             NO_GET:
89  003C  22                               RET                         ;return to caller
90  003D                                   END

Assembler Errors =      0
```

Cross Reference

| Label | Value | Reference | | | |
|---|---|---|---|---|---|
| EQUAL:CODESEG | C 0026 | 74 | -78 | | |
| KEY0:DATA | E 1804 | 49 | 63 | 73 | |
| KEYCODE:CODE | E 0800 | 46 | 87 | | |
| KEYSCAN:CODESEG | C 0000 | 45 | -52 | | |
| KEY_BUFFER:DATA | E 1803 | 48 | 57 | | |
| KEY_LOOP:CODESEG | C 000F | -61 | 82 | | |
| KEY_OUT0:DATA | E 1805 | 83 | | | |
| KEY_OUT1:DATA | E 1806 | 84 | | | |
| KEY_OUT2:DATA | E 1807 | 85 | | | |
| NOT_SAME:CODESEG | C 0023 | 73 | -75 | | |
| NO_GET:CODESEG | C 003C | 86 | -88 | | |
| PORTOA:XDATA | E 1001 | 47 | | | |
| PORTOC:XDATA | E 1002 | 53 | | | |
| SAME_KEY:BIT | E 2808 | 50 | 60 | 77 | 86 |

```
$XREF DEBUG
        NAME    KEY SEQUENCE
;***********************************************************************
;
;MODULE NAME: KEY SEQUENCE
;       (C) Copyright 1987 Teletec Corporation, U.S.A.
;AUTHOR: Ming Hsu
;CODE COMPLETE: 01/22/86
;LAST MODIFICATION:03/09/87
;PERFORMED BY: Ming Hsu
;TEST/DEBUG:
;
;REVISION NUMBER: new
;
;DESCRIPTION: This module dispatch the keycode action.
;
;INPUTS: keycode
;
;OUTPUTS: brounching to corresponding address
;
;REGISTERS USAGE:    ACC, PSW
;
;SUPPORT MODULES:
;                 KEY_CHECK: get key code.
;                 F_STATE: final state
;                 ERR_DISP: display error message
;                 SECRET: secret code sequence
;
;SIZE:  68H
;
;EXECUTION TIME:
;
;PDL:
;       IF program mode
;               THEN
;                       performed secret function
;       ENDIF
;       get key code
;       IF no key
;               THEN go to final state
;       ENDIF
;       IF key release
;               THEN go to final state
;       ENDIF
;       IF in error mode
;               THEN go to error display
;       ENDIF
;       jump to key sequence
;       end
;
;*******************************************************************************
CODESEG         SEGMENT CODE
                PUBLIC  KEY_START
                EXTRN   CODE(ERR_DISP,SECRET)
                EXTRN   CODE(VOLUME_DOWN,VOLUME_UP)
                EXTRN   CODE(CHANNEL_DN,CHANNEL_UP)
                EXTRN   CODE(SQUELCH_DN,SQUELCH_UP)
                EXTRN   CODE(F_STATE,ILL_KEY,KEY_CHECK)
                EXTRN   CODE(SET KEY)
```

```
                                             EXTRN   CODE(MODE_KEY)
                                             EXTRN   CODE(CAN_KEY)
                                             EXTRN   BIT(ERROR_MODE,PROG_MODE)
                                             RSEG    CODESEG
                            ;*****************************************************************************
                            KEY_START:
0000  30 00 03     .ER.                      JNB     PROG_MODE,KEY_START5
0003  02 00 00     ..E.                      LJMP    SECRET
                            KEY_START5:
0006  12 00 00     ..E.                      CALL    KEY_CHECK
0009  70 03        .R..                      JNZ     KEY_START10
000B  02 00 00     ..E.                      LJMP    F_STATE
                            KEY_START10:
000E  76 00                                  MOV     @R0,#0
0010  30 E7 03     .BR.                      JNB     ACC.7,KEY_START20
0013  02 00 00     ..E.                      LJMP    F_STATE
                            KEY_START20:
0016  30 00 03     .ER.                      JNB     ERROR_MODE,KEY_START30
0019  02 00 00     ..E.                      LJMP    ERR_DISP                  ;error mode display
                            KEY_START30:
001C  90 00 20     ..C.                      MOV     DPTR,#J_TABLE
001F  73                                     JMP     @A+DPTR
                            J_TABLE:
0020  00                                     DB      0                         ;dummy location
0021  02 00 00     ..E.                      LJMP    VOLUME_DOWN               ;volume down
0024  02 00 00     ..E.                      LJMP    VOLUME_UP                 ;volume up
0027  02 00 00     ..E.                      LJMP    CHANNEL_DN                ;channel down
002A  02 00 00     ..E.                      LJMP    CHANNEL_UP                ;channel up
002D  02 00 00     ..E.                      LJMP    SQUELCH_DN                ;squelch down
0030  02 00 00     ..E.                      LJMP    SQUELCH_UP                ;squelch up
                            ;
0033  02 00 00     ..E.                      LJMP    MODE_KEY                  ;KEY_MODE
0036  02 00 00     ..E.                      LJMP    SET_KEY                   ;KEY_SET
0039  02 00 00     ..E.                      LJMP    CAN_KEY                   ;KEY_CAN
003C  02 00 00     ..E.                      LJMP    ILL_KEY                   ;KEY_FON
003F  02 00 00     ..E.                      LJMP    ILL_KEY                   ;KEY_SITE
0042  02 00 00     ..E.                      LJMP    ILL_KEY                   ;KEY_SEN
                            ;
0045  02 00 00     ..E.                      LJMP    ILL_KEY                   ;KEY_KBB
0048  02 00 00     ..E.                      LJMP    ILL_KEY                   ;KEY_KAA
                            ;
004B  02 00 00     ..E.                      LJMP    ILL_KEY                   ;KEY_PWR
004E  02 00 00     ..E.                      LJMP    ILL_KEY                   ;KEY_SQ
0051  02 00 00     ..E.                      LJMP    ILL_KEY                   ;KEY_GRP
0054  02 00 00     ..E.                      LJMP    ILL_KEY                   ;KEY_PA
0057  02 00 00     ..E.                      LJMP    ILL_KEY                   ;KEY_AUX
005A  02 00 00     ..E.                      LJMP    ILL_KEY                   ;KEY_COD
005D  02 00 00     ..E.                      LJMP    ILL_KEY                   ;KEY_MSG
                            ;
0060  02 00 00     ..E.                      LJMP    ILL_KEY                   ;KEY_CH
0063  02 00 00     ..E.                      LJMP    ILL_KEY                   ;KEY_SEL
0066  02 00 00     ..E.                      LJMP    ILL_KEY                   ;KEY_PRI
                            ;
0069                                         END

Assembler Errors =      0
```

```
                    Cross Reference

Label                  Value    Reference
CAN_KEY:CODE           E 080D     61    93
CHANNEL_DN:CODE        E 0804     56    86
CHANNEL_UP:CODE        E 0805     87
ERROR_MODE:BIT         E 280E     62    77
ERR_DISP:CODE          E 0800     54    78
F_STATE:CODE           E 0808     58    71    75
ILL_KEY:CODE           E 0809     94    95    96    98    99   101   102   103
                                 104   105   106   107   109   110   111
J_TABLE:CODESEG        C 0020     80   -82
KEY_CHECK:CODE         E 080A     69
KEY_START:CODESEG      C 0000     53   -65
KEY_START10:CODESEG    C 000E     70   -72
KEY_START20:CODESEG    C 0016     74   -76
KEY_START30:CODESEG    C 001C     77   -79
KEY_START5:CODESEG     C 0006     66   -68
MODE_KEY:CODE          E 080C     60    91
PROG_MODE:BIT          E 280F     66
SECRET:CODE            E 0801     67
SET_KEY:CODE           E 080B     59    92
SQUELCH_DN:CODE        E 0806     57    88
SQUELCH_UP:CODE        E 0807     89
VOLUME_DOWN:CODE       E 0802     55    84
VOLUME_UP:CODE         E 0803     85
```

```
$XREF DEBUG TITLE( FINAL KEY EXIT MODULE)
                NAME    CFINAL
;***********************************************************************
;
;MODULE NAME: CFINAL
;       (C) Copyright 1987 Teletec Corporation, U.S.A.
;AUTHOR: Ming Hsu
;CODE COMPLETE: 02/23/87
;LAST MODIFICATION: 02/23/87
;PERFORMED BY: Ming Hsu
;TEST/DEBUG:
;
;REVISION NUMBER: new
;
;DESCRIPTION: This routine handles the final key exit
;
;INPUTS:none
;
;OUTPUTS: none
;
;REGISTERS USAGE: ACC, R0, R1, R5, DPTR
;
;SUPPORT MODULES: KEY_CHECK - get key code.
;
;SIZE:  24H
;
;EXECUTION TIME:
;
;PDL:
;       add valid beeper count
;       reset next procedure
```

```
32                               ;       set up timer and go to sleep
33                               ;
34                               ;****************************************************************************
36                               CODESEG         SEGMENT CODE
37                                               RSEG    CODESEG
38                                               PUBLIC  FINAL_EXIT,KEY_LAST
39                                               EXTRN   BIT(NO_KEY,RELEASE,WAIT,NO_DISPLAY)
40                                               EXTRN   DATA(BEEPER,OPTIMER,P_NEXTO,P_NEXT1)
41                                               EXTRN   CODE(FINAL_CNT,VALID_CNT,SET_TIMER,OP_CHECK,KEY_CHECK)
42                                               EXTRN   CODE(OTHER_KEY)

                          Cross Reference

Label                   Value   Reference
BEEPER:DATA             E 1804    40    45    47
FINAL_CNT:CODE          E 0808    41    48
FINAL_EXIT:CODESEG      C 0000    38   -44
FK2000:CODESEG          C 001E    56   -58
KEY_CHECK:CODE          E 080C    59
KEY_LAST:CODESEG        C 0018    38    49    50   -55
NO_DISPLAY:BIT          E 2803    53
NO_KEY:BIT              E 2800    39    56
OPTIMER:DATA            E 1805    48
OP_CHECK:CODE           E 080B    57
OTHER_KEY:CODE          E 080D    42    61
P_NEXTO:DATA            E 1806    49
P_NEXT1:DATA            E 1807    50
RELEASE:BIT             E 2801    51
SET_TIMER:CODE          E 080A    54
VALID_CNT:CODE          E 0809    46
WAIT:BIT                E 2802    52


44  0000                      FINAL_EXIT   EQU     $
45  0000  E5 00      .E..                  MOV     A,BEEPER                 ;get current beeper count
46  0002  24 00      .E..                  ADD     A,#VALID_CNT             ;add valid count
47  0004  F5 00      .E..                  MOV     BEEPER,A
48  0006  75 00 00   .EE.                  MOV     OPTIMER,#FINAL_CNT       ;load final time out count
49  0009  75 00 18   .EC.                  MOV     P_NEXTO,#LOW(KEY_LAST)   ;load next starting address
50  000C  75 00 00   .EC.                  MOV     P_NEXT1,#HIGH(KEY_LAST)
51  000F  D2 00      .E..                  SETB    RELEASE
52  0011  D2 00      .E..                  SETB    WAIT
53  0013  C2 00      .E..                  CLR     NO_DISPLAY               ;clear display priority flag
54  0015  02 00 00   ..E.                  LJMP    SET_TIMER
55  0018                      KEY_LAST     EQU     $
56  0018  30 00 03   .ER.                  JNB     NO_KEY,FK2000            ;last key in the sequence
57  001B  02 00 00   ..E.                  LJMP    OP_CHECK
58                            FK2000:
59  001E  12 00 00   ..E.                  LCALL   KEY_CHECK                ;go to get key code
60  0021  FD                               MOV     R5,A                     ;store key value
61  0022  02 00 00   ..E.                  LJMP    OTHER_KEY
62  0025                                   END

Assembler Errors =     0
```

```
$XREF DEBUG TITLE(KEYBOARD DECODE FUNCTION)
        NAME    CKEYCODE
;**********************************************************************
;
;MODULE NAME: CKEYCODE
;       (C) Copyright 1987 Teletec Corporation, U.S.A.
;AUTHOR: Ming Hsu
;CODE COMPLETE: 01/18/86
;LAST MODIFICATION: 03/09/87
;PERFORMED BY: Ming Hsu
;TEST/DEBUG: 01/18/86
;
;REVISION NUMBER: new
;
;DESCRIPTION: This module analyzes the key matrix and outputs the key codes.
;
;INPUTS: Key matrix reading
;
;OUTPUTS: Key code(s)
;
;REGISTERS USAGE: A, DPTR, PSW, R0, R1, R2, R3, R4, R5, R6
;
;SUPPORT MODULES: none
;
;SIZE: 76H
;
;EXECUTION TIME:
;
;PDL:
; (1) DECODE:
;       check bit position for all key matrix input( total 4 bytes)
;               IF bit=0
;                       THEN get key code
;                            IF more then 3 keys
;                               THEN ignore rest of the keys
;                       ELSE next bit
;       END OF DECODING
;
; (2) CODE OUTPUT:
;       IF LAST KEY exist
;               THEN compare LAST KEY to CURRENT KEY
;                       IF LAST KEY equals to any of the CURRENT KEY
;                               THEN delete CURRENT KEY
;                               ELSE output key released
;       move CURRENT KEY to KEY OUTPUT
;       update LAST KEY
;       END OF KEY OUTPUT
;
;********************************************************************************
CODESEG         SEGMENT CODE
                RSEG    CODESEG
                PUBLIC  KEYCODE
                EXTRN   CODE(KEYTABLE)
                EXTRN   DATA(KEY_BUFFER)
                EXTRN   DATA(KEY0,KEY1,KEY2)
                EXTRN   DATA(LAST_KEY0,LAST_KEY1,LAST_KEY2)
                EXTRN   DATA(KEY_OUT0,KEY_OUT1,KEY_OUT2)
                EXTRN   BIT(NO_KEY)
```

```
0000                     KEYCODE        EQU     $                       ;entry point
0000  D2 00        .E..                 SETB    NO_KEY                  ;set no key flag
0002  75 00 00     .E..                 MOV     KEY0,#0                 ;clear keycode buffer
0005  75 00 00     .E..                 MOV     KEY1,#0
0008  75 00 00     .E..                 MOV     KEY2,#0
                         ;*****************************************************************************
                         ;*
                         ;* check any key pressed and get its keycode
                         ;*
                         ;*****************************************************************************
000B  78 00        .E..                 MOV     R0,#KEY_BUFFER          ;R0 point to first byte
000D  79 00        .E..                 MOV     R1,#KEY0                ;R1 point to first key
000F  7A 03                             MOV     R2,#3                   ;total 3 rows
0011  90 00 00     ..E.                 MOV     DPTR,#KEYTABLE
                         KEYCODE110:
0014  E6                                MOV     A,@R0                   ;get debounced key matrix reading
0015  7B 08                             MOV     R3,#8                   ;8 positions
                         KEYCODE120:
0017  13                                RRC     A
0018  50 08        .R..                 JNC     GET_KEY                 ;low active
                         KEYCODE150:
001A  A3                                INC     DPTR                    ;point to next keycode
001B  DB FA        .R..                 DJNZ    R3,KEYCODE120           ;check end of byte
001D  08                                INC     R0                      ;point to next byte
001E  DA F4        .R..                 DJNZ    R2,KEYCODE110           ;check end of 3 byte
0020  80 0D        .R..                 SJMP    CODE_OUT
                         GET_KEY:
0022  FC                                MOV     R4,A
0023  E4                                CLR     A
0024  93                                MOVC    A,@A+DPTR
0025  60 04        .R..                 JZ      KEYCODE200              ;keycode=0,don't save
0027  F7                                MOV     @R1,A                   ;save key code
0028  09                                INC     R1                      ;point to next key code location
0029  C2 00        .E..                 CLR     NO_KEY                  ;clear no key flag
                         KEYCODE200:
002B  EC                                MOV     A,R4                    ;restore key matrix for next position
002C  B9 01 EB     .ER.                 CJNE    R1,#KEY2+1,KEYCODE150   ;get 3 keys, ignore rest of the keys
                         ;*****************************************************************************
                         ;*
                         ;*  This portion takes care of the relationship between CURRENT KEY, LAST KEY
                         ;*  and KEY OUTPUT.
                         ;*  IF CURRENT KEY EQUAL TO LAST KEY(S)
                         ;*                             THEN NO KEY OUTPUT
                         ;*  IF CURRENT KEY NOT EQUAL TO LAST KEY(S)
                         ;*                             THEN NEW KEY OUTPUT
                         ;*  IF LAST KEY NOT IN CURRENT KEY(S)
                         ;*                             THEN KEY RELEASED
                         ;*
                         ;*****************************************************************************
                         CODE_OUT:
002F  78 00        .E..                 MOV     R0,#LAST_KEY0
0031  79 00        .E..                 MOV     R1,#KEY_OUT0
0033  7A 03                             MOV     R2,#3
0035  AC 00        .E..                 MOV     R4,KEY0                         ;save current key
0037  AD 00        .E..                 MOV     R5,KEY1
0039  AE 00        .E..                 MOV     R6,KEY2
                         GKEY10:
003B  E6                                MOV     A,@R0
                         GKEY20:
```

```
121  003C  60 1E      .R..              JZ     GKEY30               ;if last key not released yet
122                         KEYED:
123  003E  B5 00 05   .ER.              CJNE   A,KEY0,KEYED10       ;is last key equal to KEY0
124  0041  75 00 00   .E..              MOV    KEY0,#0              ;if yes, this key doesn't count
125  0044  80 16      .R..              SJMP   GKEY30
126                         KEYED10:
127  0046  B5 00 05   .ER.              CJNE   A,KEY1,KEYED20       ;is last key equal to KEY1
128  0049  75 00 00   .E..              MOV    KEY1,#0              ;if yes, this key doesn't count
129  004C  80 0E      .R..              SJMP   GKEY30
130                         KEYED20:
131  004E  B5 00 05   .ER.              CJNE   A,KEY2,KEY_RES       ;is last key equal to KEY2
132  0051  75 00 00   .E..              MOV    KEY2,#0              ;if yes, this key doesn't count
133  0054  80 06      .R..              SJMP   GKEY30
                      Cross Reference

Label                     Value    Reference
CODE_OUT:CODESEG          C 002F     86  -111
GET_KEY:CODESEG           C 0022     80   -87
GKEY10:CODESEG            C 003B   -118   147
GKEY20:CODESEG            C 003C   -120
GKEY30:CODESEG            C 005C    121   125   129   133  -145
KEY0:DATA                 E 1802     56    63    72   115   123   124   149
KEY1:DATA                 E 1803     64   116   127   128
KEY2:DATA                 E 1804     65    97   117   131   132
KEYCODE:CODESEG           C 0000     53   -61
KEYCODE110:CODESEG        C 0014    -75    85
KEYCODE120:CODESEG        C 0017    -78    83
KEYCODE150:CODESEG        C 001A    -81    97
KEYCODE200:CODESEG        C 002B     91   -95
KEYED:CODESEG             C 003E   -122
KEYED10:CODESEG           C 0046    123  -126
KEYED20:CODESEG           C 004E    127  -130
KEYTABLE:CODE             E 0800     54    74
KEY_BUFFER:DATA           E 1801     55    71
KEY_OUT0:DATA             E 1808     58   113
KEY_OUT1:DATA             E 1809      0
KEY_OUT2:DATA             E 180A    152
KEY_RES:CODESEG           C 0056    131  -140
K_EXIT:CODESEG            C 0070    153  -162
LAST_KEY0:DATA            E 1805     57   112   163
LAST_KEY1:DATA            E 1806    164
LAST_KEY2:DATA            E 1807    165
LD_KEY:CODESEG            C 005F   -148
LD_KEY10:CODESEG          C 0063   -151   161
LD_KEY20:CODESEG          C 0068    152  -154
NO_KEY:BIT                E 280B     59    62    94
NO_KEY10:CODESEG          C 006D    156  -159

135                         ;*****************************************************************************
136                         ;*
137                         ;* last key not equal to any of the current key, the key was been released
138                         ;*
139                         ;*****************************************************************************
140                         KEY_RES:
141  0056  D2 E7      .B..              SETB   ACC.7                ;set bit 7
142  0058  F7                           MOV    @R1,A                ;store to keycode output
143  0059  76 00                        MOV    @R0,#0               ;clear last key
144  005B  09                           INC    R1
```

```
                                GKEY30:
0050C  08                                   INC     R0
005D   DA DC         .R..                   DJNZ    R2,GKEY10

                                LD_KEY:
005F   78 00         .E..                   MOV     R0,#KEY0
0061   7A 03                                MOV     R2,#3

                                LD_KEY10:
0063   B9 01 02      .ER.                   CJNE    R1,#KEY_OUT2+1,LD_KEY20
0066   80 0B         .R..                   SJMP    K_EXIT

                                LD_KEY20:
0068   E6                                   MOV     A,@R0
0069   60 02         .R..                   JZ      NO_KEY10
006B   F7                                   MOV     @R1,A
006C   09                                   INC     R1

                                NO_KEY10:
006D   08                                   INC     R0
006E   DA F3         .R..                   DJNZ    R2,LD_KEY10

                                K_EXIT:
0070   8C 00         .E..                   MOV     LAST_KEY0,R4        ;update last keys
0072   8D 00         .E..                   MOV     LAST_KEY1,R5
0074   8E 00         .E..                   MOV     LAST_KEY2,R6
0076   22                                   RET                         ;return to caller
0077                                        END

Assembler Errors =      0

;*************************************************************************
;
;MODULE NAME: CTX_ACT
;
;CODE COMPLETE: 05/23/86
;LAST MODIFICATION: 07/11/86
;TEST/DEBUG:
;
;REVISION NUMBER: new
;
;DESCRIPTION: This module is one of the EXEC stage. It checks the response
;              from RFU and decides to re_transmit or finish the transmit
;              process.
;
;INPUTS:
;
;OUTPUTS:
;
;REGISTER USAGE: A, R1, R2, R3, R4, R7, DPTR
;
;SUPPORT MODULES:
;
;SIZE:
;
;EXECUTION TIME:
;
;PDL:
;       IF (Tx pending)
;          IF (RX buffer empty)
;             IF (Tx timeout)
;                re_transmit
```

```
;               ELSE
;                   IF (received character = ACK)
;                       finished the Tx procedure
;                   ENDIF
;               ENDIF
;           ENDIF
;       ENDIF
;       EXIT
;
;****************************************************************************
;**************************************************************************
;
;MODULE NAME: CCM_STCK
;       (C) Copyright 1987 Teletec Corporation, U.S.A.
;AUTHOR: Ming Hsu
;CODE COMPLETE: 08/26/86
;LAST MODIFICATION: 03/03/87
;PERFORMED BY: Ming Hsu
;TEST/DEBUG:
;
;REVISION NUMBER: new
;
;DESCRIPTION: This module takes the received STATE TABLE CHECK SUM byte and
;               compare to the calculated check sum in CU
;
;INPUTS: HEALTH STATUS from RFU
;
;OUTPUTS:
;
;REGISTER USAGE: A, DPTR
;
;SUPPORT MODULES: none
;
;SIZE:
;
;EXECUTION TIME:
;
;
;**************************************************************************
;**************************************************************************
;
;MODULE NAME: CTX_CMD
;       (C) Copyright 1987 Teletec Corporation, U.S.A.
;AUTHOR: Ming Hsu
;CODE COMPLETE: 05/23/86
;LAST MODIFICATION: 10/31/86
;PERFORMED BY: Ming Hsu
;TEST/DEBUG:
;
;REVISION NUMBER: new
;
;DESCRIPTION: This module will execute in response to a PCM transmit command
;             interrupt. This module will be responsible for removing data
;             from the data buffer and storing the data in PCM transmit command
;             latch.
;
;INPUTS:
```

```
;
;OUTPUTS:
;
;REGISTER USAGE:
;
;SUPPORT MODULES:
;
;SIZE:
;
;EXECUTION TIME:
;               Normal Case = 47 us
;               Last byte case = 25 us
;PDL:
;       IF (byte count equal to zero)
;          set rfu response pending flag
;          change PCM mode to data mode
;          enable pcm rx interrupt
;       ELSE
;          decrease byte count
;          get current data byte
;          send data to PCM command port
;       ENDIF
;       EXIT
;
;*********************************************************************
;******************************************************************************
;
;MODULE NAME: CPREP_ME
;
;CODE COMPLETE: 05/22/86
;LAST MODIFICATION: 08/14/86
;TEST/DEBUG:
;
;REVISION NUMBER: new
;
;DESCRIPTION: This routine transfers PCM message to TX buffer and calculate
;             check sum. Change the PCM mode to command mode and enable TX
;             interrupt.
;
;INPUTS:
;       R0 = number of bytes need to be transfer (not include SOH and check sum )
;       R1 = starting point of the message (in first page).
;       R2 = OPCODE
;OUTPUTS: PCM message in TX buffer
;
;REGISTERS USAGE: R0, R1, R2, ACC, DPTR, PSW
;
;SUPPORT MODULES: none
;
;SIZE:
;
;EXECUTION TIME:
;
;PDL:
;       reset TX buffer pointer
;       transfer command to TX buffer
;       send SOH to PCM command output port
;       set PCM mode to command mode( TX interrupt will be enable by hardware )
;
;******************************************************************************
```

```
;**********************************************************************
;
;MODULE NAME: CPCMRES
;
;CODE COMPLETE: 10/23/86
;LAST MODIFICATION: 10/29/86
;TEST/DEBUG:
;
;REVISION NUMBER: new
;
;DESCRIPTION: This module will be responsible for reset PCM interrupt jam
;              by clear Tx and RX interrupt and all the related parameters.
;
;INPUTS:
;
;OUTPUTS:
;
;REGISTER USAGE:
;
;SUPPORT MODULES:
;
;SIZE:
;
;EXECUTION TIME:
;
;PDL:
;
;**********************************************************************

;**********************************************************************
;
;MODULE NAME: CCM_HLTH
;
;CODE COMPLETE: 08/26/86
;LAST MODIFICATION: 01/21/87
;TEST/DEBUG:
;
;REVISION NUMBER: new
;
;DESCRIPTION: This module takes the received health byte and put in HEALTH
;              bits
;
;INPUTS: HEALTH STATUS from RFU
;
;OUTPUTS:
;
;REGISTER USAGE: A, DPTR
;
;SUPPORT MODULES: none
;
;SIZE:
;
;EXECUTION TIME:
;
;
;**********************************************************************
```

```
;************************************************************************
;
;MODULE NAME: CCM_SCAN
;
;CODE COMPLETE: 08/29/86
;LAST MODIFICATION: 08/30/86
;TEST/DEBUG:
;
;REVISION NUMBER: new
;
;DESCRIPTION: This module is responsible for handling the scan status
;              response from the rf unit. Also the old scan status will
;              updated with current scan status prior to updating the
;              current scan status with the rfu response. Well, did you
;              get that? huh?
;
;INPUTS: RX_BEG - pcm receive buffer.
;        SCAN_STATUS - current scan status.
;
;OUTPUTS: SCAN_STATUS - updated with new data from RFU.
;         OLD_SCNSTAT - updated from current scan status.
;
;REGISTER USAGE: A, DPTR
;
;SUPPORT MODULES: none
;
;SIZE:
;
;EXECUTION TIME:
;
;PDL:
;
;************************************************************************
;************************************************************************
;
;MODULE NAME: CINTZERO
;
;CODE COMPLETE: 05/08/86
;LAST MODIFICATION: 09/08/86
;TEST/DEBUG:
;
;REVISION NUMBER: new
;
;DESCRIPTION: This module performs a dispatch function for the external
;              interrupt zero. Determination will be made as to whether
;              interrupt occured due to a PCM transmit command and PCM receive
;              command, and control will be passed to an appropriate handler.
;              This module will handle termination of the interrupt once the
;              handler completes processing.
;
;INPUTS:
;
;OUTPUTS:
;
;REGISTER USAGE:
;
;SUPPORT MODULES: Rx_COMMAND - pcm receive data handler.
;                 Tx_COMMAND - pcm transmit data handler.
```

```
;
;SIZE:
;
;EXECUTION TIME:
;
;PDL:
;
;**********************************************************************
;**********************************************************************
;
;MODULE NAME: CRX_CMD
;       (C) Copyright 1987 Teletec Corporation. U.S.A.
;AUTHOR: Ming Hsu
;CODE COMPLETE: 05/22/86
;LAST MODIFICATION: 02/09/87
;PERFORMED BY: Ming Hsu
;TEST/DEBUG:
;
;REVISION NUMBER: new
;
;DESCRIPTION: This module will execute in response to a PCM receive command
;             interrupt. This module will be responsible for removing data
;             from the PCM receive command latch and storing the data into
;             a buffer.
;
;INPUTS: RX_HEAD - contains pointer for next received byte.
;
;OUTPUTS: RX_BEG - receive buffer updated with new receive data.
;
;REGISTER USAGE: A, R1, R2, DPTR
;
;SUPPORT MODULES:
;
;SIZE:
;
;EXECUTION TIME:
;
;PDL:
;
;**********************************************************************
;**********************************************************************
;
;MODULE NAME: CTX_SAME
;
;CODE COMPLETE: 07/10/86
;LAST MODIFICATION: 11/03/86
;TEST/DEBUG:
;
;REVISION NUMBER: new
;
;DESCRIPTION: This module handles the re-transmission of the last message
;             transmitted to the RFU. An error counter will be maintained
;             and should the maximum number of errors be reached re-
;             transmission will be aborted and the error reported.
;
;INPUTS:
;
;OUTPUTS:
```

```
;
;REGISTER USAGE: A, DPTR
;
;SUPPORT MODULES: none
;
;SIZE:
;
;EXECUTION TIME:
;
;PDL:    IF (PCM_ERR_CNT = PCM_ERR_MAX)
;            reset receive buffer
;            release transmit buffer
;            set pcm error flag to active
;            reset pcm error counter
;        ELSE
;            increment pcm error counter
;            re-init transmit byte count
;            re_init tx buffer pointer
;            re-enable transmit interrupt
;            set pcm to command mode
;            write soh to transmit latch
;        ENDIF
;        disable receive interrupt
;        EXIT
;
;************************************************************************
;************************************************************************
;
;MODULE NAME: CCM_DISP
;
;CODE COMPLETE: 07/10/86
;LAST MODIFICATION: 12/17/86
;TEST/DEBUG:
;
;REVISION NUMBER: new
;
;DESCRIPTION: This module will handle the reception of messages from the
;             RFU other than ACK's and NAK's. These messages will be stored
;             and program control will be dispatched to the appropriate
;             command processor for action. A checksum will be calculated
;             on the incoming message and bad messages will result in the
;             original CU command being re-transmitted.
;
;INPUTS:
;
;OUTPUTS:
;
;REGISTER USAGE:
;
;SUPPORT MODULES: CTX_SAME - handles re-transmission of previaous message.
;
;SIZE:
;
;EXECUTION TIME:
;
;PDL:    IF ( REAL_CLOCK - RX_TIMER - RX_TIMEOUT > 1 )
;            retransmit
;        ELSE
```

```
;           A = number of bytes received
;           B = number of bytes expected
;           A : B
;           IF (all bytes are here)
;              calculate checksum
;              IF (checksum bad)
;                retransmit
;              ELSE
;                dispatch program to message handler
;                reset message function
;              ENDIF
;           ENDIF
;        ENDIF
;        EXIT
;
;***********************************************************************
```

SOFTWARE HEADER FOR CONTROL UNIT (DIGITAL SERIAL INTERFACE) RFU RESPONSE DISPATCH FUNCTION (CCM_DISP)
APP. ITEM 5k

```
;***********************************************************************
;
;MODULE NAME: R_DISPAT
;       (C) Copyright 1987 Teletec Corporation, U.S.A.
;AUTHER: Ming Hsu
;CODE COMPLETE: 06/05/1986
;LAST MODIFICATION: 02/19/87
;PERFORMED BY: Ming Hsu
;TEST/DEBUG:
;
;REVISION NUMBER: new
;
;DESCRIPTION: This module dispatch the command processing
;
;INPUTS:
;
;OUTPUTS:
;
;REGISTER USAGE:
;
;SUPPORT MODULES:
;
;SIZE:
;
;EXECUTION TIME:
;
;PDL:
;
;***********************************************************************
```

SOFTWARE HEADER FOR TRANSCEIVER UNIT (DIGITAL SERIAL INTERFACE)
RECEIVED COMMAND DISPATCHING ROUTINE (R_DISPAT)

APP. ITEM 5l

```
;*****************************************************************************
;
;MODULE NAME: RCM_VON
;
;       (c) Copyright 1987 Teletec Corporation. U.S.A.
;
;AUTHOR: Ming Hsu
;CODE COMPLETE: 05/30/86
;LAST MODIFICATION: 02/24/87
;PERFORMED BY: John Fussell
;TEST/DEBUG:
;
;REVISION NUMBER: new
;
;DESCRIPTION: This module handles voice privacy ON.
;
;INPUTS: none
;
;OUTPUTS: AUDIO_CNTRL - updated to enable voice privacy.
;
;REGISTER USAGE: A, DPTR
;
;SUPPORT MODULES: none
;
;SIZE:
;
;EXECUTION TIME:
;
;PDL:   turn on voice privacy module
;       switch audio paths for voice privacy
;       set audio control update flag
;       EXIT
;
;*****************************************************************************
```

SOFTWARE HEADER FOR TRANSCEIVER UNIT (DIGITAL SERIAL INTERFACE)
VOICE PRIVACY ON MESSAGE HANDLER (RCM_VON)

APP. ITEM 5m

```
;*****************************************************************************
;
;MODULE NAME: RCM_VOFF
;
;       (c) Copyright 1987 Teletec Corporation. U.S.A.
;
;AUTHOR: Ming Hsu
;CODE COMPLETE: 05/30/86
;LAST MODIFICATION: 02/24/87
;PERFORMED BY: John Fussell
;TEST/DEBUG:
;
;REVISION NUMBER: new
;
;DESCRIPTION: This module handles voice privacy OFF.
;
;INPUTS: none
;
;OUTPUTS: AUDIO_CNTRL - updated to disable voice privacy.
```

```
;
;REGISTER USAGE: A, DPTR
;
;SUPPORT MODULES: none
;
;SIZE:
;
;EXECUTION TIME:
;
;PDL:    disable voice privacy module
;        switch audio paths for normal audio
;        set audio control update flag
;        EXIT
;
;*****************************************************************************
       SOFTWARE HEADER FOR TRANSCEIVER UNIT (DIGITAL SERIAL INTERFACE)
             VOICE PRIVACY OFF MESSAGE HANDLER (RCM_VOFF)

                          APP. ITEM 5n


;***************************************************************************
;
;MODULE NAME: RPREP_MES
;
;CODE COMPLETE: 06/03/1986
;LAST MODIFICATION: 10/01/1986
;TEST/DEBUG:
;
;REVISION NUMBER: new
;
;DESCRIPTION: This routine transfers PCM message to TX buffer and calculate
;             check sum. Change the PCM mode to command mode and enable TX
;             interrupt.
;
;INPUTS:
;        R0= number of bytes need to be transfer
;        DPTR = starting point of the message
;
;OUTPUTS: PCM message in TX buffer
;
;REGISTERS USAGE: R0, R1, R2, R3, R4, R5, R6, ACC, DPTR, PSW
;
;SUPPORT MODULES: none
;
;SIZE:
;
;EXECUTION TIME:
;
;PDL:
;        reset TX buffer pointer
;        transfer command to TX buffer
;
;*****************************************************************************
          SOFTWARE HEADER FOR TRANSCEIVER UNIT (DIGITAL SERIAL INTERFACE)
              PCM COMMAND MESSAGE PREPARATION MODULE (RPREP_MES)

                             APP. ITEM 5o
```

```
;***********************************************************************
;
;MODULE NAME: RPCMRES
;
;CODE COMPLETE: 10/23/86
;LAST MODIFICATION: 10/30/86
;TEST/DEBUG:
;
;REVISION NUMBER: new
;
;DESCRIPTION: This module will be responsible for reset PCM interrupt jam
;               by clear Tx and RX interrupt and all the related parameters.
;
;INPUTS:
;
;OUTPUTS:
;
;REGISTER USAGE:
;
;SUPPORT MODULES:
;
;SIZE:
;
;EXECUTION TIME:
;
;PDL:
;
;***********************************************************************
```

SOFTWARE HEADER FOR TRANSCEIVER UNIT (DIGITAL SERIAL INTERFACE)
PCM ERROR RESET (RPCMRES)

APP. ITEM 5p

```
;***********************************************************************
;
;MODULE NAME: RPCMINT
;
;CODE COMPLETE: 05/08/86
;LAST MODIFICATION: 09/10/86
;TEST/DEBUG:
;
;REVISION NUMBER: new
;
;DESCRIPTION: This module performs a dispatch function for the PCM
;             interrupts. Determination will be made as to whether interrupt
;             occured due to a PCM transmit command or PCM receive command
;             condition and control will be passed to an appropriate handler.
;             This module will handle termination of the interrupt once the
;             handler completes processing.
;
;INPUTS: none
;
;OUTPUTS: none
;
;REGISTER USAGE: A, DPTR
;
;SUPPORT MODULES: Rx_COMMAND - pcm receive data handler.
;                 Tx_COMMAND - pcm transmit data handler.
```

```
;
;SIZE:
;
;EXECUTION TIME: 32 usec - Rx case
;                34 usec - Tx case
;
;PDL:
;
;*************************************************************************
    SOFTWARE HEADER FOR TRANSCEIVER UNIT (DIGITAL SERIAL INTERFACE)
              RFU PCM INTERRUPT HANDLER (RPCMINT)

                          APP. ITEM 5q
;*************************************************************************
;
;MODULE NAME: RTX_CMD
;       (C) Copyright 1987 Teletec Corporation, U.S.A.
;AUTHOR: Ming Hsu
;CODE COMPLETE: 05/23/86
;LAST MODIFICATION: 02/09/87
;PERFORMED BY: Ming Hsu
;TEST/DEBUG:
;
;REVISION NUMBER: new
;
;DESCRIPTION: This module will execute in response to a PCM transmit command
;             interrupt. This module will be responsible for removing data
;             from the data buffer and storing the data in PCM transmit command
;             latch.
;
;INPUTS:
;
;OUTPUTS:
;
;REGISTER USAGE: A, DPTR, R1, R2
;
;SUPPORT MODULES: none
;
;SIZE:
;
;EXECUTION TIME: 20 usec - last byte
;                47 usec - normal case
;
;PDL:
;       If byte count equal to zero
;       then
;          set Tx buffer empty
;          change PCM mode to data mode
;          exit
;       else
;          decrease byte count
;          get current data byte
;          send data to PCM command port
;          exit
;
;*************************************************************************
    SOFTWARE HEADER FOR TRANSCEIVER UNIT (DIGITAL SERIAL INTERFACE)
              PCM COMMAND TRANSMIT HANDLER (RTX_CMD)
                          APP. ITEM 5r
```

```
;************************************************************************
;
;MODULE NAME: RRX_CMD
;        (C) Copyright 1987 Teletec Corporation, U.S.A.
;AUTHOR: Ming Hsu
;CODE COMPLETE: 05/22/86
;LAST MODIFICATION: 02/09/87
;PERFORMED BY: Ming Hsu
;TEST/DEBUG:
;
;REVISION NUMBER: new
;
;DESCRIPTION: This module will execute in response to a PCM receive command
;             interrupt. This module will be responsible for removing data
;             from the PCM receive command latch and storing the data into
;             a buffer.
;
;INPUTS: Rx_HEAD - contains pointer for next received byte.
;
;OUTPUTS: RX_BEG - receive buffer updated with new receive data.
;
;REGISTER USAGE: A, R1, R2, DPTR
;
;SUPPORT MODULES:
;
;SIZE:
;
;EXECUTION TIME:
;
;PDL:
;
;************************************************************************
```

SOFTWARE HEADER FOR TRANSCEIVER UNIT (DIGITAL SERIAL INTERFACE)
PCM COMMAND RECEIVE HANDLER (RRX_CMD)

APP. ITEM 5s

```
;************************************************************************
;
;MODULE NAME: RCM_DISP
;
;CODE COMPLETE: 07/10/86
;LAST MODIFICATION: 10/14/86
;TEST/DEBUG:
;
;REVISION NUMBER: new
;
;DESCRIPTION: This module will handle the reception of messages from the
;             RFU other than ACK's and NAK's. These messages will be stored
;             and program control will be dispatched to the appropriate
;             command processor for action. A checksum will be calculated
;             on the incoming message and bad messages will result in the
;             original CU command being re-transmitted.
;
;INPUTS:
;
;OUTPUTS:
;
```

```
;REGISTER USAGE:
;
;SUPPORT MODULES: CTX_SAME - handles re-transmission of previaous message.
;
;SIZE:
;
;EXECUTION TIME:
;
;PDL:    IF ( REAL_CLOCK - RX_TIMER - RX_TIMEOUT > 1 )
;           retransmit
;        ELSE
;           A = number of bytes received
;           B = number of bytes expected
;           A : B
;           IF (all bytes are here)
;              calculate checksum
;              IF (checksum bad)
;                retransmit
;              ELSE
;                dispatch program to message handler
;                reset message function
;              ENDIF
;           ENDIF
;        ENDIF
;        EXIT
;
;**********************************************************************
```

SOFTWARE HEADER FOR TRANSCEIVER UNIT (DIGITAL SERIAL INTERFACE)
RFU RESPONSE DISPATCH FUNCTION (RCM_DISP)

APP. ITEM 5t

```
;**********************************************************************
;
;MODULE NAME: R LENGTH
;       (C) Copyright 1987 Teletec Corporation, U.S.A.
;AUTHOR: Ming Hsu
;CODE COMPLETE: 07/29/86
;LAST MODIFICATION: 03/03/87
;PERFORMED BY: Ming Hsu
;TEST/DEBUG:
;
;REVISION NUMBER: new
;
;DESCRIPTION: This module defines the length of the command string.
;
;INPUTS: OPCODE
;
;OUTPUTS: ACC - length of the command string.
;
;REGISTER USAGE:
;
;SUPPORT MODULES: none
;
;SIZE:
;
;EXECUTION TIME:
;
;PDL:
```

```
;
;************************************************************************
```

SOFTWARE HEADER FOR TRANSCEIVER UNIT (DIGITAL SERIAL INTERFACE)
COMMAND LENGTH TABLE (R_LENGTH)

APP. ITEM 5u

```
;************************************************************************
;
;MODULE NAME: CTX_ACT
;
;       (c) Copyright 1987  Teletec Corporation, U.S.A.
;
;AUTHOR: Ming Hsu
;CODE COMPLETE: 05/23/86
;LAST MODIFICATION: 07/11/86
;PERFORMED BY: John Fussell
;TEST/DEBUG:
;
;REVISION NUMBER: new
;
;DESCRIPTION: This module is one of the EXEC stage. It checks the response
;             from RFU and decides to re_transmit or finish the transmit
;             process.
;
;INPUTS:
;
;OUTPUTS:
;
;REGISTER USAGE: A, R1, R2, R3, R4, R7, DPTR
;
;SUPPORT MODULES:
;
;SIZE:
;
;EXECUTION TIME:
;
;PDL:
;       IF (TX pending)
;          IF (RX buffer empty)
;             IF (TX timeout)
;                re_transmit
;             ELSE
;                IF (received character = ACK)
;                   finished the TX procedure
;                ENDIF
;             ENDIF
;          ENDIF
;       ENDIF
;       EXIT
;
;************************************************************************
```

ACTUAL PROGRAM CODE FOR CONTROL UNIT (DIGITAL SERIAL INTERFACE)
PCM TRANSMIT HANDLER (CTX ACT)
WRITTEN IN ASSEMBLY LANGUAGE
APP. ITEM 6a (1)

```
      Microtec ASM51  Ver 2.0g
PCM TRANSMIT HANDLER

Err  Line  Addr  Object       Type

                                       CODESEG        SEGMENT CODE
                                                      RSEG    CODESEG
                                                      PUBLIC  TX_ACTION
                                                      EXTRN   BIT(TX_CHECK,TX_EMPTY.DISPATCH_FG)
                                                      EXTRN   CODE(ACK.COMMAND,NAK,PORT3A,SOH,TX_TIMEOUT)
                                                      EXTRN   CODE(TX_INT_ON,RX_INT_OFF,CONT3,CTX_SAME)
                                                      EXTRN   DATA(REAL_CLOCK,RX_OPCODE,PCM_ERR_CNT)
                                                      EXTRN   XDATA(RX_BEG,RX_HEAD,RX_TAIL,TX_NUMBER,TX_NUMBER2)
                                                      EXTRN   XDATA(TX_TIMER)
```

ACTUAL PROGRAM CODE FOR CONTROL UNIT (DIGITAL SERIAL INTERFACE)
PCM TRANSMIT HANDLER (CTX ACT)
WRITTEN IN ASSEMBLY LANGUAGE

APP. ITEM 6a (2)

```
                                 ;*************************************************************************
                                 ;
                                 ;       Check RX buffer empty
                                 ;
                                 ;*************************************************************************
       0000                      TX_ACTION       EQU     $                               ;entry point
       0000  90 00 00    ..E.                    MOV     DPTR,#RX_HEAD                   ;get RX buffer head address
       0003  E0                                  MOVX    A,@DPTR                         ;get low address of buffer head
       0004  F9                                  MOV     R1,A                            ;save low address
       0005  A3                                  INC     DPTR                            ;point to high byte
       0006  E0                                  MOVX    A.@DPTR                         ;get high address of buffer tail
       0007  FA                                  MOV     R2.A                            ;save high address
       0008  90 00 00    ..E.                    MOV     DPTR,#RX_TAIL                   ;get RX buffer tail address
       000B  E0                                  MOVX    A,@DPTR
       000C  FB                                  MOV     R3,A                            ;tail low address
       000D  A3                                  INC     DPTR
       000E  E0                                  MOVX    A.@DPTR                         ;tail high address
       000F  FC                                  MOV     R4.A                            ;save high address
       0010  6A                                  XRL     A,R2                            ;compare high address
       0011  70 14       .R..                    JNZ     TX100                           ;not equal, RX buffer not empty
       0013  EB                                  MOV     A,R3
       0014  69                                  XRL     A,R1                            ;compare low byte
       0015  70 10       .R..                    JNZ     TX100                           ;branch if rx buffer not empty
                                 ;*************************************************************************
                                 ;
                                 ;       Check transmit time out
                                 ;
                                 ;*************************************************************************
       0017  90 00 00    ..E.                    MOV     DPTR,#TX_TIMER          ;get transmit timer address
       001A  E0                                  MOVX    A,@DPTR                 ;get transmit time
       001B  F9                                  MOV     R1,A                    ;store value
       001C  E5 00       .E..                    MOV     A.REAL_CLOCK            ;get current time
       001E  C3                                  CLR     C                       ;clear carry
       001F  99                                  SUBB    A,R1                    ;get time difference
```

```
0020  C3                         CLR    C
0021  94 00        .E..          SUBB   A,#TX_TIMEOUT
0023  50 47        .R..          JNC    TX700             ;re-transmit command if no response yet
0025  80 4A        .R..          SJMP   TX990             ;not timeout
                     ;*********************************************************************
                     ;
                     ;      Get data from RX buffer
                     ;
                     ;*********************************************************************
                     TX100:
0027  8B 82        .D..          MOV    DPL,R3            ;get pointer low byte
0029  8C 83        .D..          MOV    DPH,R4            ;get pointer high byte
002B  E0                         MOVX   A,@DPTR           ;get RX data
002C  B4 00 2B     .ER.          CJNE   A,#ACK,TX200      ;branch if data is not an ACK
```

ACTUAL PROGRAM CODE FOR CONTROL UNIT (DIGITAL SERIAL INTERFACE) PCM TRANSMIT HANDLER (CTX_ACT) WRITTEN IN ASSEMBLY LANGUAGE
APP. ITEM 6a (3)

```
                     ;*********************************************************************
                     ;
                     ;      Get ACK response, finish up the transmit process
                     ;
                     ;      Reset RX_HEAD to starting address
                     ;
                     ;*********************************************************************
002F  AF 00        .E..          MOV    R7,RX_OPCODE      ;get expected op code
0031  BF 00 3B     ..R.          CJNE   R7,#0,TX700       ;re-transmit if ACK not expected

0034  74 00        .E..          MOV    A,#LOW(RX_BEG)    ;low byte of RX buffer starting address
0036  90 00 00     ..E.          MOV    DPTR,#RX_HEAD
0039  F0                         MOVX   @DPTR,A
003A  74 00        .E..          MOV    A,#HIGH(RX_BEG)   ;high byte of RX buffer starting address
003C  A3                         INC    DPTR
003D  F0                         MOVX   @DPTR,A
                     ;*************************************************************
                     ;
                     ;      Reset RX_TAIL to starting address
                     ;
                     ;*************************************************************
003E  90 00 00     ..E.          MOV    DPTR,#RX_TAIL     ;RX tail address
0041  74 00        .E..          MOV    A,#LOW(RX_BEG)    ;receive buffer starting address
0043  F0                         MOVX   @DPTR,A
0044  A3                         INC    DPTR
0045  74 00        .E..          MOV    A,#HIGH(RX_BEG)
0047  F0                         MOVX   @DPTR,A
0048  75 00 00     .E..          MOV    PCM_ERR_CNT,#0    ;reset pcm error counter
004B  C2 00        .E..          CLR    TX_CHECK          ;clear transmit check bit
004D  C2 00        .E..          CLR    TX_EMPTY          ;indicate buffer no longer full
004F  90 00 00     ..E.          MOV    DPTR,#CONT3       ;get 8255 control register address
0052  74 00        .E..          MOV    A,#RX_INT_OFF     ;get disable interrupt command
0054  F0                         MOVX   @DPTR,A           ;disable PCM RX interrupt
0055  80 1A        .R..          SJMP   TX990             ;branch to complete exit
                     ;*********************************************************************
                     ;
                     ;      NAK response
                     ;
                     ;*********************************************************************
```

```
                        TX200:
0057  B4 00 02   .ER.               CJNE    A,#NAK,TX400        ;branch if response not a NAK
005A  80 10      .R..               SJMP    TX700               ;branch to re_transmit message
```

ACTUAL PROGRAM CODE FOR CONTROL UNIT (DIGITAL SERIAL INTERFACE)
PCM TRANSMIT HANDLER (CTX ACT)
WRITTEN IN ASSEMBLY LANGUAGE

APP. ITEM 6a (4)

```
                        ;****************************************************************************
                        ;
                        ;       SOH RESPONSE
                        ;
                        ;****************************************************************************
                        TX400:
005C  B4 00 0D   .ER.               CJNE    A,#SOH,TX700        ;branch if data not ACK, NAK or SOH
005F  AF 00      .E..               MOV     R7,RX_OPCODE        ;get expected op code
0061  BF 00 02   ..R.               CJNE    R7,#0,TX410         ;branch if a response was expected

0064  80 06      .R..               SJMP    TX700               ;re-transmit if SOH not expected
                        TX410:
0066  C2 00      .E..               CLR     TX_CHECK            ;clear state flag for this routine
0068  D2 00      .E..               SETB    DISPATCH_FG         ;set state flag active for dispatch function
006A  80 05      .R..               SJMP    TX990               ;exit
                        ;****************************************************************************
                        ;
                        ;       RE-TRANSMIT SAME MESSAGE
                        ;
                        ;****************************************************************************
                        TX700:
006C  C2 00      .E..               CLR     TX_CHECK            ;clear state change flag
006E  12 00 00   ..E.               LCALL   CTX_SAME            ;execute re-transmission function
                        TX990:
0071  22                            RET                         ;return to caller
0072                                END

Assembler Errors =    0
```

ACTUAL PROGRAM CODE FOR CONTROL UNIT (DIGITAL SERIAL INTERFACE)
PCM TRANSMIT HANDLER (CTX ACT)
WRITTEN IN ASSEMBLY LANGUAGE

APP. ITEM 6a (5)

Cross Reference

| Label | Value | Reference | |
|---|---|---|---|
| ACK:CODE | E 0803 | 53 | 106 |
| COMMAND:CODE | E 0804 | 0 | |
| CONT3:CODE | E 080B | 137 | |
| CTX_SAME:CODE | E 080C | 171 | |
| DISPATCH_FG:BIT | E 2802 | 162 | |
| NAK:CODE | E 0805 | 147 | |

```
PCM_ERR_CNT:DATA         E 180F     134
PORT3A:CODE              E 0806       0
REAL_CLOCK:DATA          E 180D      55    90
RX_BEG:XDATA             E 1010      56   117    120    129    132
RX_HEAD:XDATA            E 1011      65   118
RX_INT_OFF:CODE          E 080A     138
RX_OPCODE:DATA           E 180E     115   157
RX_TAIL:XDATA            E 1012      71   128
SOH:CODE                 E 0807     156
TX100:CODESEG            C 0027      78    81   -102
TX200:CODESEG            C 0057     106  -146
TX400:CODESEG            C 005C     147  -155
TX410:CODESEG            C 0066     158  -160
TX700:CODESEG            C 006C      95   116    148   156    159   -169
TX990:CODESEG            C 0071      96   140    163  -172
TX_ACTION:CODESEG        C 0000      51   -64
TX_CHECK:BIT             E 2800      52   135    161    170
TX_EMPTY:BIT             E 2801     136
TX_INT_ON:CODE           E 0809      54
TX_NUMBER:XDATA          E 1013       0
TX_NUMBER2:XDATA         E 1014       0
TX_TIMEOUT:CODE          E 0808      94
TX_TIMER:XDATA           E 1015      57    87
```

ACTUAL PROGRAM CODE FOR CONTROL UNIT (DIGITAL SERIAL INTERFACE)
PCM TRANSMIT HANDLER (CTX ACT)
WRITTEN IN ASSEMBLY LANGUAGE

APP. ITEM 6a (6)

```
        Microtec ASM51  Ver 2.0g
STATE TABLE CHECK SUM ACTION ROUTINE

Err  Line  Addr  Object      Type

                              $XREF DEBUG TITLE(STATE TABLE CHECK SUM ACTION ROUTINE)
                                      NAME    CCM_STCK
                              ;**********************************************************************
                              ;
                              ;MODULE NAME: CCM_STCK
                              ;       (C) Copyright 1987 Teletec Corporation, U.S.A.
                              ;AUTHOR: Ming Hsu
                              ;CODE COMPLETE: 08/26/86
                              ;LAST MODIFICATION: 03/17/87
                              ;PERFORMED BY: Ming Hsu
                              ;TEST/DEBUG:
                              ;
                              ;REVISION NUMBER: new
                              ;
                              ;DESCRIPTION: This module takes the received STATE TABLE CHECK SUM byte and
                              ;               compare to the calculated check sum in CU
                              ;
                              ;INPUTS: HEALTH STATUS from RFU
                              ;
                              ;OUTPUTS:
```

```
;
;REGISTER USAGE: A, DPTR
;
;SUPPORT MODULES: none
;
;SIZE:
;
;EXECUTION TIME:
;
;PDL:    calculate state table checksum
;        compare checksum with rfu checksum
;        IF (checksums miscompare)
;           set action flags for system reset
;        ENDIF
;        EXIT
;
;***********************************************************************
```

ACTUAL PROGRAM CODE FOR CONTROL UNIT (DIGITAL SERIAL INTERFACE)
STATE TABLE CHECK SUM ACTION ROUTINE (CCM_STCK)
WRITTEN IN ASSEMBLY LANGUAGE

APP. ITEM 6b (1)

```
CODESEG        SEGMENT CODE
               RSEG    CODESEG
               PUBLIC  CCM_STCK
               EXTRN   BIT(CHANFG.SNSQFG.INIT_CONST,GUARD_INIT,PTT_INIT)
               EXTRN   BIT(GRP_ACT_FG,MOD_FLAG)
               EXTRN   DATA(REAL_CLOCK1,LAST_TIME)
               EXTRN   XDATA(RX_BEG,TABLE_CKSUM)
               EXTRN   XDATA(ENDOFTABLE,ACTIVE_GRP,GRP_PARAM)
               EXTRN   CODE(CD8000)
```

ACTUAL PROGRAM CODE FOR CONTROL UNIT (DIGITAL SERIAL INTERFACE)
STATE TABLE CHECK SUM ACTION ROUTINE (CCM_STCK)
WRITTEN IN ASSEMBLY LANGUAGE

APP. ITEM 6b (2)

ACTUAL PROGRAM CODE FOR CONTROL UNIT (DIGITAL SERIAL INTERFACE) STATE TABLE CHECK SUM ACTION ROUTINE (CCM STCK) WRITTEN IN ASSEMBLY LANGUAGE APP. ITEM 6b (3)

```
0000                    CCM_STCK   EQU    $                 ;entry point
0000  90 00 02   ..E.              MOV    DPTR,#RX_BEG+2    ;point to first byte of health status
0003  E0                           MOVX   A,@DPTR           ;get first health status
0004  90 00 00   ..E.              MOV    DPTR,#TABLE_CKSUM ;get state table check sum address
0007  F0                           MOVX   @DPTR,A           ;save table check sum
0008  78 00                        MOV    R0,#0             ;starting address of state table
```

```
000A   79 00                       MOV     R1,#0                   ;initial check sum value
000C   7A 00      .E..             MOV     R2,#ENDOFTABLE          ;size of the state table
                          STCK100:
000E   E2                          MOVX    A,@R0                   ;get state variable
000F   29                          ADD     A,R1                    ;add to last check sum
0010   F9                          MOV     R1,A                    ;save it
0011   08                          INC     R0                      ;point to next address
0012   DA FA      .R..             DJNZ    R2,STCK100              ;loop
                          ;*************************************************************************
                          ;
                          ;              CALCULATE GROUP TABLE CHECK SUM
                          ;
                          ;*************************************************************************
0014   90 00 00   ..E.             MOV     DPTR,#ACTIVE_GRP        ;starting address of current group
0017   7A FF                       MOV     R2,#0FFH                ;first 255 bytes
                          STCK200:
0019   E0                          MOVX    A,@DPTR
001A   29                          ADD     A,R1
001B   F9                          MOV     R1,A
001C   A3                          INC     DPTR
001D   DA FA      .R..             DJNZ    R2,STCK200
001F   7A 01      .E..             MOV     R2,#(GRP_PARAM-0FFH)    ;rest of the byte in group table
                          STCK300:
0021   E0                          MOVX    A,@DPTR
0022   29                          ADD     A,R1
0023   F9                          MOV     R1,A
0024   A3                          INC     DPTR
0025   DA FA      .R..             DJNZ    R2,STCK300
0027   90 00 00   ..E.             MOV     DPTR,#TABLE_CKSUM
002A   E0                          MOVX    A,@DPTR                 ;get received table check sum
002B   C3                          CLR     C
002C   99                          SUBB    A,R1                    ;compare to calculated value
002D   60 11      .R..             JZ      STCK990
                          ;*************************************************************************
                          ;
                          ;       STATE TABLE CHECK SUM NOT MATCH
                          ;
                          ;*************************************************************************
002F   85 00 00   .EE.             MOV     LAST_TIME,REAL_CLOCK1   ;reset health check time
0032   D2 00      .E..             SETB    CHANFG                  ;set channel change flag
0034   D2 00      .E..             SETB    SNSQFG                  ;set squelch change flag
0036   D2 00      .E..             SETB    GRP_ACT_FG              ;set group change flag
0038   D2 00      .E..             SETB    MOD_FLAG                ;set send mode flag
003A   D2 00      .E..             SETB    INIT_CONST              ;set send initial constant flag
003C   D2 00      .E..             SETB    GUARD_INIT              ;set guard init
003E   D2 00      .E..             SETB    PTT_INIT                ;set PTT init
                          STCK990:
0040   02 00 00   ..E.             LJMP    CDB000                  ;jump back
0043                               END

Assembler Errors =      0
```

ACTUAL PROGRAM CODE FOR CONTROL UNIT (DIGITAL SERIAL INTERFACE)
STATE TABLE CHECK SUM ACTION ROUTINE (CCM STCK)
WRITTEN IN ASSEMBLY LANGUAGE

APP. ITEM 6b (4)

Cross Reference

| Label | Value | Reference | |
|---|---|---|---|
| ACTIVE_GRP:XDATA | E 100C | 70 | |
| CCM_STCK:CODESEG | C 0000 | 43 | -51 |
| CDB000:CODE | E 080E | 49 | 104 |
| CHANFG:BIT | E 2800 | 44 | 96 |
| ENDOFTABLE:XDATA | E 100B | 48 | 58 |
| GRP_ACT_FG:BIT | E 2805 | 45 | 98 |
| GRP_PARAM:XDATA | E 100D | 78 | |
| GUARD_INIT:BIT | E 2803 | 101 | |
| INIT_CONST:BIT | E 2802 | 100 | |
| LAST_TIME:DATA | E 1808 | 95 | |
| MOD_FLAG:BIT | E 2806 | 99 | |
| PTT_INIT:BIT | E 2804 | 102 | |
| REAL_CLOCK1:DATA | E 1807 | 46 | 95 |
| RX_BEG:XDATA | E 1009 | 47 | 52 |
| SNSQFG:BIT | E 2801 | 97 | |
| STCK100:CODESEG | C 000E | -59 | 64 |
| STCK200:CODESEG | C 0019 | -72 | 77 |
| STCK300:CODESEG | C 0021 | -79 | 84 |
| STCK990:CODESEG | C 0040 | 89 | -103 |
| TABLE_CKSUM:XDATA | E 100A | 54 | 85 |

ACTUAL PROGRAM CODE FOR CONTROL UNIT (DIGITAL SERIAL INTERFACE)
STATE TABLE CHECK SUM ACTION ROUTINE (CCM_STCK)
WRITTEN IN ASSEMBLY LANGUAGE

APP. ITEM 6b (5)

---

```
        Microtec ASM51  Ver 2.0g
PCM COMMAND TRANSMIT HANDLER

Err  Line  Addr  Object        Type

                                    $XREF DEBUG TITLE(PCM COMMAND TRANSMIT HANDLER)
                                                     NAME    CTX_CMD
                                    ;***********************************************************************
                                    ;
                                    ;MODULE NAME: CTX_CMD
                                    ;        (C) Copyright 1987 Teletec Corporation, U.S.A.
                                    ;AUTHOR: Ming Hsu
                                    ;CODE COMPLETE: 05/23/86
                                    ;LAST MODIFICATION: 10/31/86
                                    ;PERFORMED BY: Ming Hsu
                                    ;TEST/DEBUG:
                                    ;
                                    ;REVISION NUMBER: new
                                    ;
                                    ;DESCRIPTION: This module will execute in response to a PCM transmit command
                                    ;             interrupt. This module will be responsible for removing data
                                    ;             from the data buffer and storing the data in PCM transmit command
                                    ;             latch.
                                    ;
                                    ;INPUTS:
                                    ;
```

```
;OUTPUTS:
;
;REGISTER USAGE;
;
;SUPPORT MODULES:
;
;SIZE:
;
;EXECUTION TIME:
;                Normal Case = 47 us
;                Last byte case = 25 us
;PDL:
;        IF (byte count equal to zero)
;           set rfu response pending flag
;           change PCM mode to data mode
;           enable pcm rx interrupt
;        ELSE
;           decrease byte count
;           get current data byte
;           send data to PCM command port
;        ENDIF
;        EXIT
;
;***********************************************************************
```

ACTUAL PROGRAM CODE FOR CONTROL UNIT (DIGITAL SERIAL INTERFACE)
PCM COMMAND TRANSMIT HANDLER (CTX_CMD)
WRITTEN IN ASSEMBLY LANGUAGE

APP. ITEM 6c (1)

---

```
CODESEG         SEGMENT CODE
                RSEG    CODESEG
                PUBLIC  TX_COMMAND
                EXTRN   BIT(TX_CHECK)
                EXTRN   CODE(PORT3A,STATUS,TX_INT_OFF,CONT3,RX_INT_ON,PI9000)
                EXTRN   XDATA(TX_HEAD,TX_NUMBER,TX_TIMER)
                EXTRN   DATA(REAL_CLOCK)
```

ACTUAL PROGRAM CODE FOR CONTROL UNIT (DIGITAL SERIAL INTERFACE)
PCM COMMAND TRANSMIT HANDLER (CTX_CMD)
WRITTEN IN ASSEMBLY LANGUAGE

APP. ITEM 6c (2)

ACTUAL PROGRAM CODE FOR CONTROL UNIT (DIGITAL SERIAL INTERFACE) PCM COMMAND TRANSMIT HANDLER (CTX_CMD) WRITTEN IN ASSEMBLY LANGUAGE
APP. ITEM 6c (3)

```
;***********************************************************************
;
;        check and adjust byte count
;
;***********************************************************************
```

```
 60  0000                         TX_COMMAND    EQU    $                  ;entry point
 61  0000  90 00 00    ..E.                     MOV    DPTR,#TX_NUMBER    ;load address of the byte count
 62  0003  E0                                   MOVX   A,@DPTR            ;get number of bytes in TX buffer
 63  0004  60 21       .R..                     JZ     TXC500             ;if byte count equal zero, go to end of TX servi

 64  0006  14                                   DEC    A                  ;decrease byte count
 65  0007  F0                                   MOVX   @DPTR,A            ;save current byte count
 66  0008  90 00 00    ..E.                     MOV    DPTR,#TX_HEAD      ;point to current byte address pointer
 67  000B  E0                                   MOVX   A,@DPTR            ;get current data pointer(low byte)
 68  000C  F9                                   MOV    R1,A               ;save the value
 69  000D  A3                                   INC    DPTR               ;point to high byte
 70  000E  E0                                   MOVX   A,@DPTR            ;get high byte
 71  000F  89 82       .D..                     MOV    DPL,R1
 72  0011  F5 83       .D..                     MOV    DPH,A              ;load pointer
 73  0013  E0                                   MOVX   A,@DPTR            ;get data
 74  0014  A3                                   INC    DPTR               ;point to next byte
 75  0015  A9 82       .D..                     MOV    R1,DPL             ;save current pointer
 76  0017  AA 83       .D..                     MOV    R2,DPH             ;save current pointer
 77  0019  90 00 00    ..E.                     MOV    DPTR,#PORT3A       ;load PCM command output port address
 78  001C  F0                                   MOVX   @DPTR,A            ;send data to port
 79  001D  90 00 00    ..E.                     MOV    DPTR,#TX_HEAD      ;load buffer head
 80  0020  E9                                   MOV    A,R1
 81  0021  F0                                   MOVX   @DPTR,A            ;save current data pointer
 82  0022  A3                                   INC    DPTR
 83  0023  EA                                   MOV    A,R2
 84  0024  F0                                   MOVX   @DPTR,A            ;save current data pointer
 85  0025  80 14       .R..                     SJMP   TXC990             ;branch to exit
 86                               TXC500:
 87  0027  90 00 00    ..E.                     MOV    DPTR,#CONT3        ;get control port address
 88  002A  74 00       .E..                     MOV    A,#STATUS          ;get command to change PCM mode to data mode
 89  002C  F0                                   MOVX   @DPTR,A            ;write to the port
 90  002D  74 00       .E..                     MOV    A,#TX_INT_OFF      ;get command to disable tx interrupt
 91  002F  F0                                   MOVX   @DPTR,A            ;write command to 8255
 92  0030  74 00       .E..                     MOV    A,#RX_INT_ON       ;get command to enable RX interrupt
 93  0032  F0                                   MOVX   @DPTR,A            ;write command to 8255
 94  0033  D2 00       .E..                     SETB   TX_CHECK           ;indicate to exec that RFU response pending
 95  0035  90 00 00    ..E.                     MOV    DPTR,#TX_TIMER     ;get address of transmit response timer
 96  0038  E5 00       .E..                     MOV    A,REAL_CLOCK       ;get current value of real time clock
 97  003A  F0                                   MOVX   @DPTR,A            ;update transmit timer
 98                               TXC990:
 99  003B  02 00 00    ..E.                     LJMP   PI9000             ;return to calling routine
100  003E                                       END

Assembler Errors =      0
```

Cross Reference

| Label | Value | Reference | |
|---|---|---|---|
| CONT3:CODE | E 0804 | 89 | |
| PI9000:CODE | E 0806 | 101 | |
| PORT3A:CODE | E 0801 | 53 | 79 |
| REAL_CLOCK:DATA | E 180A | 55 | 98 |
| RX_INT_ON:CODE | E 0805 | 94 | |
| STATUS:CODE | E 0802 | 90 | |
| TXC500:CODESEG | C 0027 | 65 | -88 |
| TXC990:CODESEG | C 003B | 87 | -100 |

```
TX_CHECK:BIT            E 2800    52    96
TX_COMMAND:CODESEG      C 0000    51   -62
TX_HEAD:XDATA           E 1007    54    68    81
TX_INT_OFF:CODE         E 0803    92
TX_NUMBER:XDATA         E 1008    63
TX_TIMER:XDATA          E 1009    97
```

ACTUAL PROGRAM CODE FOR CONTROL UNIT (DIGITAL SERIAL INTERFACE)
PCM COMMAND TRANSMIT HANDLER (CTX_CMD)
WRITTEN IN ASSEMBLY LANGUAGE

APP. ITEM 6c (4)

```
$XREF DEBUG TITLE(PCM COMMAND MESSAGE PREPARATION MODULE)
        NAME    CPREP_ME
;*****************************************************************************
;
;MODULE NAME: CPREP_ME
;
;       (c) Copyright 1987 Teletec Corporation, U.S.A.
;
;CODE COMPLETE: 05/22/86
;LAST MODIFICATION: 03/17/87
;TEST/DEBUG:
;
;REVISION NUMBER: new
;
;DESCRIPTION: This routine transfers PCM message to TX buffer and
;             calculate check sum. Change the PCM mode to command
;             mode and enable TX interrupt.
;
;INPUTS:
;       R0 = number of bytes need to be transfer
;            (not include SOH and check sum )
;       R1 = starting point of the message (in first page).
;       R2 = OPCODE
;
;OUTPUTS: PCM message in TX buffer
;
;REGISTERS USAGE: R0, R1, R2, ACC, DPTR, PSW
;
;SUPPORT MODULES: none
;
;SIZE:
;
;EXECUTION TIME:
;
;PDL:
;       reset TX buffer pointer
;       transfer command to TX buffer
;       send SOH to PCM command output port
;       set PCM mode to command mode( TX interrupt will be enable by hardware )
;       EXIT
;
;*****************************************************************************
```

ACTUAL PROGRAM CODE FOR CONTROL UNIT (DIGITAL SERIAL INTERFACE)
PCM COMMAND MESSAGER PREPARATION MODULE (CPREP_ME)
WRITTEN IN ASSEMBLY LANGUAGE

APP. ITEM 6d (1)

```
                        CODESEG         SEGMENT CODE
                                        RSEG    CODESEG
                                        PUBLIC  PREP_MESS
                                        EXTRN   CODE(COMMAND,PORT3A,SOH,TX_INT_ON,CONT3)
                                        EXTRN   DATA(PORT2)
                                        EXTRN   XDATA(TX_BEG,TX_HEAD,TX_NUMBER,TX_NUMBER2)
                                        EXTRN   BIT(TX_EMPTY)
```

ACTUAL PROGRAM CODE FOR CONTROL UNIT (DIGITAL SERIAL INTERFACE)
PCM COMMAND MESSAGE PREPARATION MODULE (CPREP_ME)
WRITTEN IN ASSEMBLY LANGUAGE

APP. ITEM 6d (2)

```
                        ;**************************************************************************
                        ;
                        ;       Set up TX buffer pointer
                        ;
                        ;**************************************************************************
0000                    PREP_MESS       EQU     $                       ;entry point
0000 90 00 00   ..E.                    MOV     DPTR,#TX_NUMBER2        ;load address of the second byte count
0003 E8                                 MOV     A,R0                    ;get number of bytes needed to be sent
0004 04                                 INC     A                       ;byte count plus check sum
0005 F0                                 MOVX    @DPTR,A                 ;store byte count in the buffer
0006 90 00 00   ..E.                    MOV     DPTR,#TX_NUMBER         ;load address of the byte count
0009 F0                                 MOVX    @DPTR,A                 ;load byte count
000A 90 00 00   ..E.                    MOV     DPTR,#TX_HEAD           ;load address of the buffer pointer
000D 74 00      .E..                    MOV     A,#LOW(TX_BEG)          ;get low byte of the starting point
000F F0                                 MOVX    @DPTR,A                 ;save low byte of TX starting point
0010 A3                                 INC     DPTR                    ;point to next location
0011 74 00      .E..                    MOV     A,#HIGH(TX_BEG)         ;get high byte of the starting point
0013 F0                                 MOVX    @DPTR,A                 ;save TX buffer starting point(low byte)
                        ;**************************************************************************
                        ;
                        ;       Transfer message to TX buffer and calculate check sum
                        ;
                        ;**************************************************************************
0014 90 00 00   ..E.                    MOV     DPTR,#TX_BEG            ;load begin address of TX buffer
0017 EA                                 MOV     A,R2                    ;get OPCODE
0018 F0                                 MOVX    @DPTR,A                 ;load to buffer
0019 FB                                 MOV     R3,A                    ;first check sum
001A 18                                 DEC     R0                      ;decrease byte count
001B E8                                 MOV     A,R0                    ;get byte count
001C 60 08      .R..                    JZ      PREP20                  ;no more data
                        PREP10:
001E A3                                 INC     DPTR                    ;point to next location
001F E3                                 MOVX    A,@R1                   ;get command data from external memory
0020 F0                                 MOVX    @DPTR,A                 ;load value to TX buffer
0021 2B                                 ADD     A,R3                    ;calculate check sum
0022 FB                                 MOV     R3,A                    ;move check sum to temporary storage
0023 09                                 INC     R1                      ;point to next byte
0024 D8 F8      .R..                    DJNZ    R0,PREP10               ;check end of message
                        PREP20:
0026 A3                                 INC     DPTR                    ;point to location for check sum
```

```
0027  EB                   MOV     A,R3                 ;get check sum
0028  F0                   MOVX    @DPTR,A              ;load check sum in TX buffer
             ;*******************************************************************
             ;
             ;     Send out SOH and change the PCM mode to command
             ;
             ;*******************************************************************
0029  90 00 00    ..E.     MOV     DPTR,#PORT3A         ;load PCM command address
002C  74 00       .E..     MOV     A,#SOH               ;load start of header
002E  F0                   MOVX    @DPTR,A              ;load data to the port
002F  90 00 00    ..E.     MOV     DPTR,#CONT3          ;PCM C/D address
0032  74 00       .E..     MOV     A,#COMMAND           ;change PCM mode to command
0034  F0                   MOVX    @DPTR,A              ;write back out to the port
0035  74 00       .E..     MOV     A,#TX_INT_ON         ;get command to enable tx interrupt
0037  F0                   MOVX    @DPTR,A              ;write command to 8255
0038  D2 00       .E..     SETB    TX_EMPTY             ;set tx buffer full state flag
003A  22                   RET                          ;return to caller
003B                       END

Assembler Errors =    0
```

ACTUAL PROGRAM CODE FOR CONTROL UNIT (DIGITAL SERIAL INTERFACE)
PCM COMMAND MESSAGE PREPARATION MODULE (CPREP_ME)
WRITTEN IN ASSEMBLY LANGUAGE

```
Label                  Value    Reference
COMMAND:CODE           E 0800     47   103
CONT3:CODE             E 0804    102
PORT2:DATA             E 1805     48
PORT3A:CODE            E 0801     99
PREP10:CODESEG         C 001E    -82    89
PREP20:CODESEG         C 0026     81   -90
PREP_MESS:CODESEG      C 0000     46   -57
SOH:CODE               E 0802    100
TX_BEG:XDATA           E 1006     49    65    68    75
TX_EMPTY:BIT           E 280A     50   107
TX_HEAD:XDATA          E 1007     64
TX_INT_ON:CODE         E 0803    105
TX_NUMBER:XDATA        E 1008     62
TX_NUMBER2:XDATA       E 1009     58
```

ACTUAL PROGRAM CODE FOR CONTROL UNIT (DIGITAL SERIAL INTERFACE)
PCM COMMAND MESSAGE PREPARATION MODULE (CPREP_ME)
WRITTEN IN ASSEMBLY LANGUAGE

APP. ITEM 6d (5)

```
$XREF DEBUG TITLE(PCM ERROR RESET)
                NAME    CPCMRES
;*******************************************************************
;
;MODULE NAME: CPCMRES
;
;       (c) Copyright 1987 Teletec Corporation, U.S.A.
;
;AUTHOR: Ming Hsu
;CODE COMPLETE: 10/23/86
;LAST MODIFICATION: 3/17/87
```

```
;PERFORMED BY: John Fussell
;TEST/DEBUG:
;
;REVISION NUMBER: new
;
;DESCRIPTION: This module will be responsible for reset PCM interrupt jam
;               by clear TX and RX interrupt and all the related parameters.
;
;INPUTS:
;
;OUTPUTS:
;
;REGISTER USAGE:
;
;SUPPORT MODULES:
;
;SIZE:
;
;EXECUTION TIME:
;
;PDL:   clear pcm tx interrupt
;       clear pcm rx interrupt
;       reset pcm rx buffer pointer
;       EXIT
;
;*************************************************************************
```

ACTUAL PROGRAM CODE FOR CONTROL UNIT (DIGITAL SERIAL INTERFACE)
PCM ERROR RESET (CPCMRES)
WRITTEN IN ASSEMBLY LANGUAGE

APP. ITEM 6e (1)

```
CODESEG         SEGMENT CODE
                RSEG    CODESEG
                PUBLIC  CPCMRES
                EXTRN   BIT(PCMTXINT,PCMRXINT,TX_CHECK,TX_EMPTY)
                EXTRN   CODE(PORT1B,PORT3A,STATUS,TX_INT_OFF,CONT3,RX_INT_ON)
                EXTRN   CODE(PORT3B,RX_INT_OFF)
                EXTRN   XDATA(RX_BEG,RX_HEAD,RX_TAIL,TX_HEAD,TX_NUMBER)
                EXTRN   DATA(RX_OPCODE,PCM_ERR_CNT)
```

ACTUAL PROGRAM CODE FOR CONTROL UNIT (DIGITAL SERIAL INTERFACE)
PCM ERROR RESET (CPCMRES)
WRITTEN IN ASSEMBLY LANGUAGE

APP.ITEM 6e (2)

```
0000                    CPCMRES   EQU    $                   ;entry point
0000  90 00 00   ..E.             MOV    DPTR,#PORT1B
0003  E0                          MOVX   A,@DPTR
0004  20 00 37   .ER.             JB     PCMRXINT,PCMRES990
0007  20 00 34   .ER.             JB     PCMTXINT,PCMRES990
```

```
                                ;**********************************************************************
                                ;
                                ;       CLEAR TX INTERRUPT
                                ;
                                ;**********************************************************************
000A  90 00 00     ..E.                 MOV     DPTR,#CONT3             ;get control port address
000D  74 00        .E..                 MOV     A,#STATUS               ;get command to change PCM mode to data mode
000F  F0                                MOVX    @DPTR,A                 ;write to the port
0010  74 00        .E..                 MOV     A,#TX_INT_OFF           ;get command to disable tx interrupt
0012  F0                                MOVX    @DPTR,A                 ;write command to 8255
0013  74 00        .E..                 MOV     A,#RX_INT_ON            ;get command to enable RX interrupt
0015  F0                                MOVX    @DPTR,A                 ;write command to 8255
0016  90 00 00     ..E.                 MOV     DPTR,#TX_NUMBER         ;clear TX number
0019  74 00                             MOV     A,#0
001B  F0                                MOVX    @DPTR,A
                                ;**********************************************************************
                                ;
                                ;       CLEAR RX INTERRUPT
                                ;
                                ;**********************************************************************
001C  75 00 00     .E..                 MOV     RX_OPCODE,#0            ;reset expect op code
001F  74 00        .E..                 MOV     A,#LOW(RX_BEG)          ;low byte of RX buffer starting address
0021  90 00 00     ..E.                 MOV     DPTR,#RX_HEAD
0024  F0                                MOVX    @DPTR,A
0025  74 00        .E..                 MOV     A,#HIGH(RX_BEG)         ;high byte of RX buffer starting address
0027  A3                                INC     DPTR
0028  F0                                MOVX    @DPTR,A
0029  90 00 00     ..E.                 MOV     DPTR,#PORT3B
002C  E0                                MOVX    A,@DPTR                 ;dummy read
                                ;*****************************************************************
                                ;
                                ;       Reset RX_TAIL to starting address
                                ;
                                ;*****************************************************************
002D  90 00 00     ..E.                 MOV     DPTR,#RX_TAIL           ;RX tail address
0030  74 00        .E..                 MOV     A,#LOW(RX_BEG)          ;receive buffer starting address
0032  F0                                MOVX    @DPTR,A
0033  A3                                INC     DPTR
0034  74 00        .E..                 MOV     A,#HIGH(RX_BEG)
0036  F0                                MOVX    @DPTR,A
0037  75 00 00     .E..                 MOV     PCM_ERR_CNT,#0          ;reset pcm error counter
003A  C2 00        .E..                 CLR     TX_CHECK                ;clear transmit check bit
003C  C2 00        .E..                 CLR     TX_EMPTY                ;indicate buffer no longer full
                                PCMRES990:
003E  22                                RET
003F                                    END

Assembler Errors =      0
```

ACTUAL PROGRAM CODE FOR CONTROL UNIT (DIGITAL SERIAL INTERFACE)

PCM ERROR RESET (CPCMRES)
WRITTEN IN ASSEMBLY LANGUAGE

APP. ITEM 6e (4)

Cross Reference

```
Label                  Value    Reference
CONT3:CODE             E 0808    58
CPCMRES:CODESEG        C 0000    41   -48
PCMRES990:CODESEG      C 003E    51    52   -96
PCMRXINT:BIT           E 2801    51
PCMTXINT:BIT           E 2800    42    52
PCM_ERR_CNT:DATA       E 1812    93
PORT1B:CODE            E 0804    43    49
PORT3A:CODE            E 0805    0
PORT3B:CODE            E 080A    44    80
RX_BEG:XDATA           E 100C    45    74    77    88    91
RX_HEAD:XDATA          E 100D    75
RX_INT_OFF:CODE        E 080B    0
RX_INT_ON:CODE         E 0809    63
RX_OPCODE:DATA         E 1811    46    73
RX_TAIL:XDATA          E 100E    87
STATUS:CODE            E 0806    59
TX_CHECK:BIT           E 2802    94
TX_EMPTY:BIT           E 2803    95
TX_HEAD:XDATA          E 100F    0
TX_INT_OFF:CODE        E 0807    61
TX_NUMBER:XDATA        E 1010    65
```

ACTUAL PROGRAM CODE FOR CONTROL UNIT (DIGITAL SERIAL INTERFACE)
PCM ERROR RESET (CPCMRES)
WRITTEN IN ASSEMBLY LANGUAGE

APP. ITEM 6e (5)

```
$XREF DEBUG TITLE(HEALTH ACTION ROUTINE)
                NAME    CCM_HLTH
;*************************************************************************
;
;MODULE NAME: CCM_HLTH
;
;       (c) Copyright 1987 Teletec Corporation, U.S.A.
;
;AUTHOR: Ming Hsu
;CODE COMPLETE: 08/26/86
;LAST MODIFICATION: 01/21/87
;PERFORMED BY: Ming Hsu
;TEST/DEBUG:
;
;REVISION NUMBER: new
;
;DESCRIPTION: This module takes the received health byte and put in
;             HEALTH bits
;
;INPUTS: HEALTH STATUS from RFU
;
;OUTPUTS:
;
;REGISTER USAGE: A, DPTR
;
;SUPPORT MODULES: none
;
;SIZE:
```

```
                                    ;
                                    ;EXECUTION TIME:
                                    ;
                                    ;PDL:
                                    ;
                                    ;*************************************************************************
```

ACTUAL PROGRAM CODE FOR CONTROL UNIT (DIGITAL SERIAL INTERFACE)
HEALTH ACTION ROUTINE (CCM HLTH)
WRITTEN IN ASSEMBLY LANGUAGE

APP. ITEM 6f (1)

```
                         CODESEG      SEGMENT CODE
                                      RSEG    CODESEG
                                      PUBLIC  CCM_HLTH
                                      EXTRN   BIT(PTT_OUT_FG,MOD_OUT_FG)
                                      EXTRN   DATA(HEALTHSTAT1,HEALTHSTAT2)
                                      EXTRN   XDATA(RX_BEG)
                                      EXTRN   CODE(CDB000)
```

ACTUAL PROGRAM CODE FOR CONTROL UNIT (DIGITAL SERIAL INTERFACE)
HEALTH ACTION ROUTINE (CCM HEALTH)
WRITTEN IN ASSEMBLY LANGUAGE

APP. ITEM 6f (2)

```
0000                     CCM_HLTH     EQU     $                     ;entry point
0000  90 00 02   ..E.                 MOV     DPTR,#RX_BEG+2        ;point to first byte of health status
0003  E0                              MOVX    A,@DPTR               ;get first health status
0004  F8                              MOV     R0,A                  ;load health status to RAM bits
0005  A3                              INC     DPTR                  ;point to second byte
0006  E0                              MOVX    A,@DPTR               ;get second health status
0007  F9                              MOV     R1,A                  ;load health status to RAM bits
0008  A3                              INC     DPTR
0009  E0                              MOVX    A,@DPTR
000A  13                              RRC     A
000B  50 04      .R..                 JNC     HLTH100
000D  D2 00      .E..                 SETB    PTT_OUT_FG            ;PTT time out
000F  80 02      .R..                 SJMP    HLTH150
                         HLTH100:
0011  C2 00      .E..                 CLR     PTT_OUT_FG
                         HLTH150:
0013  13                              RRC     A
0014  50 04      .R..                 JNC     HLTH200
0016  D2 00      .E..                 SETB    MOD_OUT_FG            ;no modulation time out
0018  80 02      .R..                 SJMP    HLTH250
                         HLTH200:
001A  C2 00      .E..                 CLR     MOD_OUT_FG
                         HLTH250:
001C  90 00 00   ..E.                 MOV     DPTR,#HEALTHSTAT1     ;get health status address
001F  E8                              MOV     A,R0
0020  F0                              MOVX    @DPTR,A               ;update new health status
0021  90 00 00   ..E.                 MOV     DPTR,#HEALTHSTAT2
0024  E9                              MOV     A,R1
0025  F0                              MOVX    @DPTR,A               ;update new health status
0026  02 00 00   ..E.                 LJMP    CDB000                ;jump back
0029                                  END
Assembler Errors =    0
```

ACTUAL PROGRAM CODE FOR CONTROL UNIT (DIGITAL SERIAL INTERFACE)
HEALTH ACTION ROUTINE (CCM HLTH)
WRITTEN IN ASSEMBLY LANGUAGE

APP. ITEM 6f (3)

```
Label                  Value    Reference
CCM_HLTH:CODESEG       C 0000     38   -44
CD8000:CODE            E 0805     42    73
HEALTHSTAT1:DATA       E 1802     40    67
HEALTHSTAT2:DATA       E 1803     70
HLTH100:CODESEG        C 0011     54   -57
HLTH150:CODESEG        C 0013     56   -59
HLTH200:CODESEG        C 001A     61   -64
HLTH250:CODESEG        C 001C     63   -66
MOD_OUT_FG:BIT         E 2801     62    65
PTT_OUT_FG:BIT         E 2800     39    55    58
RX_BEG:XDATA           E 1004     41    45
```

ACTUAL PROGRAM CODE FOR CONTROL UNIT (DIGITAL SERIAL INTERFACE)
HEALTH ACTION ROUTINE (CCM HLTH)
WRITTEN IN ASSEMBLY LANGUAGE

APP. ITEM 6f (4)

```
$XREF DEBUG TITLE(SCAN STATUS RESPONSE HANDLER)
                NAME    CCM_SCAN
;***********************************************************************
;
;MODULE NAME: CCM_SCAN
;
;       (c) Copyright 1987 Teletec Corporation, U.S.A
;
;AUTHOR: John Fussell
;CODE COMPLETE: 08/29/86
;LAST MODIFICATION: 08/30/86
;PERFORMED BY: John Fussell
;TEST/DEBUG:
;
;REVISION NUMBER: new
;
;DESCRIPTION: This module is responsible for handling the scan status
;             response from the rf unit. Also the old scan status will
;             be updated with current scan status prior to updating the
;             current scan status with the rfu response.
;
;INPUTS: RX_BEG - pcm receive buffer.
;        SCAN_STATUS - current scan status.
;
;OUTPUTS: SCAN_STATUS - updated with new data from RFU.
;         OLD_SCNSTAT - updated from current scan status.
;
;REGISTER USAGE: A, DPTR
;
;SUPPORT MODULES: none
;
;SIZE:
;
```

```
34                      ;EXECUTION TIME:
35                      ;
36                      ;PDL:
37                      ;
38                      ;**************************************************************************
```

ACTUAL PROGRAM CODE FOR CONTROL UNIT (DIGITAL SERIAL INTERFACE)
SCAN STATUS RESPONSE HANDLER (CCM_SCAN)
WRITTEN IN ASSEMBLY LANGUAGE

APP. ITEM 6g (1)

```
40                      CODESEG         SEGMENT CODE
41                                      RSEG    CODESEG
42                                      PUBLIC  CCM_SCAN
43                                      EXTRN   BIT(GUARD)
44                                      EXTRN   XDATA(RX_BEG,SCAN_STATUS,OLD_SCNSTAT)
45                                      EXTRN   CODE(CD8000)
```

ACTUAL PROGRAM CODE FOR CONTROL UNIT (DIGITAL SERIAL INTERFACE)
SCAN STATUS RESPONSE HANDLER (CCM_SCAN)
WRITTEN IN ASSEMBLY LANGUAGE

APP. ITEM 6g (2)

```
47  0000                    CCM_SCAN    EQU     $                   ;entry point
48  0000  90 00 00   ..E.               MOV     DPTR,#SCAN_STATUS   ;get address of scan status state variable
49  0003  E0                            MOVX    A,@DPTR             ;get current scan status
50  0004  90 00 00   ..E.               MOV     DPTR,#OLD_SCNSTAT   ;get address of old scan status state variable
51  0007  F0                            MOVX    @DPTR,A             ;update state variable
52  0008  90 00 02   ..E.               MOV     DPTR,#RX_BEG+2      ;point to new scan status
53  000B  E0                            MOVX    A,@DPTR             ;get scan status
54  000C  90 00 00   ..E.               MOV     DPTR,#SCAN_STATUS   ;get address of scan status state variable
55  000F  F0                            MOVX    @DPTR,A             ;update state variable
56  0010  30 00 01   .ER.               JNB     GUARD,SCAN999
57  0013  00                            NOP
58                          SCAN999:
59  0014  02 00 00   ..E.               LJMP    CD8000              ;return to the command dispatch function
60  0017                                END

Assembler Errors =      0
```

ACTUAL PROGRAM CODE FOR CONTROL UNIT (DIGITAL SERIAL INTERFACE)
SCAN STATUS RESPONSE HANDLER (CCM_SCAN)
WRITTEN IN ASSEMBLY LANGUAGE

APP. ITEM 6g (3)

Cross Reference

| Label | Value | Reference | |
|---|---|---|---|
| CCM_SCAN:CODESEG | C 0000 | 42 | -47 |
| CD8000:CODE | E 0804 | 45 | 59 |
| GUARD:BIT | E 2800 | 43 | 56 |
| OLD_SCNSTAT:XDATA | E 1003 | 50 | |
| RX BEG:XDATA | E 1001 | 44 | 52 |

```
SCAN999:CODESEG        C 0014     56   -58
SCAN_STATUS:XDATA      E 1002     48    54
```

ACTUAL PROGRAM CODE FOR CONTROL UNIT (DIGITAL SERIAL INTERFACE)
SCAN STATUS RESPONSE HANDLER (CCM_SCAN)
WRITTEN IN ASSEMBLY LANGUAGE

APP. ITEM 6g (4)

```
$XREF DEBUG TITLE(EXTERNAL INTERRUPT ZERO HANDLER)
                NAME    CINTZERO
;***********************************************************************
;
;MODULE NAME: CINTZERO
;
;       (C) Copyright 1987 Teletec Corporation, U.S.A.
;
;AUTHOR: John Fussell
;CODE COMPLETE: 05/08/86
;LAST MODIFICATION: 03/17/87
;PERFORMED BY: John Fussell
;TEST/DEBUG:
;
;REVISION NUMBER: new
;
;DESCRIPTION: This module performs a dispatch function for the external
;              interrupt zero. Determination will be made as to whether
;              interrupt occured due to a PCM transmit command and PCM receive
;              command. and control will be passed to an appropriate handler.
;              This module will handle termination of the interrupt once the
;              handler completes processing.
;
;INPUTS: none
;
;OUTPUTS:none
;
;REGISTER USAGE: ACC, DPTR
;
;SUPPORT MODULES: RX_COMMAND - pcm receive data handler.
;                 TX_COMMAND - pcm transmit data handler.
;
;SIZE:
;
;EXECUTION TIME:
;
;PDL:
;       save working registers on the stack
;       read interrupt status port
;       IF ( interrupt was a PCM receive interrupt )
;               execute PCM receive message handler
;       ELSE (interrupt was a PCM transmit interrupt )
;               execute PCM transmit message handler
;       ENDIF
;       restore working registers from the stack
;       EXIT
;
;***********************************************************************
```

ACTUAL PROGRAM CODE FOR CONTROL UNIT (DIGITAL SERIAL INTERFACE) EXTERNAL INTERRUPT ZERO HANDLER (CINTZERO)
WRITTEN IN ASSEMBLY LANGUAGE
APP. ITEM 6h (1)

```
                              CODESEG      SEGMENT CODE
                                           RSEG    CODESEG
                                           PUBLIC  INT_ZERO,PI9000
                                           EXTRN   CODE(RX_COMMAND,TX_COMMAND,PORT1B)
                                           EXTRN   BIT(PCMTXINT,PCMRXINT)
```

ACTUAL PROGRAM CODE FOR CONTROL UNIT (DIGITAL SERIAL INTERFACE)
EXTERNAL INTERRUPT ZERO HANDLER (CINTZERO)
WRITTEN IN ASSEMBLY LANGUAGE

APP. ITEM 6h (2)

```
                              ;*******************************************************************
                              ;
                              ;       INTERRUPT HOUSEKEEPING
                              ;
                              ;*******************************************************************
0000                          INT_ZERO     EQU     $                   ;entry point
0000  C0 E0       .D..                     PUSH    ACC                 ;save contents of ACC during interrupt
0002  C0 F0       .D..                     PUSH    B                   ;save contents of B
0004  C0 82       .D..                     PUSH    DPL                 ;save lower order DPTR
0006  C0 83       .D..                     PUSH    DPH                 ;save high order DPTR
0008  C0 D0       .D..                     PUSH    PSW                 ;save program status word
000A  C2 D4       .B..                     CLR     RS1                 ;switch to register file 1
000C  D2 D3       .B..                     SETB    RS0                 ;
                              ;*******************************************************************
                              ;
                              ;       DETERMINE INTERRUPT SOURCE
                              ;
                              ;*******************************************************************
000E  90 00 00    ..E.                     MOV     DPTR,#PORT1B        ;get address of 8255 port
0011  E0                                   MOVX    A,@DPTR             ;read contents of port
                              PI1000:
0012  20 00 03    .ER.                     JB      PCMRXINT,PI2000     ;branch if receive interrupt not present
0015  02 00 00    ..E.                     LJMP    RX_COMMAND          ;go handle reception of emaculate data
                              PI2000:
0018  20 00 03    .ER.                     JB      PCMTXINT,PI9000     ;branch if no interrupt present
001B  02 00 00    ..E.                     LJMP    TX_COMMAND          ;go handle data transmission to rfu
                              ;*******************************************************************
                              ;
                              ;       EXIT FROM INTERRUPT
                              ;
                              ;*******************************************************************
                              PI9000:
001E  D0 D0       .D..                     POP     PSW                 ;restore program status word
0020  D0 83       .D..                     POP     DPH                 ;restore high order DPTR
0022  D0 82       .D..                     POP     DPL                 ;restore lower order DPTR
0024  D0 F0       .D..                     POP     B                   ;restore contents of B
0026  D0 E0       .D..                     POP     ACC                 ;restore contents of ACC
0028  32                                   RETI                        ;return to interrupted routine
0029                                       END

Assembler Errors =      0
```

ACTUAL PROGRAM CODE FOR CONTROL UNIT (DIGITAL SERIAL INTERFACE)
EXTERNAL INTERRUPT ZERO HANDLER (CINTZERO)
WRITTEN IN ASSEMBLY LANGUAGE

APP. ITEM 6h (3)

Cross Reference

| Label | Value | Reference | | |
|---|---|---|---|---|
| INT_ZERO:CODESEG | C 0000 | 51 | -60 | |
| PCMRXINT:BIT | E 2804 | 76 | | |
| PCMTXINT:BIT | E 2803 | 53 | 79 | |
| PI1000:CODESEG | C 0012 | -75 | | |
| PI2000:CODESEG | C 0018 | 76 | -78 | |
| PI9000:CODESEG | C 001E | 51 | 79 | -86 |
| PORT1B:CODE | E 0802 | 73 | | |
| RX_COMMAND:CODE | E 0800 | 52 | 77 | |
| TX_COMMAND:CODE | E 0801 | 80 | | |

ACTUAL PROGRAM CODE FOR CONTROL UNIT (DIGITAL SERIAL INTERFACE)
EXTERNAL INTERRUPT ZERO HANDLER (CINTZERO)
WRITTEN IN ASSEMBLY LANGUAGE

APP. ITEM 6h (4)

```
$XREF DEBUG TITLE(PCM COMMAND RECEIVE HANDLER)
                NAME    CRX_CMD
;*************************************************************************
;
;MODULE NAME: CRX_CMD
;
;       (C) Copyright 1987 Teletec Corporation, U.S.A.
;
;AUTHOR: Ming Hsu
;CODE COMPLETE: 05/22/86
;LAST MODIFICATION: 02/09/87
;PERFORMED BY: Ming Hsu
;TEST/DEBUG:
;
;REVISION NUMBER: new
;
;DESCRIPTION: This module will execute in response to a PCM receive command
;             interrupt. This module will be responsible for removing data
;             from the PCM receive command latch and storing the data into
;             a buffer.
;
;INPUTS: RX_HEAD - contains pointer for next received byte.
;
;OUTPUTS: RX_BEG - receive buffer updated with new receive data.
;
;REGISTER USAGE: A, R1, R2, DPTR
;
;SUPPORT MODULES:
;
;SIZE:
;
;EXECUTION TIME:
;
```

```
                                      ;PDL;
                                      ;
                                      ;**********************************************************************
```

ACTUAL PROGRAM CODE FOR CONTROL UNIT (DIGITAL SERIAL INTERFACE)
PCM COMMAND RECEIVE HANDLER (CRX_CMD)
WRITTEN IN ASSEMBLY LANGUAGE

APP. ITEM 6i (1)

```
                                      CODESEG       SEGMENT CODE
                                                    RSEG    CODESEG
                                                    PUBLIC  RX_COMMAND
                                                    EXTRN   CODE(PORT3B,PI9000)
                                                    EXTRN   XDATA(RX_BEG,RX_HEAD,RX_TIMER)
                                                    EXTRN   DATA(REAL_CLOCK)
```

ACTUAL PROGRAM CODE FOR CONTROL UNIT (DIGITAL SERIAL INTERFACE)
PCM COMMAND RECEIVE HANDLER (CRX_CMD)
WRITTEN IN ASSEMBLY LANGUAGE

APP. ITEM 6i (2)

```
                                      ;**********************************************************************
                                      ;
                                      ;     Get data from PCM command receive port and save it in receive buffer
                                      ;
                                      ;**********************************************************************
0000                                  RX_COMMAND    EQU     $                         ;entry point
0000  90 00 00     ..E.                             MOV     DPTR,#PORT3B              ;load PCM RX command port address
0003  E0                                            MOVX    A,@DPTR                   ;get command byte
0004  F9                                            MOV     R1,A                      ;save receive data
0005  90 00 00     ..E.                             MOV     DPTR,#RX_HEAD             ;get buffer tail address
0008  E0                                            MOVX    A,@DPTR                   ;get pointer(low byte)
0009  FA                                            MOV     R2,A
000A  A3                                            INC     DPTR
000B  E0                                            MOVX    A,@DPTR                   ;get pointer(high byte)
000C  8A 82        .D..                             MOV     DPL,R2
000E  F5 83        .D..                             MOV     DPH,A                     ;move pointer to DPTR
0010  E9                                            MOV     A,R1                      ;restore receive data
0011  F0                                            MOVX    @DPTR,A                   ;save RX data in RX buffer
                                      ;**********************************************************************
                                      ;
                                      ;     Adjust RX_HEAD
                                      ;
                                      ;**********************************************************************
0012  A3                                            INC     DPTR                      ;increase pointer
0013  E5 82        .D..                             MOV     A,DPL                     ;save pointer
0015  A9 83        .D..                             MOV     R1,DPH                    ;save pointer
0017  90 00 00     ..E.                             MOV     DPTR,#RX_HEAD             ;get pointer address
001A  B9 00 07     .ER.                             CJNE    R1,#HIGH(RX_BEG+32),B10   ;check end of buffer
001D  B4 20 04     .ER.                             CJNE    A,#LOW(RX_BEG+32),B10
0020  74 00        .E..                             MOV     A,#LOW(RX_BEG)            ;RX buffer starting point
0022  79 00        .E..                             MOV     R1,#HIGH(RX_BEG)          ;RX buffer starting point
                                      B10:
0024  F0                                            MOVX    @DPTR,A                   ;save current pointer(low byte)
0025  A3                                            INC     DPTR
0026  E9                                            MOV     A,R1
```

```
80  0027  F0                      MOVX   @DPTR,A          ;save current pointer
81  0028  90 00 00   ..E.         MOV    DPTR,#RX_TIMER   ;get address of receive message timer
82  002B  E5 00      .E..         MOV    A,REAL_CLOCK     ;get current value of realtime clock
83  002D  F0                      MOVX   @DPTR,A          ;update receive timer
84  002E  02 00 00   ..E.         LJMP   PI9000           ;return to calling routine
85  0031                          END

Assembler Errors =    0
```

ACTUAL PROGRAM CODE FOR CONTROL UNIT (DIGITAL SERIAL INTERFACE)
PCM COMMAND RECEIVE HANDLER (CRX_CMD)
WRITTEN IN ASSEMBLY LANGUAGE

APP. ITEM 6i (3)

Cross Reference

| Label | Value | Reference | | | | |
|---|---|---|---|---|---|---|
| B10:CODESEG | C 0024 | 72 | 73 | -76 | | |
| PI9000:CODE | E 0801 | 84 | | | | |
| PORT3B:CODE | E 0800 | 41 | 51 | | | |
| REAL_CLOCK:DATA | E 1805 | 43 | 82 | | | |
| RX_BEG:XDATA | E 1002 | 42 | 72 | 73 | 74 | 75 |
| RX_COMMAND:CODESEG | C 0000 | 40 | -50 | | | |
| RX_HEAD:XDATA | E 1003 | 54 | 71 | | | |
| RX_TIMER:XDATA | E 1004 | 81 | | | | |

ACTUAL PROGRAM CODE FOR CONTROL UNIT (DIGITAL SERIAL INTERFACE)
PCM COMMAND RECEIVE HANDLER (CRX_CMD)
WRITTEN IN ASSEMBLY LANGUAGE

APP. ITEM 6i (4)

```
$XREF DEBUG TITLE(PCM MESSAGE RE-TRANSMISSION PROCESSOR)
                NAME    CTX_SAME
;*************************************************************************
;
;MODULE NAME: CTX_SAME
;
;       (c) Copyright 1987 Teletec Corporation, U.S.A.
;
;AUTHOR: John Fussell
;CODE COMPLETE: 07/10/86
;LAST MODIFICATION: 03/17/87
;PERFORMED BY: John Fussell
;TEST/DEBUG:
;
;REVISION NUMBER: new
;
;DESCRIPTION: This module handles the re-transmission of the last message
;             transmitted to the RFU. An error counter will be maintained
;             and should the maximum number of errors be reached re-
;             transmission will be aborted and the error reported.
;
;INPUTS:
;
;OUTPUTS:
;
```

```
                                  ;REGISTER USAGE: A, DPTR
                                  ;
                                  ;SUPPORT MODULES: none
                                  ;
                                  ;SIZE:
                                  ;
                                  ;EXECUTION TIME:
                                  ;
                                  ;PDL:    IF (PCM_ERR_CNT = PCM_ERR_MAX)
                                  ;            reset receive buffer
                                  ;            release transmit buffer
                                  ;            set pcm error flag to active
                                  ;            reset pcm error counter
                                  ;.       ELSE
                                  ;            increment pcm error counter
                                  ;            re-init transmit byte count
                                  ;            re_init tx buffer pointer
                                  ;            re-enable transmit interrupt
                                  ;            set pcm to command mode
                                  ;            write soh to transmit latch
                                  ;        ENDIF
                                  ;        disable receive interrupt
                                  ;        EXIT
                                  ;
                                  ;**********************************************************************

                                  CODESEG        SEGMENT CODE
                                                 RSEG    CODESEG
                                                 PUBLIC  CTX-SAME
                                                 EXTRN   BIT(PCM_MESS_ER,TX_EMPTY)
                                                 EXTRN   DATA(PCM_ERR_CNT)
                                                 EXTRN   XDATA(TX_HEAD.TX_BEG)
                                                 EXTRN   XDATA(TX_NUMBER,TX_NUMBER2,RX_TAIL,RX_HEAD,RX_BEG)
                                                 EXTRN   CODE(PCM_ERR_MAX,CONT3,TX_INT_ON,RX_INT_OFF,SOH,PORT3A)
                                                 EXTRN   CODE(COMMAND)
```

ACTUAL PROGRAM CODE FOR CONTROL UNIT (DIGITAL SERIAL INTERFACE)
PCM MESSAGE RE-TRANSMISSION PROCESSOR (CTX_SAME)
WRITTEN IN ASSEMBLY LANGUAGE

APP. ITEM 6j (2)

```
                                  ;**********************************************************************
                                  ;
                                  ;        UPDATE PCM ERROR COUNTER
                                  ;
                                  ;**********************************************************************
0000                              CTX_SAME       EQU     $                          ;entry point
0000   E5 00         .E..                        MOV     A,PCM_ERR_CNT              ;get current value of counter
0002   B4 00 1D      .ER.                        CJNE    A,#PCM_ERR_MAX,TXS100      ;branch if maximum not reached
                                  ;**********************************************************************
                                  ;
                                  ;        HANDLE PCM ERROR
                                  ;
                                  ;**********************************************************************
0005   74 00         .E..                        MOV     A,#LOW(RX_BEG)             ;low byte of RX buffer starting address
0007   90 00 00      ..E.                        MOV     DPTR,#RX_HEAD
```

```
000A  F0                             MOVX   @DPTR,A
000B  74 00      .E..                MOV    A,#HIGH(RX_BEG)      ;high byte of RX buffer starting address
000D  A3                             INC    DPTR
000E  F0                             MOVX   @DPTR,A
000F  90 00 00   ..E.                MOV    DPTR,#RX_TAIL        ;RX tail address
0012  74 00      .E..                MOV    A,#LOW(RX_BEG)       ;receive buffer starting address
0014  F0                             MOVX   @DPTR,A
0015  A3                             INC    DPTR
0016  74 00      .E..                MOV    A,#HIGH(RX_BEG)
0018  F0                             MOVX   @DPTR,A
0019  75 00 00   .E..                MOV    PCM_ERR_CNT,#0       ;reset pcm error counter
001C  C2 00      .E..                CLR    TX_EMPTY             ;release transmit buffer
001E  D2 00      .E..                SETB   PCM_MESS_ER          ;set error flag active
0020  80 2B      .R..                SJMP   TXS900               ;branch to exit
                        ;*********************************************************************
                        ;
                        ;       RE-TRANSMIT PREVIOUS MESSAGE
                        ;
                        ;*********************************************************************
                        TXS100:
0022  78 00                          MOV    R0,#0
0024  79 05                          MOV    R1,#5
                        TXS105:
0026  D8 FE      .R..                DJNZ   R0,TXS105
0028  D9 FC      .R..                DJNZ   R1,TXS105
002A  05 00      .E..                INC    PCM_ERR_CNT          ;increment pcm error counter
002C  90 00 00   ..E.                MOV    DPTR,#TX_NUMBER2     ;get address of last string byte count
002F  E0                             MOVX   A,@DPTR              ;get byte count
0030  90 00 00   ..E.                MOV    DPTR,#TX_NUMBER
0033  F0                             MOVX   @DPTR,A              ;restore byte count
0034  90 00 00   ..E.                MOV    DPTR,#TX_HEAD        ;load address of the buffer pointer
0037  74 00      .E..                MOV    A,#LOW(TX_BEG)       ;get low byte of the starting point
0039  F0                             MOVX   @DPTR,A              ;save low byte of TX starting point
003A  A3                             INC    DPTR                 ;point to next location
003B  74 00      .E..                MOV    A,#HIGH(TX_BEG)      ;get high byte of the starting point
003D  F0                             MOVX   @DPTR,A              ;save TX buffer starting point(low byte)
003E  90 00 00   ..E.                MOV    DPTR,#PORT3A         ;load PCM command address
0041  74 00      .E..                MOV    A,#SOH               ;load start of header
0043  F0                             MOVX   @DPTR,A              ;load data to the port
0044  90 00 00   ..E.                MOV    DPTR,#CONT3          ;get 8255 control register address
0047  74 00      .E..                MOV    A,#COMMAND           ;get command for PCM command mode
0049  F0                             MOVX   @DPTR,A              ;write out to the port
004A  74 00      .E..                MOV    A,#TX_INT_ON         ;get enable interrupt command
004C  F0                             MOVX   @DPTR,A              ;enable PCM TX interrupt
```

ACTUAL PROGRAM CODE FOR CONTROL UNIT (DIGITAL SERIAL INTERFACE)
PCM MESSAGE RE-TRANSMISSION PROCESSOR (CTX_SAME)
WRITTEN IN ASSEMBLY LANGUAGE

APP. ITEM 6j (4)

```
                        ;*********************************************************************
                        ;
                        ;       DISABLE RECEIVE INTERRUPT AND EXIT
                        ;
                        ;*********************************************************************
                        TXS900:
004D  90 00 00   ..E.                MOV    DPTR,#CONT3          ;get 8255 control register address
```

```
129  0050  74 00      .E..                    MOV    A,#RX_INT_OFF          ;get disable interrupt command
130  0052  F0                                 MOVX   @DPTR,A                ;disable PCM RX interrupt
131                            TXS990:
132  0053  22                                 RET                           ;return to calling routine
133  0054                                     END

Assembler Errors =     0
```

ACTUAL PROGRAM CODE FOR CONTROL UNIT (DIGITAL SERIAL INTERFACE)
PCM MESSAGE RE-TRANSMISSION PROCESSOR (CTX_SAME)
WRITTEN IN ASSEMBLY LANGUAGE

APP. ITEM 6j (5)

Cross Reference

```
Label                  Value   Reference
COMMAND:CODE           E 0810    60   117
CONT3:CODE             E 080B   116   128
CTX_SAME:CODESEG       C 0000    54   -67
PCM_ERR_CNT:DATA       E 1802    56    68    87   102
PCM_ERR_MAX:CODE       E 080A    59    69
PCM_MESS_ER:BIT        E 2800    55    89
PORT3A:CODE            E 080F   113
RX_BEG:XDATA           E 1009    75    78    82    85
RX_HEAD:XDATA          E 1008    76
RX_INT_OFF:CODE        E 080D   129
RX_TAIL:XDATA          E 1007    81
SOH:CODE               E 080E   114
TXS100:CODESEG         C 0022    69   -96
TXS105:CODESEG         C 0026   -99   100   101
TXS900:CODESEG         C 004D    90  -127
TXS990:CODESEG         C 0053  -131
TX_BEG:XDATA           E 1004   108   111
TX_EMPTY:BIT           E 2801    88
TX_HEAD:XDATA          E 1003    57   107
TX_INT_ON:CODE         E 080C   119
TX_NUMBER:XDATA        E 1005    58   105
TX_NUMBER2:XDATA       E 1006   103
```

ACTUAL PROGRAM CODE FOR CONTROL UNIT (DIGITAL SERIAL INTERFACE)
PCM MESSAGE RE-TRANSMISSION PROCESSOR (CTX_SAME)
WRITTEN IN ASSEMBLY LANGUAGE

APP. ITEM 6j (6)

```
$XREF DEBUG TITLE(RFU RESPONSE DISPATCH FUNCTION)
                NAME    CCM_DISP
;**********************************************************************
;
;MODULE NAME: CCM_DISP
;
;        (c) Copyright 1987 Teletec Corporation, U.S.A.
;
;AUTHOR: John Fussell
```

```
;CODE COMPLETE: 07/10/86
;LAST MODIFICATION: 12/17/86
;PERFORMED BY: John Fussell
;TEST/DEBUG:
;
;REVISION NUMBER: new
;
;DESCRIPTION: This module will handle the reception of messages from the
;              RFU other than ACK's and NAK's. These messages will be stored
;              and program control will be dispatched to the appropriate
;              command processor for action. A checksum will be calculated
;              on the incoming message and bad messages will result in the
;              original CU command being re-transmitted.
;
;INPUTS:
;
;OUTPUTS:
;
;REGISTER USAGE:
;
;SUPPORT MODULES: CTX_SAME - handles re-transmission of previaous message.
;
;SIZE:
;
;EXECUTION TIME:
;
;PDL:   IF ( REAL_CLOCK - RX_TIMER - RX_TIMEOUT > 1 )
;          retransmit
;       ELSE
;          A = number of bytes received
;          B = number of bytes expected
;          A : B
;          IF (all bytes are here)
;             calculate checksum
;             IF (checksum bad)
;               retransmit
;             ELSE
;               dispatch program to message handler
;               reset message function
;             ENDIF
;          ENDIF
;       ENDIF
;       EXIT
;
;**************************************************************************
```

ACTUAL PROGRAM CODE FOR CONTROL UNIT (DIGITAL SERIAL INTERFACE)
RFU RESPONSE DISPATCH FUNCTION (CCM_DISP)
WRITTEN IN ASSEMBLY LANGUAGE

APP. ITEM 6k (2)

```
CODESEG         SEGMENT CODE
                RSEG    CODESEG
                PUBLIC  CCM_DISP,CDB000
                EXTRN   BIT(DISPATCH_FG,TX_EMPTY)
                EXTRN   DATA(PCM_ERR_CNT,RX_OPCODE,REAL_CLOCK)
```

```
                                            EXTRN   XDATA(RX_TAIL,RX_HEAD,RX_BEG,RX_TIMER)
                                            EXTRN   CODE(CTX_SAME,CONT3,RX_INT_OFF)
                                            EXTRN   CODE(CCM_STCK)
                                            EXTRN   CODE(CCM_SCAN,CCM_HLTH)
                              ;             EXTRN   CODE(CCM_CONF)
                                            EXTRN   CODE(RX_TIMEOUT,RX_NUM_TABL)
```

ACTUAL PROGRAM CODE FOR CONTROL UNIT (DIGITAL SERIAL INTERFACE)
RFU RESPONSE DISPATCH FUNCTION (CCM_DISP)
WRITTEN IN ASSEMBLY LANGUAGE

APP. ITEM 6k (3)

```
                              ;*****************************************************************************
                              ;
                              ;       CHECK RECEIVE TIME OUT
                              ;
                              ;*****************************************************************************
0000                          CCM_DISP        EQU     $                       ;entry point
0000  90 00 00    ..E.                        MOV     DPTR,#RX_TIMER          ;get receive timer address
0003  E0                                      MOVX    A,@DPTR                 ;get receive time
0004  F9                                      MOV     R1,A                    ;store value
0005  E5 00       .E..                        MOV     A,REAL_CLOCK            ;get current time
0007  C3                                      CLR     C                       ;clear carry
0008  99                                      SUBB    A,R1                    ;get time difference
0009  C3                                      CLR     C
000A  94 00       .E..                        SUBB    A,#RX_TIMEOUT
000C  40 05       .R..                        JC      CD1000                  ;not a timeout yet
000E  12 00 00    ..E.                        LCALL   CTX_SAME                ;execute re-transmission function
0011  80 7D       .R..                        SJMP    CD9000                  ;exit dispatch function
                              ;*************************************************************************
                              ;
                              ;       HOW MANY BYTES ARE EXPECTED
                              ;
                              ;*************************************************************************
                              CD1000:
0013  E5 00       .E..                        MOV     A,RX_OPCODE             ;get opcode of RFU response
0015  90 00 00    ..E.                        MOV     DPTR,#RX_NUM_TABL       ;get address of message length table
0018  93                                      MOVC    A,@A+DPTR               ;retrieve message length from table
0019  FF                                      MOV     R7,A                    ;save number of bytes expected
```

ACTUAL PROGRAM CODE FOR CONTROL UNIT (DIGITAL SERIAL INTERFACE)
RFU RESPONSE DISPATCH FUNCTION (CCM_DISP)
WRITTEN IN ASSEMBLY LANGUAGE

APP. ITEM 6k (4)

```
                              ;*************************************************************************
                              ;
                              ;       HOW MANY BYTES ARE HERE
                              ;
                              ;*************************************************************************
001A  90 00 00    ..E.                        MOV     DPTR,#RX_HEAD           ;get address of buffer pointer
001D  E0                                      MOVX    A,@DPTR                 ;get address of last byte received
001E  FA                                      MOV     R2,A                    ;save low order byte
001F  A3                                      INC     DPTR                    ;increment external ram pointer
0020  E0                                      MOVX    A,@DPTR                 ;retrieve address of last byte received
0021  FB                                      MOV     R3,A                    ;save high order byte
```

```
0022  90 00 00   ..E.           MOV    DPTR,#RX_TAIL          ;get address of buffer pointer
0025  E0                        MOVX   A.@DPTR                ;get address of first byte received
0026  FC                        MOV    R4.A                   ;save low order byte
0027  A3                        INC    DPTR                   ;increment external ram pointer
0028  E0                        MOVX   A.@DPTR                ;retrieve address of first byte received
0029  FD                        MOV    R5,A                   ;save high order byte
002A  C3                        CLR    C                      ;clear carry before subtraction
002B  EA                        MOV    A,R2                   ;get low order last byte address
002C  9C                        SUBB   A.R4                   ;subtract low order bytes
002D  9F                        SUBB   A.R7                   ;subtract number of bytes expected from number r
eceived
002E  40 62      .R..           JC     CD9900                 ;branch if all bytes not yet received
0030  70 11      .R..           JNZ    CD3000                 ;branch if too many bytes received
                       ;*************************************************************************
                       ;
                       ;      CALCULATE MESSAGE CHECKSUM
                       ;
                       ;*************************************************************************
0032  7A 00                     MOV    R2.#0                  ;init register used for checksum cal
0034  1F                        DEC    R7                     ;decrement number of message bytes
0035  90 00 00   ..E.           MOV    DPTR,#RX_BEG           ;get address of receive buffer
                       CD2000:
0038  E0                        MOVX   A,@DPTR                ;retrieve message byte from buffer
0039  2A                        ADD    A,R2                   ;calculate checksum
003A  FA                        MOV    R2,A                   ;save result
003B  A3                        INC    DPTR                   ;point to next byte
003C  DF FA      .R..           DJNZ   R7,CD2000              ;branch if not done
003E  E0                        MOVX   A,@DPTR                ;retrieve received checksum
003F  C3                        CLR    C                      ;reset carry before subtracting
0040  9A                        SUBB   A,R2                   ;compare checksums
0041  60 05      .R..           JZ     CD5000                 ;branch if checksum ok
```

ACTUAL PROGRAM CODE FOR CONTROL UNIT (DIGITAL SERIAL INTERFACE)
RFU RESPONSE DISPATCH FUNCTION (CCM_DISP)
WRITTEN IN ASSEMBLY LANGUAGE

APP. ITEM 6k (5)

```
                       ;*************************************************************************
                       ;
                       ;      RE-TRANSMIT LAST MESSAGE
                       ;
                       ;*************************************************************************
                       CD3000:
0043  12 00 00   ..E.           LCALL  CTX_SAME               ;execute re-transmission function
0046  80 48      .R..           SJMP   CD9000                 ;exit dispatch function
                       ;*************************************************************************
                       ;
                       ;      DISPATCH TO THE APPROPRIATE HANDLER
                       ;
                       ;*************************************************************************
                       CD5000:
0048  90 00 01   ..E.           MOV    DPTR,#RX_BEG+1
004B  E0                        MOVX   A.@DPTR
004C  B5 00 1C   .ER.           CJNE   A.RX_OPCODE,CD6000     ;get opcode as index to jump table
004F  14                        DEC    A                      ;decrement opcode to access table
0050  C3                        CLR    C                      ;reset carry before multiplying
```

```
0051  75 F0 03    .D..           MOV    B,#3                ;get number bytes per jump instruction
0054  A4                         MUL    AB                  ;create index to jump table
0055  90 00 59    ..C.           MOV    DPTR,#CD5100        ;get address of jump table
0058  73                         JMP    @A+DPTR             ;branch to routine based on opcode
                  ;*****************************************************************************
                  ;
                  ;      JUMP TABLE FOR MESSAGE HANDLERS
                  ;
                  ;      NOTE: These routines must return via LJMP CD8000 for correct linkage.
                  ;
                  ;*****************************************************************************
                  CD5100:
0059  02 00 00    ..E.           LJMP   CCM_STCK            ;execute state table checksum handler
005C  02 00 00    ..E.           LJMP   CCM_SCAN            ;execute scan status handler
005F  02 00 6B    ..C.           LJMP   CCM_FSK             ;execute FSK data handler
0062  02 00 6B    ..C.           LJMP   CCM_SEQ             ;execute SEQ data handler
0065  02 00 00    ..E.           LJMP   CCM_HLTH            ;execute health status handler
0068  02 00 6B    ..C.           LJMP   CCM_CONF            ;execute RFU configuration handler
                  ;*****************************************************************************
                  ;
                  ;      DUMMY ROUTINES
                  ;
                  ;*****************************************************************************
                  CCM_FSK:
                  CCM_SEQ:
                  CCM_CONF:
                  CD6000:
006B  02 00 6E    ..C.           LJMP   CD8000              ;branch to exit
                  ;*****************************************************************************
                  ;
                  ;      RESET PCM RECEIVE BUFFER
                  ;
                  ;*****************************************************************************
                  CD8000:
006E  74 00       .E..           MOV    A,#LOW(RX_BEG)      ;low byte of RX buffer starting address
0070  90 00 00    ..E.           MOV    DPTR,#RX_HEAD
0073  F0                         MOVX   @DPTR,A
0074  74 00       .E..           MOV    A,#HIGH(RX_BEG)     ;high byte of RX buffer starting address
0076  A3                         INC    DPTR
0077  F0                         MOVX   @DPTR,A
0078  90 00 00    ..E.           MOV    DPTR,#RX_TAIL       ;RX tail address
007B  74 00       .E..           MOV    A,#LOW(RX_BEG)      ;receive buffer starting address
007D  F0                         MOVX   @DPTR,A
007E  A3                         INC    DPTR
007F  74 00       .E..           MOV    A,#HIGH(RX_BEG)
0081  F0                         MOVX   @DPTR,A
0082  75 00 00    .E..           MOV    RX_OPCODE,#0        ;reset expected receive opcode
0085  75 00 00    .E..           MOV    PCM_ERR_CNT,#0      ;reset pcm error counter
0088  C2 00       .E..           CLR    TX_EMPTY            ;release transmit buffer
                  ;*****************************************************************************
                  ;
                  ;      DISABLE PCM RECEIVE INTERRUPT
                  ;
                  ;*****************************************************************************
008A  90 00 00    ..E.           MOV    DPTR,#CONT3         ;get address of 8255 control register
008D  74 00       .E..           MOV    A,#RX_INT_OFF       ;get command to disable receive interrupt
008F  F0                         MOVX   @DPTR,A             ;write command to 8255
                  CD9000:
```

```
216  0090  C2 00        .E..                CLR     DISPATCH_FG          ;clear state change flag
217                                CD9900:
218  0092  22                               RET                          ;return to calling routine
219  0093                                   END

Assembler Errors =      0
```

ACTUAL PROGRAM CODE FOR CONTROL UNIT (DIGITAL SERIAL INTERFACE)
RFU RESPONSE DISPATCH FUNCTION (CCM_DISP)
WRITTEN IN ASSEMBLY LANGUAGE

APP. ITEM 6k (7)

```
                      Cross Reference

Label                     Value    Reference
CCM_CONF:CODESEG          C 006B     174  -182
CCM_DISP:CODESEG          C 0000      58   -73
CCM_FSK:CODESEG           C 006B     171  -180
CCM_HLTH:CODE             E 080E     173
CCM_SCAN:CODE             E 080D      64   170
CCM_SEQ:CODESEG           C 006B     172  -181
CCM_STCK:CODE             E 080C      63   169
CD1000:CODESEG            C 0013      82   -90
CD2000:CODESEG            C 0038    -127   132
CD3000:CODESEG            C 0043     118  -143
CD5000:CODESEG            C 004B     136  -151
CD5100:CODESEG            C 0059     159  -168
CD6000:CODESEG            C 006B     154  -183
CD8000:CODESEG            C 006E      58   184  -191
CD9000:CODESEG            C 0090      84   145  -215
CD9900:CODESEG            C 0092     117  -217
CONT3:CODE                E 080A     212
CTX_SAME:CODE             E 0809      62    83   144
DISPATCH_FG:BIT           E 2800      59   216
PCM_ERR_CNT:DATA          E 1802      60   205
REAL_CLOCK:DATA           E 1804      77
RX_BEG:XDATA              E 1007     126   152   192   195   199   202
RX_HEAD:XDATA             E 1006     101   193
RX_INT_OFF:CODE           E 080B     213
RX_NUM_TABL:CODE          E 0810      92
RX_OPCODE:DATA            E 1803      91   154   204
RX_TAIL:XDATA             E 1005      61   107   198
RX_TIMEOUT:CODE           E 080F      66    81
RX_TIMER:XDATA            E 1008      74
TX_EMPTY:BIT              E 2801     206
```

ACTUAL PROGRAM CODE FOR CONTROL UNIT (DIGITAL SERIAL INTERFACE)
RFU RESPONSE DISPATCH FUNCTION (CCM_DISP)
WRITTEN IN ASSEMBLY LANGUAGE

APP. ITEM 6k (8)

```
$XREF DEBUG TITLE( RECEIVED COMMAND DISPATCHING ROUTINE )
                NAME    R_DISPAT
;**********************************************************************
;
;MODULE NAME: R_DISPAT
;
;       (C) Copyright 1987 Teletec Corporation, U.S.A.
;
;AUTHOR: Ming Hsu
;CODE COMPLETE: 06/05/1986
;LAST MODIFICATION: 03/17/87
;PERFORMED BY: John Fussell
;TEST/DEBUG:
;
;REVISION NUMBER: new
;
;DESCRIPTION: This module performs dispatching for incoming
;             pcm command messages.
;
;INPUTS: RX_BEG - opcode of message in the receieve buffer.
;
;OUTPUTS: none
;
;REGISTER USAGE: A, B, DPTR
;
;SUPPORT MODULES: none
;
;SIZE:
;
;EXECUTION TIME:
;
;PDL:   retrieve command opcode from receive buffer
;       IF (opcode is legal)
;          dispatch to appropriate module
;       ENDIF
;       EXIT
;
;**********************************************************************
```

APP. ITEM 61 (1)

ACTUAL PROGRAM CODE FOR TRANSCEIVER UNIT (DIGITAL SERIAL INTERFACE)
RECEIVED COMMAND DISPATCHING ROUTINE (R_DISPAT)
WRITTEN IN ASSEMBLY LANGUAGE

```
CODESEG         SEGMENT CODE
                RSEG    CODESEG
                PUBLIC  R_DISPATCH
                EXTRN   CODE(RCM_INOUT,RCM_CHCG)
                EXTRN   CODE(RCM_SNSQ,RCM_RFLV,CM_VPON,CM_VPOFF,CM_TXSEQ)
                EXTRN   CODE(CM_RXSEQ,CM_TXFSK)
                EXTRN   CODE(RCM_CTCTX,CM_RESET,CM_TRAN,CM_DTMF)
                EXTRN   CODE(RCM_GUARD,CM_PD,RCM_PTT)
                EXTRN   CODE(RCM_PRI,RCM_GFRE,RCM_MODE,CM_HEALTH,CM_CONF)
                EXTRN   CODE(RCM_PA,CM_SSI,CM_CHAN,RCM_STATE)
                EXTRN   CODE(LAST_OP,RX_ERR)
                EXTRN   XDATA(RX_BEG)
```

ACTUAL PROGRAM CODE FOR TRANSCEIVER UKNIT (DIGITAL SERIAL INTERFACE)
RECEIVED COMMAND DISPATCHING ROUTINE (R_DISPAT)
WRITTEN IN ASSEMBLY LANGUAGE

APP. ITEM 61 (2)

```
0000                      R_DISPATCH   EQU   $
0000  90 00 01    ..E.                 MOV   DPTR,#RX_BEG+1      ;load RX buffer begining address
0003  E0                               MOVX  A,@DPTR             ;get OPCODE
0004  C3                               CLR   C                   ;clear carry flag
0005  94 00       .E..                 SUBB  A,#LAST_OP          ;subtract last opcode
0007  50 09       .R..                 JNC   RX_CMD_TBL          ;opcode error
0009  E0                               MOVX  A,@DPTR             ;get OPCODE again
000A  75 F0 03    .D..                 MOV   B,#3                ;every JUMP has 3 byte
000D  A4                               MUL   AB
000E  90 00 12    ..C.                 MOV   DPTR,#RX_CMD_TBL    ;load starting address
0011  73                               JMP   @A+DPTR             ;jump to corresponding location
                          RX_CMD_TBL:
0012  02 00 00    ..E.                 LJMP  RX_ERR              ;opcode error routine
0015  02 00 00    ..E.                 LJMP  RCM_SNSQ            ;OP=1    SNSQ
0018  02 00 00    ..E.                 LJMP  RCM_RFLV            ;OP=2    RF output level
001B  02 00 00    ..E.                 LJMP  CM_VPON             ;OP=3    Voice privacy on
001E  02 00 00    ..E.                 LJMP  CM_VPOFF            ;OP=4    Voice privacy off
0021  02 00 00    ..E.                 LJMP  CM_TXSEQ            ;OP=5    TX sequential tone
0024  02 00 00    ..E.                 LJMP  CM_RXSEQ            ;OP=6    RX sequential tone
0027  02 00 00    ..E.                 LJMP  CM_TXFSK            ;OP=7    TX FSK data
002A  02 00 00    ..E.                 LJMP  RX_ERR              ;OP=8
002D  02 00 00    ..E.                 LJMP  RCM_INOUT           ;OP=9    channel SET/REMOVE
0030  02 00 00    ..E.                 LJMP  RCM_CHCG            ;OP=A    TX frequency
0033  02 00 00    ..E.                 LJMP  RCM_PTT             ;OP=B    PTT timeout constant
0036  02 00 00    ..E.                 LJMP  RCM_CTCTX           ;OP=C    TX CTCSS tone
0039  02 00 00    ..E.                 LJMP  RCM_PA              ;OP=D    PA MODE
003C  02 00 00    ..E.                 LJMP  CM_RESET            ;OP=E    Address true reset
003F  02 00 00    ..E.                 LJMP  CM_TRAN             ;OP=F    Control transfer

0042  02 00 00    ..E.                 LJMP  CM_DTMF             ;OP=10   DTMF message
0045  02 00 00    ..E.                 LJMP  RCM_GUARD           ;OP=11   Guard channel message
0048  02 00 00    ..E.                 LJMP  CM_PD               ;OP=12   power down
004B  02 00 00    ..E.                 LJMP  RCM_PRI             ;OP=13   group priority
004E  02 00 00    ..E.                 LJMP  RCM_GFRE            ;OP=14   group frequency
0051  02 00 00    ..E.                 LJMP  RCM_MODE            ;OP=15   mode message
0054  02 00 00    ..E.                 LJMP  CM_HEALTH           ;OP=16   health status check
0057  02 00 00    ..E.                 LJMP  CM_CONF             ;OP=17   configuration check
005A  02 00 00    ..E.                 LJMP  CM_SSI              ;OP=18   SSI message request
005D  02 00 00    ..E.                 LJMP  CM_CHAN             ;OP=19   active channel request
0060  02 00 00    ..E.                 LJMP  RCM_STATE           ;OP=20   state table check sum
0063                                   END

Assembler Errors =     0
```

ACTUAL PROGRAM CODE FOR TRANSCEIVER UNIT (DIGITAL SERIAL INTERFACE)
RECEIVED COMMAND DISPATCHING ROUTINE (R_DISPAT)
WRITTEN IN ASSEMBLY LANGUAGE

APP. ITEM 61 (3)

Cross Reference

```
Label                  Value   Reference
CM_CHAN:CODE           E 0817     91
CM_CONF:CODE           E 0814     89
CM_DTMF:CODE           E 080C     82
CM_HEALTH:CODE         E 0813     88
CM_PD:CODE             E 080E     84
CM_RESET:CODE          E 080A     79
CM_RXSEQ:CODE          E 0807     45     71
CM_SSI:CODE            E 0816     90
CM_TRAN:CODE           E 080B     80
CM_TXFSK:CODE          E 0808     72
CM_TXSEQ:CODE          E 0806     70
CM_VPOFF:CODE          E 0805     69
CM_VPON:CODE           E 0804     68
LAST_OP:CODE           E 0819     50     57
RCM_CHCG:CODE          E 0801     75
RCM_CTCTX:CODE         E 0809     46     77
RCM_GFRE:CODE          E 0811     86
RCM_GUARD:CODE         E 080D     47     83
RCM_INOUT:CODE         E 0800     43     74
RCM_MODE:CODE          E 0812     87
RCM_PA:CODE            E 0815     49     78
RCM_PRI:CODE           E 0810     48     85
RCM_PTT:CODE           E 080F     76
RCM_RFLV:CODE          E 0803     67
RCM_SNSQ:CODE          E 0802     44     66
RCM_STATE:CODE         E 0818     92
RX_BEG:XDATA           E 101B     51     54
RX_CMD_TBL:CODESEG     C 0012     58     62    -64
RX_ERR:CODE            E 081A     65     73
R_DISPATCH:CODESEG     C 0000     42    -53
```

ACTUAL PROGRAM CODE TRANSCIVER UNIT (DIGITAL SERIAL INTERFACE)

RECEIVED COMMAND DISPATCHING ROUTINE (R_DISPAT)

WRITTEN IN ASSEMBLY LANGUAGE

APP. ITEM 6 1 (4)

```
$XREF DEBUG TITLE( VOICE PRIVACY ON MESSAGE HANDLER )
                NAME    RCM_VON
;***************************************************************************
;
;MODULE NAME: RCM_VON
;
;        (c) Copyright 1987 Teletec Corporation, U.S.A.
;
;AUTHOR: Ming Hsu
;CODE COMPLETE: 05/30/86
;LAST MODIFICATION: 02/24/87
;PERFORMED BY: John Fussell
;TEST/DEBUG:
;
;REVISION NUMBER: new
```

```
                        ;
                        ;DESCRIPTION: This module handles voice privacy ON.
                        ;
                        ;INPUTS: none
                        ;
                        ;OUTPUTS: AUDIO_CNTRL - updated to enable voice privacy.
                        ;
                        ;REGISTER USAGE: A, DPTR
                        ;
                        ;SUPPORT MODULES: none
                        ;
                        ;SIZE:
                        ;
                        ;EXECUTION TIME:
                        ;
                        ;PDL:    turn on voice privacy module
                        ;        switch audio paths for voice privacy
                        ;        set audio control update flag
                        ;        EXIT
                        ;
                        ;***************************************************************************
```

ACTUAL PROGRAM CODE FOR TRANSCEIVER UNIT ( DIGITAL SERIAL INTERFACE)
VOICE PRIVACY ON MESSAGE HANDLER (RCM _ VON)
WRITTEN IN ASSEMBLY LANGUAGE

APP. ITEM 6m (1)

```
                        CODESEG     SEGMENT CODE
                                    RSEG    CODESEG
                                    PUBLIC  CM_VPON
                                    EXTRN   BIT(VP_ON_2,AUD_ACT_FG)
                                    EXTRN   BIT(VP_RX_AUD,RX_AUD,VP_MOD_AUD,RFU_MIC_AUD)
                                    EXTRN   XDATA(AUDIO_CNTRL)
                                    EXTRN   CODE(PORT1A)
```

ACTUAL PROGRAM CODE FOR TRANSCEIVER UNIT (DIGITAL SERIAL INTERFACE)
VOICE PRIVACY ON MESSAGE HANDLER (RCM_VON)
WRITTEN IN ASSEMBLY LANGUAGE

APP. ITEM 6m (2)

```
0000                    CM_VPON     EQU     $                   ;entry point
0000  90 00 00   ..E.               MOV     DPTR,#PORT1A        ;get address of 8255 port
0003  E0                            MOVX    A,@DPTR             ;read port contents
0004  D2 00      .E..               SETB    VP_ON_2             ;turn on voice privacy module
0006  F0                            MOVX    @DPTR,A             ;write modified data to port
0007  90 00 00   ..E.               MOV     DPTR,#AUDIO_CNTRL   ;get address of audio path control s.v.
000A  E0                            MOVX    A,@DPTR             ;retrieve msbyte
000B  D2 00      .E..               SETB    VP_RX_AUD           ;enable privacy audio to speaker
000D  D2 00      .E..               SETB    VP_MOD_AUD          ;enable privacy audio to transmitter
000F  C2 00      .E..               CLR     RX_AUD              ;inhibit received audio to speaker
0011  F0                            MOVX    @DPTR,A             ;restore state variable
0012  A3                            INC     DPTR                ;point to second byte of state variable
0013  E0                            MOVX    A,@DPTR             ;retrieve lsbyte
0014  C2 00      .E..               CLR     RFU_MIC_AUD         ;inhibit mic audio to transmitter

0016  F0                            MOVX    @DPTR,A             ;restore state variable
0017  D2 00      .E..               SETB    AUD_ACT_FG          ;set action flag to active state
```

```
0019   22          RET                    ;return to calling routine
001A               END
```

Assembler Errors = 0

ACTUAL PROGRAM CODE FOR TRANSCEIVER UNIT (DIGITAL SERIAL INTERFACE)
VOICE PRIVACY ON MESSAGE HANDLER (RCM_VON)
WRITTEN IN ASSEMBLY LANGUAGE

APP. ITEM 6m (3)

Cross Reference

| Label | Value | Reference | |
|---|---|---|---|
| AUDIO_CNTRL: XDATA | E 1006 | 43 | 51 |
| AUD_ACT_FG: BIT | E 2801 | 61 | |
| CM_VPON: CODESEG | C 0000 | 40 | -46 |
| PORT1A: CODE | E 0807 | 44 | 47 |
| RFU_MIC_AUD: BIT | E 2805 | 59 | |
| RX_AUD: BIT | E 2803 | 55 | |
| VP_MOD_AUD: BIT | E 2804 | 54 | |
| VP_ON_2: BIT | E 2800 | 41 | 49 |
| VP_RX_AUD: BIT | E 2802 | 42 | 53 |

ACTUAL PROGRAM CODE FOR TRANSCEIVER UNIT (DIGITAL SERIAL INTERFACE)
VOICE PRIVACY ON MESSAGE HANDLER (RCM_VON)
WRITTEN IN ASSEMBLY LANGUAGE

APP. ITEM 6m (4)

```
$XREF DEBUG TITLE( VOICE PRIVACY OFF MESSAGE HANDLER )
                NAME    RCM_VOFF
;*******************************************************************************
;
;MODULE NAME: RCM_VOFF
;
;       (c) Copyright 1987 Teletec Corporation, U.S.A.
;
;AUTHOR: Ming Hsu
;CODE COMPLETE: 05/30/86
;LAST MODIFICATION: 02/24/87
;PERFORMED BY: John Fussell
;TEST/DEBUG:
;
;REVISION NUMBER: new
;
;DESCRIPTION: This module handles voice privacy OFF.
;
;INPUTS: none
;
;OUTPUTS: AUDIO_CNTRL - updated to disable voice privacy.
;
;REGISTER USAGE: A, DPTR
;
```

```
                ;SUPPORT MODULES: none
                ;
                ;SIZE:
                ;
                ;EXECUTION TIME:
                ;
                ;PDL:    disable voice privacy module
                ;        switch audio paths for normal audio
                ;        set audio control update flag
                ;        EXIT
                ;
                ;**************************************************************************
```

ACTUAL PROGRAM CODE FOR TRANSCEIVER UNIT ( DIGITAL SERIAL INTERFACE)
VOICE PRIVACY OFF MESSAGE HANDLER (RCM_VOFF)
WRITTEN IN ASSEMBLY LANGUAGE
APP. ITEM 6n (1)

```
CODESEG     SEGMENT CODE
            RSEG    CODESEG
            PUBLIC  CM_VPOFF
            EXTRN   BIT(VP_ON_2,AUD_ACT_FG)
            EXTRN   BIT(VP_RX_AUD,RX_AUD,VP_MOD_AUD,RFU_MIC_AUD)
            EXTRN   XDATA(AUDIO_CNTRL)
            EXTRN   CODE(PORT1A)
```

ACTUAL PROGRAM CODE FOR TRANSCEIVER UNIT (DIGITAL SERIAL INTERFACE)
VOICE PRIVACY OFF MESSAGE HANDLER (RCM_VOFF)
WRITTEN IN ASSEMBLY LANGUAGE
APP. ITEM 6n (2)

```
0000                     CM_VPOFF  EQU    $                   ;entry point
0000  90 00 00   ..E.              MOV    DPTR,#PORT1A        ;get address of 8255 port
0003  E0                           MOVX   A,@DPTR             ;read port contents
0004  C2 00      .E..              CLR    VP_ON_2             ;turn off voice privacy module
0006  F0                           MOVX   @DPTR,A             ;write modified data to port
0007  90 00 00   ..E.              MOV    DPTR,#AUDIO_CNTRL   ;get address of audio path control s.v.
000A  E0                           MOVX   A,@DPTR             ;retrieve msbyte
000B  C2 00      .E..              CLR    VP_RX_AUD           ;inhibit privacy audio to speaker
000D  C2 00      .E..              CLR    VP_MOD_AUD          ;inhibit privacy audio to transmitter
000F  D2 00      .E..              SETB   RX_AUD              ;enable received audio to speaker
0011  F0                           MOVX   @DPTR,A             ;restore state variable
0012  A3                           INC    DPTR                ;point to second byte of state variable
0013  E0                           MOVX   A,@DPTR             ;retrieve lsbyte
0014  D2 00      .E..              SETB   RFU_MIC_AUD         ;enable mic audio to transmitter

0016  F0                           MOVX   @DPTR,A             ;restore state variable
0017  D2 00      .E..              SETB   AUD_ACT_FG          ;set action flag to active state
0019  22                           RET                        ;return to calling routine
001A                               END

Assembler Errors =    0
```

ACTUAL PROGRAM CODE FOR TRANSCEIVER UNIT (DIGITAL SERIAL INTERFACE)
VOICE PRIVACY OFF MESSAGE HANDLER (RCM_VOFF)
WRITTEN IN ASSEMBLY LANGUAGE

APP. ITEM 6n (3)

Cross Reference

| Label | Value | Reference | |
|---|---|---|---|
| AUDIO_CNTRL: XDATA | E 1006 | 43 | 51 |
| AUD_ACT_FG: BIT | E 2801 | 61 | |
| CM_VPOFF: CODESEG | C 0000 | 40 | -46 |
| PORT1A: CODE | E 0807 | 44 | 47 |
| RFU_MIC_AUD: BIT | E 2805 | 59 | |
| RX_AUD: BIT | E 2803 | 55 | |
| VP_MOD_AUD: BIT | E 2804 | 54 | |
| VP_ON_2: BIT | E 2800 | 41 | 49 |
| VP_RX_AUD: BIT | E 2802 | 42 | 53 |

ACTUAL PROGRAM CODE FOR TRANSCEIVER UNIT (DIGITAL SERIAL INTERFACE)
VOICE PRIVACY OFF MESSAGE HANDLER (RCM_VOFF)
WRITTEN IN ASSEMBLY LANGUAGE

APP. ITEM 6n (4)

```
$XREF DEBUG TITLE( PCM COMMAND MESSAGE PREPARATION MODULE)
                NAME    RPREP_MES
;***************************************************************************
;
;MODULE NAME: RPREP_MES
;
;       (c) Copyright 1987  Teletec Corporation, U.S.A.
;
;AUTHOR: Ming Hsu
;CODE COMPLETE: 06/03/1986
;LAST MODIFICATION: 10/01/1986
;PERFORMED BY: John Fussell
;TEST/DEBUG:
;
;REVISION NUMBER: new
;
;DESCRIPTION: This routine transfers PCM message to TX buffer and calculate
;             check sum. Change the PCM mode to command mode and enable TX
;             interrupt.
;
;INPUTS:R0 -  number of bytes need to be transfer
;       DPTR - starting point of the message
;
;OUTPUTS: PCM message in TX buffer
;
;REGISTERS USAGE: R0, R1, R2, R3, R4, R5, R6, ACC, DPTR, PSW
;
;SUPPORT MODULES: none
;
;SIZE:
;
;EXECUTION TIME:
;
```

```
                                 ;PDL:
                                 ;       reset TX buffer pointer
                                 ;       transfer command to TX buffer
                                 ;       EXIT
                                 ;
                                 ;****************************************************************************
```

ACTUAL PROGRAM CODE FOR TRANSCEIVER UNIT (DIGITAL SERIAL INTERFACE)
PCM COMMAND MESSAGE PREPARATION MODULE (RPREP_MES)
WRITTEN IN ASSEMBLY LANGUAGE

APP. ITEM 6o (1)

```
                                 CODESEG         SEGMENT CODE
                                                 PUBLIC  PREP_MESS
                                                 EXTRN   XDATA(TX_BEG,TX_HEAD,TX_NUMBER)
```

ACTUAL PROGRAM CODE FOR TRANSCEIVER UNIT (DIGITAL SERIAL INTERFACE)
PCM COMMAND MESSAGE PREPARATION MODULE (RPREP_MES)
WRITTEN IN ASSEMBLY LANGUAGE

APP. ITEM 60 (2)

```
                                                 RSEG    CODESEG
                                 ;****************************************************************************
                                 ;
                                 ;       set up TX buffer pointer
                                 ;
                                 ;****************************************************************************
0000                             PREP_MESS       EQU     $                       ;entry point
0000  AB 82         .D..                         MOV     R3,DPL                  ;save message starting address,low byte
0002  AC 83         .D..                         MOV     R4,DPH                  ;save message starting address,high byte
0004  E8                                         MOV     A,R0                    ;get number of bytes needed to be sent
0005  04                                         INC     A                       ;number of byte to be sent
0006  90 00 00      ..E.                         MOV     DPTR,#TX_NUMBER         ;load address of the byte count
0009  F0                                         MOVX    @DPTR,A                 ;store byte count in the buffer
000A  90 00 00      ..E.                         MOV     DPTR,#TX_HEAD           ;point to location of the TX pointer
000D  74 00         .E..                         MOV     A,#LOW(TX_BEG)          ;get low byte of the starting point
000F  F0                                         MOVX    @DPTR,A                 ;save low byte of TX starting point
0010  A3                                         INC     DPTR                    ;point to next location
0011  74 00         .E..                         MOV     A,#HIGH(TX_BEG)         ;get high byte of the starting point
0013  F0                                         MOVX    @DPTR,A                 ;save TX buffer starting point(low byte)
                                 ;****************************************************************************
                                 ;
                                 ;       Transfer message to TX buffer and calculate check sum
                                 ;
                                 ;****************************************************************************
0014  90 00 00      ..E.                         MOV     DPTR,#TX_BEG            ;load buffer starting address
0017  AD 82         .D..                         MOV     R5,DPL
0019  AE 83         .D..                         MOV     R6,DPH
001B  7A 00                                      MOV     R2,#0                   ;clear check sum

                                 PREP10:
001D  8B 82         .D..                         MOV     DPL,R3
001F  8C 83         .D..                         MOV     DPH,R4
0021  E0                                         MOVX    A,@DPTR                 ;get command data from external memory
0022  A3                                         INC     DPTR
0023  AB 82         .D..                         MOV     R3,DPL
```

```
0025  AC 83     .D..     MOV    R4,DPH
0027  8D 82     .D..     MOV    DPL,R5
0029  8E 83     .D..     MOV    DPH,R6
002B  F0                 MOVX   @DPTR,A        ;load value to TX buffer
002C  2A                 ADD    A,R2           ;calculate check sum
002D  FA                 MOV    R2,A           ;move check sum to temporary storage
002E  A3                 INC    DPTR           ;point to next buffer location
002F  AD 82     .D..     MOV    R5,DPL
0031  AE 83     .D..     MOV    R6,DPH
0033  D8 E8     .R..     DJNZ   R0,PREP10      ;check end of message
0035  F0                 MOVX   @DPTR,A        ;load check sum in TX buffer
0036  22                 RET                   ;return to caller
0037                     END

Assembler Errors =    0
```

ACTUAL PROGRAM CODE FOR TRANSCEIVER UNIT (DIGITAL SERIAL INTERFACE)
PCM COMMAND MESSAGE PREPARATION MODULE (RPREP_MES)
WRITTEN IN ASSEMBLY LANGUAGE

APP. ITEM 60 (3)

Cross Reference

| Label | Value | Reference | | | |
|---|---|---|---|---|---|
| PREP10:CODESEG | C 001D | -73 | 88 | | |
| PREP_MESS:CODESEG | C 0000 | 42 | -51 | | |
| TX_BEG:XDATA | E 1000 | 43 | 59 | 62 | 69 |
| TX_HEAD:XDATA | E 1001 | 58 | | | |
| TX_NUMBER:XDATA | E 1002 | 56 | | | |

ACTUAL PROGRAM CODE FOR TRANSCEIVER UNIT (DIGITAL SERIAL INTERFACE)
PCM COMMAND MESSAGE PREPARATION MODULE (RPREP_MES )
WRITTEN IN ASSEMBLY LANGUAGE

APP. ITEM 60 (4)

```
$XREF DEBUG TITLE(PCM ERROR RESET)
                NAME    RPCMRES
;*************************************************************************
;
;MODULE NAME: RPCMRES
;
;       (c) Copyright 1987  Teletec Corporation, U.S.A.
;
;AUTHOR: Ming Hsu
;CODE COMPLETE: 10/23/86
;LAST MODIFICATION: 03/17/87
;PERFORMED BY: John Fussell
;TEST/DEBUG:
;
;REVISION NUMBER: new
;
;DESCRIPTION: This module will be responsible for reset PCM
;             interrupt jam by clearing the TX and RX interrupt
;             and all the related parameters.
;
;INPUTS: none
;
```

```
;OUTPUTS: none
;
;REGISTER USAGE: A, DPTR
;
;SUPPORT MODULES: none
;
;SIZE:
;
;EXECUTION TIME:
;
;PDL:
;        clear RX interrupt
;        clear TX interrupt
;        Reset RX_TAIL to starting address
;        EXIT
;
;**********************************************************************
```

ACTUAL PROGRAM CODE FOR TRANSCEIVER UNIT (DIGITAL SERIAL INTERFACE)
PCM ERROR RESET (RPCMRES)
WRITTEN IN ASSEMBLY LANGUAGE

APP. ITEM 6p (1)

```
CODESEG         SEGMENT CODE
                RSEG    CODESEG
                PUBLIC  RPCMRES
                EXTRN   BIT(PCMTXINT,PCMRXINT,TX_EMPTY)
                EXTRN   CODE(PORT1B,PORT3A,PORT3B,STATUS,TX_INT_OFF,CONT3)
                EXTRN   CODE(RX_INT_OFF,RX_INT_ON)
                EXTRN   XDATA(RX_BEG,RX_HEAD,RX_TAIL,TX_HEAD,TX_NUMBER)
```

ACTUAL PROGRAM CODE FOR TRANSCEIVER UNIT (DIGITAL SERIAL INTERFACE)
PCM ERROR RESET (RPCMRES)
WRITTEN IN ASSEMBLY LANGUAGE

APP. ITEM 6p (2)

Cross Reference

| Label | Value | Reference | | | | |
|---|---|---|---|---|---|---|
| CONT3:CODE | E 0808 | 59 | | | | |
| PCMRES990:CODESEG | C 0036 | 52 | 53 | -94 | | |
| PCMRXINT:BIT | E 2801 | 52 | | | | |
| PCMTXINT:BIT | E 2800 | 44 | 53 | | | |
| PORT1B:CODE | E 0803 | 45 | 50 | | | |
| PORT3A:CODE | E 0804 | 0 | | | | |
| PORT3B:CODE | E 0805 | 80 | | | | |
| RPCMRES:CODESEG | C 0000 | 43 | -49 | | | |
| RX_BEG:XDATA | E 100B | 47 | 74 | 77 | 88 | 91 |
| RX_HEAD:XDATA | E 100C | 75 | | | | |
| RX_INT_OFF:CODE | E 0809 | 46 | | | | |
| RX_INT_ON:CODE | E 080A | 64 | | | | |
| RX_TAIL:XDATA | E 100D | 87 | | | | |
| STATUS:CODE | E 0806 | 60 | | | | |
| TX_EMPTY:BIT | E 2802 | 93 | | | | |
| TX_HEAD:XDATA | E 100E | 0 | | | | |
| TX_INT_OFF:CODE | E 0807 | 62 | | | | |
| TX_NUMBER:XDATA | E 100F | 66 | | | | |

ACTUAL PROGRAM CODE FOR TRANSCEIVER UNIT (DIGITAL SERIAL INTERFACE)
PCM ERROR RESET (RPCMRES)
WRITTEN IN ASSEMBLY LANGUAGE

APP. ITEM 6p (4)

```
0000                    RPCMRES     EQU     $                       ;entry point
0000  90 00 00   ..E.               MOV     DPTR,#PORT1B
0003  E0                            MOVX    A,@DPTR
0004  20 00 2F   .ER.               JB      PCMRXINT,PCMRES990
0007  20 00 2C   .ER.               JB      PCMTXINT,PCMRES990
                        ;*********************************************************************
                        ;
                        ;       CLEAR TX INTERRUPT
                        ;
                        ;*********************************************************************
000A  90 00 00   ..E.               MOV     DPTR,#CONT3             ;get control port address
000D  74 00      .E..               MOV     A,#STATUS               ;get command to change PCM mode to data mode
000F  F0                            MOVX    @DPTR,A                 ;write to the port
0010  74 00      .E..               MOV     A,#TX_INT_OFF           ;get command to disable tx interrupt
0012  F0                            MOVX    @DPTR,A                 ;write command to 8255
0013  74 00      .E..               MOV     A,#RX_INT_ON            ;get command to enable RX interrupt
0015  F0                            MOVX    @DPTR,A                 ;write command to 8255
0016  90 00 00   ..E.               MOV     DPTR,#TX_NUMBER         ;clear TX number
0019  74 00                         MOV     A,#0
001B  F0                            MOVX    @DPTR,A
                        ;*********************************************************************
                        ;
                        ;       CLEAR RX INTERRUPT
                        ;
                        ;*********************************************************************
001C  74 00      .E..               MOV     A,#LOW(RX_BEG)          ;low byte of RX buffer starting address
001E  90 00 00   ..E.               MOV     DPTR,#RX_HEAD
0021  F0                            MOVX    @DPTR,A
0022  74 00      .E..               MOV     A,#HIGH(RX_BEG)         ;high byte of RX buffer starting address
0024  A3                            INC     DPTR
0025  F0                            MOVX    @DPTR,A
0026  90 00 00   ..E.               MOV     DPTR,#PORT3B
0029  E0                            MOVX    A,@DPTR                 ;dummy read
                        ;*****************************************************************
                        ;
                        ;       Reset RX_TAIL to starting address
                        ;
                        ;*****************************************************************
002A  90 00 00   ..E.               MOV     DPTR,#RX_TAIL           ;RX tail address
002D  74 00      .E..               MOV     A,#LOW(RX_BEG)          ;receive buffer starting address
002F  F0                            MOVX    @DPTR,A
0030  A3                            INC     DPTR
0031  74 00      .E..               MOV     A,#HIGH(RX_BEG)
0033  F0                            MOVX    @DPTR,A
0034  C2 00      .E..               CLR     TX_EMPTY                ;indicate buffer no longer full
                        PCMRES990:
0036  22                            RET
0037                                END
```

assembl

```
$XREF DEBUG TITLE(RFU PCM INTERRUPT HANDLER)
                NAME    RPCMINT
;*********************************************************************
;
;MODULE NAME: RPCMINT
;
;       (C) Copyright 1987 Teletec Corporation, U.S.A.
;
;AUTHOR: John Fussell
;CODE COMPLETE: 05/08/86
;LAST MODIFICATION: 03/12/87
;PERFORMED BY: Ming Hsu
;TEST/DEBUG:
;
;REVISION NUMBER: new
;
;DESCRIPTION: This module performs a dispatch function for the PCM
;             interrupts. Determination will be made as to whether interrupt
;             occured due to a PCM transmit command or PCM receive command
;             condition and control will be passed to an appropriate handler.
;             This module will handle termination of the interrupt once the
;             handler completes processing.
;
;INPUTS: none
;
;OUTPUTS: none
;
;REGISTER USAGE: A, DPTR
;
;SUPPORT MODULES: RX_COMMAND - pcm receive data handler.
;                 TX_COMMAND - pcm transmit data handler.
;
;SIZE:
;
;EXECUTION TIME: 32 usec - RX case
;                34 usec - TX case
;
;PDL:
;       save working registers on the stack
;       read interrupt status port
;       IF ( interrupt was a PCM receive interrupt )
;               execute PCM receive message handler
;       ELSE (interrupt was a PCM transmit interrupt )
;               execute PCM transmit message handler
;       ENDIF
;       restore working registers from the stack
;       EXIT
;
;*********************************************************************
```

ACTUAL PROGRAM CODE FOR TRANSCEIVER UNIT (DIGITAL SERIAL INTERFACE) RFU PCM INTERRUPT HANDLER (RPCMINT)
WRITTEN IN ASSEMBLY LANGUAGE
APP. ITEM 6q (1)

```
CODESEG         SEGMENT CODE
                RSEG    CODESEG
                PUBLIC  PCMINT,PI9000
                EXTRN   CODE(RX_COMMAND,TX_COMMAND,PORT1B)
                EXTRN   BIT(PCMTXINT,PCMRXINT)
```

ACTUAL PROGRAM CODE FOR TRANSCEIVER UNIT (DIGITAL SERIAL INTERFACE)
RFU PCM INTERRUPT HANDLER (RPCMINT)
WRITTEN IN ASSEMBLY LANGUAGE

APP. ITEM 6q (2)

```
57                           ;*************************************************************************
58                           ;
59                           ;       INTERRUPT HOUSEKEEPING
60                           ;
61                           ;*************************************************************************
62  0000                     PCMINT         EQU     $                  ;entry point
63  0000  C0 E0      .D..                   PUSH    ACC                ;save contents of ACC during interrupt
64  0002  C0 F0      .D..                   PUSH    B                  ;save contents of B
65  0004  C0 82      .D..                   PUSH    DPL                ;save lower order DPTR
66  0006  C0 83      .D..                   PUSH    DPH                ;save high order DPTR
67  0008  C0 D0      .D..                   PUSH    PSW                ;save program status word
68  000A  C2 D4      .B..                   CLR     RS1                ;switch to register file 1
69  000C  D2 D3      .B..                   SETB    RS0                ;
70                           ;*************************************************************************
71                           ;
72                           ;       DETERMINE INTERRUPT SOURCE
73                           ;
74                           ;*************************************************************************
75  000E  90 00 00   ..E.                   MOV     DPTR,#PORT1B       ;get address of 8255 port
76  0011  E0                                MOVX    A,@DPTR            ;read contents of port
77  0012  20 00 03   .ER.                   JB      PCMRXINT,PI1000    ;branch if receive interrupt not present
78  0015  02 00 00   ..E.                   LJMP    RX_COMMAND         ;go handle reception of emaculate data
79                           PI1000:
80  0018  20 00 03   .ER.                   JB      PCMTXINT,PI9000    ;branch if no interrupt present
81  001B  02 00 00   ..E.                   LJMP    TX_COMMAND         ;go handle transmission of command data
82                           ;*************************************************************************
83                           ;
84                           ;       EXIT FROM INTERRUPT
85                           ;
86                           ;*************************************************************************
87                           PI9000:
88  001E  D0 D0      .D..                   POP     PSW                ;restore program status word
89  0020  D0 83      .D..                   POP     DPH                ;restore high order DPTR
90  0022  D0 82      .D..                   POP     DPL                ;restore lower order DPTR
91  0024  D0 F0      .D..                   POP     B                  ;restore contents of B
92  0026  D0 E0      .D..                   POP     ACC                ;restore contents of ACC
93  0028  32                                RETI                       ;return to interrupted routine
94  0029                                    END
```

Assembler Errors = 0

ACTUAL PROGRAM CODE FOR TRANSCEIVER UNIT (DIGITAL SERIAL INTERFACE)
RFU PCM INTERRUPT HANDLER (RPCMINT)
WRITTEN IN ASSEMBLY LANGUAGE

APP. ITEM 6q (3)

Cross Reference

```
Label              Value    Reference
PCMINT:CODESEG     C 0000     53   -62
PCMRXINT:BIT       E 2804     77
```

```
PCMTXINT: BIT          E 2803    55    80
PI1000: CODESEG        C 0018    77   -79
PI9000: CODESEG        C 001E    53    80   -87
PORT1B: CODE           E 0802    75
RX_COMMAND: CODE       E 0800    54    78
TX_COMMAND: CODE       E 0801    81
```

ACTUAL PROGRAM CODE FOR TRANSCEIVER UNIT (DIGITAL SERIAL INTERFACE)
RFU PCM INTERRUPT HANDLER (RPCMINT)
WRITTEN IN ASSEMBLY LANGUAGE

APP. ITEM 6q (4)

```
$XREF DEBUG TITLE(PCM COMMAND TRANSMIT HANDLER)
                NAME    RTX_CMD
;***********************************************************************
;
;MODULE NAME: RTX_CMD
;
;       (C) Copyright 1987 Teletec Corporation, U.S.A.
;
;AUTHOR: Ming Hsu
;CODE COMPLETE: 05/23/86
;LAST MODIFICATION: 02/09/87
;PERFORMED BY: Ming Hsu
;TEST/DEBUG:
;
;REVISION NUMBER: new
;
;DESCRIPTION: This module will execute in response to a PCM transmit command
;             interrupt. This module will be responsible for removing data
;             from the data buffer and storing the data in PCM transmit
;             command latch.
;
;INPUTS: TX_NUMBER - number of bytes to transmit.
;        TX_HEAD - pointer to data to transmit.
;
;OUTPUTS: none
;
;REGISTER USAGE: A, DPTR, R1, R2
;
;SUPPORT MODULES: none
;
;SIZE:
;
;EXECUTION TIME: 20 usec - last byte
;                47 usec - normal case
;
;PDL:
;       IF (byte count equal to zero)
;          set TX buffer empty
;          change PCM mode to data mode
;       ELSE
;          decrease byte count
;          get current data byte
;          send data to PCM command port
;       ENDIF
;       EXIT
```

```
                        ;
                        ;***********************************************************************
```

ACTUAL PROGRAM CODE FOR TRANSCEIVER UNIT (DIGITAL SERIAL INTERFACE) PCM COMMAND TRANSMIT HANDLER (RTX_CMD)
WRITTEN IN ASSEMBLY LANGUAGE

APP. ITEM 6r (1)

```
                        CODESEG         SEGMENT CODE
                                        RSEG    CODESEG
                                        PUBLIC  TX_COMMAND
                                        EXTRN   BIT(TX_EMPTY)
                                        EXTRN   CODE(CONT3,PORT3A,RX_INT_ON,STATUS,TX_INT_OFF,PI9000)
                                        EXTRN   XDATA(TX_HEAD,TX_NUMBER)
```

ACTUAL PROGRAM CODE TRANSCEIVER UNIT (DIGITAL SERIAL INTERFACE)
PCM COMMAND TRANSMTI HANDLER (RTX_CMD)

APP. ITEM 6r (2)

```
                        ;***********************************************************************
                        ;
                        ;       check and adjust byte count
                        ;
                        ;***********************************************************************
0000                    TX_COMMAND      EQU     $               ;entry point
0000  90 00 00   ..E.                   MOV     DPTR,#TX_NUMBER ;load address of the byte count
0003  E0                                MOVX    A,@DPTR         ;get number of bytes in TX buffer
0004  60 21      .R..                   JZ      TXC500          ;if byte count equal zero, go to end of TX servi

0006  14                                DEC     A               ;decrease byte count
0007  F0                                MOVX    @DPTR,A         ;save current byte count
0008  90 00 00   ..E.                   MOV     DPTR,#TX_HEAD   ;point to current byte address pointer
000B  E0                                MOVX    A,@DPTR         ;get current data pointer(low byte)
000C  F9                                MOV     R1,A            ;save the value
000D  A3                                INC     DPTR            ;point to high byte
000E  E0                                MOVX    A,@DPTR         ;get high byte
000F  89 82      .D..                   MOV     DPL,R1
0011  F5 83      .D..                   MOV     DPH,A           ;load pointer
0013  E0                                MOVX    A,@DPTR         ;get data
0014  A3                                INC     DPTR            ;point to next byte
0015  A9 82      .D..                   MOV     R1,DPL          ;save current pointer
0017  AA 83      .D..                   MOV     R2,DPH          ;save current pointer
0019  90 00 00   ..E.                   MOV     DPTR,#PORT3A    ;load PCM command output port address
001C  F0                                MOVX    @DPTR,A         ;send data to port
001D  90 00 00   ..E.                   MOV     DPTR,#TX_HEAD   ;load buffer head
0020  E9                                MOV     A,R1
0021  F0                                MOVX    @DPTR,A         ;save current data pointer
0022  A3                                INC     DPTR
0023  EA                                MOV     A,R2
0024  F0                                MOVX    @DPTR,A         ;save current data pointer
0025  80 0E      .R..                   SJMP    TXC990          ;jump to exit
                        TXC500:
0027  90 00 00   ..E.                   MOV     DPTR,#CONT3     ;port address
002A  74 00      .E..                   MOV     A,#STATUS       ;change PCM mode to data mode
002C  F0                                MOVX    @DPTR,A         ;write to the port
002D  74 00      .E..                   MOV     A,#TX_INT_OFF   ;disable PCM TX interrupt
002F  F0                                MOVX    @DPTR,A
```

```
93  0030  74 00     .E..               MOV    A,#RX_INT_ON      ;get command to enable RX interrupt
94  0032  F0                           MOVX   @DPTR,A
95  0033  C2 00     .E..               CLR    TX_EMPTY          ;TX buffer empty
96                           TXC990:
97  0035  02 00 00  ..E.               LJMP   PI9000            ;return to calling routine
98  0038                               END
```

Assembler Errors =    0

ACTUAL PROGRAM CODE FOR TRANSCEIVER UNIT (DIGITAL SERIAL INTERFACE)  PCM COMMAND TRANSMIT HANDLER (RTX_CMD)
WRITTEN IN ASSEMBLY LANGUAGE

APP. ITEM 6r  (3)

Cross Reference

| Label | Value | Reference | | |
|---|---|---|---|---|
| CONT3:CODE | E 0801 | 53 | 88 | |
| FI9000:CODE | E 0806 | 97 | | |
| PORT3A:CODE | E 0802 | 78 | | |
| RX_INT_ON:CODE | E 0803 | 93 | | |
| STATUS:CODE | E 0804 | 89 | | |
| TXC500:CODESEG | C 0027 | 64 | -87 | |
| TXC990:CODESEG | C 0035 | 86 | -96 | |
| TX_COMMAND:CODESEG | C 0000 | 51 | -61 | |
| TX_EMPTY:BIT | E 2800 | 52 | 95 | |
| TX_HEAD:XDATA | E 1007 | 54 | 67 | 80 |
| TX_INT_OFF:CODE | E 0805 | 91 | | |
| TX_NUMBER:XDATA | E 1008 | 62 | | |

ACTUAL PROGRAM CODE FOR TRANSCEIVER UNIT (DIGITAL SERIAL INTERFACE)
PCM COMMAND TRANSMIT HANDLER (RTX_CMD)
WRITTEN IN ASSEMBLY LANGUAGE

APP. ITEM 6r (4)

```
$XREF DEBUG TITLE(PCM COMMAND RECEIVE HANDLER)
                NAME    RRX_CMD
;***********************************************************************
;
;MODULE NAME: RRX_CMD
;
;       (C) Copyright 1987 Teletec Corporation, U.S.A.
;
;AUTHOR: Ming Hsu
;CODE COMPLETE: 05/22/86
;LAST MODIFICATION: 03/17/87
;PERFORMED BY: John Fussell
;TEST/DEBUG:
;
;REVISION NUMBER: new
;
;DESCRIPTION: This module will execute in response to a PCM receive command
;             interrupt. This module will be responsible for removing data
;             from the PCM receive command latch and storing the data into
```

```
                                  ;              a buffer.
                                  ;
                                  ;INPUTS: RX_HEAD - contains pointer for next received byte.
                                  ;
                                  ;OUTPUTS: RX_BEG - receive buffer updated with new receive data.
                                  ;
                                  ;REGISTER USAGE: A, R1, R2, DPTR
                                  ;
                                  ;SUPPORT MODULES: none
                                  ;
                                  ;SIZE:
                                  ;
                                  ;EXECUTION TIME:
                                  ;
                                  ;PDL:
                                  ;       get data from pcm command receive port
                                  ;       save it in receive buffer
                                  ;       adjust RX_HEAD
                                  ;       EXIT
                                  ;
                                  ;************************************************************************
```

ACTUAL PROGRAM CODE FOR TRANSCEIVER UNIT (DIGITAL SERIAL INTERFACE)
PCM COMMAND RECEIVE HANDLER (RRX_CMD)
WRITTEN IN ASSEMBLY LANGUAGE

APP. ITEM 6s (1)

```
                                  CODESEG        SEGMENT CODE
                                                 RSEG    CODESEG
                                                 PUBLIC  RX_COMMAND
                                                 EXTRN   CODE(PORT3B,PI9000)
                                                 EXTRN   XDATA(RX_BEG,RX_HEAD,RX_TIMER)
                                                 EXTRN   DATA(REAL_CLOCK)
```

ACTUAL PROGRAM CODE FOR TRANSCEIVER UNIT (DIGITAL SERIAL INTERFACE)
PCM COMMAND RECEIVE HANDLER (RRX_CMD)
WRITTEN IN ASSEMBLY LANGUAGE

APP. ITEM 6s (2)

```
                                  ;**************************************************************************
                                  ;
                                  ;      Get data from PCM command receive port and save it in receive buffer
                                  ;
                                  ;**************************************************************************
0000                              RX_COMMAND     EQU     $                         ;entry point
0000   90 00 00    ..E.                          MOV     DPTR,#PORT3B              ;load PCM RX command port address
0003   E0                                        MOVX    A,@DPTR                   ;get command byte
0004   F9                                        MOV     R1,A                      ;save receive data
0005   90 00 00    ..E.                          MOV     DPTR,#RX_HEAD             ;get buffer tail address
0008   E0                                        MOVX    A,@DPTR                   ;get pointer(low byte)
0009   FA                                        MOV     R2,A
000A   A3                                        INC     DPTR
```

```
62  000B  E0                 MOVX   A,@DPTR                   ;get pointer(high byte)
63  000C  8A 82      .D..    MOV    DPL,R2
64  000E  F5 83      .D..    MOV    DPH,A                     ;move pointer to DPTR
65  0010  E9                 MOV    A,R1                      ;restore receive data
66  0011  F0                 MOVX   @DPTR,A                   ;save RX data in RX buffer
67                  ;***************************************************************************
68                  ;
69                  ;       Adjust RX_HEAD
70                  ;
71                  ;***************************************************************************
72  0012  A3                 INC    DPTR                      ;increase pointer
73  0013  E5 82      .D..    MOV    A,DPL                     ;save pointer
74  0015  A9 83      .D..    MOV    R1,DPH                    ;save pointer
75  0017  90 00 00   ..E.    MOV    DPTR,#RX_HEAD             ;get pointer address
76  001A  B9 00 07   .ER.    CJNE   R1,#HIGH(RX_BEG+32),RC1000
77                                                            ;check for end of buffer
78  001D  B4 20 04   .ER.    CJNE   A,#LOW(RX_BEG+32),RC1000
79  0020  74 00      .E..    MOV    A,#LOW(RX_BEG)            ;RX buffer starting point
80  0022  79 00      .E..    MOV    R1,#HIGH(RX_BEG)          ;RX buffer starting point
81                  RC1000:
82  0024  F0                 MOVX   @DPTR,A                   ;save current pointer(low byte)
83  0025  A3                 INC    DPTR
84  0026  E9                 MOV    A,R1
85  0027  F0                 MOVX   @DPTR,A                   ;save current pointer
86  0028  90 00 00   ..E.    MOV    DPTR,#RX_TIMER            ;get address of receive message timer
87  002B  E5 00      .E..    MOV    A,REAL_CLOCK              ;get current value of realtime clock
88  002D  F0                 MOVX   @DPTR,A                   ;update receive timer
89  002E  02 00 00   ..E.    LJMP   PI9000                    ;return to calling routine
90  0031                     END

Assembler Errors =    0
```

ACTUAL PROGRAM CODE FOR TRANSCEIVER UNIT (DIGITAL SERIAL INTERFACE)
PCM COMMAND RECEIVE HANDLER (RRX_CMD)
WRITTEN IN ASSEMBLY LANGUAGE

APP. ITEM 6s (3)

Cross Reference

| Label | Value | Reference | | | | |
|---|---|---|---|---|---|---|
| FI9000: CODE | E 0801 | 89 | | | | |
| FORT3B: CODE | E 0800 | 45 | 55 | | | |
| RC1000: CODESEG | C 0024 | 76 | 78 | -81 | | |
| REAL_CLOCK: DATA | E 1805 | 47 | 87 | | | |
| RX_BEG: XDATA | E 1002 | 46 | 76 | 78 | 79 | 80 |
| RX_COMMAND: CODESEG | C 0000 | 44 | -54 | | | |
| RX_HEAD: XDATA | E 1003 | 58 | 75 | | | |
| RX_TIMER: XDATA | E 1004 | 86 | | | | |

ACTUAL PROGRAM CODE FOR TRANSCEIVER UNIT (DIGITAL SERIAL INTERFACE)
PCM COMMAND RECEIVE HANDLER (RRX_CMD)
WRITTEN IN ASSEMBLY LANGUAGE

APP. ITEM 6s (4)

```
$XREF DEBUG TITLE(RFU RESPONSE DISPATCH FUNCTION)
                     NAME     RCM_DISP
;*********************************************************************
;
;MODULE NAME: RCM_DISP
;
;        (c) Copyright 1987  Teletec Corporation, U.S.A.
;
;AUTHOR: John Fussell
;CODE COMPLETE: 07/10/86
;LAST MODIFICATION: 03/18/87
;PERFORMED BY: John Fussell
;TEST/DEBUG:
;
;REVISION NUMBER: new
;
;DESCRIPTION: This module will handle the reception of messages from the
;             RFU other than ACK's and NAK's. These messages will be stored
;             and program control will be dispatched to the appropriate
;             command processor for action. A checksum will be calculated
;             on the incoming message and bad messages will result in the
;             original CU command being re-transmitted.
;
;INPUTS: RX_BEG - pcm receive buffer.
;
;OUTPUTS: none
;
;REGISTER USAGE: A, DPTR, R0, R2, R3, R7
;
;SUPPORT MODULES: CTX_SAME - handles re-transmission of previous message.
;
;SIZE:
;
;EXECUTION TIME:
;
;*********************************************************************
```

ACTUAL PROGRAM CODE FOR TRANSCEIVER UNIT (DIGITAL SERIAL INTERFACE)
RFU RESPONSE DISPATCH FUNCTION (RCM_DISP)
WRITTEN IN ASSEMBLY LANGUAGE

APP. ITEM 6t (1)

```
;*********************************************************************
;
;PDL:    IF ( REAL_CLOCK - RX_TIMER - RX_TIMEOUT > 1 )
;           retransmit
;        ELSE
;           A = number of bytes received
;           B = number of bytes expected
;           A : B
;           IF (all bytes are here)
;              calculate checksum
;              IF (checksum bad)
;                 retransmit
```

```
                          ;             ELSE
                          ;               dispatch program to message handler
                          ;               reset message function
                          ;             ENDIF
                          ;           ENDIF
                          ;         ENDIF
                          ;         EXIT
                          ;
                          ;**********************************************************************
                          CODESEG         SEGMENT CODE
                                          RSEG    CODESEG
                                          PUBLIC  RCM_DISP
                                          EXTRN   BIT(SOH_OP_CK,SEND_SOH)
                                          EXTRN   DATA(RX_LENGTH,REAL_CLOCK,TIMEOUT_CNT)
                                          EXTRN   XDATA(RX_TAIL,RX_HEAD,RX_BEG,RX_TIMER)
                                          EXTRN   CODE(R_DISPATCH,RX_NUM_TABL)
                                          EXTRN   CODE(ACK,COMMAND,SOH,TX_INT_ON)
                                          EXTRN   CODE(PORT3A,CONT3)
```

ACTUAL PROGRAM CODE FOR TRANSCEIVER UNIT (DIGITAL SERIAL INTERFACE)
RFU RESPONSE DISPATCH FUNCTION (RCM_DISP)
WRITTEN IN ASSEMBLY LANGUAGE

APP. ITEM 6t (2)

```
                          ;**********************************************************************
                          ;
                          ;       CHECK RECEIVE TIME OUT
                          ;
                          ;**********************************************************************
0000                      RCM_DISP        EQU     $                           ;entry point
0000  20 00 22   .ER.                     JB      SOH_OP_CK,CD0300            ;if SOH_OP_CK=1 then skip SOH
                                                                              ;and OPCODE check
0003  90 00 00   ..E.                     MOV     DPTR,#RX_HEAD
0006  E0                                  MOVX    A,@DPTR
0007  F6                                  MOV     R0,A                        ;save the pointer
0008  B4 00 03   .ER.                     CJNE    A,#LOW(RX_BEG),CD0100
000B  02 00 76   ..C.                     LJMP    CD9900                      ;return in receive buffer empty
                          CD0100:
000E  90 00 00   ..E.                     MOV     DPTR,#RX_BEG                ;get receive buffer starting address
0011  E0                                  MOVX    A,@DPTR                     ;get first receive
0012  B4 00 54   .ER.                     CJNE    A,#SOH,CD8000               ;first byte should be SOH
                                                                              ;if not SOH, go to reset receive buffer
0015  B8 01 03   .ER.                     CJNE    R0,#LOW(RX_BEG+1),CD0200    ;is opcode received ?
0018  02 00 76   ..C.                     LJMP    CD9900
                          CD0200:
001B  A3                                  INC     DPTR                        ;point to opcode
001C  E0                                  MOVX    A,@DPTR                     ;get opcode
001D  90 00 00   ..E.                     MOV     DPTR,#RX_NUM_TABL
0020  93                                  MOVC    A,@A+DPTR
0021  F5 00      .E..                     MOV     RX_LENGTH,A                 ;save receive command length
0023  D2 00      .E..                     SETB    SOH_OP_CK                   ;set skip SOH and OPCODE check
                          ;**********************************************************************
                          ;
                          ;       HOW MANY BYTES ARE HERE
```

```
                          ;
                          ;**********************************************************************
                          CD0300:
0025  90 00 00   ..E.                MOV    DPTR,#RX_HEAD          ;get address of buffer pointer
0028  E0                             MOVX   A,@DPTR                ;get address of last byte received
0029  FA                             MOV    R2,A                   ;save low order byte
002A  A3                             INC    DPTR                   ;increment external ram pointer
002B  E0                             MOVX   A,@DPTR                ;retrieve address of last byte received
002C  FB                             MOV    R3,A                   ;save high order byte
002D  C3                             CLR    C                      ;clear carry before subtraction
002E  EA                             MOV    A,R2                   ;get low order last byte address
002F  94 00      .E..                SUBB   A,#LOW(RX_BEG)         ;subtract low order bytes
0031  95 00      .E..                SUBB   A,RX_LENGTH            ;subtract number of bytes expected
                                                                   ;from number received
0033  40 41      .R..                JC     CD9900                 ;branch if all bytes not yet received
0035  70 32      .R..                JNZ    CD8000                 ;branch if too many bytes received
                          ;**********************************************************************
                          ;
                          ;       CALCULATE MESSAGE CHECKSUM
                          ;
```

ACTUAL PROGRAM CODE FOR TRANSCEIVER UNIT (DIGITAL SERIAL INTERFACE) RFU RESPONSE DISPATCH FUNCTION (RCM_DISP)
WRITTEN IN ASSEMBLY LANGUAGE
APP. ITEM 6t (3)

```
                          ;************************************************************************
                          ;
                          ;       CHECK RECEIVE TIME OUT
                          ;
                          ;************************************************************************
0000                      RCM_DISP     EQU    $                              ;entry point
0000  20 00 22   .ER.                  JB     SOH_OP_CK,CD0300               ;if SOH_OP_CK=1 then skip SOH
                                                                             ;and OPCODE check
0003  90 00 00   ..E.                  MOV    DPTR,#RX_HEAD
0006  E0                               MOVX   A,@DPTR
0007  F8                               MOV    R0,A                           ;save the pointer
0008  B4 00 03   .ER.                  CJNE   A,#LOW(RX_BEG),CD0100
000B  02 00 76   ..C.                  LJMP   CD9900                         ;return in receive buffer empty
                          CD0100:
000E  90 00 00   ..E.                  MOV    DPTR,#RX_BEG                   ;get receive buffer starting address
0011  E0                               MOVX   A,@DPTR                        ;get first receive
0012  B4 00 54   .ER.                  CJNE   A,#SOH,CD8000                  ;first byte should be SOH
                                                                             ;if not SOH, go to reset receive buffer
0015  B8 01 03   .ER.                  CJNE   R0,#LOW(RX_BEG+1),CD0200       ;is opcode received ?
0018  02 00 76   ..C.                  LJMP   CD9900
                          CD0200:
001B  A3                               INC    DPTR                           ;point to opcode
001C  E0                               MOVX   A,@DPTR                        ;get opcode
001D  90 00 00   ..E.                  MOV    DPTR,#RX_NUM_TABL
0020  93                               MOVC   A,@A+DPTR
0021  F5 00      .E..                  MOV    RX_LENGTH,A                    ;save receive command length
0023  D2 00      .E..                  SETB   SOH_OP_CK                      ;set skip SOH and OPCODE check
                          ;**********************************************************************
                          ;
                          ;       HOW MANY BYTES ARE HERE
                          ;
                          ;**********************************************************************
                          CD0300:
0025  90 00 00   ..E.                  MOV    DPTR,#RX_HEAD          ;get address of buffer pointer
```

```
0028  E0                  MOVX   A,@DPTR          ;get address of last byte received
0029  FA                  MOV    R2,A             ;save low order byte
002A  A3                  INC    DPTR             ;increment external ram pointer
002B  E0                  MOVX   A,@DPTR          ;retrieve address of last byte received
002C  FB                  MOV    R3,A             ;save high order byte
002D  C3                  CLR    C                ;clear carry before subtraction
002E  EA                  MOV    A,R2             ;get low order last byte address
002F  94 00      .E..     SUBB   A,#LOW(RX_BEG)   ;subtract low order bytes
0031  95 00      .E..     SUBB   A,RX_LENGTH      ;subtract number of bytes expected
                                                  ;from number received
0033  40 41      .R..     JC     CD9900           ;branch if all bytes not yet received
0035  70 32      .R..     JNZ    CD8000           ;branch if too many bytes received
                 ;*****************************************************************
                 ;
                 ;      CALCULATE MESSAGE CHECKSUM
                 ;
```

ACTUAL PROGRAM CODE FOR TRANSCEIVER UNIT (DIGITAL SERIAL INTERFACE) RFU RESPONSE DISPATCH FUNCTION (RCM_DISP)
WRITTEN IN ASSEMBLY LANGUAGE
APP. ITEM 6t (3)

```
                 ;*****************************************************************
0037  C2 00      .E..     CLR    SOH_OP_CK        ;clear skip flag
0039  7A 00               MOV    R2,#0            ;init register used for checksum cal
003B  AF 00      .E..     MOV    R7,RX_LENGTH     ;get rx length
003D  1F                  DEC    R7               ;decrement number of message bytes
003E  90 00 00   ..E.     MOV    DPTR,#RX_BEG     ;get address of receive buffer
                 CD2000:
0041  E0                  MOVX   A,@DPTR          ;retrieve message byte from buffer
0042  2A                  ADD    A,R2             ;calculate checksum
0043  FA                  MOV    R2,A             ;save result
0044  A3                  INC    DPTR             ;point to next byte
0045  DF FA      .R..     DJNZ   R7,CD2000        ;branch if not done
0047  E0                  MOVX   A,@DPTR          ;retrieve received checksum
0048  C3                  CLR    C                ;reset carry before subtracting
0049  9A                  SUBB   A,R2             ;compare checksums
004A  60 03      .R..     JZ     CD5000           ;branch if checksum ok
```

ACTUAL PROGRAM CODE FOR TRANSCEIVER UNIT (DIGITAL SERIAL INTERFACE)
RFU RESPONSE DISPATCH FUNCTION (RCM_DISP)
WRITTEN IN ASSEMBLY LANGUAGE

APP. ITEM 6t (4)

```
                 ;*****************************************************************
                 ;
                 ;      CHECK SUM ERROR RESPONSE
                 ;
                 ;*****************************************************************
004C  02 00 76   ..C.     LJMP   CD9900
                 ;*****************************************************************
                 ;
                 ;      DISPATCH TO THE APPROPRIATE HANDLER
                 ;
                 ;*****************************************************************
                 CD5000:
004F  12 00 00   ..E.     LCALL  R_DISPATCH       ;call dispatch routine
0052  E4                  CLR    A
```

```
150  0053  F5 00       .E..                 MOV    TIMEOUT_CNT,A       ;clear time out count
151  0055  74 00       .E..                 MOV    A,#SOH
152  0057  10 00 02    .ER.                 JBC    SEND_SOH,CD5100
153  005A  74 00       .E..                 MOV    A,#ACK
154                              CD5100:
155  005C  90 00 00    ..E.                 MOV    DPTR,#PORT3A        ;load PCM command port address
156  005F  F0                               MOVX   @DPTR,A             ;load data to it
157  0060  90 00 00    ..E.                 MOV    DPTR,#CONT3         ;PCM C/D control port address
158  0063  74 00       .E..                 MOV    A,#COMMAND          ;change to command mode
159  0065  F0                               MOVX   @DPTR,A             ;load to port
160  0066  74 00       .E..                 MOV    A,#TX_INT_ON        ;enable TX interrupt
161  0068  F0                               MOVX   @DPTR,A             ;write to port
162                              ;*****************************************************************************
163                              ;
164                              ;      RESET RECEIVE BUFFER
165                              ;
166                              ;*****************************************************************************
167                              CD8000:
168  0069  90 00 00    ..E.                 MOV    DPTR,#RX_HEAD               ;get receive buffer head address
169  006C  74 00       .E..                 MOV    A,#LOW(RX_BEG)              ;low byte of buffer starting address
170  006E  F0                               MOVX   @DPTR,A
171  006F  A3                               INC    DPTR
172  0070  74 00       .E..                 MOV    A,#HIGH(RX_BEG)             ;high byte of buffer starting address
173  0072  F0                               MOVX   @DPTR,A
174  0073  02 00 76    ..C.                 LJMP   CD9900                      ;return to caller
175                              CD9900:
176  0076  22                               RET
177  0077                                   END
```

Assembler Errors =      0

ACTUAL PROGRAM CODE FOR TRANSCEIVER UNIT (DIGITAL SERIAL INTERFACE)
RFU RESPONCE DISPATCH FUNCTION (RCM_DISP)
WRITTEN IN ASSEMBLY LANGUAGE

APP. ITEM 6t (5)

Cross Reference

| Label | Value | Reference | | | | | | |
|---|---|---|---|---|---|---|---|---|
| ACK: CODE | E 080B | 66 | 153 | | | | | |
| CD0100: CODESEG | C 000E | 80 | -82 | | | | | |
| CD0200: CODESEG | C 001B | 87 | -89 | | | | | |
| CD0300: CODESEG | C 0025 | 75 | -101 | | | | | |
| CD2000: CODESEG | C 0041 | -125 | 130 | | | | | |
| CD5000: CODESEG | C 004F | 134 | -147 | | | | | |
| CD5100: CODESEG | C 005C | 152 | -154 | | | | | |
| CD8000: CODESEG | C 0069 | 85 | 114 | -167 | | | | |
| CD9900: CODESEG | C 0076 | 81 | 88 | 113 | 141 | 174 | -175 | |
| COMMAND: CODE | E 080C | 158 | | | | | | |
| CONT3: CODE | E 0810 | 157 | | | | | | |
| PORT3A: CODE | E 080F | 67 | 155 | | | | | |
| RCM_DISP: CODESEG | C 0000 | 61 | -74 | | | | | |
| REAL_CLOCK: DATA | E 1803 | 0 | | | | | | |
| RX_BEG: XDATA | E 1007 | 80 | 83 | 87 | 110 | 124 | 169 | 172 |
| RX_HEAD: XDATA | E 1006 | 77 | 102 | 168 | | | | |
| RX_LENGTH: DATA | E 1802 | 63 | 94 | 111 | 122 | | | |
| RX_NUM_TABL: CODE | E 080A | 92 | | | | | | |
| RX_TAIL: XDATA | E 1005 | 64 | | | | | | |
| RX_TIMER: XDATA | E 1008 | 0 | | | | | | |

```
R_DISPATCH:CODE        E 0809      65    148
SEND_SOH:BIT           E 2801     152
SOH:CODE               E 080D      85    151
SOH_OP_CK:BIT          E 2800      62     75     95    120
TIMEOUT_CNT:DATA       E 1804     150
TX_INT_ON:CODE         E 080E     160
```

ACTUAL PROGRAM CODE FOR TRANSCEIVER UNIT (DIGITAL SERIAL INTERFACE)
RFU RESPONSE DISPATCH FUNCTION (RCM_DISP)
WRITTEN IN ASSEMBLY LANGUAGE

APP. ITEM 6t (6)

```
$XREF DEBUG TITLE( COMMAND LENGTH TABLE )
                NAME    R_LENGTH
;************************************************************************
;
;MODULE NAME: R_LENGTH
;
;       (C) Copyright 1987 Teletec Corporation, U.S.A.
;
;AUTHOR: Ming Hsu
;CODE COMPLETE: 07/29/86
;LAST MODIFICATION: 03/03/87
;PERFORMED BY: Ming Hsu
;TEST/DEBUG:
;
;REVISION NUMBER: new
;
;DESCRIPTION: This module defines the length of the command string.
;
;INPUTS: OPCODE
;
;OUTPUTS: ACC - length of the command string.
;
;REGISTER USAGE: none
;
;SUPPORT MODULES: none
;
;SIZE:
;
;EXECUTION TIME:
;
;PDL: none
;
;************************************************************************
```

ACTUAL PROGRAM CODE FOR TRANSCEIVER UNIT (DIGITAL SERIAL INTERFACE)
COMMAND LENGTH TABLE (R_LENGTH)
WRITTEN IN ASSEMBLY LANGUAGE

APP. ITEM 6u (1)

```
CODESEG         SEGMENT CODE
                RSEG    CODESEG
                PUBLIC  RX_NUM_TABL
```

ACTUAL PROGRAM CODE FOR TRANSCEIVER UNIT (DIGITAL SERIAL INTERFACE)
COMMAND LENGTH TABLE (R_TABLE)
WRITTEN IN ASSEMBLY LANGUAGE

APP. ITEM 6u (2)

```
                 ;*****************************************************************************
                 ;
                 ;       TABLE OF COMMAND STRING
                 ;
                 ;*****************************************************************************
                 RX_NUM_TABL:
0000   00                  DB      0                          ;OP=0 dummy byte
0001   04                  DB      4                          ;OP=1 SNSQ level
0002   04                  DB      4                          ;OP=2 RF power level
0003   03                  DB      3                          ;OP=3 Voice Privacy ON
0004   03                  DB      3                          ;OP=4 Voice Privacy OFF
0005   06                  DB      6                          ;OP=5 TX sequential tone
0006   06                  DB      6                          ;OP=6 RX sequential tone
0007   07                  DB      7                          ;OP=7 FSK data message
0008   05                  DB      5                          ;OP=8 TX Synthesizer Reference Frequency
0009   05                  DB      5                          ;OP=9 RX Synthesizer Reference Frequency
000A   11                  DB      17                         ;OP=A Channel parameter change
000B   09                  DB      9                          ;OP=B PTT timeout constant
000C   04                  DB      4                          ;OP=C TX CTCSS Tone
000D   04                  DB      4                          ;OP=D PA MODE
000E   03                  DB      3                          ;OP=E Address True Reset
000F   03                  DB      3                          ;OP=F Control Transfer
                 ;*****************************************************************************
0010   04                  DB      4                          ;OP=10 DTMF Tone
0011   11                  DB      17                         ;OP=11 Guard Channel RX Frequency
0012   03                  DB      3                          ;OP=12 Power down command
0013   09                  DB      9                          ;OP=13 Group Priority Message
0014   12                  DB      18                         ;OP=14 Group Frequency Message
0015   04                  DB      4                          ;OP=15 Mode Message
0016   03                  DB      3                          ;OP=16 Health Status Check
0017   03                  DB      3                          ;OP=17 Configuration Check
0018   03                  DB      3                          ;OP=18 SSI Message Request
0019   03                  DB      3                          ;OP=19 Active Channel Request
001A   03                  DB      3                          ;OP=20 State table check sum
001B                       END

Assembler Errors =      0
```

ACTUAL PROGRAM CODE FOR TRANSCEIVER UNIT (DIGITAL SERIAL INTERFACE)
COMMAND LENGTH TABLE (R_LENGTH)
WRITTEN IN ASSEMBLY LANGUAGE

APP. ITEM 6u (3)

```
                        Cross Reference

Label                   Value     Reference
RX_NUM_TABL:CODESEG     C 0000       37    -44
```

ACTUAL PROGRAM CODE FOR TRANSCEIVER UNIT (DIGITAL SERIAL INTERFACE)
COMMAND LENGTH TABLE (R_LENGTH)
WRITTEN IN ASSEMBLY LANGUAGE

APP. ITEM 6u (4)

APPENDIX 7

Appendix 7 is a comprehensive compilation of software module headers and sample program codes of the system of the invention.

Table of Contents 1.0 Introduction 2.0 General System Overview 3.0 Software Design Description 4.0 Software Module Headers 5.0 Software Code Examples 1.0 Introduction The purpose of this document is to describe the design of the software to be used in the OMNI VHF Mobile Transceiver Radio System. There are four components of this document as follows:

- general system overview
- system block diagrams with explanations
- software module headers
- software code examples The general system overview will cover the program development process, the tools and computers used in the development process and a high level discussion of the software architecture.

The system block diagrams and explanations will cover in more detail how the software works and which sub-modules support the major modules.

The software module headers are the actual headers used to identify and describe each module of the software design.

The software code examples are the actual assembly language listings of the primary modules used to support the front panel control system.

2.0 General System Overveiw

There are two computer programs in the OMNI VHF Mobile Transceiver Radio System. One program resides in the Control Unit and one program resides in the Transceiver Unit. Both programs use similar architectures to perform their different functions. The two programs communicate to each other over the bidirectional PCM communications link which the software controls. The Control Unit program basically handles management of the LCD display, front panel keyboard, and radio database. The Transceiver Unit program basically handles controling the various hardware modules in the Transceiver Unit based on the command information sent to it from the Control Unit program.

The approach taken on this design was to use state driven software in order to reduce complexity and to make the software easy to modify and test. The basic concept is to have an interrupt function that updates a system state table in memory based on changes in the system. State change flags are used to show that a particular state variable has changed. There will be a circular executive module that will monitor the state change flags and will execute the appropriate module to perform any action that the state change requires. The combination of state driven modules with a circular exec allows for a straight forward implementation of a multitasking software system. All basic functions of the radio will be handled this way. This includes the Control Unit updates as well as Transceiver module update functions.

2.1 Software Development Process

The software development process used was "top down design". This process is a standard software technique used to develop code from the general requirements or top level downward toward the specific implementation. The software development process included several major phases.

The first phase was the requirements definition phase. During this phase all requirements for the software were identified and documented. The second phase was the design phase. The first step of the design phase was to examine the software requirements and define the basic system architecture needed to meet the requirements. After the basic architecture was defined the next step was to complete the high level design of the software modules shown in the basic architecture. The next step was to complete program development language (PDL) or psuedo code for each of the modules. After the PDL was complete the source code for each module was written and each module was assembled. After many modules were coded and assembled the individual modules were linked together to form one large program. Once the modules were linked together then the debug phase took place.

To debug the code two methods were used. In one method a software simulator was used in the development enviornment to run the code. This process simulates execution of each instruction of the program in a controlled situation to allow analysis by the programmer. The second method of debug was the use of an in circuit emulator (ICE). In this method the program is executed in the actual target system under control of the emulator. In both methods of debug, basic operation of the code along with overall program flow is verified.

The last phase in the development was testing. In this phase correct interaction of the program with the hardware was verified. This was accomplished by using oscilliscopes, logic analyzers and RF signal generators on the target system to verify each of the requirements defined in the first stage of development.

2.2 Computers and Development Tools

MS-DOS compatible microcomputers were used as the development enviornment to run the cross assembler, the editors, the simulator and the emulator. The programming language used was Intel 8051 Assembly Language. The following text editors were used for source code development: Wordstar Professional. IBM Professional Editor II, UnderWare Inc. Brief Editing Facility and Custom Software Systems PC/VI. The assembler and linker used for program development was the Microtec Research Paragon ASM51 Cross Assembler and Linker. The software simulator used was the Avocet AVSIM 8051. The in circuit emultor (ICE) used to debug the code was the Metalink MetaICE-32.

3.0 Software Design Description

The system block diagrams and explanations will cover in more detail how the software works and which sub-modules support the major modules.

3.1 Control Unit Program

The Control Unit Program is divided into several subprograms as shown in the diagram. The division is based on functionality and is accomplished in the program by using interrupt levels. The Control Unit interrupt structure is such that the executive module (CEXEC) is the foreground or non-interrupt level. The other subprograms have been allocated a dedicated interrupt. Each of this subprograms can interrupt the executive level. No interrupt routine may interrupt another except for the PCM communication interrupt (CINTZERO). The PCM communication interrupt may interrupt all other levels of the program.

Control Unit Program Diagram (insert state diagram here)

3.1.1 Control Unit Executive (CEXEC)

The Control Unit Executive module is the main controlling routine in the Control Unit Program. Structurally this module is circular in fashion. This means that once execution of this routine begins it will continue in an endless loop until power down occurs. While executing in the loop the routine will constantly check several state change flags to determine if an action is required. Should a flag indicate that a change in the system has occured then the executive routine will execute the appropriate action routine. The following sub-modules support the Control Unit Executive routine:

| | | | |
|---|---|---|---|
| CALPHA | CANNUNC | CHEALTH | CBEEPER |
| CVUPDATE | CEEROMPG | CPCOMTX | CPCOMRX |
| CMODE | CCUPDATE | CEXSTATE | CSUPDATE |
| CCTCSSTX | CCTCSSRX | CPOWER | CPHONE |
| CPRIVACY | CAUX | CPA_ACT | CGRP_ACT |
| CTX_ACT | CPD_ACT | CCM_DISP | CSCN_CMD |
| CRVT_CMD | CCT_CMD | CDSP_SPR | CHEAL_CMD |
| CPCMRES | | | |

3.1.2 Power Up Initialization (CPWRUP)

The Power Up Initialization module executes once for every power up reset to the system and performs most of the action required to prepare the Control Unit for operation. This includes performing diagnostics, initializing I/O ports, initializing the system state table, initializing the timers and starting the interrupts. Once initialization is complete program control is passed to the Control Unit Executive routine. The following sub-modules support the power up initialization function:

| | | | |
|---|---|---|---|
| CEXTRAMT | CROMTST | SSYSRES | CLCDINIT |
| CINTRAMT | CCH_DISP | CMES_DIS | |

3.1.3 PCM Communications Interrupt (CINTZERO)

The PCM Communications Interrupt routine handles the transmitting and receiveing of data to and from the Transceiver Unit. This routine must first determine the source of the interrupt (transmit or receive). Once the source is determined then data is either transmitted from a previously prepared buffer or received and stored in another buffer for later use by the Control Unit program. The data is transmitted and received in a specific message format that includes start of header, opcode, message checksum and data. Once a data transmission is initiated, one byte of data will be transmitted every 250 usec until all bytes have been transmitted. The following sub-modules support the PCM Communications Interrupt routine:

CINTZERO CTX_CMD CRX_CMD 3.1.4 Radio Function Interrupt (CRADIO)

The Radio Function Interrupt is a realtime timer interrupt used to monitor radio functions that require realtime response. This timer interrupt is generated once every 250 usec and divided into four operational states. Each state handles different functions and the states are changed such that each function is processed once every 1 msec. Radio functions that are handled by this interrupt level are: microphone push to talk debounce, microphone hook switch debounce, audio and speaker control, transmit light control, busy light control, auxiliary function, and push to talk timeouts. The status of these radio functions are communicated to and from the Transceiver Unit by the PCM Single Bit Status Signals.

3.1.5 RS-232 Communications Interrupt (CP232INT)

The RS-232 Communications Interrupt routine handles the transmitting and receiveing of data thru the microprocessor's onboard USART. This routine must first determine the source of the interrupt (transmit or receive). Once the source is determined then data is either transmitted from a previously prepared buffer or received and stored in another buffer for later use by the Control Unit program. The data is transmitted and received in a message format specific to the application of the USART. The USART can be used to program the radio's database, control the radio remotely or to interface external peripheral equipment.

3.1.6 Keyboard and Power Interrupts (CKEYINT)

The Keyboard and Power Interrupt module handles determining the source of interrupt and dispatch to the appropriate handler. Possible interrupt sources are a power button actuation, a power monitor alert or a front panel keyboard actuation. If either power interrupt occurs CKEYINT will request a power down of the system. The CEXEC module will handle the power down action request. If a front panel key has been actuated then CKEYINT will start the Keytimer and enable the Keytimer Interrupt.

3.1.7 Keytimer Interrupt (CKEYTIME)

The Keytimer Interrupt routine handles debounce and dispatch of all front panel keyboard support routines. These routines form the primary control system for the OMNI Transceiver Radio System. During normal system operation there are no keytimer interrupts until a key sequence is initiated. Once the first key of key sequence is initiated and CKEYINT has passed program control to the CKEYTIME module then keytimer interrupts will begin ocurring on a regular basis to handle the key sequence. The Keytimer module and sub-modules handle each key sequence in a state driven manner such that each key in a sequence is a finite state. Each time the Keytimer interrupt occurs in a key sequence program control will be vectored to a sub-module to handle the current state. This continues until the key sequence is completed. The following sub-modules support the Keytimer Interrupt routine:

| | | | |
|---|---|---|---|
| CKEYTIME | CKEYSCAN | CKEYCHEK | CKEYCODE |
| COTHERS | CSEQ | CFINAL | |
| CCANCEL | CCH_VAL | CGROUP | CIR_VOL |
| CIR_SQ | CIR_CH | CMESSAGE | CSET_PA |
| CSET_PWR | CSET_MES | CSET | CSITE |
| CSQ_VAL | CSELECT | | |

3.2 Transceiver Unit Program

The Transceiver Unit Program is divided into several subprograms as shown in the diagram. The division is based on functionality and is accomplished in the program by using interrupt levels. The Transceiver Unit interrupt structure is such that the executive module (REXEC) is the foreground or non-interrupt level. The other subprograms have been allocated a dedicated interrupt. Each of this subprograms can interrupt the executive level. No interrupt routine may interrupt another except for the PCM communication interrupt (RPCMINT). The PCM communication interrupt may interrupt all other levels of the program.

Transceiver Unit Diagram (insert state diagram here)

3.2.1 Transceiver Unit Executive (REXEC)

The Transceiver Unit Executive module is the main controlling routine in the Transceiver Unit Program. Structurally this module is circular in fashion. This means that once execution of this routine begins it will continue in an endless loop until power down occurs. While executing in the loop the routine will constantly check several state change flags to determine if an action is required. Should a flag indicate that a change in the system has occured then the executive routine will execute the appropriate action routine. The following sub-modules support the Transceiver Unit Executive routine:

| | | | |
|---|---|---|---|
| REXEC | RRXSYN | RTXSYN | RCTCSSRX |
| RCTCSSTX | RPOWER | RAUD_ACT | RUNMUTE |
| REXSTATE | RTX_SEQ | RSCAN | RPD_ACT |
| RMODE | RRFSNSQ | R_DISPAT | RPCMRES |

3.2.2 Power Up Initialization (RPWRUP)

The Power Up Initialization module executes once for every power up reset to the system and performs most of the action required to prepare the Transceiver Unit for operation. This includes performing diagnostics, initializing I/O ports, initializing the system state table, initializing the timers and starting the interrupts. Once initialization is complete program control is passed to the Transceiver Unit Executive routine. The following sub-modules support the power up initialization function:

RPWRUP RINTRAMT REXTRAMT RROMTEST 3.2.3 Radio Function Interrupt (RRADIO)

The Radio Function Interrupt is a realtime timer interrupt used to monitor radio functions that require realtime response. This timer interrupt is generated once every 1 msec. Radio functions that are handled by this interrupt level are: audio and speaker control, PTT functions, the busy function, and push to talk timeouts. The status of these radio functions are communicated to and from the Control Unit by the PCM Single Bit Status Signals.

3.2.4 Power Down Interrput (RPWRDN)

The Power Down Interrupt routine handles initiating a controlled power down of the Transceiver Unit should the Power Monitor Interrupt become active. If the Power Monitor interrupt occurs RPWRDN will request a power down of the system. The REXEC module will handle the power down action request.

3.2.5 PCM Communication Interrupt (RPCMINT)

The PCM Communications Interrupt routine handles the transmitting and receiving of data to and from the Control Unit. This routine must first determine the source of the interrupt (transmit or receive). Once the source is determined then data is either transmitted from a previously prepared buffer or received and stored in another buffer for later use by the Transceiver Unit program. The data is transmitted and received in a specific message format that includes start of header, opcode, message checksum and data. Once a data transmission is initiated, one byte of data will be transmitted every 250 usec until all bytes have been transmitted. The following sub-modules support the PCM Communications Interrupt routine:

RPCMINT
RTX_CMD
RRX_CMD 4.0 Software Module Headers

The software module headers are the actual headers used to identify and describe each module of the software design. The headers as shown are in various stages of completion based on the current phase of development for a given module.

Example:

```
;**********************************************************************
;
;MODULE NAME: name used for module, module entry point and filename
;
;       (c) Copyright 1987  Teletec Corporation, U.S.A
;
;AUTHOR: programmer s name
;CODE COMPLETE: date
;
;LAST MODIFICATION: date
;PERFORMED BY: programmer s name
;
;TEST/DEBUG: date
;
;REVISION NUMBER: references the release number
;
;DESCRIPTION: english description of what the module does
;
;INPUTS: items the module needs for proper execution
;
;OUTPUTS: product of module execution
;
;REGISTER USAGE: 8051 registers modified during execution
;
;SUPPORT MODULES: utility modules used by this module
;
;SIZE: program memory spaced required
;
;EXECUTION TIME: time in microseconds for module execution
;
;PDL: program development language or psuedo code
;
;**********************************************************************
```

4.1 Control Unit Module Headers (insert control unit headers here)

PATENT_2.TXT
PATENT_3.TXT
PATENT_4.TXT
PATENT_5.TXT
PATENT_6.TXT 4.2 Transceiver Unit Module Headers (insert transceiver unit headers here)

PATENT_7.TXT
PATENT_8.TXT
PATENT_9.TXT 5.0 Software Code Examples

The software code examples are the actual assembly language listings of the primary modules used to support the front panel control system. The modules included are listed below:

| | | | |
|---|---|---|---|
| CKEYTIME | CKEYSCAN | CKEYCHEK | CKEYCODE |
| COTHERS | CSEQ | CFINAL | CKEYINT |
| CCANCEL | CCH_VAL | CGROUP | CIR_VOL |
| CIR_SQ | CIR_CH | CMESSAGE | CSET_PA |
| CSET_PWR | CSET_MES | CSET | CSITE |
| CSQ_VAL | CSELECT | | |

(insert program listings here)

PATENT_0.TXT

```
;***********************************************************************
;
;MODULE NAME: CKEYTIME
;
;       (C) Copyright 1987 Teletec Corporation, U.S.A.
;
;AUTHER: Ming Hsu
;CODE COMPLETE: 01/20/86
;LAST MODIFICATION: 03/09/87
;PERFORMEr BY: Ming Hsu
;TEST/DEBUG: 02/05/86
;
;REVISION NUMBER: new
;
;DESCRIPTION: This module takes care of keyboard timer functions. This
;             includes operator timeouts,key debounce and other keyboard
;             timing.
;
;INPUTS: NONE
;
;OUTPUTS: NONE
;
;REGISTERS USAGE: ACC, DPTR, PSW
;
;SUPPORT MODULES: KEYSCAN - scans keyboard rows and columns.
;
;SIZE: OF1H
;
;EXECUTION TIME:
;
;***********************************************************************


;***********************************************************************
;
;PDL:
;       save register used
;       prescaler function
;               IF prescaler count not equal to 0
;                  THEN set up 250 us timer
;                       exit
;               ENDIF
;       beeper service routine
;               IF beeper count = 0
;                       THEN turn off beeper
;                       ELSE decrease beeper count
;               ENDIF
;       power down and TX mode check
;               IF power down signal active
;                       THEN perform power down function
;               ENDIF
;               IF in TX mode
;                       THEN display current channel number
;               ENDIF
;       keytimer prescaler
;               wait 40 ms before go to keyboard scan routine
;       perform keyboard scan
;       IF release state
;               THEN
;                       IF no key pressed
;                               THEN go to final state
;                               ELSE wait until key release
;                       ENDIF
```

```
;       ENDIF
;       IF final state
;               THEN check operator time out
;               IF key debounced
;                       THEN go to key sequence
;                       ELSE wait for keys to be debounced
;               ENDIF
;       ENDIF
;       perform illegal key function
;       perform valid key function
;       perform operator timeout check
;               decrease operator time count
;                       IF timeout count = 0
;                               THEN revert LCD dispaly to channel number
;                       ENDIF
;       performed final state function
;               disable beeper
;               reset key sequence starting address
;               reset key matrix
;               clear last key buffer
;               enable keyboard interrupt
;               restore registers
;       EXIT
;
;***************************************************************************

;***************************************************************************
;
;MODULE NAME: CKEYINT
;       (C) Copyright 1987 Teletec Corporation, U.S.A.
;AUTHOR: Ming C. Hsu
;CODE COMPLETE: 02/10/86
;LAST MODIFICATION: 03/09/87
;PERFORMED BY: Ming C. Hsu
;TEST/DEBUG: 02/10/86
;
;REVISION NUMBER: new
;
;DESCRIPTION: Keyboard interrupt service routine.
;
;INPUTS: none
;
;OUTPUTS: key matrix data in KEY_BUFFER
;
;REGISTERS USAGE: register bank 3, ACC, DPTR, PSW
;
;SUPPORT MODULES: keyscan
;
;SIZE: 4CH
;
;EXECUTION TIME:
;
;PDL:
;       disable keytimer interrupt
;       disable keyboard interrupt
;       save register
;       initialize key scan buffer
;       perform key scan
;       set up debounce timer
;       EXIT
;
;***************************************************************************

;***************************************************************************
;
;MODULE NAME: CKEY_CHEK
;       (C) Copyright 1987 Teletec Corporation, U.S.A.
;AUTHOR: Ming Hsu
;CODE COMPLETE: 01/20/86
;LAST MODIFICATION: 03/09/87
;PERFORMED BY:Ming Hsu
;TEST/DEBUG:
;
;REVISION NUMBER: NEW
;
;DESCRIPTION: This module checks to see is any key in the key buffer.
;
;INPUTS: KEY_OUTO,KEY_OUT1,KEY_OUT2
;
;OUTPUTS: A=KEYCODE( O= NO KEY )
;
;REGISTERS USAGE: ACC,RO,R1
;
```

```
;SUPPORT MODULES: NONE
;
;SIZE:  OCH
;
;EXECUTION TIME:
;
;PDL:
;       get key buffer contents
;       IF key buffer not equal to 0
;               THEN exit
;               ELSE check next buffer location
;       ENDIF
;       end
;
;**********************************************************************


;**********************************************************************
;
;MODULE NAME: CKEYSCAN
;       (C) Copyright 1987, Teletec Corporation, U.S.A.
;AUTHOR: Ming Hsu
;CODE COMPLETE: 01/18/86
;LAST MODIFICATION: 03/09/87
;PERFORMED BY: Ming Hsu
;TEST/DEBUG: 01/18/86
;
;REVISION NUMBER: new
;
;DESCRIPTION: This module scans the keyboard matrix, debounces and
;             outputs the valid keycode.
;
;INPUTS: none
;
;OUTPUTS: keycode(s)
;
;REGISTERS USAGE: A, DPTR, PSW, RO, R1, R2, R3, R4
;
;SUPPORT MODULES: KEYCODE - performs keyboard decode function.
;
;SIZE:
;
;EXECUTION TIME:
;
;PDL:
;       set one of the row to low
;       read key column input
;       compare current reading to last reading
;       IF (current reading not equal to last reading)
;          clear the flag
;          save the current reading to last reading
;       ENDIF
;       scan next row
;       EXIT
;
;**********************************************************************


;**********************************************************************
;
;MODULE NAME: CKEYCODE
;       (C) Copyright 1987 Teletec Corporation, U.S.A.
;AUTHOR: Ming Hsu
;CODE COMPLETE: 01/18/86
;LAST MODIFICATION: 03/09/87
;PERFORMED BY: Ming Hsu
;TEST/DEBUG: 01/18/86
;
;REVISION NUMBER: new
;
;DESCRIPTION: This module analyzes the key matrix and outputs the key codes.
;
;INPUTS: Key matrix reading
;
;OUTPUTS: Key code(s)
;
;REGISTERS USAGE: A, DPTR, PSW, RO, R1, R2, R3, R4, R5, R6
;
;SUPPORT MODULES: none
;
;SIZE: 76H
;
;EXECUTION TIME:
;
```

```
;PDL:
; (1) DECODE:
;       check bit position for all key matrix input( total 4 bytes)
;               IF bit=0
;                       THEN get key code
;                            IF more then 3 keys
;                               THEN ignore rest of the keys
;                       ELSE next bit
;       END OF DECODING
;
; (2) CODE OUTPUT:
;       IF LAST KEY exist
;               THEN compare LAST KEY to CURRENT KEY
;                       IF LAST KEY equals to any of the CURRENT KEY
;                               THEN delete CURRENT KEY
;                               ELSE output key released
;       move CURRENT KEY to KEY OUTPUT
;       update LAST KEY
;       END OF KEY OUTPUT
;
;*********************************************************************


;*********************************************************************
;
;MODULE NAME: KEY SEQUENCE
;       (C) Copyright 1987 Teletec Corporation, U.S.A.
;AUTHOR: Ming Hsu
;CODE COMPLETE: 01/22/86
;LAST MODIFICATION:03/09/87
;PERFORMED BY: Ming Hsu
;TEST/DEBUG:
;
;REVISION NUMBER: new
;
;DESCRIPTION: This module dispatch the keycode action.
;
;INPUTS: keycode
;
;OUTPUTS: brounching to corresponding address
;
;REGISTERS USAGE:    ACC, PSW
;
;SUPPORT MODULES:
;                 KEY_CHECK: get key code.
;                 F_STATE: final state
;                 ERR_DISP: display error message
;                 SECRET: secret code sequence
;
;SIZE:  68H
;
;EXECUTION TIME:
;
;PDL:
;       IF program mode
;               THEN
;                       performed secret function
;       ENDIF
;       get key code
;       IF no key
;               THEN go to final state
;       ENDIF
;       IF key release
;               THEN go to final state
;       ENDIF
;       IF in error mode
;               THEN go to error display
;       ENDIF
;       jump to key sequence
;       end
;
;*********************************************************************

;*********************************************************************
;
;MODULE NAME: CFINAL
;       (C) Copyright 1987 Teletec Corporation, U.S.A.
;AUTHOR: Ming Hsu
;CODE COMPLETE: 02/23/87
;LAST MODIFICATION: 02/23/87
;PERFORMED BY: Ming Hsu
;TEST/DEBUG:
;
;REVISION NUMBER: new
;
;DESCRIPTION: This routine handles the final key exit
;
```

```
;INPUTS:none
;
;OUTPUTS: none
;
;REGISTERS USAGE: ACC, R0, R1, R5, DPTR
;
;SUPPORT MODULES: KEY_CHECK - get key code.
;
;SIZE:  24H
;
;EXECUTION TIME:
;
;PDL:
;       add valid beeper count
;       reset next procedure
;       set up timer and go to sleep
;       EXIT
;
;***********************************************************************


;***********************************************************************
;
;MODULE NAME: CAN_KEY
;       (C) Copyright 1987 Teletec Corporation, U.S.A.
;AUTHOR: Ming Hsu
;CODE COMPLETE:  09/17/86
;LAST MODIFICATION: 03/09/87
;PERFORMED BY: Ming Hsu
;TEST/DEBUG:
;
;REVISION NUMBER: new
;
;DESCRIPTION: This module handles the CAN key sequence.
;
;INPUTS: keycode
;
;OUTPUTS: none
;
;REGISTERS USAGE: ACC, PSW, DPTR, R0, R1, R5
;
;SUPPORT MODULES: KEY_CHECK: get key code
;                 SET_MESS: load LCD message
;                 SITE_CAN: cancel site function
;
;SIZE: 101H
;
;EXECUTION TIME:
;
;***********************************************************************


;***********************************************************************
;
;PDL:
;       IF multiple keys
;          THEN illegal key exit
;       set up next entry address
;       blank display
;       set up timer and wait for next key
;
;       KEY DISPATCH MODULE
;       IF no key pressed
;          THEN check operator time out
;       CASE 1: PA key
;          THEN disable PA function
;               display PA OFF message
;               exit
;       CASE 2: CH key
;          THEN set up entry point for channel number
;               display message
;               exit
;       CASE 3: SIT key
;          THEN perform can site function
;               display SITE OFF message
;               exit
;       CASE 4: AUX key
;          THEN disable AUX function
;               display AUX OFF message
;               exit
;       CASE 5: FON key
;          THEN disable FON function
;               dispaly FON OFF message
;               exit
```

```
;       CASE 6: PRI key
;          THEN disable PRI function
;               display PRI OFF message
;               exit
;       CASE 7: MSG key
;          THEN load default message
;               display MSG OFF message
;               exit
;       CASE 8: # key
;          THEN set beeper off flag
;               display beeper off message
;               exit
;       CASE 9: * key
;          THEN set EL lamp off flag
;               exit
;
;       go to check other keys
;
;*********************************************************************


;*********************************************************************
;
;MODULE NAME: CCH_VAL
;       (C) Copyright 1987 Teletec Corporation, U.S.A.
;AUTHOR: Ming Hsu
;CODE COMPLETE: 03/10/86
;LAST MODIFICATION: 03/09/87
;PERFORMED BY: Ming Hsu
;TEST/DEBUG:
;
;REVISION NUMBER: new
;
;DESCRIPTION: This routine handles the key sequences used to support
;             user channel selection.
;
;INPUTS:    key code
;
;OUTPUTS:   none
;
;REGISTERS USAGE:
;                   ACC, PSW, B, RO, R1, R5, DPTR
;
;SUPPORT MODULES:   KEY_CHECK: get key code
;                   MESS_DISP: transfer LCD display message to LCD buffer
;                   CCHADDR: get channel address
;                   CHDISP: display channel message
;
;SIZE: OCEH
;
;EXECUTION TIME:
;
;PDL:   first key input
;       IF no key
;               THEN go to check operator's time out
;       get first key value
;       IF not number key
;               THEN check other key entry
;       display input value
;       set up next key sequence
;       perform second key input
;       IF no key
;               THEN go to check operator's time out
;       get first key value
;       IF not number key
;               THEN check other key entry
;       display input value
;       convert BCD to binary
;       IF channel input value over limit
;               THEN revert LCD to original display
;       enable channel
;       display current channel
;       end
;
;*********************************************************************
```

```
;*************************************************************************
;
;MODULE NAME: CGROUP
;       (C) Copyright 1987 Teletec Corporation, U.S.A.
;AUTHOR: Ming Hsu
;CODE COMPLETE: 03/13/86
;LAST MODIFICATION: 03/09/87
;PERFORMED BY: Ming Hsu
;TEST/DEBUG:
;
;REVISION NUMBER: new
;
;DESCRIPTION: This module takes care of the key sequence SET-GRP-X-X.
;
;INPUTS: none
;
;OUTPUTS: none
;
;REGISTERS USAGE:
;
;SUPPORT MODULES: KEY_CHECK - to get key code from key buffer
;                 MESS_DISP - to load message to LCD buffer
;SIZE:
;
;EXECUTION TIME:
;
;*************************************************************************


;*************************************************************************
;
;PDL:
;  FIRST KEY SEQUENCE
;       IF no key pressed
;          THEN check operator's time out
;       ENDIF
;       get input key
;       IF not number key
;          THEN check other functions
;       save key value
;       display group message
;       setup second key sequence
;       valid key action
;
;  SECOND KEY SEQUENCE
;       IF no key pressed
;          THEN check operator's time out
;       ENDIF
;       IF not number key
;          THEN check other functions
;       ENDIF
;       save key value
;       display group message
;       convert group value to binary
;       IF group number equal to zero
;         THEN error group
;              revert back LCD display
;              illegal key exit
;       ENDIF
;       IF group number over maximum group value
;         THEN error group
;              revert back LCD display
;              illegal key exit
;         IF group not implemented
;            THEN
;               error group
;               revert back LCD display
;               illegal key exit
;         ENDIF
;       ENDIF
;       set group update flag
;       go to final state
;       ENDIF
;       EXIT
;
;*************************************************************************
```

```
;***********************************************************************
;
;MODULE NAME: IRCH
;       Copyright 1987 Teletec Corporation. U.S.A.
;AUTHOR: Ming Hsu
;CODE COMPLETE:2/7/1986
;LAST MODIFICATION: 03/03/1987
;PERFORMED BY:Ming Hsu
;TEST/DEBUG:
;
;REVISION NUMBER: new
;
;DESCRIPTION: Increase or decrease channel number.
;
;INPUTS: new key
;
;OUTPUTS: channel number
;
;REGISTERS USAGE: ACC,PSW,DPTR,R0
;
;SUPPORT MODULES: CHDISP
;
;SIZE: 0AFH
;
;EXECUTION TIME:
;
;***********************************************************************


;***********************************************************************
;
;MODULE NAME: IR_VOL
;
;CODE COMPLETE: 2/5/1986
;LAST MODIFICATION: 10/07/1986
;TEST/DEBUG:
;
;REVISION NUMBER: new
;
;DESCRIPTION: This module takes care of the VOLUME_UP and VOLUME_DOWN key operations.
;
;INPUTS: keycode
;
;OUTPUTS: volume up/down
;
;REGISTERS USAGE:
;                 ACC, PSW
;
;SUPPORT MODULES:
;                 VOL_DISPLAY: display current volume
;
;SIZE: 8BH
;
;EXECUTION TIME:
;
;PDL:
;       IF no key pressed
;          THEN final state
;          ELSE
;               IF new key input
;                  THEN
;                       IF key released
;                          THEN
;                               IF last state is volume level display
;                                  THEN revert LCD display
;                                       set volume up/down
;                               ENDIF
;                          ELSE
;                               IF volume up or down
;                                  THEN display volume level
;                                  ELSE illegal key
;                               ENDIF
;                       ENDIF
;               ENDIF
;       ENDIF
;       check time count
;       IF time count =0
;          THEN increase or decrease volume level
;       exit
;       END
;
;***********************************************************************
```

```
;************************************************************************
;
;MODULE NAME: IR_SQ
;       (C) Copyright 1987 Teletec Corporation, U.S.A.
;AUTHOR: Ming Hsu
;CODE COMPLETE: 2/5/1986
;LAST MODIFICATION: 03/09/87
;PERFORMED BY: Ming HSu
;TEST/DEBUG:
;
;REVISION NUMBER: new
;
;DESCRIPTION: squelch up/down handling routine
;
;INPUTS: keycode
;
;OUTPUTS: squelch up/down
;
;REGISTERS USAGE:
;                   ACC, PSW,
;
;SUPPORT MODULES:
;                   SQ_DISPLAY: display current squelch value
;
;SIZE: 8DH
;
;EXECUTION TIME:
;
;PDL:
;       IF no key pressed
;          THEN final state
;       IF new key input
;          THEN
;               IF key released
;                  THEN
;                       IF last state is squelch level display state
;                          THEN revert LCD display
;                               set squelch up/down
;                  ELSE
;                       IF squelch up or down
;                          THEN display squelch level
;                          ELSE illegal key
;       check time count
;       IF time count equal to zero
;          THEN increase or decrease squelch level
;       exit
;
;************************************************************************
```

```
;************************************************************************
;
;MODULE NAME: IR_SQ
;       (C) Copyright 1987 Teletec Corporation, U.S.A.
;AUTHOR: Ming Hsu
;CODE COMPLETE: 2/5/1986
;LAST MODIFICATION: 03/09/87
;PERFORMED BY: Ming HSu
;TEST/DEBUG:
;
;REVISION NUMBER: new
;
;DESCRIPTION: squelch up/down handling routine
;
;INPUTS: keycode
;
;OUTPUTS: squelch up/down
;
;REGISTERS USAGE:
;                   ACC, PSW,
;
;SUPPORT MODULES:
;                   SQ_DISPLAY: display current squelch value
;
;SIZE: 8DH
;
;EXECUTION TIME:
;
;PDL:
;       IF no key pressed
;          THEN final state
;       IF new key input
;          THEN
;               IF key released
;                  THEN
;                       IF last state is squelch level display state
;                          THEN revert LCD display
;                               set squelch up/down
```

```
;               ELSE
;                    IF squelch up or down
;                       THEN display squelch level
;                       ELSE illegal key
;       check time count
;       IF time count equal to zero
;          THEN increase or decrease squelch level
;       exit
;
;*********************************************************************


;*********************************************************************
;
;PDL:
;       IF no key pressed
;          THEN final state
;       IF get new key
;          THEN
;               IF key released
;                  THEN released key check
;                       IF in wait state
;                          THEN
;                               IF released key = channel_down
;                                  THEN set channel_up
;                                       exit
;                               IF released key = channel_up
;                                  THEN set channel_dn
;                                       exit
;                          ELSE
;                               IF channel has been update at least once
;                                  THEN final state
;                                  ELSE update channel number
;                                       final state
;                  ELSE
;                       IF new key= channel up or down
;                          THEN  set wait state, display channel number and exit
;                          ELSE  illegal key
;          ELSE
;               decrease time count
;               IF time count=0
;                  THEN
;                       update channel number
;                       IF channel up
;                          THEN
;                               IF channel in high limit
;                                  THEN exit
;                                  ELSE increase channel number
;                                       display current channel number
;                                       restore time count
;                                       exit
;                          ELSE
;                               IF channel in low limit
;                                  THEN exit
;                                  ELSE decrease channel number
;                                       display current channel number
;                                       restore time count
;                                       exit
;                  ELSE
;                  EXIT
;
;*********************************************************************


;*********************************************************************
;
;PDL:
;       FIRST KEY
;       IF no key pressed
;          THEN
;               check operator time out
;               exit
;       IF input key is a number key
;          THEN
;               convert key code to BCD
;               store first digit
;               display message
;               set up next entry point for second digit
;               set up valid key exit
;               exit
;          ELSE
;               exit
;       SECOND KEY
;       IF (no key pressed)
;               check operator time out
;               exit
```

```
;       IF (input key is a number key)
;              convert key code to BCD
;              combine first and second digit
;              store digit to message buffer .
;              display message
;       EXIT
;
;**********************************************************************
```

```
;**********************************************************************
;
;MODULE NAME: CSET_PA
;       (C) Copyright 1987 Teletec Corporation, U.S.A.
;AUTHOR: Ming Hsu
;CODE COMPLETE: 03/10/86
;LAST MODIFICATION: 03/02/87
;PERFORMED BY: Ming Hsu
;TEST/DEBUG:
;
;REVISION NUMBER: new
;
;DESCRIPTION: This routine handles the key sequences necessary for the
;             public address function.
;
;INPUTS:
;
;OUTPUTS:
;
;REGISTERS USAGE: ACC, R0, R1, R5, DPTR
;
;SUPPORT MODULES: KEY_CHECK - get key code
;                 MESS_DISP - transfer message to display buffer
;
;SIZE: 05BH
;
;EXECUTION TIME:
;
;PDL:
;       If no key pressed
;          THEN check opertaor's time out
;       get key code
;       IF key input is ONE, TWO, or THREE
;          THEN
;             .   update power level
;             .   load display message in LCD alternate buffer
;          ELSE
;                 check other key sequences
;       EXIT
;
;**********************************************************************
```

```
;**********************************************************************
;
;PDL:   IF multiple keys
;          THEN illegal key exit
;       set up next entry address
;       blank display
;       set up timer and wait for next key
;       KEY DISPATCH MODULE
;       IF no key pressed
;          THEN check operator time out
;       CASE 1: PA key.
;          THEN set up PA key sequence
;               display PA message
;               exit
;       CASE 2: PWR key
;          THEN set up power input key sequence
;               display PWR message
;               exit
;       CASE 3: CH key
;          THEN set up entry point for channel number
;               display message
;               exit
;       CASE 4: SQ key
;          THEN set up entry point for SQ value
;               display SQ message
;               exit
;       CASE 5: SIT key
;          THEN set up site number input sequence
;               display SITE  message
;               exit
;       CASE 6: GROUP key
;          THEN set up group entry point
;               display GROUP message
;               exit
```

```
;       CASE 7: MSG key
;          THEN set up message entering key sequence
;               display MSG message
;               exit
;       CASE 8: SEL key
;          THEN set up select key sequence
;               display SEL message
;               exit
;       CASE 9: AUX key
;          THEN enable AUX function
;               display AUX ON message
;               exit
;       CASE 10: FON key
;          THEN enable FON function
;               dispaly FON ON message
;               exit
;       CASE 11: PRI key
;          THEN enable PRIVACY function
;               display PRI ON message
;               exit
;       CASE 12: # key
;          THEN enable beeper
;               display BEEP ON message
;               exit
;       CASE 13: * key
;          THEN set EL lamp on flag
;               exit
;       go to check other keys
;       END
;
;**********************************************************************

;**************************************************************************************
;
;MODULE NAME: CP232INT
;
;       Copyright 1987  Teletec Corporation, U.S.A.
;
;AUTHOR: Kevin A. Peterson
;CODE COMPLETE:
;
;LAST MOD'FICATION: 2/2/87
;PERFORMED BY: Kevin A. Peterson
;
;TEST/DEBUG:
;
;REVISION NUMBER: new
;
;DESCRIPTION:   This module handles the low-level port communications for the
;               radio programming mode via the RS232 port connector.  This
;               module is executed after an interrupt (if enabled) on the RXD
;               or TXD lines of the 8031. Interrupts are enabled by calls to
;               CPTXBUF or CPTXENQ.  This routine handles both RX and TX
;               interrupts and flow control is set by the variable RXTXSTAT.
;               Currently, the interrupts are limited to half-duplex operation
;               only.  Data direction is controlled by RXTXSTAT.  All data
;               received or transmitted will be in COMBUFF1 or COMBUFF2.  The
;               destination buffer is selected by the RXBUFPNT or TXBUFPNT
;               pointer before the serial port interrupt is enabled.  Flags are
;               set and interrupts are disabled upon exit if the block
;               transmission is complete.
;
;
;
;INPUTS: Input data retrieved from COMBUFF1 or COMBUFF2,
;        RXTXSTAT,RXBUFPNT,RXBUFCNT,TXBUFPNT,TXBUFCNT
;        RX_SEL,TX_SEL,RXBUFFUL,TXBUFEMT,RXBUFEMT
;
;OUTPUTS: Output data stored in COMBUFF1 or COMBUFF2,
;         Modified RXTXSTAT
;
;REGISTER USAGE: All registers used are saved  (DPTR,ACC,R1,R2,PSW)
;
;SUPPORT MODULES: None
;
;SIZE:
;
;EXECUTION TIME:
;
;**************************************************************************************
```

```
;*****************************************************************************************
;
;PDL:
;       IF1 RS232 interrupt occurs
;           THEN
;              IF2 RX interrupt and receive mode enabled
;                  THEN store received byte in buffer
;                  ELSE
;                     IF3 TX interrupt and transmit mode enabled
;                         THEN transmit byte from buffer
;                         ELSE ignore interrupt
;                     ENDIF3
;              ENDIF2
;           ELSE do nothing
;       ENDIF1
;
;*****************************************************************************************


;**************************************************************************
;
; MODULE NAME :         CPACK
;
;      (c)   Copyright 1987 Teletec Corporation, U. S. A.
;
; AUTHOR :              Wm. Moore
; CODE COMPLETE :       1/23/87
;
; LAST MODIFICATION :
; PERFORMED BY :
;
; TEST/DEBUG :          1/19/87
;
; REVISION NUMBER :     1.0
;
; DESCRIPTION :         Pack a group of 2 unpacked bytes into 1 byte of
;                       packed BCD in 'A'.
;
; INPUTS :              @DPTR :
;                         Points to a 2 byte area of external ram where 2
;                         unpacked nibbles of data are located.
;                         bytes are initially stored.
;
; OUTPUTS :             A :
;                         Packed byte of 2 nibbles.
;
;                       @DPTR :
;                         Points to the byte of external memory just past the
;                         2 bytes used to input the unpacked nibbles.
;
; REGISTER USAGE :      A, R7, DPTR.
;                       Flag register affected.
;
; SUPPORT MODULES :     none.
;
; SIZE :                0C hex bytes (12 decimal).
;
; EXECUTION TIME :      15 cycles.
;
;
; PDL :         Get low nibble of external ram in top nibble of R7.
;               Increment to next external ram location.
;               Get low nibble of external ram byte in A.
;               Combine nibbles in R7 and A (OR them together).
;               Increment to next external ram location.
;               Return 1 byte of packed data.
;               EXIT
;
;
;**************************************************************************
```

```
;***************************************************************************************
;
;MODULE NAME: CPBLDEND
;
; (c)  Copyright 1987  Teletec Corporation, U.S.A.
;
;AUTHOR: Kevin A. Peterson
;CODE COMPLETE:
;
;LAST MOCIFICATION:
;PERFORMED BY:
;
;TEST/DEBUG:
;
;REVISION NUMBER: new
;
;DESCRIPTION: This module builds an end block, XMODEM style. In addition,
;             this module adjusts all buffers,' pointers, status bytes and clocks
;             for the next block transmission.
;
;    <SOH> <BLK#> <255-BLK#> <FINAL EEROM CHECKSUM> <126 FF's> <CHECKSUM>
;
;             Current end block entries:
;
;             1. Total EEROM checksum value (2 bytes).
;
;INPUTS:  BLKCNT,FINCSUM,COMBUFF1,TXBUFCNT
;
;OUTPUTS: Modified COMBUFF1
;
;REGISTER USAGE:
;
;SUPPORT MODULES: CPINRCAC, CPCSUMTX, CPINTBUF, CPINRBUF, CPINRXTX
;
;SIZE:
;
;EXECUTION TIME:
;
;PDL: build end block
;     calculate and append checksum
;     adjust buffer pointers
;     init status control byte
;     init retry counters and clock
;     EXIT
;
;***************************************************************************************


;*******************************************************************************
;
;MODULE NAME: CPCAN2
;
;       Copyright 1987 Teletec Corp. USA
;
;AUTHOR: kevin A. Peterson
;
;CODE COMPLETE:
;LAST MOCIFICATION:
;PERFORMED BY:
;
;TEST/DEBUG:
;
;REVISION NUMBER: new
;
;DESCRIPTION: This module handles the cancel key sequence for the CPCLONTX
;             function. Program control is passed back to CPMODE or CPCLONTX
;             via a long jump based on whether a positive or negative response
;             is received from the keyboard operator.
;
;INPUTS: P_NEXTO,P_NEXT1,NO_KEY
;
;OUTPUTS: NONE
;
;REGISTER USAGE:
;
;SUPPORT MODULES: SET_MESS,KEY_CHECK,VALID_KEY,SET_TIMER,ERROR_KEY
;                 CPMODE,CPCLONTX
;
;SIZE:
;
;EXECUTION TIME:
;
;PDL:
;
;*******************************************************************************
```

```
;*****************************************************************************************
;
;MODULE NAME: CPBLKMOV (formerly RLBLKMOV)
;
; (c)  Copyright 1987  Teletec Corporation, U.S.A.
;
;AUTHOR: David Easter (renamed by Kevin A. Peterson)
;CODE COMPLETE:
;LAST MODIFICATION:
;PERFORMED BY:
;TEST/DEBUG:
;
;REVISION NUMBER: new
;
;DESCRIPTION:
;       Copy a block of bytes in external data memory referenced by 16-bit
;       pointers.  A 1 is returned in ACC if the old destinitation block was
;       the same as the source block; otherwise a 0 is returned.  The block
;       size must be at least 1.
;
;INPUTS:
;       R0      destination pointer (LSB)
;       R1      destination pointer (MSB)
;       R2      source pointer (LSB)
;       R3      source pointer (MSB)
;       R4      byte count
;
;OUTPUTS:
;       ACC     1 indicates src and dest blocks were the same; 0 indicates not
;
;REGISTER USAGE:
;       R1, R0  dest    16-bit pointer
;       R3, R2  src     16-bit pointer
;       R4      cnt     8-bit pointer
;       B       same    boolean (zero/non-zero)
;
;SUPPORT MODULES:
;       None
;
;SIZE:
;
;EXECUTION TIME:
;
;PDL:
;       set same to 1
;       UNTIL (cnt = 0)
;               IF (byte at dest is not same to byte at src)
;                       set same to 0
;               ENDIF
;               copy byte at src to location at dest
;               decrement cnt
;       ENDUNTIL
;
;*****************************************************************************************

;*********************************************************************
;
;MODULE NAME: CPCAN
;
;       Copyright 1987 Teletec Corp. USA
;
;AUTHOR: Kevin A. Peterson
;
;CODE COMPLETE:
;LAST MODIFICATION:
;PERFORMED BY:
;
;TEST/DEBUG:
;
;REVISION NUMBER: new
;
;DESCRIPTION: This module handles cancel key sequence for the CPMODE module.
;
;INPUTS: CAN,SET,P_NEXT0,P_NEXT1,NO_KEY,WAIT
;
;OUTPUTS: NONE
;
;REGISTER USAGE:
;
;SUPPORT MODULES: SET_MESS,KEY_CHECK,VALID_KEY,SET_TIMER,F_STATE,
;                 ERROR_KEY
;
;SIZE:
;
;EXECUTION TIME:
;
;PDL:
;
;*********************************************************************
```

```
;***********************************************************************
;
;MODULE NAME: SET_KEY
;       (C) Copyright 1987 Teletec Corporation, U.S.A.
;AUTHOR: Ming Hsu
;CODE COMPLETE: 09/17/86
;LAST MODIFICATION: 03/09/87
;PERFORMED BY: Ming Hsu
;TEST/DEBUG:
;
;REVISION NUMBER: new
;
;DESCRIPTION: This module takes care the SET key sequences.
;
;INPUTS: keycode
;
;OUTPUTS: none
;
;REGISTERS USAGE: ACC, PSW, DPTR, R0, R1, R5
;
;SUPPORT MODULES: KEY_CHECK: get key code
;                 SET_MESS: load LCD message
;                 SITE_CAN: cancel site function
;
;SIZE:
;
;EXECUTION TIME:
;
;***********************************************************************


;***********************************************************************
;
;MODULE NAME: CSITE
;       (C) Copyright 1987 Teletec Corporation, U.S.A.
;AUTHOR: Ming Hsu
;CODE COMPLETE: 03/08/86
;LAST MODIFICATION: 03/03/87
;PERFORMED BY: Ming Hsu
;TEST/DEBUG:
;
;REVISION NUMBER: new
;
;DESCRIPTION: This routine handles the key sequences necessary for site
;             selection.
;
;
;INPUTS: key code
;
;OUTPUTS: site value
;
;REGISTERS USAGE:
;                ACC, PSW, R1, R3, R4, R5, R6, DPTR, B
;
;SUPPORT MODULES:
;                 KEY_CHECK: get key code
;                 MESS_DISP: transfer display message to LCD buffer
;
;SIZE: 0C6H
;
;EXECUTION TIME:
;
;PDL:
;       first key input
;       IF no key
;               THEN go to check operator's time out
;       get first key value
;       IF not number key
;               THEN check other key entry
;       display input value
;       set up next key sequence
;       perform second key input
;       IF no key
;               THEN go to check operator's time out
;       get first key value
;       IF not number key
;               THEN check other key entry
;       display input value
;       convert BCD to binary
;       IF  input value over SITE limit
;               THEN revert LCD to original display
;       set SITE change action flag
;       END
;
;***********************************************************************
```

```
;**********************************************************************
;
;MODULE NAME: SET_MESS
;
;CODE COMPLETE:
;LAST MODIFICATION: 3/11/1986
;TEST/DEBUG:
;
;REVISION NUMBER: new
;
;DESCRIPTION: This module prepares the display buffer for LCD and set up valid
;              key beeping counts.
;
;INPUTS: DPTR = display message starting point
;
;OUTPUTS: display message in alternate LCD buffer, valid beeper count and operator's
;              time out count also been set up.
;
;REGISTERS USAGE: ACC, DPTR, R0, R1
;
;SUPPORT MODULES: MESS_DISP: transfer display message to LCD buffer
;
;
;SIZE: 14H
;
;EXECUTION TIME:
;
;PDL:
;       load number of byte need to be transfer
;       transfer the message to alternate LCD display buffer
;       set up LCD pointer
;       set up LCD update flag
;       set up RELEASE state
;       set up WAIT( for next key ) state
;
;**********************************************************************


;**********************************************************************
;
;MODULE NAME: CSQ_VAL
;       (C) Copyright 1987 Teletec Corporation, U.S.A.
;AUTHOR: Ming Hsu
;CODE COMPLETE: 03/08/86
;LAST MODIFICATION: 03/03/87
;PERFORMED BY: Ming Hsu
;TEST/DEBUG:
;
;REVISION NUMBER: new
;
;DESCRIPTION: This routine handles the set squelch key sequence.
;
;INPUTS:
;
;OUTPUTS:
;
;REGISTERS USAGE:
;
;SUPPORT MODULES: MESS_DISP -
;
;SIZE:
;
;EXECUTION TIME:
;
;PDL:
;       first key input
;       IF no key
;               THEN go to check operator's time out
;       get first key value
;       IF not number key
;               THEN check other key entry
;       display input value
;       set up next key sequence
;       perform second key input
;       IF no key
;               THEN go to check operator's time out
;       get first key value
;       IF not number key
;               THEN check other key entry
;       display input value
;       convert BCD to binary
;       IF  input value over SQ limit
;               THEN revert LCD to original display
;       set SQ change action flag
;       END
;
;**********************************************************************
```

```
;***********************************************************************
;
;MODULE NAME: CSET_PWR
;       (C) Copyright 1987 Teletec Corporation, U.S.A.
;AUTHOR: Ming Hsu
;CODE COMPLETE: 03/05/86
;LAST MODIFICATION: 03/09/87
;PERFORMED BY: Ming Hsu
;TEST/DEBUG:
;
;REVISION NUMBER: new
;
;DESCRIPTION: This routine handles the key sequences used to update the
;             transmit power level.
;
;INPUTS: key code
;
;OUTPUTS: power level
;
;REGISTERS USAGE:
;                 ACC, PSW, R1, R3, R4, R5, R6, DPTR, B
;
;SUPPORT MODULES:
;                 KEY_CHECK: get key code
;                 MESS_DISP: transfer display message to LCD buffer
;
;SIZE: 97H
;
;EXECUTION TIME:
;
;PDL:
;       IF no key
;               THEN check operator's timeout
;       get key code
;       set temparory power level
;       prepare EEROM programming data
;       set up LCD display
;       EXIT
;
;***********************************************************************


;***********************************************************************
;
;MODULE NAME: CMESSAGE
;       (C) Copyright 1987 Teletec Corporation, U.S.A.
;AUTHOR: Ming Hsu
;CODE COMPLETE: 03/14/86
;LAST MODIFICATION: 03/02/87
;PERFORMED BY: Ming Hsu
;TEST/DEBUG:
;
;REVISION NUMBER: new
;
;DESCRIPTION: This routine handles the key sequences necessary to support
;             the message function.
;
;INPUTS: KEYCODE -
;
;OUTPUTS: message number
;
;REGISTERS USAGE:
;                 ACC, PSW, R1, R5, DPTR, B
;
;SUPPORT MODULES:
;                 MESS_DISP - transfer message to display buffer
;                 KEY_CHECK - get key code
;SIZE:
;
;EXECUTION TIME:
;
************************************************************************
```

```
;*****************************************************************************************
;
;MODULE NAME: CPBLDHED
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: This module builds a header block, XMODEM style. In addition,
;              this module adjusts all buffers, pointers, status bytes and clocks
;              for the next block transmission.
;
;
;    <SOH> <BLK#> <255-BLK#> <MAX GROUP # ATTRIBUTE> <127 FF's> <CHECKSUM>
;
;              Current header block entries:
;
;              1. MAX_GRP - maximum group attribute value for host unit
;
;              2. 16K Data Flag - 11H if 16K data transfer, FFH otherwise
;
;
;INPUTS: BLKCNT,MAX_GRP,COMBUFF1,TXBUFCNT
;        COMSTAT1,DATA16K
;
;OUTPUTS: COMBUFF1
;
;REGISTER USAGE:
;
;SUPPORT MODULES: CPINRCAC, CPCSUMTX, CPINTBUF, CPINRBUF, CPINRXTX
;
;SIZE:
;
;EXECUTION TIME:
;
;PDL: build header block
;     calculate and append checksum
;     adjust buffer pointers
;     init status control byte
;     init retry counters and clock
;     EXIT
;
;*****************************************************************************************


;*******************************************************************
;
;MODULE NAME: CPCAN3
;
;       Copyright 1987 Teletec Corp. USA
;
;AUTHOR: Kevin A. Peterson
;
;CODE COMPLETE:
;LAST MODIFICATION:
;PERFORMED BY:
;
;TEST/DEBUG:
;
;REVISION NUMBER: new
;
;DESCRIPTION: This module handles the cancel key sequence for the CPCLONRX
;              function. Program control is passed back to CPMODE or CPCLONRX
;              via a long jump based on whether a positive or negative response
;              is received from the keyboard operator.
;
;INPUTS: P_NEXT0,P_NEXT1,NO_KEY
;
;OUTPUTS: NONE
;
;REGISTER USAGE:
;
;SUPPORT MODULES: SET_MESS,KEY_CHECK,VALID_KEY,SET_TIMER,ERROR_KEY
;                 CPMODE,CPCLONRX
;
;SIZE:
;
;EXECUTION TIME:
;
;PDL:
;
;*******************************************************************
```

```
;*******************************************************************************
;
;MODULE NAME: CPCLONRX
;
;       Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: CPCLONRX is the display and keyboard handler for the CLONE RX
;             communication function.  This module is accessed via a long jump
;             from the CPMODE module.
;
;INPUTS: COMSTAT1,ALPHAFG,WAIT,RELEASE,COMRX_FG,TXSTARTED,NO_KEY
;
;OUTPUTS: NONE
;
;REGISTER USAGE:
;
;SUPPORT MODULES: SET_MESS,SET_TIMER,KEY_CHECK,VALID_KEY,ERROR_KEY
;                 CPCAN2,CPTXINIT,MESS_DISP
;
;
;SIZE:
;
;EXECUTION TIME:
;
;PDL:
;
;*******************************************************************************


;*******************************************************************************
;
;MODULE NAME: CPCLONTX
;
;       Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: CPCLONTX is the display and keyboard handler for the CLONE TX
;             communication function.  This module is accessed via a long jump
;             from the CPMODE module.
;
;
;
;INPUTS: MODETST,COMTX_FG,NO_KEY,BEEP_FG,ALPHAFG,RELEASE,WAIT
;
;OUTPUTS: NONE
;
;REGISTER USAGE:
;
;SUPPORT MODULES: SET_MESS,SET_TIMER,KEY_CHECK,VALID_KEY,ERROR_KEY
;                 CPCAN2,CPTXINIT,MESS_DISP
;
;
;SIZE:
;
;EXECUTION TIME:
;
;PDL:
;
;*******************************************************************************
```

```
;*****************************************************************************
;
;MODULE NAME: CPCMPHED
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: This module is called by CPCOMRX to compare header information
;             that is sent in the first data block during a radio clone
;             sequence.  All header information must match any local attributes
;             or the communication session will abort.  This is a security check
;             to insure that radio models can not be upgraded by simple program
;             downloads, i.e. additional groups, privacy modules, etc. These
;             attributes can only be changed by factory personnel.
;
;
;             Current header entries that are checked:
;
;             1. MAX_GRP - maximum number of groups attribute.
;
;             2. 16K Data Transfer flag (00 or FF).
;
;
;
;
;INPUTS: COMBUFF2,MAX_GRP,FUNCCNTRL00,COMSTAT1,CHAN_A_EN,SITE_EN,DATA16K
;
;OUTPUTS: ACC = 00H or FFH.
;
;REGISTER USAGE:
;
;SUPPORT MODULES: NONE
;
;SIZE:
;
;EXECUTION TIME:
;
;PDL:
;
;
;
;
;*****************************************************************************

;*****************************************************************************
;
;MODULE NAME: CPCOMRX
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: This module is called by the main EXEC routine when COMRX_FG
;             flag is set.  The CPCOMRX module execution is controlled by the
;             CPRXSTAT state variable in external ram. The CPCOMRX module
;             performs all the necessary serial port communication protocol
;             handling, pointer addressing, error checking, data transfers,
;             etc. for a CLONE RX (slave) RS232 communication sequence.
;
;
;
;INPUTS:   CPRXSTAT,BLKCNT,COMBUFF2,TXBUFCNT,COMSTAT1
;          CPTXSTAT,FINCSUM,EEROM_B_CNT,EEROM_S_PNT
;          EEROMBUFFER,EEROM_D_PNT,SYS_CNTRL03
;          RXSTAT0,RXSTAT1,RXSTAT2,RXSTAT3,RXSTAT4,RXSTAT5
;          RXSTAT6,RXSTAT7,RXBUFEMT,RXBUFFUL,NOCODE,NOCLKINIT
;          COMRX_FG,COMTX_FG,ALPHAFG,EEROM_BUSY,TXSTARTED
;          WAIT,RELEASE,NOCSUM
;          P_DATA_OK,DATA16K
;
```

```
;OUTPUTS: NONE
;
;REGISTER USAGE:
;
;SUPPORT MODULES: CPINRXTX,CPINRBUF,CPINTBUF,RXTXSTAT,CPINCLK4
;                 CPTIMCK4,CPTIMCK2,CPINCLK2,CPCSUMRX,CPCSUMEE
;                 CPCMPHED,MESS_DISP,CPSTRBLK,BLKCNTMX,CLRX50
;                 CPRXINIT
;
;SIZE:
;
;EXECUTION TIME:
;
;*************************************************************************************

;*************************************************************************************
;
;PDL: DOCASE
;
;       CASE (CPRXSTAT = 01)
;
;            initialize RXTXSTAT for RX/TX & clear buffer status flags
;            update state variable
;            IF1 (character in RX buffer)
;                check character
;                IF2 (character = ENQ)
;                    set RXTXSTAT for RX/TX & clear buffer status flags
;                    update CPRXSTAT state variable
;                    transmit ACK character
;                ELSE2 (character = any other character)
;                      ignore character
;                      clear RX buffer
;                      set RXTXSTAT for RX/TX & clear buffer status flags
;                ENDIF2
;            ENDIF1
;
;       CASE (CPRXSTAT = 04)
;            IF3 (character in RX buffer)
;                check character
;                DOCASE2
;                  CASE (character = upload character (???))
;                       set RXTXSTAT for RX/TX & clear buffer status flags
;                       clear RX buffer
;                       start RX timeout clock #4 (3 second)
;                       update CPRXSTAT state variable
;                       transmit ACK character
;                  CASE (character = download character (???))
;                       set RXTXSTAT for RX/TX & clear buffer status flags
;                       clear RX buffer
;                       update CPRXSTAT state variable (twice)
;                       transmit ACK character
;                  CASE (character = ENQ)
;                       set RXTXSTAT for RX/TX & clear buffer status flags
;                       clear RX buffer
;                       retransmit ACK character
;                  CASE (character = illegal character)
;                       ignore character (let host timeout)
;                       clear RX buffer
;                ENDDOCASE2
;            ENDIF3
;
;       CASE (CPRXSTAT = 08)
;            check timeout clock #4
;            IF25 (timeout clock #4)
;                 host got ACK
;                 set NOCODE bit
;                 switch to CLONTX mode
;                 upload data to MS-DOS computer
;            ELSE25 wait till timoeut
;                   IF26 (download code)
;                         resend ACK
;                   ENDIF26.
;            ENDIF25
;
;       CASE (CPRXSTAT = 10)
;            dispaly RX DATA message
;            IF4 (character in RX buffer)
;                check character
;                DOCASE3
;                  CASE (character = download character (???))
;                       set RXTXSTAT for RX/TX & clear buffer status flags
;                       clear RX buffer
;                       retransmit ACK character
```

```
            CASE (character = SOH)
                start timout clock #2 (1.25 second)
                set go around bit
                IF5 (RX buffer full)
                    calculate checksum
                    IF6 (checksum OK)
                        compare header data
                        IF7 (header match)
                            set RXTXSTAT for RX/TX & clear status flags
                            clear RX buffer
                            update CPRXSTAT state variable
                            transmit ACK
                        ELSE7 transmit 'no match' character
                              display error message
                              abort transmission
                        ENDIF7
                    ELSE6 set RXTXSTAT for RX/TX & clear status flags
                          clear RX buffer
                          transmit NACK

                    ENDIF6
                ELSE5 check timeout clock #2 (1.25 second)
                      IF40 (timout clock #2)
                           set RXTXSTAT for RX/TX & clear status flags
                           clear RX buffer
                           clear go around bit
                           transmit NACK
                      ELSE40 do nothing (exit)
                      ENDIF40
                ENDIF5
            CASE (character = illegal character)
                start timeout clock #2
                wait 1.25 seconds to end transmission
                transmit NAK

    CASE (CPRXSTAT = 20)
        DOWHILE (BLKCNT < 65)
                start timeout clock #2
                IF10 (RX buffer full)
                    check received block #
                    IF50 (block # not equal to BLKCNT)
                        display sequence error message
                        abort transmission
                    ENDIF50
                    calculate checksum
                    IF11 (checksum OK)
                        check EEROM status
                        IF12 (EEROM not busy)
                            transfer data to EEROM buffer
                            set EEROM burn flag
                            increment BLKCNT
                            set RXTXSTAT for RX/TX
                            clear buffer status flags
                            clear RX buffer
                            transmit ACK
                        ENDIF12
                    ELSE11 set RXTXSTAT for RX/TX
                           clear buffer status flags
                           clear RX buffer
                           transmit NAK
                    ENDIF11
                ELSE10 check for RX timeout #2
                       IF13 (RX timeout #2)
                            set RXTXSTAT for RX/TX
                            clear buffer status flags
                            clear RX buffer
                            transmit NACK
                       ENDIF13
                ENDIF10
        ENDDOWHILE
        update CPRXSTAT state variable

    CASE (CPRXSTAT = 40)
        IF15 (RX buffer full)
            calculate checksum
            IF16 (checksum OK)
                save 'final eerom checksum'
                calculate new 'final eerom checksum'
                compare 'final eerom checksums'
                IF17 (compare OK)
                    set PDATAOK_FG flag
                    display CRX RDY message
                    clear COMRX_FG flag
                ELSE17 clear PDATAOK_FG flag
                       display error message
                       clear COMRX_FG flag
                ENDIF17
```

```
;               ELSE16 set RXTXSTAT for RX/TX
;                      clear buffer status flags
;                      clear RX buffer
;                      start RX timeout clock
;                      transmit NACK
;               ENDIF16
;
;          ELSE15 check for RX timeout
;                 IF18 (RX timeout)
;                      set RXTXSTAT for RX/TX
;                      clear buffer status flags
;                      clear RX buffer
;                      transmit NACK
;                 ENDIF18
;          ENDIF15
;
;    END?OCASE
;
;**********************************************************************************

;**********************************************************************************
;
;MODULE NAME: CPCOMTX
;
; (c)   Copyright 1987  Teletec Corporation, U.S.A.
;
;AUTHOR: Kevin A. Peterson
;CODE COMPLETE:
;
;LAST MO?IFICATION:
;PERFORMED BY:
;
;TEST/DEBUG:
;
;REVISION NUMBER: new
;
;DESCRIPTION:   This module is called by the main EXEC routine when COMTX_FG
;               flag is set.  The CPCOMTX module execution is controlled by the
;               CPTXSTAT state variable in external ram. The CPCOMTX module
;               performs all the necessary serial port communication protocol
;               handling, pointer addressing, error checking, data transfers,
;               etc. for a CLONE TX (host) RS232 communication sequence.
;
;INPUTS: CPTXSTAT,RXTXSTAT,COMBUFF1,TXBUFPNT,TXBUFCNT
;        BEEP_CTL,BLKCNT,TXDRETRY,TXTRETRY,TXTIMCLK
;        COMSTAT1,FINCSUM,COMBUFF2
;        P_NEXT0,P_NEXT1
;        TXSTAT0,TXSTAT1,TXSTAT2,TXSTAT3,TXSTAT4,TXSTAT5
;        TXSTAT6,TXSTAT7,WAIT,RELEASE,DATA16K
;        ALPHAFG,BEEP_FG,RXBUFEMT,COMTX_FG,NOCODE
;
;OUTPUTS: NONE
;
;REGISTER USAGE:
;
;SUPPORT MODULES: MESS_DISP,CLTX50,CLRX50
;                 BEEPP5SEC,BEEPNUM5
;                 CPCSUMEE,CPINRCAC,CPINRXTX,CPINRBUF,CPINTBUF
;                 CPBLDHED,CPBLDEND,CPUPILLC,CPUPTIMO,CPTIMCK1
;                 CPGETBLK
;
;SIZE:
;
;EXECUTION TIME:
;
;**********************************************************************************


;**********************************************************************************
;
;PDL: DOCASE
;
;       CASE (CPTXSTAT = 01)
;            calculate total eerom checksum and save
;            display 'tx data' message
;            initialize retry counters and start Rx timeout clock
;            initialize BLKCNT
;            initialize RXTXSTAT for RX/TX & clear buffer status flags
;            update CPTXSTAT state variable
;            transmit 'ENQ' character
;
;       CASE (CPTXSTAT = 02)
;            IF1 (character in RX buffer)
;                check character
;                IF2 (character = ACK)
```

```
;               IF3 (NOCODE bit = 0)
;                   initialize retry counters and start Rx timeout clock
;                   set RXTXSTAT for RX/TX & clear buffer status flags
;                   update CPTXSTAT state variable
;                   transmit 'download code'
;               ELSE3 build 'header block'
;                     calculate checksum
;                     initialize retry counters and start Rx timeout clock
;                     set RXTXSTAT for RX/TX & clear buffer status flags
;                     update CPTXSTAT state variable (twice)
;                     start block transmission
;               ENDIF3
;           ELSE2 (character = NACK or illegal character)
;                 update 'illegal character' retry counter
;                 IF4 (Retries = 11)
;                     abort transmission
;                 ELSE4 initialize Rx timeout clock
;                       retransmit 'ENQ' character
;                 ENDIF4
;           ENDIF2
;       ELSE1 check RX timeout
;             IF5 (RX timeout)
;                 update 'timeout' retry counter
;                 IF25 (Retries = 11)
;                      abort transmission
;                      display error message
;                 ELSE25 initialize Rx timeout clock
;                        retransmit 'ENQ' character
;                 ENDIF25
;             ENDIF5
;       ENDIF1
;
;   CASE (CPTXSTAT = 04)
;        IF26 (character in RX buffer)
;             check character
;             IF27 (character = ACK)
;                  build 'header block'
;                  calculate checksum
;                  initialize retry counters and start Rx timeout clock
;                  set RXTXSTAT for RX/TX & clear buffer status flags
;                  update CPTXSTAT state variable
;                  start block transmission
;             ELSE27 (character = NACK or illegal character)
;                    update 'illegal character' retry counter
;                    IF28 (Retries = 11)
;                         abort transmission
;                    ELSE28 initialize Rx timeout clock
;                           retransmit 'download code' character
;                    ENDIF28
;             ENDIF27
;        ELSE26 check RX timeout
;               IF27 (RX timeout)
;                    update 'timeout' retry counter
;                    IF28 (Retries = 11)
;                         abort transmission
;                         display error message
;                    ELSE28 initialize Rx timeout clock
;                           retransmit 'download code' character
;                    ENDIF28
;               ENDIF27
;        ENDIF26
;
;   CASE (CPTXSTAT = 08)
;        IF6 (character in RX buffer)
;            check character
;            DOCASE2
;              CASE (character = ACK)
;                   increment BLKCNT
;                   build 'data block #1'
;                   calculate checksum
;                   initialize retry counter and start Rx timeout clock
;                   set RXTXSTAT for RX/TX & clear buffer status flags
;                   update CPTXSTAT state variable
;                   start block transmission
;              CASE (character = no match character (???))
;                   abort transmission
;                   display error message
;              CASE (character = NACK or illegal character)
;                   update 'illegal character' retry counter
;                   IF7 (Retries = 11)
;                       abort transmission
;                       display error message
;                   ELSE7 initialize Rx timeout clock
;                         retransmit 'header block'
;                   ENDIF7
;            ENDDOCASE2
```

```
;        ELSE6 check RX timeout
;              IF8 (RX timeout)
;                  update 'timeout' retry counter
;                  IF9 (Retries = 11)
;                      abort transmission
;                      display error message
;                  ELSE9 initialize Rx timeout clock
;                        retransmit 'header block'
;                  ENDIF9
;              ENDIF8
;        ENDIF6
;
;   CASE (CPTXSTAT = 10)
;        DOWHILE (BLKCNT < 64)
;                IF10 (character in RX buffer)
;                     check character
;                     IF11 (character = ACK)
;                          increment BLKCNT
;                          build 'data block #n'
;                          calculate checksum
;                          initialize retry counters and start Rx timeout
;                          clock
;                          set RXTXSTAT for RX/TX & clear buffer status
;                          flags
;                          start block transmission
;                          IF30 (BLKCNT = BLKCNTMAX)
;                               update CPTXSTAT state variable
;                          ENDIF30
;                     ELSE11 (character = NACK or illegal character)
;                            update 'illegal character' retry counter
;                            IF12 (Retries = 11)
;                                 abort transmission
;                                 display error message
;                            ELSE12 initialize Rx timeout clock
;                                   retransmit 'data block #n'
;                            ENDIF12
;                     ENDIF11
;                ELSE10 check RX timeout
;                       IF13 (RX timeout)
;                            update 'timeout' retry counter
;                            IF14 (Retries = 11)
;                                 abort transmission
;                                 display error message
;                            ELSE14 initialize Rx timeout clock
;                                   retransmit 'data block  #n'
;                            ENDIF14
;                       ENDIF13
;                ENDIF10
;        ENDDOWHILE
;
;   CASE (CPTXSTAT = 20)
;        IF15 (character in RX buffer)
;             check character
;             IF16 (character = ACK)
;                  build 'end block (final eerom checksum)'
;                  calculate checksum
;                  initialize retry counters and start Rx timeout clock
;                  set RXTXSTAT for RX/TX & clear buffer status flags
;                  update CPTXSTAT state variable
;                  start block transmission
;             ELSE16 (character = NACK or illegal character)
;                    update 'illegal character' retry counter
;                    IF17 (Retries = 11)
;                         abort transmission
;                         display error message
;                    ELSE17 initialize Rx timeout clock
;                           retransmit 'last data block'
;                    ENDIF17
;             ENDIF16
;        ELSE15 check RX timeout
;               IF18 (RX timeout)
;                    update 'timeout' retry counter
;                    IF19 (Retries = 11)
;                         abort transmission
;                         display error message
;                    ELSE19 initialize Rx timeout clock
;                           retransmit 'last data block'
;                    ENDIF19
;               ENDIF18
;        ENDIF15
;
;   CASE (CPTXSTAT = 40)
;        IF20 (character in RX buffer)
;             check character
;             IF21 (character = ACK)
;                  clear COMTX_FG
;                  display CTX_RDY message
```

```
;                    ELSE21 (character = NACK or illegal character)
;                          update 'illegal character' retry counter
;                          IF22 (Retries = 11)
;                               abort transmission
;                               display error message
;                          ELSE22 initialize Rx timeout clock
;                                 retransmit 'end block'
;                          ENDIF22
;                    ENDIF21
;               ELSE20 check RX timeout
;                      IF23 (RX timeout)
;                          update 'timeout' retry counter
;                          IF24 (Retries = 11)
;                               abort transmission
;                               display error message
;                          ELSE24 initialize Rx timeout clock
;                                 retransmit 'end block'
;                          ENDIF24
;                      ENDIF23
;               ENDIF20
;        ENDDOCASE
;
;
;
;*********************************************************************************

;*********************************************************************************
;
;MODULE NAME: CPCSUMEE
;
; (c)  Copyright 1987  Teletec Corporation, U.S.A.
;
;AUTHOR: Kevin A.Peterson
;CODE COMPLETE:
;
;LAST MODIFICATION:
;PERFORMED BY:
;
;TEST/DEBUG:
;
;REVISION NUMBER: new
;
;DESCRIPTION:    This module builds a 2-byte checksum value for the data
;                contained in EEROM memory space (8192 or 16384 bytes).
;                The checksum value obtained is stored in external ram (FINCSUM).
;                An 8K or 16K checksum will be calculated based on the state
;                of the DATA16K flag.
;
;INPUTS:  ALPHATABLE,GROUPTABLE,COMSTAT1,DATA16K
;
;OUTPUTS: FINCSUM
;
;REGISTER USAGE:
;
;SUPPORT MODULES: NONE
;
;SIZE:
;
;EXECUTION TIME:
;
;PDL:
;
;
;*********************************************************************************

;*********************************************************************************
;
;MODULE NAME: CPCSUMRX
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION:    This module is called by CPCOMRX to perform checksums on
;                incoming RS232 data from the serial port. The data to be
;                checked is assumed to be in the COMBUFF data buffer.  The
;                format of the data must be as follows:
;
```

```
;               (XMODEM protocol)
;
;               <SOH><BLK #> <255 - BLK #><128 data bytes><1 byte checksum>
;
;               CPCSUMRX builds the checksum value for the 128 byte data
;               block and compares it to the value already in the COMBUFF+131
;               location.  If the compare is OK, 00H is returned in the ACC
;               register.  Otherwise FFH is returned, signifying bad RS232
;               data.
;
;
;
;
;INPUTS: COMBUFF2
;
;OUTPUTS: ACC = 00 or FF
;
;REGISTER USAGE:
;
;SUPPORT MODULES: NONE
;
;SIZE:
;
;EXECUTION TIME:
;
;PDL:    calculate checksum
;        IF (checksum compare OK)
;           return 00H in ACC
;        ELSE return FFH in ACC
;        ENDIF
;
;*****************************************************************************************


;*****************************************************************************************
;
;MODULE NAME: CPCSUMTX
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION:    This module is called by CPCOMTX to build checksums on
;                outgoing RS232 data from the serial port. The data to be
;                checked is assumed to be in the COMBUFF data buffer.  The
;                (XMODEM protocol)
;                <SOH> <BLK #> <255 - BLK #> <128 data bytes> <1 byte checksum>
;                CPCSUMRX builds the checksum value for the 128 byte data
;                block only and stores it to the COMBUFF+131 location.
;
;INPUTS: COMBUFF1
;
;OUTPUTS: Modified COMBUFF1
;
;REGISTER USAGE:
;
;SUPPORT MODULES: NONE
;
;SIZE:
;
;EXECUTION TIME:
;
;PDL:    calculate 1-byte checksum and store in COMBUFF+131 location
;
;*****************************************************************************************
```

```
;*****************************************************************************************
;
;MODULE NAME: CPGETBLK
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION:     This module is called by CPCOMTX to prep data for RS232
;                 transmission.  CPGETBLK calculates the necessary address
;                 pointers and calls CPBLKMOV to transfer 128 byte data blocks
;                 from EEROM to COMBUFF data space.  In addition CPGETBLK adds the
;                 necessary control characters to satisfy the XMODEM protocol as
;                 follows:
;
;                 (XMODEM PROTOCOL)
;
;                 <SOH> <BLK #> <255 - BLK #> <128 data bytes> <1 byte checksum>
;
;
;                 In addition,  CPGETBLK calls CPCSUMTX to calculate the 1-byte
;                 checksum value which is appended to the 128 data bytes.
;
;INPUTS: BLKCNT,COMBUFF1,GROUPTABLE,ALPHATABLE,BLKCNTMX
;
;OUTPUTS: NONE
;
;REGISTER USAGE:
;
;SUPPORT MODULES:  CPBLKMOV,CPCSUMTX
;
;
;SIZE:
;
;EXECUTION TIME:
;
;PDL:             calculate and store necessary address pointers
;                 call CPBLKMOV
;                 call CPCSUMTX
;                 EXIT
;
;*****************************************************************************************

;*****************************************************************************************
;
;MODULE NAME:CPINCLK2
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: This module is called by CPCOMRX to initialize timeout clock #2.
;             New time = real_clock1 time. Each clock tick = 256 millisec.
;
;
;
;
;
;INPUTS:  RXTIMCLK2,REAL_CLOCK1
;
;OUTPUTS: Modified RXTIMCLK2
;
;REGISTER USAGE:
;
;SUPPORT MODULES: NONE
;
;SIZE:
;
;EXECUTION TIME:
;
;PDL:
;
;
;*****************************************************************************************
```

```
;*************************************************************************************
;
;MODULE NAME:CPINCLK4
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: This module is called by CPCOMRX to initialize timeout clock #4.
;             New time = real_clock1 time. Each clock tick = 256 millisec.
;
;
;
;
;
;INPUTS: RXTIMCLK4,REAL_CLOCK1
;
;OUTPUTS: Modified RXTIMCLK4
;
;REGISTER USAGE:
;
;SUPPORT MODULES: NONE
;
;SIZE:
;
;EXECUTION TIME:
;
;PDL:
;
;
;
;
;*************************************************************************************


;*************************************************************************************
;
;MODULE NAME: CPINRBUF
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: This module resets RXBUFPNT -> COMBUFF2 and sets RXBUFCNT =
;              XMODCNT1
;
;
;
;
;
;INPUTS: XMODCNT1,RXBUFPNT,RXBUFCNT,COMBUFF2
;
;OUTPUTS: Modified RXBUFPNT,RXBUFCNT
;
;REGISTER USAGE:
;
;SUPPORT MODULES: NONE
;
;SIZE:
;
;EXECUTION TIME:
;
;PDL:
;
;
;
;
;*************************************************************************************
```

```
;***************************************************************************************
;
;MODULE NAME: CPINRCAC
;
; (c)  Copyright 1987  Teletec Corporation, U.S.A.
;
;AUTHOR: Kevin A. Peterson
;CODE COMPLETE:
;
;LAST MOI IFICATION:
;PERFORMED BY:
;
;TEST/DEBUG:
;
;REVISION NUMBER: new
;
;DESCRIPTION: This module initializes both retry counters (TXTRETRY & TXDRETRY)
;             and restarts the TX timeout clock (TXTIMCLK)
;
;
;
;
;
;INPUTS:  RETRYNUM,TXTRETRY,TXDRETRY,TXTIMCLK,REAL_CLOCK1
;
;OUTPUTS: Modified TXTRETRY,TXDRETRY,TXTIMCLK
;
;REGISTER USAGE:
;
;SUPPORT MODULES: NONE
;
;SIZE:
;
;EXECUTION TIME:
;
;PDL:
;
;
;
;
;***************************************************************************************

;***************************************************************************************
;
;MODULE NAME: CPINRXTX
;
; (c)  Copyright 1987  Teletec Corporation, U.S.A.
;
;AUTHOR: Kevin A. Peterson
;CODE COMPLETE:
;
;LAST MOLIFICATION:
;PERFORMED BY:
;
;TEST/DEBUG:
;
;REVISION NUMBER: new
;
;DESCRIPTION: This module initializes RXTXSTAT as follows:
;
;               RX and TX OK
;               RXBUFFUL = 0
;               RXBUFEMT = 1
;               TXBUFEMT = 1
;
;
;
;
;
;INPUTS: RXTXSTAT
;
;OUTPUTS: Modified RXTXSTAT
;
;REGISTER USAGE:
;
;SUPPORT MODULES: NONE
;
;SIZE:
;
;EXECUTION TIME:
;
;PDL:
;
;
;
;
;***************************************************************************************
```

```
;*****************************************************************************************
;
;MODULE NAME: CPINTBUF
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: This module resets TXBUFPNT -> COMBUFF1+1
;
;
;
;
;
;INPUTS: COMBUFF1,TXBUFPNT
;
;OUTPUTS: Modified TXBUFCNT
;
;REGISTER USAGE:
;
;SUPPORT MODULES: NONE
;
;SIZE:
;
;EXECUTION TIME:
;
;PDL:
;
;*****************************************************************************************

;*****************************************************************************************
;
;MODULE NAME: CPMODE
;
;       Copyright 1987 Teletec Corporation, U.S.A.
;
;AUTHOR: Kevin A. Peterson
;
;CODE COMPLETE: 1/22/87
;
;LAST MODIFICATION: 1/29/87
;PERFORMED BY: Kevin A. Peterson
;
;TEST/DEBUG:
;
;REVISION NUMBER: new
;
;DESCRIPTION:   This routine handles the programming mode selection via the <MOD> key.
;               CPMODE uses "MODECTL" and "FACT_SET1" variables to control flow through
;               routine.  This routine is entered after the 'Secret Code' has been
;               entered by the radio operator.
;
;INPUTS:  MODBIT1,MODBIT2,MODBIT3,MODBIT4,MODBIT5,FACTSET1,FACTSET2,FACTSET3
;         NO_KEY MODECTL,FACT_SET1,P_NEXT0,P_NEXT1
;
;OUTPUTS: NONE
;
;REGISTER USAGE:
;
;SUPPORT MODULES: SET_TIMER,KEY_CHECK,ERROR_KEY,SET_MESS
;                 CPCLONRX,CPCLONTX,CPRS232P,CPRS232D,CPKEYPAD,CPCAN
;
;SIZE:
;
;EXECUTION TIME:
;
;PDL:   DOCASE
;               CASE ( <#> key depressed )
;                    IF ( first time entry to CPMODE module )
;                       THEN execute ERROR_KEY handler
;                       ELSE dispatch to selected mode
;                     ENDIF
;               ENDCASE
;               CASE ( <CAN> key depressed )
;                    execute CPCAN handler
;               ENDCASE
;               CASE ( <MOD> key depressed )
;                    update MODECTL variable and set up to display next mode
;               ENDCASE
;       ENDDOCASE
;*****************************************************************************************
```

```
;*****************************************************************************
;
;MODULE NAME: CPRXINIT
;
;       Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION:   This module is called by CPCOMRX to perform any necessary
;               serial port initialization (i.e. baud rate selection, SCON
;               register loading, initialization of CPCOMRX state variable,
;               etc.
;
;INPUTS: CPRXSTAT,PORT_CTL,COMSTAT1
;
;OUTPUTS: NONE
;
;REGISTER USAGE:
;
;SUPPORT MODULES: NONE
;
;SIZE:
;
;EXECUTION TIME:
;
;PDL:
;
;*****************************************************************************

;*****************************************************************************
;
;MODULE NAME: CPSTRBLK
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION:   This module is called by CPCOMRX to store data after data block
;               reception. The data is found in COMBUFF2 external ram space.
;               See XMODEM protocol description below.  CPSTRBLK calculates the
;               necessary address pointers and calls CPBLKMOV to transfer the
;               data to the EEROM burn buffer. CPSTRBLK transfers the 128 byte
;               data block and the necessary EEROM control bytes (EEROM_B_CNT,
;               EEROM_S_PNT,EEROM_D_PNT).
;
;
;
;
;
;               (XMODEM PROTOCOL)
;
;               <SOH> <BLK #> <255 - BLK #> <128 data bytes> <1 byte checksum>
;
;
;INPUTS: BLKCNT,COMBUFF2,EEROMBUFFER,ALPHATABLE,GROUPTABLE,BLKCNTMX
;
;OUTPUTS: EEROM_B_CNT,EEROM_D_PNT,EEROM_S_PNT
;
;REGISTER USAGE:
;
;SUPPORT MODULES:  CPBLKMOV
;
;SIZE:
;
;EXECUTION TIME:
;
;PDL:
;
;
;
;*****************************************************************************
```

```
;******************************************************************************
;
;MODULE NAME: CPTIMCK1
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: This module performs a time check when called by CPCOMTX.
;              If time check value exceeds TXTIMLIM, FF is returned in ACC,
;              otherwise 00 is returned. Clock resolution is 256 msec/tick.
;
;
;INPUTS:  REAL_CLOCK1,CMP_DATA0,TXTIMCLK,TXTIMLIM
;
;OUTPUTS: ACC = 00H or FFH
;
;REGISTER USAGE:
;
;SUPPORT MODULES: NONE
;
;SIZE:
;
;EXECUTION TIME:
;
;PDL: calculate elapsed time
;     IF elapsed time > TXTIMLIM
;        return ACC = FF
;     ELSE return ACC = 00
;     ENDIF
;
;
;******************************************************************************

;******************************************************************************
;
;MODULE NAME: CPTIMCK2
;
; (c)  Copyright 1987  Teletec Corporation, U.S.A.
;
;AUTHOR: Kevin A. Peterson
:CODE COMPLETE:
;
;LAST MODIFICATION:
;PERFORMED BY:
;
;TEST/DEBUG:
;
;REVISION NUMBER: new
;
;DESCRIPTION: This module performs a time check when called by CPCOMRX.
;              If time check value exceeds RXTIMLIM2, FF is returned in ACC,
;              otherwise 00 is returned. Clock resolution is 256 msec/tick.
;
;
;INPUTS: RXTIMLIM2,REAL_CLOCK1,CMP_DATA0,RXTIMCLK2
;
;OUTPUTS: ACC = 00H or FFH
;
;REGISTER USAGE:
;
;SUPPORT MODULES: NONE
;
;SIZE:
;
;EXECUTION TIME:
;
;PDL: calculate elapsed time
;     IF elapsed time > RXTIMLIM2
;        return ACC = FF
;     ELSE return ACC = 00
;     ENDIF
;
;
;******************************************************************************
```

```
;*******************************************************************************
;
;MODULE NAME: CPTIMCK4
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: This module performs a time check when called by CPCOMRX.
;             If time check value exceeds RXTIMLIM4, FF is returned in ACC,
;             otherwise 00 is returned. Clock resolution is 256 msec/tick.
;
;
;
;
;
;INPUTS: RXTIMLIM4,REAL_CLOCK1,CMP_DATA0,RXTIMCLK4
;
;OUTPUTS: ACC = 00H or FFH
;
;REGISTER USAGE:
;
;SUPPORT MODULES: NONE
;
;SIZE:
;
;EXECUTION TIME:
;
;PDL: calculate elapsed time
;     IF elapsed time > RXTIMLIM4
;        return ACC = FF
;     ELSE return ACC = 00
;     ENDIF
;
;
;*******************************************************************************

;*******************************************************************************
;
;MODULE NAME: CPTXINIT
;
;       Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION:    This module is called by CPCOMTX to perform any necessary
;                serial port initialization (i.e. baud rate selection, SCON
;                register loading, initialization of CPCOMTX state variable,
;                etc.
;
;INPUTS: CPTXSTAT,PORT_CTL,COMSTAT1,FUNCCNTRL00
;
;OUTPUTS: NONE
;
;REGISTER USAGE:
;
;SUPPORT MODULES: NONE
;
;SIZE:
;
;EXECUTION TIME:
;
;PDL:
;
;*******************************************************************************
```

```
;*************************************************************************************
;
;MODULE NAME: CPUPILLC
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: This module updates the 'illegal character' retry counter.  If
;              there have been to many retries, FF is returned in ACC. Otherwise
;              the timeout clock (TXTIMCLK) is restarted and 00 is returned in
;              ACC.
;
;
;
;
;INPUTS:  REAL_CLOCK1,TXDRETRY,TXTIMCLK
;
;OUTPUTS: Modified TXTIMCLK,TXDRETRY and ACC = 00H or FFH
;
;REGISTER USAGE:
;
;SUPPORT MODULES: NONE
;
;SIZE:
;
;EXECUTION TIME:
;
;PDL:
;
;*************************************************************************************

;*************************************************************************************
;
;MODULE NAME: CPUPTIMO
;
; (c)  Copyright 1987  Teletec Corporation, U.S.A.
;
;AUTHOR: Kevin A. Peterson
;CODE COMPLETE:
;
;LAST MODIFICATION:
;PERFORMED BY:
;
;TEST/DEBUG:
;
;REVISION NUMBER: new
;
;DESCRIPTION: This module updates the 'timeout' retry counter (TXTRETRY). If
;              there have been to many retries, FF is returned in ACC. Otherwise
;              the timeout clock is restarted, and 00 is returned in ACC.
;
;INPUTS:  REAL_CLOCK1,TXTRETRY,TXTIMCLK
;
;OUTPUTS: Modified TXTRETRY,TXTIMCLK and ACC = 00H or FFH.
;
;REGISTER USAGE:
;
;SUPPORT MODULES: NONE
;
;SIZE:
;
;EXECUTION TIME:
;
;PDL:
;
;*************************************************************************************
```

```
;***********************************************************************
;
;MODULE NAME:        CUNPACK
;
;(c)   Copyright 1987 Teletec Corporation, U. S. A.
;
;AUTHOR:             Wm. Moore
;CODE COMPLETE:      1/23/87
;
;LAST MODIFICATION:
;PERFORMED BY:
;
;TEST/DEBUG:         1/16/87
;
;REVISION NUMBER:    new
;
;DESCRIPTION:        Unpack a packed byte of 2 nibbles. Byte may either be
;                     a hex or bcd value.  The top nibble and bottom nibble
;                     are written to external memory in separate bytes.
;
;INPUTS:             A:
;                       Packed byte of 2 nibbles to convert.
;                     @DPTR:
;                       Points to an area in external memory where result
;                       will be stored.
;
;OUTPUTS:            @DPTR:
;                       Points to the byte of external memory just past the
;                       2 bytes used to store the unpacked nibbles.
;
;REGISTER USAGE:     A, B, DPTR.
;                     Flag register affected.
;
;SUPPORT MODULES:    none.
;
;SIZE:               0B hex bytes (11 decimal).
;
;EXECUTION TIME:     16 cycles.
;
;PDL:           A = packed byte of 2 nibbles (hex or bcd).
;               Load B with 16.
;               Perform divide on register A.
;               Top nibble of A ends up in A.
;               Store Top nibble at DPTR.
;               Increment DPTR.
;               Bottom nibble of A ends up in B.
;               Store Bottom nibble at DPTR.
;               Increment DPTR.
;               EXIT
;
;***********************************************************************
;***********************************************************************
;
;SUPPORT MODULES:    CMULT32 - Multiplies 2 4 byte unsigned hex numbers together.
;                              Input Parameters:
;                                R3:R2:R1:R0: The multiplicand.
;                                R7:R6:R5:R4: The multiplier.
;                              Output Parameters:
;                                R7:R6:R5:R4:R3:R2:R1:R0: The resultant product.
;
;                     CHEX2BCD - Converts a 4 byte hex number to 5 byte packed
;                              BCD number.
;                              Input Parameters:
;                                R3:R2:R1:R0: Input 4 byte hex number.
;                              Output Parameters:
;                                R4:R3:R2:R1:R0: Resultant 5 byte packed BCD number.
;
;                     CNVRTNA - converts given N, A and R values into frequency.
;                              Input Parameters:
;                                N_VALUE  : the N value.
;                                A_VALUE  : the A value.
;                                R_VALUE  : the R value.
;                              Output Parameters:
;                                R3:R2:R1:R0 : 4 byte unsigned hex frequency.
;
;                     CUNPACK - Unpack a packed BCD byte into 2 unpacked bytes.
;                              Input Parameters:
;                                A = packed BCD byte.
;                                DPTR -> location where unpacked result placed.
;                              Output Parameters:
;                                DPTR -> next location past data that was unpacked.
```

```
;
;
;SIZE:                5E hex bytes (94 decimal).
;
;EXECUTION TIME:      2400 - 3200 cycles.
;
;PDL:
;
;            Read N_VALUE, A_VALUE, and R_INDEX from table using @DPTR.
;
;            Convert this to binary frequency by calling CNVRTNA.
;
;            Convert this to Tx frequency by multipling by TX_MULT_CON.
;
;            Convert hex frequency to packed BCD by calling CHEX2BCD.
;
;            Convert packed BCD to unpacked BCD by calling CUNPACK.
;
;            EXIT
;
;
;*************************************************************************
;*************************************************************************
;
;MODULE NAME:         CTXNA2F
;
;       (c) Copyright 1987  Teletec Corporation, U.S.A
;
;AUTHOR:              Wm. Moore
;CODE COMPLETE:       2/23/87
;
;LAST MODIFICATION:
;PERFORMED BY:
;
;TEST/DEBUG:          2/19/87
;
;REVISION NUMBER:     1.0
;
;DESCRIPTION:         Convert the given transmit synthesizer divide by N,
;                          A and R values into tne transmit frequency.
;
;INPUTS:                 NA_2_TX_NA:
;                          4 byte data structure of N, A, and R values:
;
;                            7  6  5  4   3  2  1  0
;                          +-------------+-------------+
;                          :        8 bits nex         : MS byte of N value.
;                          +---------------------------+
;                          :        8 bits hex         : LS byte of N value.
;                          +---------------------------+
;                          :        8 bits hex         : divide by A value.
;                          +---------------------------+
;                          : 0  0  0  0 : 4 bits hex   : divide by R index value.
;                          +-------------+-------------+
;
;OUTPUTS:                NA_2_TX_F:
;                          7 bytes of unpacked BCD transmit frequency.
;                            The decimal point will be assumed between the 3rd and 4th
;                            digit and the number scaled to represent MHz., as XXX.YYYY MHz.
;
;REGISTER USAGE:      A, B, R0-R7, DPTR.
;                      Flag register affected.
;
;*************************************************************************
;*************************************************************************
;
;SUPPORT MODULES:     CALCRNA - validates and then converts a given frequency
;                                into N and A values using channel spacing and
;                                prescaler constants.
;
;                                  Input Parameters:
;
;                                        Hex frequency  : R3:R2:R1:R0.
;                                        Channel Spacing: R7:R6:R5:R4.
;                                      Tx Prescale     : in PRESCALE variable.
;
;                                  Output Parameters:
;
;                                      If A = 0 (zero set),
;                                        N value: R1:R0.
```

```
;                                   A value: R4.
;                                   If A > 0 (zero cleared),
;                                   Given frequency and channel spacing are
;                                   not divisible.
;
;
;SIZE:                   9B hex bytes (155 decimal).
;
;EXECUTION TIME:         5000 - 18000 cycles.
;                         Dependant on the depth of search required to find a matching
;                         channel spacing.
;
;PDL:
;
;              Convert 7 bytes unpacked data to 5 bytes packed BCD in registers.
;              Digits 1,9,10 are set to zero in 5 byte area.
;
;              Convert 5 bytes packed BCD to 4 bytes unsigned binary.
;
;              Add FIRST_IF frequency to hex frequency.
;
;              DO_WHILE_1 (Rx Channel Spacing table has entries)
;              and (Channel Spacing not found)
;
;                Get next Channel Spacing value from table using table index.
;
;                Call routine to determine validity of hex frequency and
;                calculate N, and A values.
;                IF (Channel Spacing not found)
;                  move to next table entry if any.
;                ENDIF
;              END DO_WHILE_1
;              IF (Channel Spacing not found)
;                set error indicator (RX_2_NA_ER = 1).
;              EXIT
;
;*************************************************************************

;*************************************************************************
;
;MODULE NAME:   CTXF2NA
;
;       (c) Copyright 1987  Teletec Corporation, U.S.A
;
;AUTHOR:                   Wm. Moore
;CODE COMPLETE:          2/23/87
;
;LAST MODIFICATION:
;PERFORMED BY:
;
;TEST/DEBUG:             1/19/87
;
;REVISION NUMBER:          1.0
;
;DESCRIPTION:   Convert the given transmit frequency into the transmit
;                     synthesizer divide by N, A and R values.
;
;INPUTS:                   TX_2_NA_F:
;                            7 bytes of unpacked BCD transmit frequency.
;                              The decimal point will be assumed between the 3rd and 4th
;                              digit and the number scaled to represent MHz.. as XXX.YYYY MHz.
;
;OUTPUTS:                  TX_2_NA_NA:
;                            4 byte data structure of N, A, and R values:
;
;                              7  6  5  4   3  2  1  0
;                             +-------------+------------+
;                             :        8 bits hex        : MS byte of N value.
;                             +--------------------------+
;                             :        8 bits hex        : LS byte of N value.
;                             +--------------------------+
;                             :        8 bits hex        : divide by A value.
;                             +--------------------------+
;                             : 0  0  0  0 : 4 bits hex  : divide by R index value.
;                             +-------------+------------+
;
;REGISTER USAGE:        A, B, R0-R7, DPTR.
;                        Flag register affected.
;
;*************************************************************************
```

```
;*************************************************************************
;*************************************************************************
;
;MODULE NAME:        CTERM23
;
;     (c) Copyright 1987  Teletec Corporation, U.S.A
;
;AUTHOR:             Wm. Moore
;CODE COMPLETE:      1/23/87
;
;LAST MODIFICATION:
;PERFORMED BY:
;
;TEST/DEBUG:         1/22/87
;
;REVISION NUMBER:    1.0
;
;DESCRIPTION:        Add in the sub-products for the 2 x 2 byte multiplication
;                       performed by the CNVRTNA routine.
;
;INPUTS:             A contains the multiplicand.
;                     B contains the multiplier.
;
;OUTPUTS:            The multiplication product in R3:R2:R1 is updated.
;
;REGISTER USAGE:     A, B, R1-R3.
;                     Flag register affected.
;
;SUPPORT MODULES:    none.
;
;SIZE:               13 hex bytes (19 decimal).
;
;EXECUTION TIME:     22 cycles.
;
;PDL:
;
;             Present multiplication result in R3:R2:R1.
;
;             Multiply A and B together, then add 2 byte product into R2:R1
;             carrying into R3 if necessary.
;
;             EXIT
;
;
;*************************************************************************

;*************************************************************************
;
;MODULE NAME:        CSUB32
;
;(c) Copyright 1987 Teletec Corporation, U. S. A.
;
;AUTHOR:             Wm. Moore
;CODE COMPLETE:      1/23/87
;
;LAST MODIFICATION:
;PERFORMED BY:
;
;TEST/DEBUG:         1/17/87
;
;REVISION NUMBER:    1.0
;
;DESCRIPTION:        Performs 32 bit subtraction (with input and output borrow)
;                       on 2 operands presently in registers in the current
;                       register bank.
;
;INPUTS:             R3:R2:R1:R0
;                      Contains the minuend (the value subtracted from) for
;                      subtraction.
;                     R7:R6:R5:R4
;                       Contains the subtrahend (the value subtracted from
;                       another) for subtraction.
;
;OUTPUTS:            R3:R2:R1:R0
;                       Contains the resultant difference after subtraction.
;
;REGISTER USAGE:     A, R0-R7, DPTR.
;                     Flag register affected.
;
;SUPPORT MODULES:    none.
;
```

```
;SIZE:              0D hex bytes (13 decimal).
;
;EXECUTION TIME:    16 cycles.
;
;PDL:
;             Subtract R4 from R0 using input borrow from previous stage (if any).
;             Subtract R5 from R1 using input borrow from previous stage.
;             Subtract R6 from R2 using input borrow from previous stage.
;             Subtract R7 from R3 using input borrow from previous stage.
;             This becomes:
;
;                     R3:R2:R1:R0     (the minuend)
;                   - R7:R6:R5:R4     (the subtranend)
;                     -----------
;                     R3:R2:R1:R0     (the difference)
;
;             EXIT
;
;
;**********************************************************************
;
;MODULE NAME: CSECRET
;
;CODE COMPLETE:
;LAST MODIFICATION: 10/17/86
;TEST/DEBUG:
;
;REVISION NUMBER: new
;
;DESCRIPTION:   This module takes cares of secret code entering sequence.
;               In addition. CSECRET provides high level dispatching after the.
;               radio enters program mode via a long jump to CPMODE.
;
;INPUTS: ALPHAFG.RELEASE.SECRET_MODE.WAIT.NO_KEY,SECRET_BEG.SECRET_END
;        CMP_DATA.LCD_POINTER,P_NEXT0.P_NEXT1
;        ALT_BUFFER.SECRET_BUF.SECRET_PNT.SECRET_ERR
;
;OUTPUTS: NONE
;
;REGISTER USAGE:
;
;SUPPORT MODULES: KEY_CHECK.F_STATE.ERROR_KEY,MESS_DISP.VALID_KEY,SET_TIMER
;                 CPMODE.SET_MESS
;
;SIZE:
;
;EXECUTION TIME:
;
;PDL:
;
;**********************************************************************

;**********************************************************************
;
;SUPPORT MODULES:    CADD32 - Adds 2 4 byte unsigned hex numbers together.
;                             Input Parameters:
;                               R3:R2:R1:R0: The 1st addend.
;                               R7:R6:R5:R4: The 2nd addend.
;                             Output Parameters:
;                               R3:R2:R1:R0: The resultant sum.
;
;                    CHEX2BCD - Converts a 4 byte hex number to 5 byte packed
;                               BCD number.
;                               Input Parameters:
;                                 R3:R2:R1:R0: Input 4 byte hex number.
;                               Output Parameters:
;                                 R4:R3:R2:R1:R0: Resultant 5 byte packed BCD number.
;
;                    CNVRTNA - converts given N. A and R values into frequency.
;                              Input Parameters:
;                                N_VALUE  : the N value.
;                                A_VALUE  : the A value.
;                                R_VALUE  : the R value.
;                              Output Parameters:
;                                R3:R2:R1:R0 : 4 byte unsigned hex frequency.
;
;                    CUNPACK - Unpack a packed BCD byte into 2 unpacked bytes.
;                              Input Parameters:
;                                A = packed BCD byte.
;                                DPTR -> location where unpacked result placed.
;                              Output Parameters:
```

```
;                                DPTR -> next location past data that was unpacked.
;
;
;SIZE:                  6F hex bytes (111 decimal).
;
;EXECUTION TIME:        2100 - 3200 cycles.
;
;PDL:
;             Read N_VALUE, A_VALUE, and R_INDEX from RX_2_NA_NA table.
;
;             Convert this to binary frequency by calling CNVRTNA.
;
;             Convert this to Rx frequency by subtracting FIRST_IF.
;
;             Convert hex frequency to packed BCD by calling CHEX2BCD.
;
;             Convert packed BCD to unpacked BCD by calling CUNPACK.
;
;             EXIT
;
;
;**************************************************************************

;**************************************************************************
;
;MODULE NAME:           CRXNA2F
;
;       (c) Copyright 1987  Teletec Corporation, U.S.A
;
;AUTHOR:                Wm. Moore
;CODE COMPLETE:         2/23/87
;
;LAST MODIFICATION:
;PERFORMED BY:
;
;TEST/DEBUG:            2/19/87
;
;REVISION NUMBER:          1.0
;
;DESCRIPTION:   Convert the given receive synthesizer divide by N,
;                     A and R values into the receive frequency.
;
;INPUTS:                   NA_2_RX_NA:
;                            4 byte data structure of N, A, and R values:
;
;                              7  6  5  4   3  2  1  0
;                            +-------------+------------+
;                            :        8 bits hex        : MS byte of N value.
;                            +--------------------------+
;                            :        8 bits hex        : LS byte of N value.
;                            +--------------------------+
;                            :        8 bits hex        : divide by A value.
;                            +--------------------------+
;                            : 0  0  0  0 : 4 bits hex  : divide by R index value.
;                            +--------------------------+
;
;OUTPUTS:                  NA_2_RX_F:
;                            7 bytes of unpacked BCD transmit frequency.
;                              The decimal point will be assumed between the 3rd and 4th
;                              digit and the number scaled to represent MHz., as XXX.YYYY MHz.
;
;REGISTER USAGE:        A, B, R0-R7, DPTR.
;                        Flag register affected.
;
;**************************************************************************

;**************************************************************************
;
;SUPPORT MODULES:          CALCRNA - validates and then converts a given frequency
;                                    into N and A values using channel spacing and
;                                    prescaler constants.
;
;                                    Input Parameters:
;
;                                          Hex frequency   : R3:R2:R1:R0.
;                                          Channel Spacing: R7:R6:R5:R4.
;                                        Rx Prescale     : in PRESCALE variable.
;
;                                    Output Parameters:
;
;                                        If A = 0 (zero set),
```

```
;                                       N value: R1:R0.
;                                       A value: R4.
;                                       If A > 0 (zero cleared).
;                                       Given frequency and cnannel spacing are
;                                       not divisible.
;
;
;SIZE:                  86 hex bytes (134 decimal).
;
;EXECUTION TIME:        5000 - 8000 cycles.
;                        Dependant on the depth of search required to find a matching
;                        channel spacing.
;
;PDL:
;               Convert 7 bytes unpacked data to 5 bytes packed BCD in registers.
;               Digits 1,9,10 are set to zero in 5 byte area.
;               Convert 5 bytes packed BCD to 4 bytes unsigned binary.
;               Multiply Tx Multiply Constant by hex frequency.
;               DO_WHILE_1 (Tx Channel Spacing table has entries)
;               and (Channel Spacing not found)
;                 Get next Channel Spacing value from table using table index.
;                 Call routine to determine validity of hex frequency and
;                 calculate N, and A values.
;                 IF (Cnannel Spacing not found)
;                   move to next table entry if any.
;                 ENDIF
;               END DO_WHILE_1
;               IF (Channel Spacing not found)
;                 set error indicator (TX_2_NA_ER = 1).
;               EXIT
;
;*************************************************************************

;*************************************************************************
;
;MODULE NAME:           CRXF2NA
;
;     (c) Copyright 1987  Teletec Corporation, U.S.A
;
;AUTHOR:                Wm. Moore
;CODE COMPLETE:         1/23/87
;LAST MODIFICATION:
;PERFORMED BY:
;TEST/DEBUG:            1/19/87
;
;REVISION NUMBER:       1.0
;
;DESCRIPTION:           Convert the given receive frequency into the receive
;                        synthesizer divide by N, A and R values.
;
;INPUTS:                RX_2_NA_F:
;                           7 bytes of unpacked BCD receive frequency.
;                             The decimal point will be assumed between the 3rd and 4th
;                             digit and the number scaled to represent MHz., as XXX.YYYY MHz.
;
;OUTPUTS:               RX_2_NA_NA:
;                           4 byte data structure of N, A, and R values:
;
;                             7  6  5  4   3  2  1  0
;                            +-------------+-------------+
;                            :       8 bits hex          : MS byte of N value.
;                            +---------------------------+
;                            :       8 bits hex          : LS byte of N value.
;                            +---------------------------+
;                            :       8 bits hex          : divide by A value.
;                            +---------------------------+
;                            : 0  0  0  0 : 4 bits hex   : divide by R index value.
;                            +-------------+-------------+
;
;REGISTER USAGE:        A, B, R0-R7, DPTR.
;                        Flag register affected.
;
;*************************************************************************

;*************************************************************************
;
;MODULE NAME:           CMULTSTR
;
;(c)  Copyright 1987 Teletec Corporation, U. S. A.
;
;AUTHOR:                Wm. Moore
```

```
;CODE COMPLETE:        2/23/87
;
;LAST MODIFICATION:
;PERFORMED BY:
;
;TEST/DEBUG:           2/23/87
;
;REVISION NUMBER:      1.0
;
;DESCRIPTION:          Loads the initial sub-products in for the 32 bit multiplication
;                         routine in the result area.
;
;INPUTS:               A contains the multiplicand.
;                       B contains the multiplier.
;                       DPTR points to the current location in result when
;                         addition is to proceed.
;
;OUTPUTS:              DPTR incremented by 2.  Result updated with this
;                         partial product.
;
;REGISTER USAGE:       A, B, DPTR.
;                       Flag register affected.
;
;SUPPORT MODULES:      none.
;
;SIZE:                 8 hex bytes (8 decimal).
;
;EXECUTION TIME:
;
;PDL:
;
;**********************************************************************

;**********************************************************************
;
;            *** this looks like:
;
;                    r3r2r1r0    (the multiplicand).
;                  x r7r6r5r4    (the multiplier).
;                    --------
;                        r4r0
;                      r4r1      (16 partial products).
;                    r4r2
;                  r4r3
;                      r5r0
;                    r5r1
;                  r5r2
;                r5r3
;                    r6r0
;                  r6r1
;                r6r2
;              r6r3
;            ----------------
;            Compute this first
;
;                  r7r0
;                r7r1
;              r7r2
;            r7r3
;            ----------------
;            Add this in next (after we
;            restore R7's original value).
;
;
;**********************************************************************

;**********************************************************************
;
;EXECUTION TIME:       200 - 1086 cycles.
;
;                        Dependant on number of bytes in each operand and which
;                        operand is larger.  Routine checks for partial products
;                        with zero value operand(s).
;
;                        The following are typical tested values:
;
;                          1234  688 cycles       1234  299 cycles
;                        x 4321                 x   12
;                          ----                   ----
;
;                            12  311 cycles         12  208 cycles
```

```
;                     x 1234                  x   12
;                       ----                    ----
;
;                       123456  299 cycles         12  413 cycles
;                     x     12                x 123456
;                        ------                  ------
;
;                       12345678 1068 cycles
;                     x 12345678
;                       --------
;
;PDL:
;
;             Save R7 in external ram (we need 1 free register).
;             Compute initial 3 products and load result area.
;             Compute 9 partial products and sum them into the result.
;             Restore R7 contents (in external ram) to a free register.
;             (since 3/4 of the products have been calculated, we have
;             some free registers now).
;             Compute 4 partial products and sum them into the result.
;             Result is now complete in external ram.
;             Move result back into registers R7:R6:R5:R4:R3:R2:R1:R0.
;             EXIT
;
;***************************************************************************

;***************************************************************************
;
;MODULE NAME:         CMULT32
;
;(c)   Copyright 1987 Teletec Corporation, U. S. A.
;
;AUTHOR:              Wm. Moore
;CODE COMPLETE:       2/23/87
;
;LAST MODIFICATION:
;PERFORMED BY:
;
;TEST/DEBUG:          2/19/87
;
;REVISION NUMBER:     1.0
;
;DESCRIPTION:         Performs unsigned 32 bit multiplication on 2 operands
;                        in registers in the current register bank.  It
;                        returns an unsigned 64 bit result.
;
;INPUTS:              R3:R2:R1:R0
;                        Contains the multiplicand (the number being multiplied).
;                      R7:R6:R5:R4
;                        Contains the multiplier (the number by which another number
;                        is multiplied).
;
;OUTPUTS:             R7:R6:R5:R4:R3:R2:R1:R0
;                        Contains the resultant unsigned 64 bit product of
;                        the multiplication.
;
;REGISTER USAGE:      A, R0-R7, DPTR.
;                      Flag register affected.
;
;SUPPORT MODULES:     CMULTSTR:
;                        Store the 3 initial partial products and loads them
;                        into the result area (result area initialized).
;                      CMULADD2:
;                        Adds in the specified partial product to the result
;                        area.
;
;SIZE:                151 hex bytes (337 decimal).
;
;***************************************************************************

;***************************************************************************
;
;MODULE NAME:         CMULADD2
;
;(c)  Copyright 1987 Teletec Corporation, U. S. A.
;
;AUTHOR:              Wm. Moore
;CODE COMPLETE:       2/23/87
;
;LAST MODIFICATION:
;PERFORMED BY:
```

```
;
;TEST/DEBUG:           2/23/87
;
;REVISION NUMBER:      1.0
;
;DESCRIPTION:          Adds the sub-products in for the 32 bit multiplication
;                         routine.
;
;INPUTS:               A contains the multiplicand.
;                       B contains the multiplier.
;                       DPTR points to the current location in result when
;                         addition is to proceed.
;
;OUTPUTS:              DPTR incremented by 2.  Result updated with this
;                         partial product.
;
;REGISTER USAGE:       A, B, R7, DPTR.
;                       Flag register affected.
;
;SUPPORT MODULES:      none.
;
;SIZE:                 10 hex bytes (16 decimal).
;
;EXECUTION TIME:
;
;PDL:
;
;**************************************************************************

;**************************************************************************
;
;PDL:
;
;          Acceptable values as input are from:  00000000 to FFFFFFFF.
;
;          Convert HEX number in R3:R2:R1:R0 to unpacked HEX in ram.
;
;          Clear the result area, set to 0's.
;
;          DO_WHILE_1 (We have HEX nibbles left to test)
;
;            Add in bcd equivalent of HEX nibble by calling CADDBCD.
;
;          END DO_WHILE_1
;
;          Results in R4:R3:R2:R1:R0.
;
;          EXIT
;
;**************************************************************************

;**************************************************************************
;
;PDL:
;                  We assume the following concerning variables
;                    in this module:
;
;                  N_VALUE  - 2 bytes, no larger than 10 bits (0-767 dec).
;                  A_VALUE  - 1 byte, no larger than 7 bits (0-127 dec).
;                  MULTCON  - 1 byte, full 8 bits.
;                  CHANSPAC - 2 bytes, containing decimal values of:
;
;                                     500 ->  5.0  kHz.
;                                     625 ->  6.25 kHz.
;                                    1000 -> 10    kHz.
;                                    1250 -> 12.5  kHz.
;                                    1500 -> 15.0  kHz.
;
;                  Note that the input values in CHANSPAC are significant
;                  to .01 kHz instead of .1 kHz as was previously the case.
;                  Routines that call this module MUST use the above values
;                  for CHANSPAC.
;
;
;          Compute low_byte(N_VALUE) * MULTCON.
;
;          Compute high_byte(N_VALUE) * MULTCON.
;
;          Add top nybble of low_byte to bottom nybble of high_byte.
;
;          Carry addition into high_byte if necessary (if carry bit set).
```

```
;
;             Result (2 bytes) = N_VALUE * MULTCON.
;
;             Add A_VALUE to low_byte of Result.
;
;             Carry addition into high_byte of Result if necessary.
;
;             Result (2 bytes) = (N_VALUE * MULTCON) + A.
;
;             Multiply Result (2 bytes) * CHANSPAC (2 bytes) and generate 4 byte result.
;             Call CTERM23 to add in sub products of multiplication.
;
;             Results returned in registers R3:R2:R1:R0 .
;
;             EXIT
;
;
;*************************************************************************

;*************************************************************************
;
;MODULE NAME:         CNVRTNA
;
;     (c) Copyright 1987  Teletec Corporation, U.S.A
;
;AUTHOR:              Wm. Moore
;CODE COMPLETE:       1/23/87
;
;LAST MODIFICATION:   11/13/86
;PERFORMED BY:        (unknown)
;
;TEST/DEBUG:          1/17/87
;
;REVISION NUMBER:     Rev 1.1
;
;                      (Rev 1.0   11/13/86)
;
;DESCRIPTION:         Convert the given N, A, prescale and channel spacing
;                        values into an Rx or Tx frequency.
;
;INPUTS:              A_VALUE:
;                        1 byte external ram variable containing the 'A'
;                        value of some frequency.
;                      N_VALUE:
;                        2 byte external ram variable containing the 'N'
;                        value of some frequency.
;                      MULTCON:
;                        1 byte external ram variable containing either the
;                        Rx Prescaler or Tx Prescaler value.
;                      CHANSPAC:
;                        2 byte external ram variable containing the channel
;                        spacing value (in Mhz) in the form XXX.YYYYY .  See
;                        notes in the PDL and code sections concerning this
;                        variable.
;
;OUTPUTS:             R3:R2:R1:R0: The equivalent frequency in hex.
;
;REGISTER USAGE:      A, B, R7-R0, DPTR.
;                      Flag register affected.
;
;SUPPORT MODULES:     CTERM23:
;                        Adds in the 2 sub products of the multiplication.
;
;SIZE:                42 hex bytes (66 decimal).
;
;EXECUTION TIME:      120 cycles.
;
;*************************************************************************

;*************************************************************************
;
;MODULE NAME:         CHEX2BCD
;
;(c) Copyright 1987 Teletec Corporation, U. S. A.
;
;AUTHOR:              Wm. Moore
;CODE COMPLETE:       1/23/87
;
;LAST MODIFICATION:
;PERFORMED BY:
;TEST/DEBUG:          1/18/87
;REVISION NUMBER:     1.0
```

```
;
;DESCRIPTION:        Convert the 4 byte (32 bit) unsigned hex value into its
;                       5 byte (10 digit) BCD equivalent.
;
;INPUTS:             R3:R2:R1:R0
;                       The input 32 bit unsigned hex number in 4 bytes. R3
;                       contains the most significant 8 bits.
;
;OUTPUTS:            R4:R3:R2:R1:R0
;                       The output 10 digit BCD number. R4 contains the 2 most
;                       significant BCD digits.
;
;REGISTER USAGE:     A, B, R7-R0, DPTR.
;                     Flag register affected.
;
;SUPPORT MODULES:    CUNPACK:
;                       unpacks a byte of data into 2 bytes, with top
;                       nibble = 0 and bottom nibble = data.
;                     ADDBCD:
;                       Uses nibble value (in A) and nibble place value (in B)
;                       to convert this nibble HEX value into its bcd equivalent
;                       and sum into to the result.
;
;SIZE:               3B hex bytes (59 decimal).
;
;EXECUTION TIME:     238 - 5374 cycles.
;
;                     Execution time depends on the size of the HEX number,
;                     and # of digits input in HEX.  For our values in the
;                     147 to 174 Mhz range, execution times of 1950 cycles
;                     are typical.
;
;                     The following are tested values:
;
;                     08D24D00 hex  ->  148,000,000 decimal   in  1978 cycles.
;                     0903E450      ->  151,250,000               1768
;                     09B050F0      ->  162,550,000               1966
;                     09F5BE60      ->  167,100,000               2830
;                     0A5F0780      ->  174,000,000               2188
;
;************************************************************************

;**********************************************************************
;
;MODULE NAME: CEEROM
;       (C) Copyright 1987 Teletec Corporation, U.S.A.
;AUTHOR: Ming Hsu
;CODE COMPLETE: 09/05/86
;LAST MODIFICATION: 02/23/87
;PERFORMED BY: Ming Hsu
;TEST/DEBUG:
;
;REVISION NUMBER: new
;
;DESCRIPTION: This module updates EEROM data
;
;INPUTS:
;        EEROM_B_CNT= number of bytes to be update
;        EEROM_D_PNT= (EEROM destination address )
;        EEROM_S_PNT= (source data address)
;
;OUTPUTS: NONE
;
;
;REGISTER USAGE:
;
;SUPPORT MODULES: CEETIMER
;
;SIZE:
;
;EXECUTION TIME:
;
;PDL:
;       IF EEROM_ERASE = 1
;          THEN check erase cycle time out
;               IF erase cycle time out
;                  THEN start write cycle
;                  ELSE exit
;               ENDIF
;          ELSE
;               IF EEROM_WRITE = 1
```

```
;                    THEN cneck write cycle time out
;                         IF write cycle time out
;                            THEN issue a read command
;                                 start next erase cycle
;                            ELSE
;                                 EXIT
;                         ENDIF
;                    ELSE start erase cycle
;                 ENDIF
;         ENDIF
;*********************************************************************

;*********************************************************************
;
;EXECUTION TIME:     2459 - 3389 cycles.
;
;                     Execution time depends on the magnitude of the 2 operands.
;                     For values we are using (see below), execution times of
;                     2600 cycles are typical.
;
;                     The following are tested values:
;
;                       Divisor              Dividend        Time
;                       -------              --------        ----
;
;                       0                    don't care      13   cycles.
;                       FFFFFFFF  hex         FFFF hex       2489
;                       FFFFFFFF  hex         0001 hex       3389
;                       00000001              0001 hex       2459
;                       207850000 decimal   10000 decimal    2609
;                       211100000 decimal   12500 decimal    2639
;                       222400000 decimal    6250 decimal    2549
;                       226950000 decimal   15000 decimal    2669
;                       233850000 decimal    5000 decimal    2699
;                       148000000 decimal      10 decimal    2699
;
;PDL:
;              Dividend in registers R3:R2:R1:R0.
;              Divisor in registers  R5:R4.
;              Clear R7:R6.
;              IF (divisor is not zero)
;                Clear remainder area.
;                DO_WHILE (we have bits left in dividend)
;                  Subtract divisor from remainder area.
;                  IF (remainder < divisor)
;                    Subtract divisor from current total (remainder).
;                  ENDIF
;                  Rotate Dividend and Remainder 1 bit to the left.
;                END DO_WHILE
;                Correct remainder by rotating 1 bit right.
;                Quotient is in R3:R2:R1:R0.
;                Remainder is in R7:R6:R5:R4.
;              ENDIF
;              EXIT
;
;
;*********************************************************************

;*********************************************************************
;
;MODULE NAME:         CDIV32
;
;(c)  Copyright 1987 Teletec Corporation. U. S. A.
;
;AUTHOR:              Wm. Moore
;
;                      The basic algorithm for this code was obtained
;                      from the Intel Insite 8051 math library (# CA24).
;
;CODE COMPLETE:       2/23/87
;
;LAST MODIFICATION:
;PERFORMED BY:
;
;TEST/DEBUG:          2/19/87
;
;REVISION NUMBER:     1.0
;
;DESCRIPTION:         Performs 32 bit division on 2 operands presently in
;                        registers in the current register bank. The dividend
;                        is 4 bytes (32 bits), the divisor is 2 bytes (16 bits).
```

```
;
;INPUTS:            R3:R2:R1:R0
;                      Contains the dividend for division.
;                    R5:R4
;                      Contains the divisor for division.  R7, R6 are set to
;                      zero after entering routine and need not be zero prior
;                      prior to call.  R5, R4 contain the divisor.
;
;OUTPUTS:           R3:R2:R1:R0
;                      Contains the quotient (integer portion) after division.
;                    R7:R6:R5:R4
;                      Contains the remainder after division.
;
;REGISTER USAGE:    A, R0-R7, DPTR.
;                    Flag register affected.
;
;SUPPORT MODULES:   none.
;
;SIZE:              8C hex bytes (140 decimal).
;
;
;***************************************************************************

;***************************************************************************
;***************************************************************************
;
;PDL:
;          Acceptable values as input are from:  0000000000 to 4,294,967,295.
;            The maximum value translates to FFFFFFFF hex (4 bytes).
;          Validation is NOT performed for BCD nibbles > 9.
;          Convert BCD number in R4:R3:R2:R1:R0 to unpacked BCD in ram.
;          Clear the result area, set to 0's.
;          DO_WHILE_1 (We have BCD nibbles left to test)
;            Add in hex equivalent of BCD nibble by calling CADDHEX.
;          END DO_WHILE_1
;          Results in R3:R2:R1:R0.
;          EXIT
;
;***************************************************************************

;***************************************************************************
;***************************************************************************
;
;MODULE NAME:       CBCD2HEX
;
;(c) Copyright 1987 Teletec Corporation, U. S. A.
;
;AUTHOR:            Wm. Moore
;CODE COMPLETE:     2/23/87
;LAST MODIFICATION:
;PERFORMED BY:
;TEST/DEBUG:        2/19/87
;
;REVISION NUMBER:   1.0
;
;DESCRIPTION:       Convert the 5 byte (10 digit) BCD value into its 4 byte
;                    (32 bit) unsigned hex equivalent.
;
;INPUTS:            R4:R3:R2:R1:R0
;                      The input 10 digit BCD number. R4 contains the 2 most
;                      significant BCD digits.
;
;OUTPUTS:           R3:R2:R1:R0
;                      The output 32 bit unsigned hex number in 4 bytes. R3
;                      contains the most significant 8 bits.
;
;REGISTER USAGE:    A, B, R7-R0, DPTR.
;                    Flag register affected.
;
;SUPPORT MODULES:   CUNPACK:
;                      Unpacks a byte of hex data into 2 bytes of hex, with top
;                      nibble = 0 and bottom nibble = data.
;                    ADDHEX:
;                      Uses nibble value (in A) and nibble place value (in B)
;                      to convert this nibble BCD value into its hex equivalent
;                      and sum into to the result.
;
;SIZE:              3E hex bytes (62 decimal).
;
;EXECUTION TIME:    293 - 2103 cycles.
;
```

```
;                      Execution time depends on the size of the BCD number,
;                      and # of digits input in BCD.  For our values in the
;                      147 to 174 Mhz range, execution times of 770 cycles
;                      are typical.
;
;                      The following are tested values:
;
;                      148,000,000 decimal  ->  08D24D00 hex   in  713 cycles.
;                      151,250,000          ->  0903E450           763
;                      162,550,000          ->  09B050F0           913
;                      167,100,000          ->  09F5BE60           783
;                      174,000,000          ->  0A5F0780           683
;
;***********************************************************************
;
;MODULE NAME:         CALCRNA
;
;(c)  Copyright 1987 Teletec Corporation, U. S. A.
;
;AUTHOR:              Wm. Moore
;CODE COMPLETE:       2/23/87
;LAST MODIFICATION:
;PERFORMED BY:
;TEST/DEBUG:          2/19/87
;
;REVISION NUMBER:     1.0
;
;DESCRIPTION:         Calculates the N and A values given an Rx or Tx frequency,
;                      PRESCALE, and CHANNEL SPACING values.  Validates whether
;                      the given frequency is valid.
;
;INPUTS:              R3:R2:R1:R0
;                        Contains the 4 byte unsigned hex frequency.
;                      R5:R4
;                        Contains the 4 byte unsigned hex CHANNEL SPACING value.
;                          R7:R6 will be set to 00:00 when the 32 bit divide routine
;                          is called.
;OUTPUTS:             R1:R0
;                        N_VALUE
;                      R4
;                        A_VALUE
;
;REGISTER USAGE:      A, R0-R7, DPTR.
;                      Flag register affected.
;
;SUPPORT MODULES:     none.
;
;SIZE:                14 bytes hex (20 decimal).
;
;EXECUTION TIME:      2600 - 4000 cycles.
;                      Performs 2 divisions, depends on magnitude of the
;                        numbers being divided.
;
;PDL:          Dividend in R3:R2:R1:R0 at entry.
;              Divisor  in R5:R4       at entry (R7:R6 may be = 0).
;              Divide Hex Frequency (the Dividend) by Channel Spacing (the
;                Divisor).
;              IF (remainder = 0) then
;                Divide previous result by the PRESCALE value.
;                Set flags to indicate divisiion successful.
;                We return the N and A values.
;              ELSE
;                Set flags to indicate division un-successful.
;                No returned results.
;              ENDIF
;              EXIT
;
;***********************************************************************
;
;MODULE NAME:         CADDHEX
;
;(c) Copyright 1987 Teletec Corporation, U. S. A.
;
;AUTHOR:              Wm. Moore
;CODE COMPLETE:       2/23/87
;
;LAST MODIFICATION:
;PERFORMED BY:
;
;TEST/DEBUG:          2/19/87
```

```
;
;REVISION NUMBER:     1.0
;
;DESCRIPTION:         Given the BCD nibble and its place value in the BCD
;                      number, lookup the hex equivalent in the table and
;                      add it in 'BCD nibble value' times to the result.
;
;INPUTS:              A = value of the BCD nibble (1-9).
;
;OUTPUTS:             B = this nibbles place value in the BCD number (whether
;                          this is the 1's,10's,100's,1000's nibble, etc.
;
;REGISTER USAGE:      A, B, R0-R3, R5-R6, DPTR.
;                      Flag register affected.
;
;SUPPORT MODULES:     none.
;
;SIZE:                23 hex bytes (35 decimal).
;
;EXECUTION TIME:      40 - 280 cycles typical.
;                      Dependant on size of nibble (1-9) being converted.
;
;PDL:
;              Generate offset in lookup using B, the nibble place value.
;              DO_WHILE_1 (loop count < nibble value)
;                Add in hex equivalent of BCD nibble to result.
;              END DO_WHILE_1
;              EXIT
;
;**************************************************************************

;**************************************************************************
;
;MODULE NAME:         CADDBCD
;
;(c) Copyright 1987 Teletec Corporation, U. S. A.
;
;AUTHOR:              Wm. Moore
;CODE COMPLETE:       2/23/87
;
;LAST MODIFICATION:
;PERFORMED BY:
;
;TEST/DEBUG:          2/18/87
;
;REVISION NUMBER:     1.0
;
;DESCRIPTION:         Given the HEX nibble and its place value in the HEX
;                      number, lookup the bcd equivalent in the table and
;                      add it in 'HEX nibble value' times to the result.
;
;INPUTS:              A = value of the HEX nibble (1-F).
;
;OUTPUTS:             B = this nibbles place value in the HEX number (whether
;                          this is the 1's,2's,4's,8's,16's nibble, etc.
;
;REGISTER USAGE:      A, B, R0-R3, R5-R6, DPTR.
;                      Flag register affected.
;
;SUPPORT MODULES:     none.
;
;SIZE:                30 hex bytes (48 decimal).
;
;EXECUTION TIME:      50 - 520 cycles typical.
;                      Dependant on size of nibble (1-F) being converted.
;
;PDL:
;              Generate offset in lookup using B, the nibble place value.
;              DO_WHILE_1 (loop count < nibble value)
;                Add in bcd equivalent of HEX nibble to result.
;              END DO_WHILE_1
;              EXIT
;
;**************************************************************************

;**************************************************************************
;
;MODULE NAME:         CADD32
;
;(c)  Copyright 1987 Teletec Corporation, U. S. A.
;
```

```
;AUTHOR:              Wm. Moore
;CODE COMPLETE:       2/23/87
;
;LAST MODIFICATION:
;PERFORMED BY:
;
;TEST/DEBUG:          2/19/87
;
;REVISION NUMBER:     1.0
;
;DESCRIPTION:         Performs 32 bit addition (with input and output carry)
;                        on 2 operands presently in registers in the current
;                        register bank.
;
;INPUTS:              R3:R2:R1:R0
;                        Contains the 1st addend for addition.
;                      R7:R6:R5:R4
;                        Contains the 2nd addend for addition.
;
;OUTPUTS:             R3:R2:R1:R0
;                        Contains the resultant sum after addition.
;
;REGISTER USAGE:      A. R0-R7. DPTR.
;                      Flag register affected.
;
;SUPPORT MODULES:     none.
;
;SIZE:                0D hex bytes (13 decimal).
;
;EXECUTION TIME:      16 cycles.
;
;PDL:
;
;            Add R4 to R0 using input carry from previous stage (if any).
;            Add R5 to R1 using input carry from previous stage.
;            Add R6 to R2 using input carry from previous stage.
;            Add R7 to R3 using input carry from previous stage.
;
;            This becomes:
;
;                   R3:R2:R1:R0     (the addend 1)
;                 + R7:R6:R5:R4     (the addend 2)
;                   -----------
;                   R3:R2:R1:R0     (the sum)
;
;            EXIT
;
;***********************************************************************

;**********************************************************************
;
;MODULE NAME: CA_CNVRT
;
;CODE COMPLETE: 06/02/86
;LAST MODIFICATION: 08/23/86
;TEST/DEBUG:
;
;REVISION NUMBER: new
;
;DESCRIPTION: This module will perform a data format conversion. One byte
;             of ascii found in the ACC on call to this routine will be
;             decoded to a data format compatible with the PCF8576 LCD
;             controller and a 14 segment alphanumeric biplexed configuration.
;
;INPUTS: ACC - contains one ascii character.
;
;OUTPUTS: R4,R5 - contain PCF8576 formatted data.
;
;REGISTER USAGE: A, DPTR, R3, R4, R5
;
;SUPPORT MODULES: none
;
;SIZE:
;
;EXECUTION TIME:
;
;PDL:   calculate table index
;       retrieve and store first byte of decoded data
;       retrieve and store second byte of decoded data
;       EXIT
;
;**********************************************************************
```

```
;***********************************************************************
;
;MODULE NAME: CALPDATA
;       (C) Copyright 1987 Teletec Corporation, U.S.A.
;AUTHOR: Ming Hsu
;CODE COMPLETE: 02/13/87
;LAST MODIFICATION: 02/13/87
;PERFORMED BY: Ming Hsu
;TEST/DEBUG:
;
;REVISION NUMBER: new
;
;DESCRIPTION: This module will contain all data for alpha display.
;
;SIZE:
;
;***********************************************************************

;***********************************************************************
;
;MODULE NAME: CALPHA
;
;CODE COMPLETE: 01/22/86
;LAST MODIFICATION: 10/06/86
;TEST/DEBUG:
;
;REVISION NUMBER: new
;
;DESCRIPTION: This module will perform an update of the alphanumeric
;             portion of the LCD display. This update will be based on
;             the contents of a buffer which is pointed to by LCD_POINTER.
;             The LCD_BUS function will be called to perform the interface
;             to the serial bus. The ALPHAFG will be cleared prior to exit
;             from this routine.
;
;INPUTS: LCD_POINTER - pointer to a buffer which contains eight characters of ascii data
;
;OUTPUTS: ALPHFG - state flag cleared upon exit of this routine.
;
;REGISTER USAGE: A, DPTR
;
;SUPPORT MODULES: LCD_BUS - performs interface to LCD serial bus.
;                 ALPHA_CNVRT - performs ascii to PCF8576 conversion.
;
;SIZE:
;
;EXECUTION TIME:
;
;PDL:   decode ascii input buffer
;       build lcd output buffer
;       set up pointer to address of output buffer
;       execute lcd interface function
;       clear alphanumeric update state flag
;       EXIT
;
;***********************************************************************

;***********************************************************************
;
;MODULE NAME: CALPHATB
;       Copyright 1987 Teletec Corporation, U.S.A.
;AUTHOR: Ming Hsu
;CODE COMPLETE: 02/06/87
;LAST MODIFICATION: 02/06/87
;PERFORMED BY: Ming Hsu
;TEST/DEBUG:
;
;REVISION NUMBER: new
;
;DESCRIPTION: This module will contain all information for channel display.
;
;SIZE:
;
;***********************************************************************

;***********************************************************************
;
;MODULE NAME: CANUNC
;
;CODE COMPLETE: 01/21/86
;LAST MODIFICATION: 10/07/86
;TEST/DEBUG:
```

```
;
;REVISION NUMBER: new
;
;DESCRIPTION: This module will perform an update of the anunciator
;             portion of the LCD display. This update will be based on
;             the contents of the ANUNCT buffer. The LCD_BUS function
;             will be called to perform the interface to the serial bus.
;             The ANUNCFG will be cleared prior to exit from this routine.
;
;INPUTS: ANUNCT - buffer which contains fourteen display ram update commands
;
;OUTPUTS: ANUNCFG - state flag; cleared upon exit of this routine.
;
;REGISTER USAGE: A, DPTR
;
;SUPPORT MODULES: LCD_BUS - performs interface to LCD serial bus.
;
;SIZE:
;
;EXECUTION TIME:
;
;PDL: retrieve current status of special anunciators
;     set up data pointer with buffer address
;     execute lcd interface function
;     clear anunciator update state flag
;     EXIT
;
;*************************************************************************
;*************************************************************************
;
;MODULE NAME: AUXUPDATE
;
;CODE COMPLETE: 03/04/86
;LAST MODIFICATION: 10/23/86
;TEST/DEBUG:
;
;REVISION NUMBER: new
;
;DESCRIPTION: This routine will execute when the AUX_FLAG state change flag
;             is active. This routine will handle turning the AUX anunciator
;             on and off. The AUX_FLAG state change flag will be cleared prior
;             to exit.
;
;INPUTS: FUNC_STAT - function status state variable.
;
;OUTPUTS: ANUNCT - updated with command for AUX anunciator.
;         ANUNCFG - set to cause update of display.
;         AUX_FLAG - cleared after process complete.
;
;REGISTER USAGE:
;
;SUPPORT MODULES: none
;
;SIZE:
;
;EXECUTION TIME:
;
;PDL:
;
;*************************************************************************
;*************************************************************************
;
;MODULE NAME: CAUX_ACT
;
;CODE COMPLETE: 07/21/86
;LAST MODIFICATION: 01/15/87
;TEST/DEBUG:
;
;REVISION NUMBER: new
;
;DESCRIPTION: The module performs all action required for the Auxiliary
;             alarm function. This routine will execute when the AUX_ACT_FG
;             state flag is active. When this function is completed the state
;             flag will be set not active. This routine will enable the
;             auxiliary function latch and also provide an auxiliary
;             momentary function. The momentary function will consist of three
;             pulses on the auxiliary function momentary output.
;
;
;INPUTS:
;
```

```
;OUTPUTS:
;
;REGISTER USAGE: A, R2, DPTR
;
;SUPPORT MODULES: none
;
;SIZE:
;
;EXECUTION TIME:
;
;PDL:    IF (REAL_CLOCK - AUX_TIMER1 > AUX_TIME1)
;           update AUX_TIMER2
;           set AUX_TIMER1 = REAL_CLOCK
;           IF (AUX_TIMER2 = AUX_TIME2)
;              complement AUX_FUN_MOM
;              update AUX_COUNTER
;              reset AUX_TIMER2
;           ENDIF
;           IF (AUX_COUNTER = AUX_COUNT)
;              clear AUX_FUN_FG
;              reset AUX_FUN_MOM
;           ENDIF
;        ENDIF
;
;***********************************************************************

;***********************************************************************
;
;MODULE NAME: BACKLITE
;
;CODE COMPLETE: 03/08/86
;LAST MODIFICATION: 03/10/86
;TEST/DEBUG:
;
;REVISION NUMBER: new
;
;DESCRIPTION: This routine will handle the key sequence for EL backlighting
;             control. This routine will have two possible entry points.
;             The first entry point will be in response to KEYINT and will be
;             at the beginning of the module. All subsequent entries will
;             be in response to KEYTIMER and entry points determined by the
;             current state of P_NEXT0 and P_NEXT1. The backighting sequence
;             is concurrent actuation of the asterick and pound keys and will
;             cause the EL backlighting to toggle on or off. All other key
;             combinations and singular actuation of asterick and pound will
;             result in illegal key action.
;
;INPUTS:
;
;OUTPUTS: P_NEXT0 - contains low order address of next entry point to this routine.
;         P_NEXT1 - contains high order address of next entry poin to this routine.
;
;REGISTER USAGE:
;
;SUPPORT MODULES: KEY_CHECK - routine that checks for new key actuations.
;                 LIGHT_ACT - routine that performs backlighting action.
;                 ILL_KEY - routine that handles illegal key action.
;                 SET_TIMER - routine that handles timer set up and interrupt routine.
;                 F_STATE - routine that handles keytimer final state.
;                 VALID_KEY - handles valid key beeper action.
;
;SIZE:
;
;EXECUTION TIME:
;
;***********************************************************************

;***********************************************************************
;
;MODULE NAME: CBEEPER
;
;CODE COMPLETE: 3/13/86
;LAST MODIFICATION: 06/19/86
;TEST/DEBUG:
;
;REVISION NUMBER: new
;
;DESCRIPTION: turn on/off the beeper
;
;INPUTS: none
;
```

```
;OUTPUTS: none
;
;REGISTERS USAGE:
;
;SUPPORT MODULES: none
;
;SIZE:
;
;EXECUTION TIME:
;
;PDL:
;       get port address
;       get port content
;       turn beeper on/off
;       write updated value to port
;
;*****************************************************************************

;***********************************************************************
;
;MODULE NAME: CH_LOAD
;
;CODE COMPLETE: 01/28/86
;LAST MODIFICATION: 03/06/86
;TEST/DEBUG:
;
;REVISION NUMBER: new
;
;DESCRIPTION: This module will execute when the channel state change flag
;             is active. The CHANNEL state variable will be used as input
;             in order to calculate the channel parameter:
;             RXSYNFREQ, RXSYNFREQ, and CTCSSRX. The following state
;             change flags will be set: TXSYNFG, RXSYNFG, and CTCSSRXFG. The
;             CHANFG state change flag will be cleared on exit from this module.
;              '(for in house test purposes)
;
;INPUTS: CHANNEL - channel state variable
;
;OUTPUTS: CHANFG - CHANNEL state change flag cleared on exit.
;         TXSYNFG - TX SYN state change flag set.
;         RXSYNFG - RX SYN state change flag set.
;         CTCSSRXFG - CTCSS RX state change flag set.
;         TXSYNFREQ - TX SYN state variable updated from channel table.
;         RXSYNFREQ - RX SYN state variable updated from channel table.
;         CTCSSRX - CTCSS RX Tone state variable updated from channel table.
;
;REGISTER USAGE: A, B, DPTR, R0, R2
;
;SUPPORT MODULES: none
;
;SIZE:
;
;EXECUTION TIME:
;
;PDL:
;
;***********************************************************************

;***********************************************************************
;
;MODULE NAME: CCHADATA
;
;CODE COMPLETE: 09/08/86
;LAST MODIFICATION: 12/20/86
;TEST/DEBUG:
;
;REVISION NUMBER: new
;
;DESCRIPTION: This module contains all data used to define channels.
;
;SIZE:
;
;***********************************************************************

;***********************************************************************
;
;       CHANNEL TABLE
;
;       1st and 2nd bytes RX SYN divide by N
;       3rd byte RX SYN divide by A
;       4th and 5th bytes TX SYN divide by N
```

```
;       represented times 64 for ease of packing
;       6th byte TX SYN divide by A
;       7th byte Channel Attribute Control
;       8th byte Default Transmit Power Setting
;       9th byte CTCSS RX tone
;       10th byte CTCSS TX tone
;
;  --------------------------------
;  | 7 | 6 | 5 | 4 | 3 | 2 | 1 | 0 |    Channel Attribute Control
;  --------------------------------
;    |   |   |   |   |   |   |   |_____ CTCSS Enable        1 = enable
;    |   |   |   |   |   |   |_________ TX Power Enable
;    |   |   |   |   |   |_____________
;    |   |   |   |   |_________________
;    |   |   |   |_____________________
;    |   |   |_________________________
;    |   |_____________________________
;    |_________________________________
;
;
;***********************************************************************

;***********************************************************************
;
;MODULE NAME:
;       Copyright 1987 Teletec Corporation, U.S.A.
;AUTHOR: Ming Hsu
;CODE COMPLETE: 01/29/87
;LAST MODIFICATION: 02/11/87
;PERFORMED BY: Ming Hsu
;TEST/DEBUG:
;
;DESCRIPTION: This module will calculate channel control byte address
;               from the channel and group input information.
;
;INPUT:
;       CH_TEMP: temporary channel number
;       GROUP: current group number
;
;OUTPUT:
;       DPTR= channel control byte 3
;REVISION NUMBER: new
;
;DESCRIPTION:
;
;SIZE:
;
;***********************************************************************

;***********************************************************************
;
;MODULE NAME: CHANNEL_UP,CHANNEL_DN
;       Copyright 1987 Teletec Corporation, U.S.A.
;AUTHOR: Ming Hsu
;CODE COMPLETE:2/7/1986
;LAST MODIFICATION: 01/28/1987
;PERFORMED BY: Ming Hsu
;TEST/DEBUG:
;
;REVISION NUMBER: new
;
;DESCRIPTION: Increase or decrease channel number.
;
;INPUTS:
;
;OUTPUTS:
;         TEMPORARY CHANNEL= CURREENT CHANNEL
;
;REGISTERS USAGE:
;
;SUPPORT MODULES:
;        KEY_CHECK,CHDISP,VALID_KEY,ILL_KEY
;
;SIZE:
;
;EXECUTION TIME:
;
;PDL:
;        set channel up/down flag
;        move current channel number to temporary locations
```

```
;       set up next entry address
;       IF multiple keys
;          THEN
;               IF channel up/down both pressed
;                  THEN display current channel
;                  ELSE
;                       illegal key
;       exit
;
;*******************************************************************************

;************************************************************************
;
;MODULE NAME: CCHDISP
;       Copyright 1987 Teletec Corporation, U.S.A.
;AUTHOR: Ming Hsu
;CODE COMPLETE: 02/14/86
;LAST MODIFICATION: 02/23/87
;PERFORMED BY: Ming Hsu
;TEST/DEBUG:
;
;REVISION NUMBER: new
;
;DESCRIPTION: This routine will display temporary channel number in LCD.
;             All digits will be converted from hex to ascii in order to
;             be displayed.
;
;INPUTS: CH_TEMP - temporary channel number.
;
;OUTPUTS: none
;
;REGISTERS USAGE: A, B, DPTR, PSW, R0, R1, R2, R3, R4, R5
;
;SUPPORT MODULES: none
;
;SIZE:
;
;EXECUTION TIME:
;
;PDL:
;       IF alphanumerical display enable
;               THEN get channel alphanumerical message
;                    move channel message to LCD display buffer
;       END_IF
;       IF more than 1 group defined
;               THEN
;                       IF voting group
;                               THEN move message "Vnn C" to LCD buffer
;                               ELSE move message "Gxx C" to LCD buffer
;                       END_IF
;               ELSE
;                       IF voting group
;                               THEN move message "VOT C" to LCD buffer
;                               ELSE move message "CH   " to LCD buffer
;                       END_IF
;       END_IF
;       get temporary channel number
;       convert to ASCII
;       move to LCD display buffer
;       set up display update flag
;       exit
;
;************************************************************************
;*******************************************************************************
;
;MODULE NAME: CCHINOUT
;       (C)Copyright 1987 Teletec Corporation, U.S.A.
;AUTHOR: Ming Hsu
;CODE COMPLETE: 02/18/87
;LAST MODIFICATION: 02/18/87
;PERFORMED BY: Ming Hsu
;TEST/DEBUG:
;
;REVISION NUMBER: new
;
;DESCRIPTION: This module set up PCM command message for CHANNEL SET/REMOVE.
;
;INPUTS:
;
;OUTPUTS:
```

```
;
;REGISTER USAGE:
;
;SUPPORT MODULES:
;               PREP_MESS
;SIZE:
;
;EXECUTION TIME:
;
;PDL:
;       IF (TX BUFFER FULL)
;          THEN EXIT
;          ELSE
;               load message starting address
;               load number of byte to be sent
;               execute message preparation
;               clear action flag
;       exit
;
;*****************************************************************************

;*****************************************************************************
;
;MODULE NAME: CCK_CHAN
;
;CODE COMPLETE: 03/14/86
;LAST MODIFICATION: 10/07/86
;TEST/DEBUG:
;
;REVISION NUMBER: new
;
;DESCRIPTION: This module checks the channel number upper limit.
;
;INPUTS: (R0)= first byte of channel number needs to be check
;        (R0+1)= second byte of channel number needs to be check
;
;OUTPUTS: ACC = 0 channel number under limit
;         ACC not equal to zero, channel number over maximum limit
;
;REGISTERS USAGE: A, DPTR, R0
;
;SUPPORT MODULES: none
;
;SIZE:
;
;EXECUTION TIME:
;
;PDL:
;
;*****************************************************************************

;**********************************************************************
;
;MODULE NAME: CCM_DISP
;
;CODE COMPLETE: 07/10/86
;LAST MODIFICATION: 12/17/86
;TEST/DEBUG:
;
;REVISION NUMBER: new
;
;DESCRIPTION: This module will handle the reception of messages from the
;             RFU other than ACK's and NAK's. These messages will be stored
;             and program control will be dispatched to the appropriate
;             command processor for action. A checksum will be calculated
;             on the incoming message and bad messages will result in the
;             original CU command being re-transmitted.
;
;INPUTS:
;
;OUTPUTS:
;
;REGISTER USAGE:
;
;SUPPORT MODULES: CTX_SAME - handles re-transmission of previaous message.
;
;SIZE:
;
;EXECUTION TIME:
;
```

```
;PDL:   IF ( REAL_CLOCK - RX_TIMER - RX_TIMEOUT > 1 )
;          retransmit
;       ELSE
;          A = number of bytes received
;          B = number of bytes expected
;          A : B
;          IF (all bytes are here)
;             calculate checksum
;             IF (checksum bad)
;               retransmit
;             ELSE
;               dispatch program to message handler
;               reset message function
;             ENDIF
;          ENDIF
;       ENDIF
;       EXIT
;
;*************************************************************************

;*************************************************************************
;
;MODULE NAME: CCM_HLTH
;
;CODE COMPLETE: 08/26/86
;LAST MODIFICATION: 01/21/87
;TEST/DEBUG:
;
;REVISION NUMBER: new
;
;DESCRIPTION: This module takes the received health byte and put in HEALTH
;                bits
;
;INPUTS: HEALTH STATUS from RFU
;
;OUTPUTS:
;
;REGISTER USAGE: A, DPTR
;
;SUPPORT MODULES: none
;
;SIZE:
;
;EXECUTION TIME:
;
;
;*************************************************************************

;*************************************************************************
;
;MODULE NAME: CCM_SCAN
;
;CODE COMPLETE: 08/29/86
;LAST MODIFICATION: 08/30/86
;TEST/DEBUG:
;
;REVISION NUMBER: new
;
;DESCRIPTION: This module is responsible for handling the scan status
;              response from the rf unit. Also the old scan status will
;              updated with current scan status prior to updating the
;              current scan status with the rfu response. Well, did you
;              get that? huh?
;
;INPUTS: RX_BEG - pcm receive buffer.
;        SCAN_STATUS - current scan status.
;
;OUTPUTS: SCAN_STATUS - updated with new data from RFU.
;         OLD_SCNSTAT - updated from current scan status.
;
;REGISTER USAGE: A, DPTR
;
;SUPPORT MODULES: none
;
;SIZE:
;
;EXECUTION TIME:
;
;PDL:
;
;*************************************************************************
```

```
;*********************************************************************
;
;MODULE NAME: CCM_STCK
;       (C) Copyright 1987 Teletec Corporation, U.S.A.
;AUTHOR: Ming Hsu
;CODE COMPLETE: 08/26/86
;LAST MODIFICATION: 03/03/87
;PERFORMED BY: Ming Hsu
;TEST/DEBUG:
;
;REVISION NUMBER: new
;
;DESCRIPTION: This module takes the received STATE TABLE CHECK SUM byte and
;                compare to the calculated check sum in CU
;
;INPUTS: HEALTH STATUS from RFU
;
;OUTPUTS:
;
;REGISTER USAGE: A, DPTR
;
;SUPPORT MODULES: none
;
;SIZE:
;
;EXECUTION TIME:
;
;
;*********************************************************************

;*********************************************************************
;
;MODULE NAME: CCNUMBER
;       (C) Copyright 1987 Teletec Corporation, U.S.A.
;AUTHOR: Ming Hsu
;CODE COMPLETE: 02/05/87
;LAST MODIFICATION: 02/18/87
;PERFORMED BY: Ming Hsu
;TEST/DEBUG:
;
;REVISION NUMBER:
;
;DESCRIPTION: This routine handles the key sequences used to support
;              user channel selection.
;
;INPUTS:
;
;OUTPUTS:
;
;REGISTERS USAGE:
;
;SUPPORT MODULES:
;
;SIZE:
;
;EXECUTION TIME:
;
;PDL:
;
;*****************************************************************************

;*********************************************************************
;
;MODULE NAME: CCONST
;       (C) COPYRIGHT 1987 Teletec Corporation, U.S.A.
;AUTHER:
;CODE COMPLETE: 01/16/86
;LAST MODIFICATION: 02/18/87
;PERFORMED BY: MING C. HSU
;TEST/DEBUG:
;
;REVISION NUMBER: new
;
;DESCRIPTION: This module contains the definitions for all rom based
;              constants used in the IQ-1000 control unit design.
;              This includes look up tables, memory mapped I/O, and
;              other hardware constants.
;
;                           TABLE OF CONTENTS
;               item                                              page
;
```

```
;       Header                                                  1
;       Public Declarations                                     2
;       Memory Mapped I/O Addresses                             3
;       RFU Serial Bus Addresses                                3
;       Initialization Constants                                4
;       Timer Constants                                         4
;       8255 0 Port Definitions                                 5
;       8255 1 Port Definitions                                 6-7
;       8255 2 Port Definitions                                 6-7
;       8255 3 Port Definitions                                 6-7
;       8255 4 Port Definitions                                 6-7
;       Volume DAC Table                                        11
;
;SIZE:
;
;************************************************************************

;************************************************************************
;
;MODULE NAME: CCTCSSRX
;
;CODE COMPLETE: 01/28/86
;LAST MODIFICATION: 06/27/86
;TEST/DEBUG:
;
;REVISION NUMBER: new
;
;DESCRIPTION: This module will update the CTCSS module with a new decode
;             tone. The CTCSS RX state change flag will be cleared on exit
;             from this routine.
;
;INPUTS: CTCSSRX - CTCSS decode tone state variable.
;
;OUTPUTS: CTCSSRXFG - state change flag cleared when function complete.
;
;REGISTER USAGE: RO, DPTR, A
;
;SUPPORT MODULES: MESS_PREP - rf unit message preparation routine.
;
;SIZE:
;
;EXECUTION TIME:
;
;PDL:   IF (TX_EMPTY=0)
;         retrieve ctcss decode tone from state table
;         execute rf unit message preparation routine
;         clear ctcss decode state change flag
;       ENDIF
;       EXIT
;
;************************************************************************

;************************************************************************
;
;MODULE NAME: CCTCSSTX
;
;CODE COMPLETE: 02/12/86
;LAST MODIFICATION: 06/27/86
;TEST/DEBUG:
;
;REVISION NUMBER: new
;
;DESCRIPTION: This module will update the CTCSS module with a new encode
;             tone. The CTCSS ENCODE state change flag will be cleared on
;             exit from this routine.
;
;INPUTS: CTCSSTX - CTCSS encode tone state variable.
;
;OUTPUTS: CTCSSRXFG - state change flag cleared when function complete.
;
;REGISTER USAGE: RO, DPTR, A
;
;SUPPORT MODULES: MESS_PREP - routine that handles rf unit message preparation.
;
;SIZE:
;
;EXECUTION TIME:
;
;PDL:   IF (TX_EMPTY=0)
;         retrieve ctcss encode tone from state table
```

```
;         execute message preparation function
;         clear ctcss encode state change flag
;       ENDIF
;       EXIT
;
;*************************************************************************

;*************************************************************************
;
;MODULE NAME: CCUPDATE
;       (C) Copyright 1987 Teletec Corporation, U.S.A.
;AUTHOR: Ming Hsu
;CODE COMPLETE: 01/28/86
;LAST MODIFICATION: 03/02/87
;PERFORMED BY: Ming Hsu
;TEST/DEBUG:
;
;REVISION NUMBER: new
;
;DESCRIPTION: This module will execute when the channel state change flag
;             is active. The CHANNEL state variable will be used as input
;             inorder to access the channel table. This module will use data
;             from the channel table to update the following state variables:
;             RXSYNFREQ, RXSYNFREQ, and CTCSSRX. The following state
;             change flags will be set: TXSYNFG, RXSYNFG, and CTCSSRXFG. The
;             CHANFG state change flag will be cleared on exit from this module.
;
;
;INPUTS: CHANNEL - channel state variable
;                  valid range 1 to 512
;
;OUTPUTS: CHANFG - CHANNEL state change flag cleared on exit.
;         TXSYNFREQ - TX SYN state variable updated from channel table.
;         RXSYNFREQ - RX SYN state variable updated from channel table.
;         CTCSSRX - CTCSS RX Tone state variable updated from channel table.
;         CTCSSTX - CTCSS TX Tone state variable updated from channel table.
;         SCAN_STATUS - scan status set to manual channel.
;         OLD_SCNSTAT - old scan status set to manual channel.
;
;REGISTER USAGE: A, B, DPTR, RO, R2
;
;SUPPORT MODULES: none
;
;SIZE:
;
;EXECUTION TIME:
;
;PDL:   calculate index to channel table
;       retrieve channel attributes from table
;       update state table with channel attributes
;       clear channel state change flag
;       set up PCM command message to be sent to RFU
;       EXIT
;
;*************************************************************************

;*************************************************************************
;
;MODULE NAME: CDSP_SPR
;       (C) Copyright 1987 Teletec Corporation, U.S.A.
;AUTHOR:Ming Hsu
;CODE COMPLETE: 02/12/87
;LAST MODIFICATION: 02/12/87
;PERFORMED BY: Ming Hsu
;TEST/DEBUG:
;
;REVISION NUMBER: new
;
;DESCRIPTION:
;             This module will be responsible for timing the scan status
;             request from the RFU and managing the front panel display.
;
;INPUTS: SCAN_STATUS - current status of the receiver.
;
;OUTPUTS:
;
;REGISTER USAGE:
;
;SUPPORT MODULES: CHDISP - updates alpha display based on channel state variable.
;                 MESSLOADER - updates alpha display based on ALPHAT buffer.
;
```

```
;SIZE:
;
;EXECUTION TIME:
;
;*************************************************************************

;*************************************************************************
;
;PDL:   check elasped time since last scan status request
;       IF (time to request scan status from rfu)
;          set SCN_STAT_FG active
;          record time of status request
;       ENDIF
;       compare last scan status with current scan status
;       IF (there is a change in scan status)
;          CASE
;                      CASE1 (guard channel is active)
;                         display guard channel message
;                      CASE2 (manual channel is active)
;                         display the manual channel
;                      CASE3 (a channel is active)
;                         display the correct channel number
;          ENDCASE
;       ENDIF
;       EXIT
;
;*************************************************************************

;*************************************************************************
;
;MODULE NAME: CEEROM
;
:CODE COMPLETE: 09/05/86
;LAST MODIFICATION: 10/02/86
;TEST/DEBUG:
;
;REVISION NUMBER: new
;
;DESCRIPTION: This module updates EEROM data
;
;INPUTS: EEROMBUFFER
;                first byte= number of bytes to be update
;                2 bytes location
;                1 byte data
;                and so on
;OUTPUTS:
;
;REGISTER USAGE:
;
;SUPPORT MODULES:
;
;SIZE:
;
;EXECUTION TIME:
;
;PDL:
;       IF EEROM_ERASE = 1
;          THEN check erase cycle time out
;               IF erase cycle time out
;                  THEN start write cycle
;                  ELSE exit
;          ELSE
;               IF EEROM_WRITE = 1
;                  THEN check write cycle time out
;                       IF write cycle time out
;                          THEN issue a read command
;                               start next erase cycle
;                          ELSE
;                               EXIT
;                  ELSE start erase cycle
;
;*************************************************************************

;*************************************************************************
;
;MODULE NAME: CEEROM
;       (C) Copyright 1987 Teletec Corporation, U.S.A.
;AUTHOR: Ming Hsu
;CODE COMPLETE: 09/05/86
;LAST MODIFICATION: 02/24/87
```

```
;PERFORMED BY: Ming Hsu
;TEST/DEBUG:
;
;REVISION NUMBER: new
;
;DESCRIPTION: This module updates EEROM data
;
;INPUTS:
;        EEROM_B_CNT= number of bytes to be update
;        EEROM_D_PNT= (EEROM destination address )
;        EEROM_S_PNT= (source data address)
;OUTPUTS:
;
;REGISTER USAGE:
;
;SUPPORT MODULES: CEETIMER
;
;SIZE:
;
;EXECUTION TIME:
;
;PDL:
;       IF EEROM_ERASE = 1
;          THEN check erase cycle time out
;               IF erase cycle time out
;                  THEN start write cycle
;                  ELSE exit
;               ENDIF
;          ELSE
;               IF EEROM_WRITE = 1
;                  THEN check write cycle time out
;                       IF write cycle time out
;                          THEN issue a read command
;                               start next erase cycle
;                          ELSE
;                               EXIT
;                       ENDIF
;                  ELSE start erase cycle
;               ENDIF
;       ENDIF
;**********************************************************************

;**********************************************************************
;
;MODULE NAME: CEETIMER
;
;CODE COMPLETE: 10/02/86
;LAST MODIFICATION: 10/02/86
;TEST/DEBUG:
;
;REVISION NUMBER: new
;
;DESCRIPTION: This module times the eeprom erase cycle time.
;
;INPUTS: none
;
;OUTPUTS: Carry - 1 = time not expired
;                 0 = time expired
;
;REGISTER USAGE: A, DPTR, R1
;
;SUPPORT MODULES: none
;
;SIZE:
;
;EXECUTION TIME:
;
;PDL:
;
;**********************************************************************

;**********************************************************************
;
;MODULE NAME: ERR_DISP
;
;CODE COMPLETE: 3/12/1986
;LAST MODIFICATION: 11/24/1986
;TEST/DEBUG:
;
;REVISION NUMBER: new
;
```

```
;DESCRIPTION: This module display the error message
;
;INPUTS:
;
;OUTPUTS:
;
;REGISTERS USAGE:
;
;SUPPORT MODULES:
;
;SIZE:
;
;EXECUTION TIME:
;
;PDL:
;
;
;
;
;******************************************************************************

;*************************************************************************
;
;MODULE NAME: CERROR_KEY
;
;CODE COMPLETE: 09/04/86
;LAST MODIFICATION: 09/04/86
;TEST/DEBUG:
;
;REVISION NUMBER: new
;
;DESCRIPTION: This module handles error key sequence without reset next address
;
;INPUTS:
;
;OUTPUTS:
;
;REGISTER USAGE:
;
;SUPPORT MODULES:
;
;SIZE:
;
;EXECUTION TIME:
;
;PDL:
;
;*************************************************************************

;*************************************************************************
;
;MODULE NAME: CEXEC
;       (C) Copyright 1987 Teletec Corporation, U.S.A.
;AUTHOR: Ming Hsu
;CODE COMPLETE: 01/21/86
;LAST MODIFICATION: 02/24/87
;PERFORMED BY: Ming Hsu
;TEST/DEBUG:
;
;REVISION NUMBER: new
;
;DESCRIPTION: This is module is the executive routine for the receive mode
;             of the IQ-1000 Control Unit prototype. This routine will
;             examine state flags and dispatch to control to the appropriate
;             function update routines.
;
;INPUTS: none
;
;OUTPUTS: none
;
;REGISTER USAGE: none
;
;SUPPORT MODULES: VOLUPDATE - volume update function
;                 ALPHAUPDATE - alphanumeric display update function
;                 ANUNCUPDATE - anunciator display update function
;                 CCUPDATE - channel update function
;                 TXREFUPDATE - transmit synthesizer reference update function
;                 SNSQUPDATE - user squelch update function
;                 CTCSSUPDATE - ctcss update function
;                 HEALTHCHECK - system health monitor function
```

```
;                 POWERUPDATE - transmit power update function
;                 PAUPDATE - public address update function
;                 PRIUPDATE - privacy update function
;                 MODEUPDATE - channeling mode update function
;                 FONUPDATE - phone update function
;                 AUXUPDATE - auxiliary update function
;                 PRI_SCAN - channel scanning function
;
;*************************************************************************

;*************************************************************************
;
;SUPPORT MODULES: RXREFUPDATE - receiver reference frequency update function
;                 TX_ACTION - handles RFU message responses.
;                 CM_DISP - dispatches rfu message responses.
;                 CAUX_ACT - handles auxiliary function action.
;                 CGRP_ACT - handles group function action.
;                 CPD_ACT - handles power down action.
;                 CTCSSENCODE - updates ctcss transmit tone.
;                 CSCN_CMD - handles scan status requests.
;
;SIZE: 3AH
;
;EXECUTION TIME:
;
;PDL: DOLOOP
;        IF (VOLFG=1)
;        THEN execute volume update function
;        IF (ALPHAFG=1)
;        THEN execute alphanumeric update function
;        IF (ANUNCFG=1)
;        THEN execute anunciator update function
;        IF (MOD_FLAG=1)
;        THEN channeling mode update function
;        IF (CHANFG=1)
;        THEN execute channel update function
;        IF (SNSQFG=1)
;        THEN execute user squelch update function
;        IF (CTCSSRXFG=1)
;        THEN execute ctcss receive update function
;        IF (CTCSSTXFG=1)
;        THEN execute ctcss transmit update function
;        IF (PA_FLAG=1)
;        THEN public address update function
;        IF (PRI_FLAG=1)
;        THEN privacy update function
;        IF (AUX_FLAG=1)
;        THEN auxiliary update function
;
;*************************************************************************

;*************************************************************************
;
;PDL continued:
;
;        IF (FON_FLAG=1)
;        THEN phone update function
;        IF (AUX_ACT_FG=1)
;        THEN execute auxiliary action function
;        IF (GRP_ACT_FG=1)
;        THEN execute group action function
;        IF (TX_EMPTY=1)
;        THEN execute transmit action function
;        IF (DISPATCH_FG=1)
;        THEN execute message dispatch function
;        IF (PWR_DN_FG=1)
;        THEN execute power down function
;        IF (SCN_STAT_FG=1)
;        THEN execute scan status request function
;        IF (HEALTH_FG=1)
;        THEN execute health check command
;        execute channel scanning function
;        execute health monitor function
;        IF (CHANGEMODE=1)
;        THEN execute exec state transition routine
;     ENDLOOP
;
;*************************************************************************
```

```
;************************************************************************
;
;MODULE NAME: CEXSTATE
;
;CODE COMPLETE: 12/21/86
;LAST MODIFICATION: 12/28/86
;TEST/DEBUG:
;
;REVISION NUMBER: new
;
;DESCRIPTION: This routine will execute in response to the CHANGEMODE
;             state flag being active. This routine will perform a
;             dispatch function based on the current exec mode and
;             several other inputs.
;
;INPUTS: TXMODEFG - transmit mode state flag.
;        RXMODEFG - receive mode state flag.
;        OFFHOOKFG - mic off hook state flag.
;        RADIO_STAT - radio function status state variable.
;
;OUTPUTS: CHANGEMODE - flag is cleared after exec state transition.
;
;REGISTER USAGE: A, B, DPTR
;
;SUPPORT MODULES: CRX2OFF -  receive to off hook state transition routine.
;                 COFF2TX - off hook to transmit state transition routine.
;                 COFF2RX - off hook to receive state transition routine.
;                 CTX2OFF - transmit to off hook state transition routine.
;                 CTX2RX - transmit to receive state transition routine
;                 CRX2TX - receive to off hook state transition routine.
;
;SIZE:
;
;EXECUTION TIME:
;
;************************************************************************

;************************************************************************
;
;PDL:    DOCASE1 ( current exec state )
;          CASE ( RXMODEFG=1 )
;            DOCASE2 ( requested exec state )
;              CASE ( mic is off hook )
;                   execute CRX2OFF state transition function
;              ENDCASE
;              CASE ( send function initiated )
;                   execute CRX2TX state transition function
;              ENDCASE
;            ENDDOCASE2
;          CASE ( TXMODEFG=1 )
;            DOCASE3 ( requested exec state )
;              CASE ( mic on hook )
;                   execute CTX2RX state transition function
;              ENDCASE
;              CASE ( mic off hook )
;                   execute CTX2OFF state transition function
;              ENDCASE
;            ENDDOCASE3
;          ENDCASE
;          CASE ( OFFHOOKFG=1 )
;            DOCASE4 ( requested exec state )
;              CASE ( mic on hook )
;                   execute COFF2RX state transition routine
;              ENDCASE
;              CASE ( a transmission has been initiated )
;                   execute COFF2TX state transition routine
;              ENDCASE
;            ENDDOCASE4
;          ENDCASE
;        ENDDOCASE1
;        clear CHANGEMODE exec action flag
;        EXIT
;
;************************************************************************

;************************************************************************
;
;MODULE NAME: EXTRAMTST
;
;CODE COMPLETE:
;LAST MODIFICATION: 2/13/1986
```

```
;TEST/DEBUG:
;
;REVISION NUMBER: new
;
;DESCRIPTION: test system external RAM
;
;INPUTS: none
;
;OUTPUTS:
;
;REGISTERS USAGE: R0,R1,R2,DPTR
;
;SUPPORT MODULES: none
;
;SIZE:
;
;EXECUTION TIME:
;
;PDL:
;       write increasing number to RAM location
;       read back and compare
;       IF not compare
;          THEN set RAM error flag and exit
;       write 01010101 to all the external RAM
;       read back and compare
;       IF not compare
;          THEN set RAM error flag and exit
;       write 10101010 to all the external RAM
;       read back and compare
;       IF not compare
;          THEN set RAM error flag and exit
;       clear all the external RAM
;       exit
;
;******************************************************************************

;************************************************************************
;
;MODULE NAME: CGRP_ACT
;       Copyright 1987 Teletec Corporation, U.S.A.
;AUTHOR: Ming Hsu
;CODE COMPLETE: 07/23/86
;LAST MODIFICATION: 02/27/87
;PERFORMED BY: Ming Hsu
;TEST/DEBUG:
;
;REVISION NUMBER: new
;
;DESCRIPTION: This module will execute whenever the GROUP_FLAG state change
;             flag is active. This module will be responsible for building
;             and transmitting all messages necessary to download all data
;             to the RFU to complete a scan group update. The messages will
;             be built by using the group number as an index to the group
;             table. The group table contains numbers of each channel in the
;             selected group and the priority of each channel. These channel
;             numbers will be used to index the channel table in order to
;             extract the receive synthesizer A's and N's. These A's and
;             N's will be packed with the priority byte and transmitted to
;             the RF Unit.
;
;INPUTS: GROUP - current group number.
;
;OUTPUTS: GRP_ACT_FG - state change flag cleared upon process completion.
;
;REGISTER USAGE: A, B, DPTR, R0, R1, R2, R3, R4, R6, R7
;
;SUPPORT MODULES: PREP_MESS - message preparation function.
;                 CRX_CHAN - rx syn data retrieval function.
;
;SIZE:
;EXECUTION TIME:
;
;************************************************************************

;************************************************************************
;
;
;PDL:   IF (TX_EMPTY=0)
;         IF (GRP_MES_CNT=0)
;            retrieve group state variable
```

```
;            initialize group table index
;            access group table
;            initialize group message counter
;            extract channel data from group table
;            build current group table
;            build group priority message
;            execute PREP_MESS function
;         ELSE
;            build group channel message
;            update group message count
;            update group table index
;            IF (GRP_MES_CNT=0)
;               clear GRP_ACT_FG state change flag
;            ENDIF
;         ENDIF
;       ENDIF
;       EXIT
;
;*************************************************************************

;*************************************************************************
;
;MODULE NAME: CGRPDATA
;       Copyright 1987 Teletec Corporation, U.S.A.
;AUTHOR: Ming Hsu
;CODE COMPLETE: 09/09/86
;LAST MODIFICATION: 02/05/87
;PERFORMED BY: Ming Hsu
;TEST/DEBUG:
;
;REVISION NUMBER: new
;
;DESCRIPTION: This module will contain all constants required for group
;             data definitions.
;
;             NOTE: Priority channels are numbered with respect to that group.
;             Channel numbers are from channel table.
;
;SIZE:
;
;*************************************************************************

;*************************************************************************
;
;MODULE NAME: CGRPMOVE
;       (C) Copyright 1987 Teletec Corporation, U.S.A.
;AUTHOR: Ming Hsu
;CODE COMPLETE: 02/09/87
;LAST MODIFICATION: 02/09/87
;PERFORMED BY: Ming Hsu
;TEST/DEBUG:
;
;REVISION NUMBER: new
;
;DESCRIPTION: This module will move group data from EEPROM to group
;             table.
;
;INPUTS:
;        GROUP- current group number.
;
;OUTPUTS:
;        group table
;
;REGISTER USAGE:
;
;SUPPORT MODULES:
;
;SIZE:
;
;EXECUTION TIME:
;
;*************************************************************************

;*****************************************************************************
;
;MODULE NAME: HEALTH_CMD
;
;CODE COMPLETE: 08/08/86
;LAST MODIFICATION: 10/10/86
;TEST/DEBUG:
;
```

```
;REVISION NUMBER: new
;
;DESCRIPTION: This module set up message for HEALTH STATUS update.
;
;INPUTS:
;
;OUTPUTS:
;
;REGISTER USAGE:
;
;SUPPORT MODULES:
;
;SIZE:
;
;EXECUTION TIME:
;
;PDL:
;
;***************************************************************************

;***********************************************************************
;
;MODULE NAME: HEALTHCHECK
;
;CODE COMPLETE: 02/14/86
;LAST MODIFICATION: 01/21/87
;TEST/DEBUG:
;
;REVISION NUMBER: new
;
;DESCRIPTION: This module will monitor the health of the radio system and
;             notify the operator should a health failure be detected. When
;             a failure is detected a message will be displayed on in the
;             alphanumeric portion of the LCD display. This message will be
;             displayed until the user responds by pressing any key.
;             The following system components will be monitored for health:
;             LCD, internal RAM, external RAM, ROM checksum, receiver,
;             receiver synthesizer, transmitter, transmit synthesizer, and
;             the CTCSS module.
;
;INPUTS:
;        INTRAMHLTH - internal RAM health state flag
;        EXTRAMHLTH - external RAM health state flag
;        ROMHEALTH - ROM health state flag
;        LCDHEALTH - LCD health state flag
;        CTCSSHLTH - CTCSS health state flag
;        RXHEALTH - receiver health state flag
;        TXHEALTH - transmitter health state flag
;        RXSYNHLTH - receiver synthesizer health state flag
;        TXSYNHLTH - transmit synthesizer health state flag
;        REXTRAMHLTH - RFU external RAM health state flag
;        ROMHEALTH - RFU ROM checksum health state flag
;        RINTRAMHLTH - RFU internal RAM health state flag
;        ANTHEALTH - antenna health flag
;        SEQHEALTH - sequential health state flag
;        AUDIOHEALTH - audio health state flag
;        DTMFHEALTH - DTMF health state flag
;        VPHEALTH - VOICE PRIVACY health state flag
;        MODHEALTH - MODULATION health state flag
;
;OUTPUTS: ERR_CODE - three bytes ascii error code to be displayed.
;
;REGISTER USAGE: R1,DPTR
;
;SUPPORT MODULES: none
;
;SIZE:
;
;EXECUTION TIME:
;
;***********************************************************************

;***********************************************************************
;
;MODULE NAME: INTRAMTST
;
;CODE COMPLETE:
;LAST MODIFICATION: 2/14/1986
;TEST/DEBUG:
;
```

```
;REVISION NUMBER: new
;
;DESCRIPTION: test 8051 internal RAM
;
;INPUTS: none
;
;OUTPUTS:
;
;REGISTERS USAGE:
;
;SUPPORT MODULES: none
;
;SIZE:
;
;EXECUTION TIME:
;
;PDL:
;       test first 3 internal RAM locations
;       IF error
;           THEN set internal RAM error flag and exit
;       test rest of the internal RAM with increasing number
;       IF error detected
;           THEN set internal RAM error flag and exit
;       test internal RAM with pattern 01010101
;       IF error detected
;           THEN set internal RAM error flag and exit
;       test internal RAM with pattern 10101010
;       IF error detected
;           THEN set internal RAM error flag and exit
;       exit
;
;*****************************************************************************

;**********************************************************************
;
;MODULE NAME: CINTZERO
;
;CODE COMPLETE: 05/08/86
;LAST MODIFICATION: 07/08/86
;TEST/DEBUG:
;
;REVISION NUMBER: new
;
;DESCRIPTION: This module performs a dispatch function for the external
;             interrupt zero. Determination will be made as to whether
;             interrupt occured due to a PCM transmit command and PCM receive
;             command, and control will be passed to an appropriate handler.
;             This module will handle termination of the interrupt once the
;             handler completes processing.
;
;INPUTS:
;
;OUTPUTS:
;
;REGISTER USAGE:
;
;SUPPORT MODULES: RX_COMMAND - pcm receive data handler.
;                 TX_COMMAND - pcm transmit data handler.
;
;SIZE:
;
;EXECUTION TIME:
;
;PDL:
;
;**********************************************************************

;**********************************************************************
;
;MODULE NAME: CLCD_BUS
;
;CODE COMPLETE: 01/21/86
;LAST MODIFICATION: 08/22/86
;TEST/DEBUG:
;
;REVISION NUMBER: new
;
;DESCRIPTION: This module takes care of the LCD serial interface. This
;             module will output data on 8031 PORT3.5 (LCD_SDA) and
;             alternates 8031 PORT3.4 (LCD_SCL) to generate a clock signal.
;             This module will monitor LCD_SCL inbetween data bytes before
```

```
;               transmitting the next data byte. The data length can be from
;               1 to 32 bytes. It will be assumed that data will be in PCF8576
;               format. Each byte will be sent MSBit first.
;
;
;INPUTS: DPTR - contains external RAM address of output data buffer that
;                 contains up to 32 bytes.
;
;         (DPTR)+0 - 1st byte in data buffer contains the number of bytes of
;                     data to be written. Valid range is 1 to 32.
;
;OUTPUTS: none
;
;REGISTER USAGE: DPTR, R0, R1, A
;
;SUPPORT MODULES: none
;
;SIZE:
;
;EXECUTION TIME:
;
;*************************************************************************

;*************************************************************************
;
;PDL:    extract number of bytes from buffer
;        controller start sequence
;        DOUNTIL (all data in buffer is written)
;          IF (controller is busy)
;             wait
;          ENDIF
;          write data out one bit at a time
;          decrement byte count
;          wait for byte acknowledge
;          increment buffer pointer
;        ENDDO
;        controller stop sequence
;        set clock and data line inactive
;        EXIT
;
;*************************************************************************

;*************************************************************************
;
;MODULE NAME: CLCD_CON
;       (C) Copyright 1987 Teletec Corporation, U.S.A.
;AUTHOR: Ming Hsu
;CODE COMPLETE: 08/01/86
;LAST MODIFICATION: 02/13/87
;PERFORMED BY: Ming Hsu
;TEST/DEBUG:
;
;REVISION NUMBER: new
;
;DESCRIPTION: ALL CONSTANT DEFINITION FOR LCD
;
;INPUTS:
;
;OUTPUTS:
;
;REGISTER USAGE:
;
;SUPPORT MODULES:
;
;SIZE:
;
;EXECUTION TIME:
;
;PDL:
;
;*************************************************************************

;*************************************************************************
;
;MODULE NAME: CLCDINIT
;
;CODE COMPLETE: 01/22/86
;LAST MODIFICATION: 01/08/87
;TEST/DEBUG:
;
```

```
;REVISION NUMBER:
;
;DESCRIPTION - This module will initialize both of the PCF8576
;              LCD controllers. In both controllers blinking RAM will
;              be disabled, multiplexing will be 1 : 2, and LCD bias
;              will be in a 1/2 bias voltage configuration.
;
;
;INPUTS:LCDCMDS - table of commands for initialization.
;       INITCOUNT - number of commands in LCDCMDS table.
;
;OUTPUTS:none
;
;REGISTER USAGE: R0, R1, A, DPTR
;
;SUPPORT MODULES:LCD_BUS - handles serial bus interface to LCD controllers
;
;SIZE:
;
;EXECUTION TIME:
;
;PDL: write number of bytes to write into buffer
;     set up pointers to output buffer and command table
;     write table contents into output buffer
;     execute LCD_BUS function
;     EXIT
;
;**********************************************************************

;**********************************************************************
;
;MODULE NAME: CLIGHT_ACT
;
;CODE COMPLETE: 03/08/86
;LAST MODIFICATION: 06/18/86
;TEST/DEBUG:
;
;REVISION NUMBER: new
;
;DESCRIPTION: This routine will handle the action necessary for toggling
;             the EL backlighting on and off.
;
;INPUTS: LIGHT_STAT - indicates current state of backlighting.
;
;OUTPUTS: LIGHT_STAT - set or cleared to indicate new state.
;
;REGISTER USAGE: A, DPTR
;
;SUPPORT MODULES: none
;
;SIZE:
;
;EXECUTION TIME:
;
;PDL:   IF (LIGHT_STAT=1)
;       THEN
;            turn lights off
;            clear LIGHT_STAT
;       ELSE
;            turn lights on
;            set LIGHT_STAT
;       EXIT
;
;**********************************************************************

;**********************************************************************
;
;MODULE NAME: MESS_DISP
;
;CODE COMPLETE: 03/11/86
;LAST MODIFICATION: 10/07/86
;TEST/DEBUG:
;
;REVISION NUMBER: new
;
;DESCRIPTION: This routine transfers message to LCD alternate buffer
;
;INPUTS: R1= number of bytes need to be transfer
;
;OUTPUTS: display message in LCD alternate buffer
;
```

```
;REGISTERS USAGE: RO, R1, ACC, DPTR
;
;SUPPORT MODULES: none
;
;SIZE:
;
;EXECUTION TIME:
;
;PDL:
;       load alternate LCD buffer pointer
;       move message to the buffer
;       repeat until finish
;
;*****************************************************************************

;*************************************************************************
;
;MODULE NAME: MESSLOADER
;
;CODE COMPLETE: 01/24/86
;LAST MODIFICATION: 10/07/86
;TEST/DEBUG:
;
;REVISION NUMBER: new
;
;DESCRIPTION: This module will load the ALPHAT buffer with ascii data that
;             is pointed to by the address that is found in the DPTR. The
;             first byte pointed to is assumed to be the number of ascii
;             characters to be moved to the buffer.
;
;INPUTS: DPTR - contains address of ascii data to be moved to ALPHAT buffer.
;
;OUTPUTS: ALPHAFG - will be set in order to cause display update.
;         LCD_POINTER - will contain address of ALPHAT as input to ALPHAUPDATE.
;
;REGISTER USAGE: DPTR, A, RO, R2
;
;SUPPORT MODULES: none
;
;SIZE:
;
;EXECUTION TIME:
;
;PDL:   retrieve ascii data from program memory
;       write ascii data to alpha buffer in state table
;       set alpha state change flag active
;       EXIT
;
;*************************************************************************

;*************************************************************************
;
;MODULE NAME: CMISDATA
;       (C) Copyright 1987 Teletec Corporation, U.S.A.
;AUTHOR: Ming Hsu
;CODE COMPLETE: 12/08/86
;LAST MODIFICATION: 03/06/87
;PERFORMED BY: Ming Hsu
;TEST/DEBUG:
;
;REVISION NUMBER: new
;
;DESCRIPTION: This module define system miscellaneous constant.
;
;SIZE:
;
;*************************************************************************

;*************************************************************************
;
;MODULE NAME: CMODE
;       (C) Copyright 1987 Teletec Corporation, U.S.A.
;AUTHOR: Ming Hsu
;CODE COMPLETE: 03/04/86
;LAST MODIFICATION: 03/03/87
;PERFORMED BY: Ming Hsu
;TEST/DEBUG:
;
;REVISION NUMBER: new
;
```

```
;DESCRIPTION: Depending upon the mode enable status( in EEROM ),
;             this routine will cycle the channeling mode to the next mode
;             in the cycle. i.e. manual - manual with priority - scan with
;             priority. This routine will update the anunciator buffer such
;             that the mode anunciator will indicate the new mode. The MOD_FLAG
;             state change flag will be cleared prior to exit.
;
;INPUTS: MODE - mode state variable; indicates current mode.
;
;OUTPUTS: ANUNCFG - set to cause anunciator update routine to execute.
;         MOD_FLAG - cleared after process complete.
;
;REGISTER USAGE: A, DPTR, R0, R1
;
;SUPPORT MODULES: PREP_MESS - rfu message preparation routine
;
;SIZE:
;
;EXECUTION TIME:
;
;***********************************************************************

;***********************************************************************
;
;PDL:   IF (TX_EMPTY=0)
;         IF (MODE=manual and manual with priority mode not inhibit)
;         THEN change mode to manual with priority
;         ELSE
;               IF (scan mode not inhibit)
;               THEN change mode to scan
;               ELSE
;                       IF (scan with priority not inhibit)
;                       THEN change mode to scan with priority
;                       ELSE stay in manual mode
;         IF (MODE=manual with priority and scan mode not inhibit)
;         THEN change mode to scan
;         ELSE
;               IF (scan with priority not inhibit)
;               THEN change mode to scan with priority
;               ELSE change mode to manual
;         IF (MODE=scan and scan with priority not inhibit)
;         THEN change mode to scan with priority
;         ELSE change mode to manual
;         IF (MODE=scan with priority)
;         THEN change mode to manual
;         build mode change message for RF unit
;         clear MOD_FLAG state change flag
;       ENDIF
;       EXIT
;
;***********************************************************************

;***********************************************************************
;
;MODULE NAME: MODE_KEY
;
;CODE COMPLETE:
;LAST MODIFICATION: 12/10/86
;TEST/DEBUG:
;
;REVISION NUMBER: new
;
;DESCRIPTION: This module takes care of the key sequence for MODE change.
;
;INPUTS:
;
;OUTPUTS:
;
;REGISTERS USAGE:
;
;SUPPORT MODULES:
;
;SIZE:
;
;EXECUTION TIME:
;
;PDL:
;
;
;
;
;***************************************************************************
```

```
;*******************************************************************
;
;MODULE NAME:  N_VALUE
;
;CODE COMPLETE:
;LAST MODIFICATION: 4/8/1986
;TEST/DEBUG:
;
;REVISION NUMBER: new
;
;DESCRIPTION: This module handles the key sequence of SET-CH-X-X-X
;               (for in house testing)
;INPUTS: none
;
;OUTPUTS: new channel value
;
;REGISTERS USAGE: ACC, B, PSW, DPTR, R0, R1, R5
;
;SUPPORT MODULES: KEY_CHECK: check key code
;                 MESS_DISP: move display data to LCD buffer
;
;SIZE:
;
;EXECUTION TIME:
;
;PDL:
;       IF no key pressed
;          THEN check operator time out
;       get key code
;       IF not number key
;          THEN check other functions
;       display channel message
;       set up next entry point
;       set up release state
;       set up next key flag
;       go to valid key sequence
;
;       last key in the sequence
;       convert channel number(in BCD) to binary
;       IF channel number over maximum
;          THEN illegal key sequence
;       IF channel number equal zero
;          THEN illegal key sequence
;       display current channel number
;       update channel state variable
;       go to final state
;
;**********************************************************************

;*******************************************************************
;
;MODULE NAME: N_CHDISP
;
;CODE COMPLETE: 4/8/1986
;LAST MODIFICATION: 4/8/1986
;TEST/DEBUG:
;
;REVISION NUMBER: new
;
;DESCRIPTION: This is the module to display temporary channel number in LCD
;               (This module only for in house testing purposes)
;
;INPUTS: CH_TEMP,CH_TEMP+1
;
;OUTPUTS: none
;
;REGISTERS USAGE: ACC,B,DPTR,PSW,R0,R1,R2,R3,R4,R5
;
;SUPPORT MODULES: none
;
;SIZE:
;
;EXECUTION TIME:
;
;PDL:
;       move 5 bytes of message to LCD buffer
;       get temporary channel number
;       convert to BCD
;       move to LCD display buffer
;       set up display update flag
;
;**********************************************************************
```

```
;*************************************************************************
;
;MODULE NAME: COFF2RX
;
;CODE COMPLETE: 12/22/86
;LAST MODIFICATION: 01/16/87
;TEST/DEBUG:
;
;REVISION NUMBER: new
;
;DESCRIPTION: This routine handles the state transition from the off hook
;             mode to the receive mode.
;
;INPUTS: none
;
;OUTPUTS: RXMODEFG - state flag updated.
;         OFFHOOKFG - state flag updated.
;
;REGISTER USAGE: none
;
;SUPPORT MODULES: none
;
;SIZE:
;
;EXECUTION TIME:
;
;PDL:
;
;*************************************************************************

;*************************************************************************
;
;MODULE NAME: COFF2TX
;
;CODE COMPLETE: 12/22/86
;LAST MODIFICATION: 12/22/86
;TEST/DEBUG:
;
;REVISION NUMBER: new
;
;DESCRIPTION: This routine handles the state transition from the off hook
;             mode to the transmit mode.
;
;INPUTS: none
;
;OUTPUTS: TXMODEFG - state flag updated.
;         OFFHOOKFG - state flag updated.
;
;REGISTER USAGE: none
;
;SUPPORT MODULES: none
;
;SIZE:
;
;EXECUTION TIME:
;
;PDL:
;
;*************************************************************************
;*************************************************************************
;
;MODULE NAME: CPA_ACT
;
;CODE COMPLETE: 03/04/86
;LAST MODIFICATION: 01/08/87
;TEST/DEBUG:
;
;REVISION NUMBER: new
;
;DESCRIPTION: This routine will execute when the PA_FLAG state change flag
;             is active. This routine will handle turning the PA anunciator
;             on and off. The PA_FLAG state change flag will be cleared prior
;             to exit. This module will also control speaker selection and
;             speaker audio source selection.
;             This module will prepare PCM message to be sent to RFU.
;
;INPUTS: FUNC_STAT - indicates status of PA function.
;
;OUTPUTS: ANUNCT - updated with command for PA anunciator.
;         ANUNCFG - set to cause update of display.
```

```
;       PA_FLAG - cleared after process complete.
;
;REGISTER USAGE: A, R0, R1
;
;SUPPORT MODULES: none
;
;SIZE:
;
;EXECUTION TIME:
;
;PDL:
;
;
;
;
;
;*************************************************************************

;*************************************************************************
;
;MODULE NAME: CPCAN
;
;CODE COMPLETE:08/30/86
;LAST MODIFICATION:09/10/86
;TEST/DEBUG:
;
;REVISION NUMBER: new
;
;DESCRIPTION: This module handles cancel key sequence.
;
;INPUTS:
;
;OUTPUTS:
;
;REGISTER USAGE:
;
;SUPPORT MODULES:
;
;SIZE:
;
;EXECUTION TIME:
;
;PDL:
;
;*************************************************************************

;*************************************************************************
;
;MODULE NAME: CPCH_VAL
;
;CODE COMPLETE: 08/30/86
;LAST MODIFICATION: 10/17/86
;TEST/DEBUG:
;
;REVISION NUMBER:
;
;DESCRIPTION: This routine handles the key sequences used to support
;              user channel selection.
;
;INPUTS:
;
;OUTPUTS:
;
;REGISTERS USAGE:
;
;SUPPORT MODULES:
;
;SIZE:
;
;EXECUTION TIME:
;
;PDL:
;
;*************************************************************************

;*************************************************************************
;
;MODULE NAME: CPCMRES
;
;CODE COMPLETE: 10/23/86
```

```
;LAST MODIFICATION: 10/29/86
;TEST/DEBUG:
;
;REVISION NUMBER: new
;
;DESCRIPTION: This module will be responsible for reset PCM interrupt jam
;               by clear TX and RX interrupt and all the related parameters.
;
;INPUTS:
;
;OUTPUTS:
;
;REGISTER USAGE:
;
;SUPPORT MODULES:
;
;SIZE:
;
;EXECUTION TIME:
;
;PDL:
;
;************************************************************************

;************************************************************************
;
;MODULE NAME: CPD_ACT
;
;CODE COMPLETE: 07/30/86
;LAST MODIFICATION: 12/03/86
;TEST/DEBUG:
;
;REVISION NUMBER: new
;
;DESCRIPTION: This module will be responsible for performing a power down
;             function in response to the PWR_DN_FG being active. First
;             a message will be sent to the RF Unit to command a power
;             down of the RFU. This module must wait for a response from
;             the RFU before continuing. After an ACK response has been
;             received this module will perform all functions necessary
;             functions for a controlled power down sequence.
;
;INPUTS:
;
;OUTPUTS:
;
;REGISTER USAGE: A, DPTR, R0, R1, R2, R3, R4
;
;SUPPORT MODULES: PREP_MESS - message preparation function.
;                 CTX_SAME - re-transmit same message handler.
;
;SIZE:
;
;EXECUTION TIME:
;
;************************************************************************

;************************************************************************
;
;PDL:   IF (TX_EMPTY=0)
;          initiate power down command transfer to rf unit
;          DOLOOP
;             IF (TX_EMPTY=1)
;             wait message to be transmitted
;             ENDIF
;             IF (rfu response received)
;                IF (response was an ACK)
;                   disable all interrupts
;                   disable transmitter
;                   disable audio
;                   turn off power to system
;                   disable oscillator to cpu
;                   wait for power to die
;                ELSE
;                   re-transmit same message
;                ENDIF
;             ELSE
;                IF (transmit timeout occurs)
;                   re-transmit same message
;                ENDIF
;             ENDIF
```

```
;             IF (too many re-transmissions)
;                disable all interrupts
;                disable transmitter
;                disable audio
;                turn off power to system
;                disable oscillator to cpu
;                wait for power to die
;             ENDIF
;          ENDLOOP
;       ENDIF
;       EXIT
;
;*********************************************************************
;*********************************************************************
;
;MODULE NAME: CGROUP
;
;CODE COMPLETE: 08/31/86
;LAST MODIFICATION: 10/17/86
;TEST/DEBUG:
;
;REVISION NUMBER: new
;
;DESCRIPTION: This module takes care of the key sequence SET-GRP-X-X.
;
;INPUTS: none
;
;OUTPUTS: none
;
;REGISTERS USAGE:
;
;SUPPORT MODULES: KEY_CHECK - to get key code from key buffer
;                 MESS_DISP - to load message to LCD buffer
;                 C_B_M - convert to binary and compare to maximum value
;SIZE:
;
;EXECUTION TIME:
;
;*********************************************************************
;*********************************************************************
;
;PDL:
;       IF no key pressed
;          THEN check operator's time out
;       IF not number key
;          THEN check other functions
;       save key value
;       display group message
;       go to second key sequence
;
;       IF no key pressed
;          THEN check operator's time out
;       IF not number key
;          THEN check other functions
;       save key value
;       display group message
;       convert group value to binary
;       IF group number equal to zero
;         THEN error group
;              revert back LCD display
;              illegal key exit
;       IF group number over maximum group value
;         THEN error group
;              revert back LCD display
;              illegal key exit
;       go to final state
;       EXIT
;
;*************************************************************************
;*********************************************************************
;
;MODULE NAME: FONUPDATE
;
;CODE COMPLETE: 03/04/86
;LAST MODIFICATION: 10/23/86
;TEST/DEBUG:
;
;REVISION NUMBER: new
```

```
;
;DESCRIPTION: This routine will execute when the FON_FLAG state change flag
;             is active. This routine will handle turning the FON anunciator
;             on and off. The FON_FLAG state change flag will be cleared prior
;             to exit.
;
;INPUTS: FUNC_STAT - function status state variable.
;
;OUTPUTS: ANUNCFG - set to cause update of display.
;         FON_FLAG - cleared after process complete.
;
;REGISTER USAGE:
;
;SUPPORT MODULES: none
;
;SIZE:
;
;EXECUTION TIME:
;
;PDL:
;
;***********************************************************************

;***********************************************************************
;
;MODULE NAME: CPORTBIT
;       (C) Copyright 1987 Teletec Corporation, U.S.A.
;AUTHOR: Ming Hsu
;CODE COMPLETE: 01/19/87
;LAST MODIFICATION: 02/25/87
;PERFORMED BY: Ming Hsu
;TEST/DEBUG:
;
;REVISION NUMBER: new
;
;DESCRIPTION: This module will define all variables that reside in the
;             IQ-1000 Control Unit PORTS database.
;
;                          TABLE OF CONTENTS
;             item                                          page
;
;       Header Information                                   1
;       Public Declarations                                  2
;       PORTS Offsets                                        3
;       8051 Pqrt Definitions                                4
;
;
;
;***********************************************************************

;***********************************************************************
;
;MODULE NAME: CPOWER
;
;CODE COMPLETE: 03/03/86
;LAST MODIFICATION: 11/03/86
;TEST/DEBUG:
;
;REVISION NUMBER: new
;
;DESCRIPTION: This module will execute when the PWR_FLAG state change flag
;             is active. This module will update the transmit power level
;             and the power anunciator based on the TX_POWER state variable.
;             The PWR_FLAG state change flag will be cleared on exit.
;
;INPUTS: TX_POWER - transmit power state variable.
;
;OUTPUTS: PWR_FLAG - cleared on exit.
;         ANUNCFG - set to cause anunciator update routine to execute.
;
;REGISTER USAGE: A, DPTR, RO, R1
;
;SUPPORT MODULES: PREP_MESS - rf unit message preparation routine
;
;SIZE:
;
;EXECUTION TIME:
;
;PDL:    IF (TX_EMPTY=0)
;          IF (TX_POWER=3)
```

```
;          THEN set transmit power to high
;          IF (TX_POWER=2)
;          THEN set transmit power to medium
;          IF (TX_POWER=1)
;          THEN set transmit power to low
;          clear PWR_FLAG
;          build message for rf unit
;          set ANUNCFG to update anunciator
;          clear power state change flag
;        ENDIF
;        EXIT
;
;************************************************************************

;****************************************************************************
;
;MODULE NAME: CPREP_ME
;
;CODE COMPLETE: 05/22/86
;LAST MODIFICATION: 08/14/86
;TEST/DEBUG:
;
;REVISION NUMBER: new
;
;DESCRIPTION: This routine transfers PCM message to TX buffer and calculate
;             check sum. Change the PCM mode to command mode and enable TX
;             interrupt.
;
;INPUTS:
;        R0 = number of bytes need to be transfer (not include SOH and check sum )
;        R1 = starting point of the message (in first page).
;        R2 = OPCODE
;OUTPUTS: PCM message in TX buffer
;
;REGISTERS USAGE: R0, R1, R2, ACC, DPTR, PSW
;
;SUPPORT MODULES: none
;
;SIZE:
;
;EXECUTION TIME:
;
;PDL:
;        reset TX buffer pointer
;        transfer command to TX buffer
;        send SOH to PCM command output port
;        set PCM mode to command mode( TX interrupt will be enable by hardware )
;
;****************************************************************************

;************************************************************************
;
;MODULE NAME: CPRIVACY
;
;        (c) Copyright 1987 Teletec Corporation, U.S.A.
;
;AUTHOR: John Fussell
;CODE COMPLETE: 03/04/86
;LAST MODIFICATION: 02/24/87
;PERFORMED BY: John Fussell
;TEST/DEBUG:
;
;REVISION NUMBER: new
;
;DESCRIPTION: This routine will execute when the PRI_FLAG state change flag
;             is active. This routine will handle turning the PRI anunciator
;             on and off. The PRI_FLAG state change flag will be cleared prior
;             to exit.
;
;INPUTS: FUNC_STAT - function status state variable.
;
;OUTPUTS: ANUNCFG - set to cause update of display.
;         PRI_FLAG - cleared after process complete.
;
;REGISTER USAGE: A, DPTR, R0, R2
;
;SUPPORT MODULES: PREP_MESS - rfu message preparation function.
;
;SIZE:
;
;EXECUTION TIME:
```

```
;
;PDL:    IF ( message buffer not full )
;           check function status state variable
;           IF ( privacy on requested )
;              turn on privacy anunciator
;              send vp on message to rfu
;              turn on external indicator
;           ELSE
;              turn off privacy anunciator
;              send vp off message to rfu
;              turn off external indicator
;           ENDIF
;           set anunciator update action flag
;           clear privacy update action flag
;        ENDIF
;        EXIT
;
;*********************************************************************
;*********************************************************************
;
;MODULE NAME: CPROMODE
;
;CODE COMPLETE: 01/21/86
;LAST MODIFICATION: 10/15/86
;TEST/DEBUG:
;
;REVISION NUMBER: new
;
;DESCRIPTION: This is module is the executive routine for the program mode
;             of the IQ-1000 Control Unit prototype. This routine will
;             examine state flags and dispatch to control to the appropriate
;             function update routines.
;
;INPUTS: none
;
;OUTPUTS: none
;
;REGISTER USAGE: none
;
;SUPPORT MODULES: VOLUPDATE - volume update function
;                 ALPHAUPDATE - alphanumeric display update function
;                 ANUNCUPDATE - anunciator display update function
;                 CHUPDATE - channel update function
;                 TXSYNUPDATE - transmit synthesizer update function
;                 RXSYNUPDATE - receive synthesizer update function
;                 TXREFUPDATE - transmit synthesizer reference update function
;                 SNSQUPDATE - user squelch update function
;                 CTCSSUPDATE - ctcss update function
;                 HEALTHCHECK - system health monitor function
;                 RX2TX - RX mode to TX mode state transition routine
;                 TXMODE - transmit mode exec function
;                 POWERUPDATE - transmit power update function
;                 PAUPDATE - public address update function
;                 PRIUPDATE - privacy update function
;                 MODEUPDATE - channeling mode update function
;                 FONUPDATE - phone update function
;                 AUXUPDATE - auxiliary update function
;                 PRI_SCAN - channel scanning function
;
;*********************************************************************
;*********************************************************************
;
;SUPPORT MODULES: RXREFUPDATE - receiver reference frequency update function
;                 TX_ACTION - handles RFU message responses.
;                 CM_DISP - dispatches rfu message responses.
;                 CAUX_ACT - handles auxiliary function action.
;                 CGRP_ACT - handles group function action.
;                 CPD_ACT - handles power down action.
;                 CTCSSENCODE - updates ctcss transmit tone.
;
;SIZE: 3AH
;
;EXECUTION TIME:
;
;PDL: DOLOOP
;        IF (VOLFG=1)
;        THEN execute volume update function
;        IF (ALPHAFG=1)
;        THEN execute alphanumeric update function
;        IF (ANUNCFG=1)
```

```
;       THEN execute anunciator update function
;       IF (CHANFG=1)
;       THEN execute channel update function
;       IF (RXSYNFG=1)
;       THEN execute receive synthesizer update function
;       IF (RXREF_FG=1)
;       THEN execute receiver reference update function
;       IF (TXSYNFG=1)
;       THEN execute transmit synthesizer update function
;       IF (TXREF_FG=1)
;       THEN execute transmit synthesizer reference update function
;       IF (SNSQFG=1)
;       THEN execute user squelch update function
;       IF (CTCSSRXFG=1)
;       THEN execute ctcss receive update function
;       IF (CTCSSTXFG=1)
;       THEN execute ctcss transmit update function
;       IF (PWR_FLAG=1)
;       THEN execute transmit power update function
;       IF (PA_FLAG=1)
;       THEN public address update function
;       IF (PRI_FLAG=1)
;       THEN privacy update function
;       IF (MOD_FLAG=1)
;       THEN channeling mode update function
;       IF (AUX_FLAG=1)
;       THEN auxiliary update function
;
;*************************************************************************

;*************************************************************************
;
;PDL continued:
;
;       IF (FON_FLAG=1)
;       THEN phone update function
;       IF (AUX_ACT_FG=1)
;       THEN execute auxiliary action function
;       IF (GRP_ACT_FG=1)
;       THEN execute group action function
;       IF (PSCAN_FLAG=1)
;       THEN execute channel scanning function
;       IF (TX_EMPTY=1)
;       THEN execute transmit action function
;       IF (DISPATCH_FG=1)
;       THEN execute message dispatch function
;       IF (PWR_DN_FG=1)
;       THEN execute power down function
;       IF (SCN_STAT_FG=1)
;       THEN execute scan status request function
;       IF (HEALTH_FG=1)
;       THEN execute health check command
;       execute health monitor function
;       IF (CHANGEMODE=1)
;       THEN execute exec state transition routine
;       execute transmit mode exec function
;    ENDLOOP
;
;*************************************************************************

;*************************************************************************
;
;MODULE NAME: CPSET_KEY
;
;CODE COMPLETE:
;LAST MODIFICATION: 08/31/1986
;TEST/DEBUG:
;
;REVISION NUMBER: new
;
;DESCRIPTION: This module takes care of the SET key sequences.
;
;INPUTS:
;
;OUTPUTS:
;
;REGISTERS USAGE:
;
;SUPPORT MODULES:
;
;SIZE:
```

```
;
;EXECUTION TIME:
;
;PDL:
;
;
;
;
;*****************************************************************************
;**********************************************************************
;
;MODULE NAME: CPWRDN
;
;CODE COMPLETE:02/13/86
;LAST MODIFICATION: 11/24/86
;TEST/DEBUG:
;
;REVISION NUMBER: new
;
;DESCRIPTION: This module will be executed in response to actuation of the
;             POWER key on the front panel. This module will disable the
;             transmitter, turn off audio, and turn off power to the radio
;             if the power button has been depressed for at least 1 sec. If
;             the power button is not held down for 1 sec control will be
;             returned to the interrupted program.
;
;
;INPUTS: none
;
;OUTPUTS: none
;
;REGISTER USAGE: A, DPTR, R2, R3, R6, R7, PSW
;
;SUPPORT MODULES: none
;
;SIZE:
;
;EXECUTION TIME:
;
;PDL:   save the registers used by this routine
;       IF (PBSTAT = active for 1 sec)
;         set power down state change flag active
;         disable power interrupt
;         execute system parameter save function
;       ELSE
;          restore registers
;          return from interrupt
;       ENDIF
;       END
;
;***********************************************************************
;**********************************************************************
;
;MODULE NAME: CPWRGRAPH
;
;CODE COMPLETE: 10/15/86
;LAST MODIFICATION: 10/15/86
;TEST/DEBUG:
;
;REVISION NUMBER: new
;
;DESCRIPTION: This module updates power bar graph
;
;INPUTS:
;
;OUTPUTS:
;
;REGISTER USAGE:
;
;SUPPORT MODULES:
;
;SIZE:
;
;EXECUTION TIME:
;
;PDL:
;
;***********************************************************************
```

```
;*********************************************************************
;
;MODULE NAME: CPWRUP
;       (C) Copyright 1987 Teletec Corporation, U.S.A.
;AUTHOR: John Russell
;CODE COMPLETE: 01/17/86
;LAST MODIFICATION: 03/03/87
;PERFORMED BY: Ming Hsu
;TEST/DEBUG:
;
;REVISION NUMBER: new
;
;DESCRIPTION: This module will be executed in response to power being
;             applied to the system. This module will be responsible
;             for completing the following tasks: initialize ports,
;             initialize system state variables, perform ram test,perform
;             rom test, initialize LCD controllers, initialize timers,
;             initialize system variables, and initialize interrupts.
;
;INPUTS:
;
;OUTPUTS:
;
;REGISTER USAGE: A, DPTR, R0, R2, PSW, SCON, IE, IP, SP
;
;SUPPORT MODULES: LCDINIT - performs LCD initialization
;                 MESSLOADER - loads alphanumeric buffer with an ascii message
;                 CH_DISP - updates ALPHAT based on CHANNEL state variable.
;                 INTRAMTST - internal ram test.
;                 EXTRAMTST - external ram test.
;                 ROMTST - eprom checksum.
;                 CSYS_RES - restore system parameter function.
;                 CEXEC - control unit exec.
;
;SIZE:
;
;EXECUTION TIME:
;
;*********************************************************************

;*********************************************************************
;
;PDL:   initialize internal registers
;       execute internal ram test
;       initialize stack
;       execute external ram test
;       execute rom test
;       check health of RFU modules
;       initialize 8255 I/O ports
;       initialize 8031 I/O ports
;       initialize system variables
;       initialize buffers
;       initialize system state table
;       initialize LCD controllers
;       initialize timers
;       initialize interrupts
;       END
;
;*********************************************************************

;*********************************************************************
;
;MODULE NAME: CRADIO
;       COPYRIGHT 1987 Teletec Corporation, U.S.A.
;AUTHOR: Ming C. Hsu
;CODE COMPLETE: 02/13/86
;LAST MODIFICATION: 01/23/87
;PERFORMED BY: Ming C. Hsu
;TEST/DEBUG:
;
;REVISION NUMBER: new
;
;DESCRIPTION: This module will handle processing of the following realtime
;             radio functions: audio squelch, microphone PTT, and busy lamp.
;             These functions will processed once every 1 msec. Timer 1 will
;             be used to provide the 1 msec interrupt. This module will also
;             be responsible for handling the CHANGEMODE exec state change
;             flag. This module will also perform a realtime health monitor
;             function on all RFU modules.
;
;
```

```
;INPUTS:
;
;OUTPUTS: CHANGEMODE - exec state change flag.
;
;REGISTER USAGE: A, DPTR, R2, R3, R4
;
;SUPPORT MODULES: none
;
;SIZE:
;
;EXECUTION TIME:
;
;***********************************************************************
;***********************************************************************
;
;PDL:   IF (unit is in receive mode)
;          IF (channel is busy AND ctcss tone valid is active)
;              turn on busy lamp
;              set busy state flag active
;          ELSE
;              turn off busy lamp
;              clear busy flag
;          ENDIF
;       ENDIF
;
;       IF (unit is in receive mode)
;          IF (busy flag is not active)
;             check mic ptt
;             IF (mic ptt is active)
;                set exec mode state change flag
;             ENDIF
;           ENDIF
;       ELSE (unit is in transmit mode)
;          check mic ptt
;          IF (mic ptt is not active)
;             set exec mode state change flag
;          ENDIF
;       ENDIF
;
;       IF (unit is in receive mode)
;          IF (receiver has broken squelch AND ctcss tone valid is active)
;             enable audio
;          ELSE
;             disable audio
;          ENDIF
;       ENDIF
;       EXIT
;
;***********************************************************************

;***********************************************************************
;
;MODULE NAME: CRAMBIT
;       (C) Copyright 1987 Teletec Corporation, U.S.A.
;AUTHOR: Ming Hsu
;CODE COMPLETE: 01/16/86
;LAST MODIFICATION: 03/03/87
;PERFORMED BY: Ming Hsu
;TEST/DEBUG:
;
;REVISION NUMBER: new
;
;DESCRIPTION: This module will define all variables that reside in the
;             IQ-1000 Control Unit Bit Addressable RAM database.
;
;                              TABLE OF CONTENTS
;              item                                             page
;
;       Header Information                                      1
;       Public Declarations                                     2
;       Bit Addressable Internal RAM Definitions                3 - 7
;       8051 Port Definitions                                   9
;       Bit Offsets For 8051 Registers                          10
;
;
;
;***********************************************************************
```

```
;*********************************************************************
;
;       EXEC STATE CHANGE FLAGS
;
;*********************************************************************
                RSEG    BITRAM
; ---------------------------------
; | 7 | 6 | 5 | 4 | 3 | 2 | 1 | 0 |   STATUS WORD 0
; ---------------------------------
;   |   |   |   |   |   |   |   |_____ MODE UPDATE FLAG        1=active
;   |   |   |   |   |   |   |_________ DTMF UPDATE FLAG
;   |   |   |   |   |   |_____________ SITE UPDATE FLAG
;   |   |   |   |   |_________________ POWER UPDATE FLAG
;   |   |   |   |_____________________ PUBLIC ADDRESS UPDATE FLAG
;   |   |   |_________________________ AUXILIARY FUNCTION ENABLE STATE FLAG
;   |   |_____________________________ PRIVACY UPDATE FLAG
;   |_________________________________ CHANNEL SET/REMOVE UPDATE FLAG
;
STAT0           DATA    20H
                DBIT    8
MOD_FLAG        BIT     STAT0.0
FON_FLAG        BIT     STAT0.1
SIT_FLAG        BIT     STAT0.2
PWR_FLAG        BIT     STAT0.3
PA_FLAG         BIT     STAT0.4
AUX_FLAG        BIT     STAT0.5
PRI_FLAG        BIT     STAT0.6
CHINOUT_FG      BIT     STAT0.7
; ---------------------------------
; | 7 | 6 | 5 | 4 | 3 | 2 | 1 | 0 |   STATUS WORD 1
; ---------------------------------
;   |   |   |   |   |   |   |   |_____ UPDATE ALPHA           1=active
;   |   |   |   |   |   |   |_________ UPDATE ANUNC
;   |   |   |   |   |   |_____________ UPDATE VOLUME
;   |   |   |   |   |_________________ UPDATE SNSQ
;   |   |   |   |_____________________ PTT TIMEOUT FLAG
;   |   |   |_________________________ NO MODULLATION TIME OUT FLAG
;   |   |_____________________________ UPDATE CTCSS RECEIVE DATA
;   |_________________________________ UPDATE CHANNEL
;
STAT1           DATA    21H
                DBIT    8
ALPHAFG         BIT     STAT1.0
ANUNCFG         BIT     STAT1.1
VOLFG           BIT     STAT1.2
SNSQFG          BIT     STAT1.3
PTT_OUT_FG      BIT     STAT1.4
MOD_OUT_FG      BIT     STAT1.5
CTCSSRXFG       BIT     STAT1.6
CHANFG          BIT     STAT1.7
; ---------------------------------
; | 7 | 6 | 5 | 4 | 3 | 2 | 1 | 0 |   STATUS WORD 2
; ---------------------------------
;   |   |   |   |   |   |   |   |_____ RX MODE FLAG            1=active
;   |   |   |   |   |   |   |_________ TX MODE FLAG
;   |   |   |   |   |   |_____________ OFF HOOK MODE FLAG
;   |   |   |   |   |_________________ EXEC MODE STATE CHANGE FLAG
;   |   |   |   |_____________________ CTCSS TX TONE STATE CHANGE FLAG
;   |   |   |_________________________ PCM MESSAGE DISPATCH STATE FLAG
;   |   |_____________________________ AUXILIARY ACTION STATE FLAG
;   |_________________________________ GROUP ACTION STATE FLAG
;
STAT2           DATA    22H
                DBIT    8
RXMODEFG        BIT     STAT2.0
TXMODEFG        BIT     STAT2.1
OFFHOOKFG       BIT     STAT2.2
CHANGEMODE      BIT     STAT2.3
CTCSSTXFG       BIT     STAT2.4
DISPATCH_FG     BIT     STAT2.5
AUX_ACT_FG      BIT     STAT2.6
GRP_ACT_FG      BIT     STAT2.7
```

```
; ---------------------------------
; | 7 | 6 | 5 | 4 | 3 | 2 | 1 | 0 |    STATUS WORD  3
; ---------------------------------
;   |   |   |   |   |   |   |   |_____ POWER DOWN STATE FLAG     1=active
;   |   |   |   |   |   |   |_________ STATE TABLE CHECK ACTION FLAG
;   |   |   |   |   |   |_____________ HEALTH CHECK ACTION FLAG
;   |   |   |   |   |_________________ PTT TIMEOUT STATE
;   |   |   |   |_____________________ BEEPER INHIBIT FLAG
;   |   |   |_________________________ NOT USED
;   |   |_____________________________ TRANSMIT REFERENCE ACTION FLAG
;   |_________________________________ SCAN STATUS COMMAND ACTION FLAG
;
STAT3            DATA     23H
                 DBIT     8
PWR_DN_FG        BIT      STAT3.0
ST_SUM_FG        BIT      STAT3.1
HEALTH_FG        BIT      STAT3.2
TIMEOUT_FG       BIT      STAT3.3
NO_BEEPER        BIT      STAT3.4
TXREF_FG         BIT      STAT3.6
SCN_STAT_FG      BIT      STAT3.7

;************************************************************************
;
;       HEALTH STATUS FLAGS
;
;************************************************************************
; ---------------------------------
; | 7 | 6 | 5 | 4 | 3 | 2 | 1 | 0 |    STATUS WORD  4
; ---------------------------------
;   |   |   |   |   |   |   |   |_____ PTT CONSTANT INIT
;   |   |   |   |   |   |   |_________ GUARD CHANNEL INIT
;   |   |   |   |   |   |_____________ SEND INITIAL CONSTANT FLAG
;   |   |   |   |   |_________________ LCD DISPLAY NOT ALLOWED TO BE CHANGE
;   |   |   |   |_____________________ IGNORE HEALTH ERROR FLAG
;   |   |   |_________________________ ERROR MODE FLAG
;   |   |_____________________________ ERROR 2 FLAG 1=error code displayed
;   |_________________________________ PCM MESSAGE ERROR FLAG 1=error occured
;
STAT4            DATA     24H
                 DBIT     8
PTT_INIT         BIT      STAT4.0
GUARD_INIT       BIT      STAT4.1
INIT_CONST       BIT      STAT4.2
NO_DISPLAY       BIT      STAT4.3
IGNORE_ERR       BIT      STAT4.4
ERROR_MODE       BIT      STAT4.5
ERROR2           BIT      STAT4.6
PCM_MESS_ER      BIT      STAT4.7
; ---------------------------------
; | 7 | 6 | 5 | 4 | 3 | 2 | 1 | 0 |    STATUS WORD  5
; ---------------------------------
;   |   |   |   |   |   |   |   |_____ NOT USED
;   |   |   |   |   |   |   |_________
;   |   |   |   |   |   |_____________
;   |   |   |   |   |_________________
;   |   |   |   |_____________________
;   |   |   |_________________________
;   |   |_____________________________
;   |_________________________________
;
STAT5            DATA     25H
                 DBIT     8
; ---------------------------------
; | 7 | 6 | 5 | 4 | 3 | 2 | 1 | 0 |    STATUS WORD  6
; ---------------------------------
;   |   |   |   |   |   |   |   |_____ NOT USED
;   |   |   |   |   |   |   |_________
;   |   |   |   |   |   |_____________
;   |   |   |   |   |_________________
;   |   |   |   |_____________________
;   |   |   |_________________________
;   |   |_____________________________
;   |_________________________________
;
STAT6            DATA     26H
```

```
                  DBIT      8
; ---------------------------------------
; | 7 | 6 | 5 | 4 | 3 | 2 | 1 | 0 |    STATUS WORD 7
; ---------------------------------------
;   |   |   |   |   |   |   |   |_____ INITIAL STATE FLAG        1=active
;   |   |   |   |   |   |   |_________ RELEASE STATE FLAG
;   |   |   |   |   |   |_____________ WAIT STATE FLAG
;   |   |   |   |   |_________________ FINAL STATE FLAG
;   |   |   |   |_____________________ LIGHT STATUS FLAG  1=backlighting on
;   |   |   |_________________________ SCAN DISPLAY STATUS   1=channel 0=blank
;   |   |_____________________________ SCAN ACTIVITY STATUS  1=recent activity
;   |_________________________________ CHANNEL BUSY STATE FLAG
;
STAT7             DATA      27H
                  DBIT      8
INITIAL           BIT       STAT7.0
RELEASE           BIT       STAT7.1
WAIT              BIT       STAT7.2
FINAL             BIT       STAT7.3
LIGHT_STAT        BIT       STAT7.4
DISPLAYFLAG       BIT       STAT7.5
ACTIVITYFG        BIT       STAT7.6
CHANBUSYFG        BIT       STAT7.7
; ---------------------------------------
; | 7 | 6 | 5 | 4 | 3 | 2 | 1 | 0 |    STATUS WORD  8
; ---------------------------------------
;   |   |   |   |   |   |   |   |_____ NOT USED
;   |   |   |   |   |   |   |_________
;   |   |   |   |   |   |_____________
;   |   |   |   |   |_________________
;   |   |   |   |_____________________
;   |   |   |_________________________
;   |   |_____________________________
;   |_________________________________
STAT              DATA      28H
                  DBIT      8
; ---------------------------------------
; | 7 | 6 | 5 | 4 | 3 | 2 | 1 | 0 |    STATUS WORD  9
; ---------------------------------------
;   |   |   |   |   |   |   |   |_____ NOT USED
;   |   |   |   |   |   |   |_________
;   |   |   |   |   |   |_____________
;   |   |   |   |   |_________________
;   |   |   |   |_____________________
;   |   |   |_________________________
;   |   |_____________________________
;   |_________________________________
STAT9             DATA      29H
                  DBIT      8
; ---------------------------------------
; | 7 | 6 | 5 | 4 | 3 | 2 | 1 | 0 |    STATUS WORD  10
; ---------------------------------------
;   |   |   |   |   |   |   |   |_____ IGNORE INTERNAL RAM ERROR      1=active
;   |   |   |   |   |   |   |_________ IGNORE EXTERNAL RAM ERROR
;   |   |   |   |   |   |_____________ MANUAL MODE FLAG
;   |   |   |   |   |_________________ MANUAL WITH PRIORITY MODE FLAG
;   |   |   |   |_____________________ SCAN MODE FLAG
;   |   |   |_________________________ PRIORITY SCAN MODE FLAG
;   |   |_____________________________ TX BUFFER EMPTY STATUS   1=buffer busy
;   |_________________________________ TX PENDING STATUS    1=response pending
STAT10            DATA      2AH
                  DBIT      8
MAN_FLAG          BIT       STAT10.2
MANP_FLAG         BIT       STAT10.3
SCAN_FLAG         BIT       STAT10.4
PSCAN_FLAG        BIT       STAT10.5
TX_EMPTY          BIT       STAT10.6
TX_CHECK          BIT       STAT10.7
; ---------------------------------------
; | 7 | 6 | 5 | 4 | 3 | 2 | 1 | 0 |    STATUS WORD  11
; ---------------------------------------
;   |   |   |   |   |   |   |   |_____ BUSY LIGHT BLINK STATUS            1=active
;   |   |   |   |   |   |   |_________ BUSY LIGHT BLINK TIMING 1
;   |   |   |   |   |   |_____________ BUSY LIGHT BLINK TIMING 2
;   |   |   |   |   |_________________ BUSY LIGHT BLINK TIMING 3
;   |   |   |   |_____________________ CTCSS SCAN QUALIFY STATUS
;   |   |   |_________________________ TIMEOUT MESSAGE DISPLAY
;   |   |_____________________________ REVERT TO LCD ORIGINAL BUFFER
;   |_________________________________ AUX FUNCTION ACTIVATED
;
```

```
STAT11          DATA    2BH
                DBIT    8
BUSYSTAT1       BIT     STAT11.0
BUSYSTAT2       BIT     STAT11.1
BUSYSTAT3       BIT     STAT11.2
BUSYSTAT4       BIT     STAT11.3
CTCSS_QUAL      BIT     STAT11.4
T_OUT_DISP      BIT     STAT11.5
REVERT_DISP     BIT     STAT11.6
AUX_ACTIVE      BIT     STAT11.7


;************************************************************************
;
;       ANUNCIATOR STATUS WORDS
;
;************************************************************************
; ---------------------------------
; | 7 | 6 | 5 | 4 | 3 | 2 | 1 | 0 |   STATUS WORD  12
; ---------------------------------
;   |   |   |   |   |   |   |   |_____ HIGH BAR GRAPH SEGMENT    1=active
;   |   |   |   |   |   |   |_________ MEDIUM BAR GRAPH SEGMENT
;   |   |   |   |   |   |_____________ LOW BAR GRAPH SEGMENT
;   |   |   |   |   |_________________ TX
;   |   |   |   |_____________________ not used
;   |   |   |_________________________ SCAN ANUNCIATOR
;   |   |_____________________________ PRIORITY ANUNCIATOR
;   |_________________________________ MANUAL ANUNCIATOR
;
STAT12          DATA    2CH
                DBIT    8
HIGH_BAR        BIT     STAT12.0
MED_BAR         BIT     STAT12.1
LOW_BAR         BIT     STAT12.2
TX              BIT     STAT12.3
SCAN            BIT     STAT12.5
PRIORITY        BIT     STAT12.6
MANUAL_MODE     BIT     STAT12.7
; ---------------------------------
; | 7 | 6 | 5 | 4 | 3 | 2 | 1 | 0 |   STATUS WORD  13
; ---------------------------------
;   |   |   |   |   |   |   |   |_____ not used                  1=active
;   |   |   |   |   |   |   |_________ not used
;   |   |   |   |   |   |_____________ not used
;   |   |   |   |   |_________________ PHONE
;   |   |   |   |_____________________ PRIVACY
;   |   |   |_________________________ AUXILIARY
;   |   |_____________________________ RX
;   |_________________________________ PUBLIC ADDRESS
;
STAT13          DATA    2DH
                DBIT    8
PHONE           BIT     STAT13.3
PRIVACY         BIT     STAT13.4
AUXILIARY       BIT     STAT13.5
RX              BIT     STAT13.6
PUBLIC_ADDR     BIT     STAT13.7


; ---------------------------------
; | 7 | 6 | 5 | 4 | 3 | 2 | 1 | 0 |   STATUS WORD 14
; ---------------------------------
;   |   |   |   |   |   |   |   |_____ PROGRAM MODE
;   |   |   |   |   |   |   |_________ AUDIO STATUS 1=audio has been enabled
;   |   |   |   |   |   |_____________ SAME KEY FLAG 0=key bouncing,1=key stable
;   |   |   |   |   |_________________ NO KEY FLAG 1=no key,0=key pressed
;   |   |   |   |_____________________ VOLUME UP/DOWN FLAG 0=up 1=down
;   |   |   |_________________________ SQUELCH UP/DOWN FLAG 0=up 1=down
;   |   |_____________________________ CHANNEL UP/DOWN FLAG 0=up 1=down
;   |_________________________________ SNSQ/VOL UPDATE FLAG 1=not yet updated
;
STAT14          DATA    2EH
                DBIT    8
PROG_MODE       BIT     STAT14.0
AUDIO_STAT      BIT     STAT14.1
SAME_KEY        BIT     STAT14.2
NO_KEY          BIT     STAT14.3
VOL_UP_DN       BIT     STAT14.4
SQ_UP_DN        BIT     STAT14.5
CH_UP_DN        BIT     STAT14.6
UPDATE          BIT     STAT14.7
```

```
; ----------------------------------
; | 7 | 6 | 5 | 4 | 3 | 2 | 1 | 0 |      STATUS WORD  15
; ----------------------------------
;   |   |   |   |   |   |   |   |_____ SLEW_STATE
;   |   |   |   |   |   |   |_________ VOLUME KEY
;   |   |   |   |   |   |_____________ CALCULATE FREQUENCY
;   |   |   |   |   |_________________ EEROM BUSY
;   |   |   |   |_____________________ EEROM ERASE STATE
;   |   |   |_________________________ EEROM WRITE STATE
;   |   |_____________________________ POWER INIT FLAG
;   |_________________________________ SECRET CODE ENTERING MODE
;
STAT15          DATA    2FH
                DBIT    8
SLEW_STATE      BIT     STAT15.0
VOL_NOT_CH      BIT     STAT15.1
CALFREQ         BIT     STAT15.2
EEROM_BUSY      BIT     STAT15.3
EEROM_ERASE     BIT     STAT15.4
EEROM_WRITE     BIT     STAT15.5
PWR_INIT        BIT     STAT15.6
SECRET_MODE     BIT     STAT15.7

;**********************************************************************
;
;MODULE NAME: CRAMEXT
;       (C) Copyright 1987 Teletec Corporation. U.S.A.
;AUTHOR: Ming Hsu
;CODE COMPLETE. 01/16/86
;LAST MODIFICATION: 02/24/87
;PERFUMED BY :Ming Hsu
;TEST/DEBUG :
;
;REVISION NUMBER: new
;
;DESCRIPTION: This module will define all variables that reside in the
;             Control Unit External RAM database.
;
;                           TABLE OF CONTENTS
;              item                                              page
;
;       Header Information                                        1
;       Public Declarations                                       2
;       External Ram Definitions                                  3
;
;EXTERNAL RAM SIZE: 00H
;
;**********************************************************************

;**********************************************************************
;
;MODULE NAME: CRAMINT
;       Copyright 1987 Teletec Corporation. U.S.A.
;AUTHOR: Ming Hsu
;CODE COMPLETE: 01/16/86
;LAST MODIFICATION: 01/28/87
;PERFORMED BY: Ming Hsu
;TEST/DEBUG:
;
;REVISION NUMBER: new
;
;DESCRIPTION: This module will define all variables that reside in the
;             Control Unit Internal RAM database.
;
;                           TABLE OF CONTENTS
;              item                                              page
;
;       Header Information                                        1
;       Public Declarations                                       2
;       Byte Addressable Internal RAM Definitions                 3
;       Stack                                                     3
;
;
;
;
;
;
;
;
;
;
```

```
;
;
;
;
;
;INTERNAL RAM SIZE: 7FH
;
;
;
;
;
;**********************************************************************
;********************************************************************
;
;MODULE NAME: ROMTEST
;
;CODE COMPLETE
;LAST MODIFICATION: 2/14/1986
;TEST/DEBUG:
;
;REVISION NUMBER: new
;
;DESCRIPTION: test system ROM
;
;INPUTS:
;
;OUTPUTS:
;
;REGISTERS USAGE:
;
;SUPPORT MODULES:
;
;SIZE:
;
;EXECUTION TIME:
;
;PDL:
;       get total bytes count
;       initialize temporary check sum
;       get code
;       exclusive_or with temporary check sum
;       shift left one position
;       save the temporary check sum
;       increase byte count
;       IF last byte
;           THEN compare current check sum to last byte
;               IF compare
;                   THEN exit
;                   ELSE set ROM error flag and exit
;           ELSE check next byte
;
;*****************************************************************************
;********************************************************************
;
;MODULE NAME: CRVT_DISP
;
;CODE COMPLETE: 12/22/86
;LAST MODIFICATION. 12/22/86
;TEST/DEBUG:
;
;REVISION NUMBER: new
;
;DESCRIPTION: This module is the executive function for the transmit timeout
;
;INPUT:
;
;OUTPUTS: none
;
;REGISTER USAGE:
;
;SUPPORT MODULES:
;
;*********************************************************************
;********************************************************************
;
;MODULE NAME: CRX2OFF
;
;CODE COMPLETE: 12/22/86
;LAST MODIFICATION: 01/16/86
```

```
;TEST/DEBUG:
;
;REVISION NUMBER: new
;
;DESCRIPTION: This routine handles the state transition from the receive
;             mode to the off hook mode.
;
;INPUTS: none
;
;OUTPUTS: RXMODEFG - state flag updated.
;         OFFHOOKFG - state flag updated.
;
;REGISTER USAGE: none
;
;SUPPORT MODULES: none
;
;SIZE:
;
;EXECUTION TIME:
;
;PDL:
;
;***********************************************************************

;***********************************************************************
;
;MODULE NAME: CRX2TX
;
;CODE COMPLETE: 02/11/86
;LAST MODIFICATION: 12/22/86
;TEST/DEBUG:
;
;REVISION NUMBER: new
;
;DESCRIPTION: This module is the state transition routine that handles
;             the transition from exec receive mode to exec transmit mode.
;
;
;INPUTS: none
;
;OUTPUTS: TXMODEFG - set to indicate new mode
;         RXMODEFG - cleared due to mode change
;
;REGISTER USAGE: A, DPTR
;
;SUPPORT MODULES: none
;
;SIZE:
;
;EXECUTION TIME:
;
;PDL:   disable audio
;       change exec mode flag to transmit
;       EXIT
;
;***********************************************************************
;***********************************************************************
;
;MODULE NAME: CRX_CHAN
;
;CODE COMPLETE: 07/24/86
;LAST MODIFICATION: 09/16/86
;TEST/DEBUG:
;
;REVISION NUMBER: new
;
;DESCRIPTION: This module will use the channel number given as input to
;             access the channel data table and retrieve the receive synthesizer
;             divide by N and A for that channel. This data will be stored
;             in three locations in the 1st page of external ram pointed
;             to by the value found in R0 on call to this routine.
;
;INPUTS: R0 - contains 1st page destination address of data.
;        R6 - low order channel number.
;        R7 - high order channel number.
;
;OUTPUTS: (R0)+0, +1, +2 - rx synthesizer N and A.
;
;REGISTER USAGE: A, B, DPTR, R0, R1, R2, R6, R7
;
```

```
;SUPPORT MODULES: none
;
;SIZE:
;
;EXECUTION TIME:
;
;PDL:
;
;***********************************************************************
;***********************************************************************
;
;MODULE NAME: CRX_CMD
;        (C) Copyright 1987 Teletec Corporation, U.S.A.
;AUTHOR: Ming Hsu
;CODE COMPLETE: 05/22/86
;LAST MODIFICATION: 02/09/87
;PERFORMED BY: Ming Hsu
;TEST/DEBUG:
;
;REVISION NUMBER: new
;
;DESCRIPTION: This module will execute in response to a PCM receive command
;             interrupt. This module will be responsible for removing data
;             from the PCM receive command latch and storing the data into
;             a buffer.
;
;INPUTS: RX_HEAD - contains pointer for next received byte.
;
;OUTPUTS: RX_BEG - receive buffer updated with new receive data.
;
;REGISTER USAGE: A, R1, R2, DPTR
;
;SUPPORT MODULES:
;
;SIZE:
;
;EXECUTION TIME:
;
;PDL:
;
;***********************************************************************

;***********************************************************************
;
;MODULE NAME: CRXREF
;        Copyright 1987 Teletec Corporation, U.S.A.
;AUTHOR: Ming Hsu
;CODE COMPLETE: 06/09/86
;LAST MODIFICATION: 02/02/87
;PERFORMED BY: Ming Hsu
;TEST/DEBUG:
;
;REVISION NUMBER: new
;
;DESCRIPTION: This module set up message for RX SYN REFERENCE frequency update.
;
;INPUTS:
;
;OUTPUTS:
;
;REGISTER USAGE:
;
;SUPPORT MODULES:
;                 PREP_MESS
;SIZE:
;
;EXECUTION TIME:
;
;PDL:
;        IF (TX BUFFER FULL)
;           THEN EXIT
;           ELSE
;                load message starting address
;                load number of byte to be sent
;                execute message preparation
;                clear action flag
;        exit
;
;***********************************************************************
```

```
;***********************************************************************
;
;MODULE NAME: CRXSYN
;
;CODE COMPLETE: 01/28/86
;LAST MODIFICATION: 06/27/86
;TEST/DEBUG:
;
;REVISION NUMBER: new
;
;DESCRIPTION: This routine will execute when RXSYNFG is active. This routine
;             will update the receiver synthesizer based on the RXSYNFREQ.
;             The RXSYNFG state change flag will be cleared upon completion
;             of this process.
;
;INPUTS: RXSYNFREQ - current receive synthesizer frequency.
;
;OUTPUTS: RXSYNFG - cleared when process complete.
;
;REGISTER USAGE: A, DPTR, R0
;
;SUPPORT MODULES: MESS_PREP - rf unit message preparation
;
;SIZE:
;
;EXECUTION TIME:
;
;PDL:   IF (TX_EMPTY=0)
;         retrieve divide by N and A for synthesizer
;         build message for rf unit
;         clear receive synthesizer state change flag
;       ENDIF
;       EXIT
;
;***********************************************************************

;***********************************************************************
;
;MODULE NAME: CSAVDATA
;       (C) Copyright 1987 Teletec Corporation, U.S.A.
;AUTHOR: John Russell
;CODE COMPLETE: 10/01/86
;LAST MODIFICATION: 02/04/87
;PERFORMED BY: Ming Hsu
;TEST/DEBUG:
;
;REVISION NUMBER: new
;
;DESCRIPTION: This module defines all data definitions for data stored
;             during the power down sequence.
;
;SIZE:
;
;***********************************************************************

;***********************************************************************
;
;MODULE NAME: CSCN_CMD
;
;CODE COMPLETE: 08/08/86
;LAST MODIFICATION: 08/29/86
;TEST/DEBUG:
;
;REVISION NUMBER: new
;
;DESCRIPTION: This module set up message for SCAN STATUS update.
;
;INPUTS:
;
;OUTPUTS:
;
;REGISTER USAGE: R0, R2
;
;SUPPORT MODULES: PREP_MES - message preparation routine.
;
;SIZE:
;
;EXECUTION TIME:
;
;PDL:
;
;***********************************************************************
```

```
;*********************************************************************
;
;MODULE NAME: CSECRET
;
;CODE COMPLETE:
;LAST MODIFICATION: 10/17/86
;TEST/DEBUG:
;
;REVISION NUMBER: new
;
;DESCRIPTION: This module takes cares of secret code entering sequence.
;
;INPUTS:
;
;OUTPUTS:
;
;REGISTER USAGE:
;
;SUPPORT MODULES:
;
;SIZE:
;
;EXECUTION TIME:
;
;PDL:
;
;**********************************************************************

;*********************************************************************
;
;MODULE NAME: KEY SEQUENCE
;       (C) Copyright 1987 Teletec Corporation, U.S.A.
;AUTHOR: Ming Hsu
;CODE COMPLETE: 01/22/86
;LAST MODIFICATION:03/09/87
;PERFORMED BY: Ming Hsu
;TEST/DEBUG:
;
;REVISION NUMBER: new
;
;DESCRIPTION: This module dispatch the keycode action.
;
;INPUTS: keycode
;
;OUTPUTS: brounching to corresponding address
;
;REGISTERS USAGE:    ACC, PSW
;
;SUPPORT MODULES:
;                 KEY_CHECK: get key code.
;                 F_STATE: final state
;                 ERR_DISP: display error message
;                 SECRET: secret code sequence
;
;SIZE:  68H
;
;EXECUTION TIME:
;
;PDL:
;       IF program mode
;               THEN
;                       performed secret function
;       ENDIF
;       get key code
;       IF no key
;               THEN go to final state
;       ENDIF
;       IF key release
;               THEN go to final state
;       ENDIF
;       IF in error mode
;               THEN go to error display
;       ENDIF
;       jump to key sequence
;       end
;
;*************************************************************************

;*********************************************************************
;
;MODULE NAME: CSIT_ACT
```

```
;
;CODE COMPLETE: 03/05/86
;LAST MODIFICATION: 10/08/86
;TEST/DEBUG:
;
;REVISION NUMBER: new
;
;DESCRIPTION: This routine will execute when the key sequence has been
;              correctly entered for the Site Function. This routine will
;              first determine whether CTCSS or Sequential Tones are being
;              used for defining a Site. Then either CTCSSTX state variable
;              or SEQ Message buffer will be updated with data from the Site
;              table.
;
;INPUTS: SITE - contains the current Site number in binary.
;        SITE_TYPE - indicates either CTCSS or SEQ Site definition.
;
;OUTPUTS: CTCSSTX - updated if SITE_TYPE is CTCSS.
;         SEQ_BUFFER - updated if SITE_TYPE is SEQ.
;
;REGISTER USAGE: A, DPTR, R0, R2, R3
;
;SUPPORT MODULES: none
;
;SIZE:
;
;EXECUTION TIME:
;
;PDL:   calculate index to site table
;       IF (SITE_TYPE=CTCSS)
;       THEN update ctcss transmit state variable from table
;       ELSE update sequential message buffer
;       EXIT
;
;***********************************************************************
;***********************************************************************
;
;MODULE NAME: CSIT_CAN
;
;CODE COMPLETE: 03/05/86
;LAST MODIFICATION: 06/02/86
;TEST/DEBUG:
;
;REVISION NUMBER: new
;
;DESCRIPTION: This is the action routine for the Cancel Site key sequence.
;              This routine will either update the CTCSSTX state variable
;              with the default tone or update the sequential message buffer
;              with the default sequential message. This will be based on the
;              SITE_TYPE state variable.
;
;INPUTS: SITE_TYPE - indicates either CTCSS or SEQ Site definition.
;
;OUTPUTS: CTCSSTX - updated if Site is CTCSS.
;         SEQ_BUFFER - updated if Site is sequential.
;
;REGISTER USAGE: A, DPTR, R0
;
;SUPPORT MODULES: none
;
;SIZE:
;
;EXECUTION TIME:
;
;PDL:   IF (SITE_TYPE=CTCSS)
;       THEN update CTCSSTX with default tone
;       ELSE update sequential message buffer with unit id
;       EXIT
;
;***********************************************************************
;***********************************************************************
;
;MODULE NAME: CSIT_CON
;
;CODE COMPLETE: 10/01/86
;LAST MODIFICATION: 10/21/86
;TEST/DEBUG:
;
;REVISION NUMBER: new
;
```

```
;DESCRIPTION: Definitions for sites.
;
;SIZE:
;
;*****************************************************************************
;*****************************************************************************
;
;MODULE NAME: CSQUELCH
;
;CODE COMPLETE: 02/05/86
;LAST MODIFICATION: 10/08/86
;TEST/DEBUG:
;
;REVISION NUMBER: new
;
;DESCRIPTION: This routine handles tne squelch up/down slewing kev sequence.
;
;INPUTS:
;
;OUTPUTS:
;
;REGISTERS USAGE:
;
;SUPPORT MODULES:
;
;SIZE:
;
;EXECUTION TIME:
;
;PDL:
;       set squelch up/down flag
;       set up next entry address
;       check key input
;       IF multiple keys
;          THEN
;               IF squelch up/down both pressed
;                  THEN display current squelch level
;                  ELSE
;                       illegal key
;               exit
;          ELSE
;               set up one key re-enter point
;          EXIT
;
;*****************************************************************************
;*****************************************************************************
;
;MODULE NAME: CSTATECK
;
;CODE COMPLETE: 10/10/86
;LAST MODIFICATION: 10/10/86
;TEST/DEBUG:
;
;REVISION NUMBER: new
;
;DESCRIPTION: this module takes cares of state table check sum.
;
;INPUTS:
;
;OUTPUTS:
;
;REGISTER USAGE:
;
;SUPPORT MODULES:
;
;SIZE:
;
;EXECUTION TIME:
;
;PDL:
;
;*****************************************************************************
;*****************************************************************************
;
;MODULE NAME: CSUPDATE
;
;CODE COMPLETE: 01/23/86
;LAST MODIFICATION: 10/31/86
;TEST/DEBUG:
```

```
;
;REVISION NUMBER: new
;
;DESCRIPTION: This module will execute when the SNSQ state flag has been set.
;             This module will update the squelch bar graph portion of the
;             anunciator command buffer on all values of the SQUELCH state
;             variable. This is done by using the SQUELCH state variable as an
;             input and building four Write Display Ram Commands with a bit set
;             for each segment to be turned on. The SNSQ DAC will be updated
;             for all values of the SQUELCH state variable. The SNSQ state
;             change flag will be cleared prior to exit of this routine.
;
;
;INPUTS: SQUELCH - state variable indicating relative squelch setting.
;                  valid values are 0 to 31.
;
;OUTPUTS: ANUNCFG - set if ANUNCT buffer has been updated.
;         SNSQFG - cleared when process is complete.
;
;REGISTER USAGE: A, B, DPTR, R0, R1, R2,
;
;SUPPORT MODULES: PREP_MESS - RF unit message preparation routine
;
;SIZE:
;
;EXECUTION TIME:
;
;PDL:    IF (TX_EMPTY=0)
;          update squelch bar graph in anunciator buffer
;          set ANUNCFG so display is updated
;          use SQUELCH state variable as index to SQTABLE
;          build message for RF unit
;          clear squelch state change flag
;        ENDIF
;        EXIT
;
;*************************************************************************
;*************************************************************************
;
;MODULE NAME: CSV_BIT
;       (C) Copyright 1987 Teletec Corporation, U.S.A.
;AUTHOR: Ming Hsu
;CODE COMPLETE: 01/19/87
;LAST MODIFICATION: 02/06/87
;PERFORMED BY: Ming Hsu
;TEST/DEBUG:
;
;REVISION NUMBER: new
;
;DESCRIPTION: This module will define all variables that reside in the
;             IQ-1000 Control Unit external RAM.
;
;                                TABLE OF CONTENTS
;               item                                            page
;
;        Header Information                                      1
;        Public Declarations                                     2
;
;
;
;*************************************************************************
;*************************************************************************
;
;        HEALTH STATUS FLAGS
;
;*************************************************************************
; ---------------------------------
; | 7 | 6 | 5 | 4 | 3 | 2 | 1 | 0 |     HEALTH STATUS WORD  0
; ---------------------------------
;   |   |   |   |   |   |   |   |_____ INTERNAL RAM HEALTH FLAG   1=active
;   |   |   |   |   |   |   |_________ EXTERNAL RAM HEALTH FLAG
;   |   |   |   |   |   |_____________ ROM HEALTH FLAG
;   |   |   |   |   |_________________ LCD HEALTH FLAG
;   |   |   |   |_____________________ IGNORE HEALTH ERROR FLAG
;   |   |   |_________________________ ERROR MODE FLAG
;   |   |_____________________________ ERROR 2 FLAG 1=error code displayed
;   |_________________________________ PCM MESSAGE ERROR FLAG 1=error occured
;
;HEALTHSTAT0
INTRAMHLTH      BIT     ACC.0
```

```
EXTRAMHLTH      BIT     ACC.1
ROMHEALTH       BIT     ACC.2
LCDHEALTH       BIT     ACC.3
; -----------------------------------
; | 7 | 6 | 5 | 4 | 3 | 2 | 1 | 0 |    HEALTH STATUS WORD 1
; -----------------------------------
;   |   |   |   |   |   |   |   |_____ not used               1=fault
;   |   |   |   |   |   |   |_________ CTCSS HEALTH FLAG
;   |   |   |   |   |   |_____________ RX HEALTH FLAG
;   |   |   |   |   |_________________ TX HEALTH FLAG
;   |   |   |   |_____________________ RX SYN HEALTH FLAG
;   |   |   |_________________________ TX SYN HEALTH FLAG
;   |   |_____________________________ RFU EXTERNAL RAM HEALTH FLAG
;   |_________________________________ RFU ROM HEALTH FLAG
;
;HEALTHSTAT1
CTCSSHLTH       BIT     ACC.1
RXHEALTH        BIT     ACC.2
TXHEALTH        BIT     ACC.3
RXSYNHLTH       BIT     ACC.4
TXSYNHLTH       BIT     ACC.5
REXTRAMHLTH     BIT     ACC.6
RROMHEALTH      BIT     ACC.7
; -----------------------------------
; | 7 | 6 | 5 | 4 | 3 | 2 | 1 | 0 |    HEALTH STATUS WORD  2
; -----------------------------------
;   |   |   |   |   |   |   |   |_____ RFU INTERNAL RAM HEALTH FLAG 1=bad health
;   |   |   |   |   |   |   |_________ ANTENNA HEALTH FLAG
;   |   |   |   |   |   |_____________ SEQUENTIAL HEALTH FLAG
;   |   |   |   |   |_________________ AUDIO HEALTH FLAG
;   |   |   |   |_____________________ FSK HEALTH FLAG
;   |   |   |_________________________ DTMF HEALTH FLAG
;   |   |_____________________________ VOICE PRIVACY HEALTH FLAG
;   |_________________________________ MODULATION HEALTH FLAG
;
;HEALTHSTAT2
RINTRAMHLTH     BIT     ACC.0
ANTHEALTH       BIT     ACC.1
SEQHEALTH       BIT     ACC.2
AUDIOHEALTH     BIT     ACC.3
FSKHEALTH       BIT     ACC.4
DTMFHEALTH      BIT     ACC.5
VPHEALTH        BIT     ACC.6
MODHEALTH       BIT     ACC.7
; -----------------------------------
; | 7 | 6 | 5 | 4 | 3 | 2 | 1 | 0 |    HEALTH DISPALY STATUS WORD 0
; -----------------------------------
;   |   |   |   |   |   |   |   |_____ IGNORE CTCSS ERROR 1=ACTIVE
;   |   |   |   |   |   |   |_________ IGNORE RX ERROR
;   |   |   |   |   |   |_____________ IGNORE TX ERROR
;   |   |   |   |   |_________________ IGNORE RX SYNTHESIZER ERROR
;   |   |   |   |_____________________ IGNORE TX SYNTHESIZER ERROR
;   |   |   |_________________________ IGNORE RFU EXTERNAL RAM ERROR
;   |   |_____________________________ IGNORE RFU ROM ERROR
;   |_________________________________ IGNORE RFU INTERNAL RAM ERROR
;
;IGNOR_STAT0
IGNOR_CTCSS     BIT     ACC.0
IGNOR_RX        BIT     ACC.1
IGNOR_TX        BIT     ACC.2
IGNOR_RXSYN     BIT     ACC.3
IGNOR_TXSYN     BIT     ACC.4
IGNOR_RERAM     BIT     ACC.5
IGNOR_RROM      BIT     ACC.6
IGNOR_RIRAM     BIT     ACC.7
; -----------------------------------
; | 7 | 6 | 5 | 4 | 3 | 2 | 1 | 0 |    HEALTH DISPLAY STATUS WORD  1
; -----------------------------------
;   |   |   |   |   |   |   |   |_____ IGNORE ANTENNA ERROR     1=active
;   |   |   |   |   |   |   |_________ IGNORE SEQUENTIAL MODULE ERROR
;   |   |   |   |   |   |_____________ IGNORE AUDIO ERROR
;   |   |   |   |   |_________________ IGNORE FSK ERROR
;   |   |   |   |_____________________ IGNORE DTMF ERROR
;   |   |   |_________________________ IGNORE VP ERROR
;   |   |_____________________________ IGNORE MODULATION ERROR
;   |_________________________________ IGNORE ROM ERROR
;
;IGNOR_STAT1
IGNOR_ANT       BIT     ACC.0
```

```
IGNOR_SEQ        BIT     ACC.1
IGNOR_AUDIO      BIT     ACC.2
IGNOR_FSK        BIT     ACC.3
IGNOR_DTMF       BIT     ACC.4
IGNOR_VP         BIT     ACC.5
IGNOR_MOD        BIT     ACC.6
IGNOR_ROM        BIT     ACC.7
; ---------------------------------
; | 7 | 6 | 5 | 4 | 3 | 2 | 1 | 0 |   HEALTH DISPLAY STATUS WORD  2
; ---------------------------------
;   |   |   |   |   |   |   |   |____ IGNORE INTERNAL RAM ERROR     1=active
;   |   |   |   |   |   |   |________ IGNORE EXTERNAL RAM ERROR
;   |   |   |   |   |   |____________ IGNORE LCD ERROR
;   |   |   |   |   |________________
;   |   |   |   |____________________
;   |   |   |________________________
;   |   |____________________________
;   |________________________________
;
;IGNOR_STAT2
IGNOR_IRAM       BIT     ACC.0
IGNOR_ERAM       BIT     ACC.1
IGNOR_LCD        BIT     ACC.2
;
; ---------------------------------
; | 7 | 6 | 5 | 4 | 3 | 2 | 1 | 0 |   GROUP ATTRIBUTE
; ---------------------------------
;   |   |   |   |   |   |   |   |____ GROUP NOT IMPLEMENTED
;   |   |   |   |   |   |   |________ VOTING ENABLE
;   |   |   |   |   |   |____________ MANUAL AS PO ENABLE
;   |   |   |   |   |________________ NOT USED
;   |   |   |   |____________________ NOT USED
;   |   |   |________________________ NOT USED
;   |   |____________________________ NOT USED
;   |________________________________ NOT USED
;
GROUP_IMP        BIT     ACC.0
VOTING_FG        BIT     ACC.1
MANUAL_PO        BIT     ACC.2
; ---------------------------------
; | 7 | 6 | 5 | 4 | 3 | 2 | 1 | 0 |   CHANNEL CONTROL 0
; ---------------------------------
;   |   |   |   |   |   |   |   |____ CTCSS MAN
;   |   |   |   |   |   |   |________ CTCSS SCN
;   |   |   |   |   |   |____________ SEQ MAN
;   |   |   |   |   |________________ SEQ SCN
;   |   |   |   |____________________ NOT USED
;   |   |   |________________________ NOT USED
;   |   |____________________________ NOT USED
;   |________________________________ NOT USED
;
;CONTROL 0
CTCSS_MAN        BIT     ACC.0
CTCSS_SCN        BIT     ACC.1
SEQ_MAN          BIT     ACC.2
SEQ_SCN          BIT     ACC.3
; ---------------------------------
; | 7 | 6 | 5 | 4 | 3 | 2 | 1 | 0 |   CHANNEL CONTROL 1
; ---------------------------------
;   |   |   |   |   |   |   |   |____ DUPLEX ENABLE
;   |   |   |   |   |   |   |________ TRANSMIT INHIBIT
;   |   |   |   |   |   |____________ TX POWER CHANGE INHIBIT
;   |   |   |   |   |________________ CTCSS TX ENABLE
;   |   |   |   |____________________ SEQ TX ENABLE
;   |   |   |________________________ NOT USED
;   |   |____________________________ NOT USED
;   |________________________________ NOT USED
;
;CONTROL 1
DUPLEX_EN        BIT     ACC.0
TX_INHIBIT       BIT     ACC.1
PWR_INHIBIT      BIT     ACC.2
CTCSS_TX_EN      BIT     ACC.3
SEQ_TX_EN        BIT     ACC.4
```

```
; ---------------------------------
; | 7 | 6 | 5 | 4 | 3 | 2 | 1 | 0 |     CHANNEL CONTROL 2
; ---------------------------------
;   |   |   |   |   |   |   |   |______
;   |   |   |   |   |   |   |__________
;   |   |   |   |   |   |______________
;   |   |   |   |   |__________________
;   |   |   |   |______________________
;   |   |   |__________________________
;   |   |______________________________
;   |__________________________________
;
;
; ---------------------------------
; | 7 | 6 | 5 | 4 | 3 | 2 | 1 | 0 |     CHANNEL CONTROL 3
; ---------------------------------
;   |   |   |   |   |   |   |   |______ NOT USED
;   |   |   |   |   |   |   |__________ NOT USED
;   |   |   |   |   |   |______________ NOT USED
;   |   |   |   |   |__________________ NOT USED
;   |   |   |   |______________________ NOT USED
;   |   |   |__________________________ ALPHA DISPLAY ENABLE
;   |   |______________________________ CHANNEL TEMPORARY DELETED
;   |__________________________________ CHANNEL NOT IMPLEMENTED
;
;CONTROL3
ALPHA_CH        BIT     ACC.5
CH_DELETED      BIT     ACC.6
CH_IMP          BIT     ACC.7
;
; ---------------------------------
; | 7 | 6 | 5 | 4 | 3 | 2 | 1 | 0 |     CHANNEL DISPLAY
; ---------------------------------
;   |   |   |   |   |   |   |   |______
;   |   |   |   |   |   |   |__________
;   |   |   |   |   |   |______________
;   |   |   |   |   |__________________
;   |   |   |   |______________________
;   |   |   |__________________________
;   |   |______________________________
;   |__________________________________
;
;CH_DISP_FG
ALPHA_SYS       BIT     ACC.0
;***************************************************************************
;
;MODULE NAME: CSYS_OUT
;       (C) Copyright 1987 Teletec Corporation, U.S.A.
;AUTHOR: Ming Hsu
;CODE COMPLETE: 12/12/86
;LAST MODIFICATION: 02/24/87
;PERFORMED BY: Ming Hsu
;TEST/DEBUG:
;
;REVISION NUMBER: new
;
;DESCRIPTION: This module set up message for system parameters down load from CU to RFU
;
;INPUTS:
;
;OUTPUTS:
;
;REGISTER USAGE:
;
;SUPPORT MODULES:
;
;SIZE:
;
;EXECUTION TIME:
;
;PDL:
;
;***************************************************************************
;*********************************************************************
;
;MODULE NAME: CSYS_RES
;       (C) Copyright 1987 Teletec Corporation, U.S.A.
;AUTHOR: John Fussell
;CODE COMPLETE: 10/01/86
;LAST MODIFICATION: 03/02/87
```

```
;PERFORMED BY: Ming Hsu
;TEST/DEBUG:
;
;REVISION NUMBER: new
;
;DESCRIPTION: This module will restore all pertinent system parameters
;             from eeprom at power up. All parameters will be checked
;             for validity and if wrong data is found then a default
;             value will be substituted. The parameters will be retrieved
;             from eeprom and restored in the system state table.
;
;INPUTS: SAVE_CHAN - channel prior to last power down.
;        SAVE_VOL - volume prior to last power down
;        SAVE_SQ - squelch prior to last power down.
;        SAVE_GROUP - scan group prior to last power down.
;        SAVE_FUNC - function status prior to last power down.
;        SAVE_MODE - channeling mode prior to last power down
;        SAVE_SITE - site prior to last power down.
;        SAVE_POWER - transmit power prior to last power down.
;
;OUTPUTS: CHANNEL - channel number.
;         VOLUME - speaker volume setting.
;         SQUELCH - squelch setting.
;         GROUP - scan group number.
;         FUNC_STAT - special function status.
;         MODE - channeling mode.
;         SITE - site selection.
;         TX_POWER - transmit power setting.
;
;REGISTER USAGE:
;
;SUPPORT MODULES:
;
;SIZE:
;
;EXECUTION TIME:
;
;*************************************************************************

;*************************************************************************
;
;MODULE NAME: CSYS_SAV
;       (C) Copyright 1987 Teletec Corporation, U.S.A.
;AUTHOR: John Fussell
;CODE COMPLETE: 10/01/86
;LAST MODIFICATION: 02/04/87
;PERFORMED BY: Ming Hsu
;TEST/DEBUG:
;
;REVISION NUMBER: new
;
;DESCRIPTION: This module will save all pertinent system parameters
;             in eeprom prior to power down.
;
;INPUTS:
;
;OUTPUTS:
;
;REGISTER USAGE:
;
;SUPPORT MODULES: CEETIMER - eeprom cycle timer function.
;
;SIZE:
;
;EXECUTION TIME:
;
;PDL:    build buffer of parameters to save
;        IF (EEROM_ERASE = 1)
;          IF (erase cycle time out)
;             start write cycle
;          ENDIF
;        ELSE
;          IF (EEROM_WRITE = 1)
;             IF (write cycle time out)
;               issue a read command
;               start next erase cycle
;             ENDIF
;          ELSE
;             start erase cycle
;          ENDIF
;        ENDIF
```

```
;       EXIT
;
;************************************************************************
;************************************************************************
;
;MODULE NAME: CT_DISP
;
;CODE COMPLETE: 12/22/86
;LAST MODIFICATION: 12/22/86
;TEST/DEBUG:
;
;REVISION NUMBER: new
;
;DESCRIPTION: This module is the executive function for the transmit timeout
;
;INPUT:
;
;OUTPUTS: none
;
;REGISTER USAGE:
;
;SUPPORT MODULES:
;
;************************************************************************
;************************************************************************
;
;MODULE NAME: CTX2OFF
;
;CODE COMPLETE: 12/22/86
;LAST MODIFICATION: 12/22/86
;TEST/DEBUG:
;
;REVISION NUMBER: new
;
;DESCRIPTION: This routine handles the state transition from the transmit
;             mode to the off hook mode.
;
;INPUTS: none
;
;OUTPUTS: TXMODEFG - state flag updated.
;         OFFHOOKFG - state flag updated.
;
;REGISTER USAGE: none
;
;SUPPORT MODULES: none
;
;SIZE:
;
;EXECUTION TIME:
;
;PDL:
;
;************************************************************************
;************************************************************************
;
;MODULE NAME: CTX2RX
;
;CODE COMPLETE: 02/11/86
;LAST MODIFICATION: 12/22/86
;TEST/DEBUG:
;
;REVISION NUMBER: new
;
;DESCRIPTION: This module is the state transition routine that handles
;             the transition from exec transmit mode to exec receive mode.
;
;
;
;INPUTS: none
;
;OUTPUTS: TXMODEFG - cleared due to mode change.
;         RXMODEFG - set to indicate new mode
;
;REGISTER USAGE: none
;
;SUPPORT MODULES: none
;
;SIZE:
;
```

```
;EXECUTION TIME:
;
;PDL:    set exec mode flags to receive mode
;        EXIT
;
;*************************************************************************
;*************************************************************************
;
;MODULE NAME: CTX_ACT
;
;CODE COMPLETE. 05 23/86
;LAST MODIFICATION: 07/11/86
;TEST/DEBUG:
;
;REVISION NUMBER: new
;
;DESCRIPTION: This module is one of the EXEC stage. It checks the response
;              from RFU and decides to re_transmit or finish the transmit
;              process.
;
;INPUTS:
;
;OUTPUTS:
;
;REGISTER USAGE: A, R1, R2, R3, R4, R7, DPTR
;
;SUPPORT MODULES:
;
;SIZE:
;
;EXECUTION TIME:
;
;PDL:
;        IF (TX pending)
;           IF (RX buffer empty)
;              IF (TX timeout)
;                  re_transmit
;              ELSE
;                  IF (received character = ACK)
;                      finished the TX procedure
;                  ENDIF
;              ENDIF
;           ENDIF
;        ENDIF
;        EXIT
;
;*************************************************************************
;*************************************************************************
;
;MODULE NAME: CTX_CMD
;        (C) Copyright 1987 Teletec Corporation, U.S.A.
;AUTHOR: Ming Hsu
;CODE COMPLETE: 05/23/86
;LAST MODIFICATION: 10/31/86
;PERFORMED BY: Ming Hsu
;TEST/DEBUG:
;
;REVISION NUMBER: new
;
;DESCRIPTION: This module will execute in response to a PCM transmit command
;              interrupt. This module will be responsible for removing data
;              from the data buffer and storing the data in PCM transmit command
;              latch.
;
;INPUTS:
;
;OUTPUTS:
;
;REGISTER USAGE:
;
;SUPPORT MODULES:
;
;SIZE:
;
;EXECUTION TIME:
;                 Normal Case = 47 us
;                 Last byte case = 25 us
;PDL:
;        IF (byte count equal to zero)
```

```
;          set rfu response pending flag
;          change PCM mode to data mode
;          enable pcm rx interrupt
;       ELSE
;          decrease byte count
;          get current data byte
;          send data to PCM command port
;       ENDIF
;       EXIT
;
;**********************************************************************
;**********************************************************************
;
;MODULE NAME: CTX_SAME
;
;CODE COMPLETE: 07/10/86
;LAST MODIFICATION: 11/03/86
;TEST/DEBUG:
;
;REVISION NUMBER: new
;
;DESCRIPTION: This module handles the re-transmission of the last message
;             transmitted to the RFU. An error counter will be maintained
;             and should the maximum number of errors be reached re-
;             transmission will be aborted and the error reported.
;
;INPUTS:
;
;OUTPUTS:
;
;REGISTER USAGE: A, DPTR
;
;SUPPORT MODULES: none
;
;SIZE:
;
;EXECUTION TIME:
;
;PDL:   IF (PCM_ERR_CNT = PCM_ERR_MAX)
;          reset receive buffer
;          release transmit buffer
;          set pcm error flag to active
;          reset pcm error counter
;       ELSE
;          increment pcm error counter
;          re-init transmit byte count
;          re_init tx buffer pointer
;          re-enable transmit interrupt
;          set pcm to command mode
;          write soh to transmit latch
;       ENDIF
;       disable receive interrupt
;       EXIT
;
;**********************************************************************
;**********************************************************************
;
;MODULE NAME: CTXMODE
;
;CODE COMPLETE: 02/11/86
;LAST MODIFICATION: 12/22/86
;TEST/DEBUG:
;
;REVISION NUMBER: new
;
;DESCRIPTION: This module is the executive function for the transmit mode
;             of the single processor TRIQ-1300 prototype. This routine
;             will examine state flags and dispatch control to the appropriate
;             processors.
;
;INPUTS: CHANGEMODE - exec mode state change flag
;
;OUTPUTS: none
;
;REGISTER USAGE:
;
;SUPPORT MODULES: TX2RX - TX mode to RX mode state transition routine
;                 HEALTHCHECK - system health monitor function
;                 ALPHAUPDATE - updates alphanumeric display
;                 TX_ACTION - handles RFU message responses
;
```

```
;                 CCM_DISP - handles dispatching rfu messages.
;                 CPD_ACT - handles power down action.
;
;SIZE:
;
;EXECUTION TIME:
;
;*************************************************************************

;*************************************************************************
;
;PDL:   DOLOOP
;         execute system health check function
;         IF (ALPHAFG=1)
;         THEN execute alphanumeric update function
;         IF (TX_CHECK=1)
;         THEN execute transmit action function
;         IF (DISPATCH_FG=1)
;         THEN execute dispatch function
;         IF (PWR_DN_FG=1)
;         THEN execute power down function
;         IF (HEALTH_FG=1)
;         THEN execute health check command
;         IF (CHANGEMODE=1)
;         THEN execute state transition routine
;              execute receive mode exec function
;         ENDIF
;       ENDLOOP
;
;*************************************************************************

;*************************************************************************
;
;MODULE NAME: CTXREF
;       Copyright 1987 Teletec Corporation, U.S.A.
;AUTHOR: Ming Hsu
;CODE COMPLETE: 02/10/86
;LAST MODIFICATION: 02/02/87
;PERFORMED BY: Ming Hsu
;TEST/DEBUG:
;
;REVISION NUMBER: new
;
;DESCRIPTION: This module will execute when the TXREF_FG state change
;             flag is active. This module will update the transmit synthesizer
;             reference frequency based on the TXSYNREF constant in the
;             database. TXREF_FG will cleared prior to exit.
;
;INPUTS: TXSYNREF - transmit synthesizer reference (14 bits)
;
;OUTPUTS: TXREF_FG - state change flag cleared prior to exit
;
;REGISTER USAGE: A, DPTR, R0, R2
;
;SUPPORT MODULES: MESS_PREP - rf unit message preparation.
;
;SIZE:
;
;EXECUTION TIME:
;
;PDL:   IF (TX_EMPTY=0)
;         get transmit synthesizer reference frequency
;         build message for rf unit
;         execute MESS_PREP routine
;         clear state change flag
;       ENDIF
;       EXIT
;
;*************************************************************************

;*************************************************************************
;
;MODULE NAME: CTXSYN
;
;CODE COMPLETE: 01/28/86
;LAST MODIFICATION: 07/19/86
;TEST/DEBUG:
;
;REVISION NUMBER: new
;
```

```
;DESCRIPTION: This routine will be executed when TXSYNFG is active. This routine
;             will update the transmit synthesizer based on the TXSYNFREQ state
;             variable. The TXSYNFG state change flag will be cleared upon exit.
;
;INPUTS: TXSYNFREQ - current transmit frequency from state table.
;
;OUTPUTS: TXSYNFG - cleared upon exit of this routine.
;
;REGISTER USAGE: A, DPTR, R0
;
;SUPPORT MODULES: MESS_PREP - RF unit message preparation.
;
;SIZE:
;
;EXECUTION TIME:
;
;PDL:    IF (TX_EMPTY=0)
;           retrieve divide by N for synthesizer
;           build message for rf unit
;           clear transmit synthesizer state change flag
;        ENDIF
;        EXIT
;
;*************************************************************************

;*************************************************************************
;
;MODULE NAME: VECTORS
;       (C) Copyright 1987 Teletec Corporation, U.S.A.
;AUTHOR: John Fussell
;CODE COMPLETE: 01/21/86
;LAST MODIFICATION: 03/06/87
;PERFORMED BY: Ming Hsu
;TEST/DEBUG:
;
;REVISION NUMBER:
;
;DESCRIPTION: This module contains the vectors required for interrupt
;             service. This module must be located in the lower 25H bytes
;             of program memory. i.e. ORG at location 0.
;
;INPUTS: none
;
;OUTPUTS:none
;
;REGISTER USAGE: none
;
;SUPPORT MODULES: none
;
;SIZE: 23H bytes
;
;EXECUTION TIME:none
;
;PDL: none
;
;*************************************************************************

;*************************************************************************
;
;MODULE NAME: CVOLUME
;
;CODE COMPLETE: 02/5/86
;LAST MODIFICATION: 10/23/86
;TEST/DEBUG:
;
;REVISION NUMBER: new
;
;DESCRIPTION: This module takes care of the VOLUME_UP and VOLUME_DOWN key
;             operations.
;
;INPUTS:
;
;OUTPUTS:
;
;REGISTERS USAGE:
;
;SUPPORT MODULES:
;
;SIZE:
;
;EXECUTION TIME:
```

```
;
;PDL:
;       set volume up/down flag
;       set up next entry point
;       check key input
;       IF multiple keys
;          THEN
;               IF volume up/down both pressed
;                  THEN display current volume level
;                  ELSE illegal key
;               exit
;          ELSE
;               set up first key delay count
;          EXIT
;
;*****************************************************************************

;************************************************************************
;
;MODULE NAME: CVUPDATE
;
;CODE COMPLETE: 01/23/86
;LAST MODIFICATION: 10/29/86
;TEST/DEBUG:
;
;REVISION NUMBER: new
;
;DESCRIPTION: This module will execute when the volume state flag has been set.
;             This module will update the volume bar graph portion of the
;             anunciator command buffer all values of the VOLUME state
;             variable. This is done by using the volume state variable as an
;             input and building four Write Display Ram Commands with a bit set
;             for each segment to be turned on. The volume DAC will be updated
;             for all values of the VOLUME state variable. The volume state
;             change flag will be cleared prior to exit of this routine.
;
;
;INPUTS: VOLUME - state variable indicating relative volume setting.
;                 valid values are 0 to 31.
;
;OUTPUTS: ANUNCFG - set if ANUNCT buffer has been updated.
;         VOLFG - cleared when process is complete.
;
;REGISTER USAGE: A, B, DPTR, R0, R1, R2
;
;SUPPORT MODULES: none
;
;SIZE:
;
;EXECUTION TIME:
;
;PDL:   IF (VOLUME is an even value)
;         update volume bar graph in anunciator buffer
;         set ANUNCFG so display is updated
;       ENDIF
;       use VOLUME state variable as index to VOLTABLE
;       update volume DAC with value from table
;       EXIT
;
;************************************************************************

;************************************************************************
;
;MODULE NAME: RCM_CHAN
;
;CODE COMPLETE: 06/17/86
;LAST MODIFICATION: 10/01/86
;TEST/DEBUG:
;
;REVISION NUMBER: new
;
;DESCRIPTION: This module handles command active channel function.
;
;INPUTS:
;
;OUTPUTS: T_MESS - transmit message buffer.
;
;REGISTER USAGE: A, DPTR, R0, R1
;
;SUPPORT MODULES: none
;
```

```
;SIZE:
;
;EXECUTION TIME:
;
;PDL:
;
;*****************************************************************************

;*****************************************************************************
;
;MODULE NAME: RCM_CHCG
;
;       (C) Copyright 1987 Teletec Corporation, U.S.A.
;
;PERFORMED BY: Ming Hsu
;CODE COMPLETE: 05/30/86
;LAST MODIFICATION: 02/26/87
;PERFORMED BY: David Easter
;TEST/DEBUG:
;
;REVISION NUMBER: new
;
;DESCRIPTION: This module takes the received channel parameter and updates
;              state table.
;
;INPUTS:
;
;OUTPUTS:
;
;REGISTER USAGE:
;
;SUPPORT MODULES:
;
;SIZE:
;
;EXECUTION TIME:
;
;PDL:
;
;*****************************************************************************

;*****************************************************************************
;
;MODULE NAME: RCM_CONF
;
;CODE COMPLETE:
;LAST MODIFICATION: 10/01/86
;TEST/DEBUG:
;
;REVISION NUMBER: new
;
;DESCRIPTION:This module handles system configuration check.
;
;INPUTS:
;
;OUTPUTS:
;
;REGISTER USAGE:
;
;SUPPORT MODULES:
;
;SIZE:
;
;EXECUTION TIME:
;
;PDL:
;
;*****************************************************************************

;*****************************************************************************
;
;MODULE NAME: RCM_CTCTX
;
;CODE COMPLETE:
;LAST MODIFICATION: 2/26/87
;TEST/DEBUG:
;
;REVISION NUMBER: new
;
;DESCRIPTION: This module updates CTCSS transmit tone in state table.
;
```

```
;INPUTS:
;
;OUTPUTS:
;
;REGISTER USAGE:
;
;SUPPORT MODULES:
;
;SIZE:
;
;EXECUTION TIME:
;
;PDL:
;
;******************************************************************************

;*************************************************************************
;
;MODULE NAME: RCM_DISP
;
;CODE COMPLETE: 07/10/86
;LAST MODIFICATION: 10/14/86
;TEST/DEBUG:
;
;REVISION NUMBER: new
;
;DESCRIPTION: This module will handle the reception of messages from the
;             RFU other than ACK's and NAK's. These messages will be stored
;             and program control will be dispatched to the appropriate
;             command processor for action. A checksum will be calculated
;             on the incoming message and bad messages will result in the
;             original CU command being re-transmitted.
;
;INPUTS:
;
;OUTPUTS:
;
;REGISTER USAGE:
;
;SUPPORT MODULES: CTX_SAME - handles re-transmission of previaous message.
;
;SIZE:
;
;EXECUTION TIME:
;
;PDL:    IF ( REAL_CLOCK - RX_TIMER - RX_TIMEOUT > 1 )
;           retransmit
;        ELSE
;           A = number of bytes received
;           B = number of bytes expected
;           A : B
;           IF (all bytes are here)
;              calculate checksum
;              IF (checksum bad)
;                retransmit
;              ELSE
;                dispatch program to message handler
;                reset message function
;              ENDIF
;           ENDIF
;        ENDIF
;        EXIT
;
;*************************************************************************

;******************************************************************************
;
;MODULE NAME: CM_DTMF
;
;CODE COMPLETE:
;LAST MODIFICATION: 06/17/86
;TEST/DEBUG:
;
;REVISION NUMBER: new
;
;DESCRIPTION: This module handles DTMF function.
;
;INPUTS:
;
;OUTPUTS:
;
```

```
;REGISTER USAGE:
;
;SUPPORT MODULES:
;
;SIZE:
;
;EXECUTION TIME:
;
;PDL:
;
;*******************************************************************************

;***************************************************************************
;
;MODULE NAME: RCM_GFRE
;       (C) Copyright 1987 Teletec Corporation, U.S.A.
;AUTHOR: Ming Hsu
;CODE COMPLETE: 08/20/86
;LAST MODIFICATION: 02/11/87
;PERFORMED BY:Ming Hsu
;TEST/DEBUG:
;
;REVISION NUMBER: new
;
;DESCRIPTION: This routine handles updating the current group state table
;             with data received from the control unit.
;
;INPUTS: RX_BEG - PCM receive buffer
;        GRP_MES_CNT - number of group frequency messages expected.
;
;OUTPUTS: CURRENT_GRP - updated with new group frequency data
;
;REGISTER USAGE: A, DPTR, R1,
;
;SUPPORT MODULES:
;
;SIZE:
;
;EXECUTION TIME:
;
;PDL:
;
;***************************************************************************

;*******************************************************************************
;
;MODULE NAME: RCM_GUARD
;       (C) Copyright 1987 Teletec Corporation, U.S.A.
;AUTHOR: Ming Hsu
;CODE COMPLETE: 03/03/87
;LAST MODIFICATION: 03/03/87
;PERFORMED BY: Ming Hsu
;TEST/DEBUG:
;
;REVISION NUMBER: new
;
;DESCRIPTION:
;
;INPUTS:
;
;OUTPUTS:
;
;REGISTER USAGE:
;
;SUPPORT MODULES:
;
;SIZE:
;
;EXECUTION TIME:
;
;PDL:
;
;*******************************************************************************

;*******************************************************************************
;
;MODULE NAME: RCM_HEAL
;
;CODE COMPLETE:06/05/86
;LAST MODIFICATION: 12/15/86
;TEST/DEBUG:
```

```
;
;REVISION NUMBER: new
;
;DESCRIPTION: This module handles health status response.
;
;INPUTS:
;
;OUTPUTS:
;
;REGISTER USAGE:
;
;SUPPORT MODULES:
;
;SIZE:
;
;EXECUTION TIME:
;
;PDL:
;
;*****************************************************************************

;*****************************************************************************
;
;MODULE NAME: RCM_INOUT
;       (C) Copyright 1987 Teletec Corporation, U.S.A.
;AUTHOR: Ming Hsu
;CODE COMPLETE: 02/18/87
;LAST MODIFICATION: 02/18/87
;PERFORMED BY: Ming Hsu
;TEST/DEBUG:
;
;REVISION NUMBER: new
;
;DESCRIPTION: This module handles RX synthesizer reference frequency.
;
;INPUTS:
;
;OUTPUTS:
;
;REGISTER USAGE:
;
;SUPPORT MODULES:
;
;SIZE:
;
;EXECUTION TIME:
;
;PDL:
;
;*****************************************************************************

;*****************************************************************************
;
;MODULE NAME: RCM_MODE
;
;CODE COMPLETE: 05/30/86
;LAST MODIFICATION: 10/14/86
;TEST/DEBUG:
;
;REVISION NUMBER: new
;
;DESCRIPTION: This module update the mode in state table.
;
;INPUTS:
;
;OUTPUTS:
;
;REGISTER USAGE:
;
;SUPPORT MODULES:
;
;SIZE:
;
;EXECUTION TIME:
;
;PDL:
;       update MODE from download message
;       IF (MODE_SCAN <> MHMODE OR mode was not initialized)
;CM1000:        set MODE_SCAN to MODE
;               execute scan initialization function
```

```
:CM5000:ENDIF
:       clear MODE_INIT initialization flag
:       set MOD_FLAG state cnange flag
;
;*************************************************************************

;*************************************************************************
:
:MODULE NAME: RCM_PA
:
:CODE COMPLETE: 01/08/87
:LAST MODIFICATION: 01/08/87
:TEST/DEBUG:
:
:REVISION NUMBER: new
;
:DESCRIPTION: This module update the PA mode in state table.
;
;INPUTS:
;
:OUTPUTS:
;
:REGISTER USAGE:
:
:SUPPORT MODULES:
:
:SIZE:
:
:EXECUTION TIME:
:
:PDL:
:
;*************************************************************************

;*************************************************************************
:
:MODULE NAME: CM_PD
:
:CODE COMPLETE:
:LAST MODIFICATION: 07/29/86
:TEST/DEBUG:
:
:REVISION NUMBER: new
:
:DESCRIPTION: This module handles power down command.
;
;INPUTS:
;
;OUTPUTS:
;
:REGISTER USAGE: none
:
:SUPPORT MODULES: none
:
:SIZE:
:
;EXECUTION TIME:
:
;PDL:
:       set power down flag
:
;*************************************************************************

;*********************************************************************.
:
:MODULE NAME: RCM_PRI
:       (C) Copyright 1987 Teletec Corporation. U.S.A.
:AUTHOR: ming Hsu
:CODE COMPLETE: 10/14/86
:LAST MODIFICATION: 02/27/87
:PERFORMED BY: David Easter
:TEST/DEBUG:
:
;REVISION NUMBER: new
:
;DESCRIPTION: This module will take the received group priority data to
:               state table.
:
;INPUTS:
;
:OUTPUTS:
```

```
;
;REGISTER USAGE:
;
;SUPPORT MODULES:
;
;SIZE:
;
;EXECUTION TIME:
;
;PDL:
;
;************************************************************************

;*******************************************************************************
;
;MODULE NAME: RCM_PTT
;
;CODE COMPLETE: 12/15/86
;LAST MODIFICATION: 12/16/86
;TEST/DEBUG:
;
;REVISION NUMBER: new
;
;DESCRIPTION: This module update the mode in state table.
;
;INPUTS:
;
;OUTPUTS:
;
;REGISTER USAGE:
;
;SUPPORT MODULES:
;
;SIZE:
;
;EXECUTION TIME:
;
;PDL:
;
;*******************************************************************************

;*******************************************************************************
;
;MODULE NAME: CM_RESET
;
;CODE COMPLETE:
;LAST MODIFICATION: 06/17/86
;TEST/DEBUG:
;
;REVISION NUMBER: new
;
;DESCRIPTION: This module handles talker/listener reset function.
;
;INPUTS:
;
;OUTPUTS:
;
;REGISTER USAGE:
;
;SUPPORT MODULES:
;
;SIZE:
;
;EXECUTION TIME:
;
;PDL:
;
;*******************************************************************************

;*******************************************************************************
;
;MODULE NAME: RCM_RFLV
;
;CODE COMPLETE:
;LAST MODIFICATION: 2/26/87
;TEST/DEBUG:
;
;REVISION NUMBER: new
;
```

```
;DESCRIPTION: This module load RF level in state table
;
;INPUTS: RF level in receive buffer
;
;OUTPUTS: RF level in state table
;
;REGISTER USAGE: ACC,PSW,DPTR
;
;SUPPORT MODULES: NONE
;
;SIZE:
;
;EXECUTION TIME:
;
;PDL:
;
;****************************************************************************

;****************************************************************************
;
;MODULE NAME: RCM_RXREF
;
;CODE COMPLETE: 07/15/86
;LAST MODIFICATION: 10/16/86
;TEST/DEBUG:
;
;REVISION NUMBER: new
;
;DESCRIPTION: This module handles RX synthesizer reference frequency.
;
;INPUTS:
;
;OUTPUTS:
;
;REGISTER USAGE:
;
;SUPPORT MODULES:
;
;SIZE:
;
;EXECUTION TIME:
;
;PDL:
;
;****************************************************************************

;****************************************************************************
;
;MODULE NAME: RCM_RXSEQ
;
;CODE COMPLETE:
;LAST MODIFICATION: 05/30/86
;TEST/DEBUG:
;
;REVISION NUMBER: new
;
;DESCRIPTION: This module handles RX sequential tone.
;
;INPUTS:
;
;OUTPUTS:
;
;REGISTER USAGE:
;
;SUPPORT MODULES:
;
;SIZE:
;
;EXECUTION TIME:
;
;PDL:
;
;****************************************************************************

;****************************************************************************
;
;MODULE NAME: RCM_SNSQ
;
;CODE COMPLETE:
;LAST MODIFICATION: 10/14/86
;TEST/DEBUG:
```

```
;
;REVISION NUMBER: new
;
;DESCRIPTION: This module handles the command SNSQ.
;
;INPUTS: SNSQ in receive buffer
;
;OUTPUTS: update SNSQ in state table
;
;REGISTER USAGE: ACC,PSW,DPTR
;
;SUPPORT MODULES:
;
;SIZE:
;
;EXECUTION TIME:
;
;PDL:
;
;*****************************************************************************

;*****************************************************************************
;
;MODULE NAME: RCM_SSI
;
;CODE COMPLETE:
;LAST MODIFICATION: 10/01/86
;TEST/DEBUG:
;
;REVISION NUMBER: new
;
;DESCRIPTION: This module handles signal strength indicator.
;
;INPUTS:
;
;OUTPUTS:
;
;REGISTER USAGE:
;
;SUPPORT MODULES: PREP_MES
;
;SIZE:
;
;EXECUTION TIME:
;
;PDL:
;
;*****************************************************************************

;*****************************************************************************
;
;MODULE NAME: RCM_STATE
;       (C) Copyright 1987 Teletec Corporation, U.S.A.
;AUTHOR: Ming Hsu
;CODE COMPLETE:10/10/86
;LAST MODIFICATION: 02/16/87
;PERFORMED BY: Ming Hsu
;TEST/DEBUG:
;
;REVISION NUMBER: new
;
;DESCRIPTION: This module handles state table check sum response.
;
;INPUTS:
;
;OUTPUTS:
;
;REGISTER USAGE:
;
;SUPPORT MODULES:
;
;SIZE:
;
;EXECUTION TIME:
;
;PDL:
;
;*****************************************************************************
```

```
;*****************************************************************************
;
;MODULE NAME: CM_TRAN
;
;CODE COMPLETE:
;LAST MODIFICATION: 06/17/86
;TEST/DEBUG:
;
;REVISION NUMBER: new
;
;DESCRIPTION: This module handles talker/listener transfer function.
;
;INPUTS:
;
;OUTPUTS:
;
;REGISTER USAGE:
;
;SUPPORT MODULES:
;
;SIZE:
;
;EXECUTION TIME:
;
;PDL:
;
;*****************************************************************************

;*****************************************************************************
;
;MODULE NAME: RCM_TXFSK
;
;CODE COMPLETE:
;LAST MODIFICATION: 05/30/86
;TEST/DEBUG:
;
;REVISION NUMBER: new
;
;DESCRIPTION:
;
;INPUTS:
;
;OUTPUTS:
;
;REGISTER USAGE:
;
;SUPPORT MODULES:
;
;SIZE:
;
;EXECUTION TIME:
;
;PDL:
;
;*****************************************************************************

;*****************************************************************************
;
;MODULE NAME: RCM_TXREF
;
;CODE COMPLETE:
;LAST MODIFICATION: 10/14/86
;TEST/DEBUG:
;
;REVISION NUMBER: new
;
;DESCRIPTION: This module handles TX synthesizer reference frequency.
;
;INPUTS:
;
;OUTPUTS:
;
;REGISTER USAGE:
;
;SUPPORT MODULES:
;
;SIZE:
;
;EXECUTION TIME:
;
```

```
;PDL:
;
;*******************************************************************************

;*******************************************************************************
;
;MODULE NAME: RCM_TXSEQ
;
;CODE COMPLETE:
;LAST MODIFICATION: 05/30/86
;TEST/DEBUG:
;
;REVISION NUMBER: new
;
;DESCRIPTION: This module handles TX sequential tone
;
;INPUTS:
;
;OUTPUTS:
;
;REGISTER USAGE:
;
;SUPPORT MODULES:
;
;SIZE:
;
;EXECUTION TIME:
;
;PDL:
;
;*******************************************************************************

;*******************************************************************************
;
;MODULE NAME: RCM_VOFF
;
;       (c) Copyright 1987 Teletec Corporation, U.S.A.
;
;AUTHOR: Ming Hsu
;CODE COMPLETE: 05/30/86
;LAST MODIFICATION: 02/24/87
;PERFORMED BY: John Fussell
;TEST/DEBUG:
;
;REVISION NUMBER: new
;
;DESCRIPTION: This module handles voice privacy OFF.
;
;INPUTS: none
;
;OUTPUTS: AUDIO_CNTRL - updated to disable voice privacy.
;
;REGISTER USAGE: A, DPTR
;
;SUPPORT MODULES: none
;
;SIZE:
;
;EXECUTION TIME:
;
;PDL:   disable voice privacy module
;       switch audio paths for normal audio
;       set audio control update flag
;       EXIT
;
;*******************************************************************************

;*******************************************************************************
;
;MODULE NAME: RCM_VON
;
;       (c) Copyright 1987 Teletec Corporation, U.S.A.
;
;AUTHOR: Ming Hsu
;CODE COMPLETE: 05/30/86
;LAST MODIFICATION: 02/24/87
;PERFORMED BY: John Fussell
;TEST/DEBUG:
;
;REVISION NUMBER: new
```

```
;
;DESCRIPTION: This module handles voice privacy ON.
;
;INPUTS: none
;
;OUTPUTS: AUDIO_CNTRL - updated to enable voice privacy.
;
;REGISTER USAGE: A, DPTR
;
;SUPPORT MODULES: none
;
;SIZE:
;
;EXECUTION TIME:
;
;PDL:     turn on voice privacy module
;         switch audio paths for voice privacy
;         set audio control update flag
;         EXIT
;
;*******************************************************************************
```

What is claimed is:

1. A multipurpose two-way radio comprising:

(a) a Control Unit, said Control Unit having a first microprocessor, and a multiplexer for serializing digitized signals including digitized audio and a demultiplexer for deserializing digitized signals including digitized audio;

(b) a Transceiver Unit having a second microprocessor, radio function modules and a multiplexer for serializing digitized signals including digitized audio and a demultiplexer for deserializing digitized signals including digitized audio;

(c) programmable software for imparting versatility to said radio, said programmable software operating at least said first or said second microprocessor;

(d) a multiplexed full duplex serial interface providing two-way communications for digital signals including said digitized audio between said Control Unit and said Transceiver Unit; and (e) means for transmitting and receiving said digitized signals including digitized audio over said multiplexed full duplex serial interface.

2. The multipurpose two-way radio of claim 1 further comprising a control panel disposed in said Control Unit.

3. The multipurpose two-way radio of claim 2 wherein said control panel includes a plurality of command and mode switches; function switches and a display connected to said first microprocessor.

4. The multipurpose two-way radio of claim 1 wherein said first microprocessor in said Control Unit and said second microprocessor in said Transceiver Unit include digital memory.

5. The multipurpose two-way radio of claim 2 wherein said digitized signals further comprise control signals, including control instructions.

6. The multipurpose two-way radio of claim 5 wherein said Control Unit further comprises means for generating said control signals and said Transceiver Unit further comprising means for executing said control instructions.

7. The multipurpose two-way radio of claim 6 further comprising an input/output port connected to said Control Unit microprocessor and said control panel, said input/output port interchanging digital information with said control panel.

8. The multipurpose two-way radio of claim 1 wherein said multiplexed full duplex serial interface has one or more optical fibers.

9. The multipurpose two-way radio of claim 1 or 8 wherein said multiplexed full duplex serial interface is interfaced with said multiplexer in said Control Unit to form a digital frame for serial transmission over said multiplexed full duplex serial interface, said multiplexer in said Control Unit having at least one digital data input and a digital audio word input and also interfaced with said multiplexer in said Transceiver Unit for receiving a digital frame from said multiplexed full duplex serial interface and separating said digital data input and said digitized audio word input.

10. The multipurpose two-way radio of claim 8 wherein said multiplexer and said demultiplexer in said Control Unit and said multiplexer and said demultiplexer in said Transceiver Unit include means for converting and reconverting audio word to analog audio.

11. The multipurpose two-way radio of claims 1 or 2 wherein said software, in cooperation with said first or said second microprocessor creates transmit and receive messages in digital frames for transmission over said multiplexed full duplex serial interface.

12. The multipurpose two-way radio of claim 1 or 2 further comprising an electronically programmable read only memory device such as a masked ROM.

13. The multipurpose two-way radio of claim 1 further comprising an electronically programmable memory device such as an EE prom or non-volatile static RAM.

14. The multipurpose two-way radio of claim 1 or 2 further comprising optional function modules connected to said second microprocessor in said Transceiver Unit.

15. The multipurpose two-way radio of claim 14 wherein said optional function modules are controlled by said software.

16. The multipurpose two-way radio of claim 15 wherein said optional function modules include function modules consisting of one or more modules selected from the group consisting of a frequency shift keying module, a sequential data module, a dual tone multiple frequency module, a continuous tone coded squelch system module, a data modem module and a voice privacy module.

17. A two-way mobile radio system comprising:

(a) a Control Unit, said Control Unit having a first central processing unit with digital memory and an interface/serializer;

(b) a radio frequency unit, said radio frequency unit having function modules and a second central processing unit with digital memory and an interface/-deserializer;

(c) programmable software cooperating with said first or said second central processing unit;

(d) a bidirectional digital serial interface connecting said interface/serializer to said interface/deserializer said serialzer having at least one digital data input and digital audio word input to provide the communication of both parametric and non parametric data and signals between said interface/serializer and said interface/deserializer over said bidirectional digital serial interface.

18. The two-way mobile radio system of claim 17 wherein both said Control Unit and Transceiver Unit include programmable software and wherein said bidirectional digital serial interface is bidirectionally symmetrical for carrying both digital data information and digitized audio.

19. The two-way mobile radio system of claim 18 wherein said bidirectional digital serial interface is a two-way Digital Serial Bus System connecting said interface/serializer and said interface/deserializer to provide a Time Division Multiplexing/Pulse Code Modulation.

20. The two-way mobile radio system of claim 19 wherein said Digital Serial Bus System provides intercommunication between said Control Unit and said Transceiver Unit.

21. The two-way mobile radio system of claim 17 wherein multi-standard capabilities are provided through the use of said programmable software in cooperation with said function modules.

22. The two-way mobile radio system of claim 19 wherein said software adds or enhances control and function aspects to the radio system/infrastructure to provide interaction between said Control Unit and said Transceiver Unit.

23. The two-way mobile radio system of claim 22 wherein said software adds or enhances one or more capabilities selected from the group consisting of channel attributes, channel organization, channel priorities, multiple operating modes, commands, functions, function setting ranges and provisions, function control protocols, overall coordination of functions and control protocols, scanning, scan related protocols, generation and recognition of various tones and tone sequences, automatic identification, sending messages, receiving messages, transpond function, automatic responses, voting, built-in programming, programming protocols, program cloning, remote programming, remote takeover, remote diagnostics, built-in diagnostics, inhibits, 'enables', manipulation of digital audio/data for encryption/decryption, display, displayed information, alphabetic and/or numeric presentations, 'housekeeping' functions, interaction with and between microprocessors, interactions between the Control Unit and the Transceiver Unit, multiple transceiver control, interaction, coordination and control of peripherals, interaction and control of/with encoders and decoders, interaction and responses to received signals and control of characteristics, capabilities, facilities and attributes that are achieved through software and/or software control.

24. The two-way mobile radio system of claim 22 wherein said software provides versatility to meet network and system changes growth, changing operational requirements, special requirements, special protocols, customer preferences, through software adaptation, software modification, software expansion, software commands, software algorithmic changes, software limiting, software restructuring and other software changes.

25. The two-way mobile radio system of claim 22 wherein said software provides default infrastructure of channel and operating attributes.

26. The two-way mobile radio system of claim 17 wherein said second central processing unit in said radio frequency unit provides means for performing autodiagnostics on the two-way mobile radio.

27. The two-way mobile radio system of claim 17 wherein said Control Unit includes an RS232C Interface Port for communications with peripheral devices.

28. The two-way mobile radio system of claim 17 wherein said bidirectional digital serial interface provides a two or four conductor communications medium between said Control Unit and said radio frequency unit.

29. The two-way mobile radio system of claim 28 wherein said two or four conductor communication medium is an Optical Fiber Control Cable.

30. The two-way mobile radio system of claim 17 further comprising optional function modules connected to said first central processing unit controlled by said software.

31. The two-way mobile radio system of claim 17 wherein said central processing unit provides means for transmitting a high priority signal to headquarters upon operation of a footswitch or the reception of an alarm signal from a portable 'Lifeline' transmitter.

32. A two-way mobile radio system comprising:

(a) a first microprocessor disposed in a Control Unit;

(b) a first multiplexer connected to said first microprocessor providing serialized and deserialized digitized signals including digitized audio;

(c) a second microprocessor disposed in a Transceiver Unit;

(d) a second multiplexer connected to said second microprocessor providing serialized and deserialized digitized signals including digitized audio;

(e) programmable software operating said first or said second microprocessor; and (f) a bidirectional digital serial interface connecting said first multiplexer to said second multiplexer providing two way communication of digitized signals including digitized audio bidirectionally between said first multiplexer and said second multiplexer.

33. The two-way mobile radio system of claim 32 further comprising a control panel disposed in said Control Unit.

34. The two-way mobile radio system of claim 33 wherein said first microprocessor and said programmable software provide means for up/down setting volume and squelch of the two-way radio in discrete digital steps with pseudoanalog and digital display confirmations of settings.

35. The two-way mobile radio system of claim 33 wherein said first microprocessor and said programmable software provide operating modes including: Manual, Manual with Priority, Scan, Scan with Priority and Voting including means for displaying modes.

36. The two-way mobile radio system of claim 33 wherein said first microprocessor and programmable software provides means for controlling such functions as setting value or control of R. F. output Levels, Squelch Steps/Levels, Group of Channels, Public Address Facility for mike audio, Public Address Facility for received audio, control of Auxiliary devices, such as for alerting of incoming calls, Codes for encryption selected, Codes for operating external devices, Codes for personal identification, Digital Status Messages, Selective Calling of other mobile or fixed stations, single or multilevel Privacy/encryption system SITE (CTCSS) or other tones, Telephone Facility and provisions for other special requirements.

37. The two-way mobile radio system of claim 33 wherein said first microprocessor and said programmable software in combination provide an enhanced send function.

38. The two-way mobile radio system of claim 37 further comprising one or more optional function modules selected from the group consisting of a frequency shift keying module, a sequential data module, a dual tone multiple frequency module, a continuous tone coded squelch system module, a data modem module and a voice privacy module.

39. The two-way mobile radio system of claim 33 wherein said programmable software provides one or more functions selected from a group consisting of routine 'housekeeping' functions, responding to signals from said Transceiver Unit, responding to other internal signals, responding to user initiated commands, responding to remote takeover command protocols, responding to remote programming of radio, performing continuous diagnostics routines, responding to faults, complying with external programming, complying with front panel programming routines, accomplishing voting, accomplishing scanning, recognizing priority channels, controlling alphanumeric display, recognizing different uses of same buttons, providing CTCSS tones, providing encryption/decryption, providing common supreme override channel for all programmed channels, providing user interface assistance during programming, responding to emergency signals, controlling operating modes, providing confirmation of settings, timing various functions, performing selective calling, providing various automatic routines, inhibiting functions or routines, as required, controlling/supervising peripheral devices, affecting responses of controls, controlling display annunciators, controlling other indicators, maintaining, updating and supervising channel attributes infrastructure, supervising phone function, maintaining messages from headquarters, supervising program access, performing automatic transponding and performing memory dump upon request.

40. The two-way mobile radio system of claim 33 wherein said Digital Serial Interface/Link provides for networking.

41. The two-way mobile radio system of claim 40 wherein said networking provides for the control of multiple Transceiver Units in the same or different frequency bands.

42. The two-way mobile radio system of claim 32 further comprising modular electromechanical design to provide for conversion.

43. The two-way radio system of claim 42 wherein said modular electromechanical design includes a cover having means for converting said radio from simplex operation to duplex operation and vice versa.

44. The two-way mobile radio system of claim 42 or 43 wherein said modular electromechanical design includes a cover having means for converting said radio from one power to another.

45. The two-way mobile radio system of claim 42 wherein said modular electromechanical design includes a connecting means for converting the two way radio from an integrated unit to an extended controlled version.

46. The two-way mobile radio system of claim 33 further comprising a second microprocessor-based Control Unit and a second control panel disposed in said second microprocessor-based Control Unit to provide additional control facilities to control said Transciever Unit.

47. The two-way mobile radio system of claim 32 further comprising a Remote Instruction Decoder in the two way radio to provide remote programming to said first or said second microprocessor.

48. The two-way mobile radio system of claim 47 wherein said remote programming is a means for a remote reprogramming of said radio.

49. The two-way mobile radio system of claim 47 wherein said remote programming provide a means for erasing said programmable software in said radio.

50. The two-way mobile radio system of claim 47 further comprising a Remote Instruction Decoder.

51. The two-way mobile radio system of claim 50 wherein said Remote Instruction Encoder and Remote Instruction Decoder include facilities for remote diagnostics and interrogation of said radio.

52. The two-way mobile radio system of claim 47 wherein said Remote Instruction Decoder includes facilities for taking over radio control functions normally controlled by the operator.

53. The two-way mobile radio system of claim 32 wherein said programmable software provides voting, said voting including a scan of received signals which are compared to a preset attribute reference and where, upon receipt of a signal meeting referenced attribute qualifications, said signal is determined acceptable and a scan function ceases to allow processing of said signal into information desired; said voting, however, continuing with subsequent scan of other predetermined channels with priority requirement now being the receipt of a signal that compares more favorably with respect to the last accepted signal, the process continuing during two-way communications, with a higher priority predetermined channel overriding and being deemed acceptable over all other channels being polled through scanning.

54. A programmable software based two way radio comprising:

(a) a first microprocessor;

(b) a first multiplexer connected to said first microprocessor for serializing and deserializing both parametric and non parametric digital signals;

(c) a second microprocessor;

(d) a second multiplexer connected to said second microprocessor for serializing and deserializing both parametric and non parametric digital signals;

(e) programmable software operating said first or said second microprocessor;

(f) a multiplexed full duplex serial interface connecting said first multiplexer to said second multiplexer to provide two way communication of said parametric and non parametric digital signals between said first multiplexer and said second multiplexer; and (g) means for transmitting and receiving serialized parametric and non parametric digital signals over said multiplexed full duplex serial interface.

55. The multipurpose two-way radio of claim 1 further comprising a Manchester II encoder and decoder disposed in said control unit and a Manchester II encoder and decoder disposed in said Transciever Unit.

* * * * *